US012547521B2

(12) United States Patent
Cranfill et al.

(10) Patent No.: US 12,547,521 B2
(45) Date of Patent: Feb. 10, 2026

(54) USER INTERFACES FOR CONTROLLING OR PRESENTING DEVICE USAGE ON AN ELECTRONIC DEVICE

(71) Applicant: Apple Inc., Cupertino, CA (US)

(72) Inventors: Elizabeth Caroline Cranfill, San Francisco, CA (US); Christopher P. Foss, San Francisco, CA (US); David C. Graham, Columbus, OH (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/127,779

(22) Filed: Dec. 18, 2020

(65) Prior Publication Data

US 2021/0109836 A1 Apr. 15, 2021

Related U.S. Application Data

(63) Continuation of application No. 16/147,069, filed on Sep. 28, 2018, now Pat. No. 10,872,024.

(Continued)

(51) Int. Cl.

*G06F 11/34* (2006.01)
*G06F 3/04812* (2022.01)

(Continued)

(52) U.S. Cl.

CPC ...... *G06F 11/3438* (2013.01); *G06F 3/04812* (2013.01); *G06F 3/04817* (2013.01); *G06F 9/541* (2013.01); *G06F 11/3062* (2013.01); *G06F 11/321* (2013.01); *G06F 11/3423* (2013.01); *G06F 21/10* (2013.01);

(Continued)

(58) Field of Classification Search

CPC .................................................... G06F 16/273

See application file for complete search history.

(56) References Cited

U.S. PATENT DOCUMENTS 5,483,261 A 1/1996 Yasutake
5,488,204 A 1/1996 Mead et al.

(Continued)

FOREIGN PATENT DOCUMENTS

CN 101339500 A 1/2009
CN 103294965 A 9/2013

(Continued)

OTHER PUBLICATIONS

Extended European Search Report received for European Patent Application No. 20209029.6, mailed on Jul. 16, 2021, 10 pages.

(Continued)

*Primary Examiner* — Di Xiao

(74) *Attorney, Agent, or Firm* — Kubota & Basol LLP

(57) ABSTRACT

In some embodiments, an electronic device presents indications of usage metrics for the device. In some embodiments, an electronic device sets, configures and/or enforces device usage limits. In some embodiments, an electronic device limits access to certain applications during certain periods of time. In some embodiments, an electronic device suppresses auxiliary functions of certain applications when an application usage limit or restriction criteria associated with those applications is reached. In some embodiments, an electronic device manages restriction settings with permission optionally provided by another electronic device.

29 Claims, 282 Drawing Sheets

Related U.S. Application Data

(60) Provisional application No. 62/692,831, filed on Jul. 1, 2018, provisional application No. 62/679,927, filed on Jun. 3, 2018, provisional application No. 62/668,811, filed on May 8, 2018.

(51) Int. Cl.

| | |
|---|---|
| ***G06F 3/04817*** | (2022.01) |
| ***G06F 9/54*** | (2006.01) |
| ***G06F 11/30*** | (2006.01) |
| ***G06F 11/32*** | (2006.01) |
| ***G06F 21/10*** | (2013.01) |
| ***G06F 21/62*** | (2013.01) |
| ***H04L 9/40*** | (2022.01) |
| ***H04L 12/14*** | (2006.01) |
| ***H04M 1/72463*** | (2021.01) |

(52) U.S. Cl.
CPC .......... *G06F 21/6218* (2013.01); *H04L 12/14* (2013.01); *H04L 63/102* (2013.01); *H04M 1/72463* (2021.01); *H04M 1/724631* (2022.02)

(56) References Cited

U.S. PATENT DOCUMENTS

| | | | | |
|---|---|---|---|---|
| 5,825,352 | A | 10/1998 | Bisset et al. | |
| 5,835,079 | A | 11/1998 | Shieh | |
| 5,880,411 | A | 3/1999 | Gillespie et al. | |
| 6,108,735 | A | 8/2000 | Pawlowski | |
| 6,188,391 | B1 | 2/2001 | Seely et al. | |
| 6,230,204 | B1 | 5/2001 | Fleming, III | |
| 6,310,610 | B1 | 10/2001 | Beaton et al. | |
| 6,323,846 | B1 | 11/2001 | Westerman et al. | |
| 6,570,557 | B1 | 5/2003 | Westerman et al. | |
| 6,677,932 | B1 | 1/2004 | Westerman | |
| 6,678,824 | B1 | 1/2004 | Cannon et al. | |
| 6,690,387 | B2 | 2/2004 | Zimmerman et al. | |
| 6,769,127 | B1 | 7/2004 | Bonomi et al. | |
| 6,785,889 | B1 | 8/2004 | Williams | |
| 7,015,894 | B2 | 3/2006 | Morohoshi | |
| 7,184,064 | B2 | 2/2007 | Zimmerman et al. | |
| 7,218,226 | B2 | 5/2007 | Wehrenberg | |
| 7,434,713 | B2 | 10/2008 | Linden | |
| 7,614,008 | B2 | 11/2009 | Ording | |
| 7,627,652 | B1 | 12/2009 | Commons et al. | |
| 7,633,076 | B2 | 12/2009 | Huppi et al. | |
| 7,653,883 | B2 | 1/2010 | Hotelling et al. | |
| 7,657,849 | B2 | 2/2010 | Chaudhri et al. | |
| 7,663,607 | B2 | 2/2010 | Hotelling et al. | |
| 7,688,306 | B2 | 3/2010 | Wehrenberg et al. | |
| 7,814,055 | B2 | 10/2010 | Hullot et al. | |
| 7,822,713 | B2 | 10/2010 | Hullot et al. | |
| 7,844,914 | B2 | 11/2010 | Andre et al. | |
| 7,895,661 | B2 | 2/2011 | Dowdy et al. | |
| 7,899,714 | B2 | 3/2011 | Robbin et al. | |
| 7,957,762 | B2 | 6/2011 | Herz et al. | |
| 8,006,002 | B2 | 8/2011 | Kalayjian et al. | |
| 8,020,105 | B1 | 9/2011 | Lemay et al. | |
| 8,068,825 | B2 | 11/2011 | Mikan et al. | |
| 8,160,941 | B1 | 4/2012 | Field et al. | |
| 8,201,224 | B1 | 6/2012 | Spertus | |
| 8,239,784 | B2 | 8/2012 | Hotelling et al. | |
| 8,279,180 | B2 | 10/2012 | Hotelling et al. | |
| 8,285,810 | B2 | 10/2012 | Svendsen et al. | |
| 8,352,873 | B2 | 1/2013 | Craig et al. | |
| 8,381,135 | B2 | 2/2013 | Hotelling et al. | |
| 8,468,580 | B1 | 6/2013 | Casey et al. | |
| 8,479,122 | B2 | 7/2013 | Hotelling et al. | |
| 8,538,458 | B2 | 9/2013 | Haney | |
| 8,554,861 | B2 | 10/2013 | Christie et al. | |
| 8,700,524 | B2 | 4/2014 | Williams et al. | |
| 8,713,535 | B2 | 4/2014 | Malhotra et al. | |
| 8,812,994 | B2 | 8/2014 | Seymour et al. | |
| 8,825,036 | B2 | 9/2014 | Kemery | |
| 8,881,975 | B1 | 11/2014 | Matthews | |
| 9,129,135 | B2 | 9/2015 | Hoefel et al. | |
| 9,137,389 | B2 | 9/2015 | Neal et al. | |
| 9,172,705 | B1 | 10/2015 | Kong et al. | |
| 9,213,845 | B1 | 12/2015 | Taraki et al. | |
| 9,270,760 | B2 | 2/2016 | Heinberg | |
| 9,292,882 | B2 | 3/2016 | Blinder | |
| 9,294,460 | B1 | 3/2016 | Thomas | |
| 9,348,458 | B2 | 5/2016 | Hotelling et al. | |
| 9,356,890 | B2 | 5/2016 | Odell et al. | |
| 9,369,537 | B1 * | 6/2016 | Mathew | G06F 11/3438 |
| 9,473,419 | B2 | 10/2016 | Brand | |
| 9,557,889 | B2 | 1/2017 | Raleigh et al. | |
| 9,626,720 | B2 | 4/2017 | Robbin et al. | |
| 9,654,598 | B1 * | 5/2017 | Crawford | H04W 4/023 |
| 9,755,842 | B2 | 9/2017 | Raleigh et al. | |
| 9,769,310 | B2 | 9/2017 | Hodge | |
| 9,870,238 | B2 | 1/2018 | Astete et al. | |
| 9,875,346 | B2 | 1/2018 | Pitschel et al. | |
| 9,933,937 | B2 | 4/2018 | Lemay et al. | |
| 9,935,956 | B1 | 4/2018 | Cha et al. | |
| 10,122,723 | B1 | 11/2018 | Chang et al. | |
| 10,243,824 | B2 | 3/2019 | Zalmanovitch et al. | |
| 2002/0015024 | A1 | 2/2002 | Westerman et al. | |
| 2002/0049806 | A1 | 4/2002 | Gatz et al. | |
| 2002/0065919 | A1 | 5/2002 | Taylor et al. | |
| 2003/0028622 | A1 | 2/2003 | Inoue et al. | |
| 2003/0061111 | A1 | 3/2003 | Dutta et al. | |
| 2003/0112874 | A1 | 6/2003 | Rabinowitz et al. | |
| 2004/0015985 | A1 | 1/2004 | Kweon | |
| 2004/0034853 | A1 | 2/2004 | Gibbons et al. | |
| 2004/0127197 | A1 | 7/2004 | Roskind | |
| 2004/0133793 | A1 | 7/2004 | Ginter et al. | |
| 2004/0236650 | A1 | 11/2004 | Zapiec et al. | |
| 2005/0060412 | A1 | 3/2005 | Chebolu et al. | |
| 2005/0190059 | A1 | 9/2005 | Wehrenberg | |
| 2005/0273399 | A1 | 12/2005 | Soma et al. | |
| 2006/0017692 | A1 | 1/2006 | Wehrenberg et al. | |
| 2006/0026521 | A1 | 2/2006 | Hotelling et al. | |
| 2006/0033724 | A1 | 2/2006 | Chaudhri et al. | |
| 2006/0150240 | A1 | 7/2006 | Robinson et al. | |
| 2006/0197753 | A1 | 9/2006 | Hotelling | |
| 2006/0218630 | A1 | 9/2006 | Pearson et al. | |
| 2006/0265192 | A1 | 11/2006 | Turicchi | |
| 2007/0261030 | A1 | 11/2007 | Wadhwa | |
| 2008/0005168 | A1 | 1/2008 | Huff et al. | |
| 2008/0005301 | A1 | 1/2008 | Li et al. | |
| 2008/0005319 | A1 | 1/2008 | Anderholm et al. | |
| 2008/0005325 | A1 | 1/2008 | Wynn et al. | |
| 2008/0070609 | A1 | 3/2008 | Ackley | |
| 2008/0109319 | A1 | 5/2008 | Foss | |
| 2008/0134295 | A1 | 6/2008 | Bailey et al. | |
| 2008/0154903 | A1 | 6/2008 | Crowley et al. | |
| 2009/0064314 | A1 | 3/2009 | Lee | |
| 2009/0086010 | A1 | 4/2009 | Tiphane | |
| 2009/0150545 | A1 | 6/2009 | Flores et al. | |
| 2009/0197569 | A1 | 8/2009 | Gaznaghi et al. | |
| 2009/0254656 | A1 | 10/2009 | Vignisson et al. | |
| 2009/0300671 | A1 | 12/2009 | Scott et al. | |
| 2010/0077036 | A1 | 3/2010 | Deluca et al. | |
| 2010/0146384 | A1 | 6/2010 | Peev et al. | |
| 2010/0146607 | A1 | 6/2010 | Piepenbrink et al. | |
| 2010/0188579 | A1 | 7/2010 | Friedman | |
| 2010/0191575 | A1 | 7/2010 | Raleigh | |
| 2010/0205656 | A1 | 8/2010 | Fein et al. | |
| 2010/0302182 | A1 | 12/2010 | Wei et al. | |
| 2010/0306163 | A1 | 12/2010 | Beaty et al. | |
| 2010/0312696 | A1 | 12/2010 | Sinha et al. | |
| 2011/0055735 | A1 | 3/2011 | Wood et al. | |
| 2011/0065419 | A1 | 3/2011 | Book et al. | |
| 2011/0078767 | A1 | 3/2011 | Cai et al. | |
| 2011/0108622 | A1 | 5/2011 | Das et al. | |
| 2011/0242002 | A1 * | 10/2011 | Kaplan | G06F 3/04883 345/173 |
| 2011/0295727 | A1 | 12/2011 | Ferris et al. | |
| 2011/0302182 | A1 | 12/2011 | Crawford | |
| 2012/0014516 | A1 | 1/2012 | Nies | |
| 2012/0036552 | A1 | 2/2012 | Dare et al. | |
| 2012/0047024 | A1 | 2/2012 | Urban et al. | |

(56) References Cited

U.S. PATENT DOCUMENTS

2012/0079110 A1 3/2012 Brown et al.
2012/0101952 A1 4/2012 Raleigh et al.
2012/0117478 A1 5/2012 Vadde et al.
2012/0173356 A1 7/2012 Fan et al.
2012/0203733 A1 8/2012 Zhang
2012/0210444 A1 8/2012 Yabe et al.
2012/0265803 A1 10/2012 Ha et al.
2012/0291101 A1 11/2012 Ahlstrom et al.
2012/0317609 A1 12/2012 Carrara et al.
2012/0331568 A1 12/2012 Weinstein et al.
2013/0017806 A1 1/2013 Sprigg et al.
2013/0018960 A1 1/2013 Knysz et al.
2013/0031191 A1 1/2013 Bott
2013/0060616 A1 3/2013 Block et al.
2013/0065555 A1 3/2013 Baker et al.
2013/0073654 A1 3/2013 Cohen et al.
2013/0080522 A1 3/2013 Ren
2013/0083059 A1 4/2013 Hwang et al.
2013/0086169 A1 4/2013 Bruich et al.
2013/0088650 A1 4/2013 Rouady et al.
2013/0109369 A1* 5/2013 Forutanpour ....... H04M 1/0279 455/418
2013/0143521 A1 6/2013 Hernandez et al.
2013/0169546 A1 7/2013 Thomas et al.
2013/0174100 A1 7/2013 Seymour et al.
2013/0227675 A1 8/2013 Fujioka
2013/0231093 A1 9/2013 Toy et al.
2013/0254288 A1 9/2013 Harrison
2013/0254660 A1 9/2013 Fujioka
2013/0311597 A1 11/2013 Arrouye et al.
2014/0009378 A1 1/2014 Chew
2014/0045472 A1 2/2014 Sharma et al.
2014/0068755 A1 3/2014 King et al.
2014/0113593 A1 4/2014 Zhou et al.
2014/0136607 A1 5/2014 Ou et al.
2014/0150068 A1 5/2014 Janzer
2014/0162595 A1 6/2014 Raleigh et al.
2014/0237235 A1 8/2014 Kuno et al.
2014/0248852 A1 9/2014 Raleigh et al.
2014/0289866 A1 9/2014 Beck et al.
2014/0298207 A1 10/2014 Ittah et al.
2014/0320398 A1 10/2014 Papstein
2014/0325407 A1 10/2014 Morris et al.
2014/0330945 A1 11/2014 Dabbiere et al.
2014/0331314 A1 11/2014 Fujioka
2014/0337997 A1 11/2014 Beck et al.
2014/0344951 A1 11/2014 Brewer
2014/0351952 A1 11/2014 Gopu
2014/0364056 A1 12/2014 Belk et al.
2015/0006723 A1 1/2015 Sheth et al.
2015/0032887 A1* 1/2015 Pesek .................... H04W 12/08 709/224
2015/0049018 A1 2/2015 Gomez
2015/0056974 A1* 2/2015 Kim ........................ G06F 9/451 455/418
2015/0106833 A1 4/2015 Kang et al.
2015/0153928 A1 6/2015 Chen et al.
2015/0269547 A1 9/2015 Fan et al.
2015/0323974 A1 11/2015 Shuster et al.
2015/0334118 A1 11/2015 Yuan et al.
2015/0341484 A1 11/2015 Yablokov et al.
2015/0341506 A1 11/2015 Mirza et al.
2015/0348032 A1 12/2015 Ioveva et al.
2015/0348185 A1 12/2015 Frost et al.
2015/0350215 A1 12/2015 Shi et al.
2015/0350220 A1 12/2015 Espinosa et al.
2015/0370428 A1* 12/2015 Chan .................. H04L 67/1095 715/739
2016/0050194 A1* 2/2016 Rachmiel ............. G06F 21/552 726/4
2016/0080510 A1 3/2016 Dawoud et al.
2016/0094538 A1 3/2016 Dabbiere et al.
2016/0094881 A1 3/2016 Khatua
2016/0127210 A1 5/2016 Noureddin et al.
2016/0139752 A1 5/2016 Shim et al.
2016/0188821 A1 6/2016 Ozeran
2016/0198322 A1 7/2016 Pitis
2016/0232336 A1 8/2016 Pitschel et al.
2016/0292060 A1 10/2016 Mathew et al.
2016/0294962 A1 10/2016 Andreev et al.
2016/0323191 A1 11/2016 Aoki
2016/0330078 A1 11/2016 Bostick et al.
2016/0342290 A1* 11/2016 Mathur ................. G06F 3/0488
2016/0349932 A1 12/2016 Gorny
2016/0357394 A1* 12/2016 Tae ................... H04W 52/0264
2016/0373588 A1 12/2016 Raleigh et al.
2017/0010794 A1 1/2017 Cho et al.
2017/0019858 A1 1/2017 Zhao et al.
2017/0034228 A1 2/2017 Grossman et al.
2017/0053129 A1 2/2017 Arif et al.
2017/0055110 A1 2/2017 Tian et al.
2017/0068822 A1* 3/2017 Cave ....................... G06F 21/12
2017/0149795 A1 5/2017 Day, II
2017/0180494 A1 6/2017 Agrawal et al.
2017/0201850 A1 7/2017 Raleigh et al.
2017/0251268 A1 8/2017 Zhao
2017/0279971 A1 9/2017 Raleigh et al.
2017/0295258 A1 10/2017 Raleigh et al.
2017/0357439 A1 12/2017 Lemay et al.
2018/0018252 A1 1/2018 Farrell et al.
2018/0032368 A1* 2/2018 Choi ....................... G06F 9/485
2018/0046818 A1 2/2018 Amacker et al.
2018/0060102 A1 3/2018 Zhu et al.
2018/0077030 A1 3/2018 Lauer et al.
2018/0224915 A1 8/2018 Shuster et al.
2018/0242036 A1* 8/2018 Watanabe ........... G06F 3/04847
2018/0276353 A1 9/2018 Pitschel et al.
2018/0324567 A1* 11/2018 Mao ...................... H04M 1/724
2018/0332178 A1* 11/2018 Ni ...................... H04N 21/4438
2018/0343306 A1 11/2018 Lotter et al.
2019/0028548 A1* 1/2019 Lauer ...................... H04L 67/02
2019/0037037 A1 1/2019 Umeya et al.
2019/0081949 A1 3/2019 Wu et al.
2019/0082227 A1 3/2019 Zhao
2019/0124065 A1 4/2019 Hodge
2019/0220290 A1* 7/2019 Yu ......................... G06F 3/0482
2019/0347180 A1 11/2019 Cranfill et al.
2019/0347181 A1 11/2019 Cranfill et al.
2020/0358765 A1 11/2020 Olsen et al.
2020/0382637 A1 12/2020 Cranfill et al.
2020/0410584 A1 12/2020 Frost et al.
2022/0261460 A1 8/2022 Pitschel et al.
2022/0303387 A1 9/2022 Cranfill et al.
2023/0153898 A1 5/2023 Frost et al.
2025/0156298 A1 5/2025 Cranfill et al.
2025/0166059 A1 5/2025 Frost et al.

FOREIGN PATENT DOCUMENTS

CN 104471521 A 3/2015
CN 104487929 A 4/2015
CN 104636645 A 5/2015
CN 105122267 A 12/2015
CN 105284099 A 1/2016
CN 105308634 A 2/2016
CN 105389078 A 3/2016
CN 106415431 A 2/2017
CN 106415476 A 2/2017
CN 106933682 A 7/2017
CN 107533368 A 1/2018
CN 107637055 A 1/2018
EP 2429183 A1 3/2012
EP 2860608 A1 4/2015
JP 2000-163031 A 6/2000
JP 2001-218976 A 8/2001
JP 2002-342033 A 11/2002
JP 2007-125338 A 5/2007
JP 2009-171115 A 7/2009
JP 2012-511282 A 5/2012
JP 2013-85236 A 5/2013
JP 2014-502383 A 1/2014
JP 2016-13151 A 1/2016
JP 2016-517598 A 6/2016

(56) References Cited

FOREIGN PATENT DOCUMENTS

| | | | |
|---|---|---|---|
| JP | 2016-224960 | A | 12/2016 |
| JP | 2017-534934 | A | 11/2017 |
| KR | 10-2011-0024212 | A | 3/2011 |
| KR | 10-2011-0063466 | A | 6/2011 |
| KR | 10-2014-0088459 | A | 7/2014 |
| KR | 10-1560760 | B1 | 10/2015 |
| WO | 2007/064200 | A1 | 6/2007 |
| WO | 2011/163481 | A2 | 12/2011 |
| WO | 2012/047932 | A2 | 4/2012 |
| WO | 2013/169849 | A2 | 11/2013 |
| WO | 2014/105276 | A1 | 7/2014 |
| WO | 2014/144908 | A1 | 9/2014 |
| WO | 2015/010111 | A1 | 1/2015 |
| WO | 2017/161499 | A1 | 9/2017 |
| WO | 2018027679 | A1 | 2/2018 |

OTHER PUBLICATIONS

Non-Final Office Action received for U.S. Appl. No. 15/875,934, mailed on Feb. 4, 2021, 12 pages.
Non-Final Office Action received for U.S. Appl. No. 16/888,543, mailed on Feb. 17, 2021, 14 pages.
Notice of Allowance received for U.S. Appl. No. 15/875,934, mailed on Jul. 30, 2021, 9 pages.
Search Report received for Chinese Patent Application No. 201811616437.2, mailed on Jan. 28, 2021, 4 pages (2 page of English Translation and 2 pages of Official Copy).
Final Office Action received for U.S. Appl. No. 14/502,981, mailed on Oct. 15, 2020, 36 pages.
Final Office Action received for U.S. Appl. No. 15/875,934, mailed on Aug. 21, 2020, 11 pages.
International Search Report received for PCT Patent Application No. PCT/US2020/035430, mailed on Oct. 28, 2020, 5 pages.
Invitation to Pay Additional Fees received for PCT Patent Application No. PCT/US2019/029214, mailed on Aug. 14, 2019, 16 pages.
Invitation to Pay Additional Fees received for PCT Patent Application No. PCT/US2020/035430, mailed on Sep. 7, 2020, 12 pages.
Check your Apple ID device list to see where you're signed in, Apple Support, Available online at: <https://support.apple.com/en-us/HT205064>, Mar. 7, 2018, 4 pages.
Extended Search Report received for European Patent Application No. 17756993.6, mailed on Oct. 4, 2019, 7 pages.
Final Office Action received for U.S. Appl. No. 14/502,937, mailed on Aug. 9, 2019, 11 pages.
Final Office Action received for U.S. Appl. No. 14/502,937, mailed on May 10, 2018, 23 pages.
Final Office Action received for U.S. Appl. No. 14/502,981, mailed on Dec. 28, 2018, 29 pages.
Final Office Action received for U.S. Appl. No. 14/502,981, mailed on Oct. 12, 2017, 22 pages.
Final Office Action received for U.S. Appl. No. 14/683,093, mailed on Dec. 15, 2016, 11 pages.
Final Office Action received for U.S. Appl. No. 15/274,887 mailed on Jan. 5, 2018, 17 pages.
Final Office Action received for U.S. Appl. No. 15/875,934, mailed on Aug. 8, 2019, 11 pages.
Final Office Action received for U.S. Appl. No. 16/179,106, mailed on Mar. 6, 2020, 12 pages.
International Search Report received for PCT Patent Application No. PCT/US2015/023406, mailed on Jun. 26, 2015, 3 pages.
International Search Report received for PCT Patent Application No. PCT/US2019/029214, mailed on Nov. 4, 2019, 6 pages.
My Data Manager Track your Mobile Data Usage and Save Money, AppPicker, Aug. 18, 2015, 4 pages.
Non-Final Office Action received for U.S. Appl. No. 14/502,937, mailed on Aug. 14, 2017, 19 pages.
Non-Final Office Action received for U.S. Appl. No. 14/502,937, mailed on Dec. 14, 2018, 24 pages.
Non-Final Office Action received for U.S. Appl. No. 14/502,981, mailed on Apr. 3, 2020, 42 pages.
Non-Final Office Action received for U.S. Appl. No. 14/502,981, mailed on Apr. 11, 2018, 20 pages.
Non-Final Office Action received for U.S. Appl. No. 14/502,981, mailed on Feb. 14, 2017, 17 pages.
Non-Final Office Action received for U.S. Appl. No. 14/683,093, mailed on Apr. 20, 2017, 11 pages.
Non-Final Office Action received for U.S. Appl. No. 14/683,093, mailed on May 5, 2016, 12 pages.
Non-Final Office Action received for U.S. Appl. No. 15/274,887 mailed on Jun. 23, 2017, 16 pages.
Non-Final Office Action received for U.S. Appl. No. 15/875,934, mailed on Jan. 23, 2020, 11 pages.
Non-Final Office Action received for U.S. Appl. No. 15/875,934, mailed on Nov. 30, 2018, 12 pages.
Non-Final Office Action received for U.S. Appl. No. 16/147,069, mailed on Jan. 6, 2020, 29 pages.
Non-Final Office Action received for U.S. Appl. No. 16/147,108, mailed on Mar. 22, 2019, 17 pages.
Non-Final Office Action received for U.S. Appl. No. 16/179,106, mailed on Oct. 23, 2019, 10 pages.
Notice of Allowance received for U.S. Appl. No. 14/502,937, mailed on Jul. 27, 2020, 4 pages.
Notice of Allowance received for U.S. Appl. No. 14/502,937, mailed on May 14, 2020, 20 pages.
Notice of Allowance received for U.S. Appl. No. 14/683,093, mailed on Sep. 6, 2017, 12 pages.
Notice of Allowance received for U.S. Appl. No. 15/274,887 mailed on Jul. 20, 2018, 10 pages.
Notice of Allowance received for U.S. Appl. No. 15/875,934, mailed on Nov. 25, 2019, 8 pages.
Notice of Allowance received for U.S. Appl. No. 16/147,069, mailed on Apr. 29, 2020, 8 pages.
Notice of Allowance received for U.S. Appl. No. 16/147,069, mailed on Aug. 19, 2020, 8 pages.
Notice of Allowance received for U.S. Appl. No. 16/147,108, mailed on Sep. 26, 2019, 28 pages.
Restriction Requirement received for U.S. Appl. No. 14/502,937, mailed on Feb. 14, 2017, 6 pages.
Search Report received for Danish Patent Application No. PA201870341, Completed on Sep. 6, 2018, 4 pages.
Search Report received for Danish Patent Application No. PA201870345, Completed on Aug. 28, 2018, 4 pages.
Written Opinion received for PCT Patent Application No. PCT/US2015/023406, mailed on Jun. 26, 2015, 10 pages.
Golightly, Daniel, "Google is Taking Steps in Search of "Digital Wellbeing"—I/O 2018", Google Blog, Available Online at: <https://www.androidheadlines.com/2018/05/google-is-taking-steps-in-search-of-digital-wellbeing-i-o-2018.html>, May 8, 2018, 3 pages.
Koester, Mark, "Moment: Automatic Track and Know Your iPhone Usage", Minding the Borderlands, Available online at: <http://www.markwk.com/2016/11/iphone-tracking-with-moment.html>, Jan. 30, 2018, 6 pages.
Langer, Christina, "How to Disable Gmail Notifications on Android", Available online at: <https://ccm.net/faq/35590-how-to-disable-gmail-notifications-on-android>, Mar. 6, 2018, 2 pages.
Lee et al., "A Multi-Touch Three Dimensional Touch-Sensitive Tablet", CHI'85 Proceedings, Apr. 1985, pp. 21-25.
Nam, Luke, "Live in the Moment (app review)", deTeched, Available online at: <http://www.deteched.com/2017/11/20/live-moment-app-review/amp/>, Dec. 6, 2017, 5 pages.
Rubine, Dean, "Combining Gestures and Direct Manipulation", CHI'92, May 3-7, 1992, pp. 659-660.
Rubine, Dean H. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

(56) References Cited

OTHER PUBLICATIONS

Final Office Action received for U.S. Appl. No. 17/020,373, mailed on Jan. 17, 2023, 15 pages.
Non-Final Office Action received for U.S. Appl. No. 17/456,803, mailed on Dec. 6, 2022, 16 pages.
Examiner's Answer to Appeal Brief received for U.S. Appl. No. 14/502,981, mailed on Jan. 12, 2022, 12 pages.
Non-Final Office Action received for U.S. Appl. No. 17/020,373, mailed on Mar. 30, 2022, 16 Pages.
Notice of Allowance received for U.S. Appl. No. 16/888,543, mailed on Feb. 11, 2022, 5 pages.
Notice of Allowance received for U.S. Appl. No. 16/888,543, mailed on Oct. 7, 2021, 5 pages.
Search Report Received for Chinese Patent Application No. 202111610141.1 mailed on Apr. 15, 2022, 4 pages (2 page of English Translation and 2 pages of Official Copy).
Notice of Allowance received for U.S. Appl. No. 17/020,373, mailed on Aug. 8, 2023, 9 pages.
Notice of Allowance received for U.S. Appl. No. 17/456,803, mailed on Mar. 16, 2023, 9 pages.
Non-Final Office Action received for U.S. Appl. No. 17/806,436, mailed on Feb. 15, 2024, 17 pages.
Non-Final Office Action received for U.S. Appl. No. 18/154,772, mailed on Feb. 9, 2024, 18 pages.
Notice of Allowance received for U.S. Appl. No. 17/020,373, mailed on Nov. 22, 2023, 7 pages.
Notice of Allowance received for U.S. Appl. No. 17/806,436, mailed on Sep. 30, 2024, 5 pages.
Notice of Allowance received for U.S. Appl. No. 17/806,436, mailed on Dec. 23, 2024, 5 pages.
Notice of Allowance received for U.S. Appl. No. 18/154,772, mailed on Dec. 27, 2024, 7 pages.
Notice of Allowance received for U.S. Appl. No. 18/154,772, mailed on Aug. 2, 2024, 12 pages.
European Search Report received for European Patent Application No. 25183620.1, Oct. 13, 2025, 10 Pages (Official Copy Only).

* cited by examiner (15 minutes of using the IM App)

(30 total minutes of using the IM App – IM App and Mail App combined into messaging category)

(60 total minutes of using the IM App – IM App and Mail App separate)

(30 minutes of using a web browser to access a website associated with the IM app)

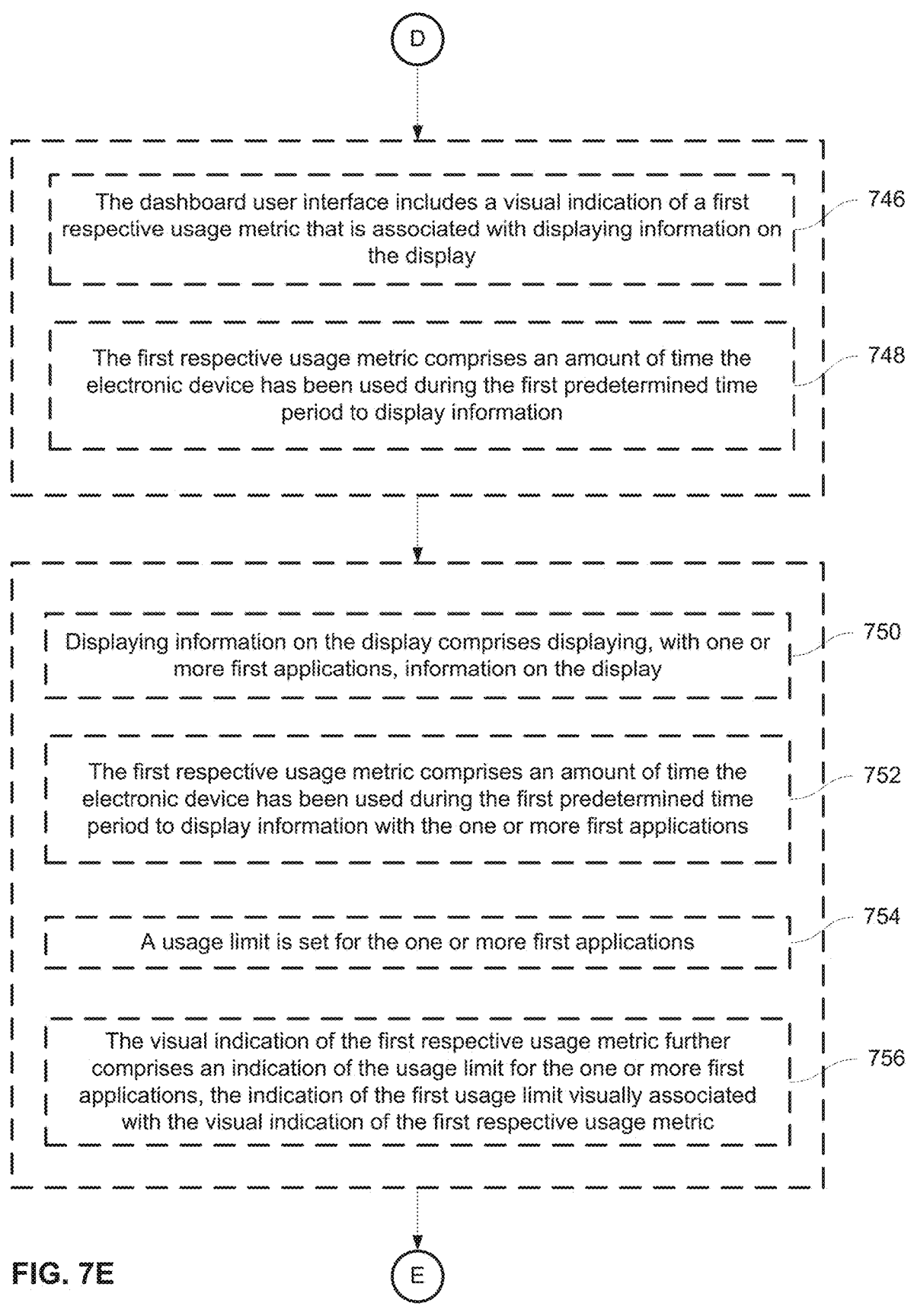

D

The dashboard user interface includes a visual indication of a first respective usage metric that is associated with displaying information on the display 746

The first respective usage metric comprises an amount of time the electronic device has been used during the first predetermined time period to display information 748

Displaying information on the display comprises displaying, with one or more first applications, information on the display 750

The first respective usage metric comprises an amount of time the electronic device has been used during the first predetermined time period to display information with the one or more first applications 752

A usage limit is set for the one or more first applications 754

The visual indication of the first respective usage metric further comprises an indication of the usage limit for the one or more first applications, the indication of the first usage limit visually associated with the visual indication of the first respective usage metric 756

FIG. 7E

E

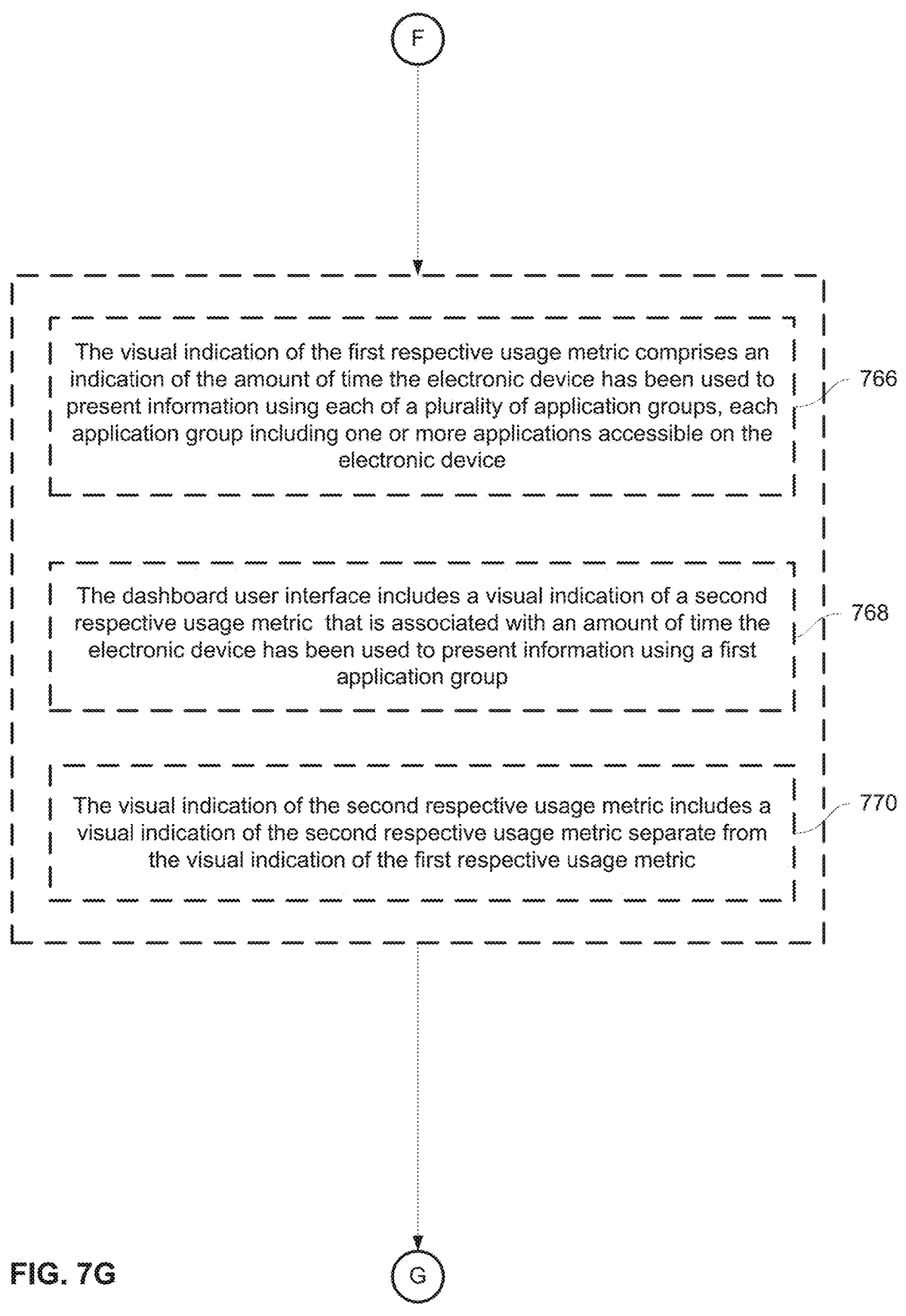

F

The visual indication of the first respective usage metric comprises an indication of the amount of time the electronic device has been used to present information using each of a plurality of application groups, each application group including one or more applications accessible on the electronic device

766

The dashboard user interface includes a visual indication of a second respective usage metric that is associated with an amount of time the electronic device has been used to present information using a first application group

768

The visual indication of the second respective usage metric includes a visual indication of the second respective usage metric separate from the visual indication of the first respective usage metric

770

FIG. 7G

G

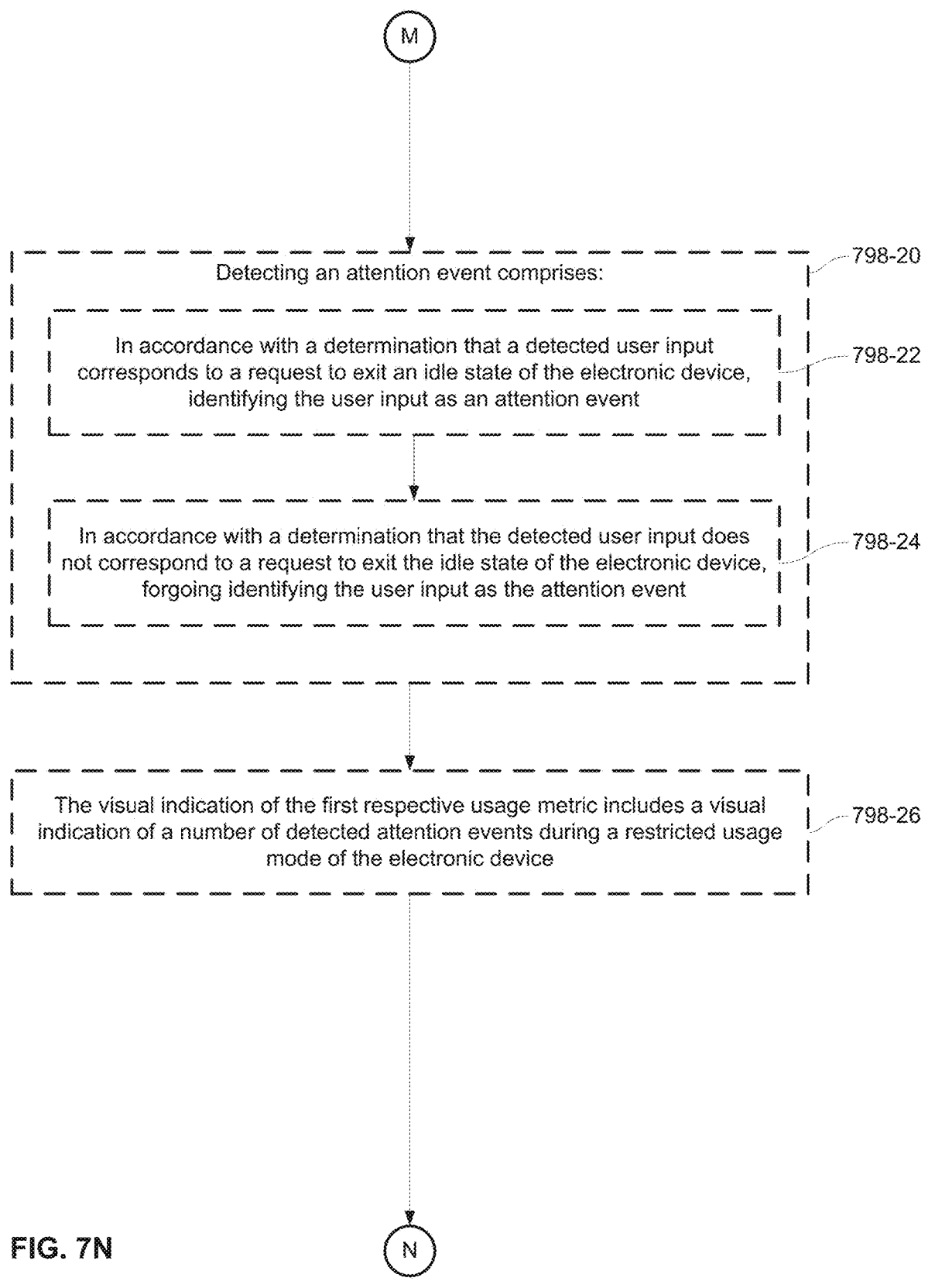

M

Detecting an attention event comprises: 798-20

In accordance with a determination that a detected user input corresponds to a request to exit an idle state of the electronic device, identifying the user input as an attention event 798-22

In accordance with a determination that the detected user input does not correspond to a request to exit the idle state of the electronic device, forgoing identifying the user input as the attention event 798-24

The visual indication of the first respective usage metric includes a visual indication of a number of detected attention events during a restricted usage mode of the electronic device 798-26

FIG. 7N

N (Restriction criteria not met for any app or category)

(Restriction criteria not met for any app or category)

(Restriction criteria not met for any app or category)

(Restriction criteria met for Social Media category)

(Restriction criteria met for Social Media category)

(Restriction criteria met for Social Media category)

(Restriction criteria met for Social Media category)

(Restriction criteria met for Social Media category)

(Restriction criteria met for Social Media category)

(Restriction criteria met for Social Media category)

(Restriction criteria met for Social Media category)

(Restriction criteria met for Social Media category)

(Restriction criteria not met for any app or category)

(Restriction criteria not met for any app or category; 5 minutes before downtime)

(Social Media usage limit not reached, downtime settings override usage limit settings)

(Notify option selected for Social Media usage limit; Restriction criteria not met for any app or category)

(Notify option selected for Social Media usage limit; Restriction criteria met for Social Media category)

(Notify screen; Restriction criteria met for Social Media category)

(Notify screen; Restriction criteria met for Social Media category)

(User accessing Social Media Application A after notify screen)

(Parentally controlled child device; Notify and Block option selected for Social Media usage limit; Restriction criteria not met for any app or category)

(Parentally controlled child device; Notify and Block option selected for Social Media usage limit; Restriction criteria met for Social Media category)

(Parentally controlled child device; Notify and block screen; Restriction criteria met for Social Media category)

(Parentally controlled child device; Notify and block screen; Restriction criteria met for Social Media category)

(Parentally controlled child device; Notify and block screen; Restriction criteria met for Social Media category)

(Child device; Notify and block screen; Restriction criteria met for Social Media category)

(Child device, Notify and block screen; Restriction criteria met for Social Media category)

(Parent device)

(Parent device)

(Child device; Notify and block screen; Restriction criteria met for Social Media category)

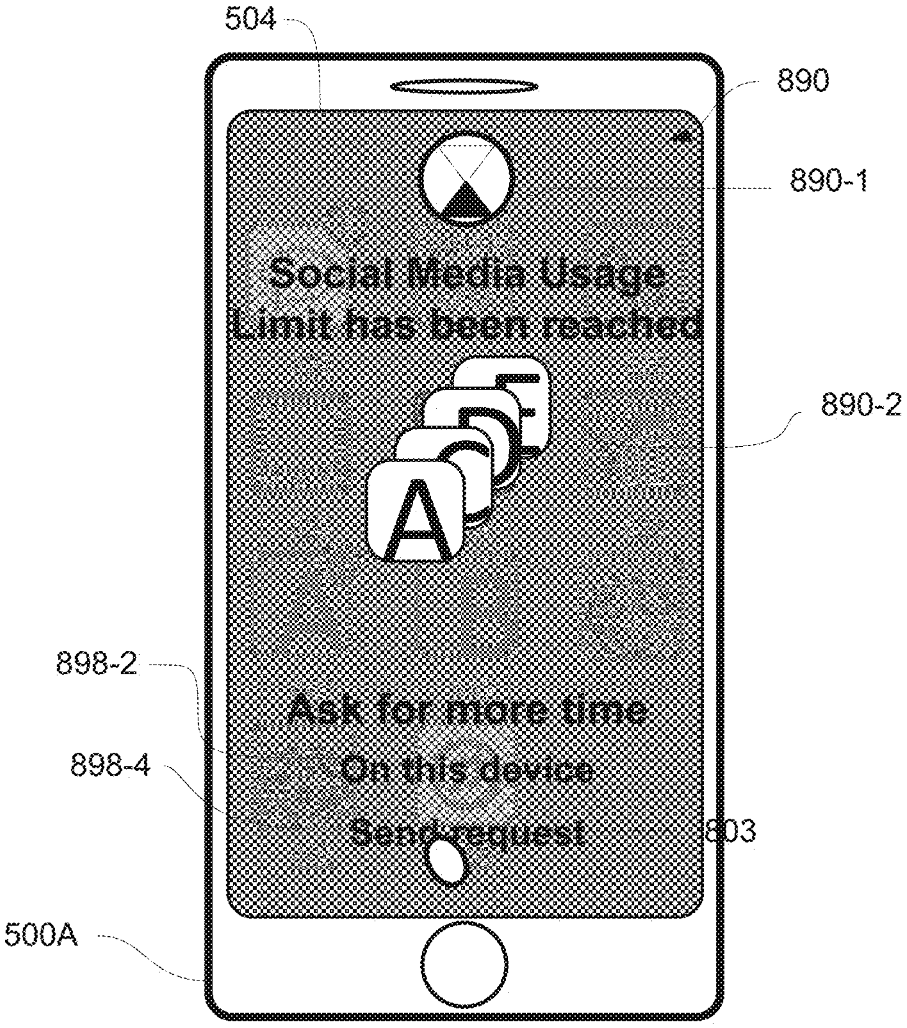
(Child device, Notify and block screen; Restriction criteria met for Social Media category)
FIG. 8AAA

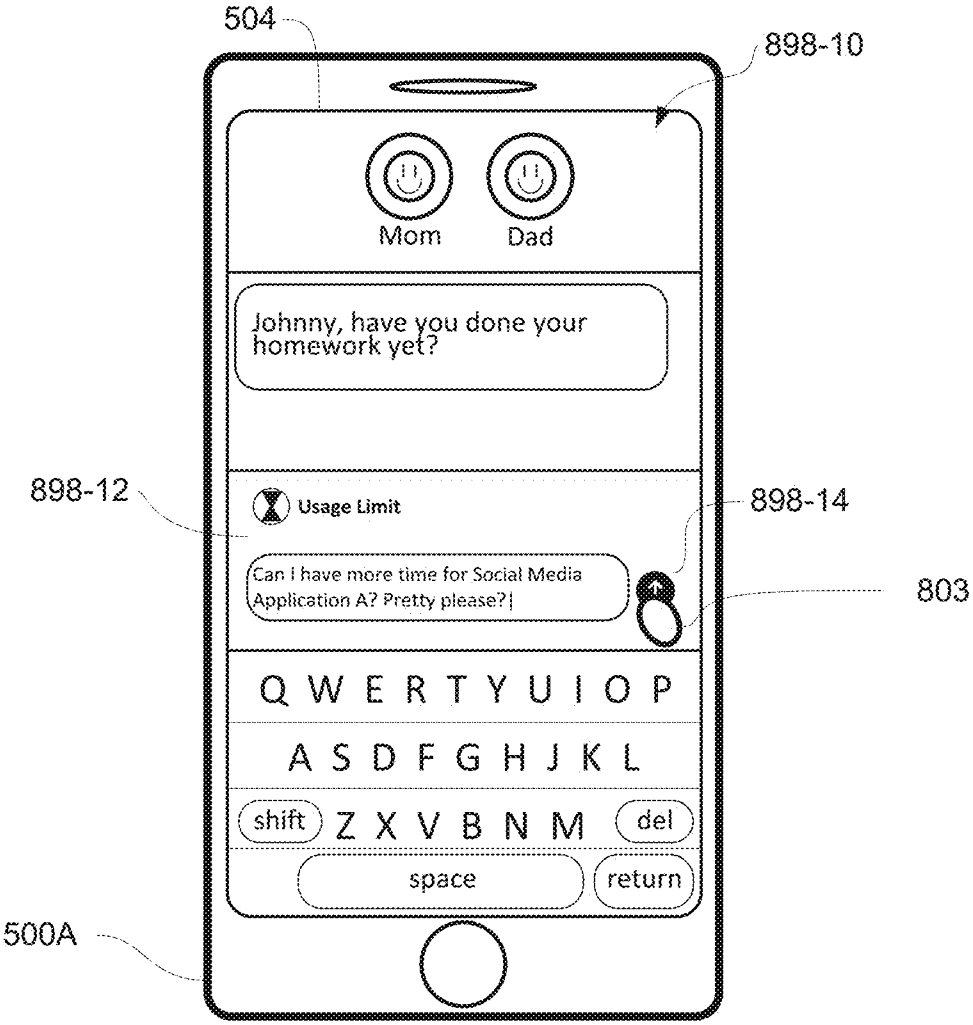
(Child device, Notify and block screen; Restriction criteria met for Social Media category)
FIG. 8BBB

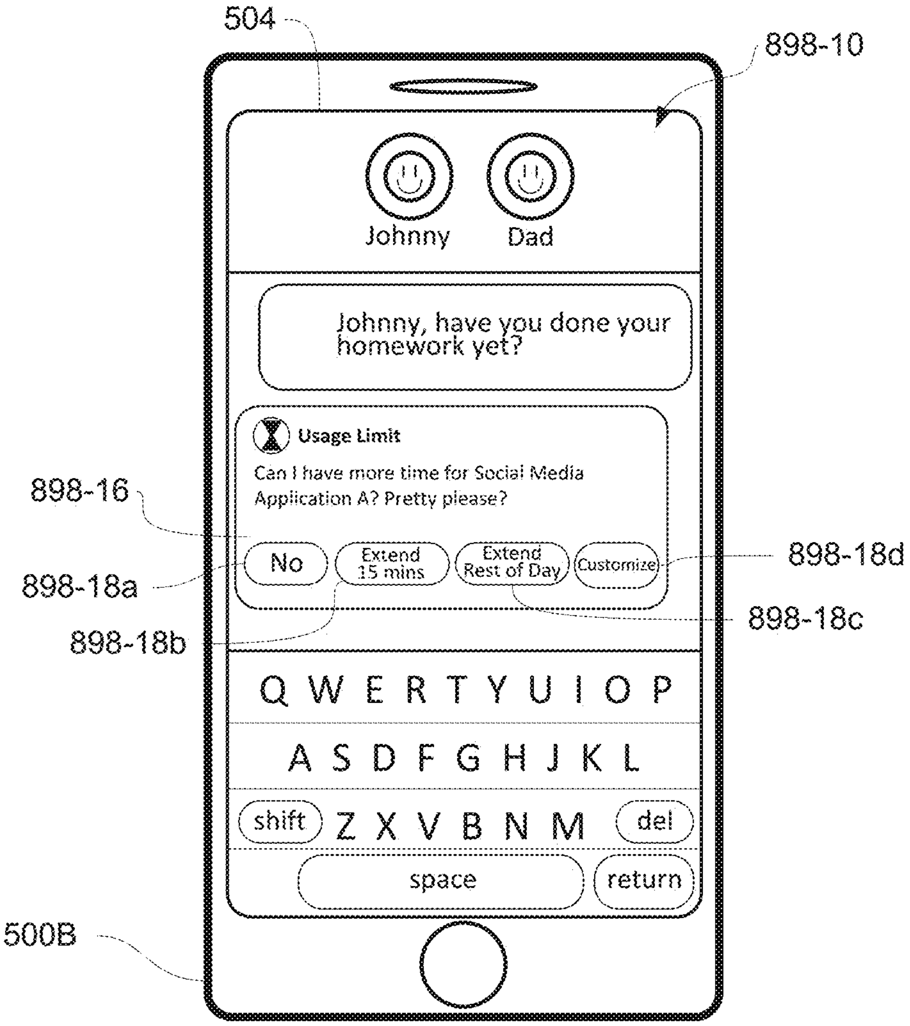
(Parent device, restriction criteria met for Social Media category on child device)
FIG. 8CCC

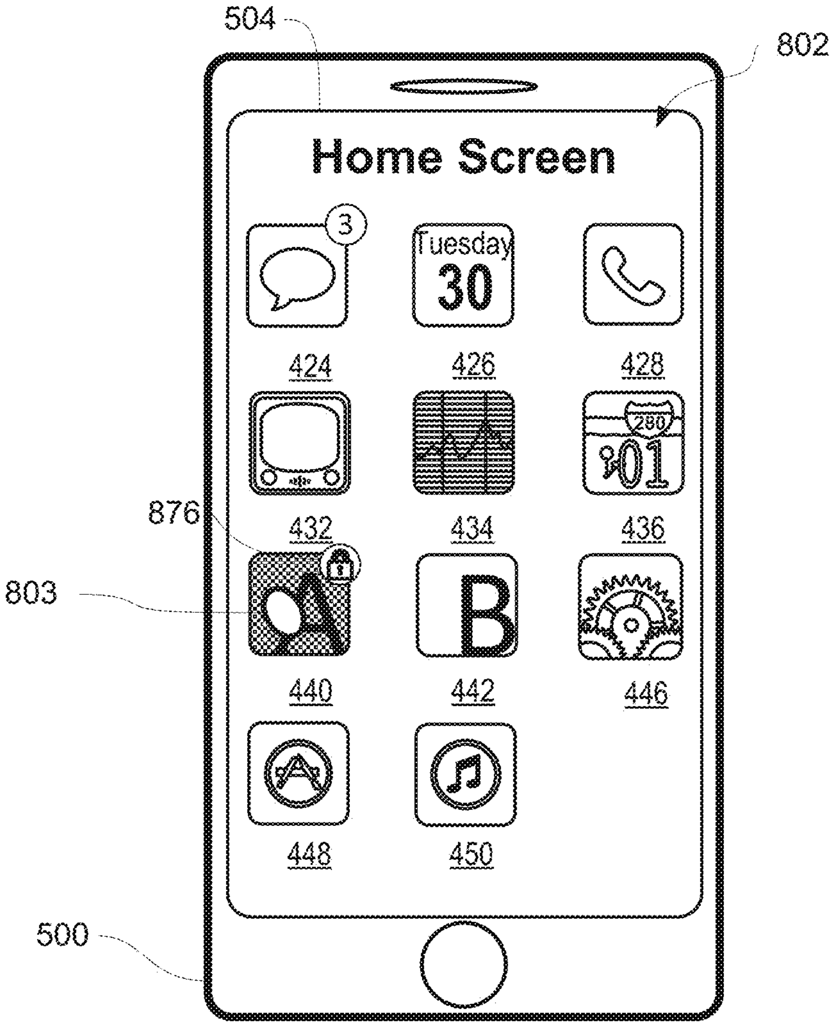
(Device without parental control; Notify and Block option selected for Social Media usage limit; Restriction criteria met for Social Media category)
FIG. 8DDD

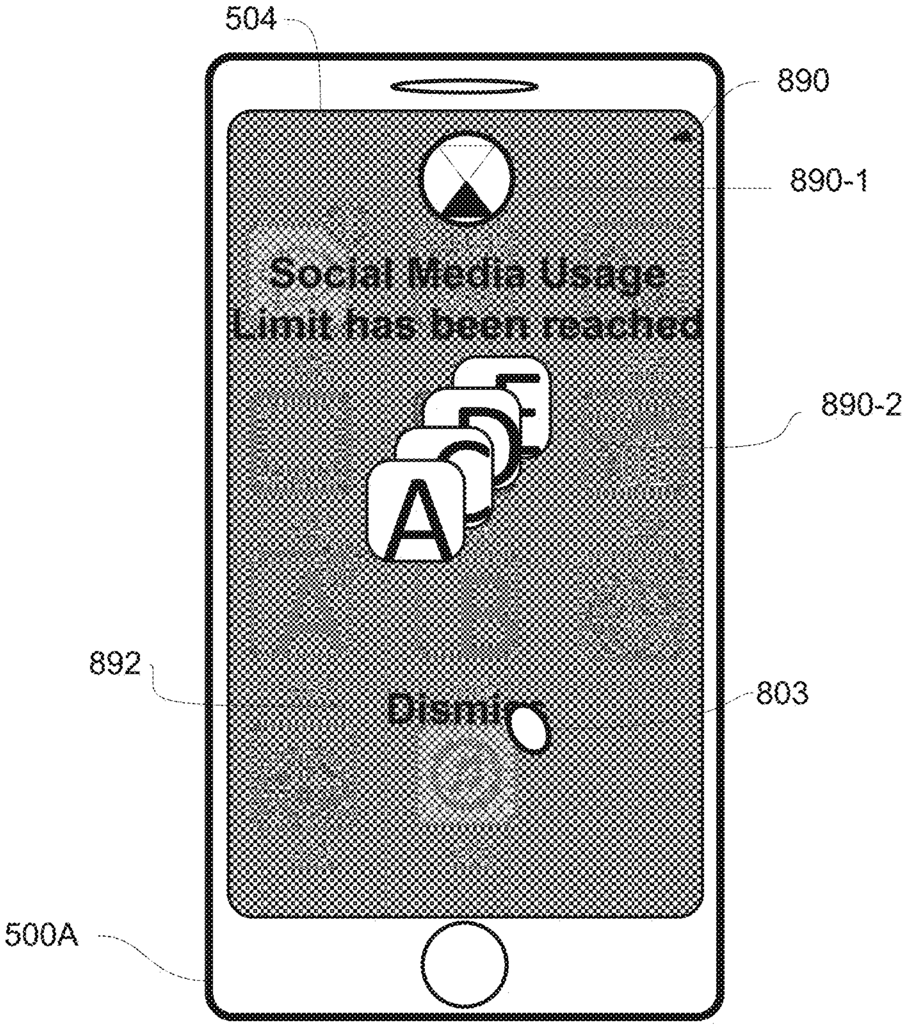
(Device without parental control; Notify and Block option selected for Social Media usage limit; Restriction criteria met for Social Media category)
FIG. 8EEE

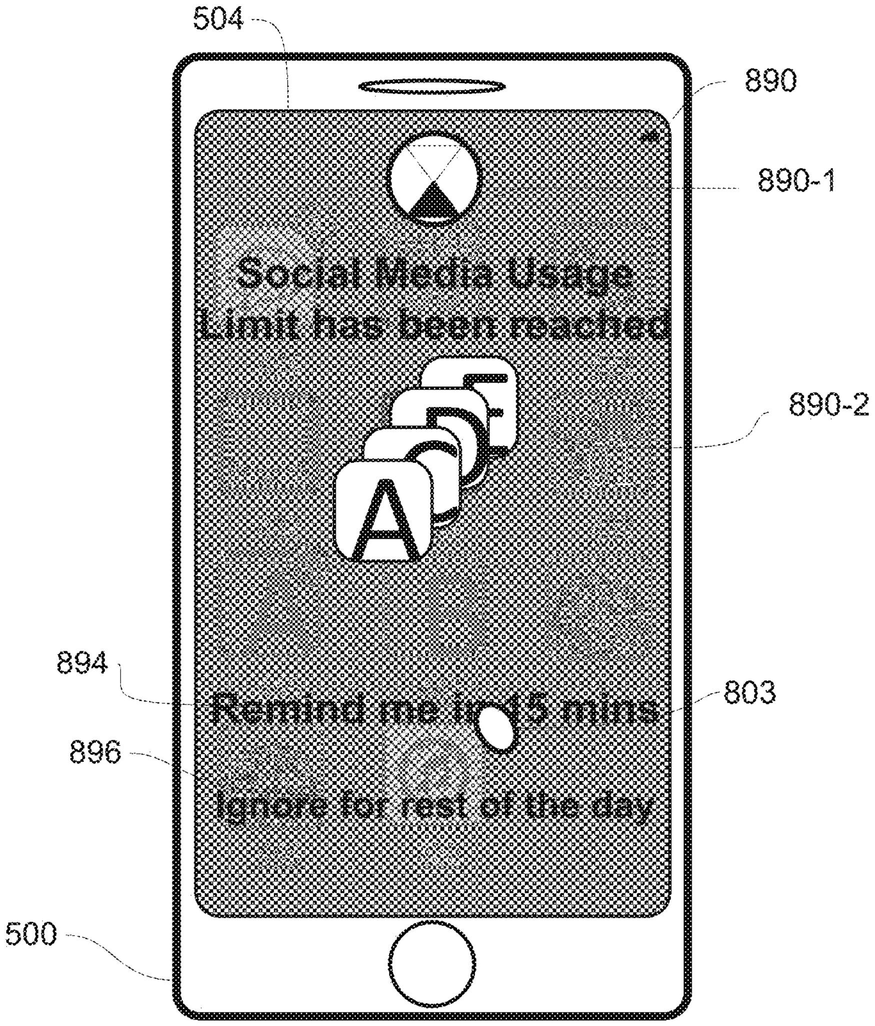
(Device without parental control; Notify and block screen; Restriction criteria met for Social Media category)
FIG. 8FFF

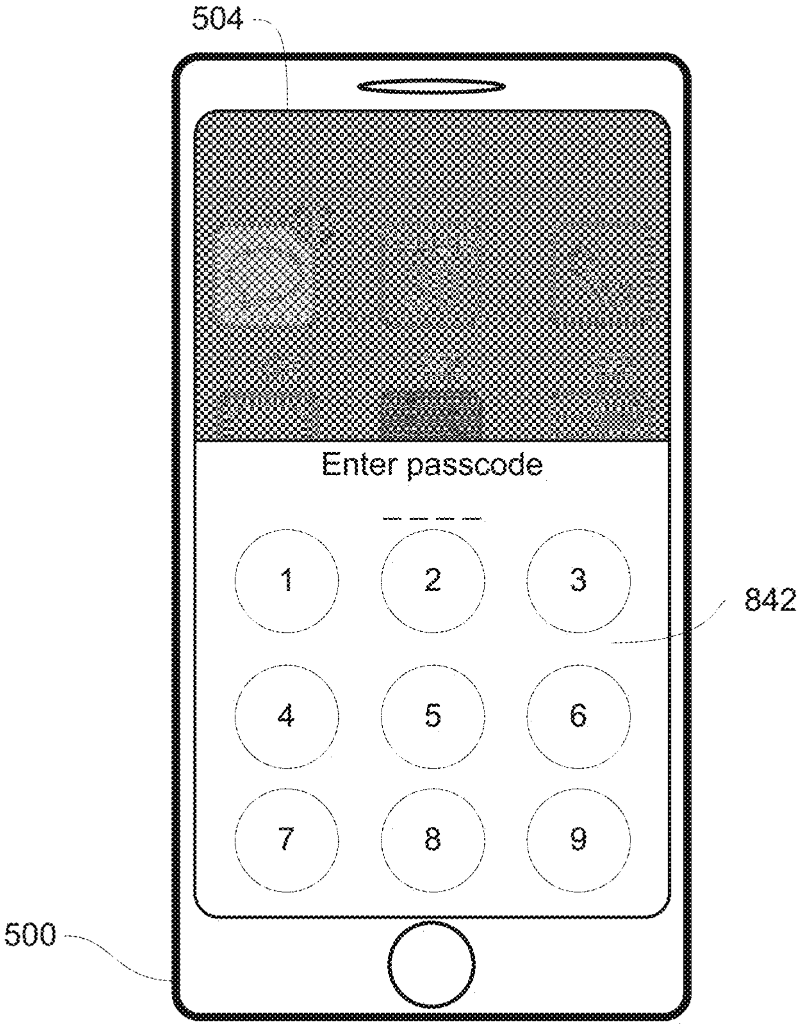
(Device without parental control; Notify and block screen; Restriction criteria met for Social Media category)
FIG. 8GGG

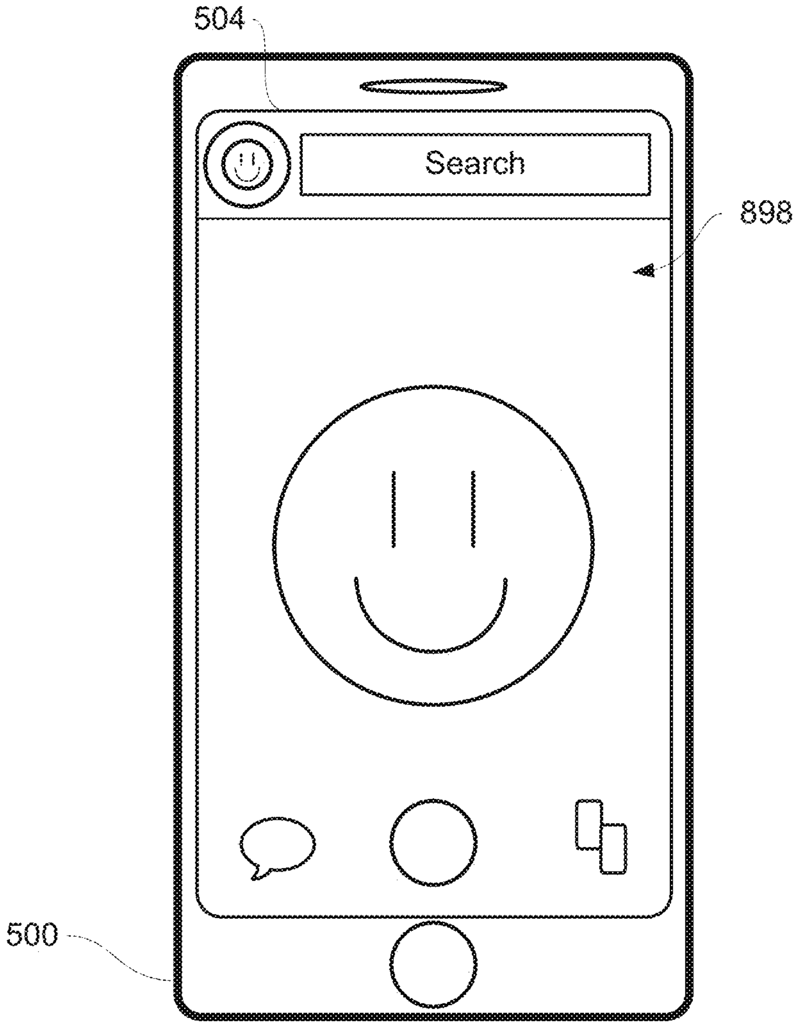
(User accessing Social Media Application A; Restriction criteria not met for any app or category)
FIG. 8HHH

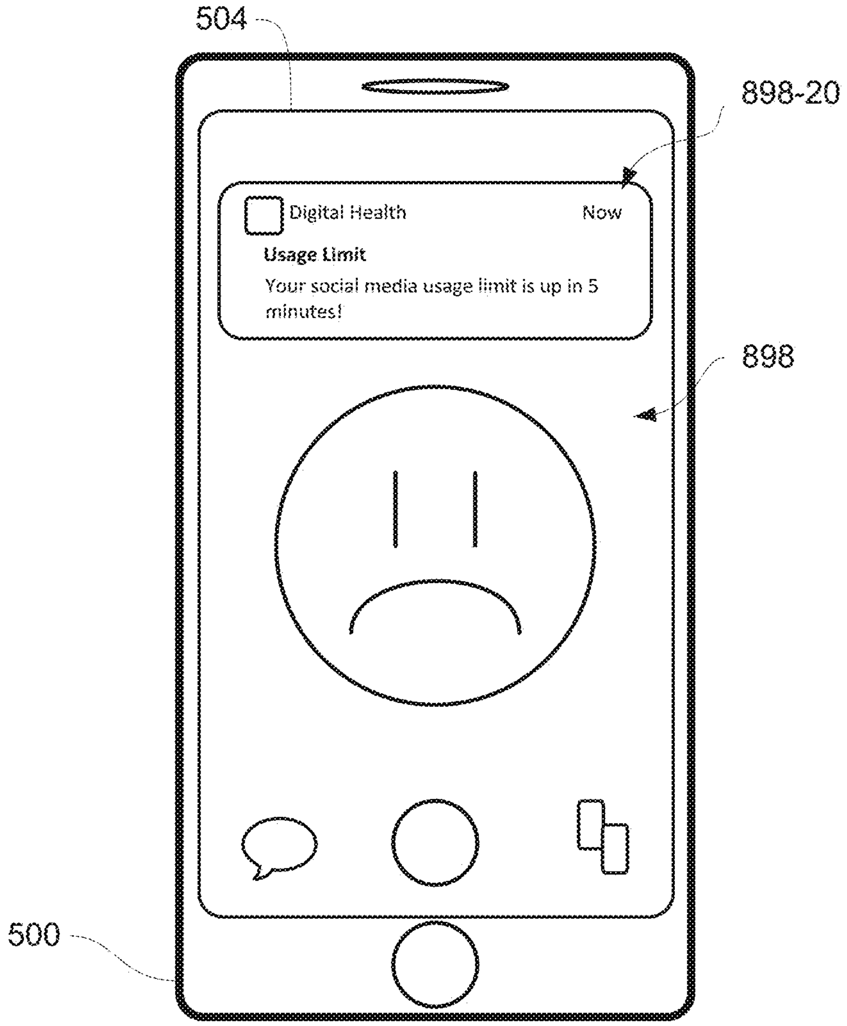
(User accessing Social Media Application A; 5 minutes of usage remaining for Social Media usage limit)
FIG. 8III

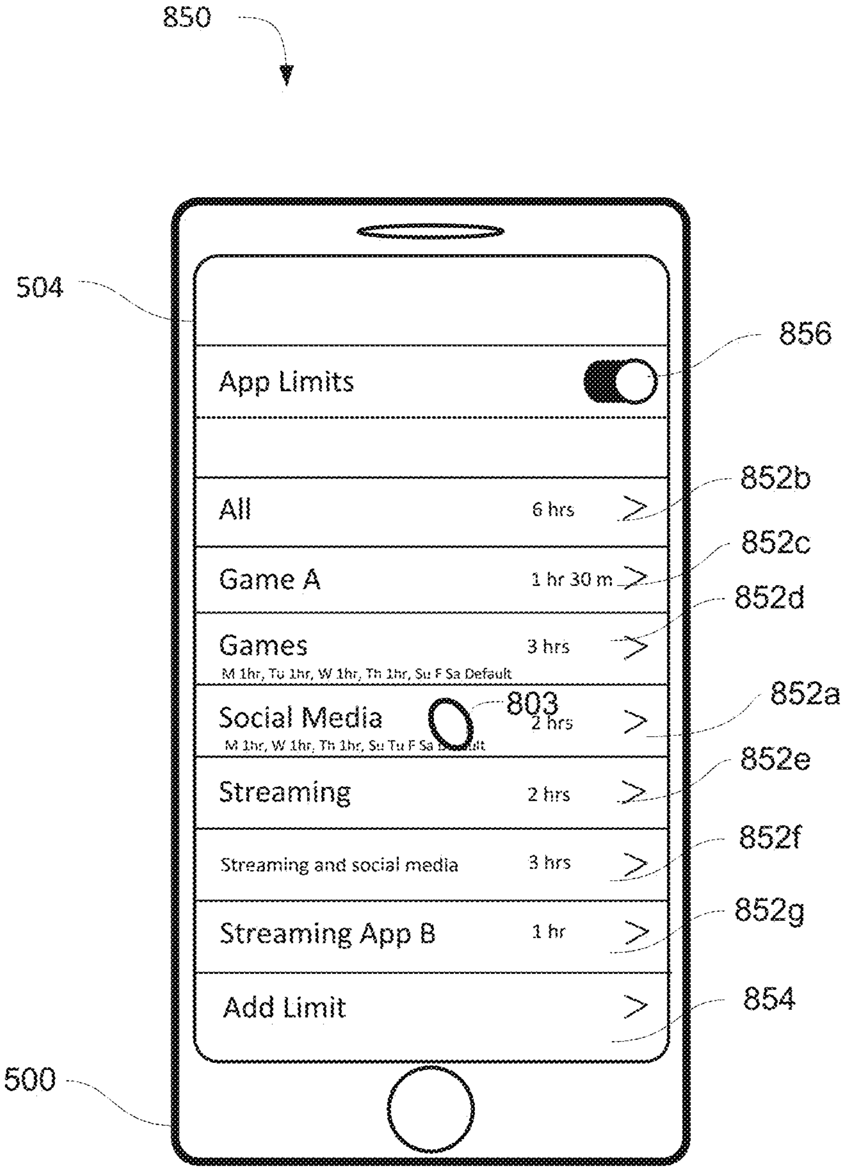
(Child device usage limit settings menu)
FIG. 8JJJ

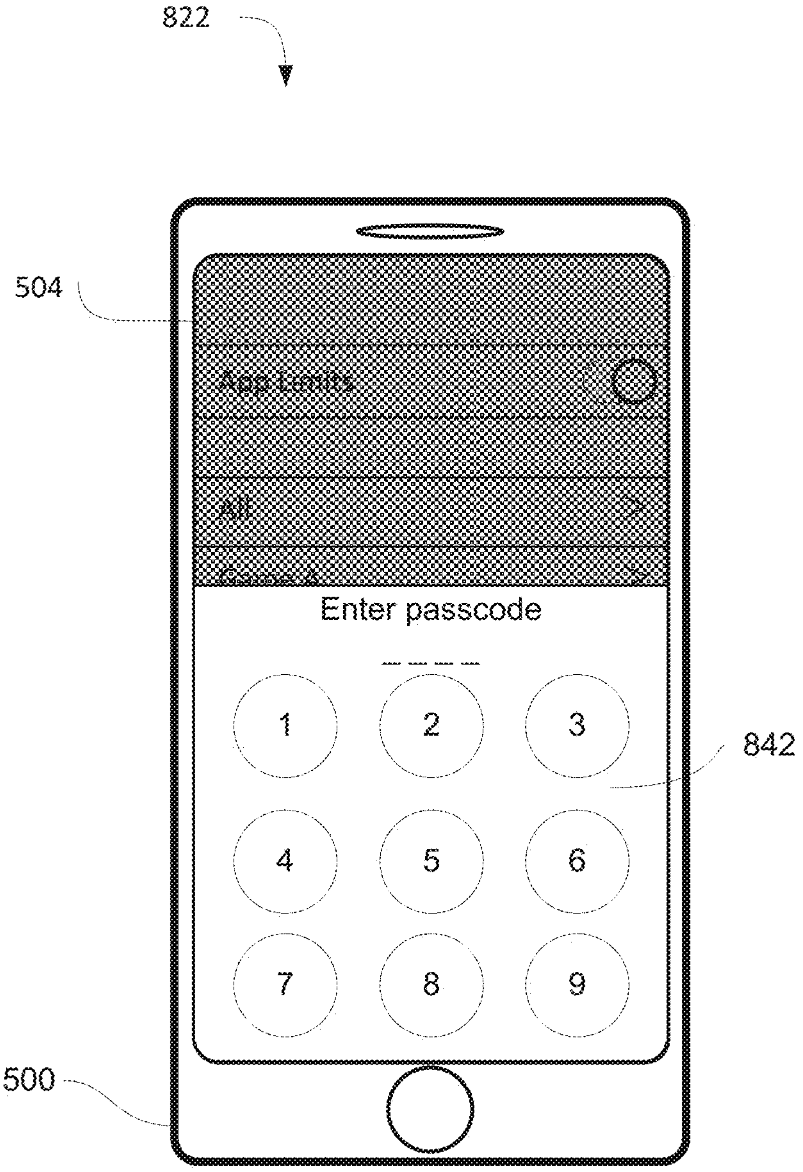
(Child device usage limit settings menu)
FIG. 8KKK

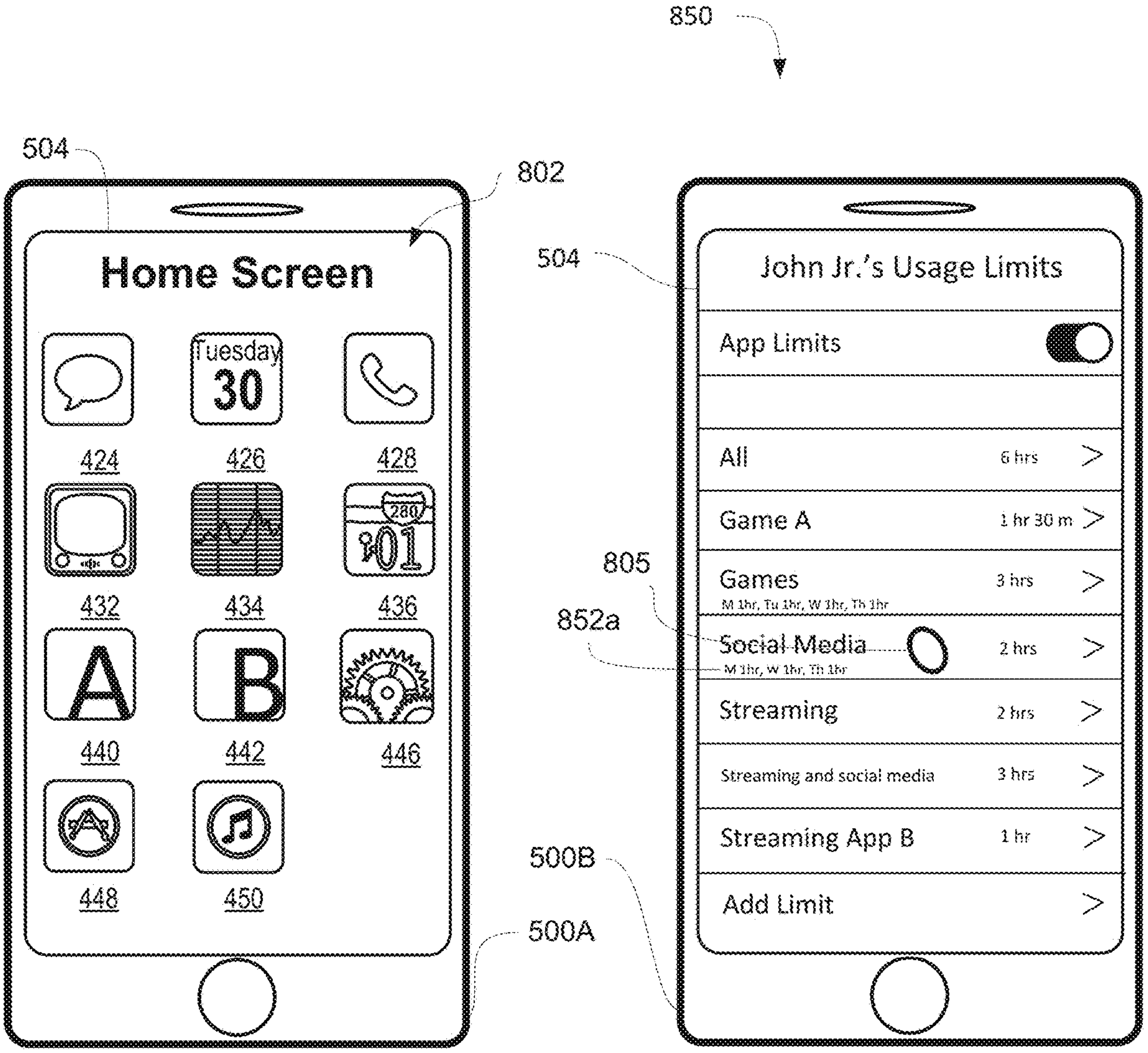
(Child device home screen; usage limit settings in effect)
(Parent device, usage limit settings menu for child device; parent attempting to modify child usage limit settings)
FIG. 8LLL

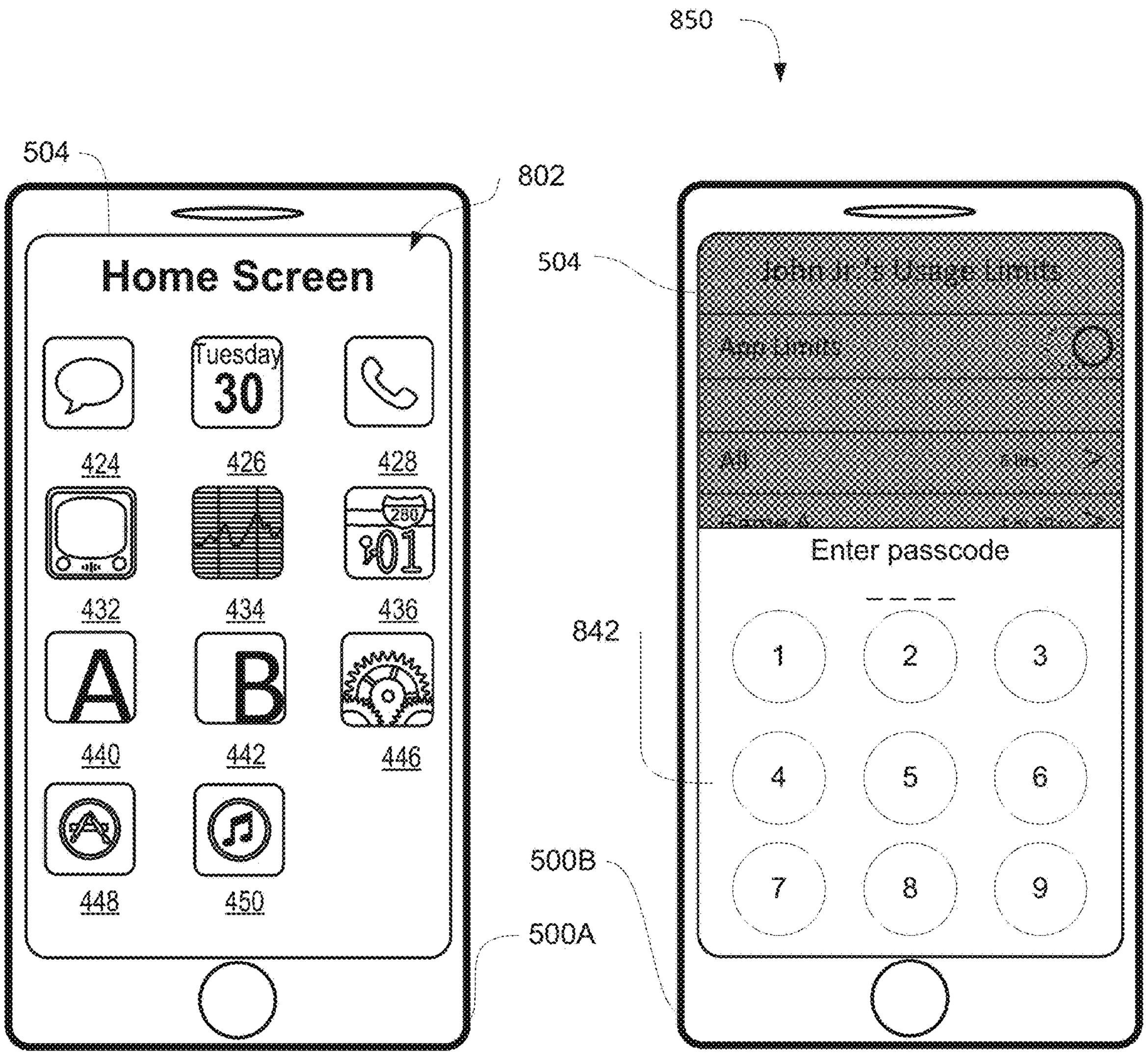
(Child device home screen; usage limit settings in effect)
(Parent device, usage limit settings menu for child device; parent attempting to modify child usage limit settings)
FIG. 8MMM

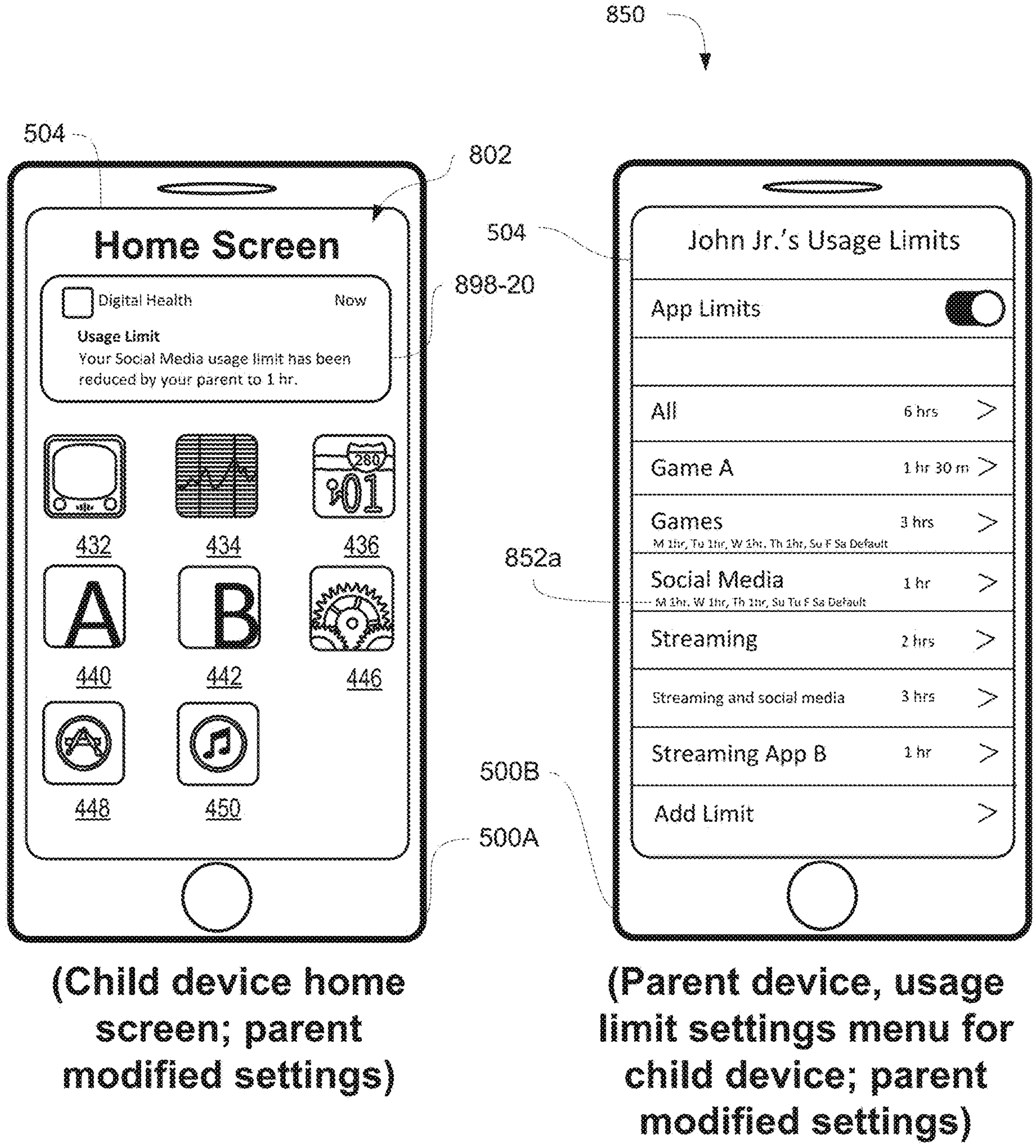
FIG. 8NNN

Figure 9I:
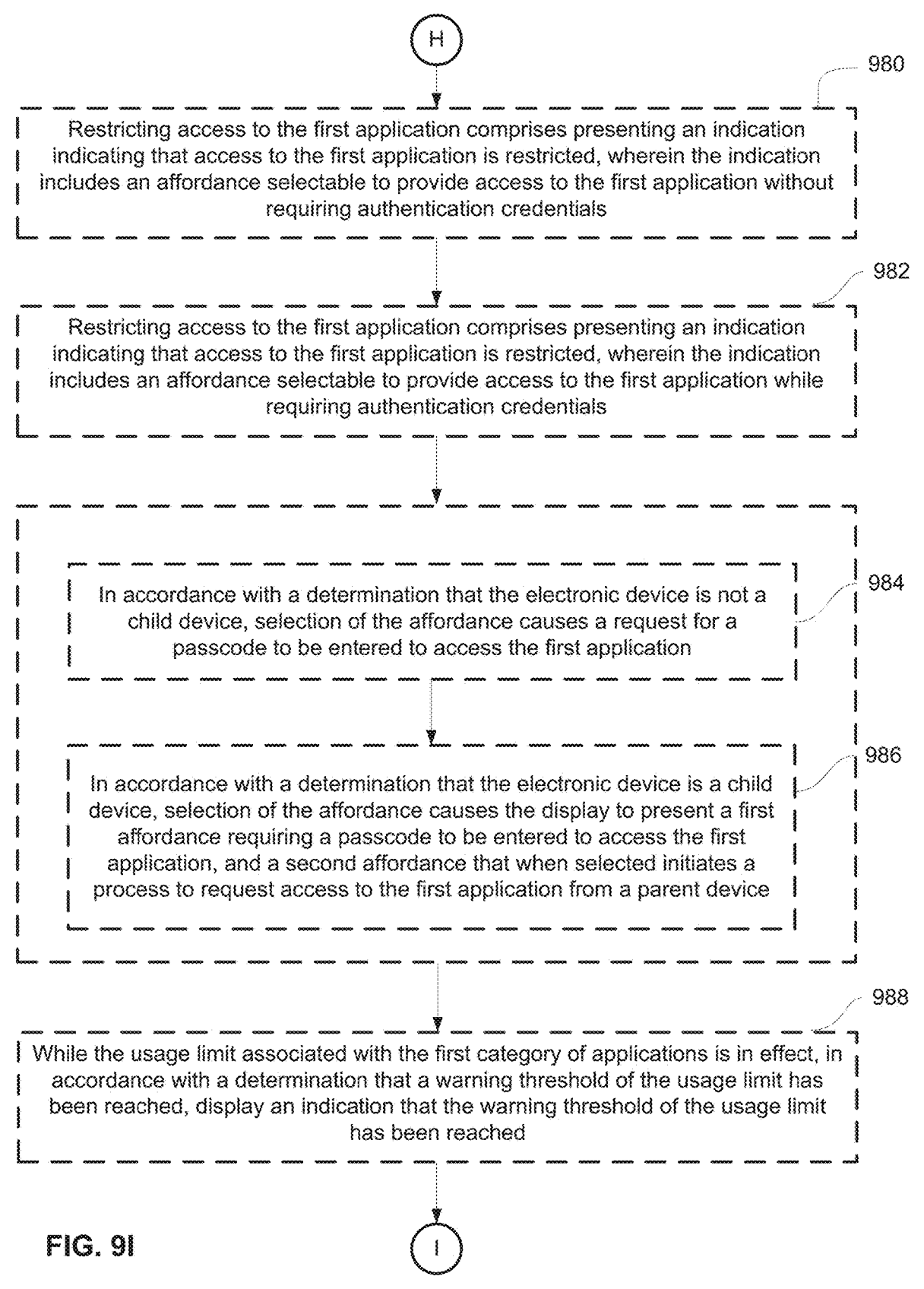

H

980 Restricting access to the first application comprises presenting an indication indicating that access to the first application is restricted, wherein the indication includes an affordance selectable to provide access to the first application without requiring authentication credentials 982 Restricting access to the first application comprises presenting an indication indicating that access to the first application is restricted, wherein the indication includes an affordance selectable to provide access to the first application while requiring authentication credentials 984 In accordance with a determination that the electronic device is not a child device, selection of the affordance causes a request for a passcode to be entered to access the first application 986 In accordance with a determination that the electronic device is a child device, selection of the affordance causes the display to present a first affordance requiring a passcode to be entered to access the first application, and a second affordance that when selected initiates a process to request access to the first application from a parent device 988 While the usage limit associated with the first category of applications is in effect, in accordance with a determination that a warning threshold of the usage limit has been reached, display an indication that the warning threshold of the usage limit has been reached

I

FIG. 9I (Child device)

(Child device)

(Parent device)

(Parent device)

(Child device before changes by parent)

(30 minutes before downtime)

(At downtime on parent device: notify option)

(After extending start of downtime on parent device: notify option)

(At downtime on parent device: notify and block option)

(At downtime on parent device: notify and block option)

(At downtime on parent device: notify and block option)

(After extending start of downtime on parent device: notify and block option)

(At downtime on child device)

(At downtime on child device)

(Receiving request at parent device to extend time at child device)

(Receiving request at parent device to extend time at child device)

(30 minutes before downtime)

(At downtime on parent device: notify option)

(At downtime on parent device: notify option)

(During downtime on parent device: notify and block option)

(During downtime on parent device: notify and block option)

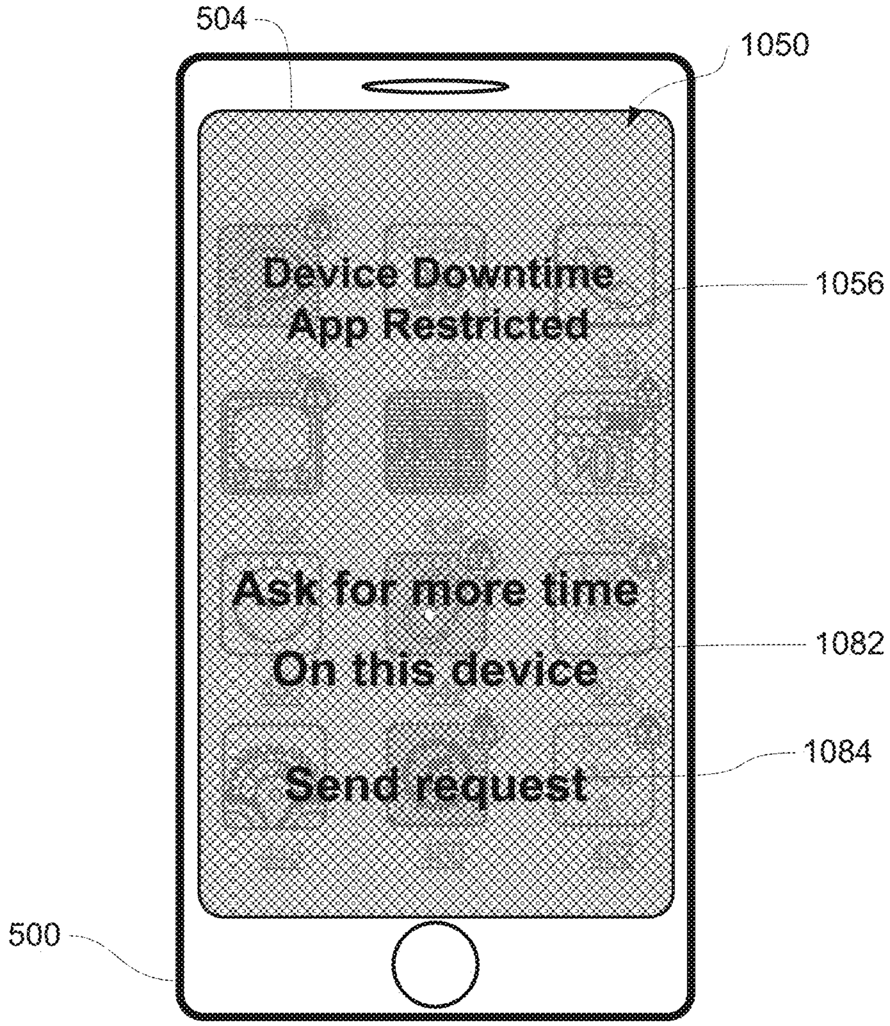
(During downtime
on child device)
FIG. 10AAA

1100

(Restriction criteria not met for any app)

(Restriction criteria not met for any app)

(Restriction criteria not met for any app)

(Restriction criteria not met for any app)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria no longer met for any app)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria met for Messages 424 and Soc Med A 452 apps)

(Restriction criteria not met for any app)

(Restriction criteria met for Messages 424 and Video Z apps)

(Restriction criteria met for Messages 424 and Soc Med A 452 apps)

(Restriction criteria no longer met for any app)

(Restriction criteria not met for any app)

(Restriction criteria met for Music, Messages 424 and Soc Med A 452 apps)

(Restriction criteria met for Music, Messages 424 and Soc Med A 452 apps)

(Child device; child age is below optional sharing threshold)

(Child device; permission required to change settings)

(Child device; permission required to change settings)

(Child device; parent approves changes to settings or authentication is provided)

(Child device)

(Parent device; child web usage is hidden; News App usage includes accessing news-related websites with Browser App)

(Child device)

(Parent device; child web usage is shared)

(Parent device; child age is above passcode threshold)

(Parent device; child age is below passcode threshold)

(Child device)

(Child device; Child's age is above optional sharing threshold)

(Child device; Child's age is above optional sharing threshold)

(Child device; Child's age is above optional sharing threshold)

USER INTERFACES FOR CONTROLLING OR PRESENTING DEVICE USAGE ON AN ELECTRONIC DEVICE

CROSS-REFERENCE TO RELATED APPLICATIONS

This application is a continuation of U.S. patent application Ser. No. 16/147,069, filed Sep. 28, 2018 and published on Nov. 14, 2019 as U.S. Publication No. 2019-0347180, which claims benefit of U.S. Provisional Patent Application Nos. 62/692,831, filed Jul. 1, 2018, 62/679,927, filed Jun. 3, 2018, and 62/668,811, filed May 8, 2018, the contents of all of which are hereby incorporated by reference in their entirety for all purposes.

FIELD OF THE DISCLOSURE

This relates generally to electronic devices that control or present information about usage of the device, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users wish to view information about their usage of such devices and/or wish to control their usage of such devices. Enhancing these interactions improves the user's experience with the device and decreases user interaction time, which is particularly important where input devices are battery-operated.

SUMMARY OF THE DISCLOSURE

Some embodiments described in this disclosure are directed to one or more electronic devices that present indications of usage metrics for the devices, and one or more operations related to the above that the electronic devices optionally perform. Some embodiments described in this disclosure are directed to one or more electronic devices that set, configure and/or enforce device usage limits, and one or more operations related to the above that the electronic devices optionally perform. Some embodiments described in this disclosure are directed to one or more electronic devices that limit access to certain applications during certain periods of time, and one or more operations related to the above that the electronic devices optionally perform. Some embodiments described in this disclosure are directed to one or more electronic devices that suppress auxiliary functions of certain applications when an application usage limit or restriction criteria associated with those applications is reached, and one or more operations related to the above that the electronic devices optionally perform. Some embodiments described in this disclosure are directed to one or more electronic devices that manage restriction settings with permission optionally provided by another electronic device, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 9A-9K are flow diagrams illustrating a method of setting, configuring and/or enforcing usage limits in accordance with some embodiments of the disclosure.

DETAILED DESCRIPTION

Description of Embodiments

Figure 1A:
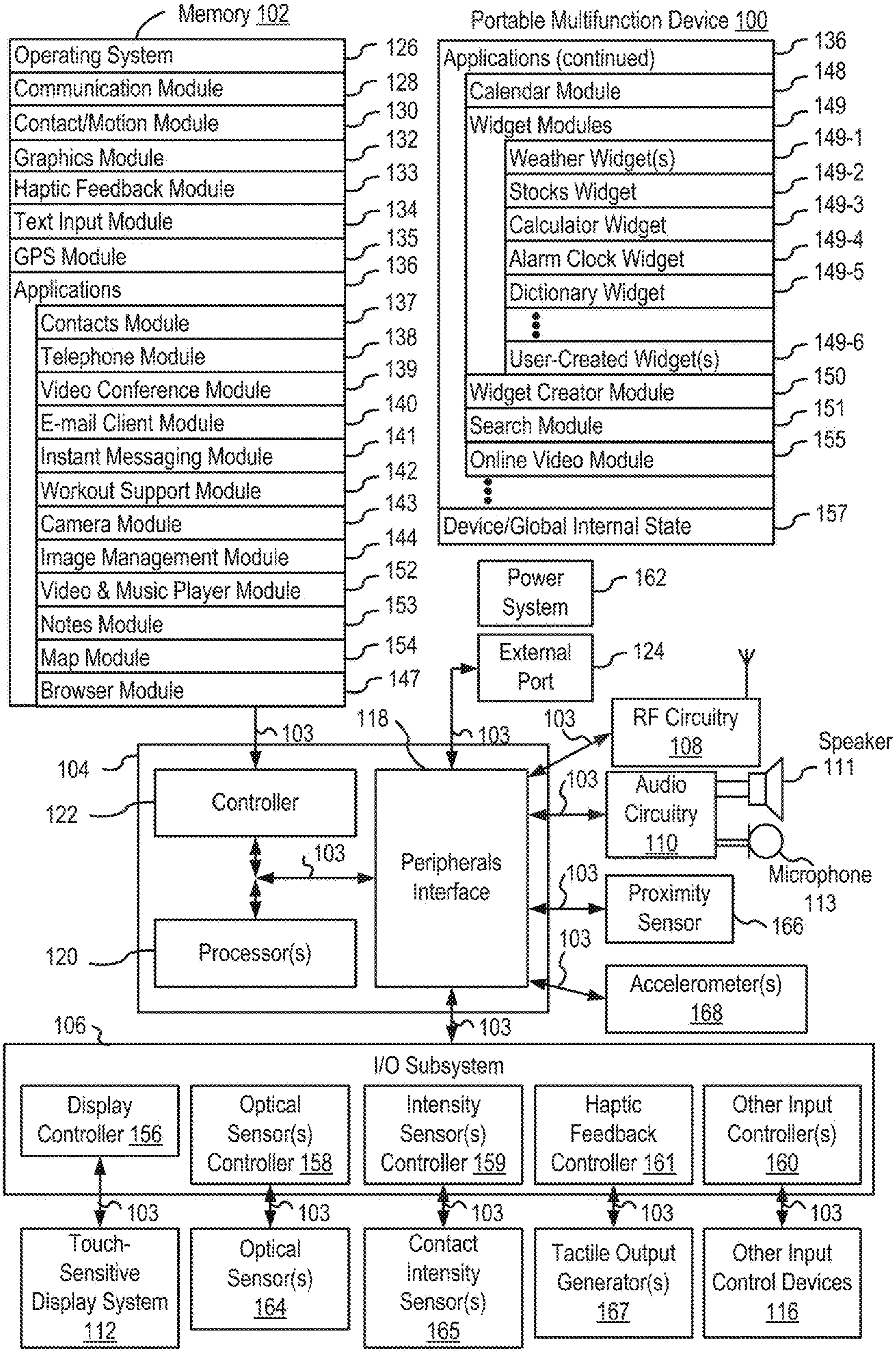
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for presenting information about device usage and/or controlling device usage. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
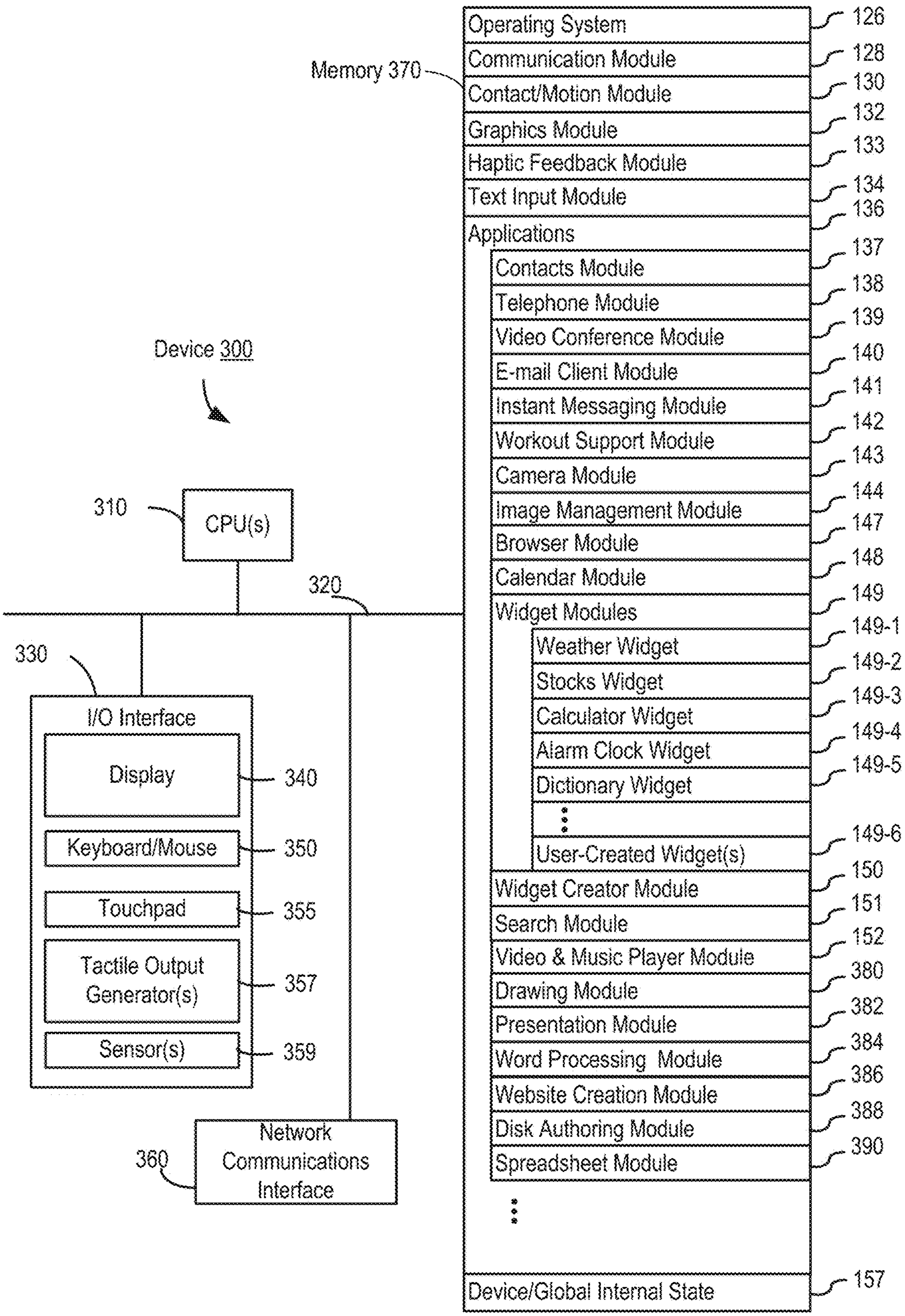
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
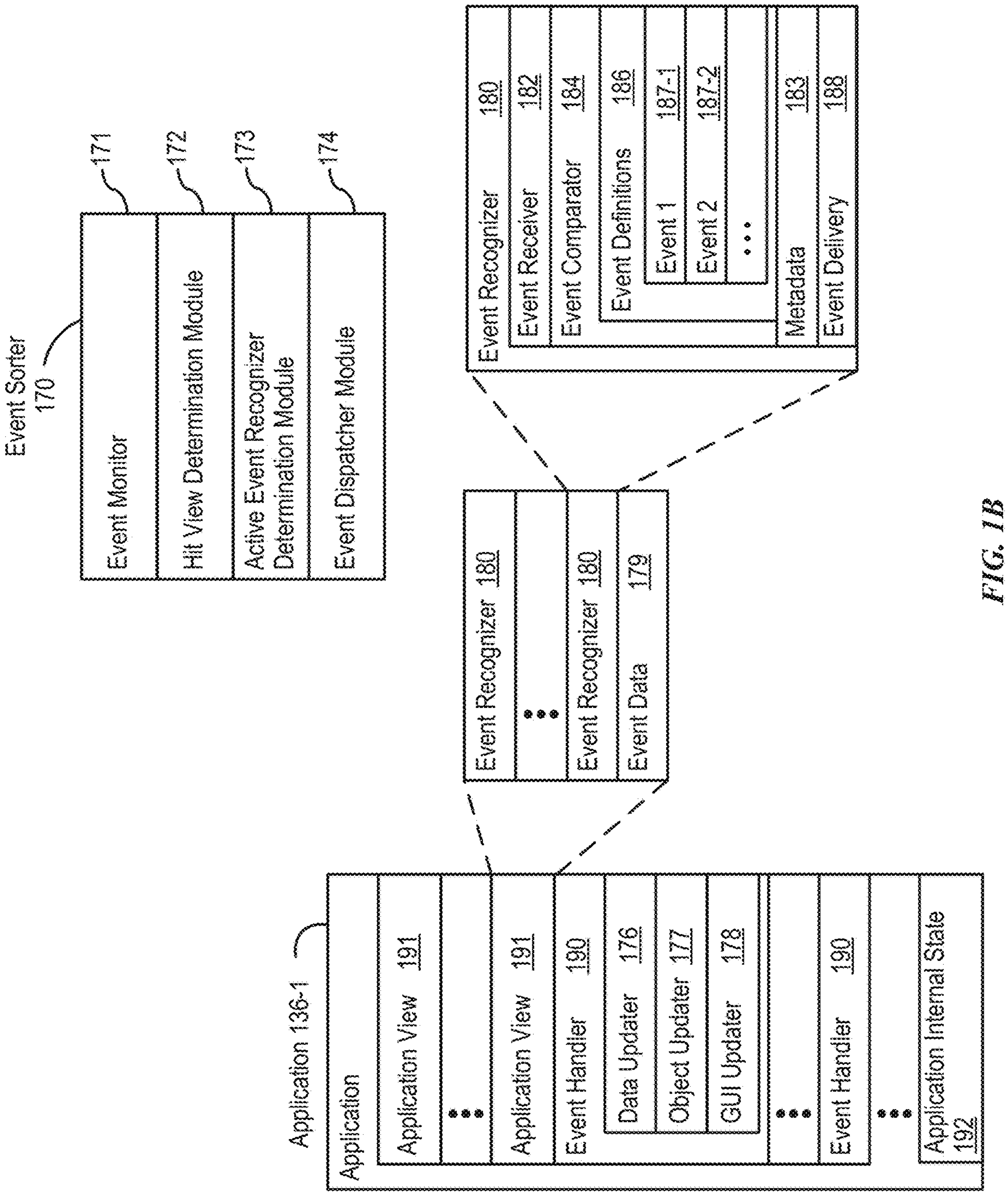
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
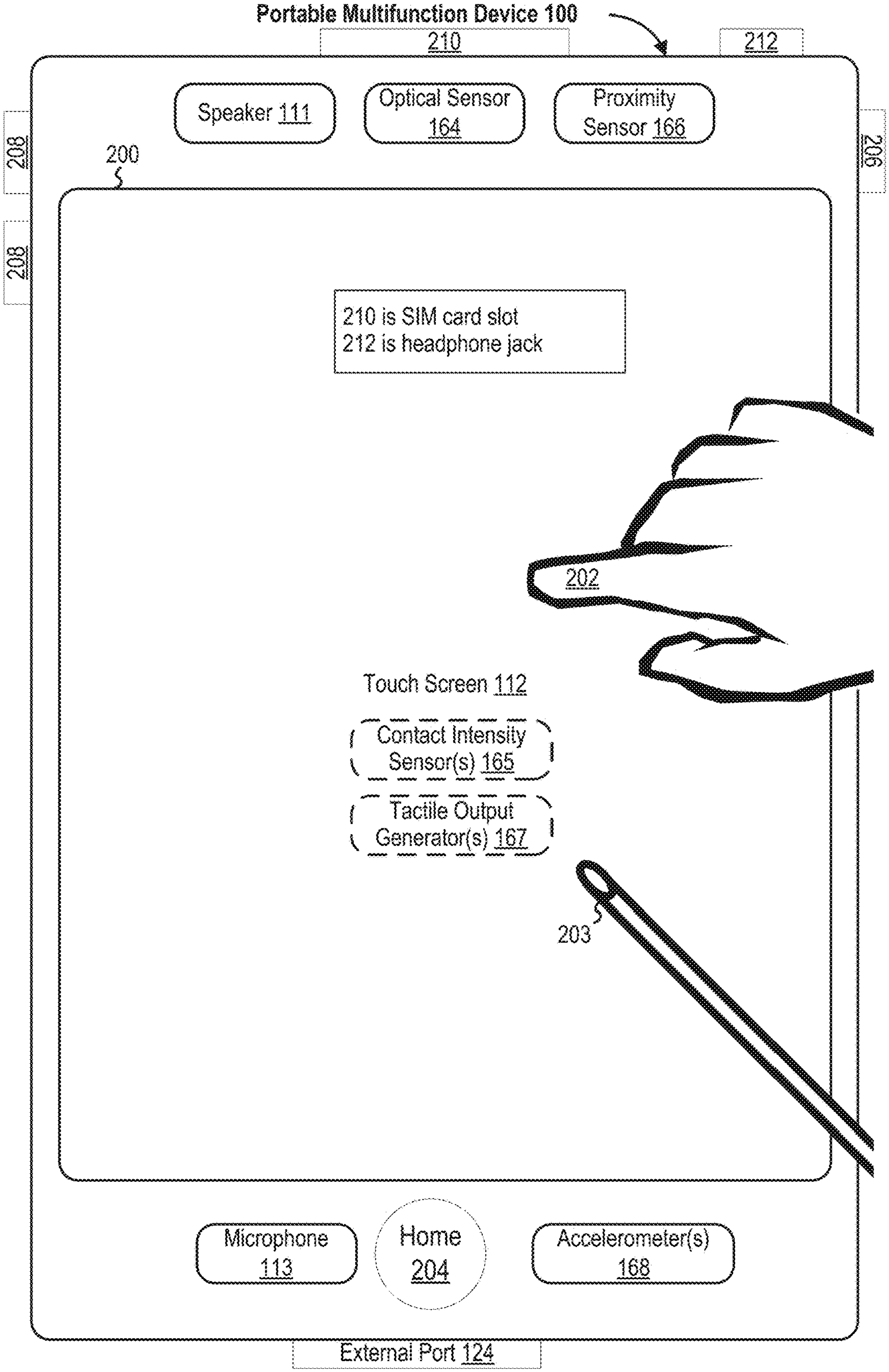
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
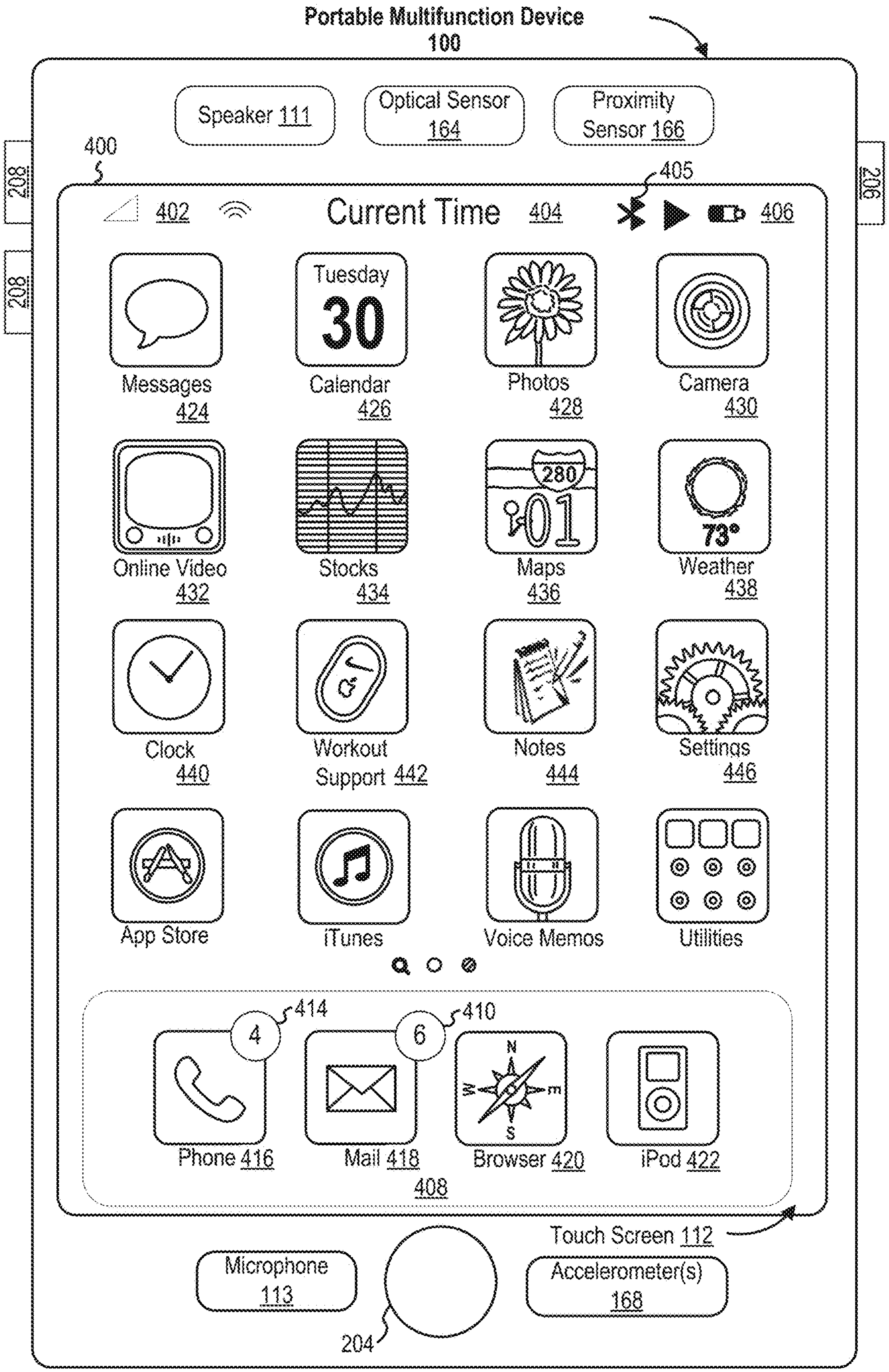
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
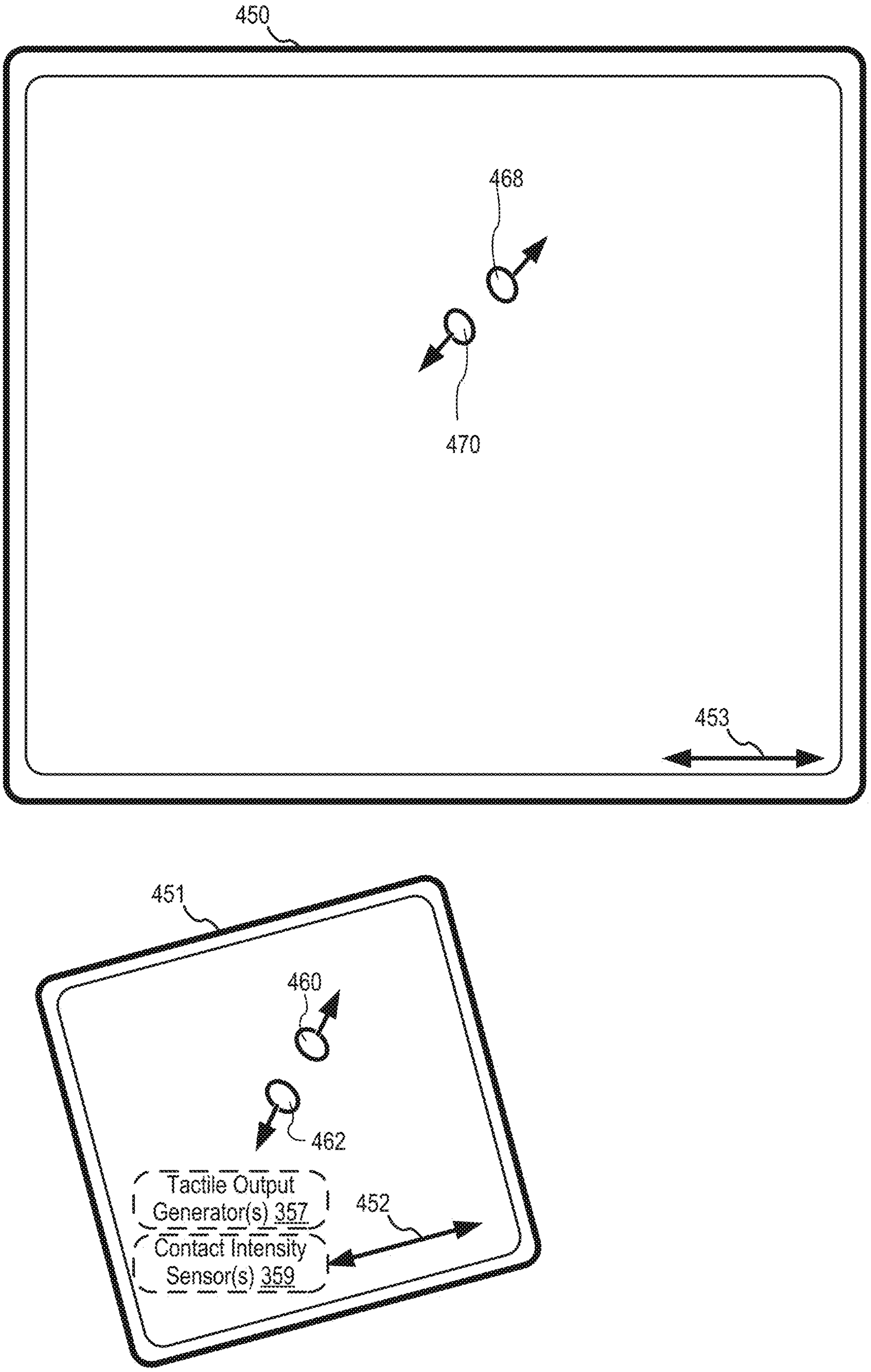
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
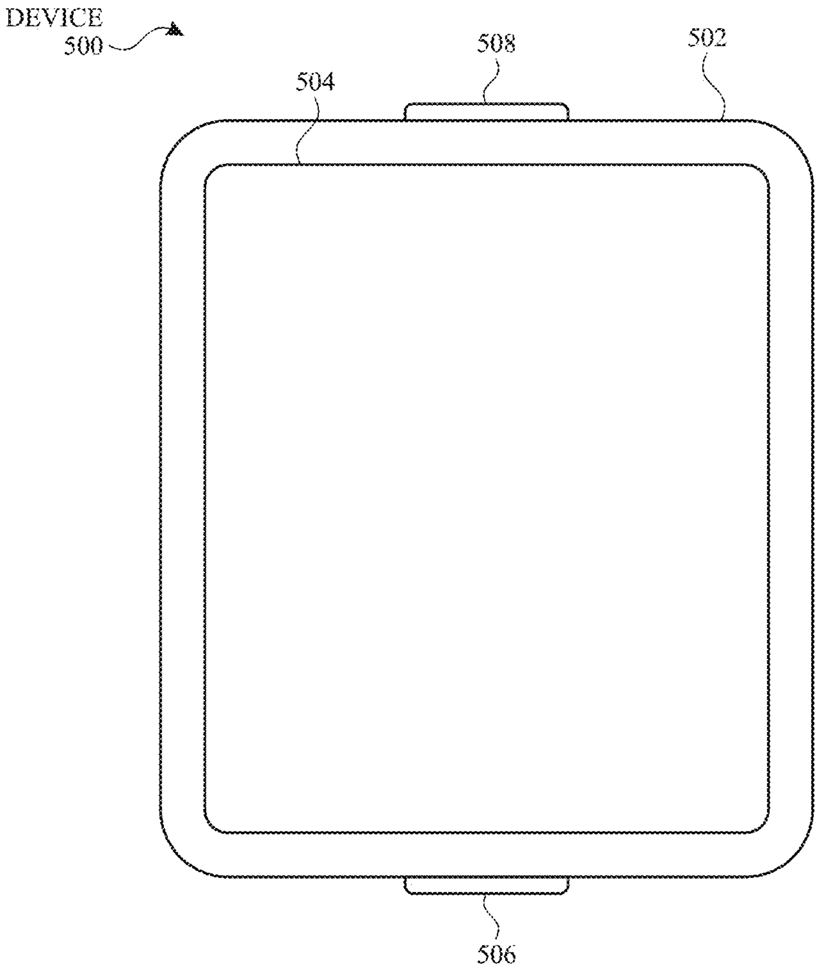
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
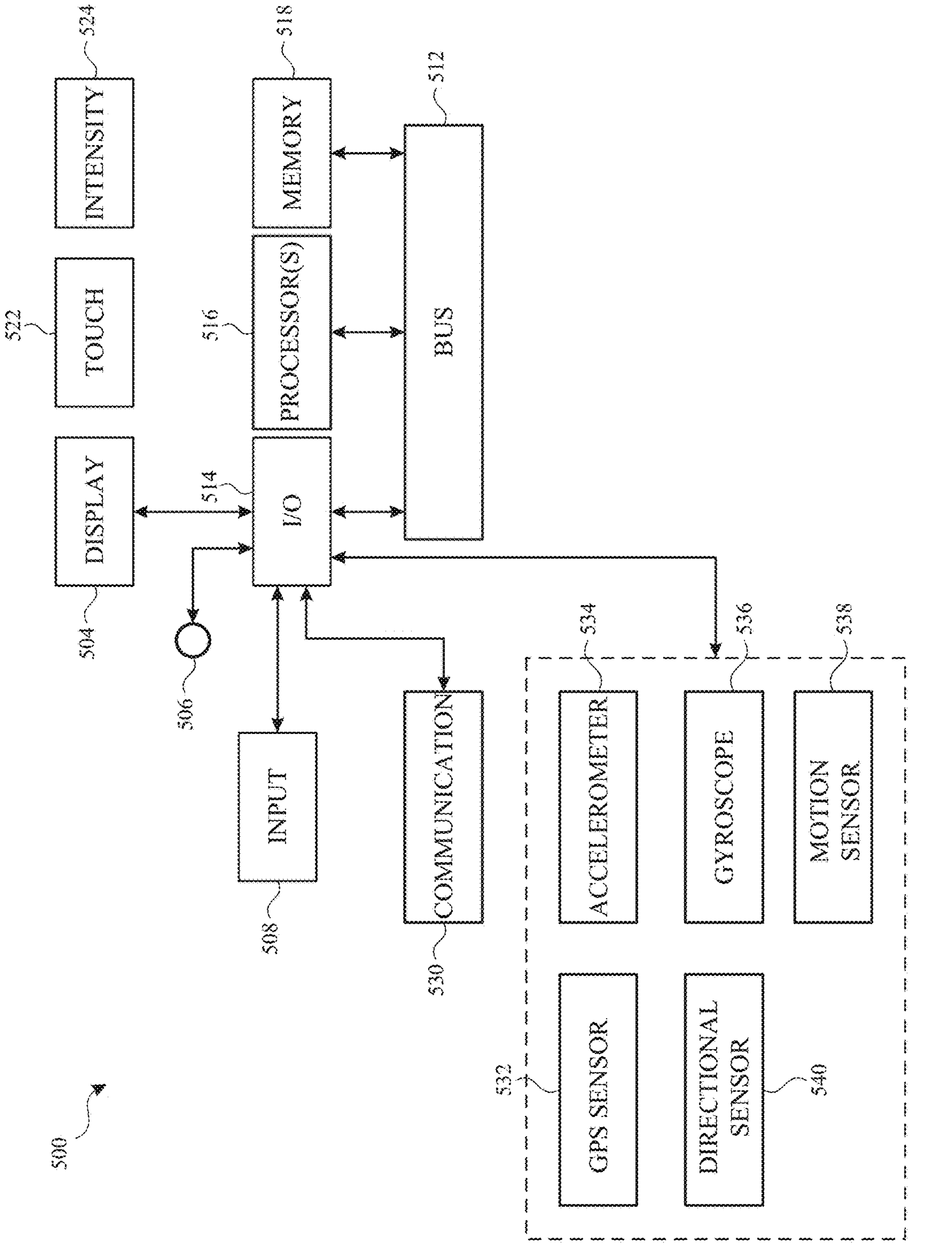
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100 and 1300 (FIGS. 7, 9, 11 and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
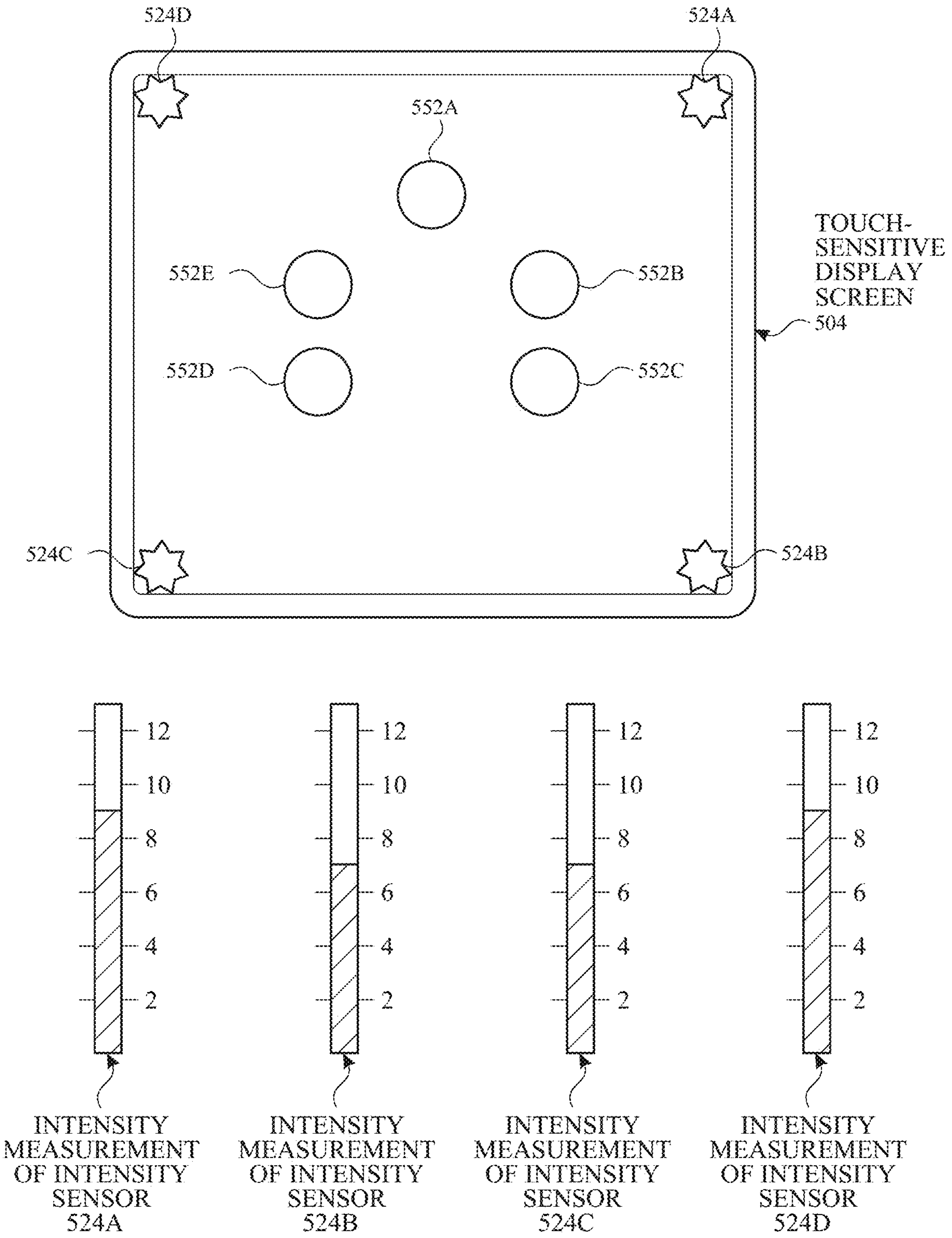
FIGS. 5C-5D illustrate exemplary components of a personal electronic device having a touch-sensitive display and intensity sensors in accordance with some embodiments.
Figure 5D:
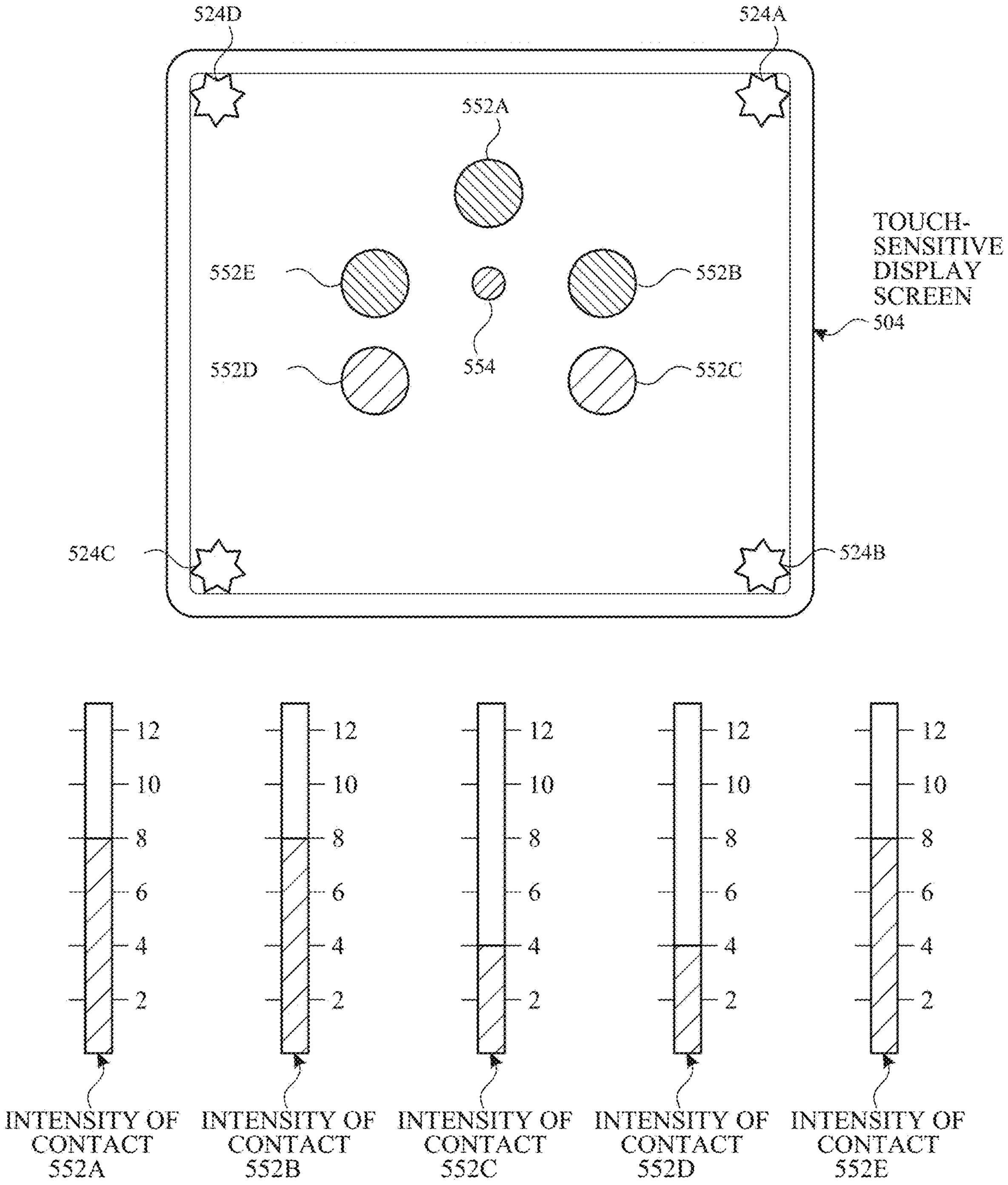

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
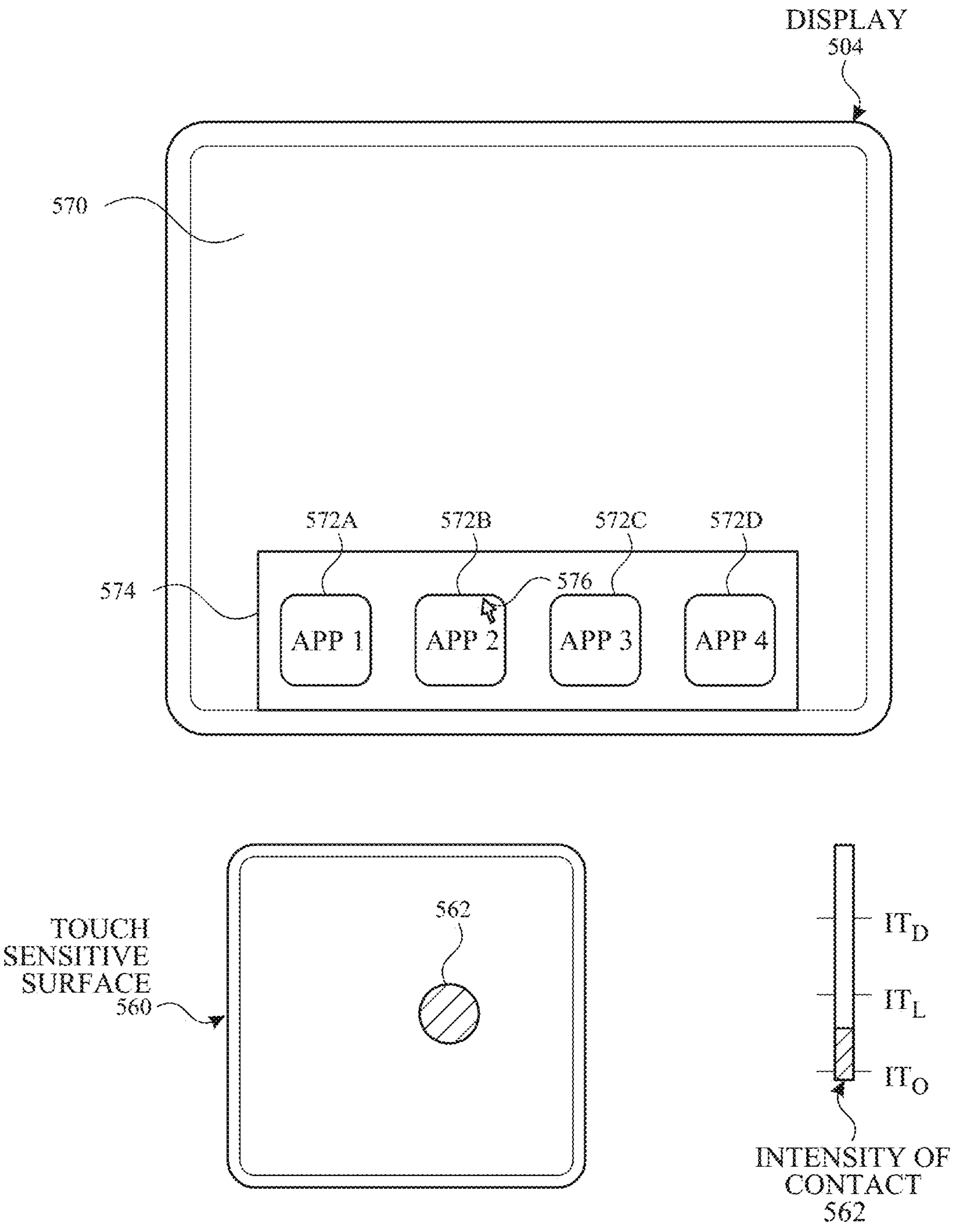
FIGS. 5E-5H illustrate exemplary components and user interfaces of a personal electronic device in accordance with some embodiments.
Figure 5F:
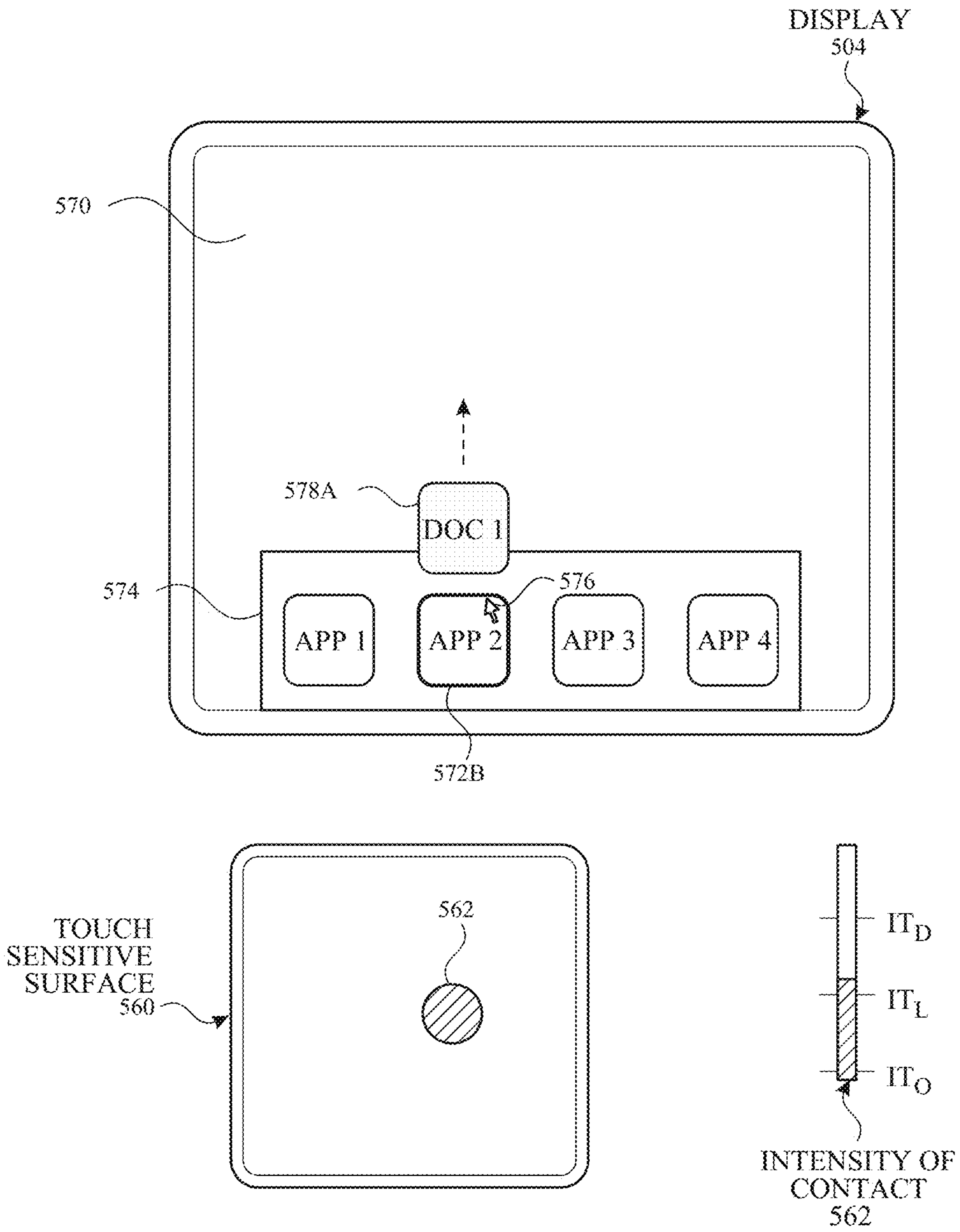
Figure 5G:
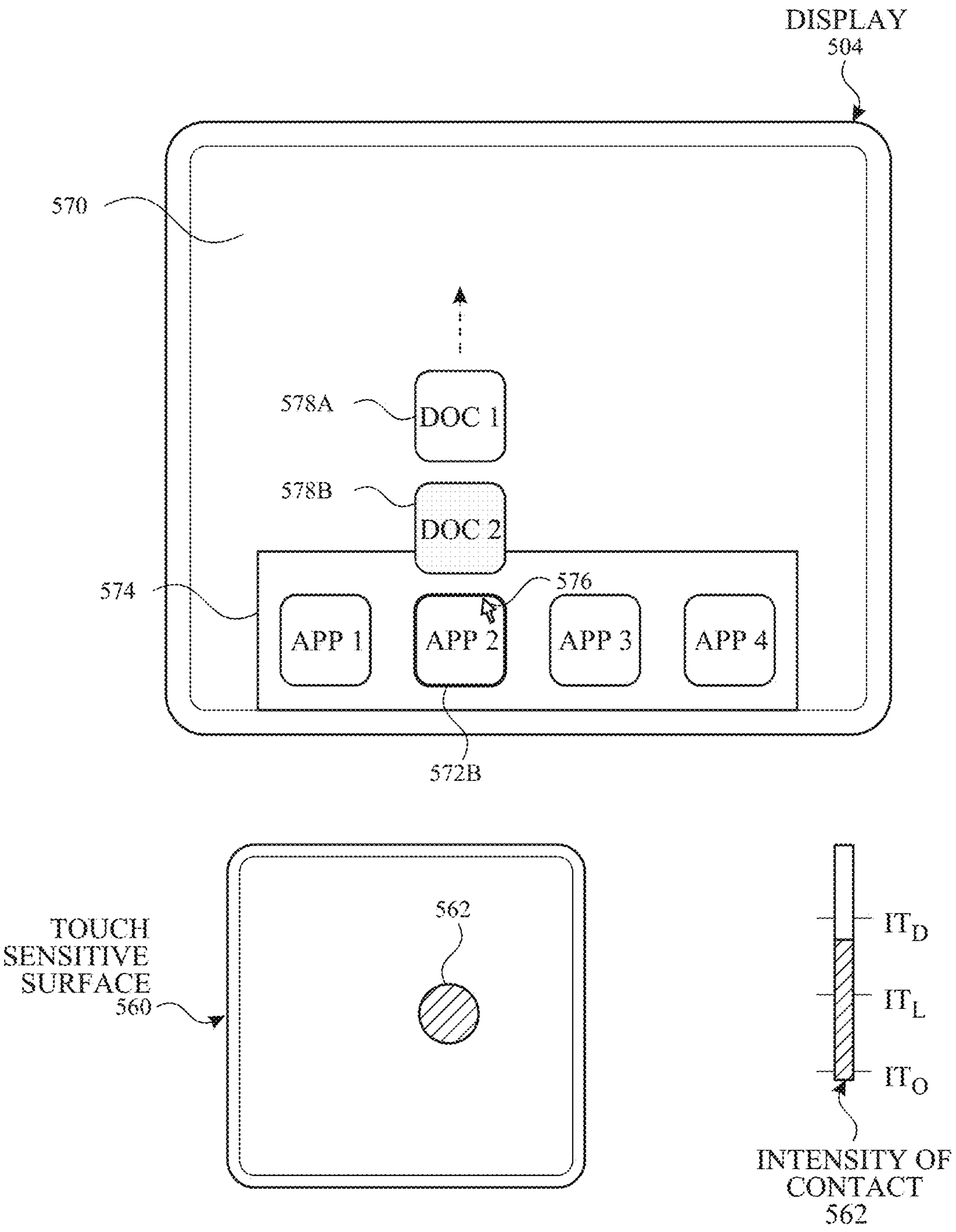
Figure 5H:
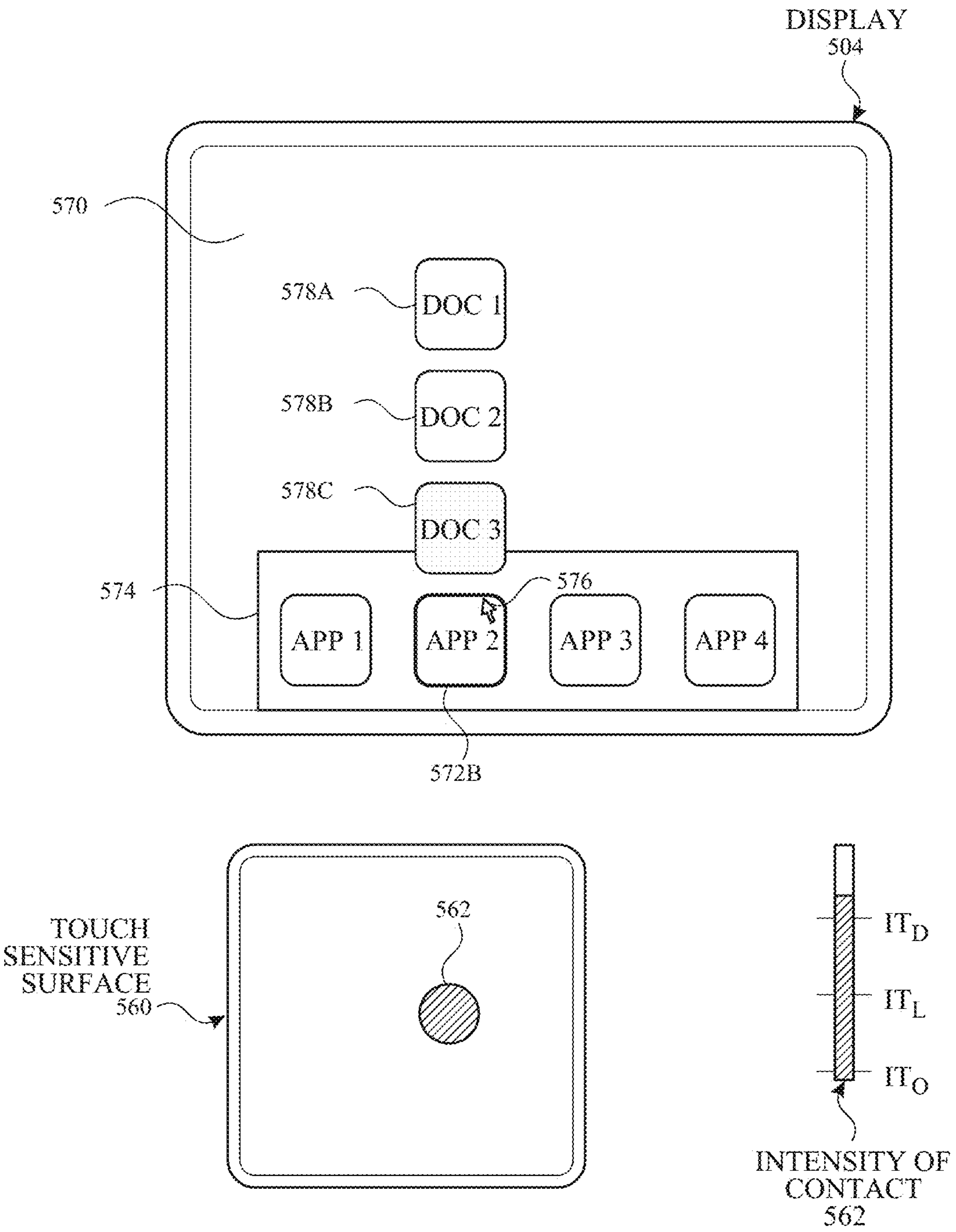

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Usage Metric Dashboard User Interface

Users interact with electronic devices in many different manners, including viewing information about the electronic device and/or usage of the electronic device. In some embodiments, the electronic device displays visual indications of one or more metrics associated with an operation at the electronic device, thereby allowing the user to view information about usage of the electronic device. The embodiments described below provide ways in which an electronic device presents indications of usage metrics associated with the use of the electronic device to perform one or more operations. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
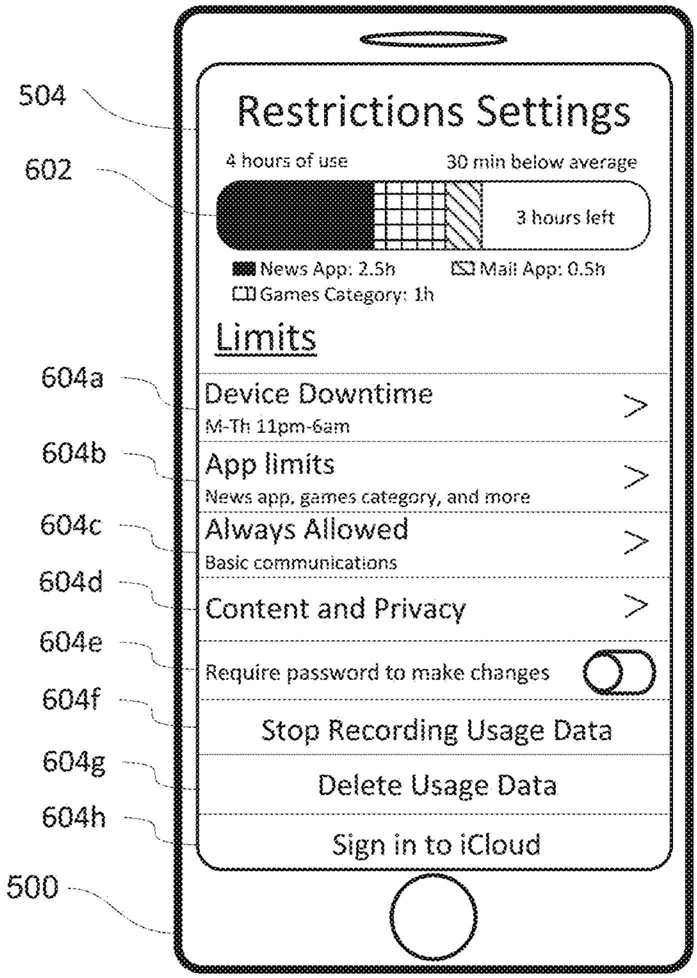
FIGS. 6A-6UU illustrate exemplary ways in which an electronic device presents indications of usage metrics in accordance with some embodiments of the disclosure.
Figure 6B:
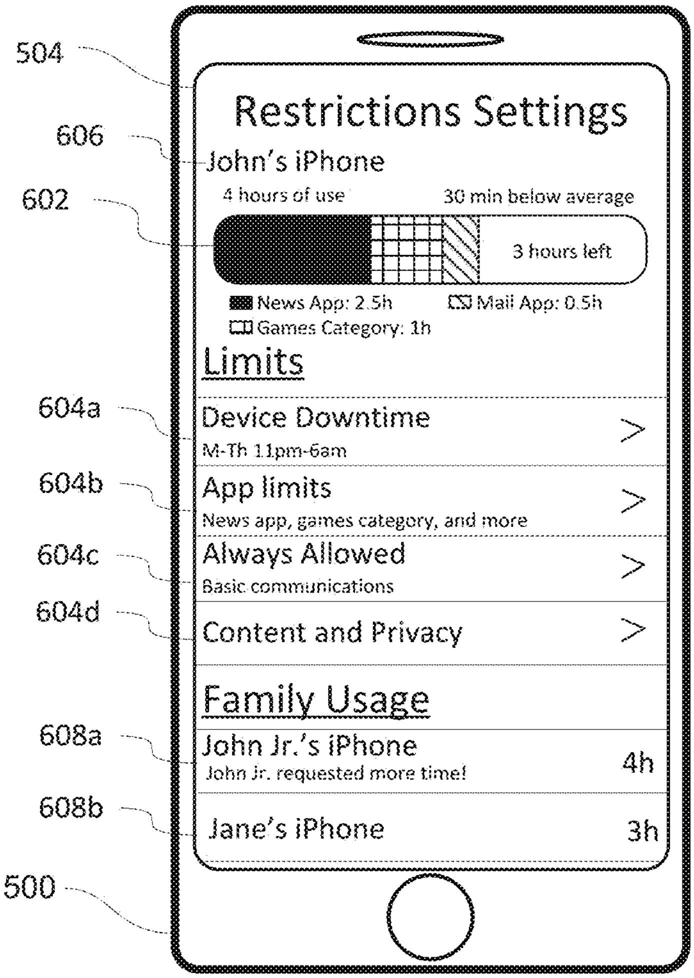
Figure 6C:
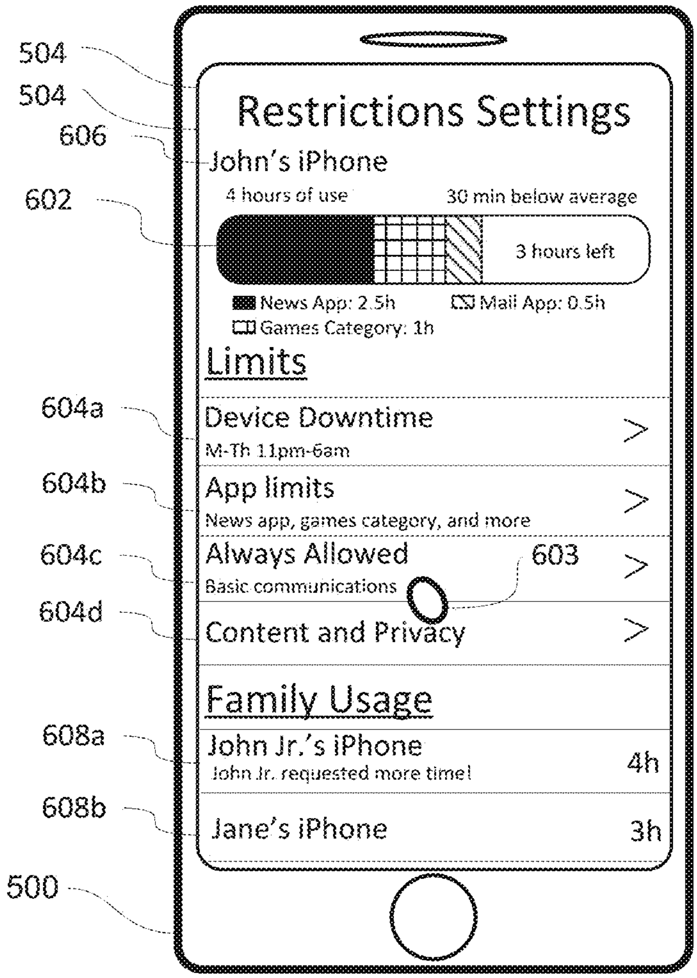
Figure 6D:
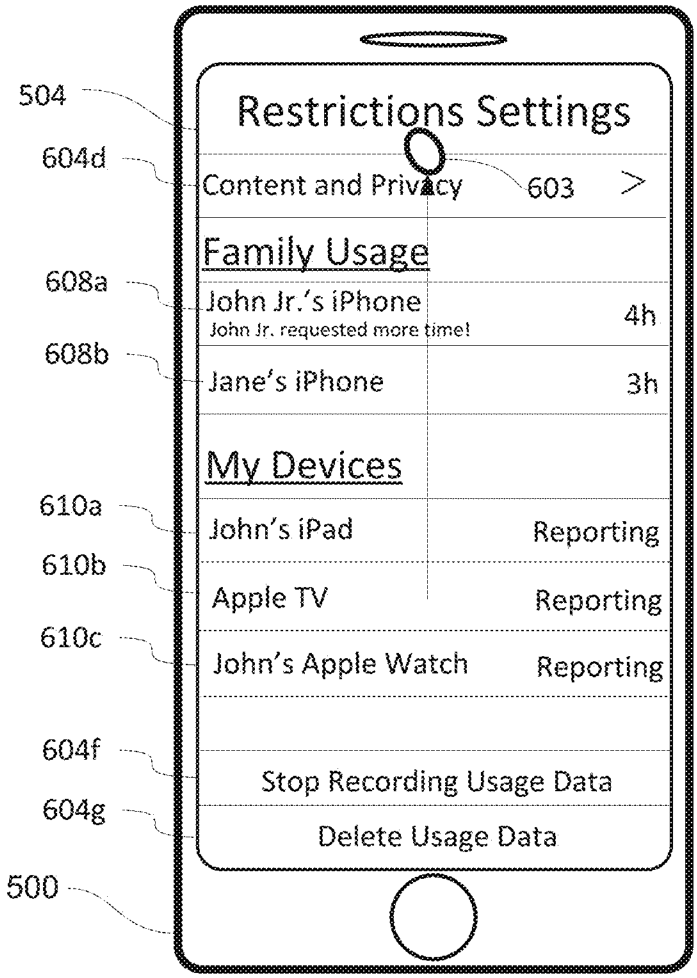
Figure 6E:
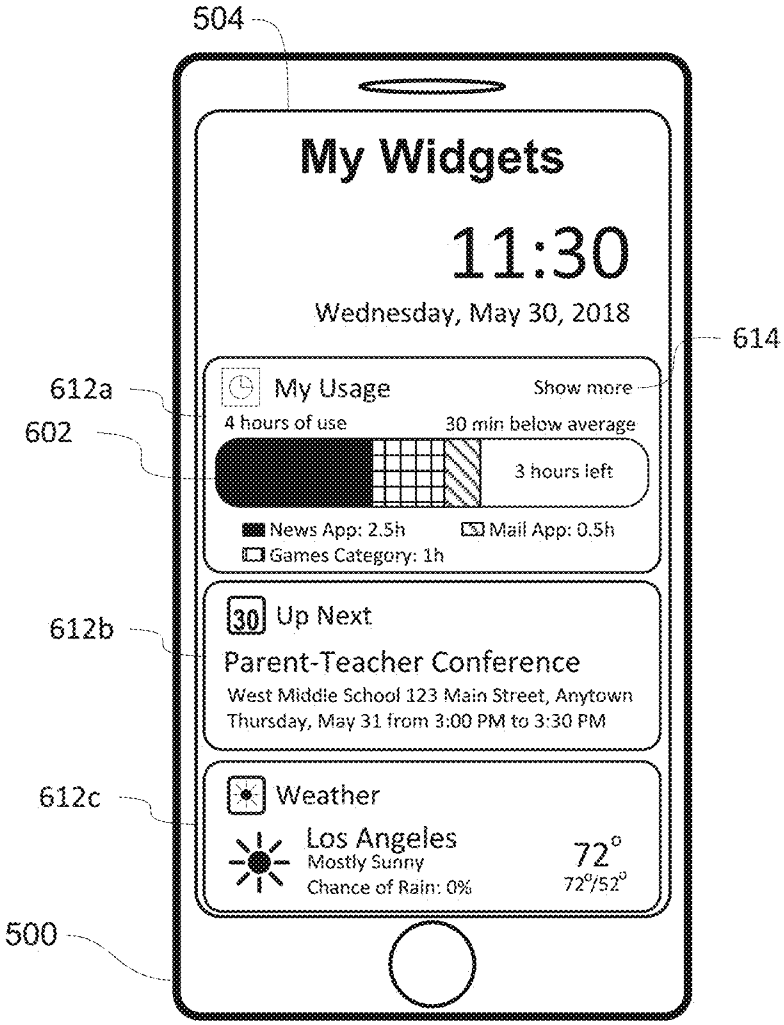
Figure 6F:
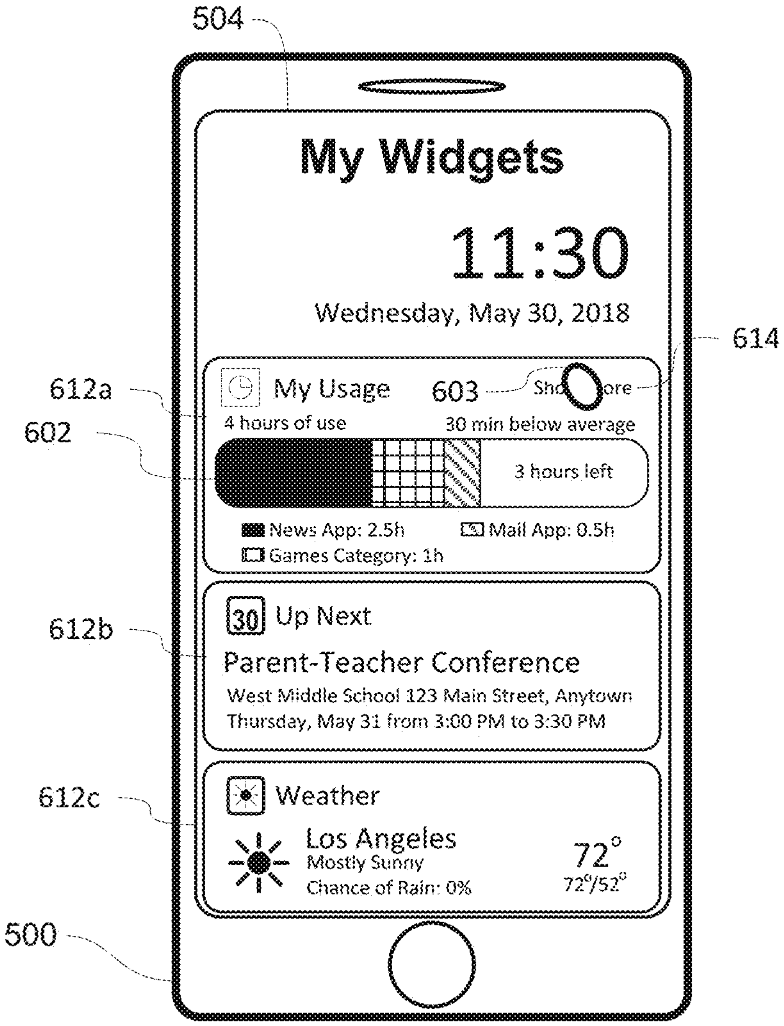
Figure 6G:
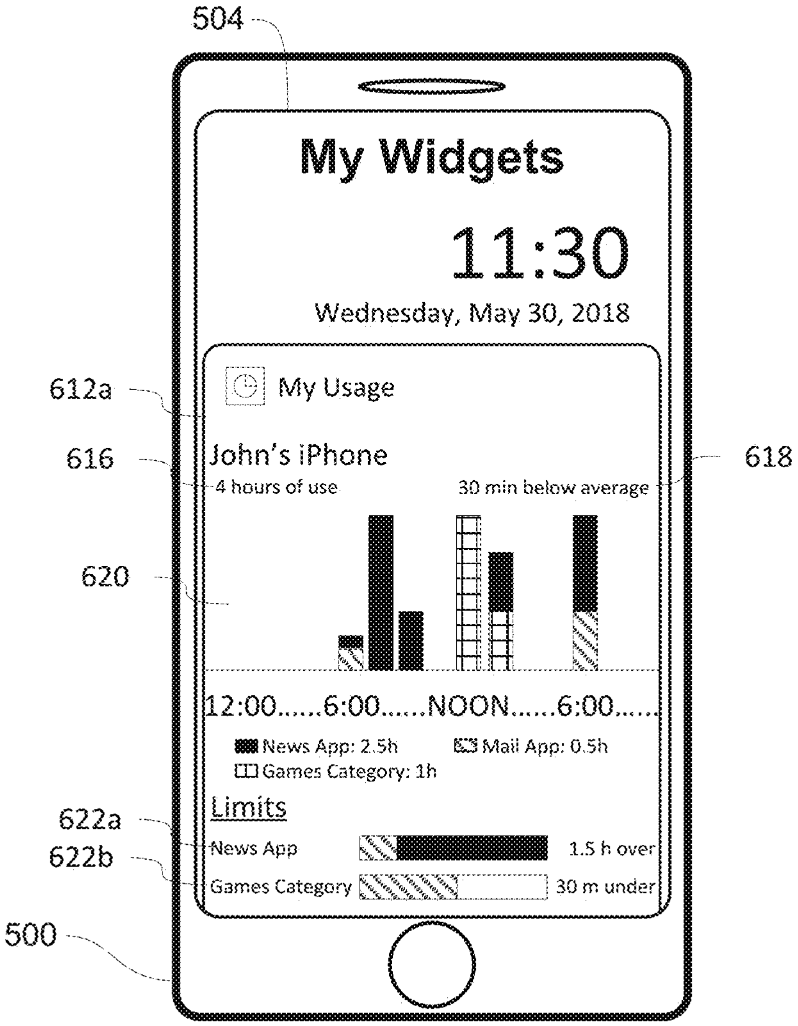
Figure 6H:
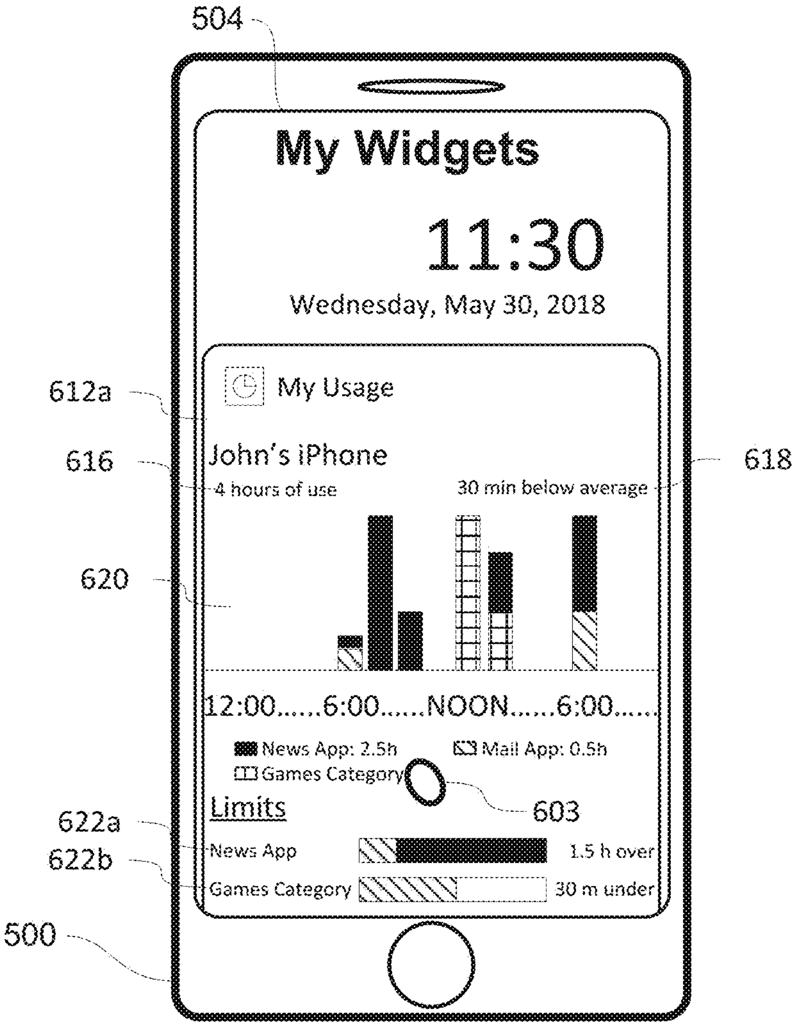
Figure 6I:
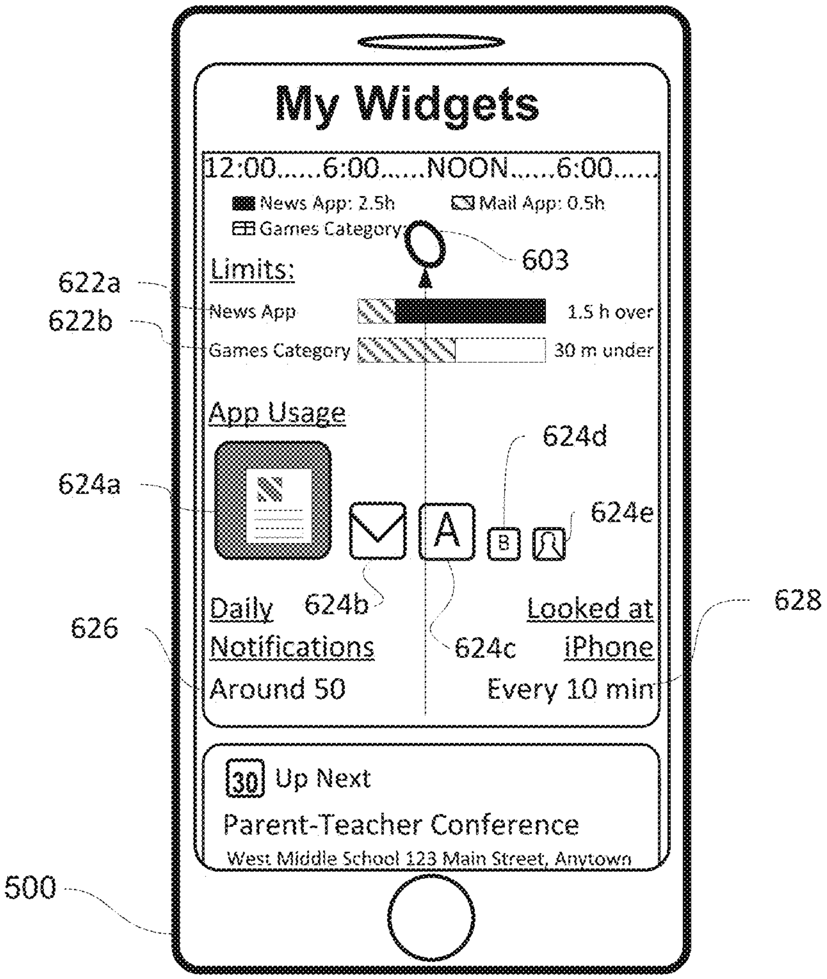
Figure 6J:
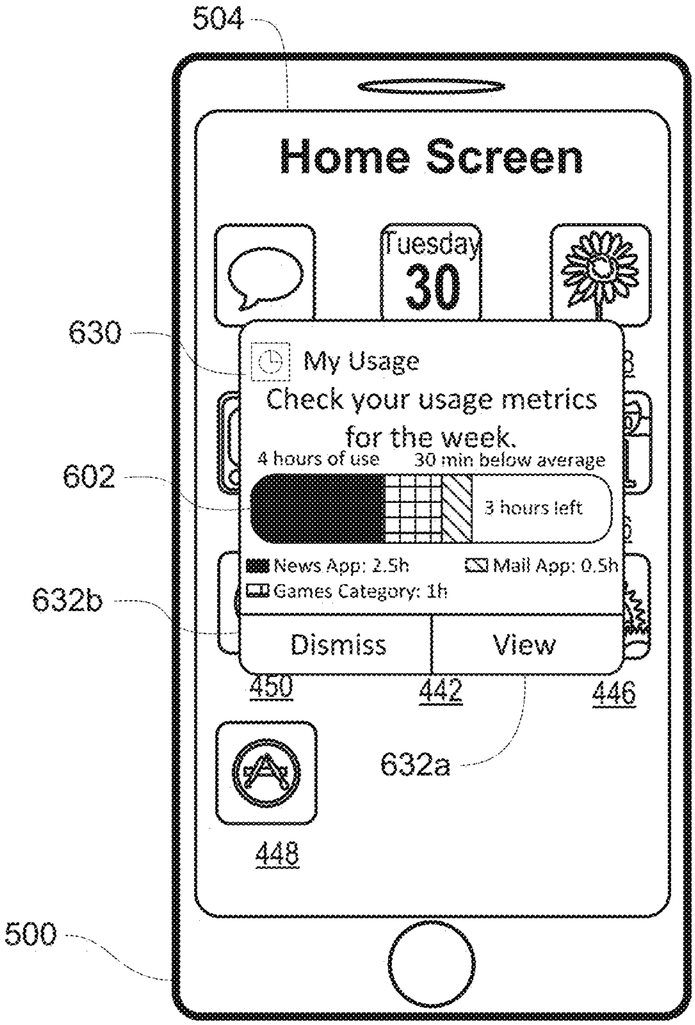
Figure 6K:
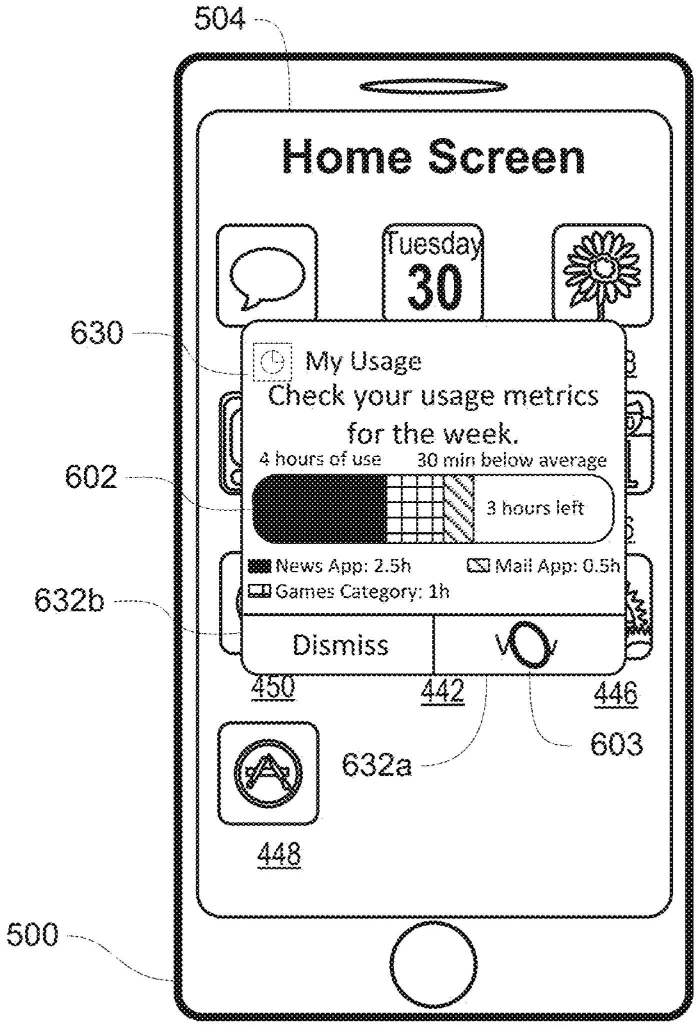
Figure 6L:
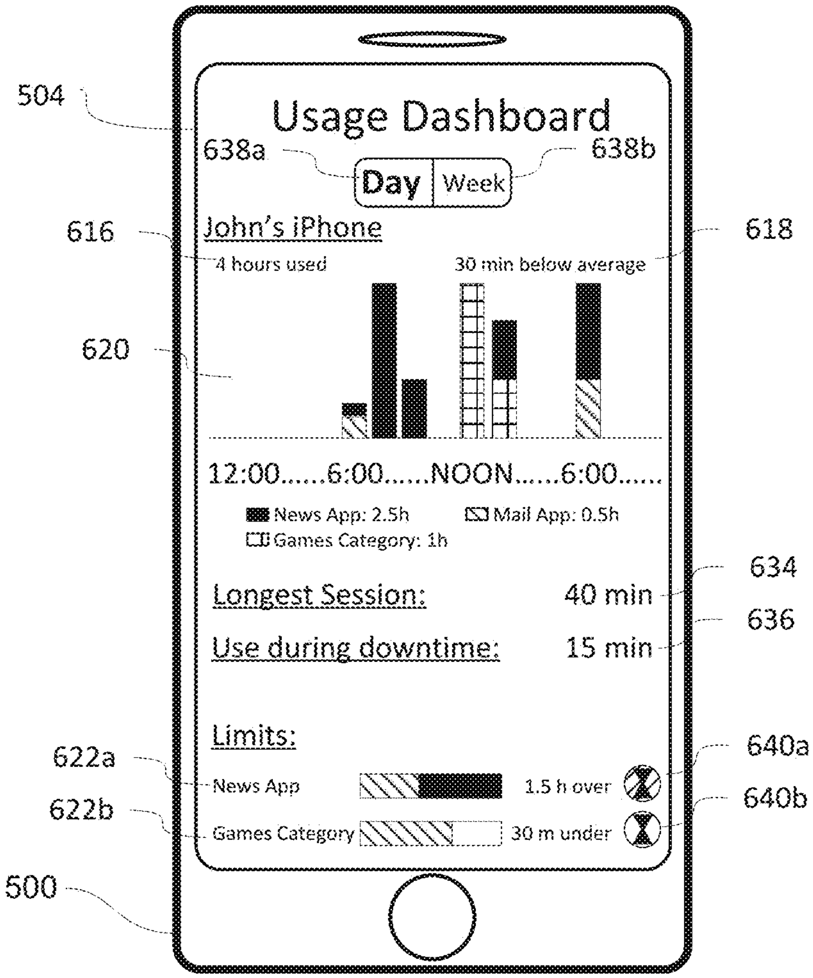
Figure 6M:
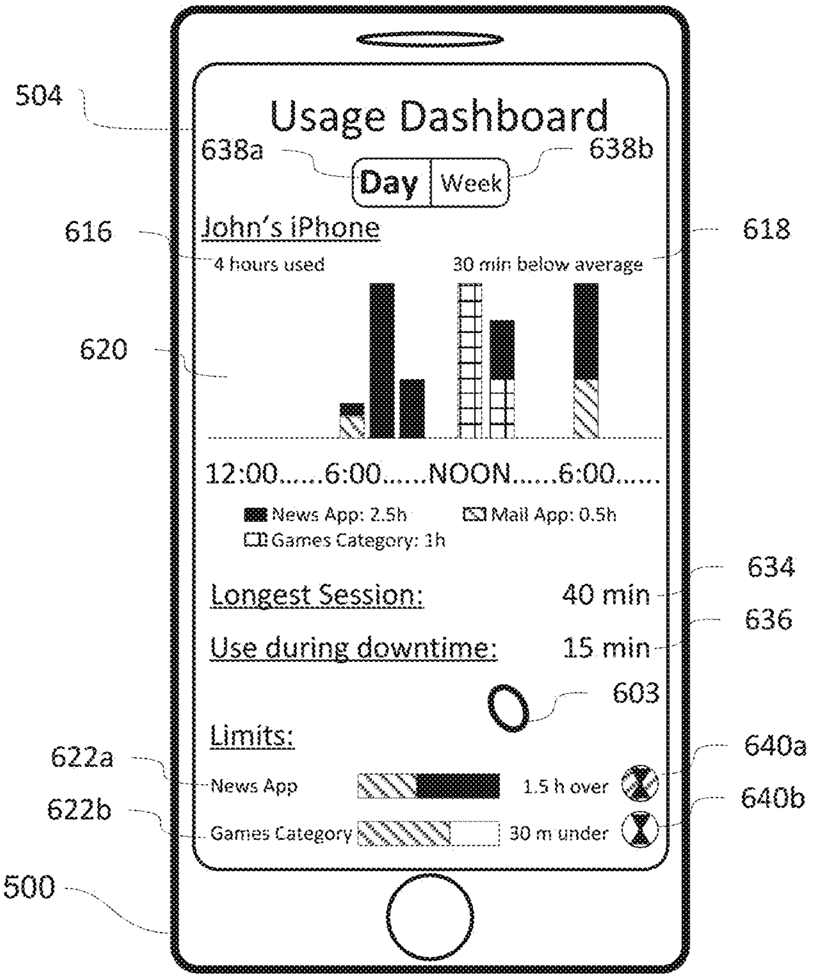
Figure 6N:
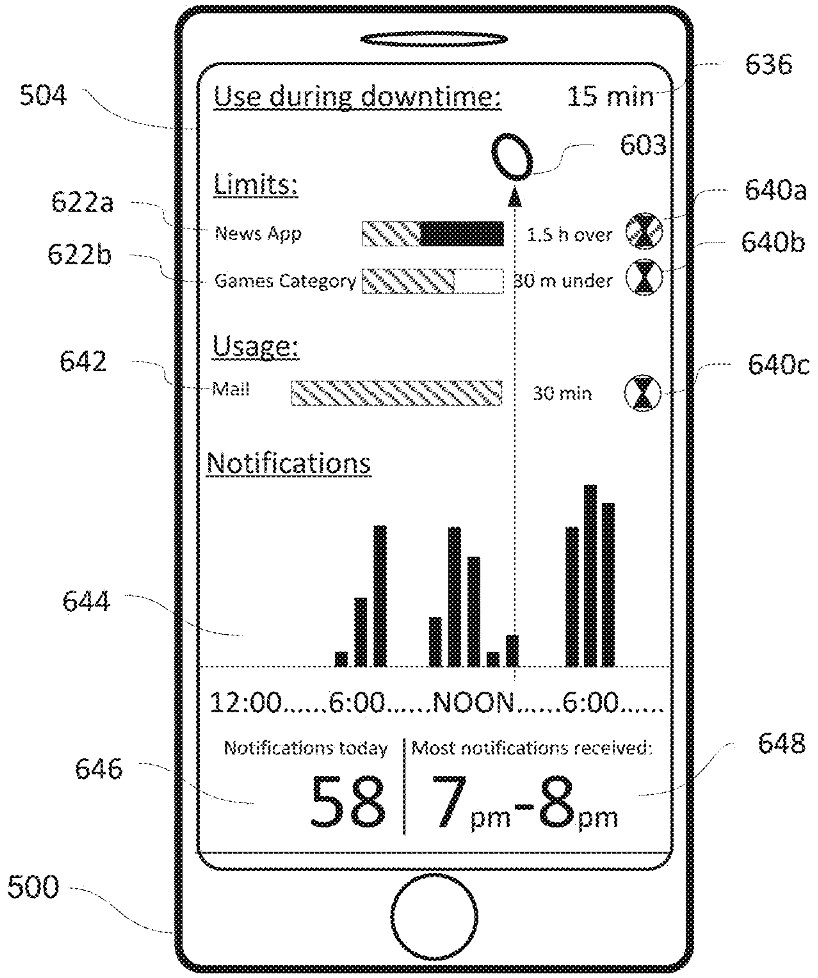
Figure 6O:
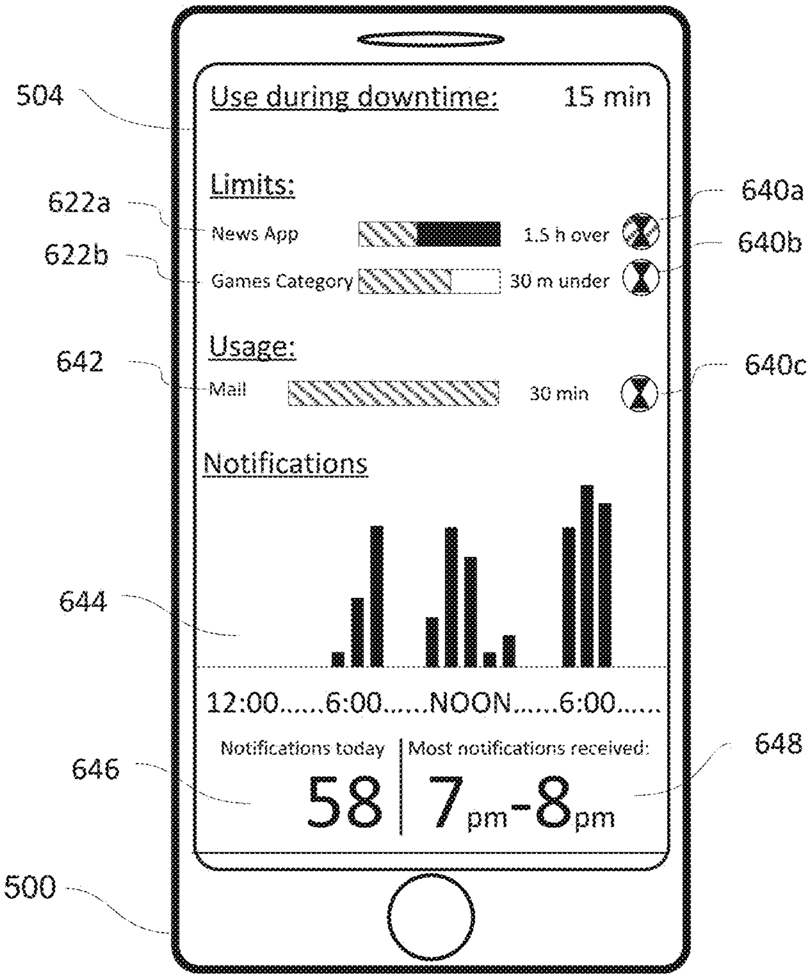
Figure 6P:
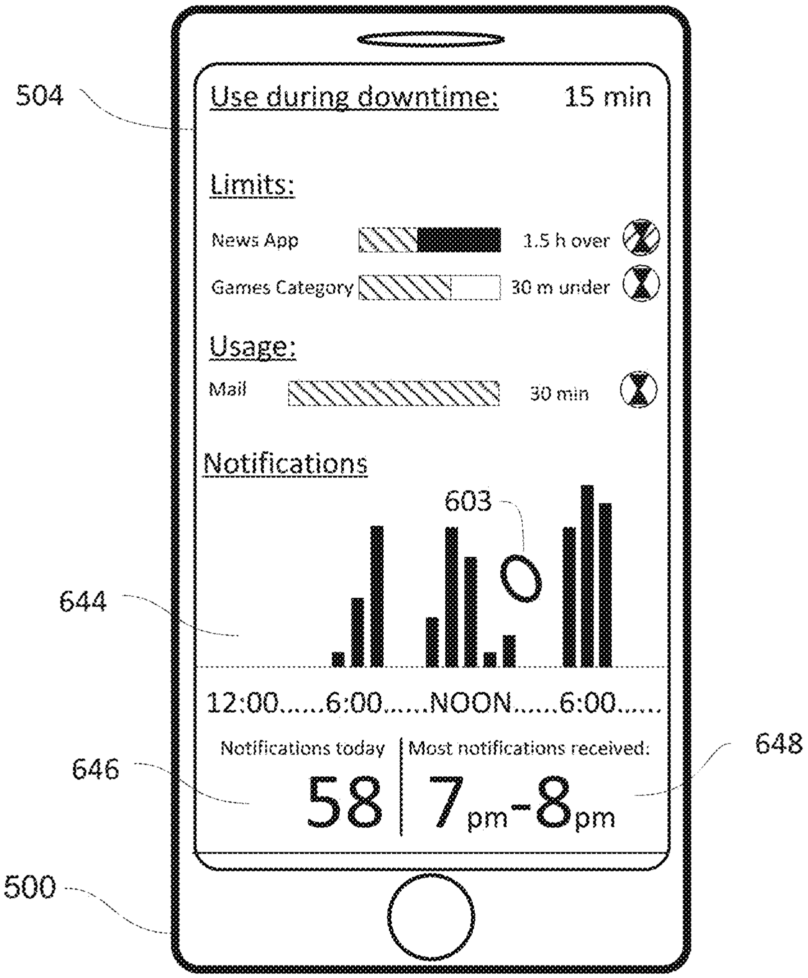
Figure 6Q:
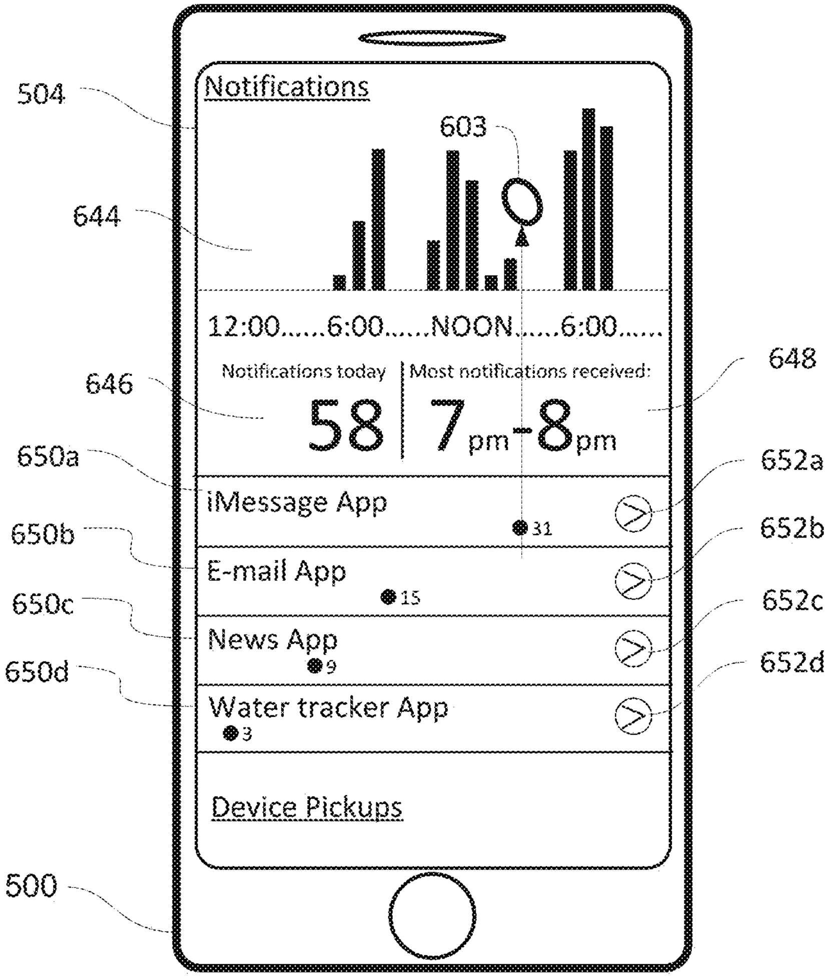
Figure 6R:
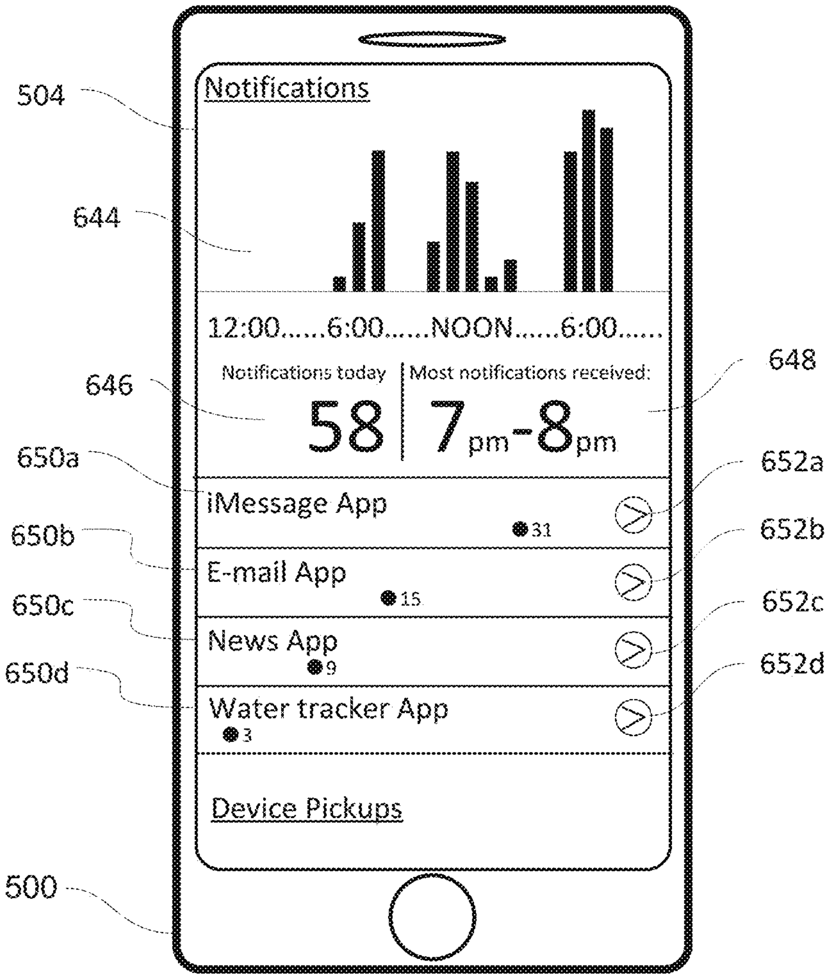
Figure 6S:
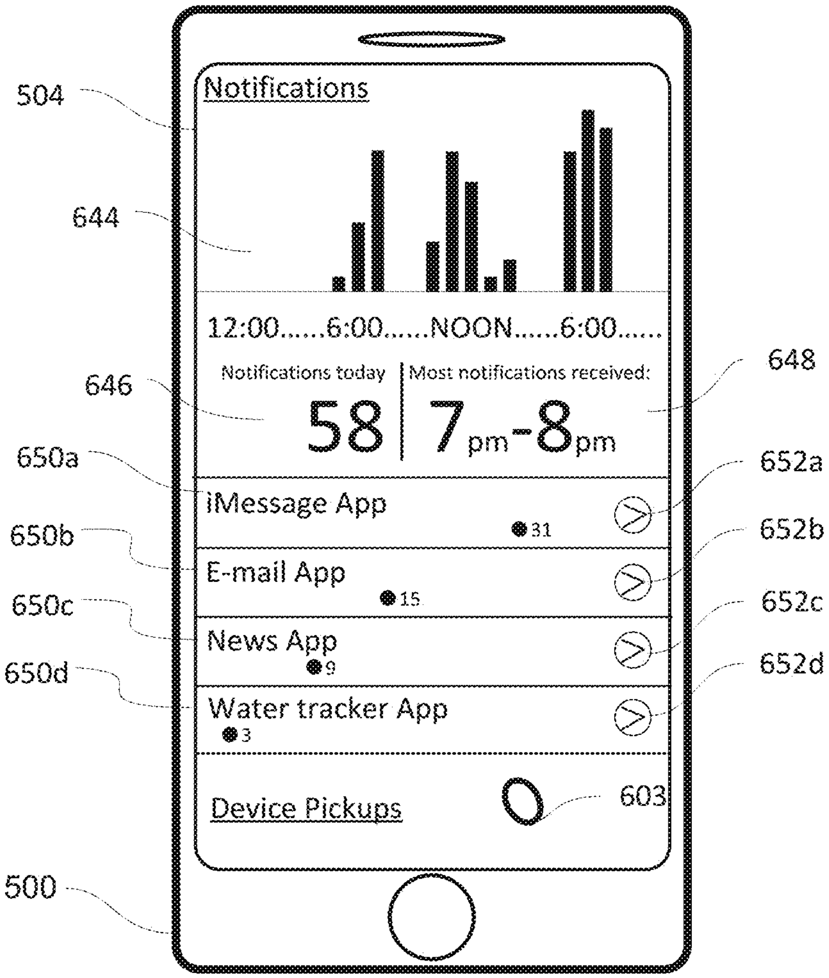
Figure 6T:
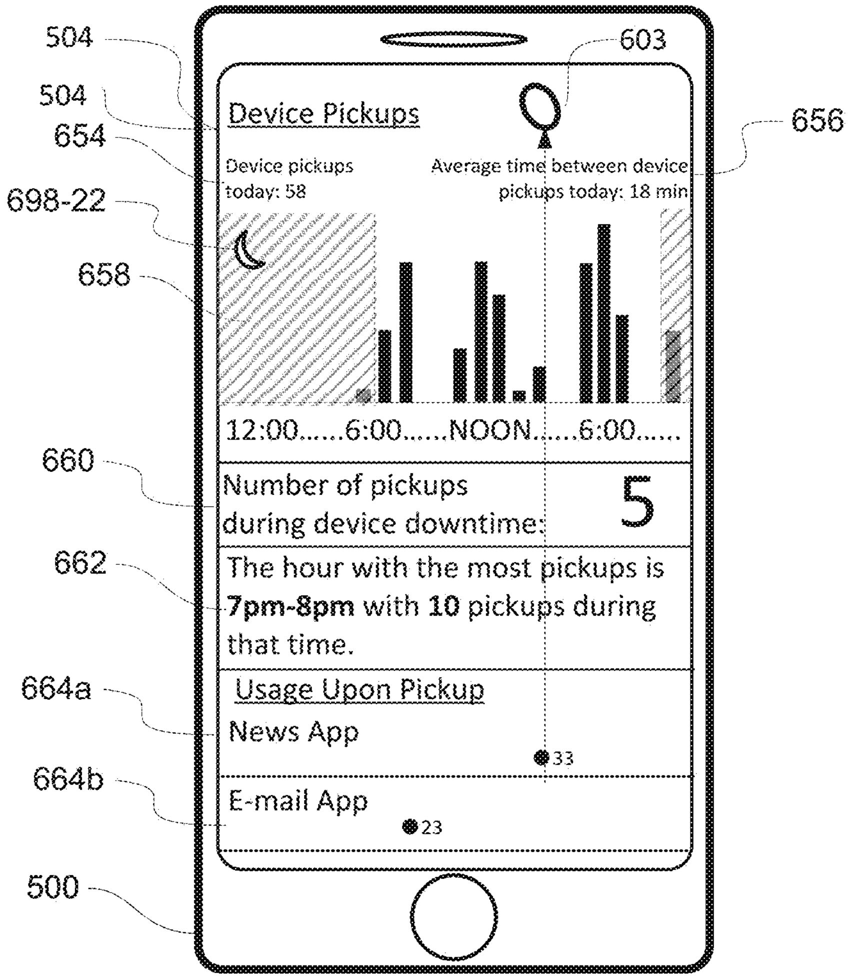
Figure 6U:
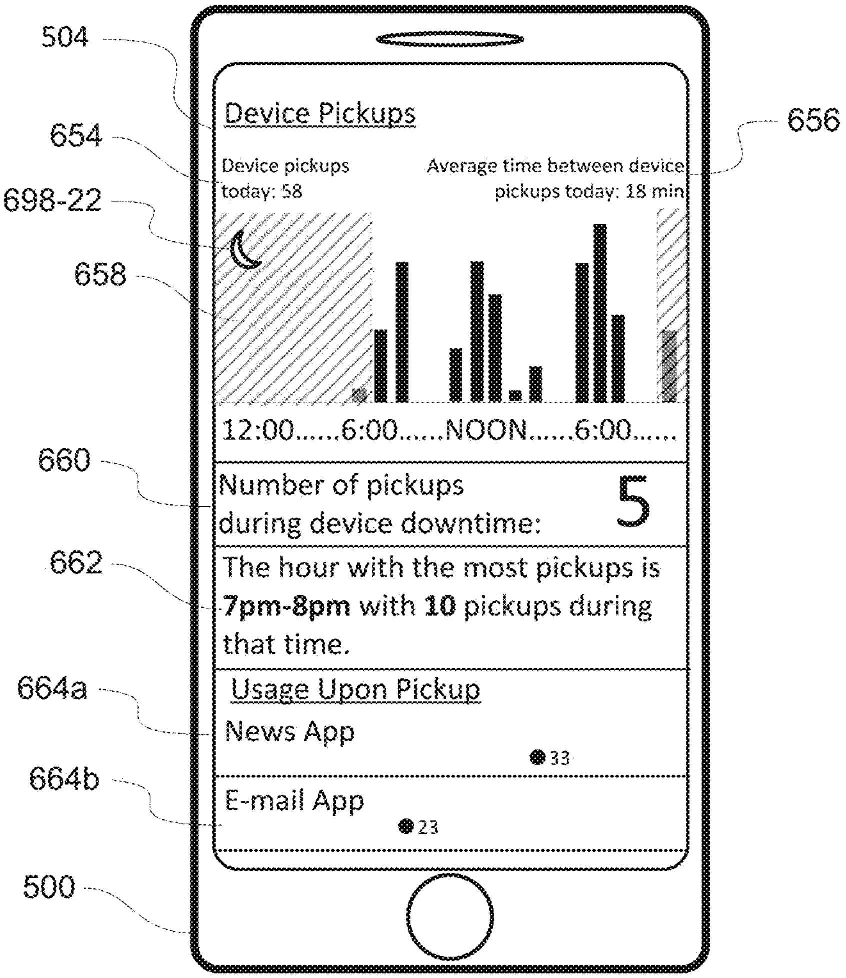

FIGS. 6A-6UU illustrate exemplary ways in which an electronic device presents indications of usage metrics in accordance with some embodiments of the disclosure. The embodiments in these figures are used to illustrate the processes described below, including the processes described with reference to FIGS. 7A-7S.

FIG. 6A illustrates exemplary device 500 with touch screen 504, such as described with reference to FIGS. 5A-5H. Touch screen 504 optionally displays one or more user interfaces that include various content. In the example illustrated in FIG. 6A, touch screen 504 displays a restrictions settings user interface for viewing information about and setting limits for usage of the electronic device 500. In FIG. 6A, the restrictions settings user interface displays an indication 602 of device usage and a number of settings related to device usage, such as settings for a restricted usage mode (e.g., "Device Downtime" 604*a*), settings for usage limits for one or more applications or categories of applications (e.g., "App Limits" 604*b*), settings for which functions are always allowed regardless of any usage restrictions being presently enforced (e.g., "Always Allowed" 604*c*), settings for content and privacy settings of the electronic device 500 (e.g., "Content and Privacy" 604*d*), a setting for requiring a password to make changes to the usage settings (e.g., "Require Password to Make Changes" 604*e*), a setting to stop recording which operations are being performed at the electronic device (e.g., "Stop Recording Usage Data" 604*f*), a setting to delete the stored data related to usage of the electronic device to perform various operations (e.g., "Delete Usage Data" 604*g*), and a setting to sign in to a cloud-based user account (e.g., "Sign in to iCloud" 604*h*). As shown in the figures, the indication 602 of device usage includes visual indications of the amount of time the electronic device has been used to access each of several applications or application categories (e.g., News App, Games Category, and Mail App). The indication 602 further includes an indication of how much of an overall "screen-time" usage limit remains (e.g., "3 hours left"). Usage limits, including the overall usage limit, are described in more detail below with reference to FIGS. 8A-9K. The electronic device 500 also displays an indication of total device usage (e.g., "4 hours of use") and a comparison of device usage for the day to average daily usage (e.g., "30 min below average").

FIG. 6B illustrates the restrictions settings user interface when the electronic device 500 is signed in to a cloud-based user account. The restrictions settings user interface includes an indication 606 of the nickname of the electronic device 500 associated with the user account and indications of devices associated with other users who are part of a group or family cloud-based account (e.g., John Jr.'s iPhone 608*a* and Jane's iPhone 608*b*). The family cloud-based account includes multiple individual user accounts that are associated with other electronic devices (e.g., "John Jr.'s iPhone" and "Jane's iPhone"). In some embodiments, the family cloud-based account includes "parent" users and "child" users and enables the parent users to view and/or control various statistics and/or settings associated with the child devices. As illustrated here and as described in more detail below with referenced to FIGS. 6V-W, a parent device (e.g., such as the electronic device 500) is able to present usage information about one or more child devices. Parent devices are further able to control usage limits and device downtime settings of child devices, as described below with reference to FIGS. 8A-11I. In FIGS. 6C-6D the user scrolls (e.g., with contact 603) the restrictions settings user interface to reveal indications of a plurality of other electronic devices (e.g., John's iPad 610*a*, Apple TV 610*b*, and John's Apple Watch 610*c*) associated with the cloud-based user account, the "Stop Recording Usage Data" setting 604*f*, and the "Delete Usage Data" setting 604*g*. The other devices listed in the "My Devices" list are associated with the same user account that is associated with electronic device 500. As will be described below with reference to FIGS. 6TT-6UU, the electronic device 500 is able to display usage metrics associated with one or more of the associated devices separately or together.

FIG. 6E illustrates a widgets user interface including a usage widget 612*a*, a calendar widget 612*b*, and a weather widget 612*c*. The usage widget 612*a* includes an indication 602 of device usage, including indications of usage of various applications and categories (e.g., the News App, the Mail App, and the Games Category) and an affordance 614 selectable to display more usage information.

FIG. 6F illustrates the user selecting (e.g., with contact 603) the affordance 614. In response to selecting the affordance 614, the usage widget 612*a* expands to show additional information as illustrated in FIG. 6G. The expanded usage widget 612*a* includes an indication of total device usage for the day 616, an indication of how much the device usage for the day deviates from average device usage 618 for a day, a graph 620 indicating device usage by application or application category over time, and indications of usage limits set on the electronic device (e.g., a News App limit 622*a* and a Games Category limit 622*b*). Graph 620 includes a bar for each hour within the day indicating device usage within that hour with color-coded sections indicating which application (e.g., News App or Mail App) or application category (e.g., Games Category) was used in each hour. As illustrated in FIG. 6G, the indication of a usage limit that has been exceeded (e.g., the News App usage limit 622*a*) includes an indication of how much that application (e.g., the News application) has been used in excess of the usage limit. Likewise, the indication of a usage limit that has not been reached (e.g., the Games Category 622*b*) includes an indication of a difference in usage for that application category (e.g., the Games category) and the usage limit. FIGS. 6H-6I illustrate the user scrolling (e.g., with contact 603) the expanded usage widget to reveal additional information, including representations 624*a*-624*e* of application usage for the day, an indication 626 of an average number of notifications received each day for the past several days, and an indication 628 of how frequently the user initiated a device "pickup" over the past day or past several days. As shown in the figure, the indications of application usage 624*a*-624*e* are application icons for those applications presented at different sizes indicative of the relative amounts of usage of the respective applications. For example, the news application indication 624*a* is the largest, indicating that this application has been used the most. Likewise, the Mail application indication 624*b* and the Game A application indication 624*c* are smaller than the News application indication 624*a* in accordance with the amount of usage of these applications.

FIG. 6J illustrates a usage notification 630 generated by device 500 in accordance with some examples of the disclosure. In some embodiments, usage notifications, such as notification 630 are generated by the electronic device 500 in regularly scheduled intervals (e.g., once per day, once per week, etc.). The usage notification includes an indication 602 of device usage, an option (e.g., "View" 632*a*) to view more information about device usage (e.g., in a dashboard user interface) and an option (e.g., "Dismiss" 632*b*) to dismiss the notification without viewing more information about device usage. In FIG. 6K, the user selects (e.g., with contact 603) "View" 632*a* to view more information about the device usage. In response, the electronic device 500 presents a usage dashboard user interface, as illustrated in FIG. 6L.

The usage dashboard user interface includes a graph 620 indicating device usage by application or application category over time as described above with reference to FIG. 6G, an indication 634 of the longest usage session on the device during the current day, an indication 636 of the amount of device usage during a restricted usage mode (e.g., "device downtime") during the current day, and indications 622*a* and 622*b* of usage of applications and categories for which usage limits are set. The usage dashboard user interface further includes a toggle for viewing indications of usage metrics with respect to a day 638*a* or a week 638*b*. As shown in FIG. 6L, the usage dashboard user interface presently displays usage metrics for the current day. The indications 622*a* and 622*b* of usage of applications having usage limits are optionally visually associated with affordances 640*a* and 640*b* selectable to display a settings user interface for viewing information about the respective application or category and updating usage limit settings for that application or category. For example, affordance 640*a* is selectable to edit usage limit settings for the News application. As illustrated in FIG. 6L, when a usage limit has been exceeded (e.g., the News App usage limit 622*a*), the respective affordance 640*a* has a different color or pattern indicating that the usage limit has been exceeded. Likewise, in some embodiments, when a usage limit is close to being reached (e.g., is within a threshold amount or percent of time), the associated affordance has the visual characteristic. Additionally, the bar graphs indicating the usage limit include differently colored portions corresponding to the amount of time the electronic device was used to access the given application or category within the usage limit (e.g., as shown in both the News App indication 622*a* and the Games Category indication 622*b*), the amount of time the given application or category was used beyond the usage limit (e.g., as shown in the News App indication 622*a*), and the amount of time remaining in the usage limit for the application or category (e.g., as shown in the Games Category 622*b* indication).

FIGS. 6M-6N illustrate the user scrolling (e.g., with contact 603) the usage dashboard user interface to reveal additional usage metric indications, as shown in FIG. 6O. As shown in the figures, the usage dashboard user interface includes an indication 642 of an amount of usage of an application (e.g., Mail) for which a usage limit has not been set and an affordance 640*c* selectable to display a settings user interface for viewing information about the respective application and updating usage limit settings for that application.

FIGS. 6P-6Q illustrate the user scrolling (e.g., with contact 603) the usage dashboard user interface to reveal additional usage metric indications, as shown in FIG. 6R. FIG. 6R illustrates the usage dashboard user interface including a graph 644 of notifications received throughout the day, an indication 646 of the number of notifications received during the day, an indication 648 of the hour during which the most notifications were received and indications 650*a*-650*d* of how many notifications were generated by a variety of applications installed on the electronic device (e.g., all applications that generated notifications today, or the top set number of notification-generating applications today). The graph 644 includes a plurality of bars indicative of how many notifications the electronic device presented during each hour of the current day. The user interface further includes multiple affordances 652*a*-652*d* visually associated with the indications 650*a*-650*d*, the affordances selectable to display notifications settings for a respective application for which an indication of notifications is displayed. For example, affordance 652*a* is selectable to edit notification settings for the iMessage app. The indications 650*a*-650*d* of notifications include a name of the application (e.g., "iMessage App", "E-mail App", "News App", and "Water Tracker App"), a number of how many notifications were generated by the respective application throughout the day, and a dot positioned to indicate the relative number of notifications generated by the application relative to the other applications.

FIGS. 6S-6T illustrate the user scrolling (e.g., with contact 603) the usage dashboard user interface to reveal additional usage metric indications, as shown in FIG. 6U.

FIG. 6U illustrates the usage dashboard user interface including an indication 654 of device "pickups" (as will be described in more detail below) for the day, an indication 656 of the average time between device pickups for the day, a graph 658 of device pickups throughout the day, an indication of the number of device pickups during device downtime 660 (device downtime is described in more detail below with reference to FIGS. 10A-11I), an indication 662 of the hour within the day having the most device pickups and the number of pickups in that time interval, and indications 664*a* and 664*b* of the number of times the user picked up the electronic device to interact with each of a plurality of applications.

Average time between device pickups for the day indicated by indication 656 is calculated as an average time between the first pickup of the day and the last pickup of the day. In some embodiments, this average includes pickups between the first pickup outside of device downtime and last pickup outside of device downtime. In some embodiments the average includes pickups between all pickups for the day, regardless of whether one or more of those pickups occurred during device downtime.

The graph 658 of device pickups throughout the day includes a bar for each hour of the day indicating the number of device pickups within each hour. As shown in FIG. 6U, the graph visually distinguishes pickups that occur during device downtime from pickups that occur outside of device downtime, and further indicates this distinction with device downtime glyph 698-22.

The applications that the user picked up the electronic device to interact with 664*a*-*b* are determined based on the first application the user interacts with upon picking up the device. For example, if the user wakes up the device, immediately closes a first application presented at the electronic device upon waking and subsequently opens a second application to perform an operation with the second application, then the second application is the application the user picked up the electronic device to interact with. As another example, if the device presents a notification associated with the first device while in a sleep mode and the user provides an input to view the notification and interact with the first application, then the first application is the application the user picked up the electronic device to interact with.

As used herein, a device "pickup" encompasses a number of kinds of user attention events, such as the user unlocking the electronic device, waking up the device, and other actions that initiate operation of the electronic device. In some embodiments, a user attention event is detected when a user input causes the electronic device to exit an idle state (e.g., a sleep mode, a locked state, a low power mode, etc. during which the user does not interact with the electronic device and/or the display of the electronic device is off). In some embodiments, the electronic device enters an idle state in response to a predetermined amount of time passing since the last user input was received at the electronic device. Optionally, the electronic device enters the idle state in response to a user input corresponding to a request to enter the idle state (e.g., pressing a power or lock button of the electronic device). In some embodiments, the display does not display an image during the idle state. In some embodiments, a lock screen is displayed on the electronic device during the idle state. The user input corresponding to the user attention event is optionally one or more of a button of the electronic device being pressed, a user action (e.g., raising the device) for terminating the idle state, an unlocking input (e.g., entering a passcode or providing biometrics), and a touch input for accessing a function (e.g., a widgets user interface, a camera application, a dashboard user interface, displaying a user interface of an application associated with a displayed indication of a notification) of the electronic device. Detecting the biometrics optionally includes detecting, with a depth camera or another sensor, the user's face. In some embodiments, the electronic device is able to determine when the user looks at their electronic device using the depth camera and facial recognition techniques and unlock in response to the user looking at the electronic device (e.g., the electronic device unlocks in response to a determination that the user is paying attention to the electronic device). In some embodiments, the electronic device exits the idle state in response to a notification (e.g., the display turns on to display the notification without a user input requesting the display to turn on) and the attention event causes the device to perform some other action (e.g., unlocking the device, updating the display to display a user interface of an application or the operating system). That is to say, the indication of the notification is optionally not a user attention event even though it causes the device to exit the idle state. In some embodiments, the attention event metrics are indicative of the number of times the user initiates the use of the electronic device (e.g., "checks" his or her phone).

Figure 6V:
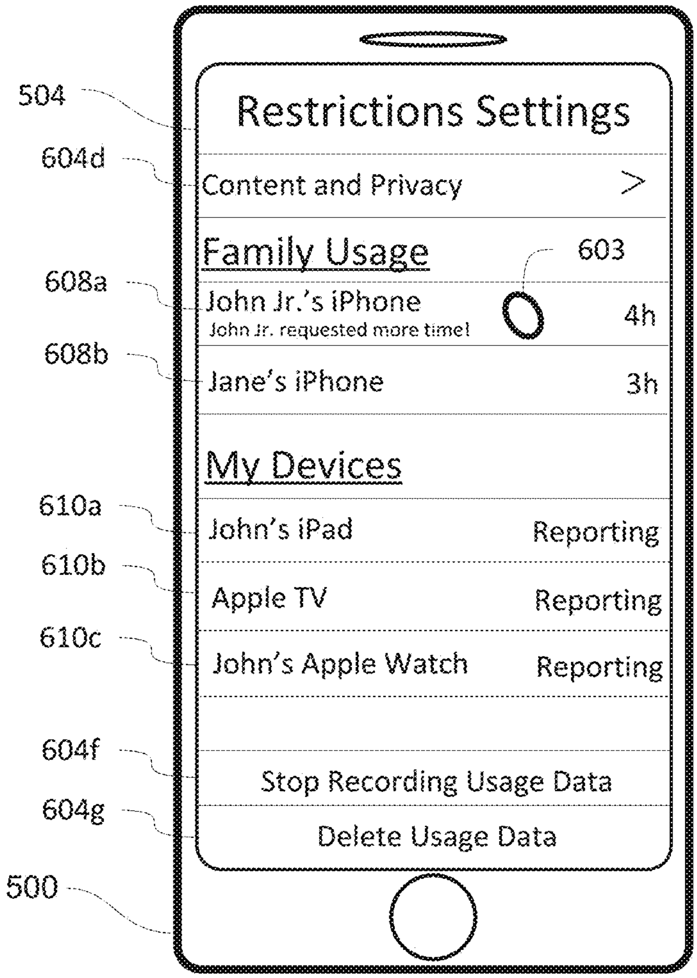

FIG. 6V illustrates the restrictions settings user interface. As shown in the figure, the restrictions settings user interface includes an indication 608*a* of an electronic device ("John Jr.'s iPhone") associated with a user that is part of a family account with which the electronic device 500 is associated. The indication further includes an indication that John Jr.'s iPhone requested more time be added to at least one usage limit controlled by the electronic device 500. In FIG. 6V, the user selects (e.g., with contact 603) the indication 608*a*.

Figure 6W:
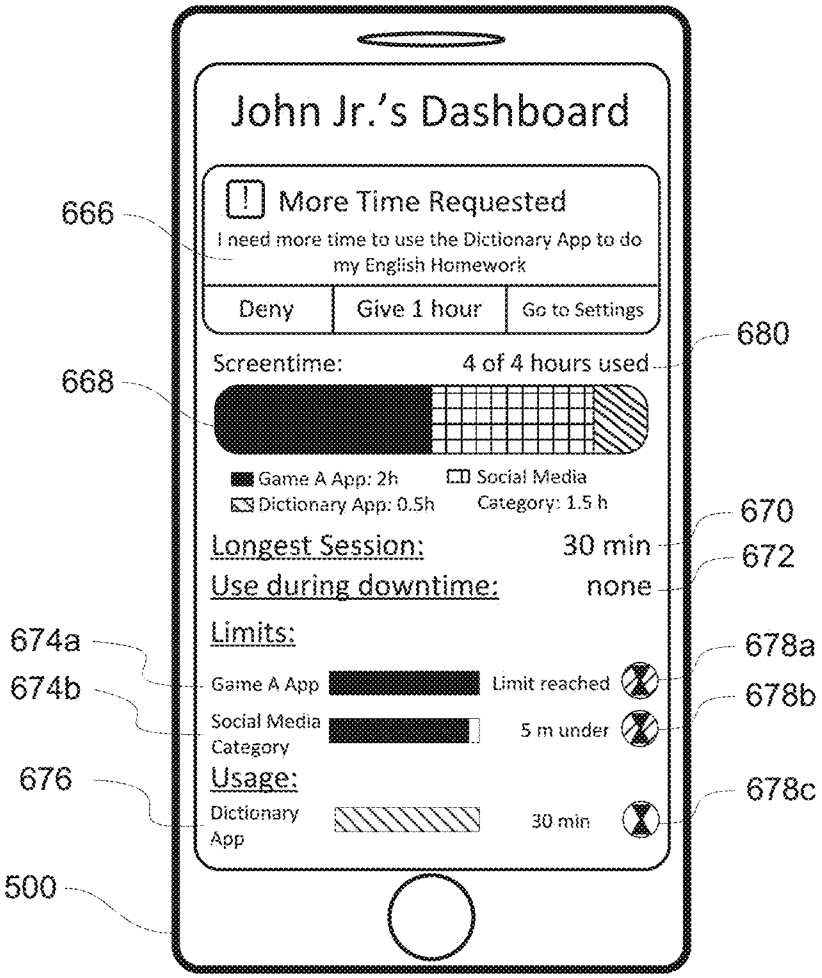

In response to the user's selection, the electronic device displays a usage dashboard user interface associated with John Jr.'s iPhone, as shown in FIG. 6W. The user interface includes an indication 666 of a request to remove an overall usage limit enforced on John Jr.'s iPhone, an indication 666 of device usage, an indication 680 of an overall screen time usage limit for John Jr.'s iPhone, an indication 670 of the duration of the longest usage session of John Jr.'s iPhone, an indication 672 of the amount of use during device downtime on John Jr.'s iPhone, indications 674*a-b* of usage of applications for which usage limits are in place on John Jr.'s iPhone, and an indication 676 of usage of an application for which no usage limit is in place of John Jr.'s iPhone, similar to as described previously in FIGS. 6L-6N.

Indication 666 is presented in response to the electronic device 500 receiving, from the other electronic device (e.g., John Jr.'s iPhone) a request to increase the amount of time of a usage limit enforced on the other electronic device. As discussed above with reference to FIG. 6B, the electronic device 500 and John Jr.'s iPhone are optionally associated with a family account that enables the electronic device 500 to manage usage settings of John Jr.'s iPhone. Indication 666 includes selectable affordances to "deny" the request, "give 1 hour" of additional time, or "go to settings" to view more options for modifying the restrictions in place on John Jr.'s iPhone. Requests from child devices to parent devices to add more time to a usage limit, and more details about usage limits in general, are described below with reference to FIGS. 9A-10AAA.

The usage dashboard user interface further includes a plurality of affordances 678*a-c* selectable to view information about the associated application or category of applications and/or to change a usage limit associated with the application or category of applications. As shown in the user interface, the affordance 678*a* associated with Game A App is shaded to indicate that the usage limit for Game A App has been reached. Likewise, the affordance 678*a* associated with the Social Media Category is shaded to indicate that the usage limit for the Social Media Category is close to being reached. In some embodiments, other visual indications are possible.

Figure 6X:
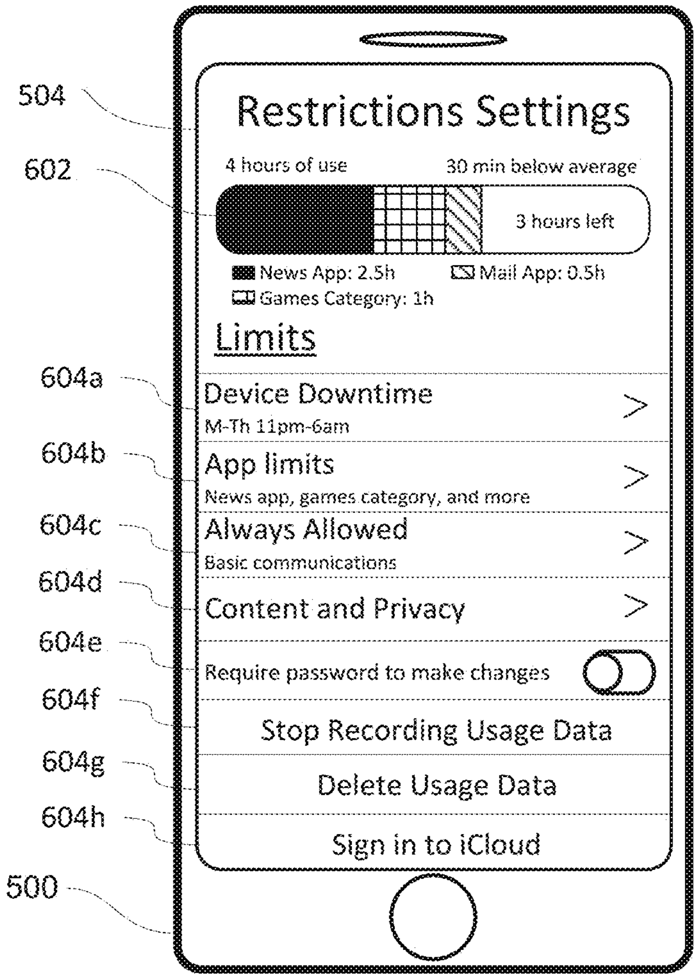
Figure 6Y:
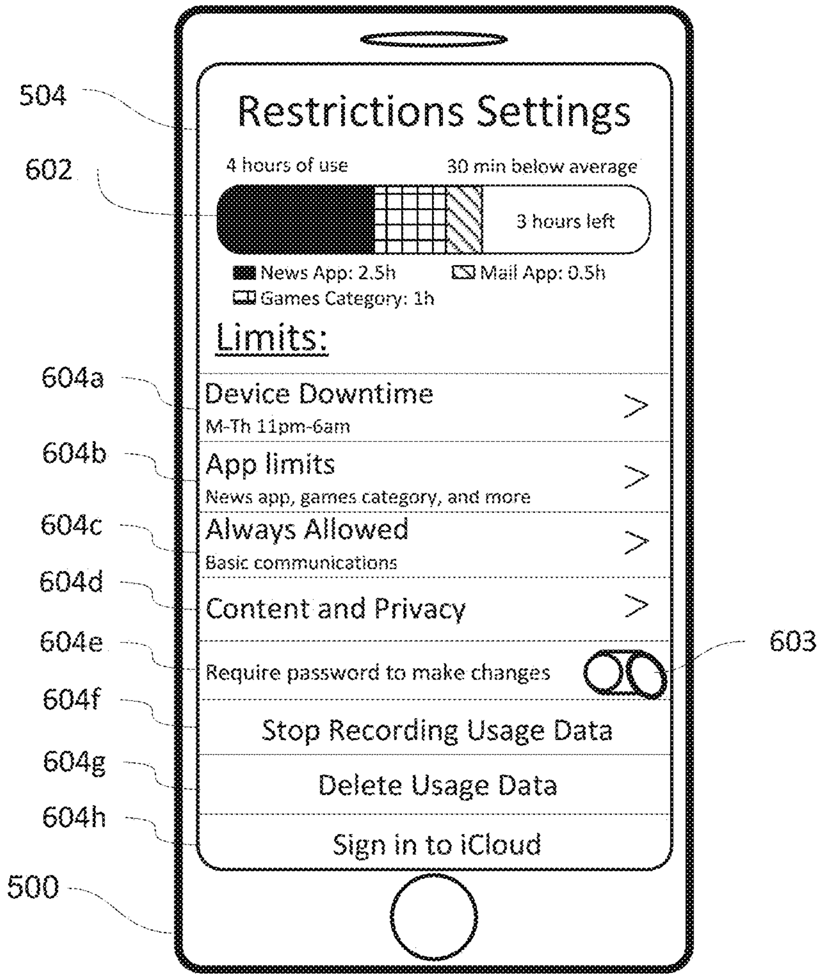
Figure 6Z:
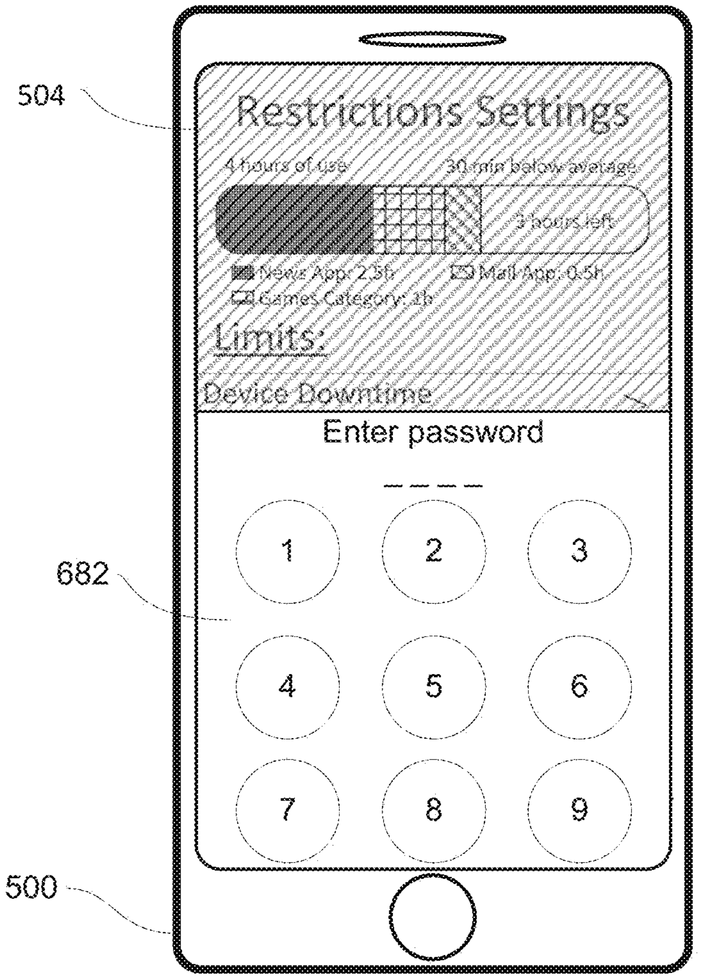
Figure 6A:
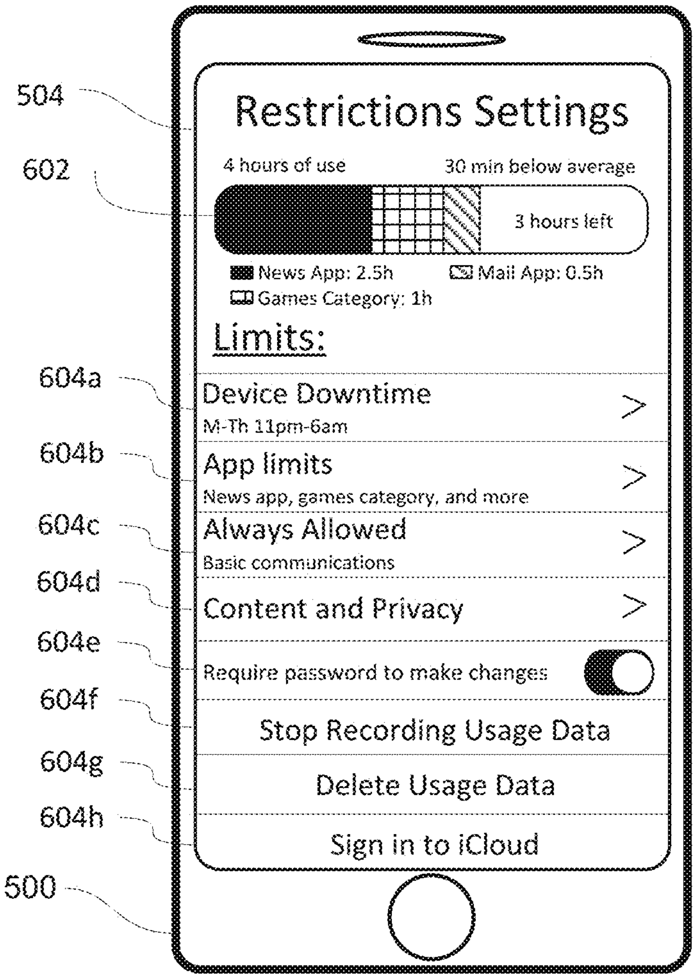
Figure 6B:
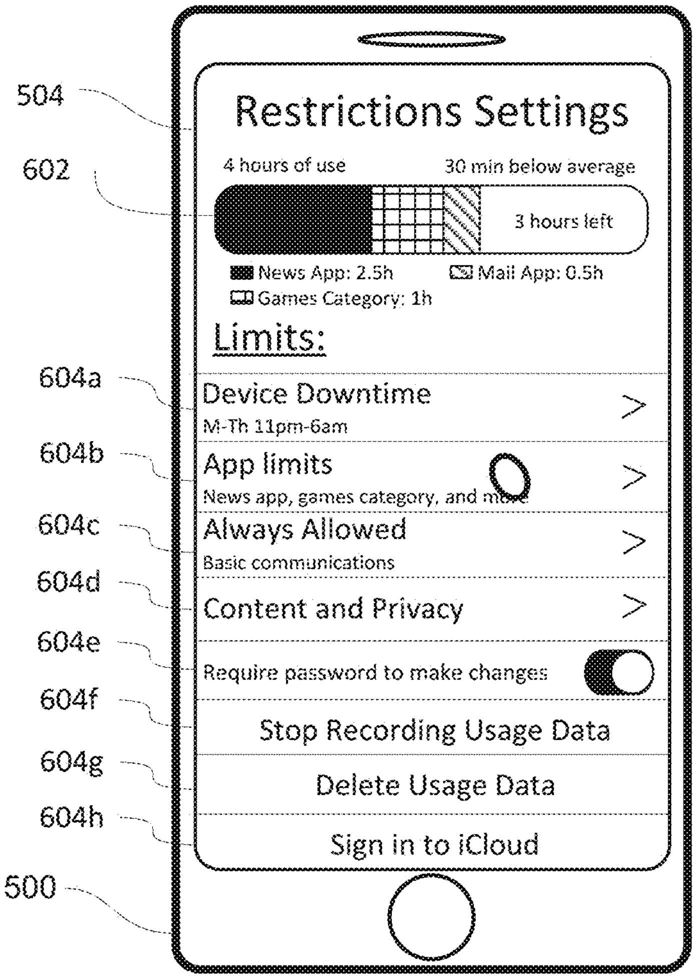
Figure 6C:
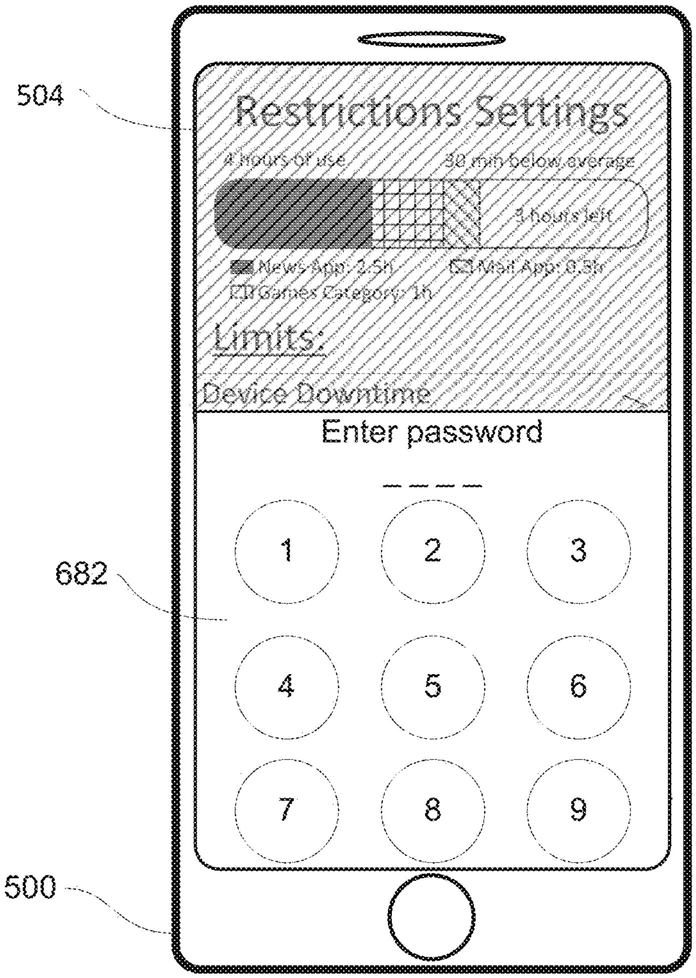
Figure 6D:
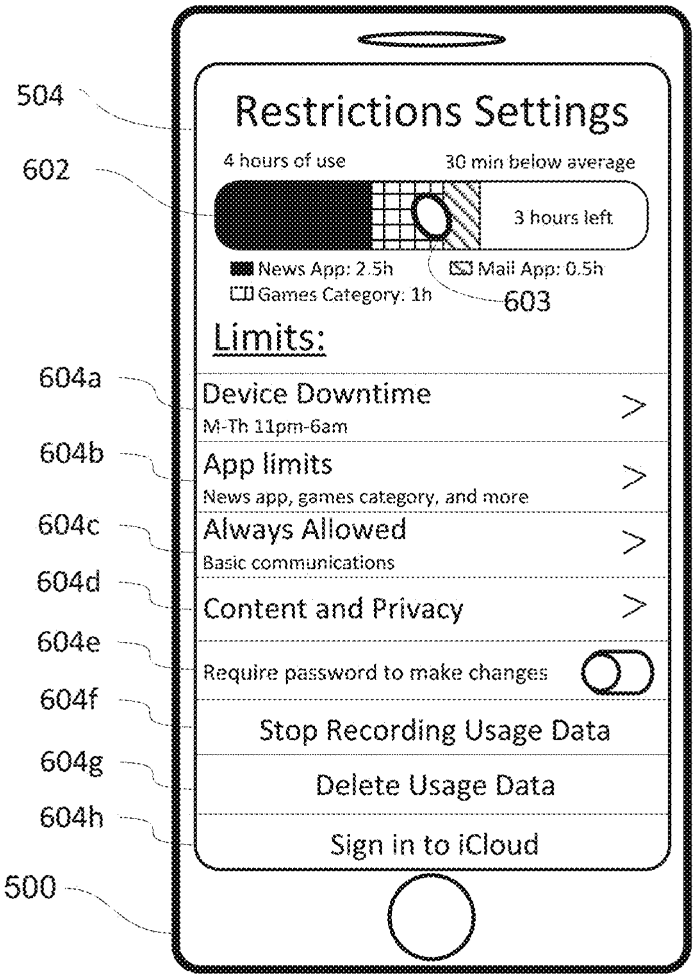
Figure 6E:
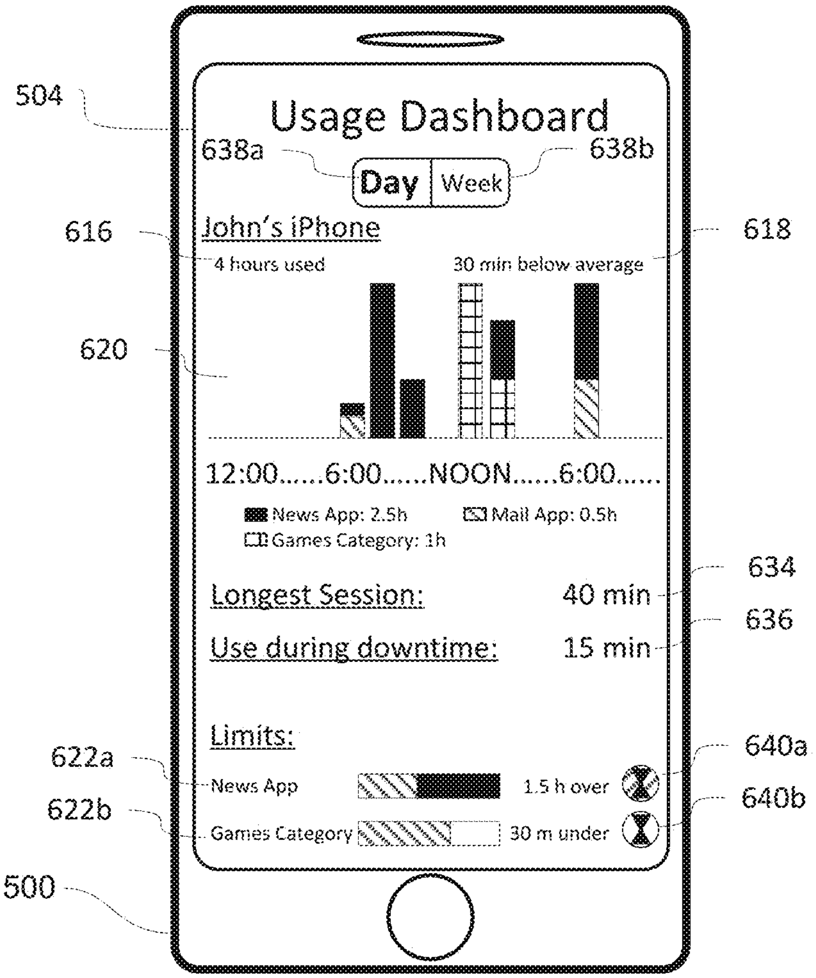
Figure 6F:
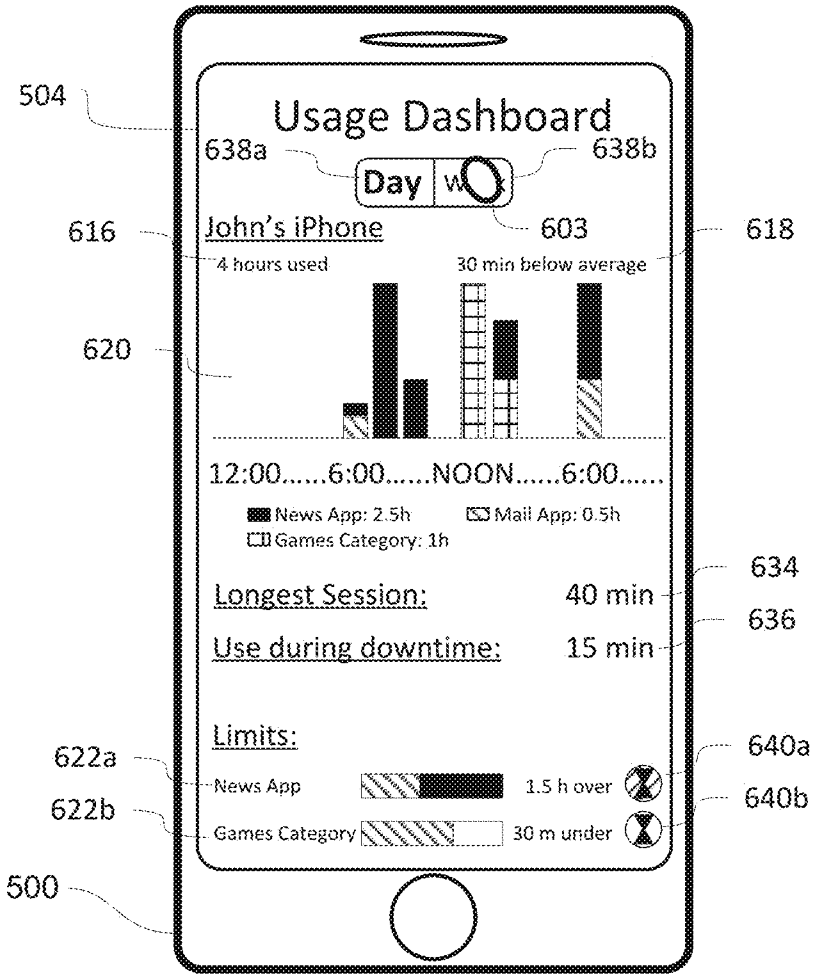
Figure 6G:
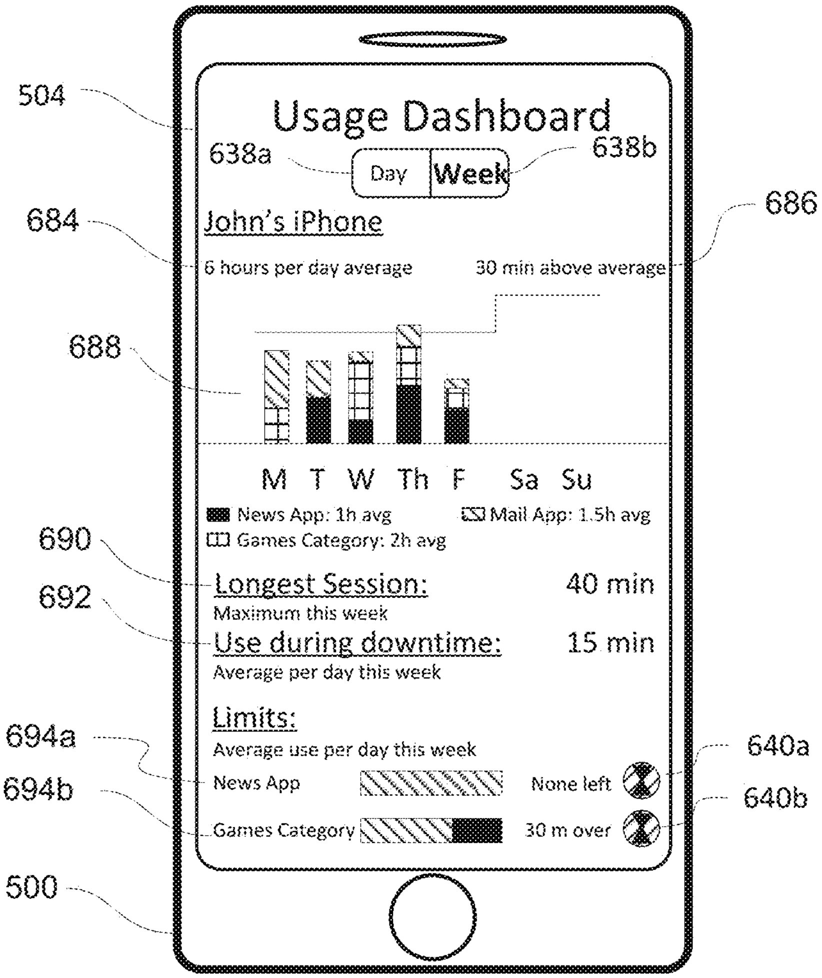
Figure 6H:
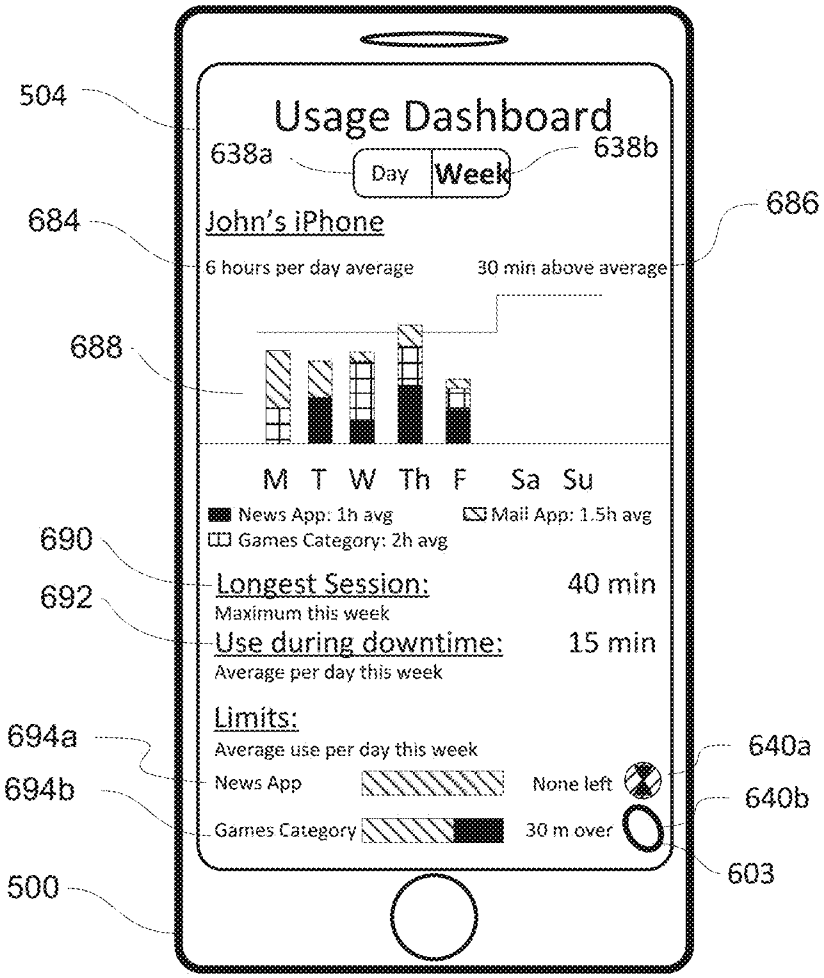
Figure 6I:
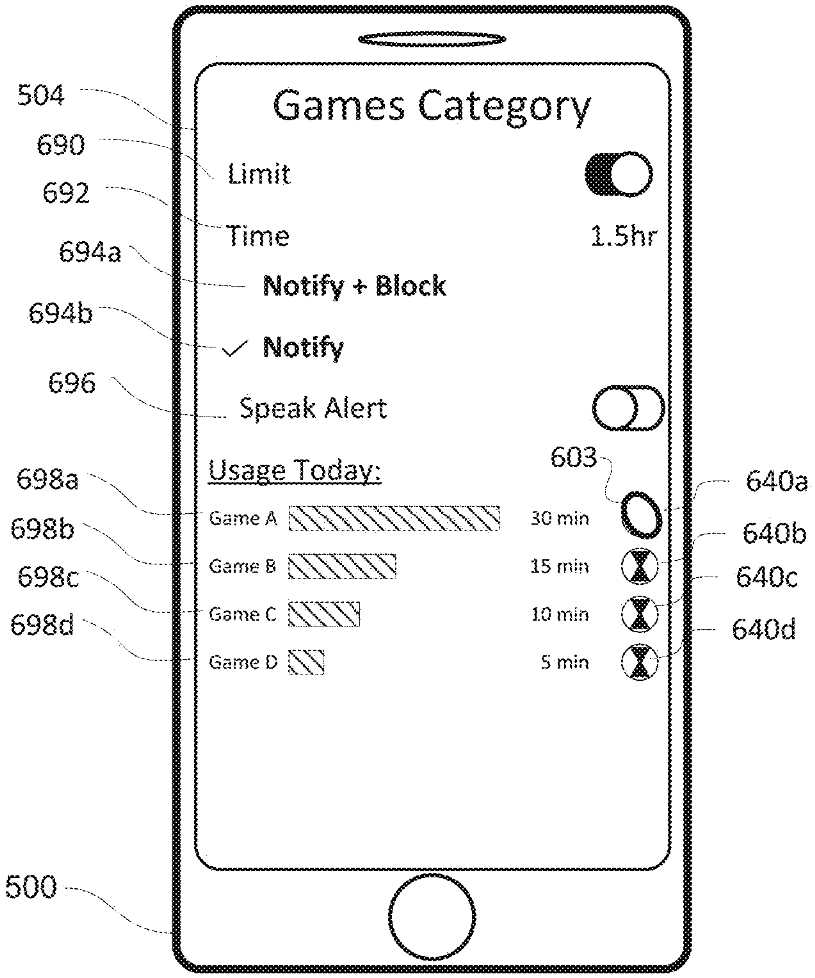
Figure 6J:
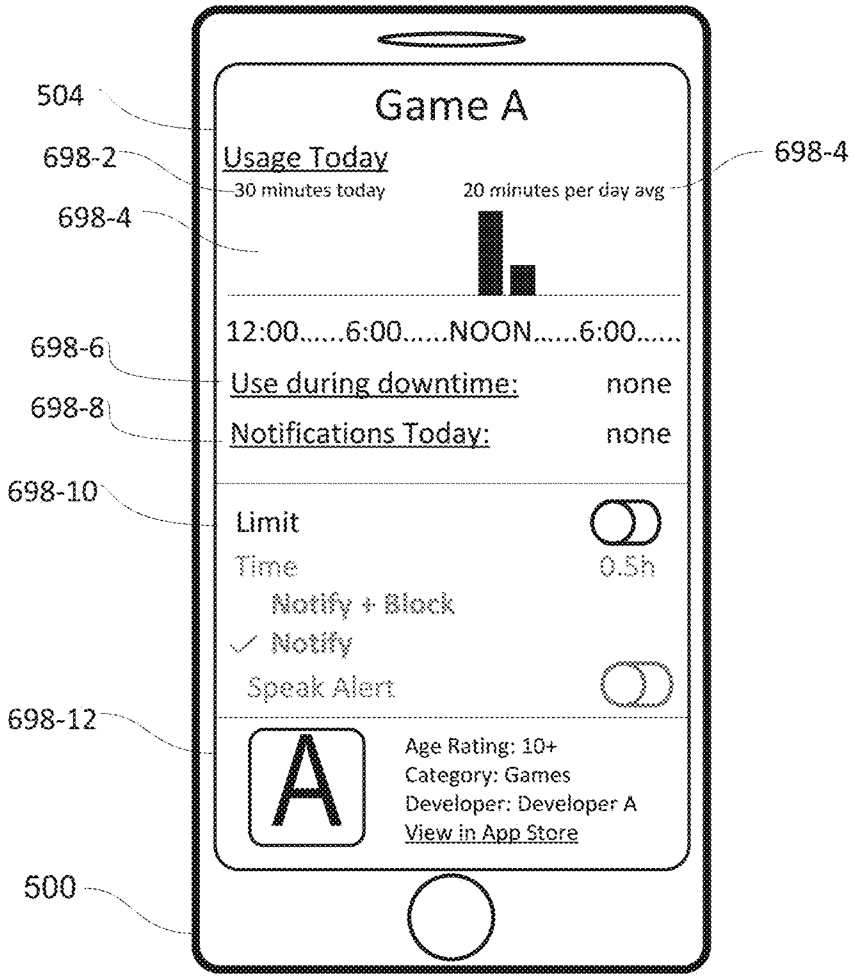
Figure 6K:
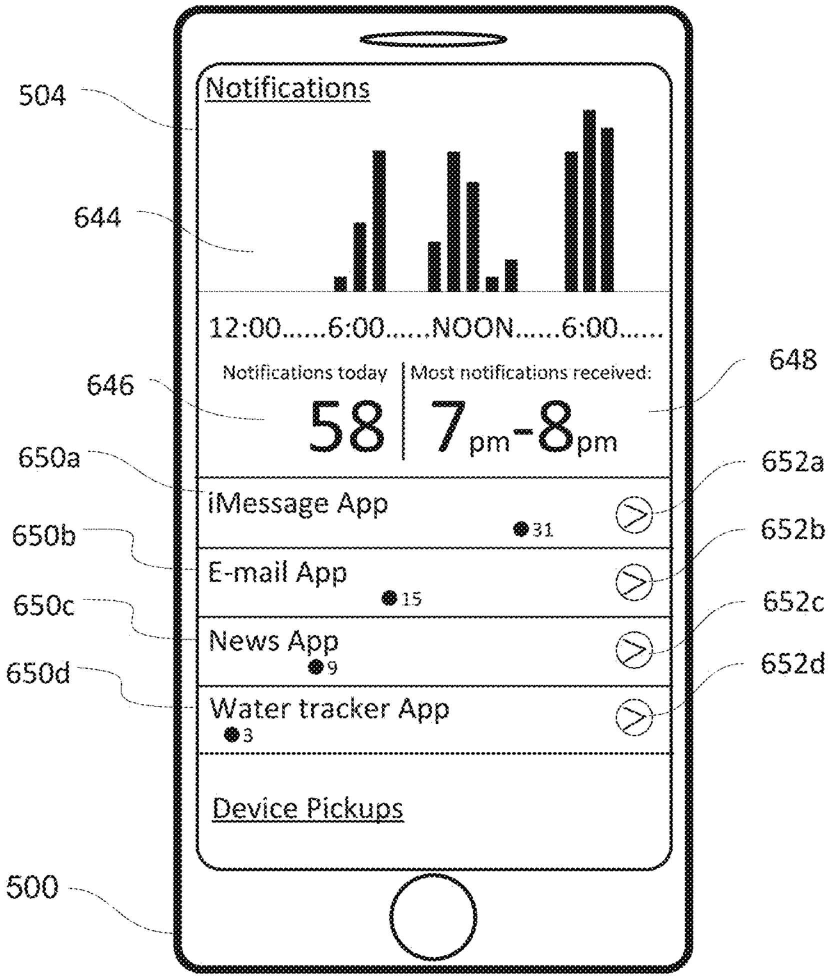
Figure 6L:
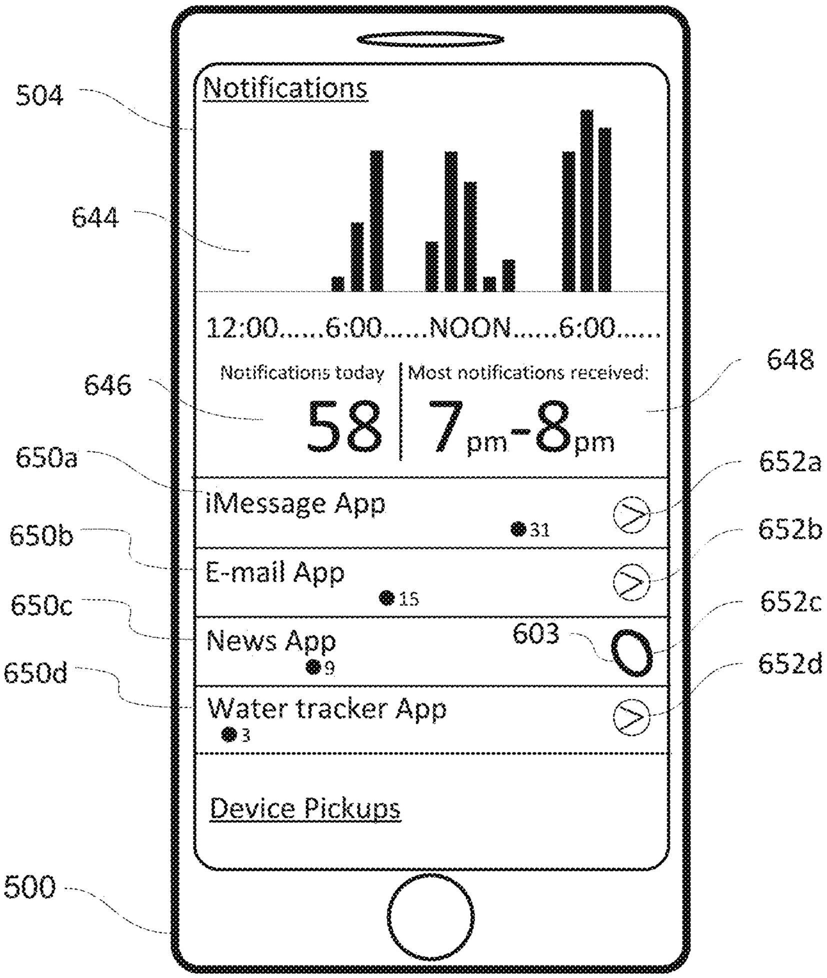
Figure 6M:
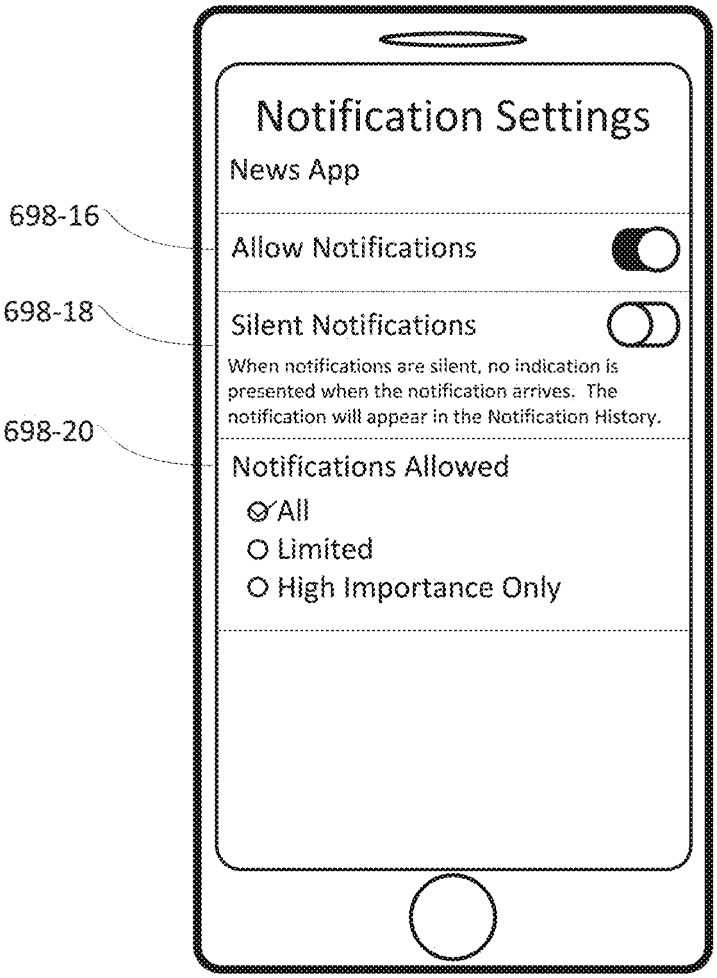
Figure 6N:
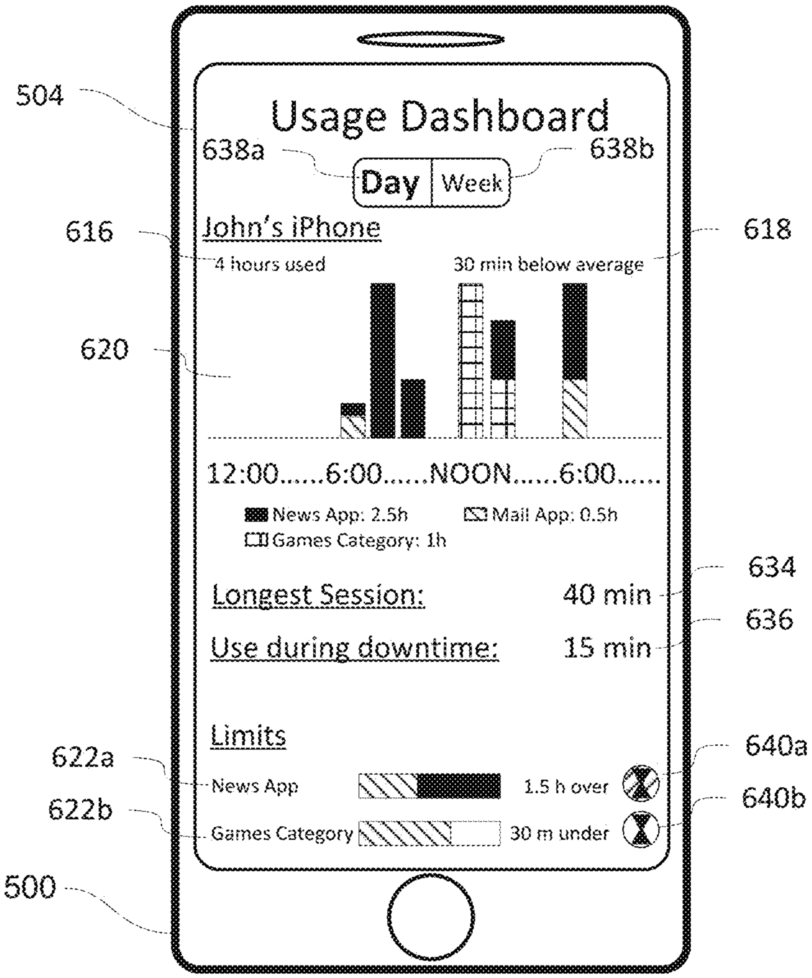
Figure 6O:
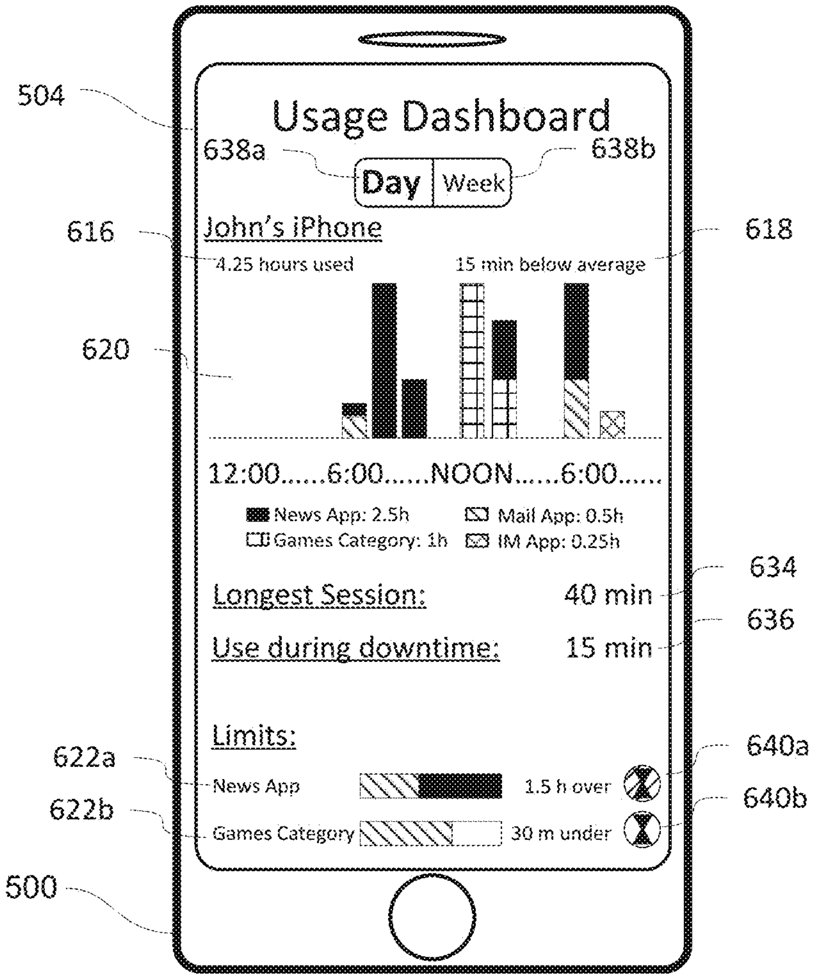
Figure 6P:
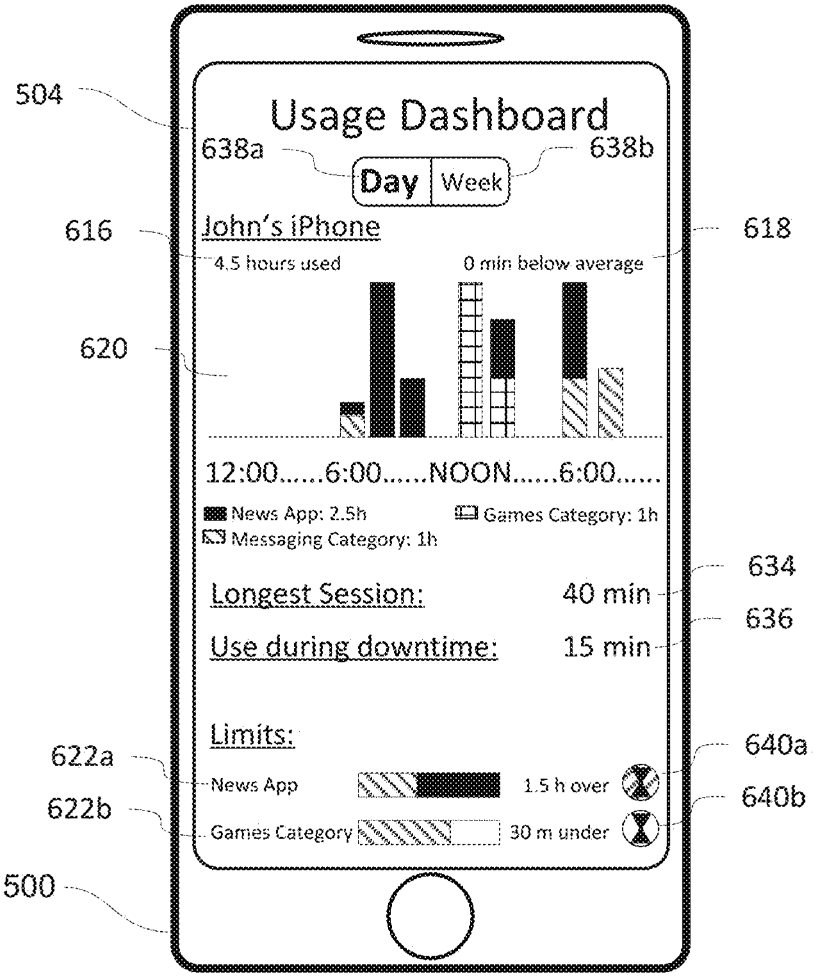
Figure 6Q:
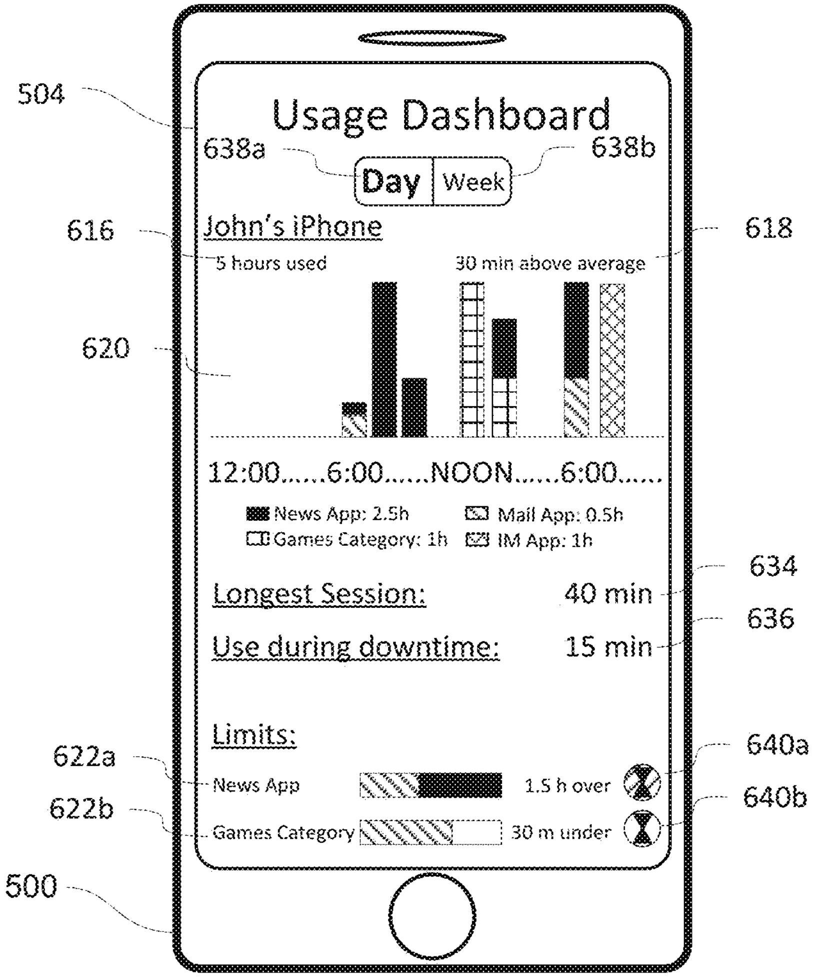
Figure 6R:
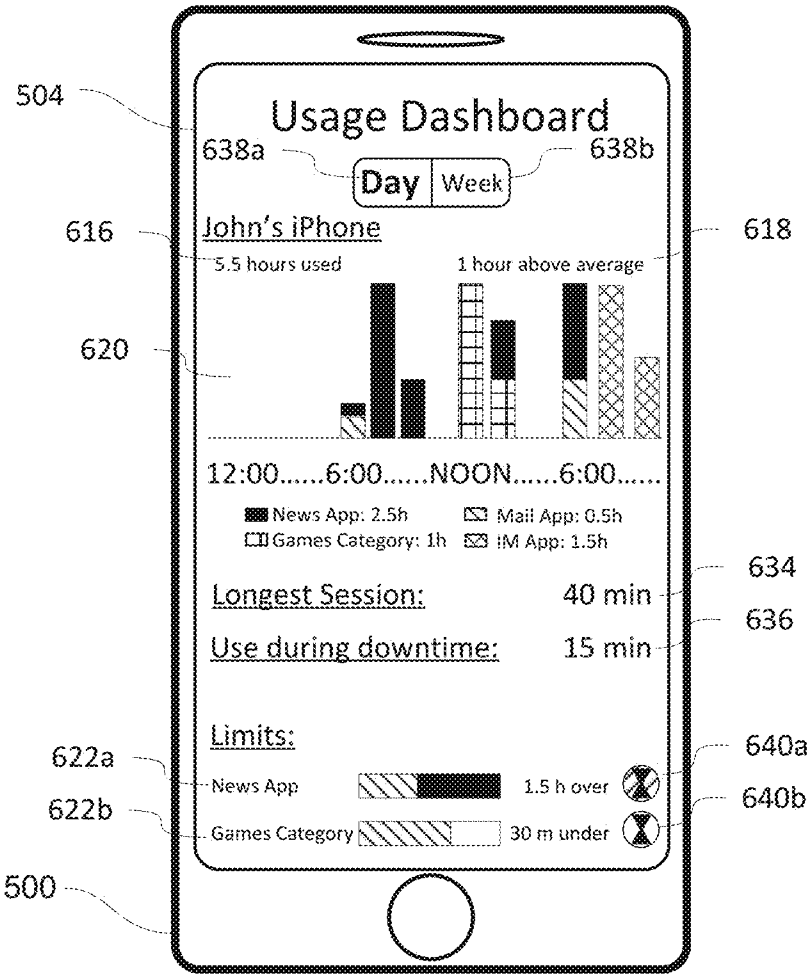
Figure 6S:
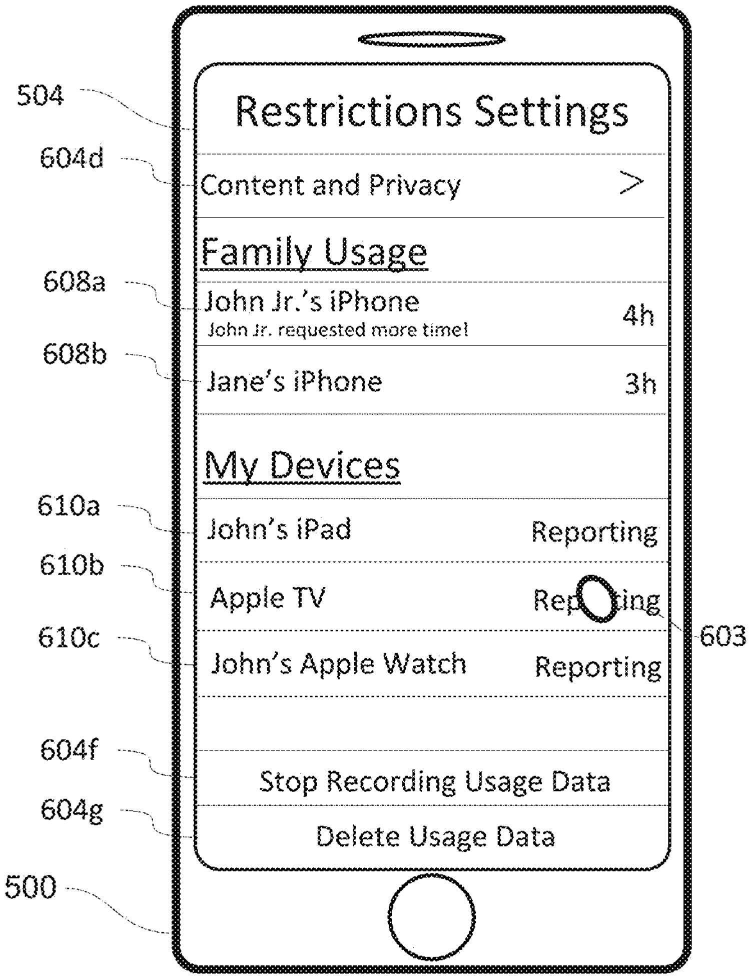
Figure 6T:
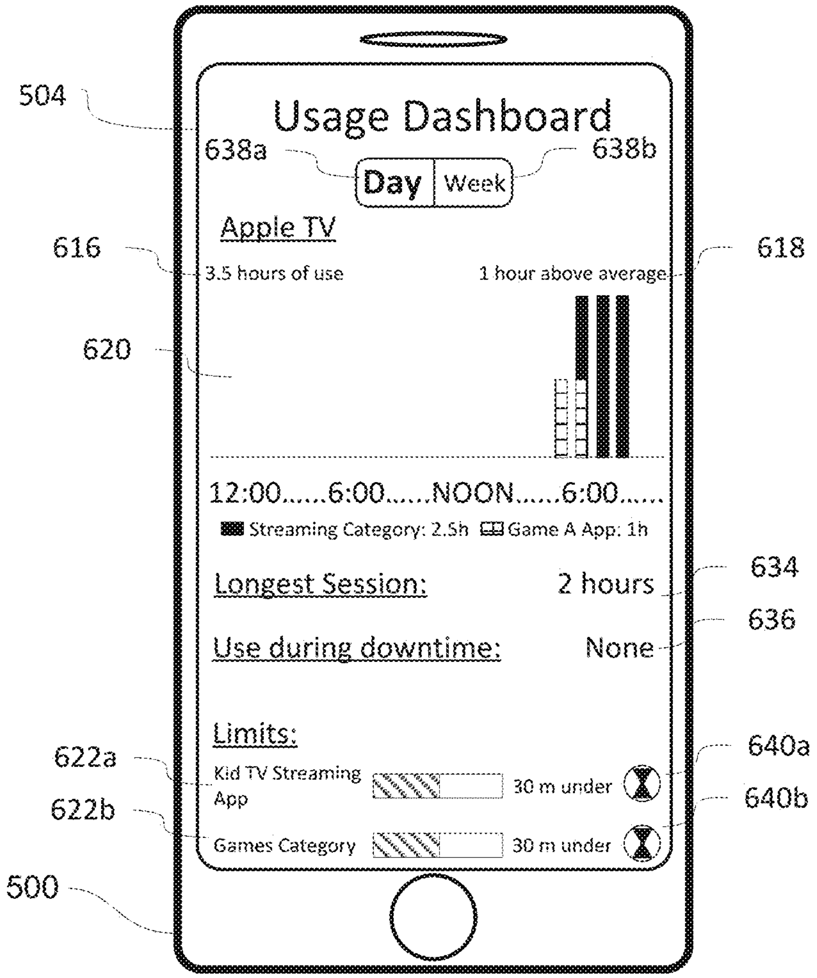
Figure 6U:
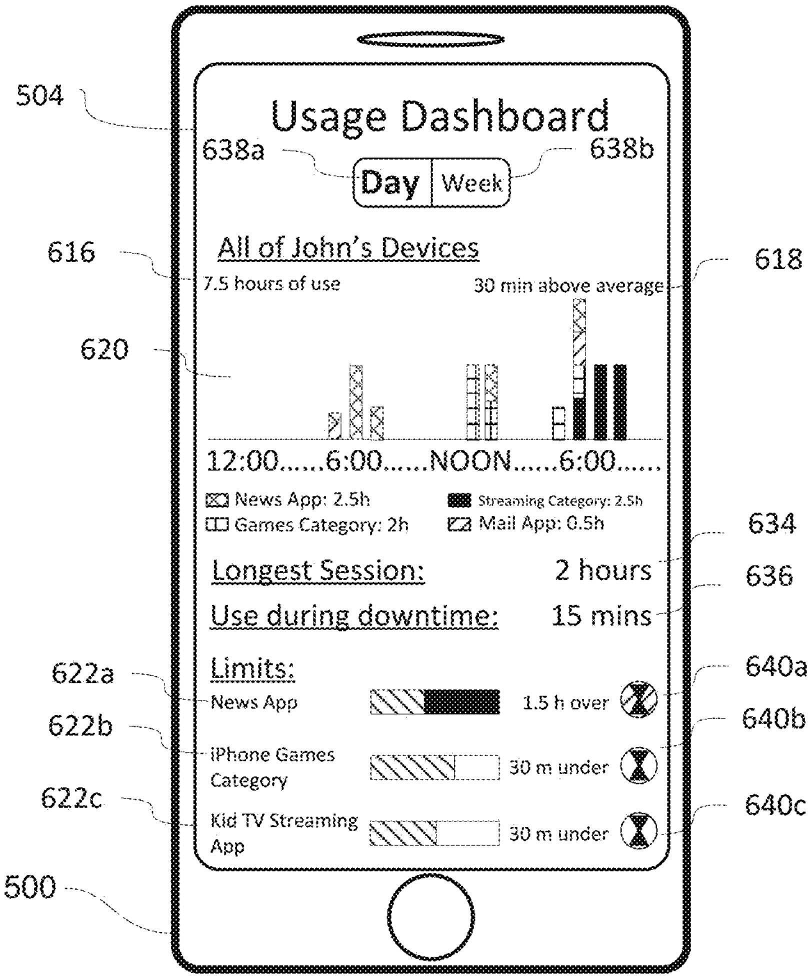

FIG. 6X illustrates the restrictions settings user interface. In FIG. 6Y, the user selects (e.g., with contact 603) a setting 604*e* to require a password (or other authentication such as a passcode or biometrics) to make changes to usage restriction settings on device 500. In response to the selection, the electronic device presents a keypad 682 for accepting a user input to set the password. In some embodiments, the electronic device presents a full keyboard or a user interface allowing the user to select the password or passcode length or the option to use a biometric input (e.g., facial recognition) for authentication to make changes to the usage settings. The authentication required to make changes to one or more usage restriction settings of electronic device 500 is optionally different from the authentication required for unlocking the electronic device 500.

After the user sets the password, the electronic device updates the password toggle 604*e* to indicate that a password is required to make changes to the usage restriction settings, as shown in FIG. 6AA. In FIG. 6BB, the user selects the indication 604*b* to make changes to the usage limits in place on the electronic device 500. In response to the input, the electronic device presents the keypad 682 to require the above-mentioned password (or other authentication method) before allowing the user to change the setting, as shown in FIG. 6CC.

FIG. 6DD illustrates the user selecting (e.g., with contact 603) the indication 602 of device usage. In response to the selection, the electronic device 500 presents the usage dashboard user interface, as shown in FIG. 6EE. As shown in FIG. 6FF, the user then selects (e.g., with contact 603), the toggle 638*b* to view the usage metrics over the course of a week. In response to the input, the electronic device 500 updates the usage dashboard user interface to display indications of the usage metrics over the course of the past week, as illustrated in FIG. 6GG.

FIG. 6GG illustrates the usage dashboard user interface presenting a plurality of usage metrics over the course of the past week. The usage dashboard user interface includes an indication 684 of the average device usage per day over the course of the week, an indication 686 of how the daily usage, on average, of each day during the week compares to average usage over a longer period of time (e.g., the last month or all time), a graph 688 illustrating daily usage of one or more applications or categories of applications, an indication 690 of the duration of the longest usage session during the week, an indication of average daily device use during device downtime 692, and indications 694*a*-694*b* of average usage of one or more applications or categories of applications for each day during the week for which usage limits are set. Graph 688 includes a bar for each day of the week indicating usage of the electronic device 500 for each day for a number of color-coded applications and application categories. As shown in the figure, the graph 688 includes an indication of an overall device usage limit (e.g., the horizontal lines running across graph 688), which is optionally different during the week (e.g., Monday to Friday) and on the weekend (e.g., Saturday and Sunday). For example, the overall device usage limit on Monday through Friday is optionally lower than the overall device usage limit on Saturday and Sunday, as shown in FIG. 6GG.

Although not shown in the figure, it should be understood that the dashboard user interface optionally includes indications of any other metrics described herein over the course of the week, with some metrics displayed in aggregate over the week (e.g., as a total, average, etc.) and others displayed as a maximum or minimum for the week. For example, turning back to FIG. 6R, the number of notifications for a day 646 is optionally replaced with the average number of notifications for each day over the week while the interval with the most notifications received 648 within a given day is replaced with an interval (e.g., a day or an hour within a day) with the most notifications received for the week. As another example, turning back to FIG. 6U, the number of device pickups during downtime 660 for the day is optionally replaced with the average number of device pickups during device downtime per day over the course of the week, while the hour with the most pickups 662 for the day is optionally replaced with a different interval (e.g., a day or an hour within day) during which the most notifications were received during the week.

FIG. 6HH illustrates the user selecting (e.g., with contact 603) the affordance 640*b* associated with the Games Category. In response to the input, the electronic device 500 presents a category settings user interface, as illustrated in FIG. 6II. The category setting user interface includes a toggle 690 to enforce or not enforce the usage limit for the category of applications, an indication 692 of the usage limit for the category of applications, an option 694*a* to enforce the limit with the notify and block setting, an option 694*b* to enforce the limit with the notify setting, a toggle 696 to present spoken alerts associated with the usage limit, and a plurality of indications 698*a-d* of usage of each application included in the category of applications for which the usage limit applies.

Toggle 690 enables the user to cease the enforcement of the category usage limit while saving the parameters of the usage limit, such as the amount of time, the notification style, and the included applications. In this way, the user can turn the toggle back on to begin enforcing the usage limit again without having to enter the parameters of the usage limit again. The notify and block 694*a* setting and notify 694*b* setting, as well as other details of usage limit settings, are described below with reference to FIGS. 8A-9K. The toggle 696 for presenting spoken alerts associated with the usage limit enables the electronic device 500 to speak notifications associated with the usage limit, such as notifications indicating that the usage limit is close to being reached or has been reached.

As shown in FIG. 6II, the user selects (e.g., with contact 603) an affordance 640*a* associated with the Game A application in the Games Category to present additional information and settings for this particular application. In response, the electronic device 500 presents a user interface with information about usage of Game A and settings for setting a usage limit for Game A, as shown in FIG. 6JJ.

FIG. 6JJ illustrates an indication 698-2 of an amount of usage of Game A, an indication 698-4 of average usage of Game A, an indication 698-6 of usage of Game A during device downtime for the day, an indication 698-8 of a number of notifications generated by Game A during the day, settings 689-10 for updating a usage limit for Game A, information 698-12 about Game A, and a graph 698-14 of usage of Game A over time for the current day (e.g., shown as multiple bars each representing usage of Game A in each hour of the current day). As shown in the figure, the user is able to create a usage limit for Game A, including setting an amount of time of the usage limit and how the electronic device 500 will behave when the limit is reached (e.g., "notify and block" or "notify"). Usage limits are described with more detail with reference to FIGS. 8A-9K. The user interface further includes a summary 698-12 of information about Game A, such as its application icon, age rating, category, developer, and a link to view Game A in an app store on the electronic device. Although the user interface illustrated in FIG. 6JJ is accessible from the category settings user interface illustrated in FIGS. 6HH-6II, similar user interfaces for individual applications are accessible from the usage metric dashboard user interface (e.g., as illustrated in FIGS. 6L-6O, 6W, and 6EE-6HH) when the user selects a settings affordance associated with an individual application (e.g., 640*a* associated with the News App, 678*c* associated with the Dictionary App, etc.).

FIG. 6KK illustrates the usage dashboard user interface presenting usage metrics pertaining to notifications, such as described with reference to FIG. 6R. In FIG. 6LL, the user selects (e.g., with contact 603) an affordance 652*c* associated with the News App notification settings. In response, the electronic device 500 presents a notification settings user interface for the News App as illustrated in FIG. 6MM. The notification settings user interface includes a toggle 698-16 for allowing notifications from the News app, a toggle 698-18 for presenting notifications for the News app in a silent mode, and options 698-20 for changing which kinds of notifications the News app presents indications of. Toggling the "allow notifications" toggle 698-16 to off causes the application not to present notifications anywhere on the electronic device 500, as opposed to presenting one or more indications (e.g., a visual indication such as text or an image, an audio indication such as a sound or spoken words, and/or haptics or other tactile feedback, etc.) of the notification when the notification is received at the electronic device when notifications are "on". Toggling the "Silent Notification" toggle 698-18 on causes the electronic device 500 to forgo presenting indications of notifications as the notifications are received (e.g., as the electronic device does when notifications are allowed), but, unlike the device's behavior when notifications are not allowed, presents indications of the notifications in a Notifications History user interface including indications of a plurality of notifications received at the electronic device, as illustrated below with reference to FIG. 12I Changing the "Notifications Allowed" setting 698-20 causes the electronic device 500 to present all notifications received at the application, a limited number of notifications, or only highly important notifications.

FIG. 6NN illustrates the usage dashboard user interface described previously. FIG. 600 illustrates the usage dashboard user interface after the user uses an instant messaging application for 15 minutes. In response to the application usage, the electronic device 500 updates the user interface to show the use of the instant messaging application in the graph 620 of device usage by application or application category over time. The indication 616 of total device usage and indication 618 of the usage of the electronic device compared to average usage are updated as well.

FIG. 6PP illustrates the usage dashboard user interface after the user uses the instant messaging application for another 15 minutes, bringing total use of the instant messaging application to 30 minutes. In response to the additional usage, the electronic device 500 combines the instant messaging application and the e-mail application into the Messaging Category (e.g., in accordance with a determination that the total usage of the applications in the Messaging Category meets a category usage threshold). Once the Mail App and the IM App are combined into the messaging category, the graph 620 is updated to include a color or pattern associated with the messaging category, which indicates use of one of the plurality of applications in the messaging category (e.g., Mail App or IM app). In some embodiments, applications are combined into categories when the combined usage of those applications meets or exceeds a predetermined category usage threshold.

In FIG. 6QQ, the dashboard user interface is updated again after the user uses the electronic device 500 to use the instant messaging application for another 30 minutes, bringing the total usage of that application to 60 minutes. In response to the additional usage, the electronic device 500 separates the instant messaging application and the e-mail application (e.g., in accordance with a determination that the usage of the instant messaging application meets an application usage threshold). That is to say, the graph 620 is updated to include separate colors or patterns indicating use of the IM App and the Mail App separately, as opposed to combining them into the messaging category. In some embodiments, applications are separated when the usage of an individual application in a combined category meets or exceeds a predetermined application usage threshold.

In some embodiments, device 500 includes not only application usage within the usage for a given application (or category), but also includes usage of a web resource (e.g., a web page) corresponding to the given application within the usage for the given application (or category). For example, FIG. 6RR illustrates the usage dashboard user interface after the user has accessed a website associated with the instant messaging application for thirty minutes. As shown in the figure, accessing the website associated with the instant messaging application counts toward the usage of the instant messaging application, as the electronic device 500 now indicates that the instant messaging application has been used for a total of 1.5 hours. This number includes an hour of using the native instant messaging application and 30 minutes accessing the instant messaging application's associated website using a web browsing application. In this way, total usage is optionally tracked outside of simply native application usage.

FIG. 6SS illustrates the user selecting (e.g., with contact 603) the indication 610*b* of "Apple TV" in the restrictions settings user interface. In response to the selection, the electronic device presents a usage dashboard user interface including usage metrics associated with the Apple TV, as shown in FIG. 6TT. In this way, the user is able to focus in on the usage of another of the user's devices. The usage dashboard user interface in FIG. 6TT includes an indication 616 of device usage for the day, an indication 618 of how the day's usage compares to average usage, a graph 620 of the device's usage of applications and application categories throughout the day, an indication 634 of the duration of the longest usage session, and an indication of device usage during downtime 636, and indications 622*a*-622*b* of usage of applications and categories of applications for which usage limits are set. In some embodiments, the electronic device 500 optionally displays additional usage metrics associated with the other electronic device, such as notifications and device pickups as described herein. The metrics presented in the usage dashboard user interface illustrated in FIG. 6TT are analogous to the similar usage metrics described above with reference to FIG. 6L.

FIG. 6UU illustrates a usage dashboard user interface including aggregate usage metrics for multiple electronic devices associated with a user account (e.g., all of John's devices, including Apple TV and John's iPhone). In this way, the user is able to view their usage across multiple (e.g., all) of their devices. The usage dashboard user interface in FIG. 6UU includes an indication 616 of combined usage of the plurality of electronic devices for the day, an indication 618 of how the day's usage compares to average usage, a graph 620 of the devices' combined usage of applications and application categories throughout the day, an indication 634 of the duration of the longest usage session across all devices, and an indication of total usage of all devices during downtime 636, and indications 622*a*-622*c* of usage of applications and categories of applications for which usage limits are set. In some embodiments, the electronic device 500 optionally displays additional usage metrics associated with the plurality of electronic devices, such as notifications and device pickups as described herein. The metrics presented in the usage dashboard user interface illustrated in FIG. 6UU are analogous to the similar usage metrics described above with reference to FIG. 6L.

Figure 7A:
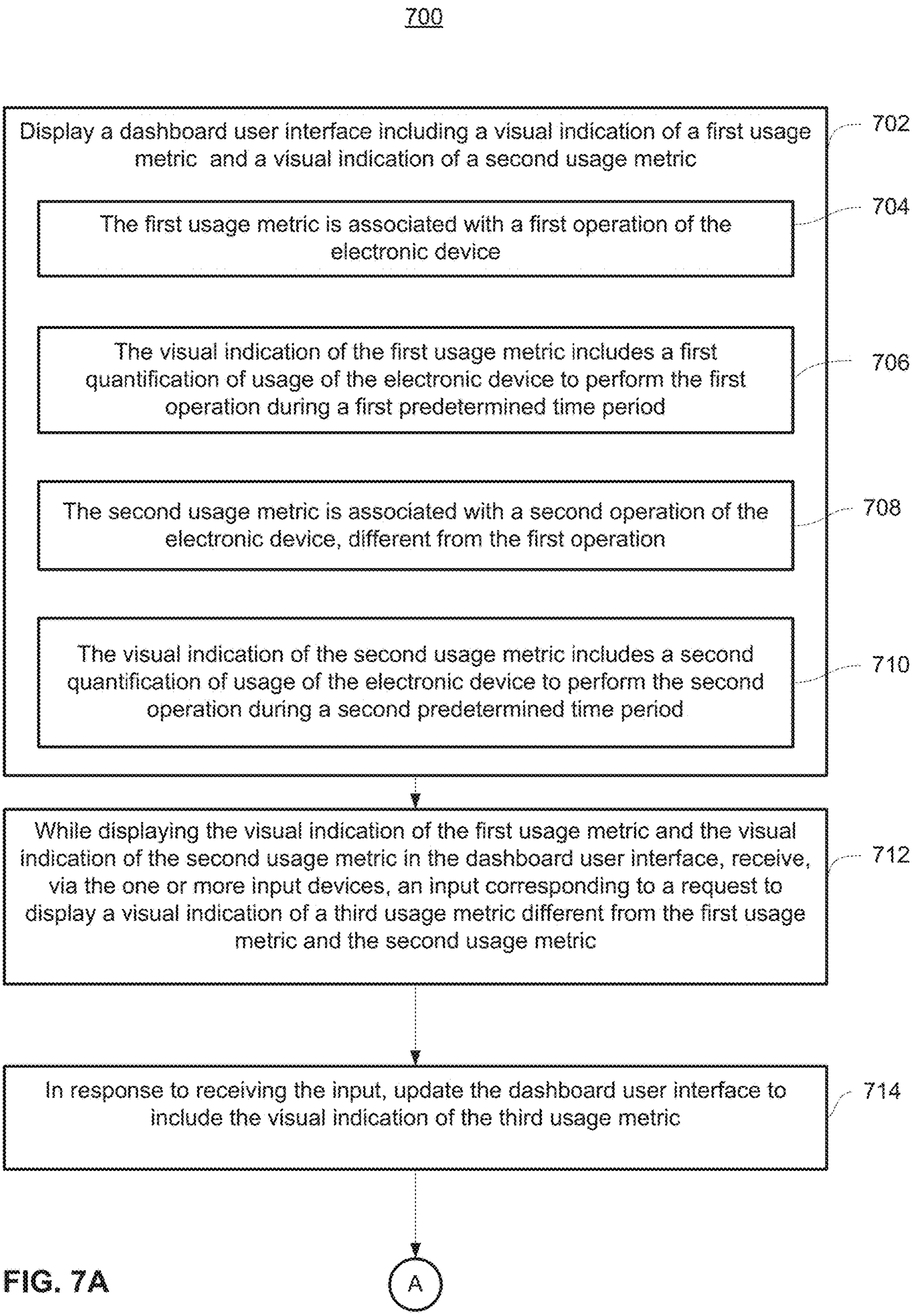
FIGS. 7A-7S are flow diagrams illustrating a method of presenting indications of usage metrics in accordance with some embodiments of the disclosure.
Figure 7B:
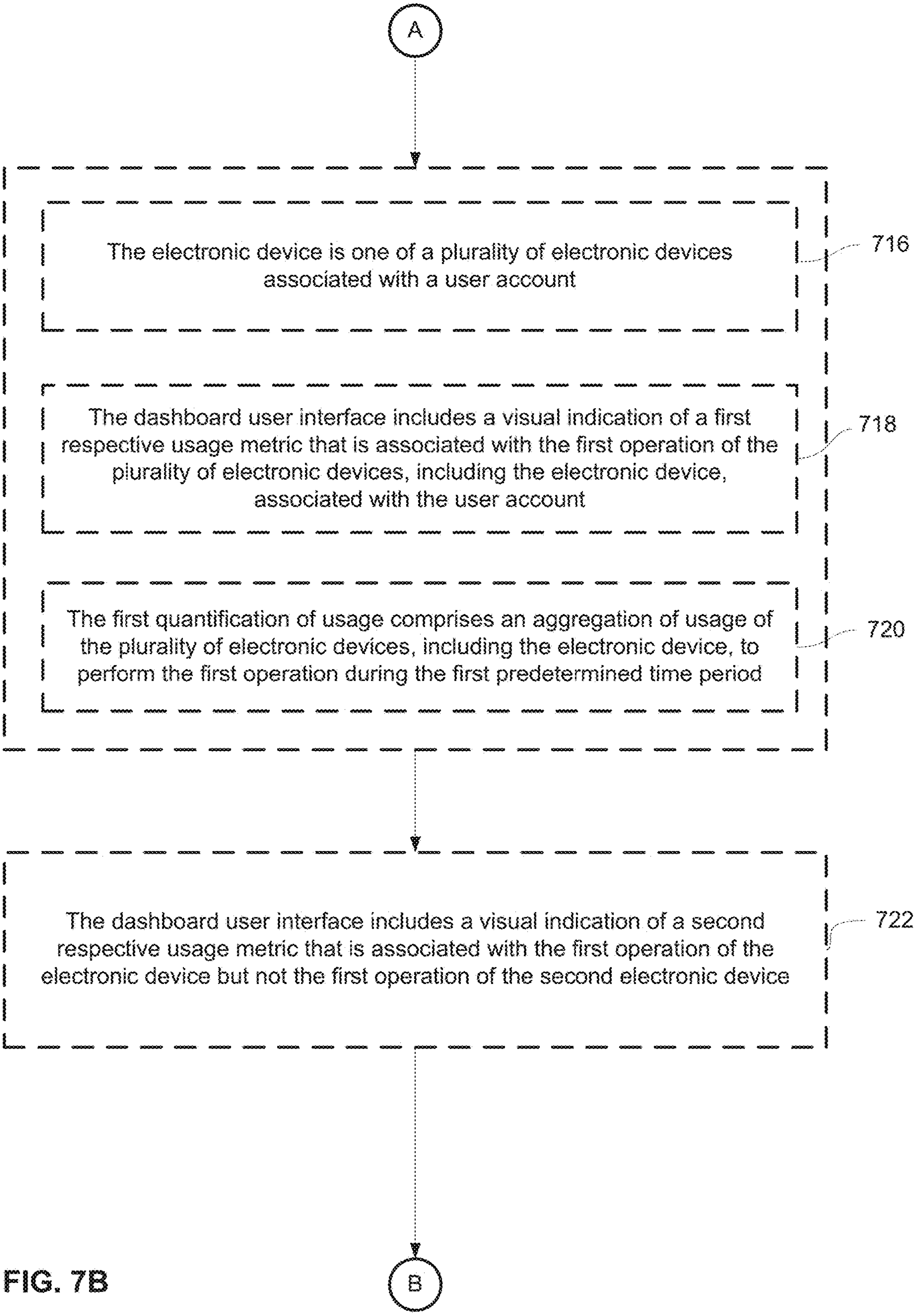
Figure 7C:
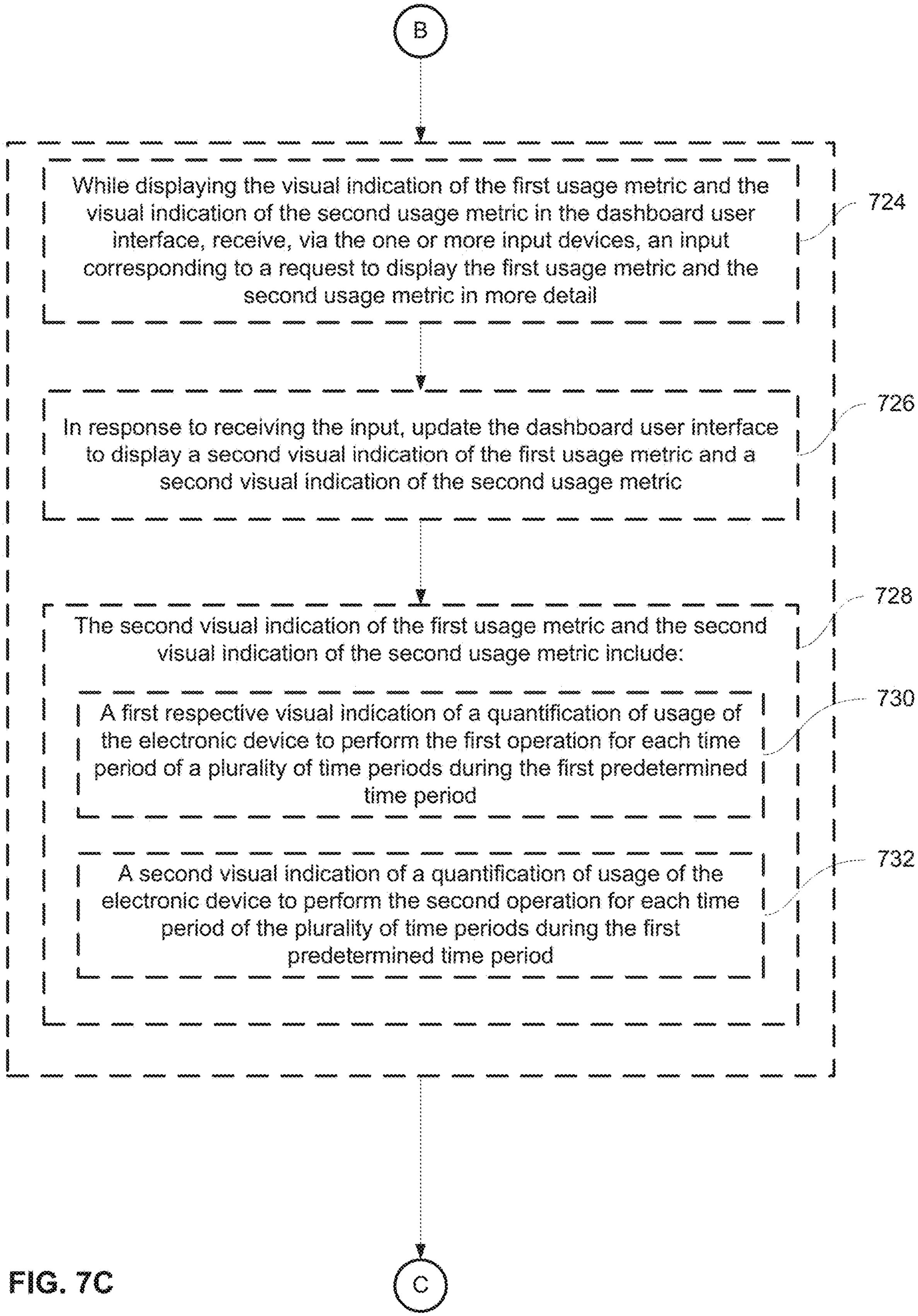
Figure 7D:
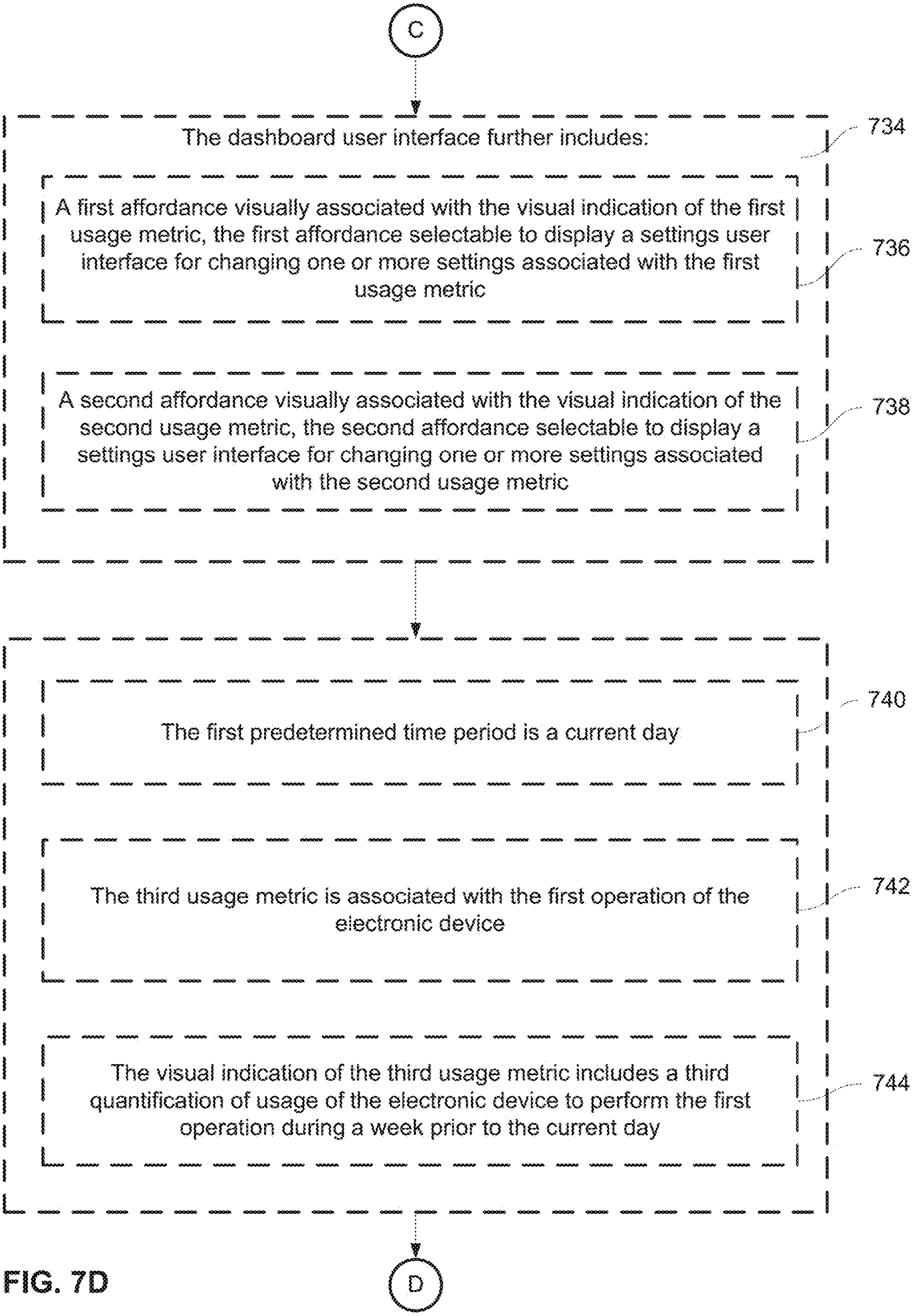
Figure 7F:
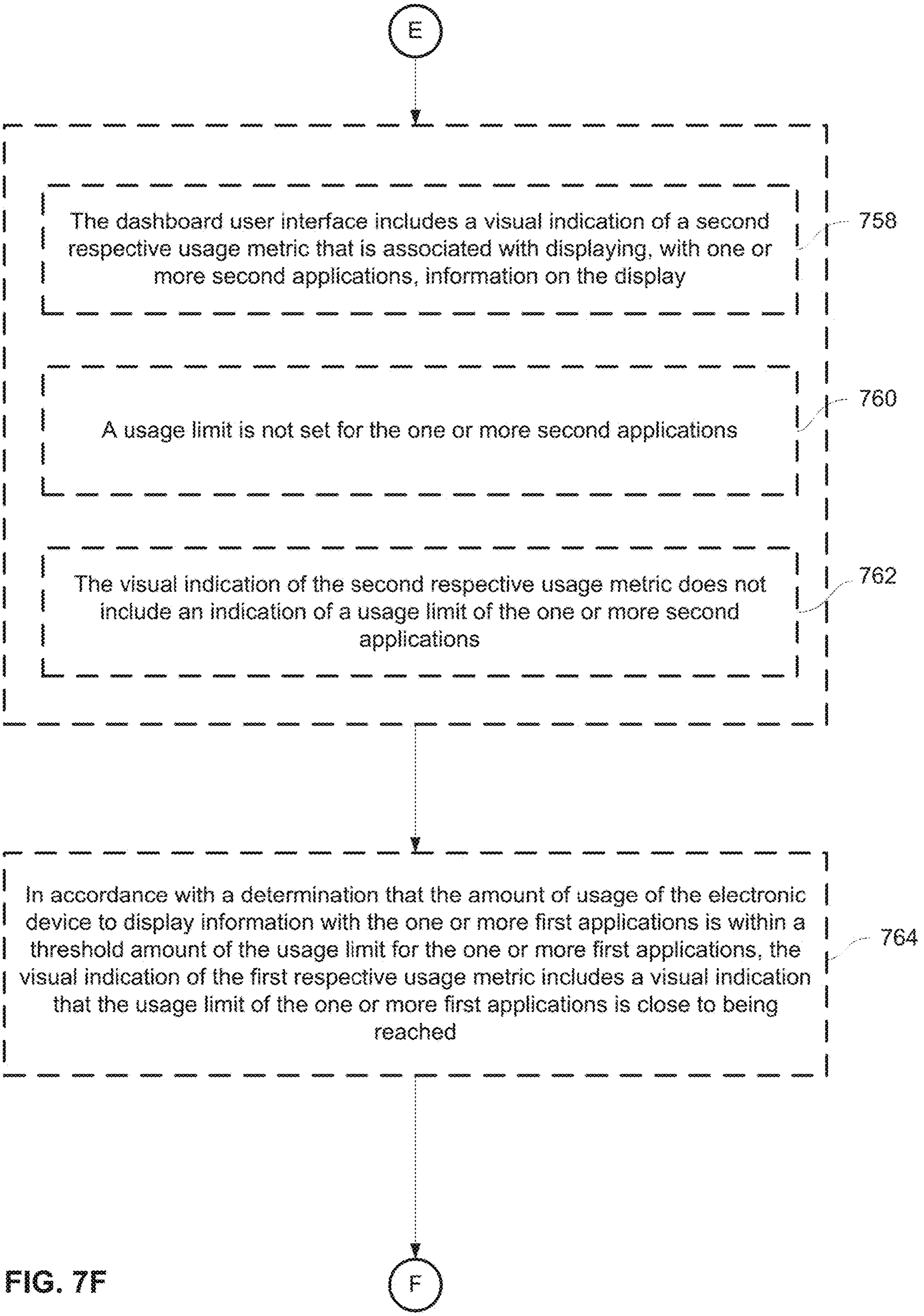
Figure 7H:
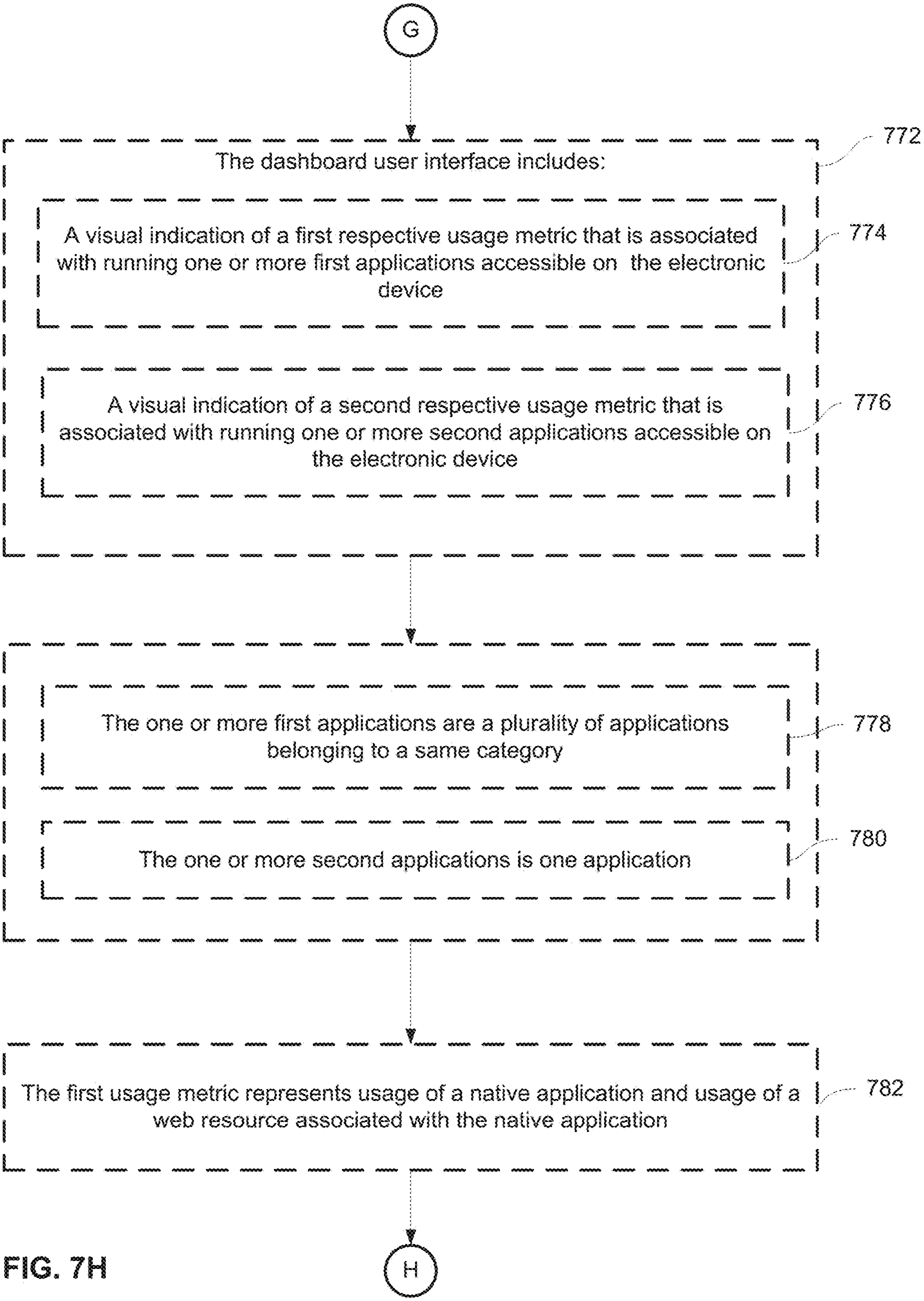
Figure 7I:
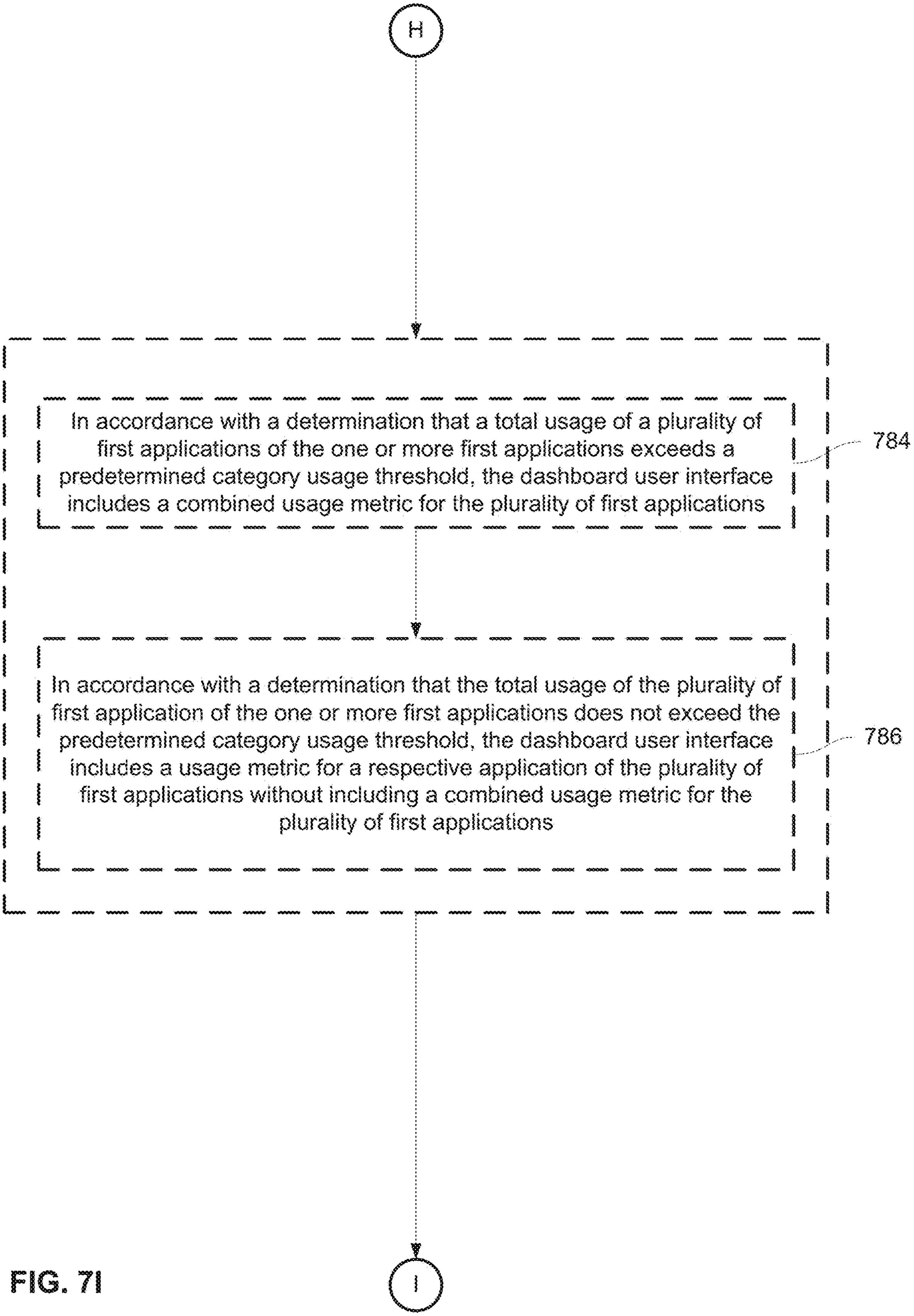
Figure 7J:
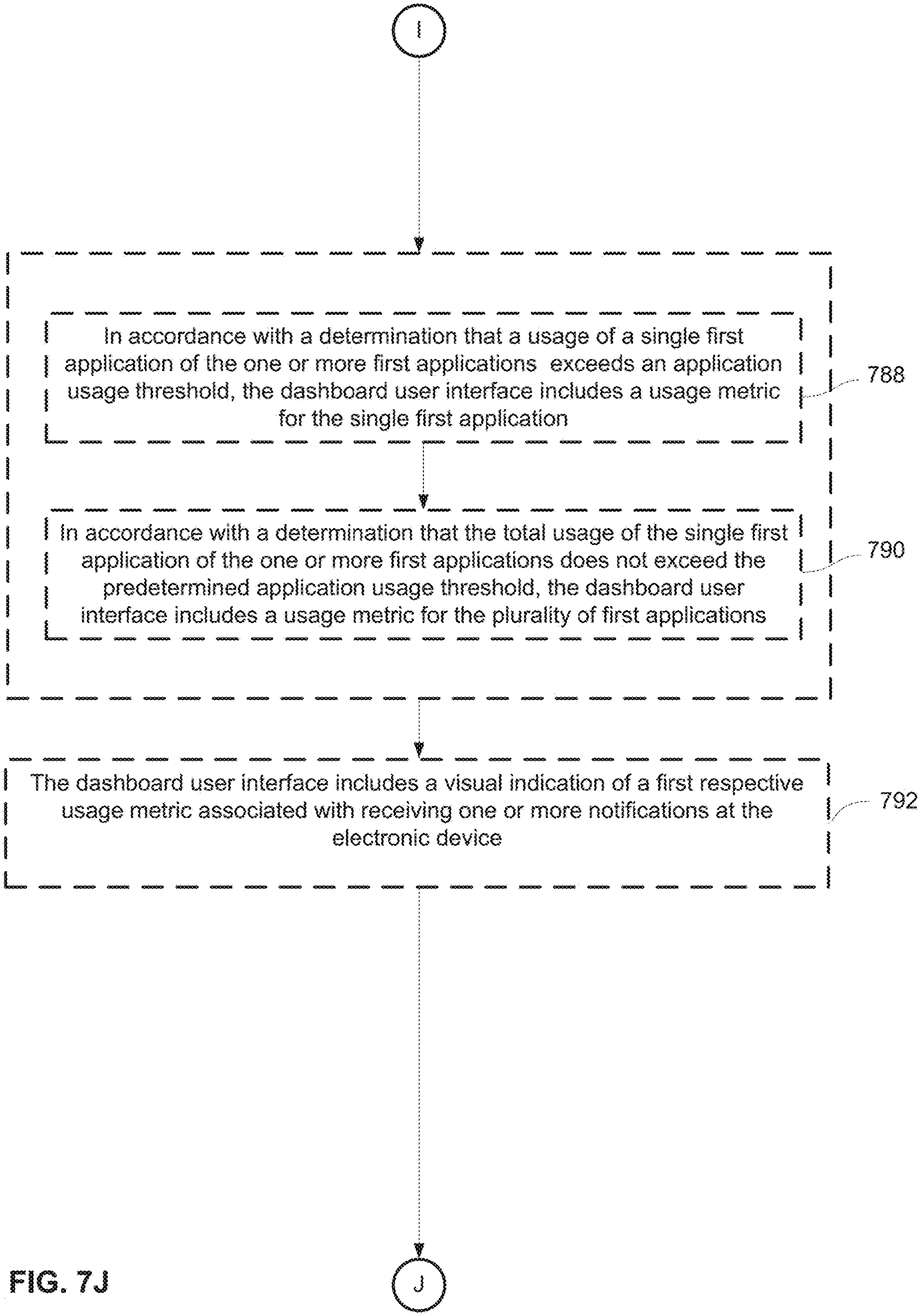
Figure 7K:
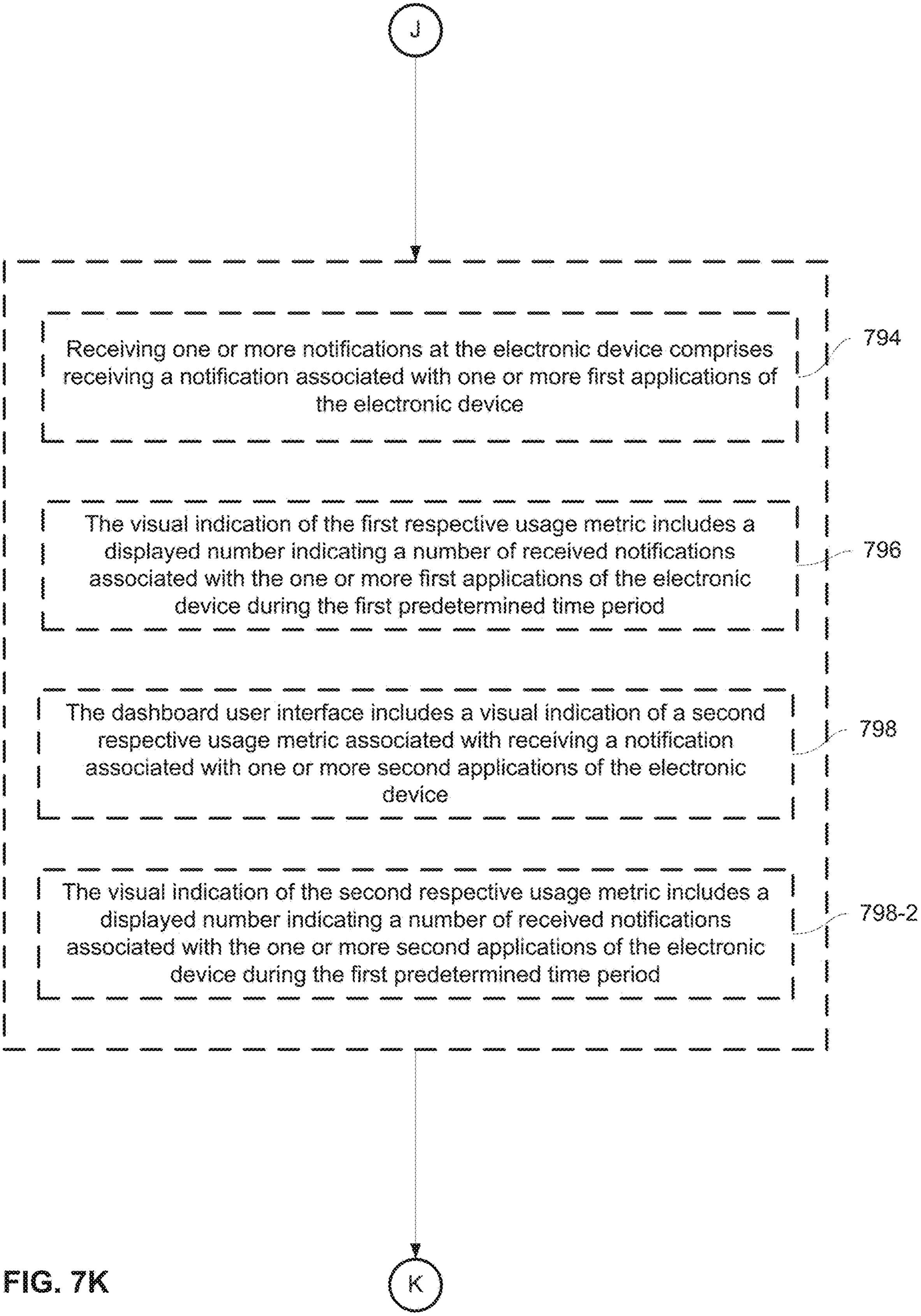
Figure 7L:
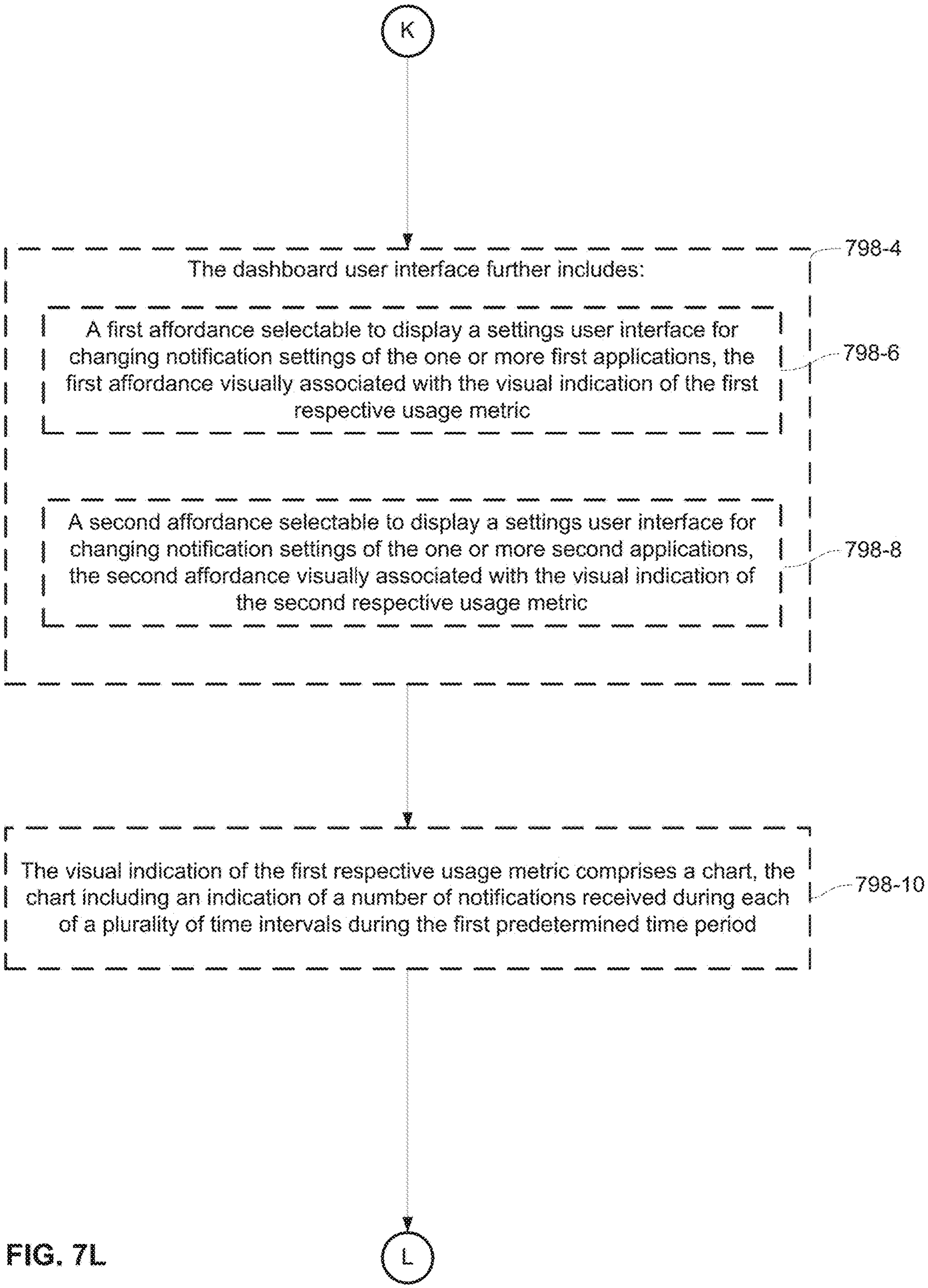
Figure 7M:
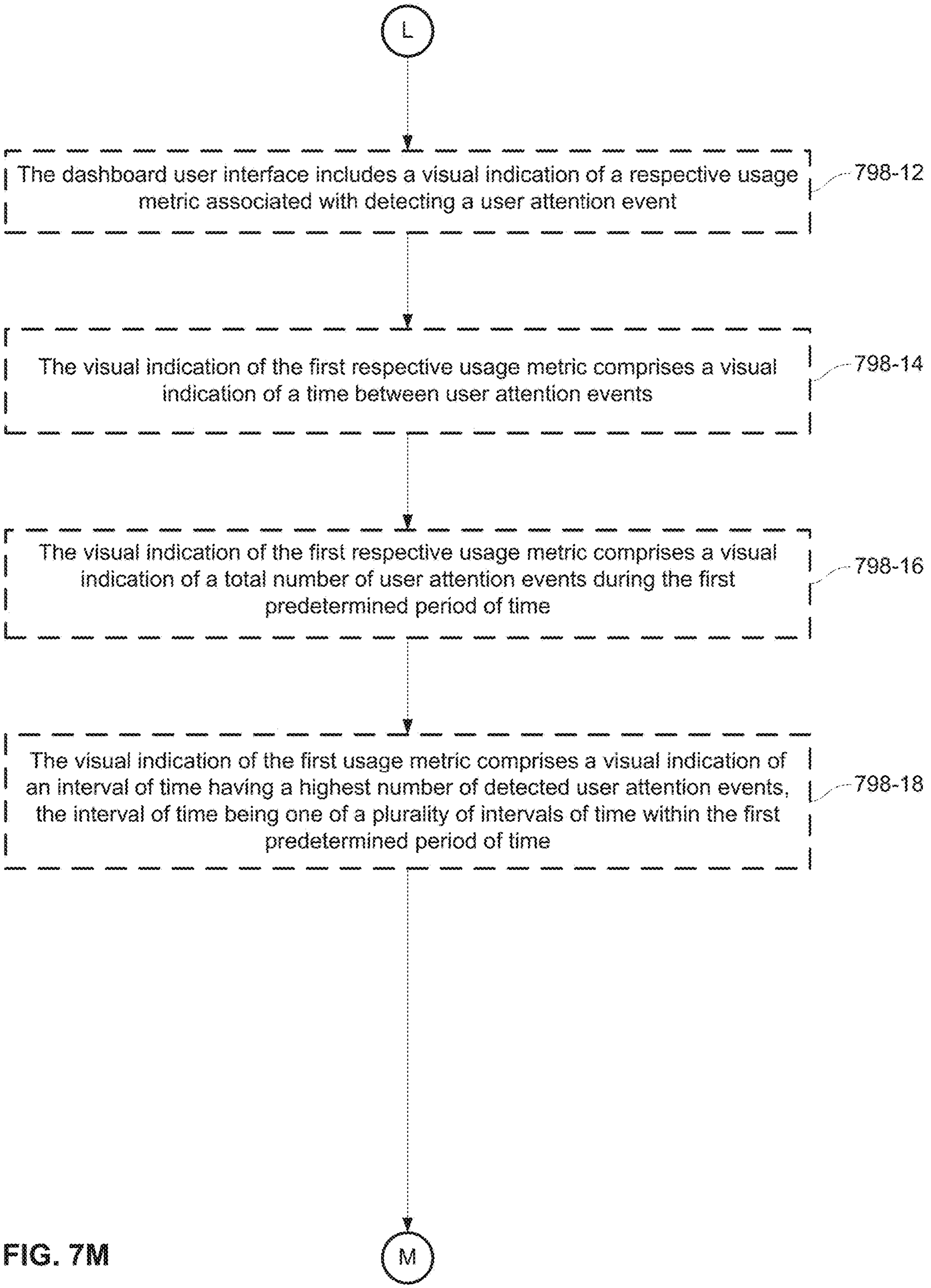
Figure 7O:
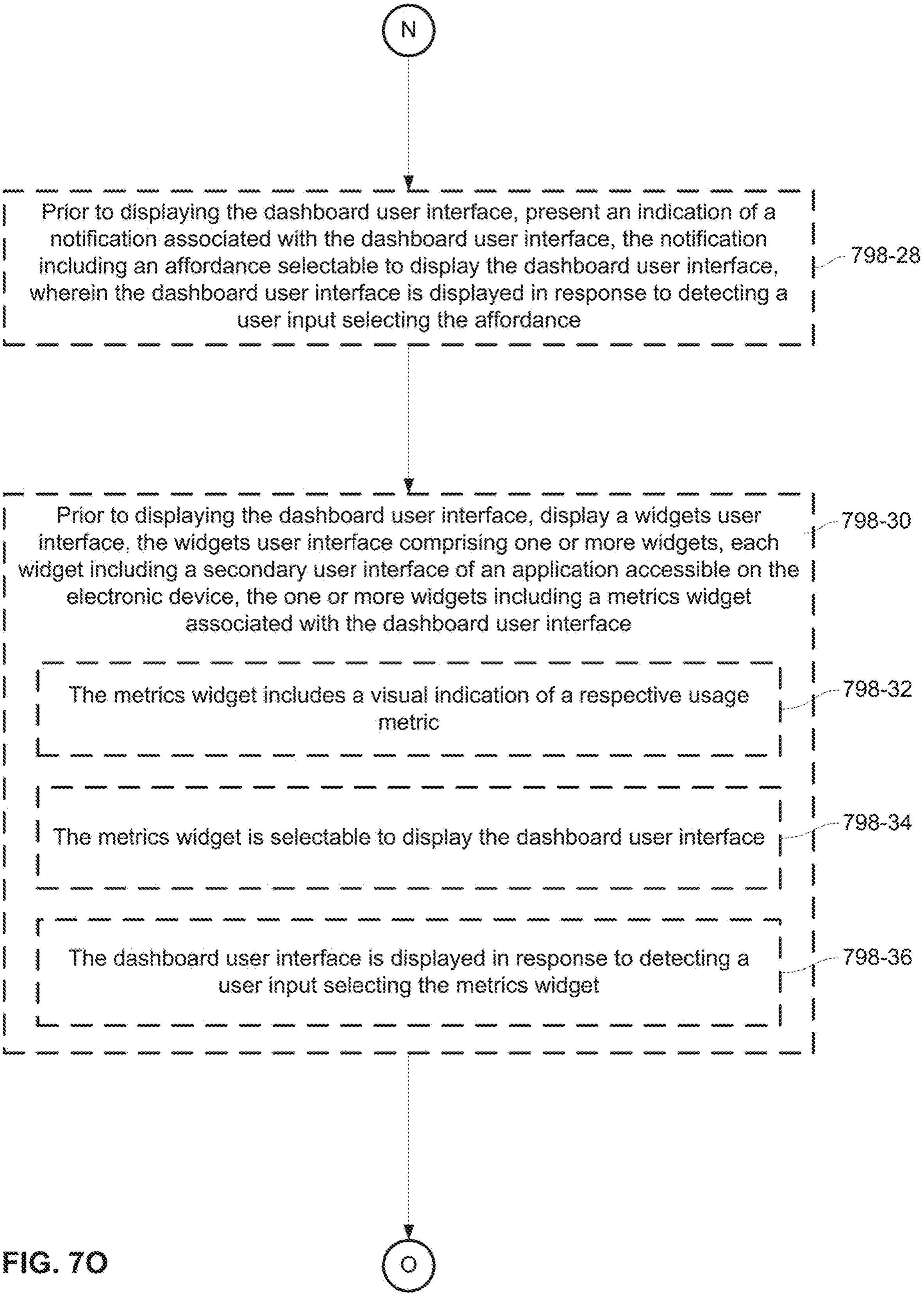
Figure 7P:
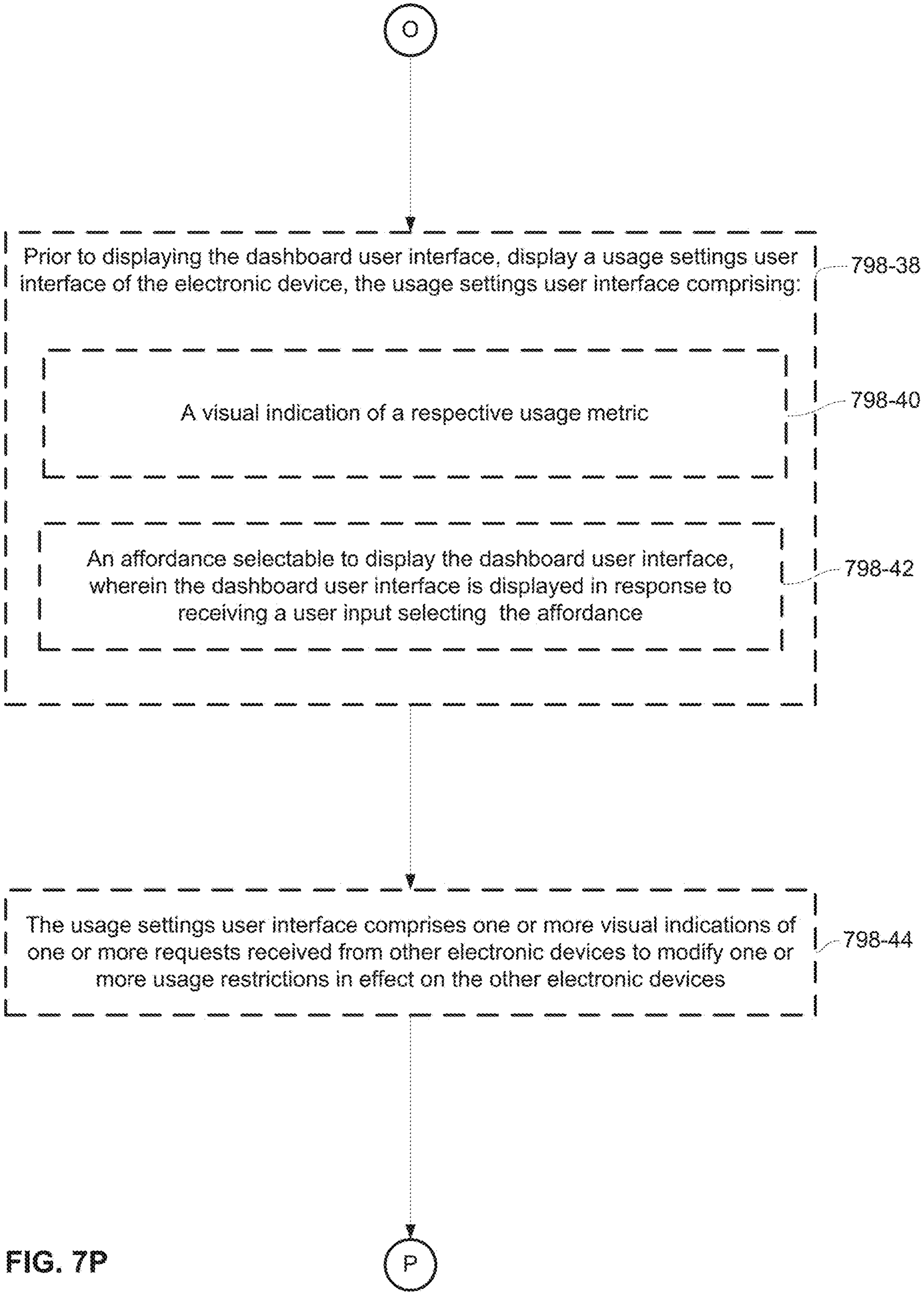
Figure 7Q:
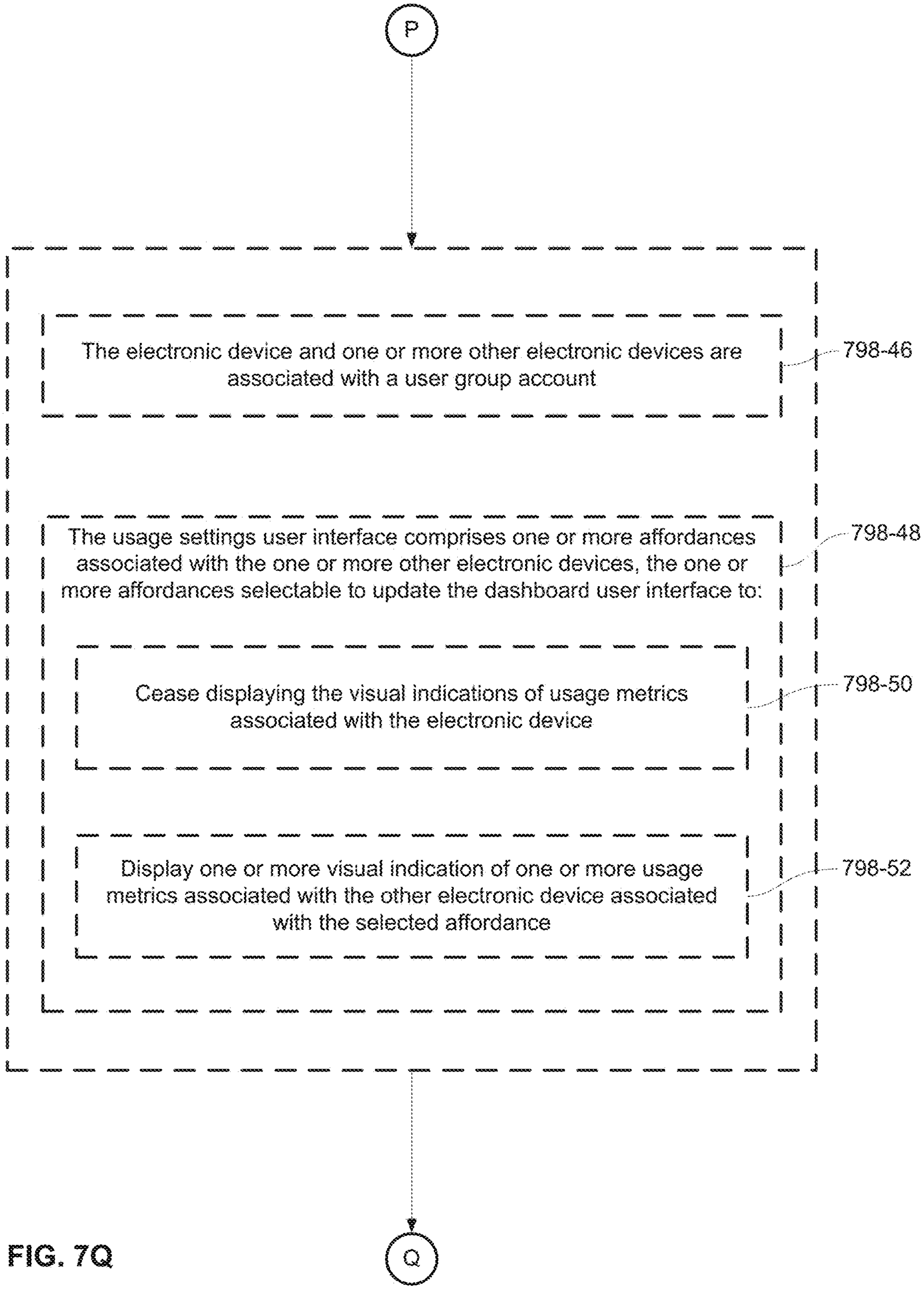
Figure 7R:
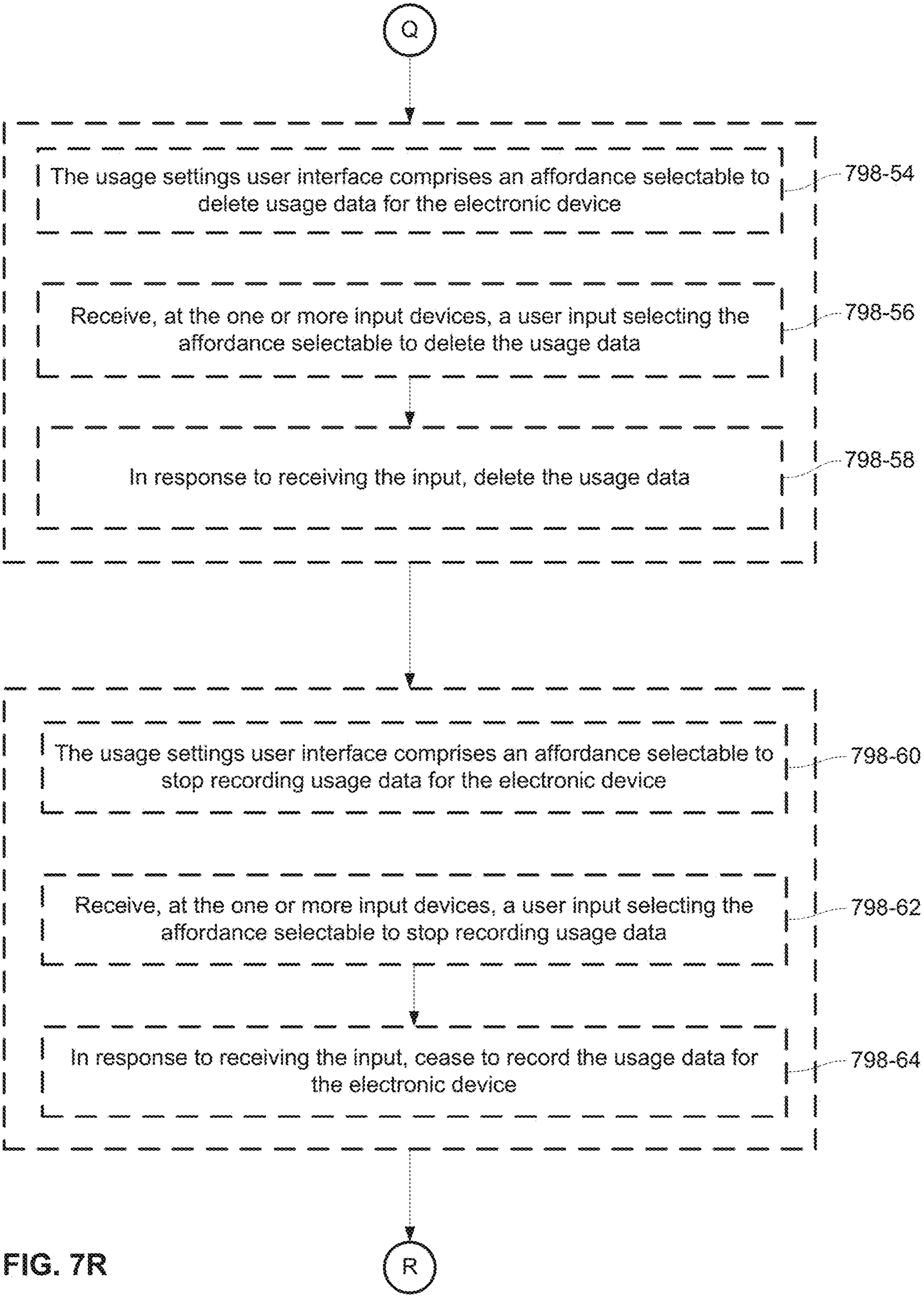
Figure 7S:
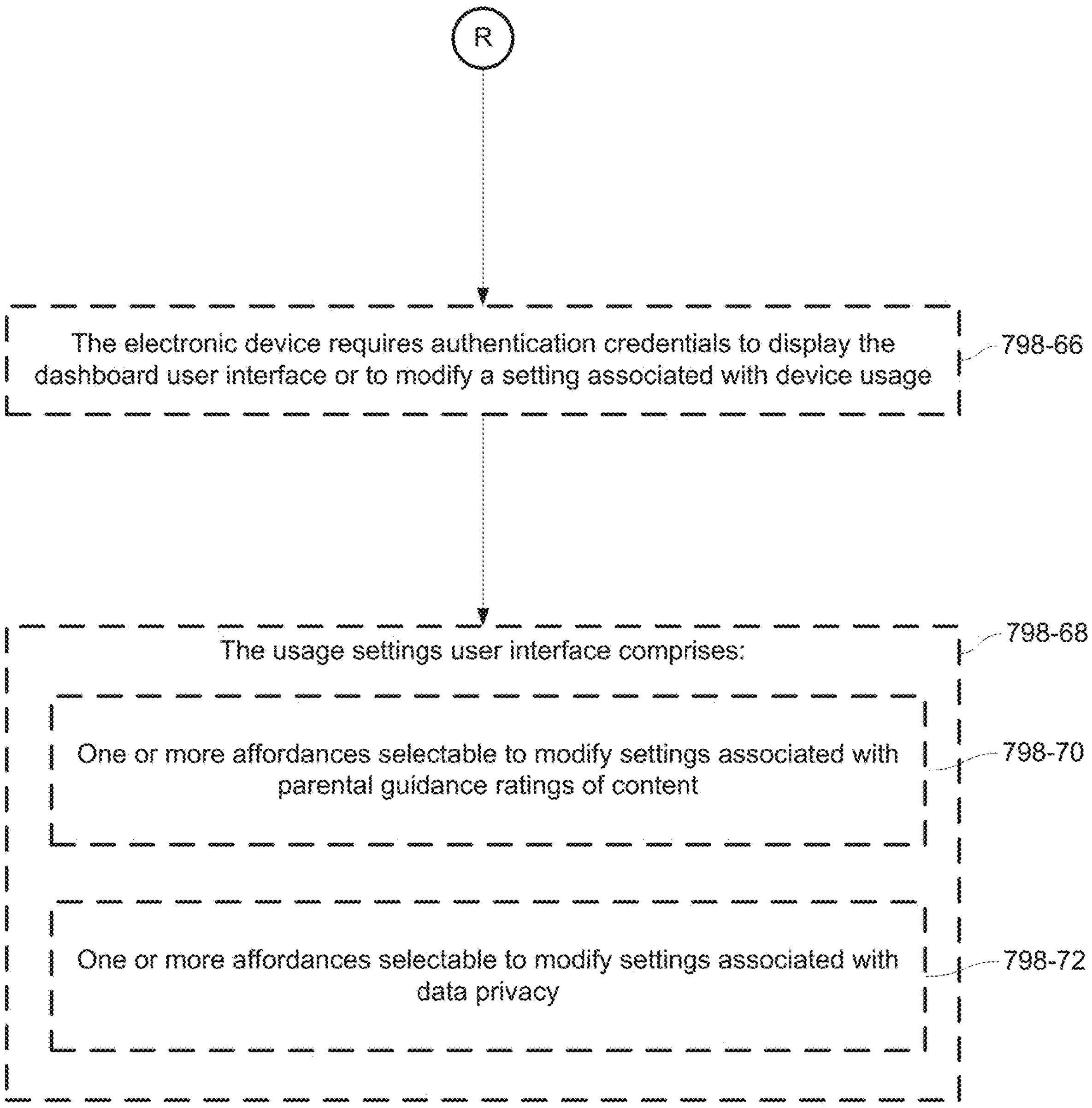

FIGS. 7A-7S are flow diagrams illustrating a method 700 of presenting indications of usage metrics in accordance with some embodiments of the disclosure. The method 700 is optionally performed at an electronic device such as device 100, device 300, or device 500 as described above with reference to FIGS. 1A-1B, 2-3, 4A-4B and 5A-5H. Some operations in method 700 are, optionally, combined and/or the order of some operations is, optionally, changed.

As described below, the method 700 provides ways to present indications of one or more usage metrics associated with an electronic device 500. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, at an electronic device (e.g., electronic device 500) in communication with a display and one or more input devices (e.g., a mobile device including a touch screen, a computer including one or more of a keyboard, mouse, trackpad, and touch screen, or a set top box in communication with a television and an input device (e.g., a remote control)) displays (702), with the display, a dashboard user interface (e.g., a digital health dashboard) including a visual indication of a first usage metric (e.g., a metric indicating how much of a first usage limit has been used up, such as a percentage bar, a pie chart, etc.) and a visual indication of a second usage metric (e.g., a metric indicating how much of a second usage limit has been used up), such as the usage metric dashboard user interfaces illustrated in FIGS. 6L-6U. The first usage metric is optionally associated with (704) a first operation of the electronic device (e.g., screen time, time using a particular application or a particular category of application, receiving notifications, attention events, etc.), such as in FIG. 6L. As an example, the first metric is optionally an indication of an amount of "screen time" during which the device has been used by a user during the current day. In some embodiments, the visual indication of the first usage metric includes (706) a first quantification of usage (e.g., an amount of time or a number of times) of the electronic device to perform the first operation during a first predetermined time period (e.g., an hour, a day, or a week), such as in FIG. 6L. The visual indication of the first usage metric optionally includes visual illustrations such as graphs or charts. In some embodiments, the visual indication of the first usage metric is a displayed number indicating the usage metric (e.g., "3 hours of screen time"). The second usage metric is optionally associated with (708) a second operation of the electronic device, different from the first operation (e.g., screen time, time using a particular application or a particular category of application, receiving notifications, attention events, etc.), such as in FIG. 6L. As an example, the second usage metric is optionally an indication of the amount of time the user has spent using the electronic device to interact with a specific application. In some embodiments, the visual indication of the second usage metric includes (710) a second quantification of usage (e.g., an amount of time or a number of times) of the electronic device to perform the second operation during a second predetermined time period (e.g., an hour, a day, or a week), such as in FIG. 6L. In some embodiments, the second usage metric is associated with a different operation, a different type of operation, a different quantification of usage, and/or a different time period (in some embodiments, the same time period as) than the first usage metric, and in some embodiments the same time period as the first usage metric. For example, the visual indication of how much time the user has spent using the electronic device to interact with a specific application optionally includes a graph illustrating the total screen time of device usage broken up by application and/or application category, including the specific application.

In some embodiments, while displaying the visual indication of the first usage metric and the visual indication of the second usage metric in the dashboard user interface, the electronic device receives (712), via the one or more input devices, an input corresponding to a request to display a visual indication of a third usage metric different from the first usage metric and the second usage metric (e.g., the third usage metric is associated with a different operation, a different type of operation, a different quantification of usage, and/or a different time period (in some embodiments, the same time period as) than the first usage metric and/or the second usage metric), such as in FIGS. 6M-6N. For example, in response to a user input to view total screen time and time spent using the specific application over the past week, the electronic device updates the display to present the total screen time and the time spent using the electronic device to interact with the specific application over the past week (e.g., as opposed to over the past day, thus allowing the user to view the metrics over different periods of time). As another example, in response to an input to view the number of notifications received by the electronic device over the course of a day (e.g., in response to user input swiping down through the dashboard user interface), the electronic device updates to display a chart illustrating the number of notifications received at the electronic device within each hour of the day and details about how many of the notifications were generated by different applications. In some embodiments, in response to receiving the input, the electronic device updates (714) the dashboard user interface to include the visual indication of the third usage metric (e.g., with or without ceasing to display the visual indication of the first usage metric and the visual indication of the second usage metric), such as in FIGS. 6M-6N. For example, the input to display the visual indication of the third usage metric is optionally an input to scroll through the dashboard user interface, which optionally causes the visual indication of the visual indication of the third usage metric to scroll into display where it was not previously displayed on the display. The above-described manner of concurrently displaying multiple visual indications of multiple usage metrics, and allowing a user to view additional visual indications of additional usage metrics, allows the electronic device to efficiently visually communicate different metrics of device usage to the user, which simplifies interactions between the user and the device and enhances the operability of the device (e.g., by providing more than one way to communicate device usage so the user is able to view the usage metric most meaningful to them), which, additionally, reduces power usage and improves battery life of the device by enabling the user to use the device more quickly and efficiently.

In some embodiments, the electronic device (716) is one of a plurality of electronic devices associated with a user account (e.g., a user ID for accessing personal data and/or settings at the plurality of electronic devices), such as in FIG. 6D. The dashboard user interface (718) optionally includes a visual indication of a first respective usage metric (e.g., the first usage metric or the second usage metric) that is associated with the first operation of the plurality of electronic devices, including the electronic device, associated with the user account (e.g., the first usage metric tracks usage of all of the electronic devices associated with the user account for performing the first operation), such as in FIG. 6UU. In some embodiments, the first quantification of usage comprises (720) an aggregation of usage of the plurality of electronic devices, including the electronic device, to perform the first operation during the first predetermined time period (e.g., for example, if the first usage metric is the amount of time spent running a particular application or a particular group of applications, the first quantification of usage is the total amount of time spent running the particular application or the particular group of applications across all devices associated with the user account during the predetermined time period), as shown in FIG. 6UU. The above-described manner of associating usage metrics with a plurality of electronic devices associated with the user allows the electronic device to present accurate usage data to the user that is consistent across all of that user's devices, which simplifies interactions between the user and the device and enhances the operability of the device (e.g., by presenting the user's usage data as a single set of metrics for all devices without the user having to check the usage data for each device individually) which, additionally, reduces power usage and improves battery life of the device by enabling the user to use the device more quickly and efficiently.

In some embodiments, the dashboard user interface includes (722) a visual indication of a second respective usage metric (e.g., the third usage metric) that is associated with the first operation of the electronic device but not the first operation of the second electronic device (e.g., the electronic device switches from displaying the usage metrics aggregated across multiple devices to displaying the usage metrics separately for each device in response to a user input for doing so (e.g., a user input selecting a particular device from a list of devices associated with the user's account)), as shown in FIG. 6TT. In some embodiments, the electronic device concurrently displays visual indications of usage metrics for each of a plurality of electronic devices associated with the user account. The above-described manner of associating usage metrics with a plurality of electronic devices associated with the user allows the electronic device to present accurate usage data to the user that is consistent across all of that user's devices, which simplifies interactions between the user and the device and enhances the operability of the device (e.g., by presenting the user's usage data as a single set of metrics for all devices without the user having to check the usage data for each device individually) which, additionally, reduces power usage and improves battery life of the device by enabling the user to use the device more quickly and efficiently.

In some embodiments, while displaying the visual indication of the first usage metric and the visual indication of the second usage metric in the dashboard user interface, the electronic device receives (724), via the one or more input devices, an input corresponding to a request to display the first usage metric and the second usage metric in more detail (e.g., a request to display more information about the first usage metric and/or the second usage metric (e.g., toggle from an "overview" to a "detailed view"), such as selection of the first usage metric and/or the second usage metric in the dashboard user interface), such as in FIGS. 6F-6G. In some embodiments, in response to receiving the input, the electronic device updates (726) the dashboard user interface to display a second visual indication of the first usage metric (e.g., a visual indication including more information with or about the first usage metric than those included in the first visual indication) and a second visual indication of the second usage metric (e.g., a visual indication including more information with or about the second usage metric than those included in the first visual indication), as shown in FIG. 6G. The second visual indication of the first usage metric and the second visual indication of the second usage metric optionally include (728) a first respective visual indication (730) of a quantification of usage of the electronic device to perform the first operation for each time period of a plurality of time periods during the first predetermined time period, as shown in FIGS. 6DD-6EE (e.g., illustrating the metric in one-hour bins over one day. In some embodiments, the second visual indication of the first usage metric is or is included in a graph or chart (e.g., a line graph, a bar graph, a plurality of pie graphs for each interval of time, etc.) over time and a second visual indication (732) of a quantification of usage of the electronic device to perform the second operation for each time period of the plurality of time periods during the first predetermined time period (e.g., illustrating the metric in one-hour bins over one day), as shown in FIG. 6G. In some embodiments, the second visual indication of the second usage metric is or is included in a graph or chart (e.g., a line graph, a bar graph, a plurality of pie graphs for each interval of time, etc.)) over time. Each indication of usage for each of the plurality of time periods optionally includes an indication of the first operation (e.g., presenting information with a first application or group of first applications) and the second operation (e.g., presenting information with a second application or group of second applications). In some embodiments, the detail view includes a graph or chart that uses different colors or other visual indications to communicate the quantification of usage by the electronic device to perform the first operation (e.g., presenting information with the first application or group of first applications) and the second operation (e.g., presenting information with the second application or group of second applications). The above-described manner of displaying more information about the first usage metric allows the electronic device to display an overview of usage and a detailed view of usage, which simplifies interactions between the user and the device and enhances the operability of the device (e.g., by hiding details when the user does not want to see them and by showing the details when needed), which, additionally, reduces power usage and improves battery life of the device by enabling the user to use the device more quickly and efficiently.

In some embodiments, the dashboard user interface further includes (734) a first affordance (e.g., selectable icon) visually associated with (e.g., displayed next to) the visual indication of the first usage metric, the first affordance selectable to display (736) a settings user interface for changing one or more settings associated with the first usage metric (e.g., the first usage metric is an amount of time the electronic device has been used to run a first application or a first group of applications and the settings user interface includes an option for setting a usage limit for the first application or first group of applications (such as in method 900)), as shown in FIGS. 6HH-6II. Additionally or alternatively, the first usage metric is optionally a number of notifications generated by a first application or first group of applications and the settings user interface includes an option for changing notifications settings for the first application or first group of applications. In some embodiments, a second affordance (e.g., selectable icon) visually associated with (e.g., displayed next to) the visual indication of the second usage metric, the second affordance selectable to display (738) a settings user interface for changing one or more settings associated with the second usage metric (e.g., the second usage metric is an amount of time the electronic device has been used to run a second application or a second group of applications and the settings user interface includes an option for setting a usage limit for the second application or second group of applications (such as in method 900)), such as in FIGS. 6HH-6II. Additionally or alternatively, the second usage metric is optionally a number of notifications generated by a second application or second group of applications and the settings user interface includes an option for changing notifications settings for the second application or second group of applications. In some embodiments, the dashboard user interface includes a graph or chart (e.g., bar graph, line graph, pie chart, etc.) indicating at least the first usage metric and the second usage metric and a list of at least the first usage metric and the second usage metric. The dashboard user interface optionally includes additional usage metrics in the graph or chart and in the list. In some embodiments, the first affordance and second affordance are displayed next to visual indications of the first usage metric and the second usage metric, respectively, included in the list. In some embodiments, the settings user interface includes a visual indication of the usage of the selected application or category throughout the course of the first time period (e.g., the day), an indication of use during a restricted usage mode (e.g., bedtime or device downtime), an indication of average use of the particular application, an indication of notifications generated by the application, affordances for setting a usage limit for the particular application, and a summary of store information about the application (e.g., rating, category, developer, link to the application in an app store). Additional or alternative metrics are possible. In some embodiments, when the user selects an affordance associated with a category of applications, the respective metrics are displayed for each application. In some embodiments, the electronic device displays affordances selectable to display metrics for single applications in response to the user selecting the affordance associated with the category of applications. The above-described manner of displaying affordances selectable to display a settings user interface while displaying the first and second usage metrics allows the electronic device to provide a way for the user to navigate to the settings associated with the usage metrics while viewing the usage metrics, which simplifies interactions between the user and the device and enhances the operability of the device (e.g., by simplifying the user's workflow for changing settings associated with the displayed metrics), which, additionally, reduces power usage and improves battery life of the device by enabling the user to use the device more quickly and efficiently.

In some embodiments, the first predetermined time period is (740) a current day (e.g., the first usage metric is the quantification of usage of the electronic device to perform the first operation during the current day), as shown in FIG. 6FF. In some embodiments, the current day is defined as beginning at 12:00 am in the current time zone of the electronic device. In some embodiments, the current day is defined as some other 24-hour interval, such as the 24 hours prior to the current time at the electronic device. The third usage metric is optionally associated with (742) the first operation of the electronic device (e.g., the third usage metric is associated with the same operation of the electronic device that is associated with the first usage metric, and is different in some other way (e.g., quantification of usage, time interval, etc.). In some embodiments, the visual indication of the third usage metric includes (744) a third quantification of usage of the electronic device to perform the first operation during a week prior to the current day (e.g., the electronic device displays a usage metric associated with the first operation of the electronic device over a week (e.g., the past seven days including the current day, the week including the current day starting on a specific day (e.g., Sunday or Monday))), as shown in FIG. 6GG. In some embodiments, the visual indication of the first usage metric is or is included in a graph or chart (e.g., a line graph, a bar graph, a bar chart, or a pie chart). For example, the first usage metric is optionally the amount of time the electronic device has been used to present information associated with a first application or a group of first applications and the dashboard displays a graph or chart including device usage for each day broken into sections representing each application or group of applications used. The above-described manner of updating the dashboard user interface to display the first usage metric over a week allows the electronic device to present the usage metric over a longer period of time which simplifies interactions between the user and the device and enhances the operability of the device (e.g., by presenting additional information concurrently), which, additionally, reduces power usage and improves battery life of the device by enabling the user to use the device more quickly and efficiently.

In some embodiments, the dashboard user interface includes (746) a visual indication of a first respective usage metric (e.g., the first usage metric) that is associated with displaying information on the display (e.g., the first operation is display usage or "screentime" (e.g., across all applications), as shown in FIG. 6L. In some embodiments, the first operation further encompasses other ways of presenting information, such as playing sounds (e.g., music or other media, spoken sounds such as during a phone call, etc.) using a speaker in communication with the electronic device), and the first respective usage metric comprises (748) an amount of time the electronic device has been used during the first predetermined time period to display information (e.g., the first metric is a total usage of the electronic device for displaying information across all applications on the electronic device (e.g., the total application screentime on the electronic device)), as shown in FIG. 6L. In some embodiments, the total usage metric further includes time one or more speakers associated with the electronic device were used to present audio content, and time other output devices of the electronic device were used to present information. The total usage is optionally presented as an amount of usage time over a specified period of time (e.g., a day, a twenty-four hour period, a week, or another user-specified period of time). In some embodiments, the total usage is optionally presented to the user with text (e.g., text that says the amount of time the device has been used) and/or with a graphic, such as a graph or chart. The indication optionally includes a percentage bar expressing the total device usage as a percent (e.g., 50% of a four-hour usage limit) or a fraction (e.g., two hours of a four-hour usage limit) of a usage limit set by a user of the electronic device. In some embodiments, while presenting the first metric indicative of overall display or device usage, the electronic device further presents one or more usage metrics (e.g., including the second usage metric) indicative of the amount of time the electronic device has been used to display or present information associated with various applications or groups of applications. For example, the visual indication of the overall device screentime optionally includes indications of how much time the device displayed or presented information associated with each of a plurality of applications or groups of applications. The above-described manner of presenting a visual indication of the amount of time the device has been used to present information allows the electronic device to visually communicate the user the amount of time the device has been in use, which makes the user-device interface more efficient (e.g., the user does not have to monitor his or her own device usage, thus reducing the inputs provided by the user to the device (e.g., inputs for monitoring usage are reduced)), which, additionally reduces power usage and improves the battery life of the device by enabling the user to use the device more quickly and efficiently.

In some embodiments, displaying information on the display comprises (750) displaying (e.g., or presenting with a different output device in communication with the electronic device (e.g., playing a sound, media, or speech with a speaker in communication with the electronic device)), with one or more first applications (e.g., a particular application or a group of applications, such as in FIG. 6L. In some embodiments, application groups are user-defined or defined by the system or a third party), information on the display, as shown in FIG. 6L. The first respective usage metric optionally comprises (752) an amount of time the electronic device has been used during the first predetermined time period to display information with the one or more first applications (e.g., the first usage metric is the screentime associated with the one or more first applications), as shown in FIG. 6L. In some embodiments, a usage limit is set (754) for the one or more first applications (e.g., an amount of time the one or more first applications are able to be used to present information in a given period of time (e.g., one day) before access to the one or more second applications is restricted), as shown in FIG. 6L. The visual indication of the first respective usage metric optionally further comprises (746) an indication of the usage limit (e.g., a maximum amount of time the device will present information without restricting access to one or more applications of the device) for the one or more first applications, the indication of the first usage limit visually associated with the visual indication of the first respective usage metric (e.g., the visual indication visually compares the amount of time the device has been used to present information compared to the usage limit), as shown in FIG. 6L. In some embodiments, the visual indication of the first metric is a graph. For example, the visual indication is optionally a bar chart and the size of the bar chart represents the usage limit. In some embodiments, the usage limit is predefined by the user. The dashboard user interface optionally presents an indication when a usage limit is close to being reached (e.g., text or an icon indicative of the usage limit being close to being reached) and/or an indication when a usage limit has been exceeded, optionally including an indication quantifying the extent to which the usage limit has been exceeded. For example, when the usage limit is represented by a bar chart, a portion of the bar chart optionally indicates an amount of usage in excess of the usage limit. The user optionally sets usage limits for one or more applications, one or more groups of applications, and/or an overall usage limit for the device. Therefore, in some embodiments, the one or more first applications optionally include one application, multiple applications, or all applications accessible on the electronic device. The usage limits described here are optionally the same or similar to the usage limits described with reference to method 900. The above-described manner of comparing the first metric to a usage limit of the electronic device allows the electronic device to communicate how much time the user is able to continue presenting information using the electronic device before one or more usage restrictions will be enforced, which makes the user-device interface more efficient (e.g., the user does not have to compare their device usage to the usage limit on their own), which, additionally reduces power usage and improves the batter life of the device by enabling the user to use the device more quickly and efficiently.

In some embodiments, the dashboard user interface includes (758) a visual indication of a second respective usage metric (e.g., the second usage metric) that is associated with displaying (e.g., or presenting with a different output device in communication with the electronic device (e.g., playing a sound, media, or speech with a speaker in communication with the electronic device)), with one or more second applications, (e.g., a particular application or a group of applications, as shown in FIG. 6N. In some embodiments, application groups are user-defined or defined by the system or a third party) information on the display. In some embodiments, a usage limit (760) is not set for the one or more second applications, and the visual indication of the second respective usage metric optionally does not include (762) an indication of a usage limit of the one or more second applications (e.g., because there isn't one), as shown in FIG. 6N. The visual indication of the second usage metric optionally indicates the amount of time the electronic device has been used to display information with the one or more second applications without an indication of a usage limit. In some embodiments, although no usage limit is set for the one or more second applications, usage of some or all of the one or more second applications are optionally limited by a usage limit having a different scope than strictly all of the one or more second applications. For example, the one or more second applications optionally include all of the applications accessible at the electronic device while the one or more first applications optionally include applications belonging to a particular category of applications (e.g., games). Although in this example there is optionally no overall usage limit (e.g., a usage limit setting a maximum amount of device usage across all applications) set at the electronic device, some of the one or more second applications (e.g., the one or more first applications) are subject to a usage limit (e.g., the usage limit of the one or more first applications). Likewise, the one or more second applications optionally include a particular application (e.g., a particular games application) while the one or more first applications optionally include applications belonging to a particular category of applications (e.g., games). Although in this example there is optionally no usage limit set for the particular second application, usage of the second application is limited by the usage limit of the one or more first applications because the one or more first applications include the second application. The above-described manner of indicating usage limits associated with application usage while displaying application usage metrics allows the electronic device to communicate how much time the user is able to continue presenting information using the applications before one or more usage restrictions will be enforced, which makes the user-device interface more efficient (e.g., the user does not have to compare their application usage to the usage limit on their own), which, additionally reduces power usage and improves the batter life of the device by enabling the user to use the device more quickly and efficiently.

In some embodiments, in accordance with a determination (764) that the amount of usage of the electronic device to display information with the one or more first applications is within a threshold amount (e.g., a percentage amount (e.g., 25%, 10%, 5%, etc.) or an absolute amount of time (e.g., 30 minutes, 15 minutes, 5 minutes, etc.)) of the usage limit for the one or more first applications, the visual indication of the first respective usage metric includes a visual indication that the usage limit of the one or more first applications is close to being reached (e.g., displaying text or an icon indicating that the usage limit is close to being reached or a visual characteristic is applied to the visual indication of the first usage metric (e.g., change in color or size of the visual indication or part of the visual indication)), as shown in FIG. 6W. In some embodiments, the visual indication of each of one or more usage metrics includes an affordance selectable to display a settings user interface for changing one or more settings associated with the respective usage metric. The affordance is optionally displayed with a visual characteristic (e.g., a different color) indicative of the usage limit associated with the respective usage metric being within the threshold amount. The dashboard user interface optionally presents an indication when a usage limit has been exceeded, optionally including an indication quantifying the extent to which the usage limit has been exceeded. For example, when the usage limit is represented by a bar chart, a portion of the bar chart optionally indicates an amount of usage in excess of the usage limit. The above-described manner of indicating when a usage limit is close to being reached while displaying usage metrics allows the electronic device to communicate how much time the user is able to continue to perform one or more operations before one or more usage restrictions will be enforced, which makes the user-device interface more efficient (e.g., the user does not have to compare their usage to the usage limit on their own), which, additionally reduces power usage and improves the batter life of the device by enabling the user to use the device more quickly and efficiently.

In some embodiments, the visual indication of the first respective usage metric comprises (766) an indication of the amount of time the electronic device has been used to present information using each of a plurality of application groups, each application group including one or more applications accessible on the electronic device (e.g., an application group is either a single application (e.g., an e-mail application, a social networking application, a game application, an internet browser, etc.)) or a category including multiple applications (e.g., a social media category, a games category, a news category, a user-defined category including a plurality of user-selected applications, etc.), as shown in FIG. 6L. The visual indication optionally includes visual representations of how much of the total device time was used for with each application category. In some embodiments, when the total device usage metric is displayed as a graph or chart, the graph or chart includes a segment for each application category (e.g., a pie graph with multiple "slices", a bar chart with multiple sections, a bar graph with multiple bars, etc.). The total usage is optionally compared to a usage limit (e.g., the whole pie of the pie chart represents a fixed usage limit, the length of the bar chart represents a fixed usage limit, etc.). In some embodiments, the dashboard user interface includes (768) a visual indication of a second respective usage metric (e.g., the second usage metric) that is associated with an amount of time the electronic device has been used to present information using a first application group (e.g., in addition to presenting the device usage of the first application group within the total device usage metric, a separate metric communicating the amount of time the first application group was used is presented), as shown in FIG. 6L. The visual indication of the second respective usage metric optionally includes (770) a visual indication of the second respective usage metric separate from the visual indication of the first respective usage metric (e.g., in addition to being presented as part of the visual indication of the overall device usage (e.g., as part of a graph or chart), the usage of the first application group is presented in an additional manner), as shown in FIG. 6L. In some embodiments, the visual indication of the usage of the first application group includes text indicating the amount of time the first application group was used. Optionally, graphic separate from the visual indication of the total device usage such as a bar with a length indicative of usage of the first application group, a dot with a position indicative of usage of the first application group, or another visual representation of usage of the first application group is displayed. In some embodiments, the electronic device presents a graph or chart illustrating how much time the electronic device has been used to present information using each of a plurality of applications and/or groups of applications and a text indication of the amount of time spent using each of the plurality of applications and/or groups of applications. The above-described manner of presenting device usage for each of multiple application groups allows the electronic device to present detailed information about device usage to the user in a graphical manner which simplifies interactions between the user and the device and enhances the operability of the device (e.g., by presenting details about a displayed metric along with the displayed metric without further input from the user), which, additionally reduces power usage and improves battery life of the device by enabling the user to use the device more quickly and efficiently.

In some embodiments, the dashboard user interface includes (772) a visual indication (774) of a first respective usage metric (e.g., the first usage metric) that is associated with running one or more first applications accessible on (e.g., installed on or accessed via a network connection) the electronic device (e.g., an individual application or a category of applications), as shown in FIG. 6L. The dashboard user interface optionally includes a visual indication (776) of a second respective usage metric (e.g., the second usage metric) that is associated with running one or more second applications accessible on (e.g., installed on or accessed via a network connection) the electronic device (e.g., an individual application or a category of applications, as shown in FIG. 6L. In some embodiments, categories of applications are defined by the user. In some embodiments, categories of applications are defined by an app store, a publisher, etc.)). Thus, the usage metric associated with the first operation is optionally an amount of time the electronic device was used to run (e.g., display) one or more first applications during the first predetermined time period, and the usage metric associated with the second operation is optionally an amount of time the electronic device was used to run (e.g., display) one or more second applications during the first predetermined time period, as shown in FIG. 6L. The above-described manner of presenting usage metrics for running applications and/or groups of applications allows the electronic device to present information about which applications are run on the electronic device, which simplifies interactions between the user and the device and enhances operability of the device, which, additionally reduces power usage and improves battery life of the device by enabling the user to use the device more quickly and efficiently.

In some embodiments, the one or more first applications are (778) a plurality of applications belonging to a same category (e.g., a user-defined category or a system-defined category of applications), as shown in FIG. 6L. In some embodiments, the categories are defined by an app store, an application publisher or distributer, or another party other than the user. When a new application is introduced to the electronic device (e.g., downloaded from the app store), a usage limit set for the category that the new application is associated with is optionally automatically applied to the new application. The first metric is optionally a quantification of total usage for the group of applications in that category. The one or more second applications is (780) optionally one application (e.g., the second metric is optionally a quantification of usage for an individual application), as shown in FIG. 6L. In some embodiments, the dashboard user interface displays a mix of one or more metrics for groups of applications concurrently with one or more metrics for individual applications. In some embodiments, the user defines which applications should have their own metrics presented in the dashboard user interface and which groups of applications should have a group metric presented in the dashboard user interface. In some embodiments, the electronic device determines which applications should have an individual application metric presented in the dashboard user interface and which application groups should have a group metric presented in the dashboard user interface. For example, an application with usage above a predetermined application use threshold will optionally have an application metric presented in the dashboard user interface while a category of applications with usage above a predetermined category threshold (in some embodiments, without individual applications having usages above the application usage threshold, and in some embodiments, even with one or more individual applications having usages above the application usage limit) will have a category metric presented in the dashboard user interface. The above-described manner of concurrently presenting metrics for individual applications and for application categories in the dashboard user interface allows the electronic device to present usage metrics that illustrate how the electronic device is being used in a meaningful way (e.g., by displaying metrics with similar granularity), which simplifies interactions between the user and the device and enhances the operability of the device (e.g., by presenting a mix of category metrics and application metrics at the same time), which additionally reduces power usage and improves battery life of the device by enabling the user to use the device more quickly and efficiently.

In some embodiments, the first usage metric represents (782) usage of a native application and usage of a web resource associated with the native application (e.g., using a web application or viewing a webpage) (e.g., when a user uses a browser application to access a website (e.g., a particular social networking website) associated with an application (e.g., a particular social networking application associated with the website) of the electronic device, the usage of using the browser application to access the website, as shown in FIG. 6RR. For example, if the first usage metric is a social media metric, the first metric includes device usage for accessing the social media platform using a web browser on the electronic device and device usage for running the social media application installed on the electronic device. The above-described manner of including device usage for accessing a webpage using a browsing application of the electronic device as part of the usage metric associated with the application or category associated with the webpage allows the electronic device to accurately track device usage associated with the application or category of each usage metric, which simplifies interactions between the user and the device and enhances the operability of the device (e.g., by combining web usage with the appropriate usage metric or metrics), which, additionally reduces power usage and improves battery life of the device by enabling the user to use the device more quickly and efficiently.

In some embodiments, in accordance with a determination (784) that a total usage of a plurality of first applications of the one or more first applications (e.g., a plurality of applications belonging to the same user-defined or system-defined category) exceeds a predetermined category usage threshold (e.g., the predetermined category usage threshold is an absolute threshold (e.g., a predetermined amount of time (e.g., half an hour, one hour, two hours, etc.) or number of times (e.g., 5, 10, 50, etc.) the plurality of first applications have been used to perform an operation (e.g., present information, generate a notification, etc.) during the first time period (e.g., a day, a week, etc.)) or a percentage threshold (e.g., 5%, 10%, 25%, etc.) of total device usage during the first time period), the dashboard user interface optionally includes a combined usage metric for the plurality of first applications (e.g., without including an individual usage metric for any of the plurality of first applications) (e.g., when the total usage of the plurality of first applications exceeds the category threshold, the total usage of the plurality of first applications, as a group, is presented in the dashboard user interface as the first metric), as shown in FIG. 6PP. In some embodiments, in accordance with a determination (786) that the total usage of the plurality of first application of the one or more first applications does not exceed the predetermined category usage threshold (e.g., the total usage of the plurality of applications belonging to the same category is less than the threshold), the dashboard user interface includes a usage metric for a respective application of the plurality of first applications without including a combined usage metric for the plurality of first applications (e.g., when the total usage of the plurality of applications does not meet the threshold, usage of one or more applications in the category are optionally presented as separate usage metrics (e.g., including the first and/or second usage metrics)), as shown in FIG. 6PP. The above-described manner of selectively presenting a metric for a group of applications allows the electronic device to present information about categories of applications that are most commonly run, which simplifies interactions between the user and the device and enhances operability of the device (e.g., by presenting a combined metric for a group of applications when the total usage of the group of applications exceeds a threshold), which, additionally reduces power usage and improves battery life of the device by enabling the user to use the device more quickly and efficiently.

In some embodiments, in accordance with a determination (788) that a usage of a single first application of the one or more first applications (e.g., the one or more first applications is a plurality of applications belonging to the same user-defined or system-defined category) exceeds an application usage threshold (e.g., the predetermined application usage threshold is an absolute threshold (e.g., a predetermined amount of time (e.g., half an hour, one hour, two hours, etc.) or number of times (e.g., 5, 10, 50, etc.)) the first application has been used to perform an operation (e.g., present information, generate a notification, etc.) during the first time period) or a percentage threshold (e.g., 5%, 10%, 25%, etc.) of total device usage during the first time period), the dashboard user interface includes a usage metric for the single first application (e.g., instead of or in addition to a combined usage metric for the plurality of first applications) (e.g., when the usage of the first application exceeds the application threshold, the usage of the first application is presented in the dashboard user interface as the first metric), as shown in FIG. 6QQ. In some embodiments, in accordance with a determination (790) that the total usage of the single first application of the one or more first applications does not exceed the predetermined application usage threshold (e.g., the usage of the single first application is less than the threshold), the dashboard user interface includes a usage metric for the plurality of first applications (e.g., when the usage of the single first application does not meet the threshold, usage of the plurality of first applications, as a group, is presented in the dashboard user interface as the first metric), as shown in FIG. 6QQ. The application usage thresholds here are optionally the same or similar to the application usage limits described with reference to method 900. The above-described manner of presenting a metrics for a applications allows the electronic device to present information about applications that are most commonly ran which simplifies interactions between the user and the device and enhances operability of the device (e.g., by presenting a metric for an application when the usage the group application exceeds a threshold), which, additionally reduces power usage and improves battery life of the device by enabling the user to use the device more quickly and efficiently.

In some embodiments, the dashboard user interface includes (792) a visual indication of a first respective usage metric (e.g., the first usage metric) associated with receiving one or more notifications at the electronic device (e.g., the dashboard user interface includes a notification metric indicative of the number of notifications received at the electronic device during a given amount of time (e.g., an hour, a day, a week, etc.)), as shown in FIG. 6KK. One or more notifications are optionally received from a different electronic device by way of a wireless or wired connection. One or more notifications are optionally generated by an application installed on the electronic device. The above-described manner of displaying a notification metric in the dashboard user interface allows the electronic device to communicate device usage for receiving notifications in an efficient and clear manner, which simplifies interactions between the user and the device and enhances the operability of the device (e.g., by automatically collecting notification usage data), which additionally reduces power usage and improves battery life of the device by enabling the user to use the device more quickly and efficiently.

In some embodiments, the electronic device receiving one or more notifications at the electronic device comprises (794) receiving a notification associated with one or more first applications (e.g., a particular application or a group of applications, such as a plurality of applications in the same system-defined or user-defined category) of the electronic device (e.g., receiving a new message notification from a messaging application), as shown in FIG. 6R. In some embodiments, the electronic device presents an indication (e.g., displays an image, generates a vibration or haptic and/or tactile output, plays a sound, etc.) of each received notification. The visual indication of the first respective usage metric optionally includes (796) a displayed number indicating a number of received notifications (e.g., a particular application or a group of applications, such as a plurality of applications in the same system-defined or user-defined category) associated with the one or more first applications of the electronic device during the first predetermined time period (e.g., a day, a week, a month, etc.). In some embodiments, the dashboard user interface includes (798) a visual indication of a second respective usage metric (e.g., the second usage metric) associated with receiving a notification associated with one or more second applications of the electronic device (e.g., receiving a reminder notification from a reminder application), as shown in FIG. 6R. In some embodiments, the electronic device presents an indication (e.g., displays an image, generates a vibration or haptic and/or tactile output, plays a sound, etc.) of each received notification. The visual indication of the second respective usage metric optionally includes (798-2) a displayed number indicating a number of received notifications associated with the one or more second applications of the electronic device during the first predetermined time period (e.g., a day, a week, a month, etc.), as shown in FIG. 6R. The above-described manner of displaying notification metrics associated with applications or groups of applications allows the electronic device to present information about which applications generate the most notifications, which simplifies interactions between the user and the device and enhances operability of the device (e.g., by presenting application data as part of the notification metrics so the user is aware of which applications cause the device to be used to present notifications with the most frequency), which additionally reduces power usage and improves battery life of the device by enabling the user to use the device more quickly and efficiently (e.g., by changing notification settings of applications that generate more notifications than the user wants to receive).

In some embodiments, the dashboard user interface further includes (798-4) a first affordance selectable to display (798-6) a settings user interface for changing notification settings of the one or more first applications (e.g., options to allow all notifications, allow some notifications (e.g., based on priority, time of day, or some other metric), or to allow no notifications for an application or group of applications)), as shown in FIGS. 6LL-6MM. In some embodiments, the first affordance is visually associated with (e.g., displayed next to) the visual indication of the first respective usage metric (e.g., notification metrics are displayed concurrently with affordances for changing notification settings), and a second affordance selectable to display (798-8) a settings user interface for changing notification settings of the one or more second applications (e.g., options to allow all notifications, allow some notifications (e.g., based on priority, time of day, or some other metric), or to allow no notifications for an application or group of applications), as shown in FIG. 6LL-6MM. The second affordance is optionally visually associated with (e.g., displayed next to) the visual indication of the second respective usage metric (e.g., notification metrics are displayed concurrently with affordances for changing notification settings). In some embodiments, the electronic device includes notification settings customizable for each application or for groups of applications. The electronic device optionally further includes notification settings that affect all of the applications on the electronic device. The above-described manner of displaying affordances selectable to display notification settings while displaying notification metrics associated with applications or groups of applications allows the electronic device to present options for changing settings associated with the metrics the user is currently viewing, which simplifies interactions between the user and the device and enhances operability of the device (e.g., by making the notifications settings accessible while viewing the notifications metrics), which additionally reduces power usage and improves battery life of the device by enabling the user to use the device more quickly and efficiently (e.g., by changing notification settings after viewing the notification metrics).

In some embodiments, the visual indication of the first respective usage metric comprises (798-10) a chart (e.g., a line graph, a bar chart, etc.), the chart including an indication of a number of notifications received during each of a plurality of time intervals (e.g., during each hour, during each day, etc.) during the first predetermined time period (e.g., a day, a week, a month, etc.), as shown in FIG. 6LL. The above-described manner of presenting a chart of the notifications received over time allows the electronic device to simultaneously present an indication of how many notifications have been received during the predetermined time period and how many notifications have been received in each interval, which simplifies interactions between the user and the device and enhances operability of the device (e.g., by displaying related information together without further user input), which additionally reduces power usage and improves battery life of the device by enabling the user to use the device more quickly and efficiently.

In some embodiments, the dashboard user interface includes (798-12) a visual indication of a respective usage metric (e.g., the first metric or the second usage metric) associated with detecting a user attention event (e.g., the dashboard user interface includes a metric indicating the number of times the user initiates an interaction with the electronic device), as shown in FIG. 6U. In some embodiments, the electronic device presents a user attention event (e.g., "device pickup") dashboard indicating one or more metrics related to user attention events. The user attention event dashboard optionally includes metrics such as the average time between pickups throughout a predetermined time period (e.g., a day, a week, etc.), the total number of pickups throughout the predetermined time period, a time-frame within the predetermined time period (e.g. an hour within a day or an hour or day within a week) with the most user attention events, the number of pickups during a restricted usage mode (e.g., bedtime), and other metrics. In some embodiments, a user attention event is detected when a user input causes the electronic device to exit an idle state (e.g., a sleep mode, a locked state, a low power mode, etc. during which the user does not interact with the electronic device and/or the display of the electronic device is off). In some embodiments, the electronic device enters an idle state in response to a predetermined amount of time passing since the last user input was received at the electronic device. Optionally, the electronic device enters the idle state in response to a user input corresponding to a request to enter the idle state (e.g., pressing a power or lock button of the electronic device). In some embodiments, the display does not display an image during the idle state. In some embodiments, a lock screen is displayed on the electronic device during the idle state. The user input corresponding to the user attention event is optionally one or more of a button of the electronic device being pressed, a user action (e.g., raising the device) for terminating the idle state, an unlocking input (e.g., entering a passcode or providing biometrics), and a touch input for accessing a function (e.g., a widgets user interface, a camera application, a dashboard user interface, displaying a user interface of an application associated with a displayed indication of a notification) of the electronic device. Detecting the biometrics optionally includes detecting, with a depth camera or another sensor, the user's face. In some embodiments, the electronic device is able to determine when the user looks at their electronic device using the depth camera and facial recognition techniques and unlock in response to the user looking at the electronic device (e.g., the electronic device unlocks in response to a determination that the user is paying attention to the electronic device). In some embodiments, the electronic device exits the idle state in response to a notification (e.g., the display turns on to display the notification without a user input requesting the display to turn on) and the attention event causes the device to perform some other action (e.g., unlocking the device, updating the display to display a user interface of an application or the operating system). That is to say, the indication of the notification is optionally not a user attention event even though it causes the device to exit the idle state. In some embodiments, the attention event metrics are indicative of the number of times the user initiates the use of the electronic device (e.g., "checks" his or her phone). The above-described manner of displaying metrics associated with user attention events (e.g., device pickups) allows the electronic device to present information about how often the user interacts with the electronic device, which simplifies interactions between the user and the device and enhances operability of the device (e.g., by conveying usage information in a way that is meaningful to the user), which additionally reduces power usage and improves battery life of the device by enabling the user to use the device more quickly and efficiently (e.g., by encouraging the user to use their phone less often and therefore more efficiently).

In some embodiments, the visual indication of the first respective usage metric comprises (798-14) a visual indication of a time between user attention events (e.g., an average time between user attention events (e.g., a button of the electronic device being pressed, a user action (e.g., raising the device) for terminating the idle state, an unlocking input (e.g., entering a passcode or providing biometrics), a touch input for accessing a function (e.g., a widgets user interface, a camera application, a dashboard user interface, displaying a user interface of an application associated with a displayed indication of a notification) of the electronic device), as shown in FIG. 6U. In some embodiments, the time between user attention events is calculated as an average time between user attention events during a period of time within the first predetermined period of time (e.g., a day, a week, etc.), the period of time starting with an earliest user attention event during the first predetermined period of time (e.g., a first attention event of the day, week, or other predetermined period of time) and a latest user attention event during the first predetermined period of time (e.g., a last attention event of the day, week, or other predetermined period of time). The above-described manner of displaying a metric indicative of the average time between user attention events (e.g., device pickups) allows the electronic device to present information about how often the user interacts with the electronic device, which simplifies interactions between the user and the device and enhances operability of the device (e.g., by conveying usage information in a way that is meaningful to the user), which additionally reduces power usage and improves battery life of the device by enabling the user to use the device more quickly and efficiently (e.g., by encouraging the user to use their phone less often and therefore more efficiently).

In some embodiments, the visual indication of the first respective usage metric comprises (798-16) a visual indication of a total number of user attention events (e.g., a button of the electronic device being pressed, a user action (e.g., raising the device) for terminating the idle state, an unlocking input (e.g., entering a passcode or providing biometrics), a touch input for accessing a function (e.g., a widgets user interface, a camera application, a dashboard user interface, displaying a user interface of an application associated with a displayed indication of a notification) of the electronic device)) during the first predetermined period of time (e.g., an day, a week, etc.), as shown in FIG. 6U. The above-described manner of displaying a metric indicative of the number of user attention events (e.g., device pickups) allows the electronic device to present information about how often the user interacts with the electronic device, which simplifies interactions between the user and the device and enhances operability of the device (e.g., by conveying usage information in a way that is meaningful to the user), which additionally reduces power usage and improves battery life of the device by enabling the user to use the device more quickly and efficiently (e.g., by encouraging the user to use their phone less often and therefore more efficiently).

In some embodiments, the visual indication of the first usage metric comprises (798-18) a visual indication of an interval of time (e.g., an hour within a day, an hour or day within a week, etc.) having a highest number of detected user attention events, the interval of time being one of a plurality of intervals of time within the first predetermined period of time (e.g., the hour within a day during which the most user attention events were detected, compared to all of the hours within the day or the day or hour within a week during which the most user attention events were detected, compared to all of the hours or days within the week), as shown in FIG. 6U. The above-described manner of displaying a metric indicative of the interval of time having the most user attention events (e.g., device pickups) allows the electronic device to present information about when the user interacts most with the electronic device, which simplifies interactions between the user and the device and enhances operability of the device (e.g., by conveying usage information in a way that is meaningful to the user), which additionally reduces power usage and improves battery life of the device by enabling the user to use the device more quickly and efficiently (e.g., by encouraging the user to use their phone less often and therefore more efficiently).

In some embodiments, detecting (798-20) an attention event comprises, in accordance with a determination (798-22) that a detected user input corresponds to a request to exit an idle state of the electronic device, as shown in FIG. 6U (e.g., the display displays a lock screen (e.g., a user interface of the operating system that is displayed before the device is unlocked without displaying a user interface of any applications accessible to the electronic device), a screensaver (e.g., an image displayed without displaying a user interface of any applications accessible to the electronic device), or is off (e.g., not displaying an image) during the idle state), identifying the user input as an attention event (e.g., the attention event is one of device motion matching one or more wakeup criteria (e.g., raise to wake), a touch input (e.g., a touch input selecting an image displayed on a lock screen, a swipe input for displaying a widgets user interface, a camera user interface, or another user interface of the operating system or one or more applications), actuation of a button included in the electronic device (e.g., pressing a power button, an unlock button, a home button, or another button or toggling a switch), or detection of a user biometric input (e.g., a fingerprint, an image of the user's face, or another biometric input (e.g., for unlocking the device)). Detecting the biometrics optionally includes detecting, with a depth camera or another sensor, the user's face. In some embodiments, the electronic device is able to determine when the user looks at their electronic device using the depth camera and facial recognition techniques and unlock in response to the user looking at the electronic device (e.g., the electronic device unlocks in response to a determination that the user is paying attention to the electronic device). In some embodiments, in accordance with a determination (798-24) that the detected user input does not correspond to a request to exit the idle state of the electronic device (e.g., the electronic device is not in an idle state or the detected user input is erroneous (e.g., a large body contact, device motion not corresponding to the user raising the device, etc.)), the electronic device forgoes identifying the user input as the attention event (e.g., processing the user input as an input other than an attention event or forgoing processing an erroneous user input), as shown in FIG. 6U. The above-described manner of detecting and recording the detection of a variety of user attention events allows the electronic device to present information about how often the user interacts with the electronic device, which simplifies interactions between the user and the device and enhances operability of the device (e.g., by conveying usage information in a way that is meaningful to the user), which additionally reduces power usage and improves battery life of the device by enabling the user to use the device more quickly and efficiently (e.g., by encouraging the user to use their phone less often and therefore more efficiently)).

In some embodiments, the visual indication of the first respective usage metric includes (798-26) a visual indication of a number of detected attention events during a restricted usage mode (e.g., "device downtime" or "bedtime") of the electronic device (e.g., the electronic device displays a metric indicative of the number of times the electronic device detected a user attention event during the restricted usage mode), as shown in FIG. 6U. The restricted usage mode described here is optionally the same or similar to the restricted usage mode described with reference to method 1100. The above-described manner of displaying a metric indicative of the number of attention events during the restricted usage mode allows the electronic device to present information about how often the user interacts with the electronic device during times that are restricted, which simplifies interactions between the user and the device and enhances operability of the device (e.g., by conveying usage information in a way that is meaningful to the user), which additionally reduces power usage and improves battery life of the device by enabling the user to use the device more quickly and efficiently (e.g., by encouraging the user to use their phone outside of the restricted mode therefore more efficiently).

In some embodiments, prior to displaying (798-28) the dashboard user interface, the electronic device presents an indication of a notification associated with the dashboard user interface (e.g., a daily or weekly "digital health" notification), the notification including an affordance selectable to display the dashboard user interface (e.g., a soft button or other user interface element), as shown in FIGS. 6K-L. In some embodiments, the notification includes a visual indication of the device usage over the past day, past week, or another period of time. The indication is optionally selectable to display the dashboard user interface. The dashboard user interface is optionally displayed in response to detecting a user input selecting the affordance (e.g., the electronic device presents a "digital health" notification including a summary of one or more usage metrics at the start of the week or the start of the day). In some embodiments, a weekly "digital health" notification is presented at the start of the week including a summary of the overall device usage for the previous week. The summary optionally includes a visual indication of the amount of time the device was used to present information using each of a plurality of applications and/or categories of applications and an indication comparing overall device usage to previous weeks (e.g., percent over or under average weekly usage). In some embodiments, a daily "digital health" notification is presented at the start of the day including a summary of the overall device usage for the previous day. The summary optionally includes a visual indication of the amount of time the device was used to present information using each of a plurality of applications and/or categories of applications and an indication comparing overall device usage to previous days (e.g., percent over or under average daily usage). Other time intervals are possible (e.g., monthly usage, etc.). The above-described manner of displaying the dashboard user interface in response to a selection of a "digital health" notification allows the electronic device to remind the user to check their usage metrics and present more detailed metrics from a notification including a summary of the metrics, which simplifies interactions between the user and the device and enhances operability of the device (e.g., by presenting a summary of usage as a notification and more details in response to a user input for presenting more details about usage), which additionally reduces power usage and improves battery life of the device by enabling the user to use the device more quickly and efficiently.

In some embodiments, prior to displaying the dashboard user interface, the electronic device displays (798-30) a widgets user interface, the widgets user interface comprising one or more widgets, each widget including a secondary user interface of an application accessible on (e.g., installed on or accessible via a network connection) the electronic device, as shown in FIGS. 6E-I (e.g., each widget comprises a user interface object (e.g., a window) including text and/or an image associated with an application (e.g., a weather widget displaying the current temperature, a sports widget displaying scores to live events, a news widget displaying the headlines of recent events, and or any user interface object displaying content associated with the application)). In some embodiments, the content of the widget corresponding to the application is updated dynamically by the application. The one or more widgets optionally include a metrics widget associated with the dashboard user interface (e.g., a widget associated with the digital health dashboard and/or the digital health settings). In some embodiments, the metrics widget includes (798-32) a visual indication of a respective usage metric (e.g., a bar chart indicating the total time the electronic device was used to present information over the past week using each of a plurality of applications or groups of applications), as shown in FIGS. 6E-6I. In some embodiments, other time periods and/or operations are possible. In some embodiments, the widget further includes an indication comparing the usage over the time period to previous usage (e.g., percentage above or below the average usage for a week). In some embodiments, the metrics widget is selectable (798-34) to display the dashboard user interface (e.g., the widget expands to include more metrics, such as the second metric or the electronic device presents a dashboard user interface within a settings application), and the dashboard user interface is optionally displayed (798-36) in response to detecting a user input selecting the metrics widget (e.g., the dashboard user interface is displayed in response to the user selecting the metrics widget, or expanding the metrics widget), as shown in FIGS. 6E-6I. The widget user interface described herein is optionally the same or similar to the widget user interfaces described with reference to methods 900, 1100 and 1300. The above-described manner of displaying the dashboard user interface in response to a selection of a metrics widget allows the electronic device to present one of the usage metrics (e.g., the first usage metric) in a top-level user interface (e.g., the widgets user interface) and provide a way for the user to enter an input to view more detailed metrics while viewing the metrics widget, which simplifies interactions between the user and the device and enhances operability of the device (e.g., by presenting a summary of usage as a widget and more details in response to a user input for presenting more details about usage), which additionally reduces power usage and improves battery life of the device by enabling the user to use the device more quickly and efficiently.

In some embodiments, prior to displaying the dashboard user interface, the electronic device displays (798-38) a usage settings user interface of the electronic device (e.g., a settings user interface associated with device usage or a "digital health" settings user interface that is a settings user interface of the operating system of the electronic device, and not a settings user interface of any particular application on the electronic device), as shown in FIGS. 6DD-6EE. The usage settings user interface optionally includes one or more soft buttons selectable to display a user interface for changing a setting associated with device usage. In some embodiments, the settings include setting one or more time intervals to operate the device in a restricted usage mode (e.g., device downtime or a bedtime mode), usage limits (e.g., "allowances") for one or more applications, categories of applications, or overall device usage, one or more whitelisted applications (e.g., phone, messaging, maps, etc.) or functions of applications (e.g., calling or receiving calls from a specific contact), and/or one or more privacy and content settings). In some embodiments, the usage settings user interface comprises a visual indication (798-40) of a respective usage metric (e.g., a bar chart indicating the total time the electronic device was used to present information over the past week using each of a plurality of applications or groups of applications), as shown in FIG. 6DD. In some embodiments, other time periods and/or operations are possible. In some embodiments, the widget further includes an indication comparing the usage over the time period to previous usage (e.g., percentage above or below the average usage for a week). The user settings user interface optionally comprises an affordance selectable to display (798-42) the dashboard user interface (e.g., a selectable image or selectable text that, when selected, causes the electronic device to update the display to present the dashboard user interface). In some embodiments, the visual indication of the first usage metric is selectable to display the dashboard user interface), as shown in FIGS. 6DD-6EE. In some embodiments, the dashboard user interface is displayed in response to receiving a user input selecting (e.g., the user touches a location on a touch screen at which the visual indication of the fourth usage metric is displayed) the affordance (e.g., the settings application of the electronic device includes a usage settings user interface for changing one or more usage settings of the electronic device). The usage settings user interface optionally includes the visual indication of the fourth usage metric which is selectable to display the dashboard user interface. In some embodiments, the fourth usage metric is the amount of time the device was used to present information over a predetermined time period (e.g., the current day, the current week, etc.) for each of a plurality of applications or categories of applications used during the time period. The visual indication optionally further indicates a usage limit or "allowance" set for the electronic device defining a maximum amount of time the electronic device is able to present information without one or more usage restrictions. The above-described manner of displaying the dashboard user interface in response to a selection of a visual indication in the usage settings user interface allows the electronic device to concurrently present a usage metric and one or more usage settings of the electronic device and provide a way for the user to enter an input to view more detailed metrics while viewing the usage settings, which simplifies interactions between the user and the device and enhances operability of the device (e.g., by presenting a summary of usage in the settings user interface and more details in response to a user input for presenting more details about usage), which additionally reduces power usage and improves battery life of the device by enabling the user to use the device more quickly and efficiently.

In some embodiments, the usage settings user interface comprises (798-44) one or more visual indications of one or more requests received from other electronic devices (e.g., via a network connection (e.g., a wired or wireless connection), as shown in FIG. 6B. In some embodiments, the electronic device and the other electronic devices are associated with a group or family account) to modify one or more usage restrictions in effect on the other electronic devices (e.g., a request to remove or increase an overall usage limit (e.g., "allowance") for the other electronic device, remove or increase an application- or application category-specific usage limit (e.g., "allowance") for the other electronic device, or to authorize the other electronic device to exit a restricted operation mode (e.g., device downtime or "bedtime" mode), as shown in FIG. 6C. In some embodiments, the visual indications each comprise a displayed image or displayed text indicative of the request. In some embodiments, a text indication merely indicates that a request has been received or includes details about the request (e.g., the identity of the other device, the specific restriction associated with the request, the identity of the user making the request, etc.). The visual indication is optionally selectable to display one or more options for approving or denying the request. The above-described manner of displaying a visual indication of a request to modify one or more usage restrictions of other devices allows the electronic device to concurrently present the request and a usage metric, and provide a way for the user to change a usage setting of the other device, which simplifies interactions between the user and the device and enhances operability of the device (e.g., by presenting usage settings for the electronic device and the other electronic device in one user interface), which additionally reduces power usage and improves battery life of the device by enabling the user to use the device more quickly and efficiently.

In some embodiments, the electronic device and one or more other electronic devices are associated (798-46) with a user group account (e.g., a family sharing group), as shown in FIG. 6B. In some embodiments, the electronic devices associated with the user group account are able to share access to files (e.g., documents, photos, etc.) and applications (e.g., if a user in the user group account purchases an application to download it, the other electronic devices are able to download the application without separately purchasing it). The user group account optionally includes parent users and child users and allows the electronic devices associated with the parent users to control one or more settings (e.g., content, privacy, usage, and other settings) of the one or more devices associated with child users). The usage settings user interface optionally comprises (798-48) one or more affordances (e.g., selectable text or images) associated with the one or more other electronic devices, the one or more affordances selectable (e.g., by touch input, mouse input, keyboard input, voice input, etc.) to update the dashboard user interface to cease displaying (798-50) the visual indications of usage metrics associated with the electronic device, and display (798-52) one or more visual indication of one or more usage metrics (e.g., presenting information at the other electronic device, receiving a notification at the other electronic device, detecting a user attention event at the other electronic device, etc.) associated with the other electronic device associated with the selected affordance (e.g., one or more usage metrics associated with the other electronic device), as shown in FIGS. 6V-6W. In some embodiments, parents are able to view a dashboard user interface for each of the children's devices to monitor the usage of the child device and set one or more usage restrictions (e.g., usage limits (e.g., "allowances")) or times in which the child device enters a restricted usage mode (e.g., device downtime or "bedtime"). The electronic device optionally determines which permissions (e.g., to view metrics and/or set usage limits and restricted operation time periods) to afford each user account based on the classification of the user account (e.g., as a parent, child, etc.) associated with the electronic device or an option selected when setting up the device. In some embodiments, the electronic device displays a usage metric (e.g., total device usage or screentime) associated with each electronic device associated with the user group account in the settings user interface. Optionally, each parent device displays a metric associated with each of the child devices but the child devices optionally do not display metrics associated with any other devices associated with the user group accounts and the parent devices optionally do not display metrics associated with electronic devices associated with the other parent user account(s) associated with the user group account. The above-described manner of displaying one or more metrics associated with the other devices in the user group account allows the electronic device to provide easy access to usage information for multiple devices in the user group, which simplifies interactions between the user and the device and enhances operability of the device (e.g., by presenting a settings user interface in which the user is able to modify one or more usage settings of the other devices), which additionally reduces power usage and improves battery life of the device by enabling the user to use the device more quickly and efficiently.

In some embodiments, the usage settings user interface comprises (798-54) an affordance selectable to delete usage data for the electronic device (e.g., data related to device usage such as time or a number of times presenting information, receiving notifications, detecting user attention events, etc. In some embodiments, deleting all usage data causes the usage metrics of the electronic device to be reset), as shown in FIG. 6A. In some embodiments, the method further comprises receiving (798-56), at the one or more input devices, a user input selecting the affordance selectable to delete the usage data (e.g., receiving a touch at a location on the touch screen at which the affordance is displayed, receiving a selection of the affordance with a mouse or keyboard input, etc.) and in response to receiving the input, deleting (798-58) the usage data. The above-described manner of presenting an option to delete all usage data allows the electronic device to reset the usage metrics in response to a user request to do so, which simplifies interactions between the user and the device and enhances operability of the device (e.g., presenting usage metrics indicative only of data collected after the data was deleted), which additionally reduces power usage and improves battery life of the device by enabling the user to use the device more quickly and efficiently.

In some embodiments, the usage settings user interface comprises (798-60) an affordance selectable to stop recording usage data for the electronic device (e.g., data related to device usage such as time or a number of times presenting information, receiving notifications, detecting user attention events, etc.), as shown in FIG. 6A. In some embodiments, when data collection is stopped, the usage metrics stop updating, but are retained in their current states. In some embodiments, the method further comprises receiving (798-62), at the one or more input devices, a user input selecting the affordance selectable to stop recording usage data (e.g., receiving a touch at a location on the touch screen at which the affordance is displayed, receiving a selection of the affordance with a mouse or keyboard input, etc.) and in response to receiving the input, ceasing (798-64) to record the usage data for the electronic device (e.g., with or without deleting all usage data). The above-described manner of presenting an option to stop recording usage data allows the electronic device to give the user control over which data are reflected in the usage metrics, which simplifies interactions between the user and the device and enhances operability of the device (e.g., presenting usage metrics excluding user-defined periods of time), which additionally reduces power usage and improves battery life of the device by enabling the user to use the device more quickly and efficiently.

In some embodiments, the electronic device requires (798-66) authentication credentials to display the dashboard user interface or to modify a setting associated with device usage (e.g., a passcode different from a passcode for unlocking the electronic device or a passcode for logging into a user account at the electronic device) to set or to change one or more usage settings of the electronic device, as shown in FIGS. 6Y-6CC (e.g., the electronic device receives, at the one or more input devices, a user input selecting the affordance selectable to require the passcode (e.g., receiving a touch at a location on the touch screen at which the affordance is displayed, receiving a selection of the affordance with a mouse or keyboard input, etc.)). In some embodiments, in response to receiving the input, the electronic device presents a user interface for setting the passcode (e.g., the electronic device displays text requesting that the user input the usage data passcode and a soft keypad for entering the passcode). While the passcode is required (e.g., in response to setting or activating the passcode), the electronic device optionally receives, at the one or more input devices, a user input for selecting one of the affordances selectable to display the settings user interface for changing the setting associated with device usage (e.g., receiving a touch at a location on the touch screen at which the affordance is displayed, receiving a selection of the affordance with a mouse or keyboard input, etc.). In response to the user input, the electronic device optionally presents a prompt to enter the passcode (e.g., displaying or speaking a message indicating that a password is required to change the setting related to device usage). Optionally, the device displays a soft keypad at which the user is able to enter the password. In accordance with a determination that the entered passcode matches the passcode (e.g., the user enters the correct passcode), the electronic device optionally presents the usage settings user interface with the ability to change one or more of the settings. In accordance with a determination that the entered passcode does not match the passcode (e.g., the user enters an incorrect passcode), the electronic device optionally forgoes presenting the usage settings user interface with the ability to change one or more of the settings (e.g., without the correct passcode, the electronic device does not allow the user to change the settings related to device usage). Optionally, the device presents an indication of the current settings (e.g., indications of one or more usage limits or time periods in which the device operates in the restricted usage mode) without the ability to make changes. The above-described manner of presenting an option to require a password to make changes to one or more settings associated with device usage allows the electronic device to prevent unauthorized changes to the one or more settings associated with device usage, which simplifies interactions between the user and the device and enhances operability of the device (e.g., allowing changes to be made at the electronic device in response to the correct passcode), which additionally reduces power usage and improves battery life of the device by enabling the user to use the device more quickly and efficiently.

In some embodiments, the usage settings user interface comprises (798-68) one or more affordances selectable (798-70) to modify settings associated with parental guidance ratings of content (e.g., settings to restrict access to content (e.g., applications, music, videos, etc.) having specified parental guidance ratings) and one or more affordances selectable (798-72) to modify settings associated with data privacy (e.g., settings to restrict sharing specified types of data, as shown in FIG. 6A (e.g., location, contacts, calendar data, reminders, photos, wireless connections, microphone, etc.)). The above-described manner of concurrently displaying the usage settings with parental guidance settings and data privacy settings allows the electronic device to present related settings in a shared user interface, which simplifies interactions between the user and the device and enhances operability of the device (e.g., presenting similar settings together), which additionally reduces power usage and improves battery life of the device by enabling the user to use the device more quickly and efficiently.

It should be understood that the particular order in which the operations in FIGS. 7A-7S have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1500) are also applicable in an analogous manner to method 700 described above with respect to FIGS. 7A-7S. For example, the usage metric dashboard user interface, usage metrics, notification metrics, device pickup metrics, usage restriction settings, etc., described above with reference to method 700 optionally have one or more of the characteristics of the usage metric dashboard user interface, usage metrics, notification metrics, device pickup metrics, usage restriction settings, etc. described herein with reference to other methods described herein (e.g., methods 900, 1100, 1300 and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7S are, optionally, implemented by components depicted in FIGS. 1A-1B. For example, displaying operations 702, 798-30, and 798-38 and receiving operations 714, 724, 798-56, and 798-62 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Application and Categorical Usage Limits

Users interact with electronic devices in many different manners, including using applications accessible on the device. In some circumstances, it is difficult for the user to monitor and limit usage of certain application during certain periods of time. The embodiments described below provide ways in which an electronic device enforces a usage limit and determines that the usage limit is reached when restriction criteria for certain applications or categories of applications are met, such as when an application usage limit associated with those applications is reached, thereby restricting a user's usage of particular applications that the user wishes to limit. Setting a usage limit on the electronic device for specific applications or categories of applications allows the electronic device to effectively limit a user's usage of particular device operations and provides an easy way for a user to set such usage limits, which make the usage of the device more efficient (e.g., the user does not have to monitor his or her own device usage, thus reducing the inputs provided by the user to the device (e.g., inputs for otherwise monitoring the user's usage)). For example, with the understanding that a usage limit is set, the user may use the limited operations more wisely and efficiently to perform all necessary tasks under the usage limit. If a usage limit is reached, the device restricts the user from using the restricted operations, thereby preventing the user from unknowingly going over the usage limit and spending more time on the device than intended), which, additionally, reduces power usage and improves battery life of the device by enabling the user to use the device more quickly and efficiently. It is understood that people use devices. When a person uses a device, that person is optionally referred to as a user of the device.

Figure 8A:
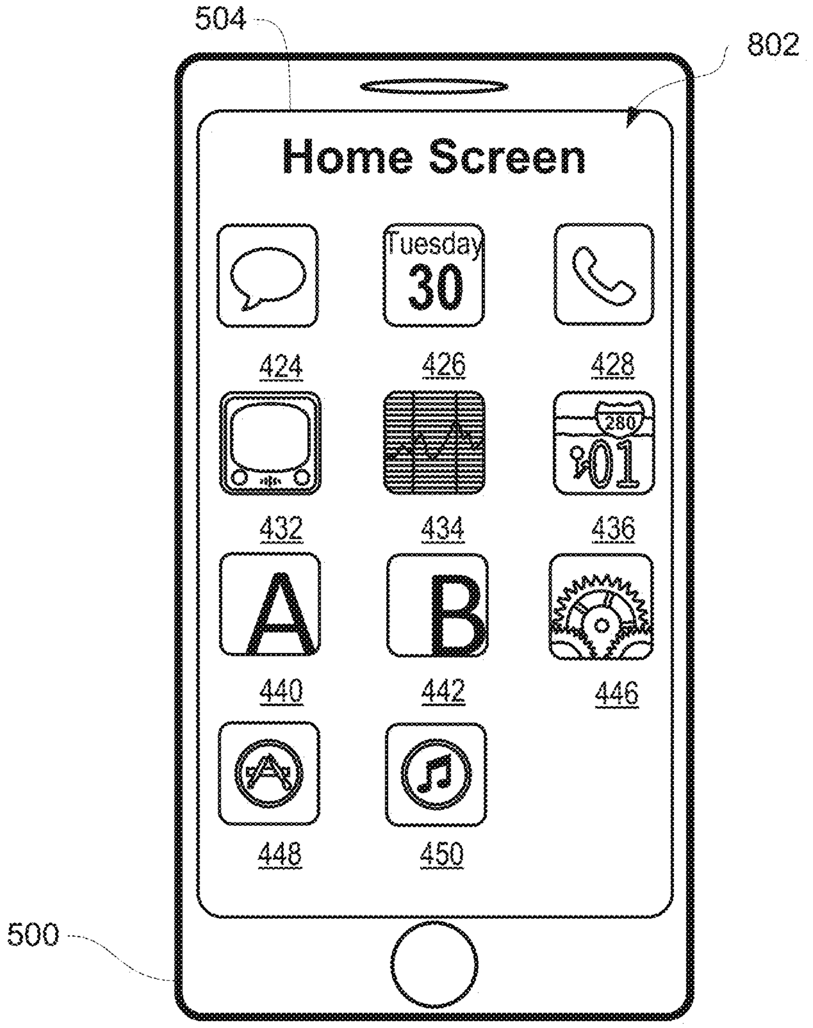
FIGS. 8A-8NNN illustrate exemplary ways in which usage limits are set, configured and/or enforced on an electronic device, in accordance with some embodiments of the disclosure.
Figure 8B:
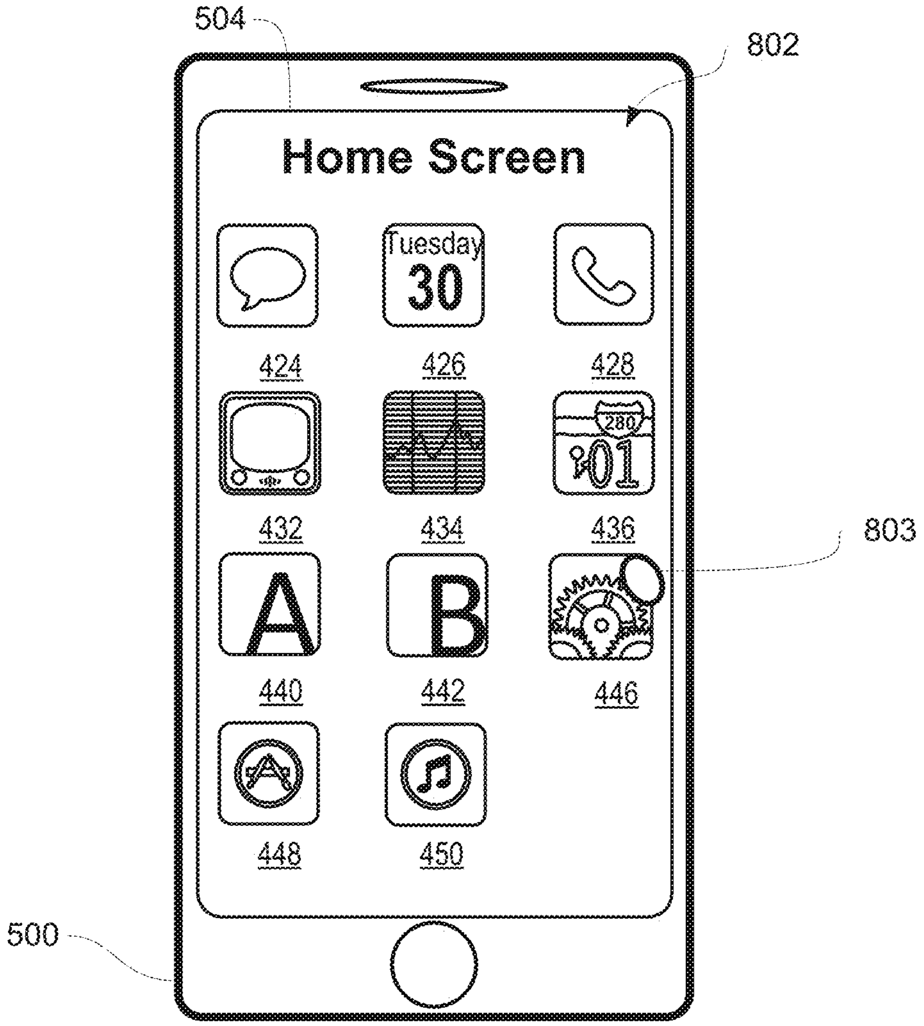
Figure 8C:
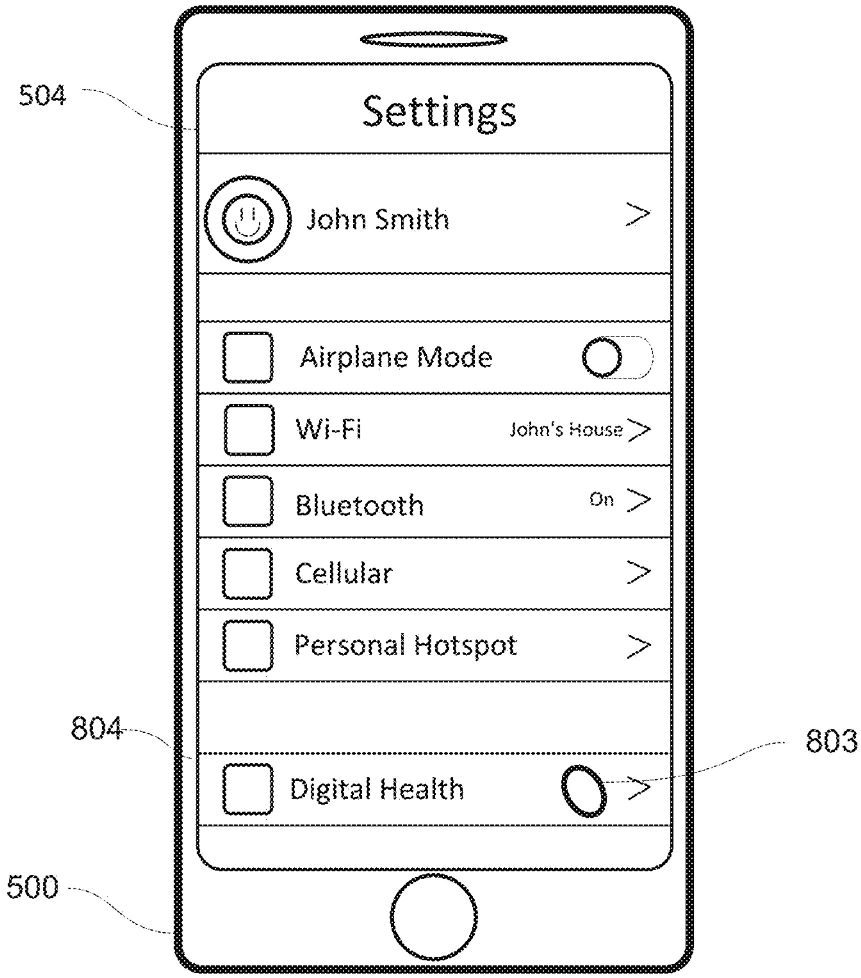
Figure 8D:
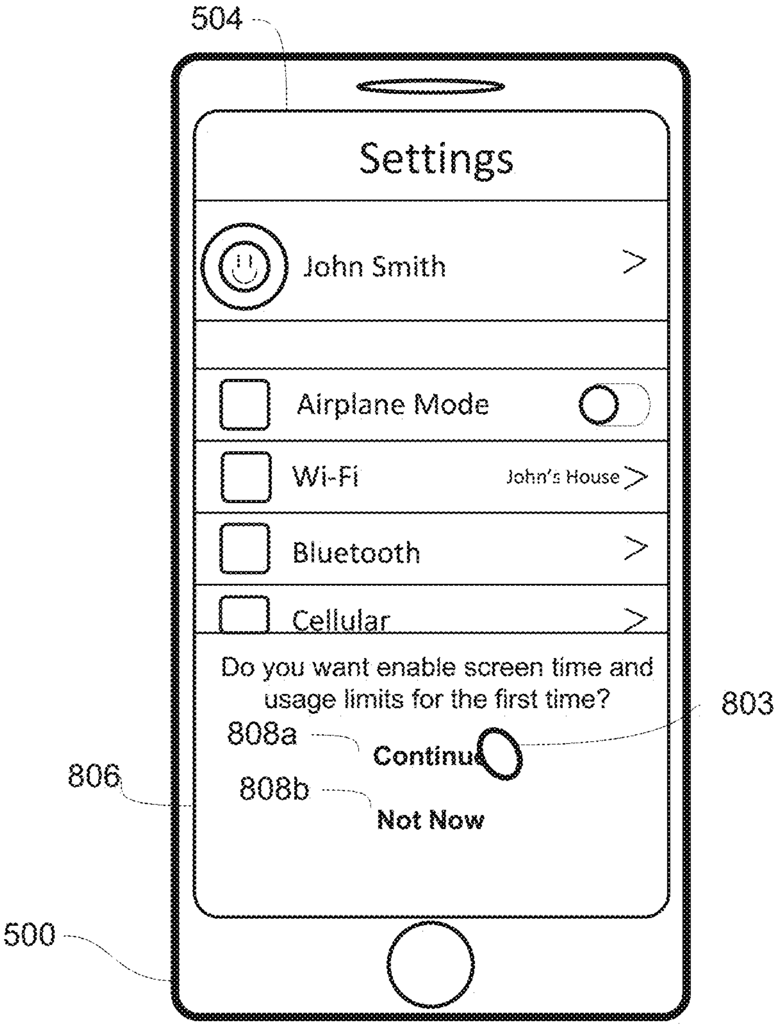
Figure 8E:
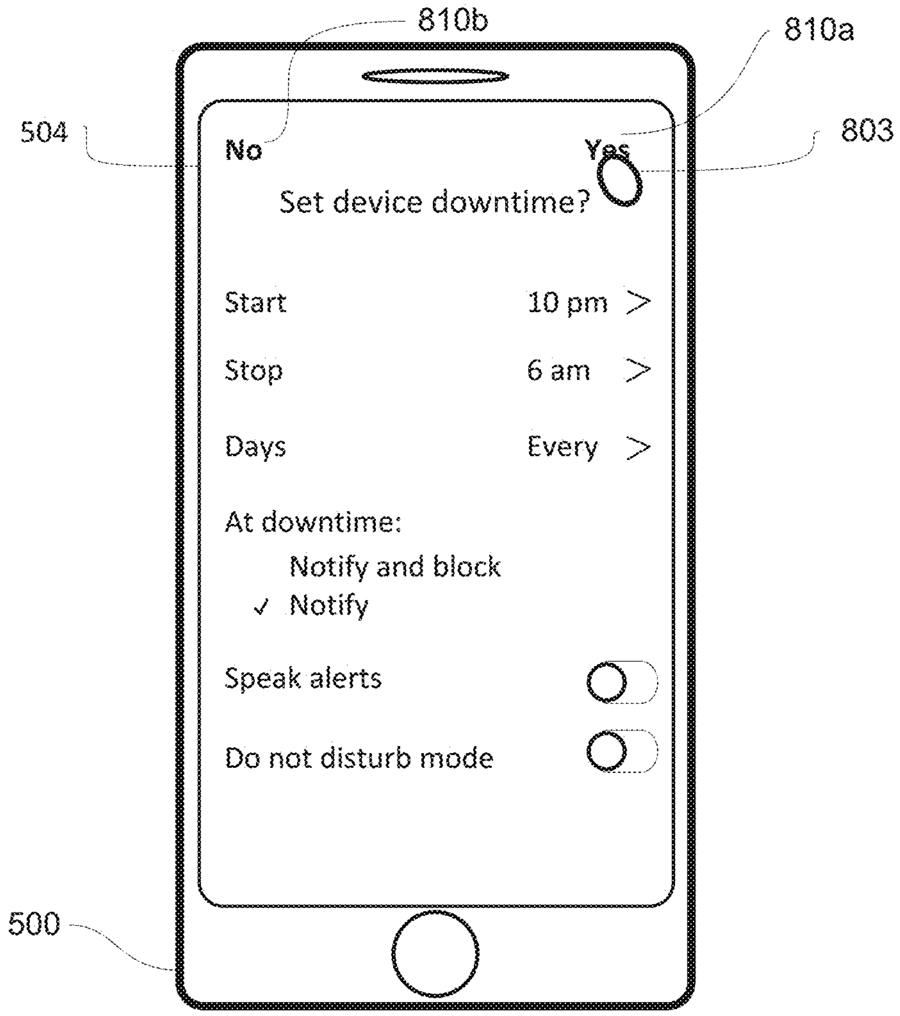
Figure 8F:
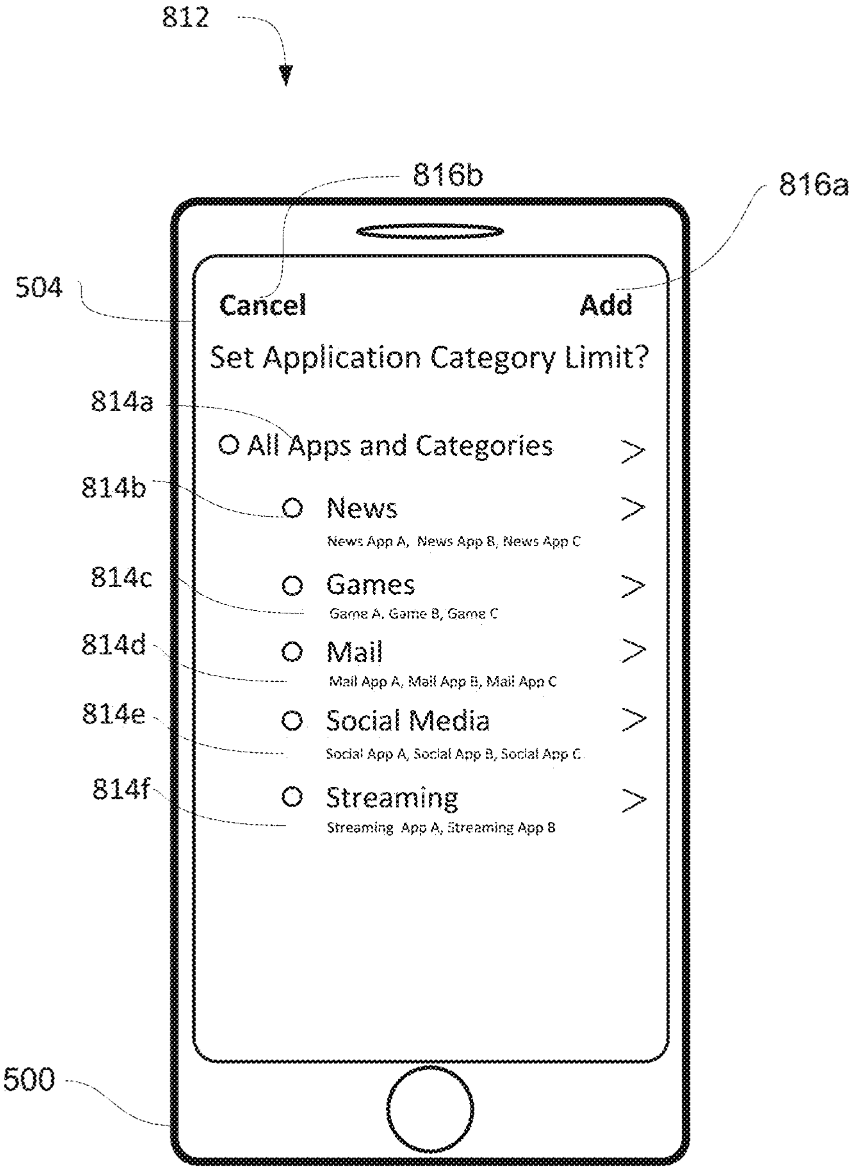
Figure 8G:
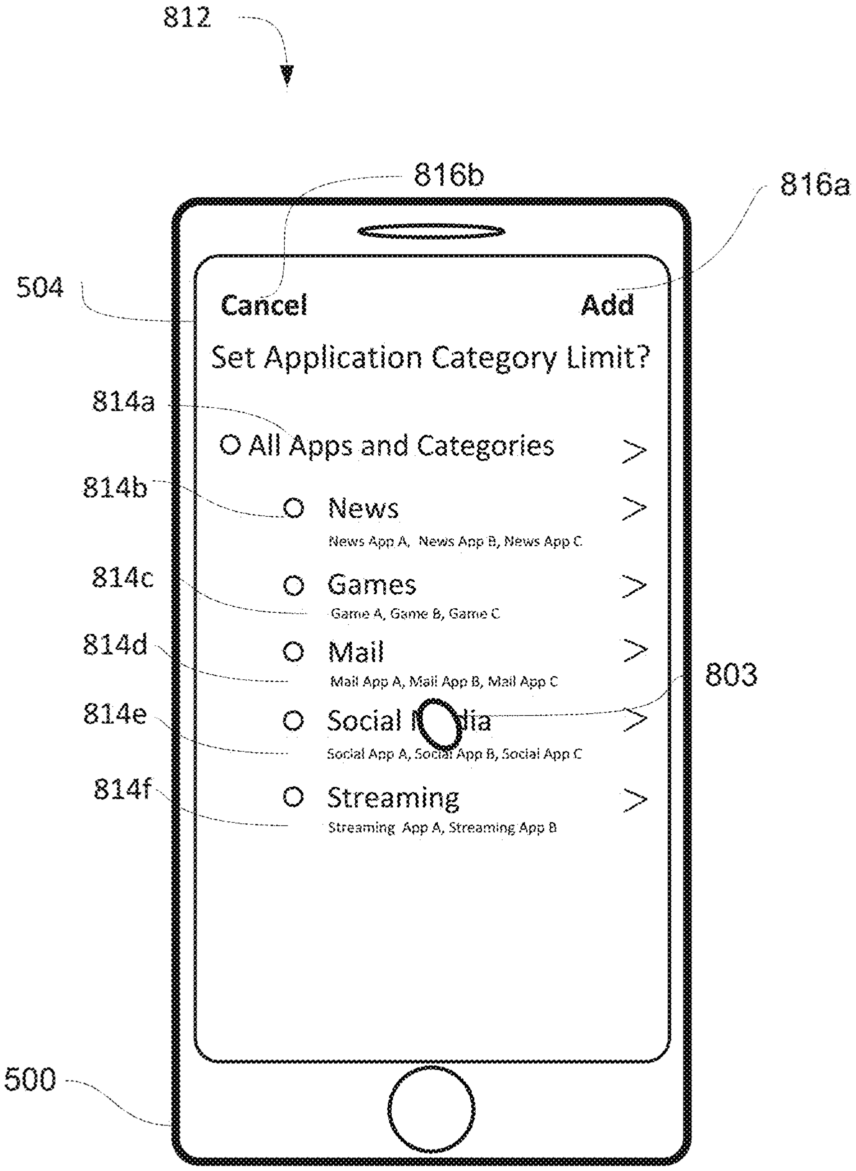
Figure 8H:
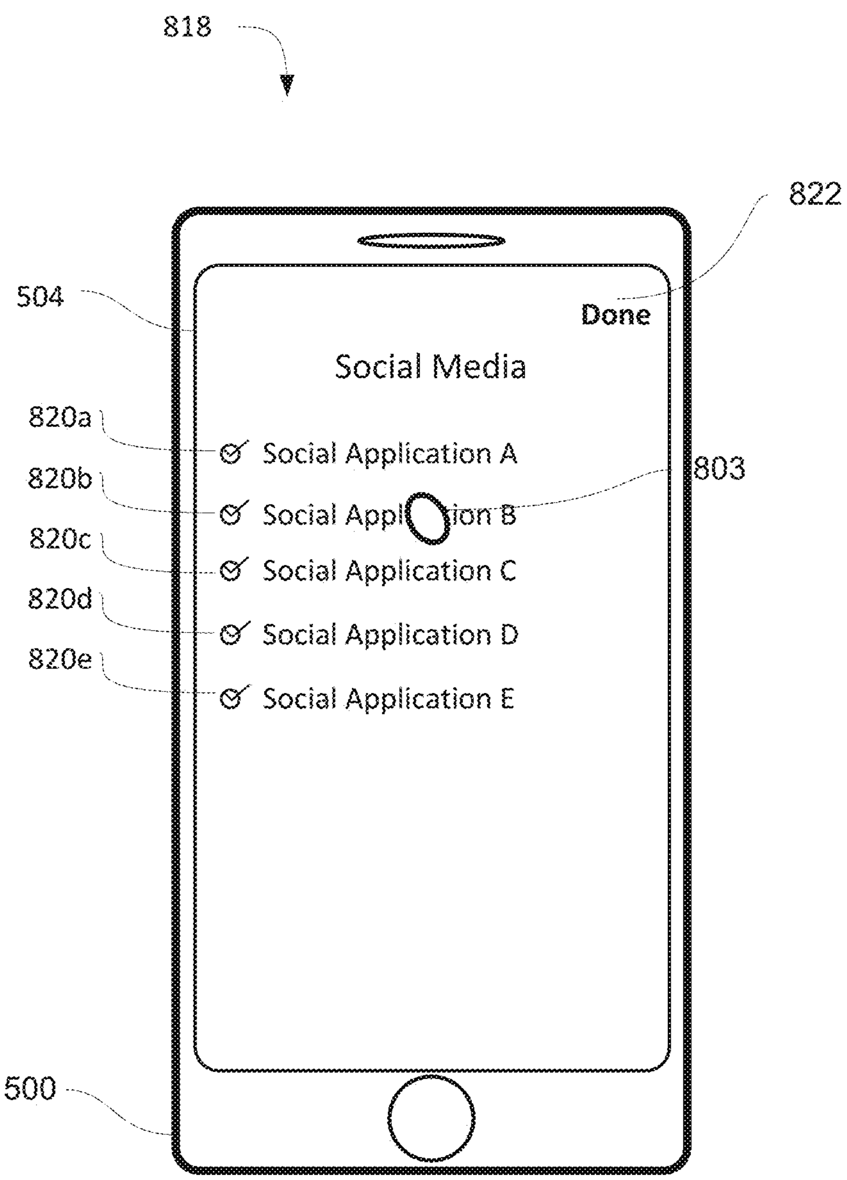
Figure 8I:
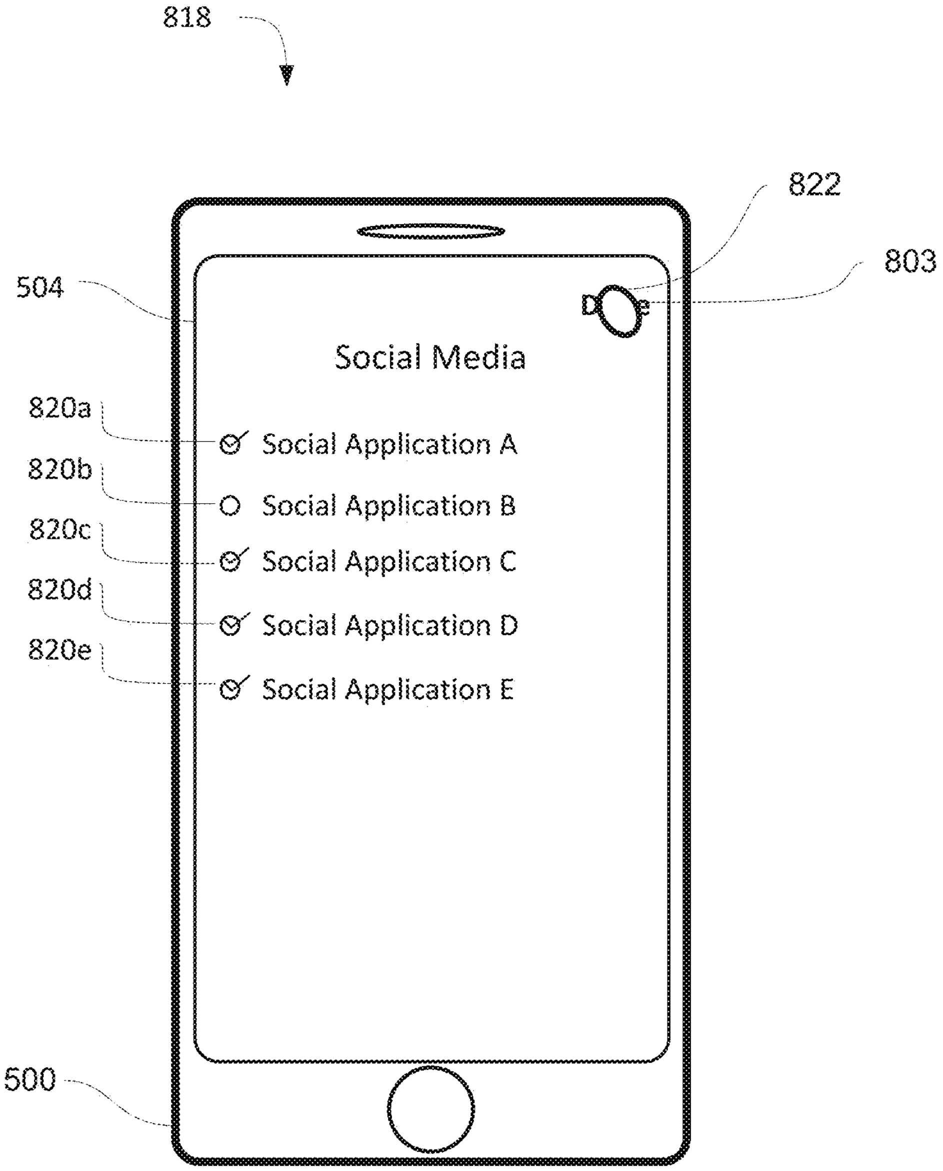
Figure 8J:
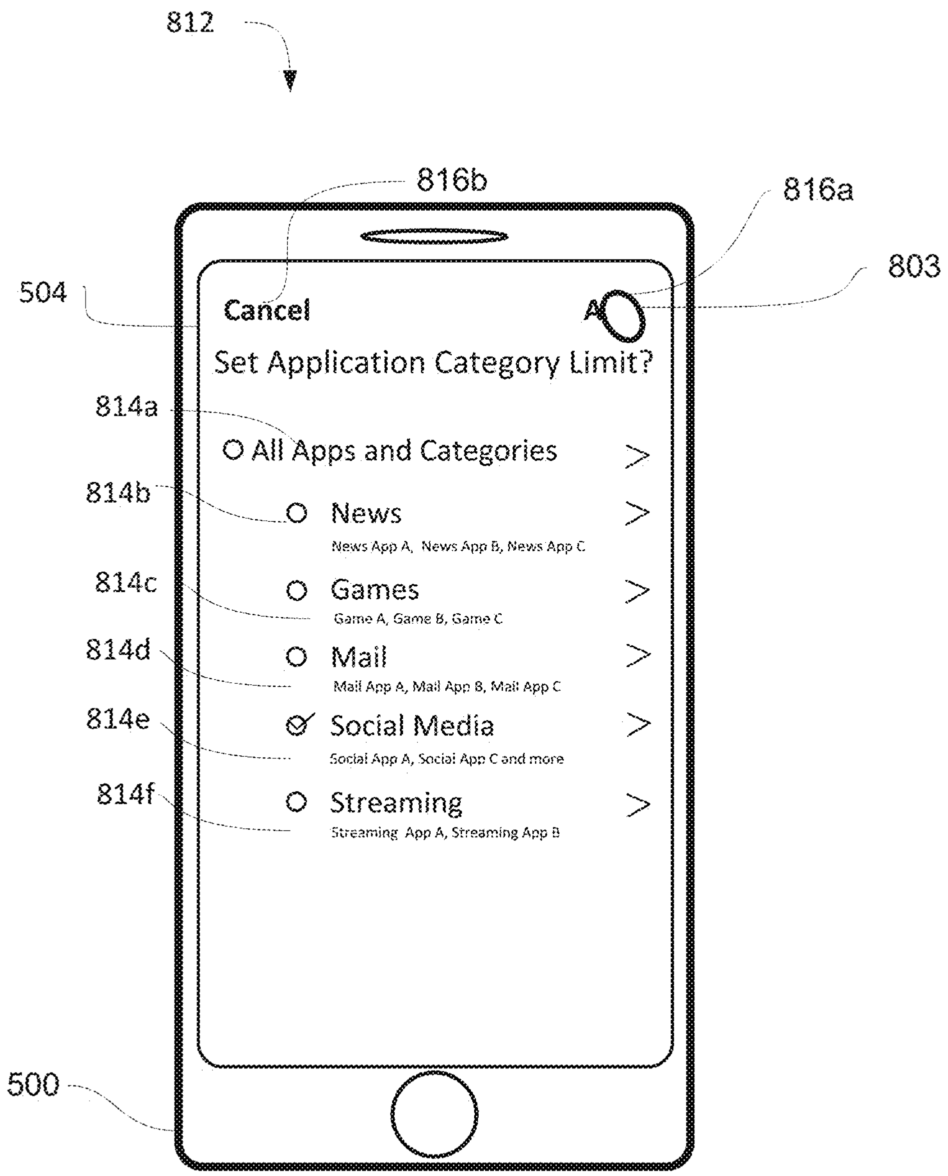
Figure 8K:
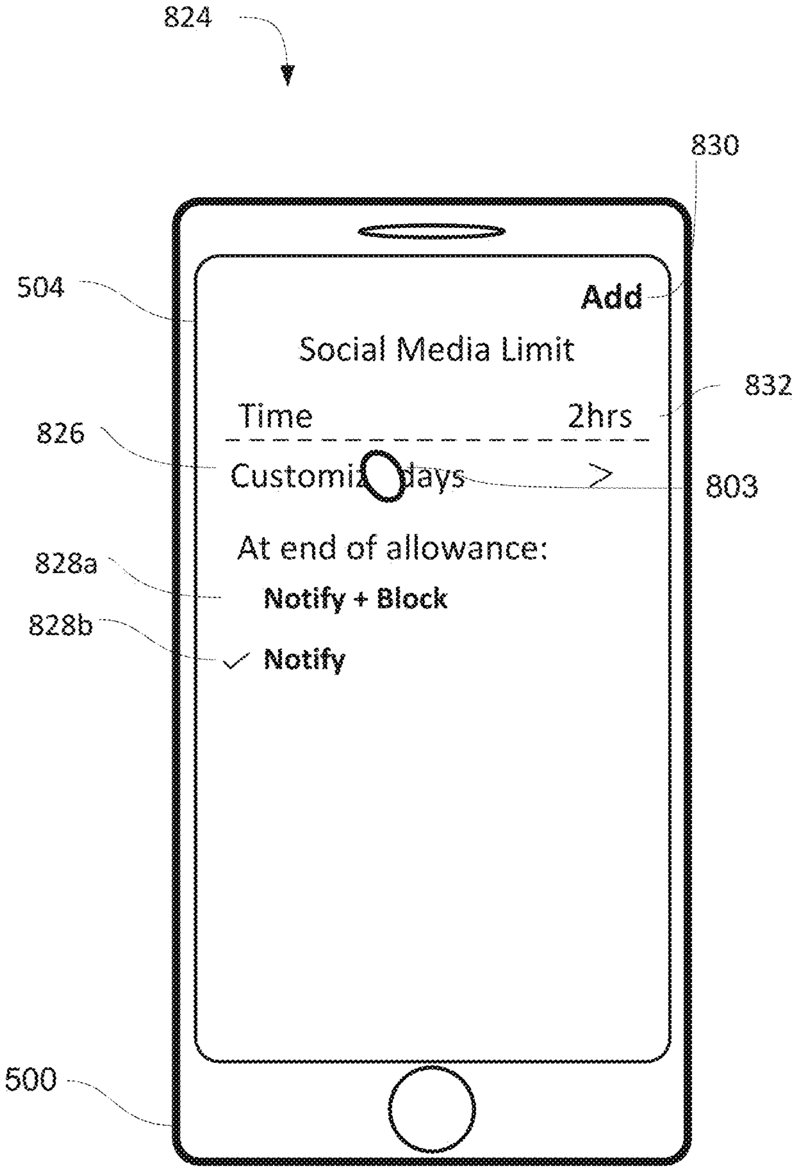
Figure 8L:
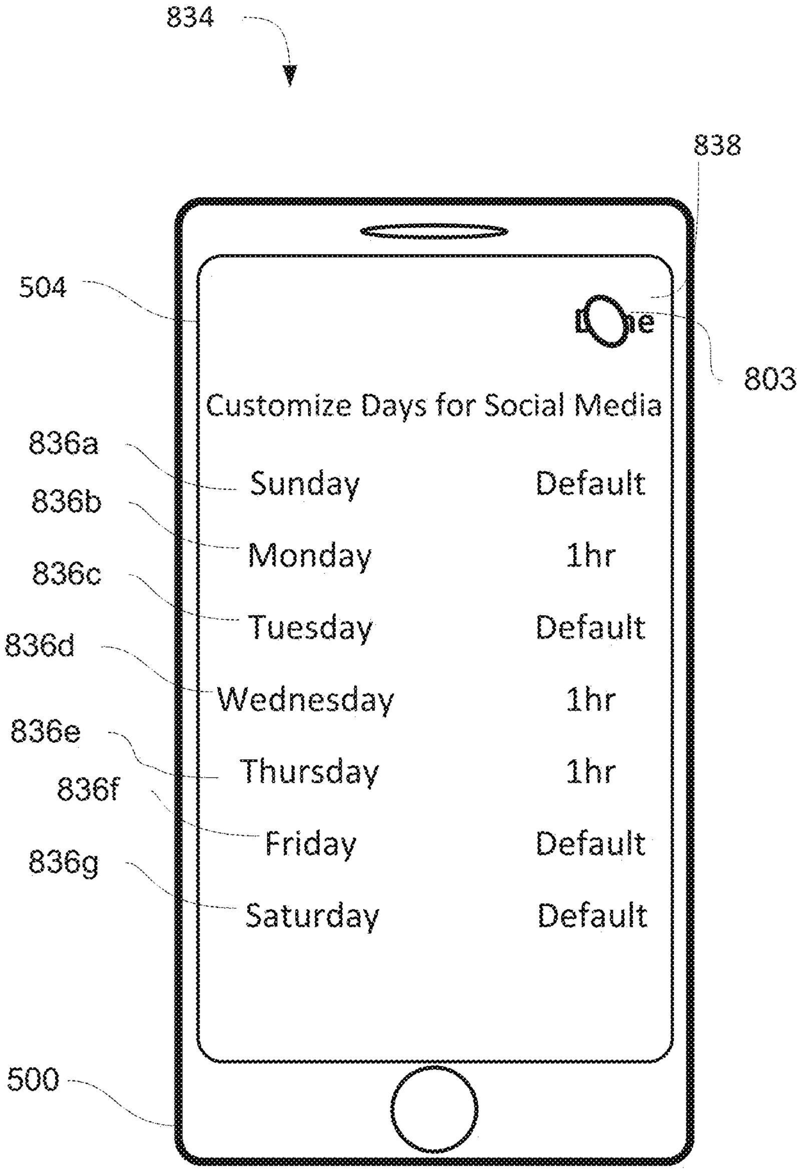
Figure 8M:
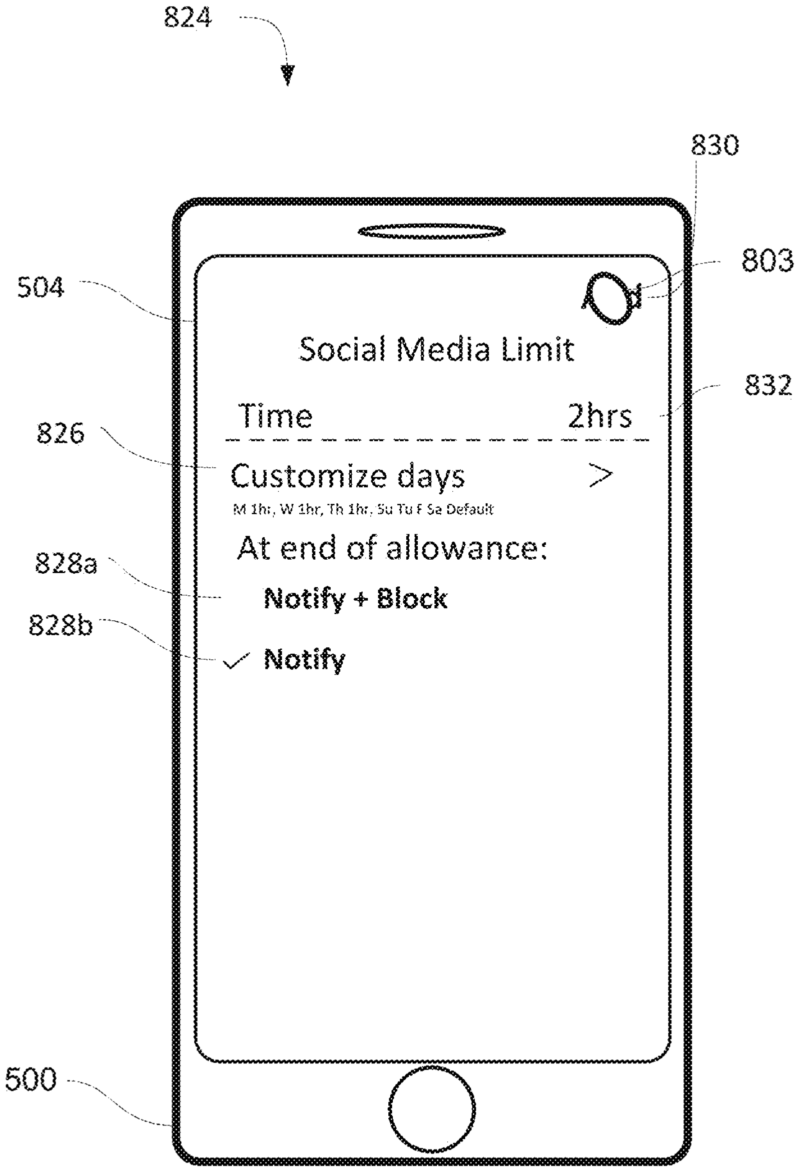
Figure 8N:
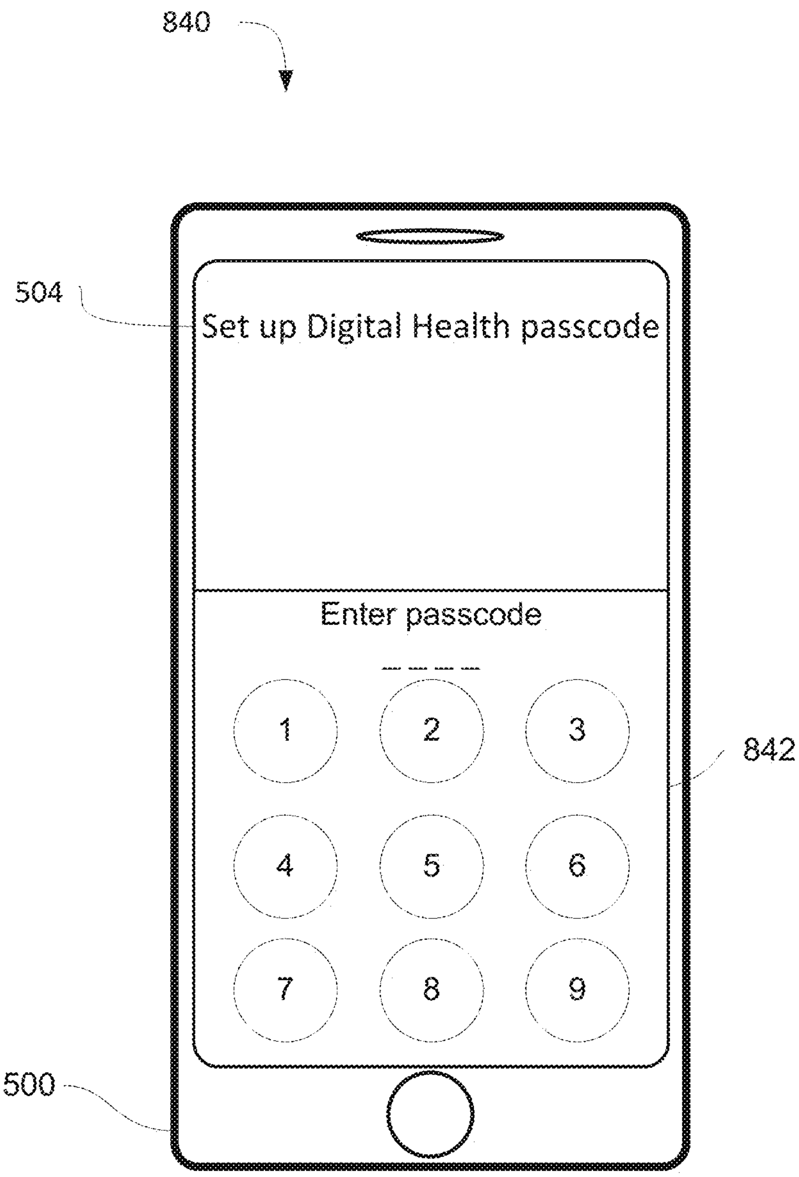

FIGS. 8A-8NNN illustrate exemplary ways in which usage limits are set, configured or enforced on an electronic device, in accordance with some embodiments of the disclosure. The embodiments in these figures are used to illustrate the processes described below, including the processes described with reference to FIGS. 9A-9K.

FIG. 8A illustrates exemplary device 500 with touch screen 504, described with reference to FIGS. 5A-5H. Touch screen 504 optionally displays one or more user interfaces that include various content. In the example illustrated in FIG. 8A, touch screen 504 displays home screen 802 at a time during which restriction criteria are not met on device 500 (e.g., a user-defined usage limit has not been reached, outside of one or more user-defined windows of time associated with a restricted usage mode). In some embodiments, the restriction criteria are met when a usage limit is reached for a given application or category of applications, as discussed below. In FIG. 8A, home screen 802 includes icons 424, 426, 428, 432, 434, 436, 440, 442, 444, 448 and 450 for launching or otherwise displaying different applications on device 500, as described above with reference to FIG. 4A.

Figure 8O:
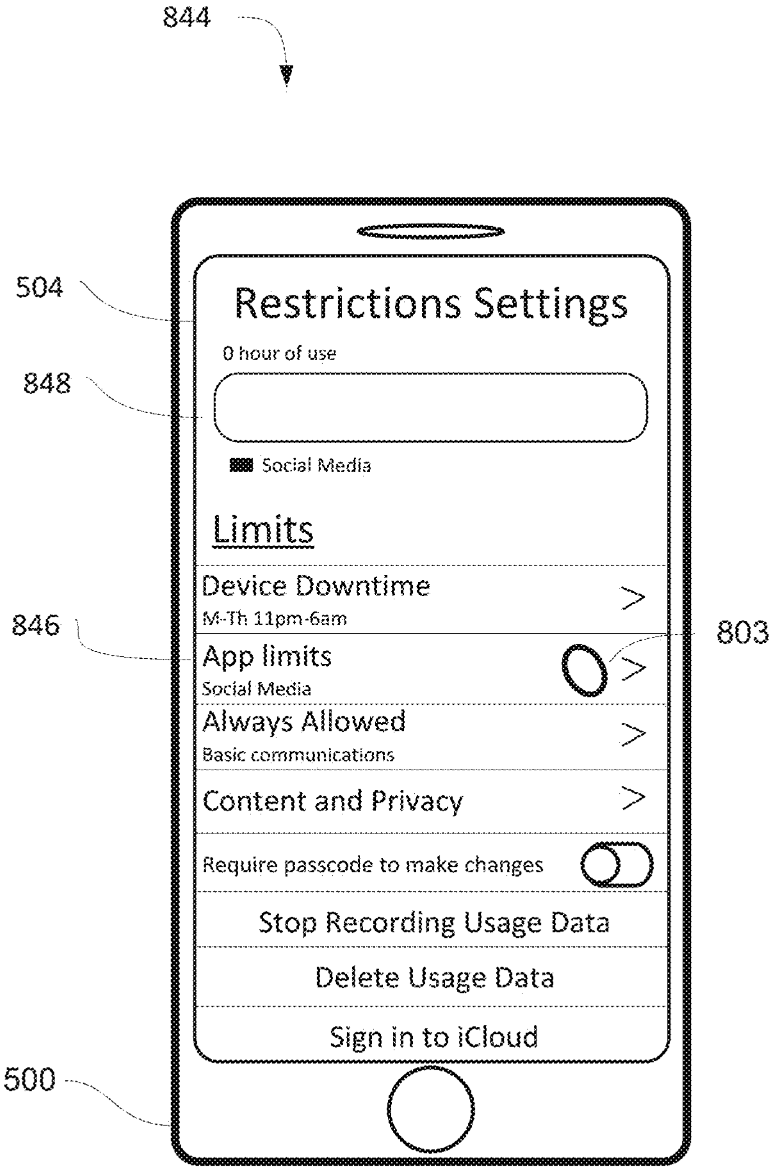
Figure 8P:
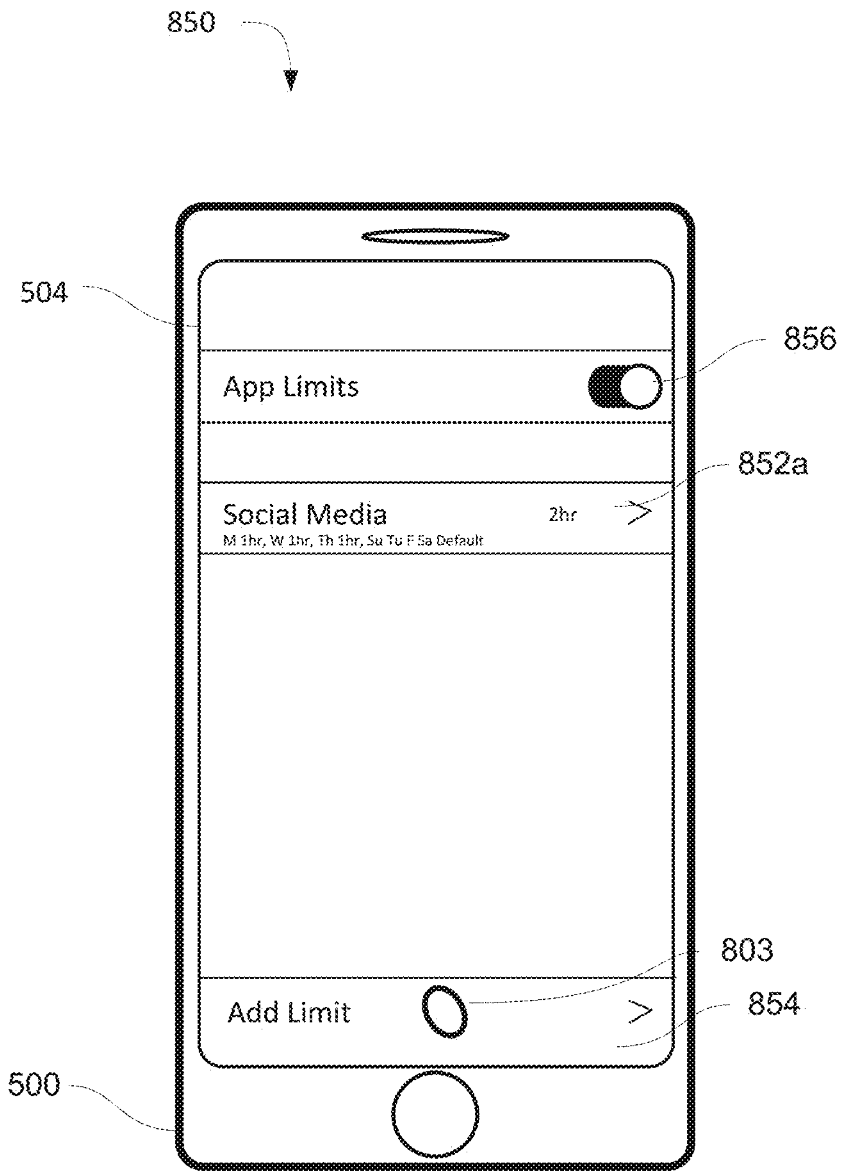
Figure 8Q:
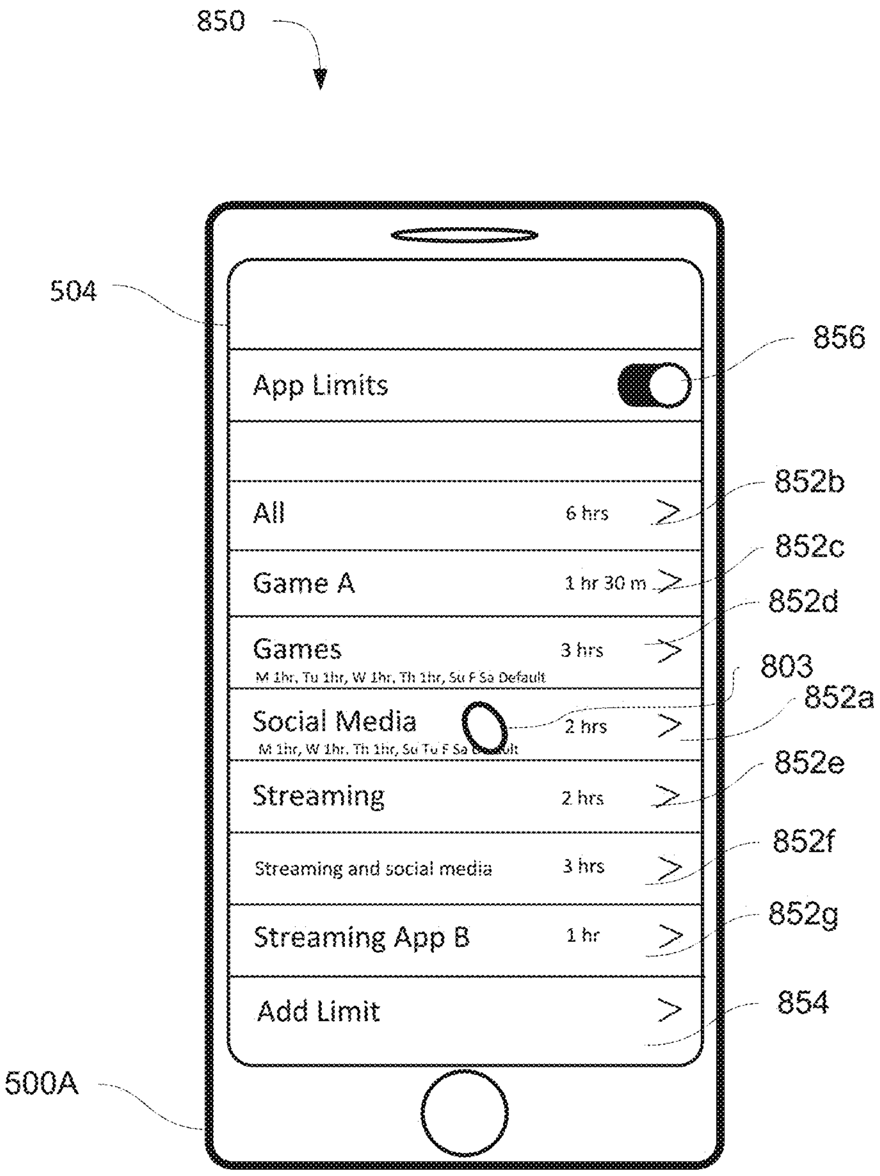
Figure 8R:
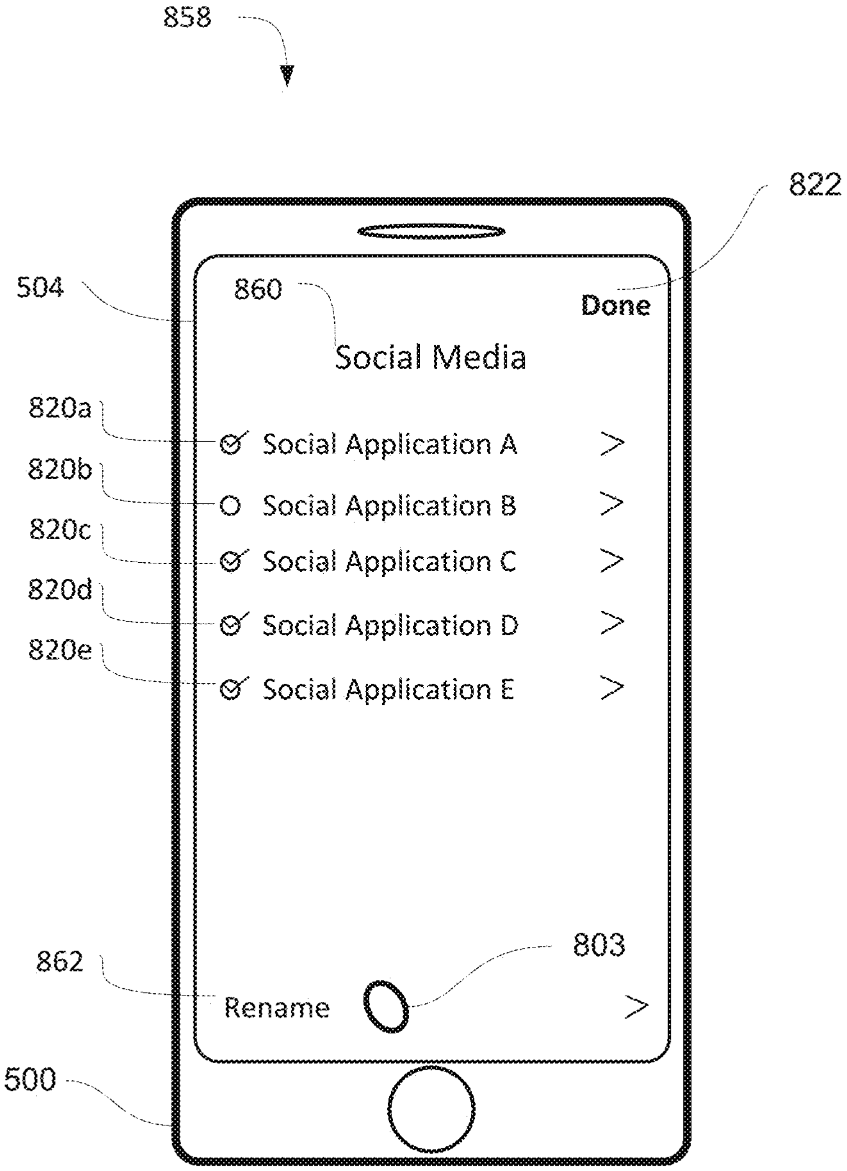
Figure 8S:
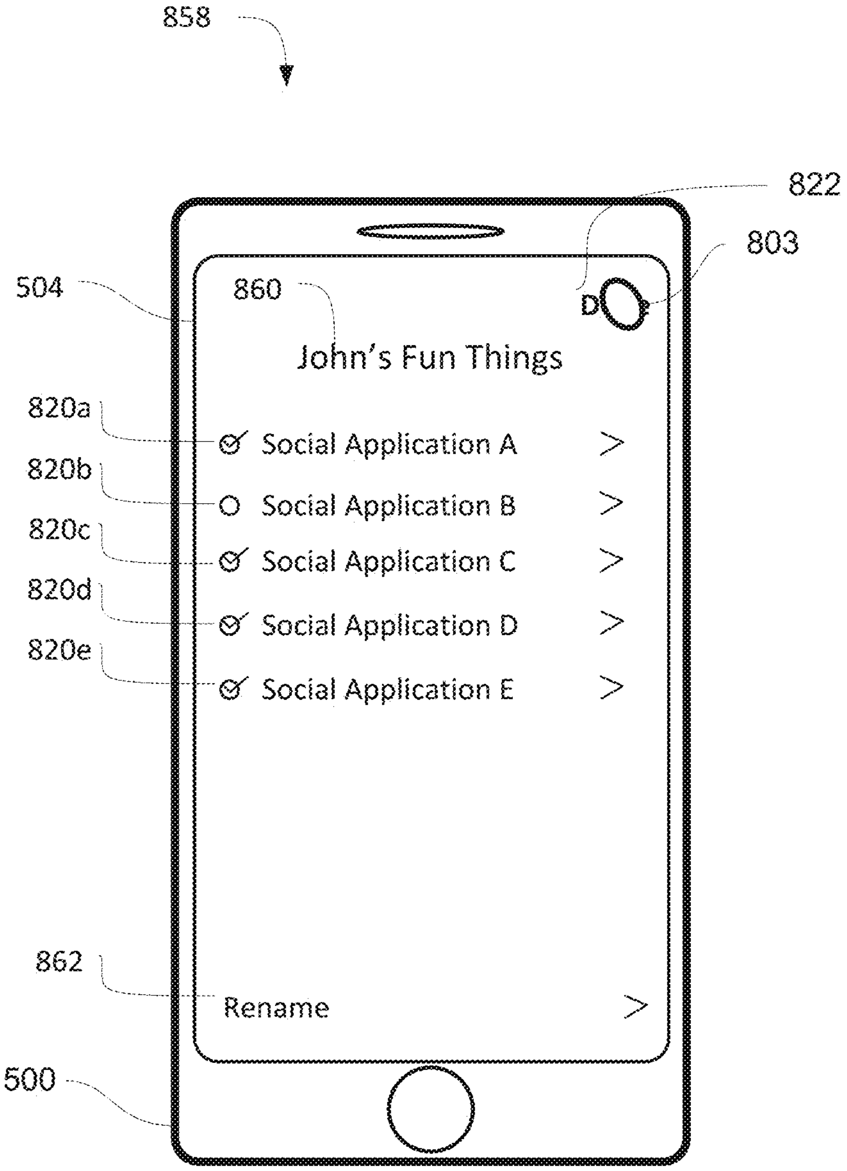
Figure 8T:
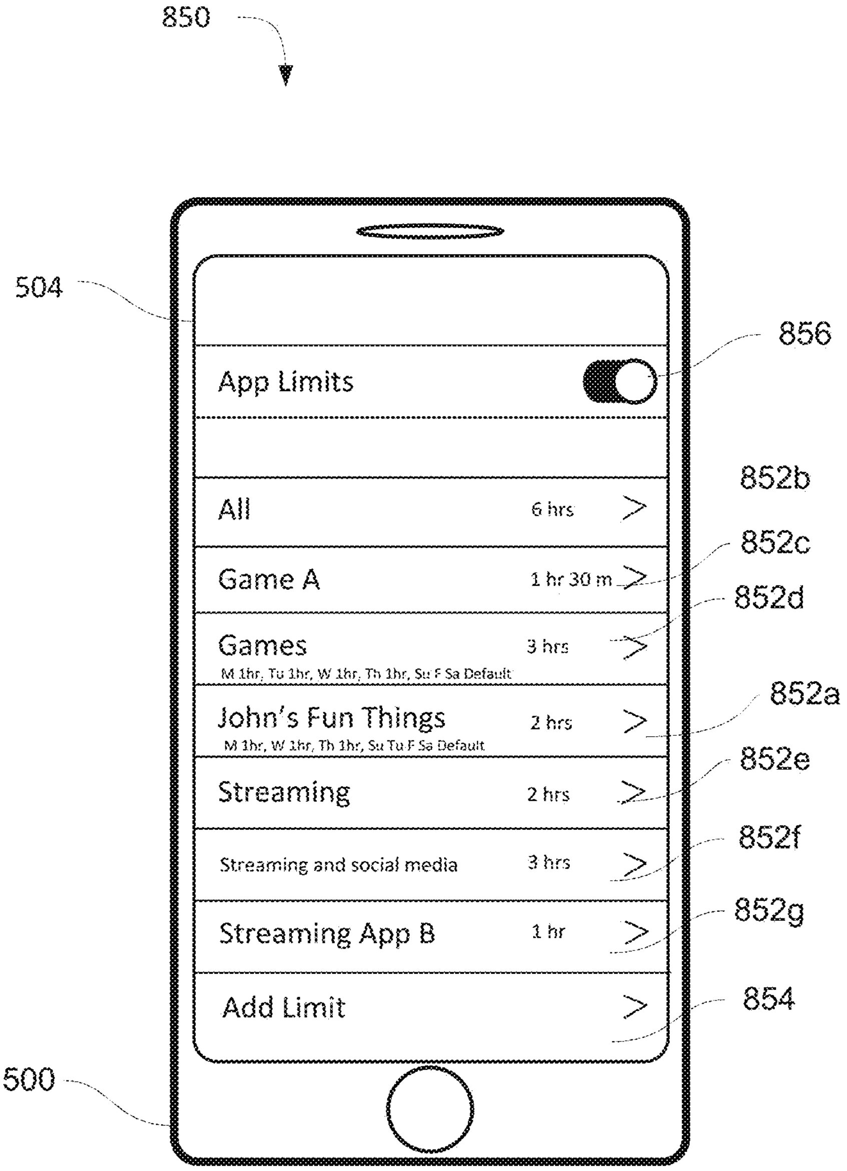

FIGS. 8B-8T illustrate exemplary methods of setting and defining usage limits on device 500 according to examples of the disclosure. In FIG. 8B, a touch object (e.g., a user's finger, a stylus, a hovering input object, a hovering input device and the likes) selects a settings application 446 from the home screen 802 (e.g., by providing contact 803). It is understood that the contact 803 and the interaction between the contact 803 and the settings application icon are merely illustrative. Although specific GUI objects and texts are illustrated in the figures, it is understood that the illustrated GUI is not limiting; the disclosed methods can be performed by displaying GUI objects and texts different from the illustrations without departing from the scope of the disclosure.

In FIG. 8C, in response to the selection of the setting application, a settings user interface is displayed, and the contact 803 selects (e.g., via a tap) an affordance associated with digital health settings 804. In response to the selection of the digital health affordance 804, as illustrated in FIG. 8D, a message 806 is displayed on the electronic device to ask if the user would like to perform initial usage limit setup (e.g., because usage limits have not yet been setup on device 500). Message 806 includes an affordance to perform the usage limit setup (e.g., "Continue" 808*a*) and an affordance to forgo the usage limit setup (e.g., "Not Now" 808*b*). The user proceeds with usage limit setup by selecting "Continue" 808*a* with contact 803. In some embodiments, the user optionally forgoes the initial usage limit setup by not continuing with the message 806 (e.g., by selecting "Not Now" 808*b*, by returning to home screen 802).

FIG. 8E illustrates an exemplary restricted usage mode setup user interface, which is optionally displayed by device 500 in response to selection of "Continue" 808*a* in FIG. 8D. In some embodiments, while performing initial usage limit setup, the restricted usage mode setup user interface in FIG. 8E is displayed. For example, one or more time windows associated with the restricted usage mode are optionally initially setup in the restricted usage mode setup user interface, as described below in more detail with reference to FIGS. 10A-10AAA and 11A-11I. After an initial setup of the restricted usage mode is completed, the user advances to initial usage limit setup by selecting "Yes" 810*a* (e.g., with contact 803). In some examples, the restricted usage mode is optionally not setup (e.g., by selecting "No" 810*b*, by returning to home screen 802, by not associating any time window with the restricted usage mode) prior to initial usage limit setup. Details of the restricted usage mode are described in more detail below with reference to FIGS. 10A-10AAA and 11A-11I. It is understood that any feature of the restricted usage mode described in the disclosure is optionally implemented in combination with any usage limit feature described herein without departing from the scope of the disclosure.

FIG. 8F illustrates an exemplary usage limit setup user interface 812 for setting one or more application or category usage limits, which is optionally displayed by device 500 in response to selection of "Yes" 810*a* in FIG. 8E. The exemplary usage limit setup user interface includes a plurality of selectable categories of applications (e.g., "All Apps and Categories" 814*a*, "News" 814*b*, "Games" 814*c*, "Mail" 814*d*, "Social Media" 814*e*, "Streaming" 814*f*). In some embodiments, the setup user interface includes selectable applications, thereby allowing the user to set usage limits for individual applications. In this way, a user is able to select one or more categories of applications or one or more individual applications the usage of which he or she wishes to limit.

In FIG. 8F, exemplary applications associated with each category of applications are displayed under each respective category (e.g., "Social App A", "Social App B", "Social App C" under "Social Media" category 814*e*). In some embodiments, the user is able to set a usage limit for all applications and categories on the electronic device by selecting "All Apps and Categories" 814*a* (e.g., an overall "screen time" limit). In some embodiments, the user is able to set usage limits for the applications and categories of applications that the user selects. The user is able to forgo initial usage limit setup by leaving the setup user interface (e.g., by selecting "Cancel" 816*b*, by returning to home screen 802, by not selecting any application or category).

Although the usage limit set up user interface is accessed as illustrated in the figures, it is understood that the usage limit set up user interfaces are optionally accessible in manners different from the illustrated embodiments without departing from the scope of the disclosure. Although specific applications and categories are illustrated in the figures, it is understood that the specific applications and categories are merely illustrative and different applications or categories optionally appear on the usage limit setup user interface without departing from the scope of the disclosure.

FIGS. 8G-8J illustrate exemplary methods of selection of a category of applications and selections of applications associated with the selected category for which the user wishes to limit usage. In FIG. 8G, the user selects (e.g., with contact 803) a category of application (e.g., Social Media category 814*e* to set a usage limit for that category). In some circumstances, the user selects more than one category of applications to set a usage limit for those combined categories, or to set usage limits for each of those categories. In some examples, the user does not select a category of applications. In some examples, selection of "All Apps and Categories" optionally selects all applications and categories of applications on the electronic device.

In FIG. 8H, in response to the selection of the category of application (e.g., Social Media category), a category usage limit setup user interface 818 is displayed. As shown in the figure, all applications associated with the currently selected category (e.g., Social Applications A-E 820*a*-820*e*) are displayed and selected by default. In some embodiments, none of the applications are selected; the user selects the applications of the currently selected category that will be limited. As illustrated, selection (e.g., with contact 803) of a selected application (e.g., Social Media Application B 820*b*) deselects the previously selected application (e.g., by using contact 803 to deselect Social Application B 820*b*). Although check marks are used to indicate selection of a particular GUI object, it is understood other methods of selection of indication (e.g., highlight, cursor) can be used without departing from the scope of the disclosure.

In FIG. 8I, in response to the selection of the previously selected Social Application B 820*b*, the Social Media Application B 820*b* is deselected. In some embodiments, access to the deselected application is provided even after a usage limit associated with the category to which the application belongs has been reached (e.g., because the deselected application is a "whitelisted" application, which will be described in more detail below). Deselecting an application (e.g., Social Media Application B 820*b*) optionally causes it not to be limited by the respective usage limit (e.g., the Social Media Category usage limit). That is to say, a whitelisted application (e.g., Social Media Application B 820*b*) is optionally accessible after a usage limit (e.g., Social Media category) associated with the whitelisted application is reached.

In some embodiments, usage of a non-whitelisted application counts toward a usage limit associated with the application. For example, Social Media Application A 820*a* is optionally selected on the usage limit setup user interface 818 in FIG. 8I. Access to Social Media Application A 820*a* is optionally restricted after the Social Media category usage limit has been reached. Before the Social Media category usage limit is reached, usage of the Social Media Application A optionally counts toward the Social Media category usage limit.

In FIG. 8I, once a desired set of applications (e.g., Social Media Applications A 820*a* and C-E 820*c*-820*e*) for a currently selected category (e.g., Social Media) is selected to be limited (e.g., access to an application of the selected set of applications is restricted after a usage limit associated with the selected category has been reached), a user confirms the set of applications (e.g., by selecting "Done" 822 with contact 803) and proceeds to a next setup user interface.

In FIG. 8J, usage limit setup user interface 812, which is optionally displayed by device 500 in response to selection of "Done" 822 in FIG. 8I, displays applications and/or categories that have been selected to be enforced by one or more respective usage limits (e.g., Social Media 814*e*). After the desired set of applications to be limited for the Social Media category is selected, the applications displayed under the Social Media category are updated to display some or all of selected applications on the category usage setup user interface 818, as shown in FIG. 8J. In some embodiments, if the names of the selected applications exceed the amount of space under a category, some of the selected applications are displayed and followed by "and more". The applications displayed under the other categories (e.g., the categories that are not selected) optionally do not update. Once all desired applications and categories have been selected to be enforced by one or more respective usage limits, the user proceeds to the next user interface (e.g., by using contact 803 to select "Add").

FIGS. 8K-8M illustrate exemplary methods of setting usage limits associated with a category. A user is able to set different usage limits to be enforced at different times for an application or a category of applications. For example, as shown in FIG. 8K, in response to selection of "Add" 816*a* in FIG. 8K, a category usage limit customization user interface 824 is displayed by device 500. Notify and Block option 828*a* and Notify option 828*b* are also displayed on the category usage limit customization user interface 824. The methods of enforcing usage limits in "Notify" and "Notify and Block" modes are described in more detail below with reference to FIGS. 8NN-8WW. Although the Notify option 828*b* is selected in the illustration, it is understood that a user is able to select either option for each usage limit. A default usage limit (e.g., "2 hrs.") associated with the category usage limit is displayed. In some embodiments, the default usage limit is automatically determined by the electronic device. A user is optionally able to customize usage limits for different days (e.g., usage limits different from the default usage limit) by selecting "Customize days" 826 on the user interface.

In FIG. 8K, selection of "customize days" by contact 803 is detected, and in response device 500 displays a usage limit customization user interface as shown in FIG. 8L. As shown in FIG. 8L, different usage limits (e.g., 1 hr) are defined for different days of the week (e.g., Monday 836*b*, Wednesday 836*d* and Thursday 836*e*). Although different days of the week are illustrated, it is understood that custom usage limits are optionally defined for any time periods. After the customized usage limits are defined, a user selects "Done" 838 to proceed to the next user interface.

FIG. 8M illustrates a category usage limit customization user interface 824 that is displayed after customized usage limits have been set up (e.g., after selection of "Done" 838 in FIG. 8L). After the customized usage limits are set up, the time periods during which the customized usage limits are enforced are displayed below "Customized days" 826. The customized usage limits are added to the Social Media category usage limit settings when a user selects "Add" 830. For example, as shown in FIG. 8M, a usage limit of one hour is enforced on Monday, Wednesday and Thursday. The default usage limit of two hour is enforced on Sunday, Tuesday, Friday and Saturday.

After setting the usage limits in FIG. 8M, device 500 optionally displays a digital health passcode setup user interface 840, as shown in FIG. 8N, for securing the usage limits that have been set. In some embodiments, after initial usage limit settings have been set, the electronic device displays the digital health passcode setup user interface 840 and prompts the user to input a passcode associated with digital health settings (e.g., usage limit settings) on passcode input user interface 842. In some embodiments, the passcode is different from a general passcode of the electronic device (e.g., a passcode to unlock the device, generally) in order to prevent unauthorized access to digital health settings on device 500 (e.g., by a child who knows a parent's device passcode). Although a four-digit numeric passcode is prompted in the illustration, it is understood that different kinds of authentication credentials are optionally used to secure digital health settings (e.g., alphanumeric passwords, biometric authentication, etc.).

After finishing initial usage limits settings, a restrictions settings user interface 844 is displayed, as illustrated in FIG. 8O. The restrictions settings user interface 844 is described in more detail with reference to FIGS. 6A-6UU and 7A-7S. Usage of an application in a category associated with a usage limit is optionally indicated on usage bar 848. Categories that have an associated usage limit (e.g., "Social Media") are displayed under "App limits" 846. For example, in FIG. 8O, there is no Social Media category usage, and hence, the usage bar 848 indicates that no Social Media category application is used. Selection of "App limits" 846 optionally causes display of the application limits user interface in FIG. 8P in which application usage limit settings are able to be changed.

FIG. 8P illustrates an application limits user interface 850. The usage limit categories that were added during initial setup (e.g., "Social Media" 852*a*) are shown on the application limits user interface 850 in FIG. 8P. The customized usage limits and their associated time periods are display under "Social Media" 852*a*. The user interface also includes an app limits toggle 856. As illustrated, the electronic device enforces defined usage limits if the button is togged "on". Conversely, the electronic device does not enforce the defined usage limits if the button is toggled "off". In some embodiments, when the electronic device does not enforce the defined usage limits, the defined usage limits remain and are saved but are not enforced. The defined usage limits will optionally be enforced in subsequent activation of application limits (e.g., by toggling the app limit toggle 856 "on"). In some embodiments, application usages are tracked and retained (e.g., application usage contributions are not reset for subsequent activations of application limits) during reactivation of application limits (e.g., by toggling the app limit toggle 856 "off" for a period of time and then toggling the app limit toggle 856 "on"). In some embodiments, application usages are not tracked and not retained (e.g., application usage contributions are reset for subsequent activations of application limits) during reactivation of application limit. A user is able to add more application or category usage limits by selecting "Add Limit" 854, as shown in FIG. 8P. In some examples, selection of "Add Limit 854" optionally causes the electronic device to display a user interface similar to usage limit setup user interface 812. For the sake of brevity, it is understood that adding one or more application or category usage limits is similar to as described in FIGS. 8F-8M.

FIG. 8Q illustrates a usage limits user interface 850 after additional application usage limits (e.g., "Game A" 852*c* and "Streaming App B" 852*g*) and category usage limits (e.g., "All" 852*b*, "Games" 852*d*, "Streaming" 852*e*, "Streaming and Social Media" 852*f*) are added. "All" 852*b* is an overall usage limit of the electronic device (e.g., an overall "screen time" limit) that is associated with all applications and categories on the electronic device. "Streaming and Social Media" **852*f* is a joint category usage limit. The joint category usage limit enforces the usage of applications associated with the joint categories. For example, usage of a streaming or social media application is optionally enforced by the "Streaming and Social Media" joint usage limit 852*f***.

The electronic device optionally enforces concurrent usage limits. For example, the user sets up concurrent usage limits "Social Media" **852*a* and "Streaming and Social Media" 852*f*** on the electronic device, as illustrated in the figure. In some embodiments, usage of a Social Media application associated with a usage limit (e.g., Social Media Application A) contributes to both concurrent usage limits. In some embodiments, the more conservative limit of the concurrent usage limit is enforced. For example, if there are two hours remaining for the Social Media usage limit and three hours remaining for the Streaming and Social Media usage limit, usage of a Social Media application is optionally limited by the more conservative Social Media usage limit (i.e., after two hours of use of the Social Media application). As another example, if there are two hours remaining for the Social Media usage limit and one hour remaining for the Streaming and Social Media usage limit, usage of a Social Media application is optionally limited by the more conservative Streaming and Social Media usage limit (i.e., after one hour of use of the Social Media application).

FIG. 8R illustrates a category usage limit settings user interface 858. The category usage limit settings user interface 858 includes information that is substantially similar to the information shown on the category usage limit setup user interface 818 in FIGS. 8H-8I. The previously selected applications (e.g., Social Media Applications A **820*a* and C-E 820*c*-820*e*) during usage limit set up are shown on the user interface 858. In some embodiments, a user redefines the applications to be limited by selecting or deselecting the applications on the category usage limit settings user interface 858. A user renames the name 860 (e.g., "Social Media") of the category usage limit by selecting "Rename" 862, as shown in FIG. 8R, which optionally results in the renaming of the Social Media category limit as shown in FIGS. 8S and 8**T.

Specifically, in FIG. 8S in response to renaming the name 860 of the category usage limit (e.g., from "Social Media" to "John's Fun Things"), the updated name is displayed on the user interface 858. After the desired updates to the category usage limit settings are performed, a user saves the updated settings and returns to the application limits user interface 850, as shown in FIG. 8T, by selecting "Done" 822. FIG. 8T illustrates the application limits user interface 850 after a category usage limit setting has been updated. In response to renaming the formerly Social Media category **852*a* to "John's Fun Things", the application limits user interface 850 shows the updated name of the category 852*a*** (e.g., "John's Fun Things").

Figure 8U:
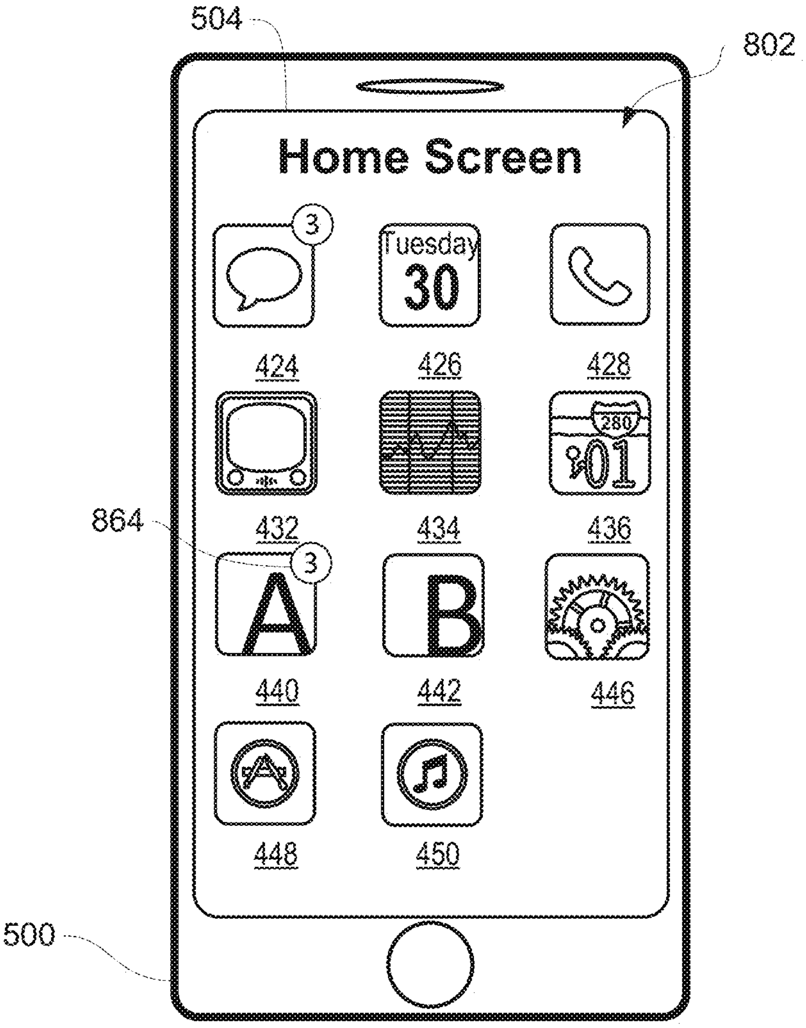

FIGS. 8U-8EE illustrate exemplary methods of displaying representations of applications in accordance with various restrictions according to examples of the disclosure.

In FIG. 8U, touch screen 504 displays home screen 802 at a time during which restriction criteria are not met on device 500 (e.g., no usage limit for any application or category of applications is reached). In some embodiments, the restriction criteria are met when a usage limit is reached for a given application or category of applications. In some embodiments, the usage restriction criteria are met during one or more windows of time associated with a restricted usage mode, as described with reference to method 1100. In FIG. 8U, home screen 802 includes application icons 424, 426, 428, 432, 434, 436, 440 (e.g., associated with Social Media Application A), 442 (e.g., associated with Social Media Application B), 446, 448, 450, and 452 for launching or otherwise displaying different applications on device 500, as described above with FIG. 4A. As shown in FIG. 8U, one or more application icons optionally include a notification indicator 864 that informs the user of any unread notifications associated with the application. For example, notification indicator 864 in FIG. 8U indicates that there are three unread messages in Social Media Application A 440. In some embodiments, notification indicator 864 is a badge superimposed over (or partially over) the appropriate icon, as illustrated in FIG. 8U.

Figure 8V:
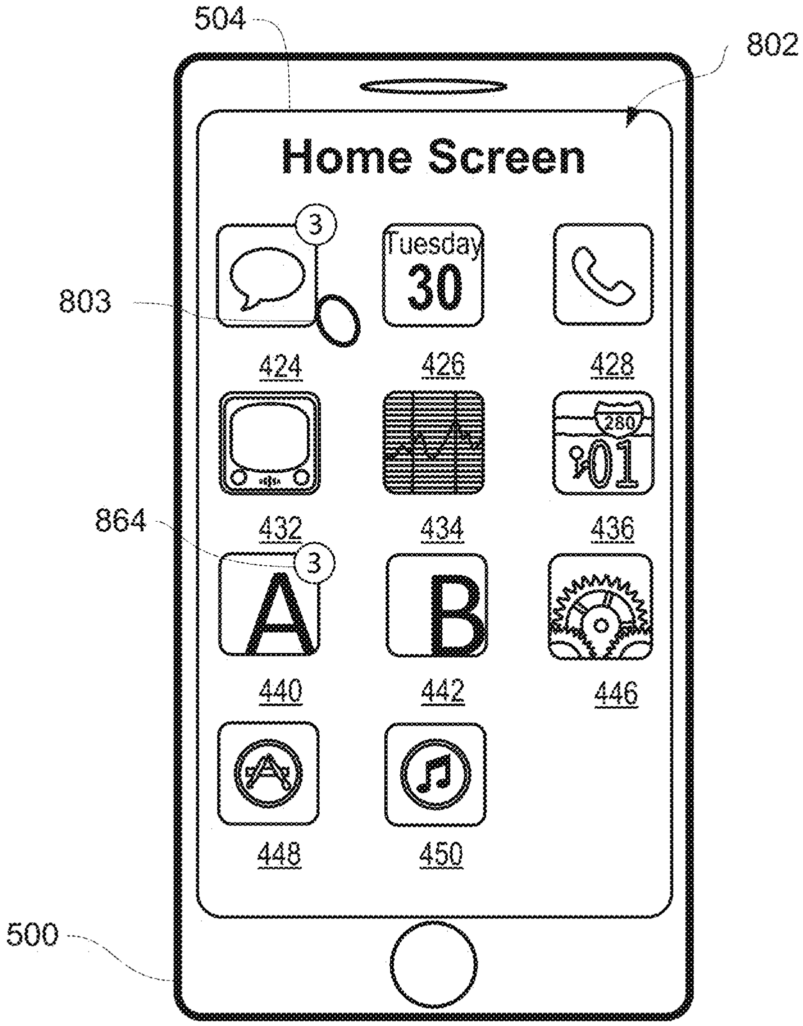
Figure 8W:
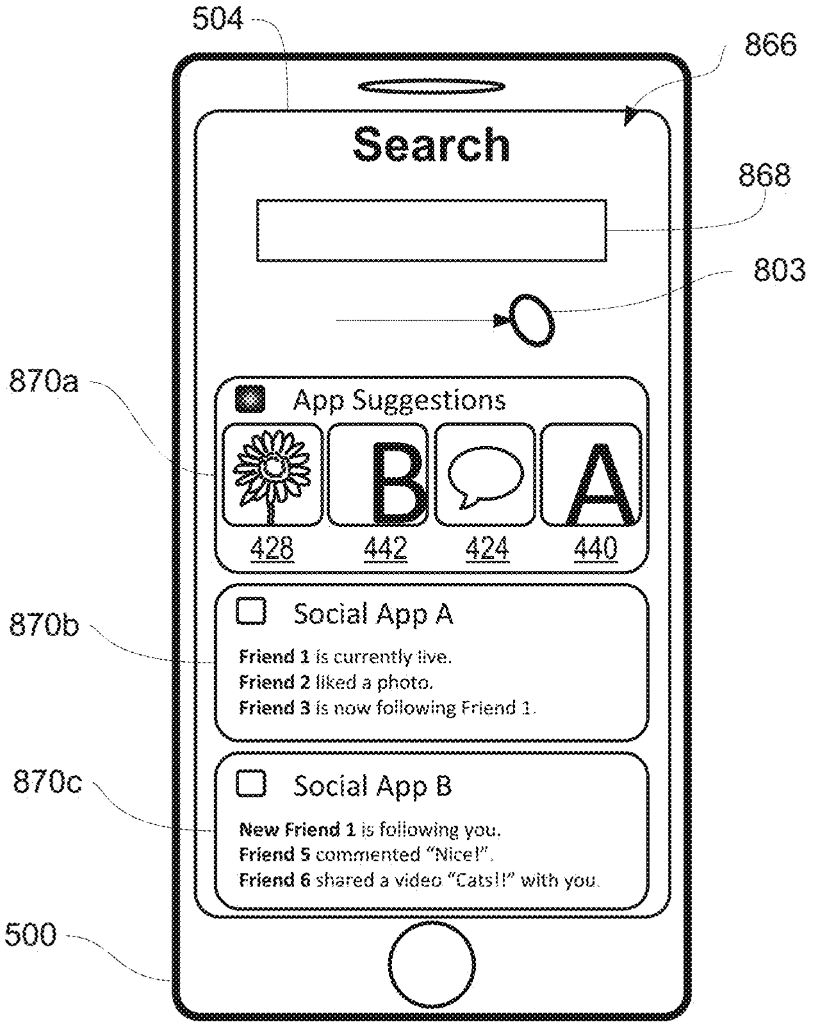

In FIGS. 8V-8W, a horizontal swipe of contact 803 is detected on touch screen 504 while home screen 802 is displayed, which causes device 500 to display a search user interface 866 at a time during which restriction criteria are not met on device 500 (e.g., no usage limit is reached). Search user interface 866 is optionally a user interface of the operating system of device 500 via which content accessible from device 500 is searched (e.g., websites, news, e-mail, applications installed on device 500, applications available to be downloaded to device 500, calendar entries, etc.). Search user interface 866 optionally includes text field 868 for entering one or more search terms to search the content accessible from device 500, "App Suggestions" user interface **870*a* for displaying applications suggested to the user by the operating system of device 500 (e.g., suggesting commonly used applications, recently used applications, favorite applications, currently running applications), and widgets 870*b* and 870*c* corresponding to applications installed on device 500 (e.g., a user interface object or window including text, image(s), and/or any other content associated with and updated by corresponding applications, such as social media applications A and B), as shown in FIG. 8W. As shown in FIG. 8W, social media applications A and B are included in "App Suggestions" and their corresponding widgets are displayed by device 500 when restriction criteria associated with those applications are not met on device 500**.

Figure 8X:
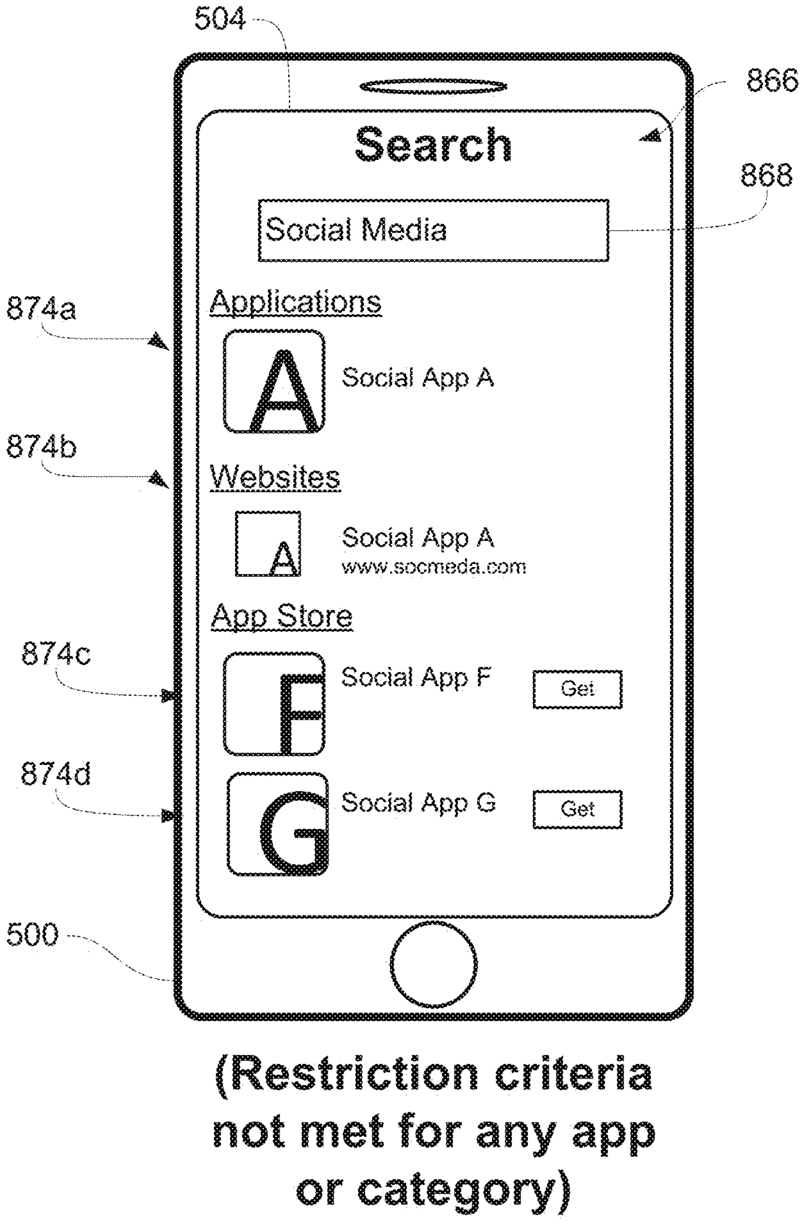

In FIG. 8X, the user has entered the search term "Social Media" into text field 868 at a time during which restriction criteria are not met on device 500 (e.g. no usage limit is reached). In response to the search term "Social Media" having been entered into text field 868, device 500 displays various search results in search user interface 866 relating to the search term "Social Media," as shown in FIG. 8X. For example, device 500 displays a link **874*a* to social media application "Social App A" installed on device 500, a link 874*b* to social media website "Social App A", which is a website related to the "Social App A" app, and links to two social media applications available for download from a repository of applications (e.g., an App Store), link 874*c* to "Social App F" and link 874*d*** to "Social App G" applications.

Figure 8Y:
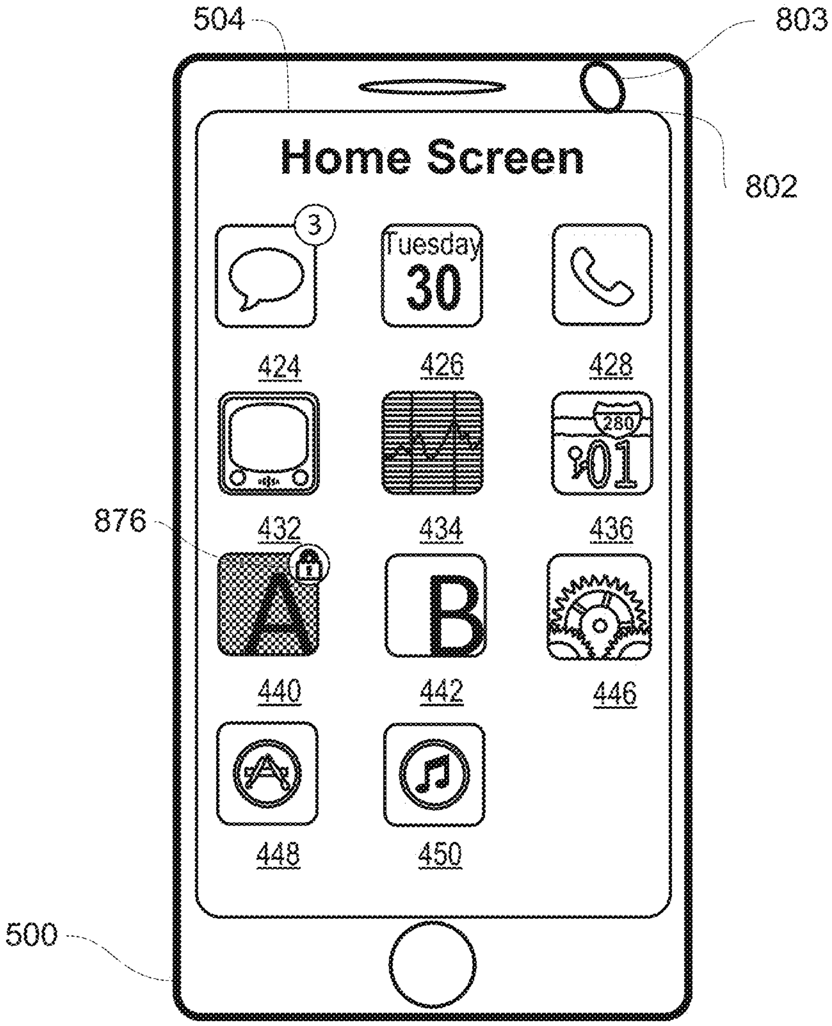

FIG. 8Y illustrates a home screen 802 displayed on device 500 when the Social Media category usage limit is reached. In response to the Social Media category usage limit being reached, the appearance of the Social Media Application A icon 440 is updated to reflect that access to the application is restricted (e.g., the icon is grayed out, a restriction badge 876, which optionally replaces the prior-displayed notification badge, overlays the icon). In some embodiments, as illustrated in FIG. 8Y, the restriction badge 876 at least partially overlays the Social Media Application A icon 440.

In some embodiments, the restriction badge 876 at least partially overlays a text description associated with the restriction application icon.

Figure 8Z:
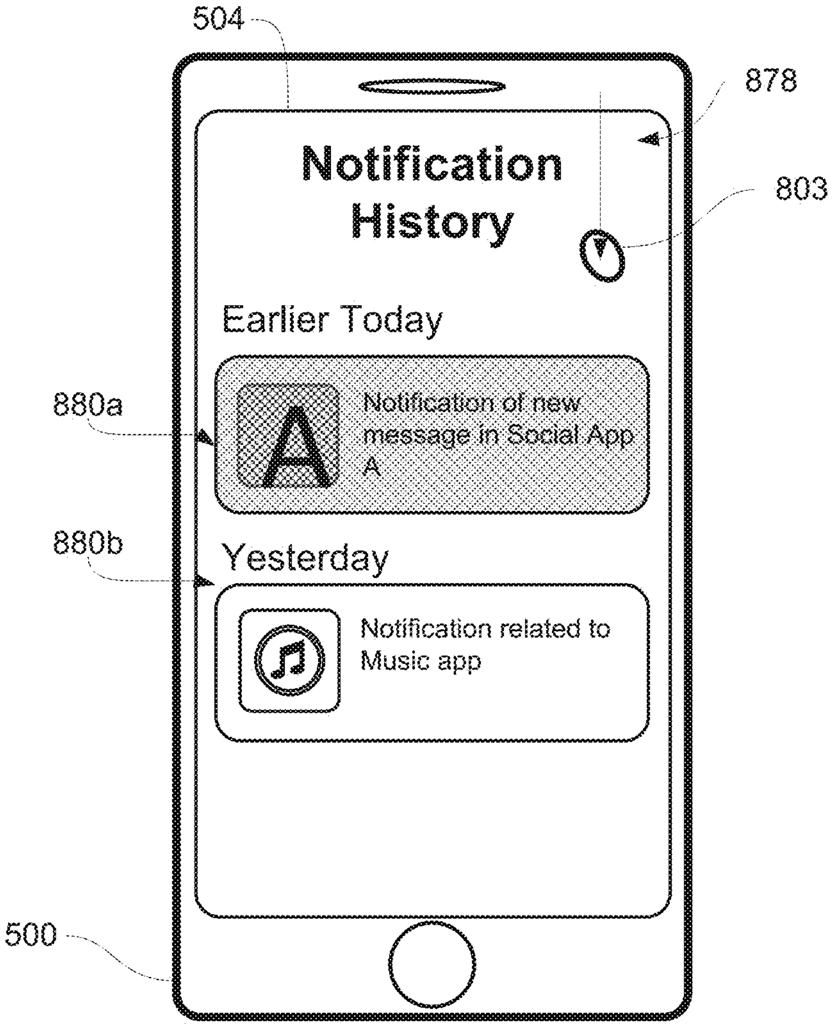
Figure 8A:
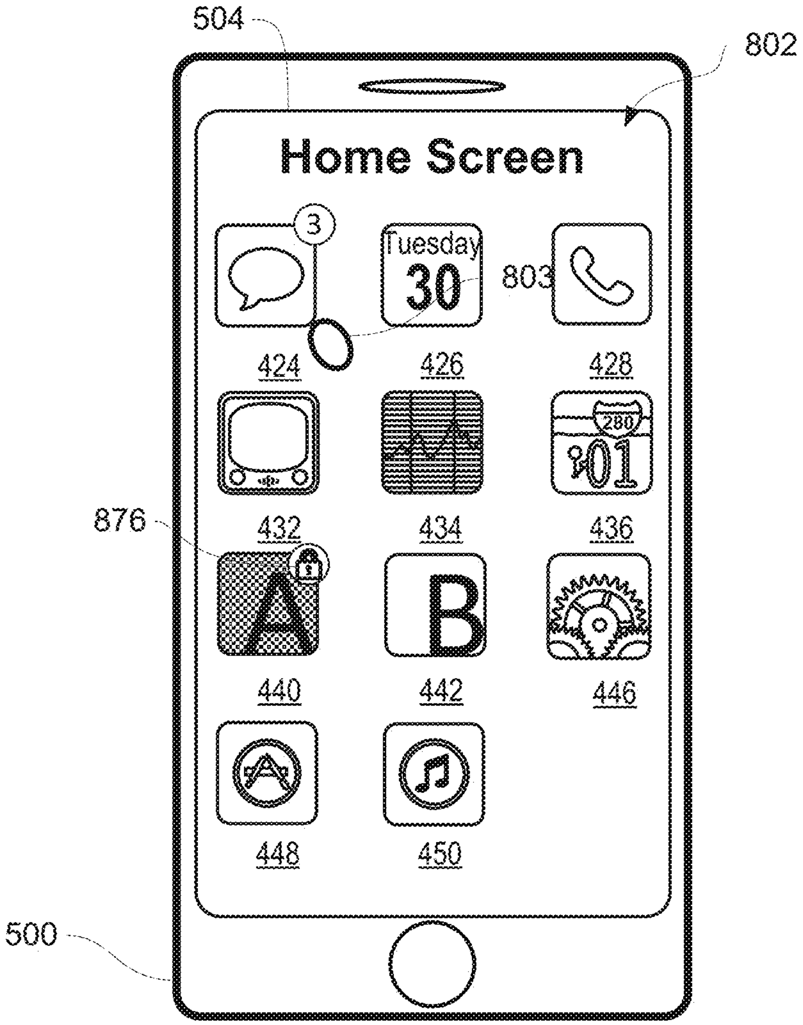
Figure 8B:
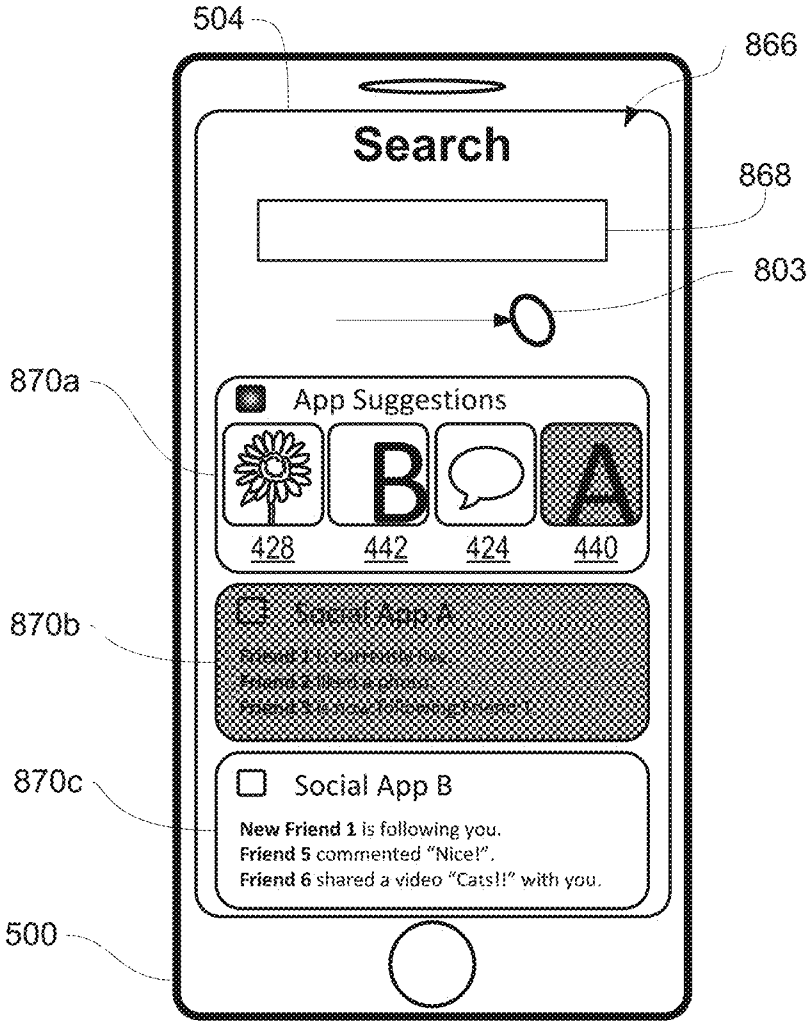
Figure 8C:
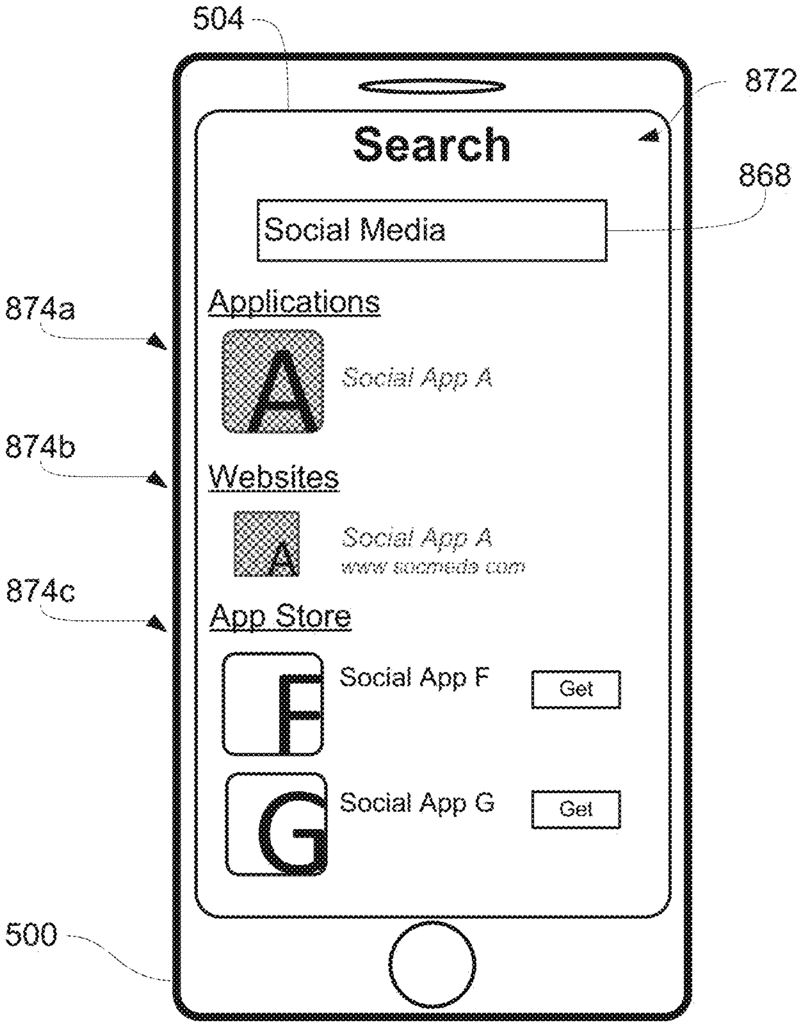
Figure 8D:
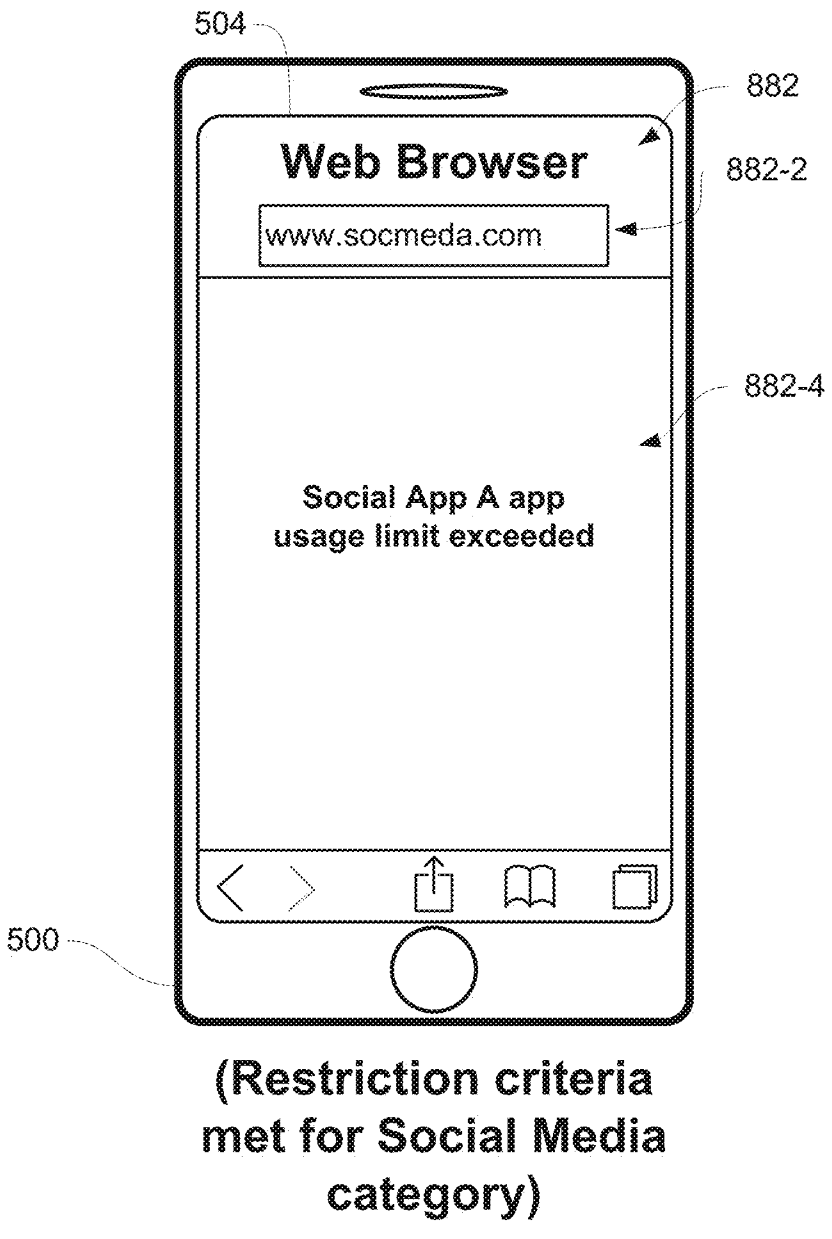
Figure 8E:
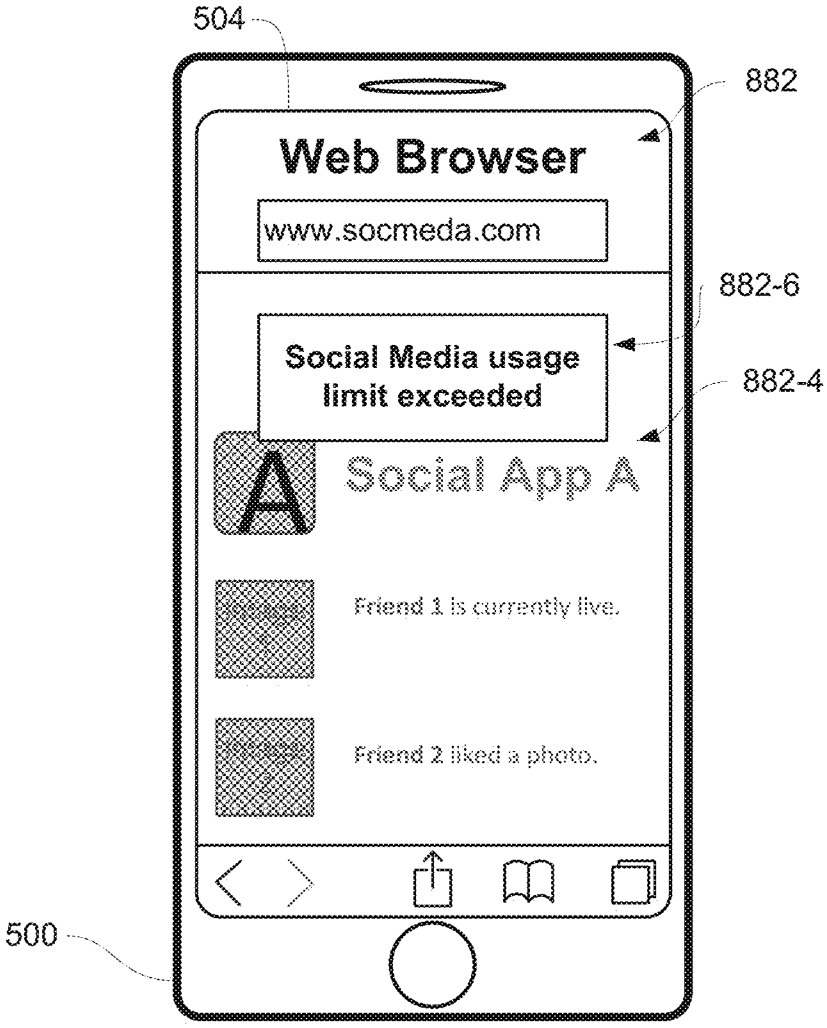
Figure 8F:
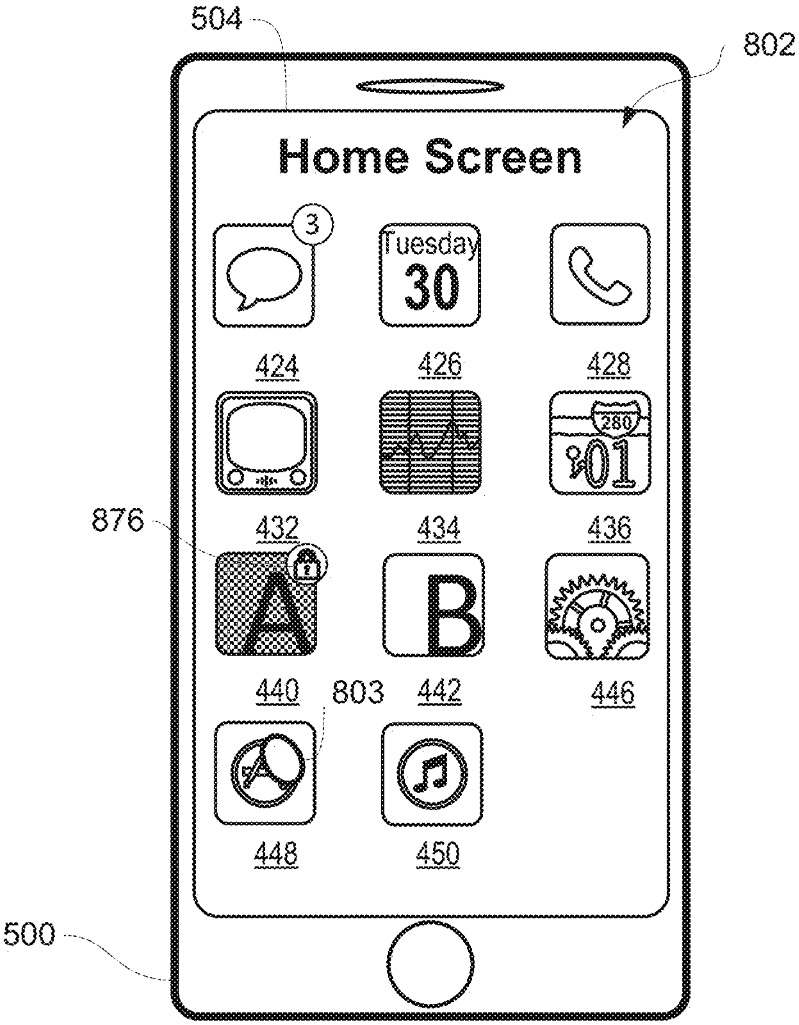
Figure 8G:
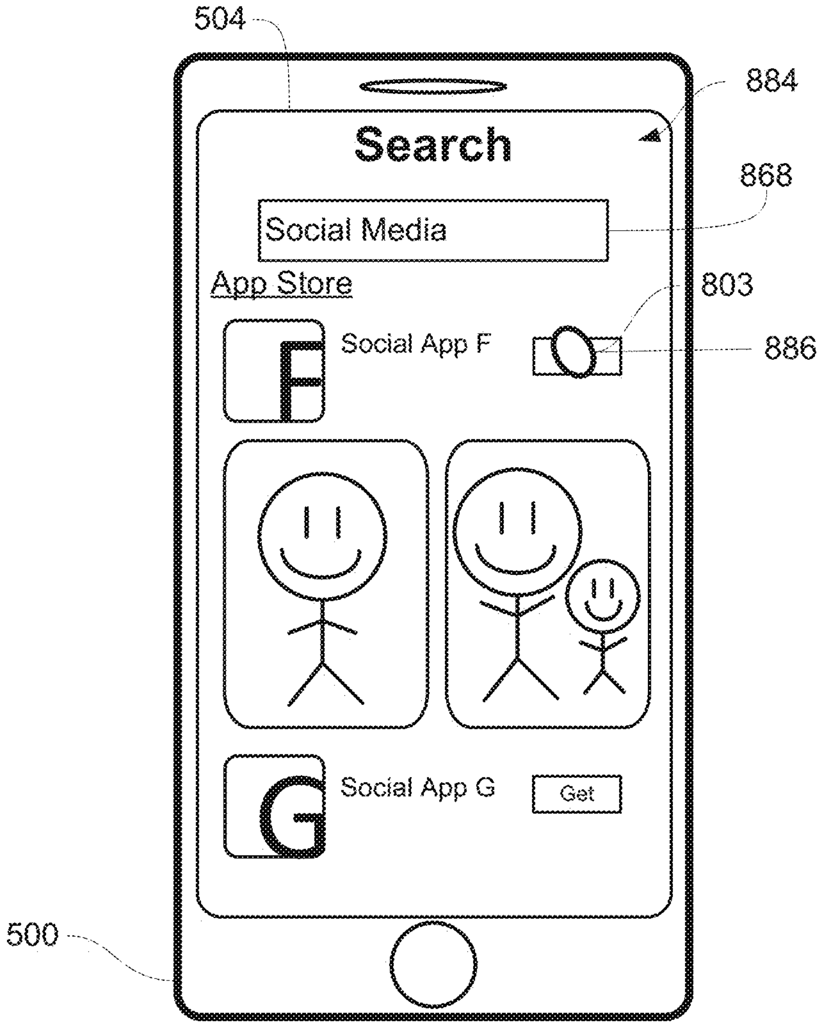
Figure 8H:
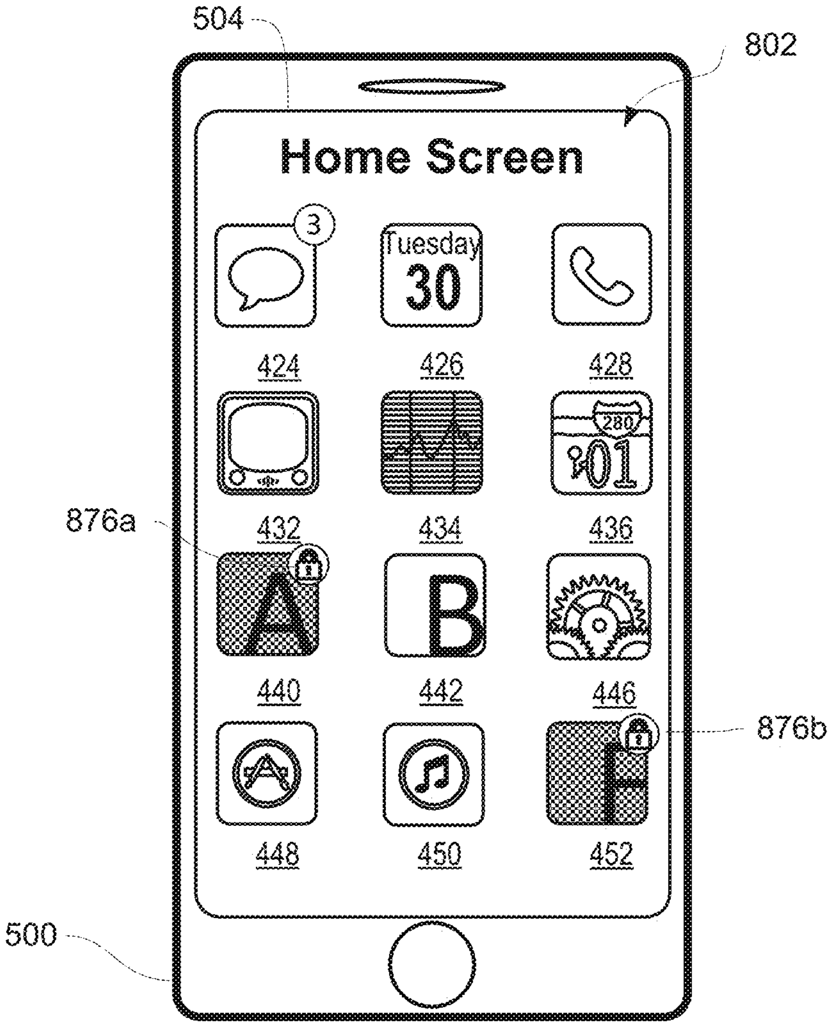
Figure 8I:
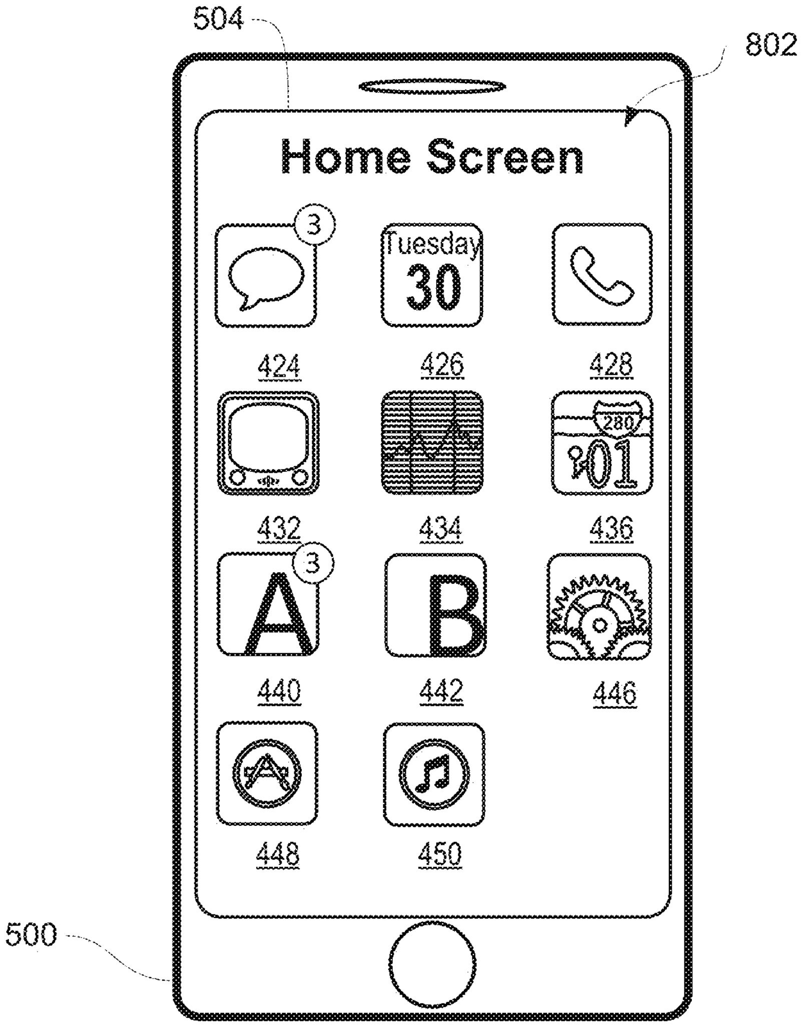
Figure 8J:
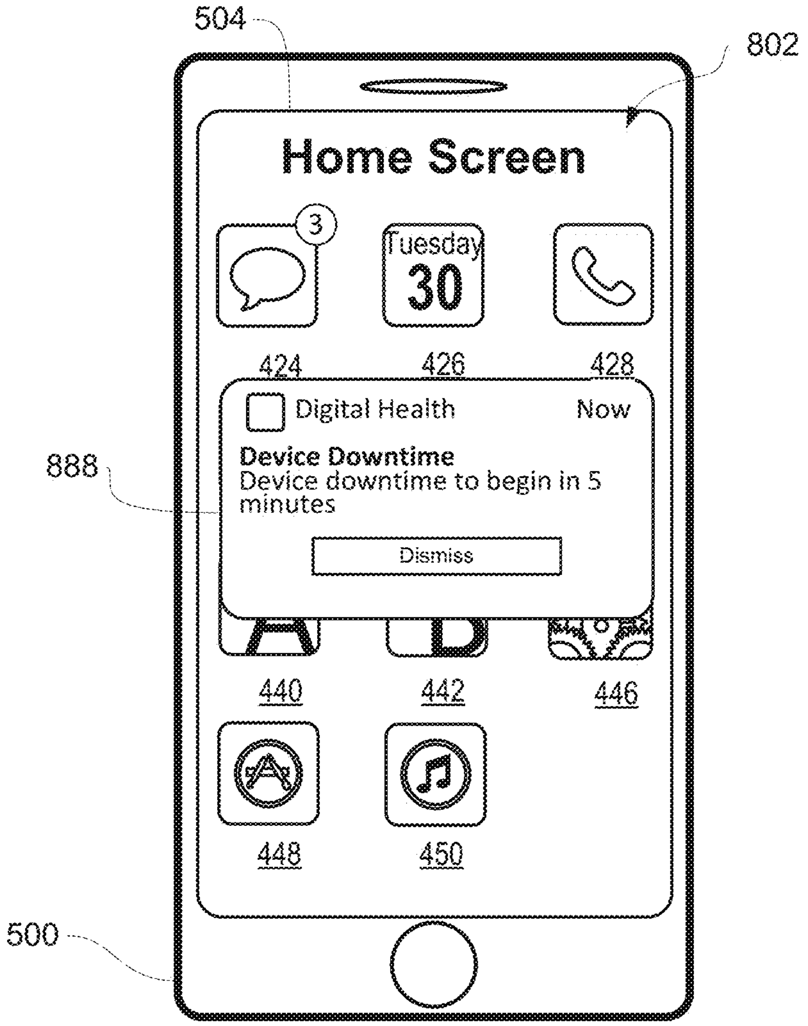
Figure 8K:
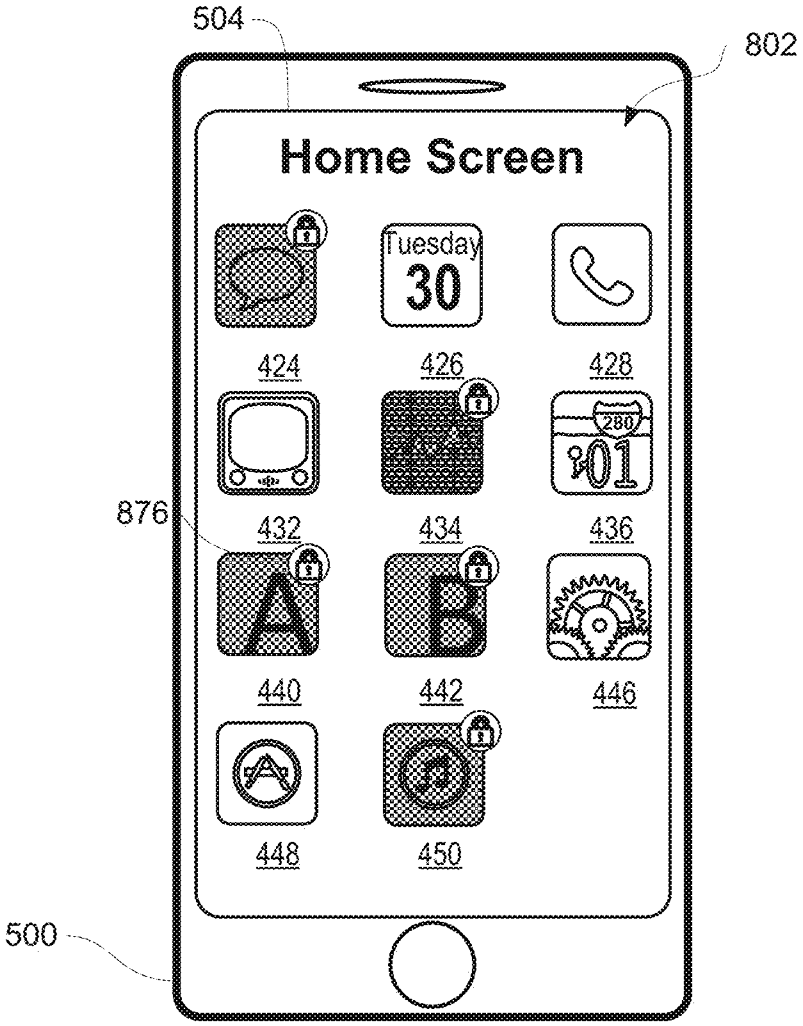
Figure 8L:
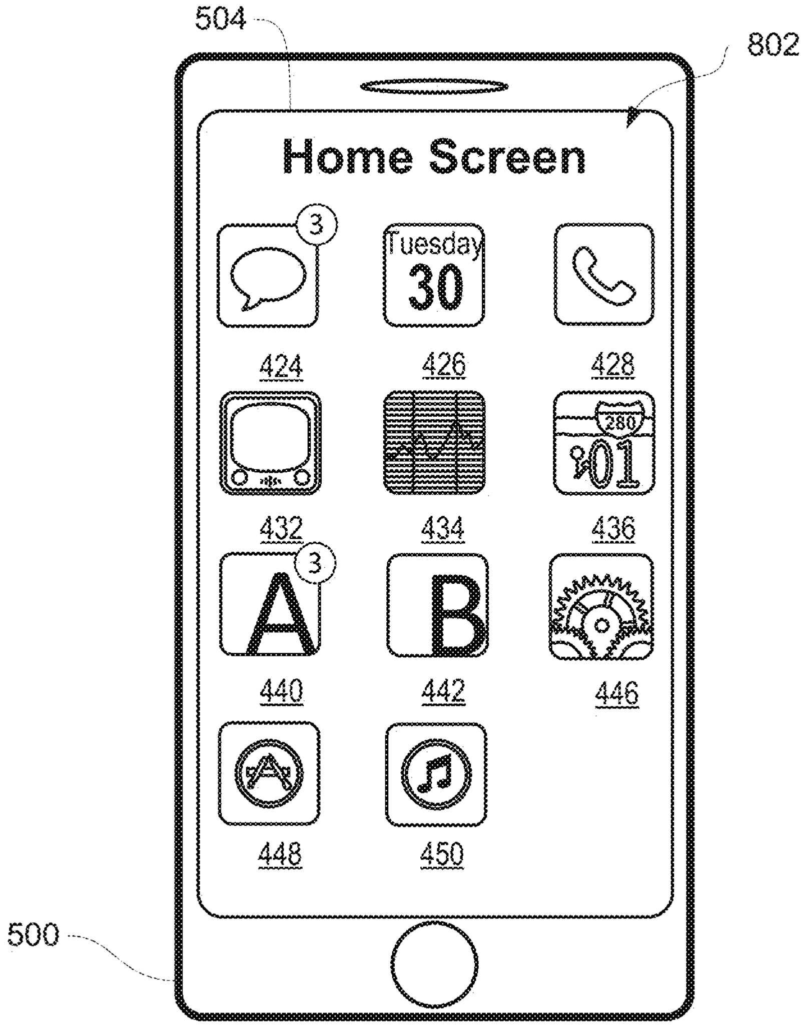
Figure 8M:
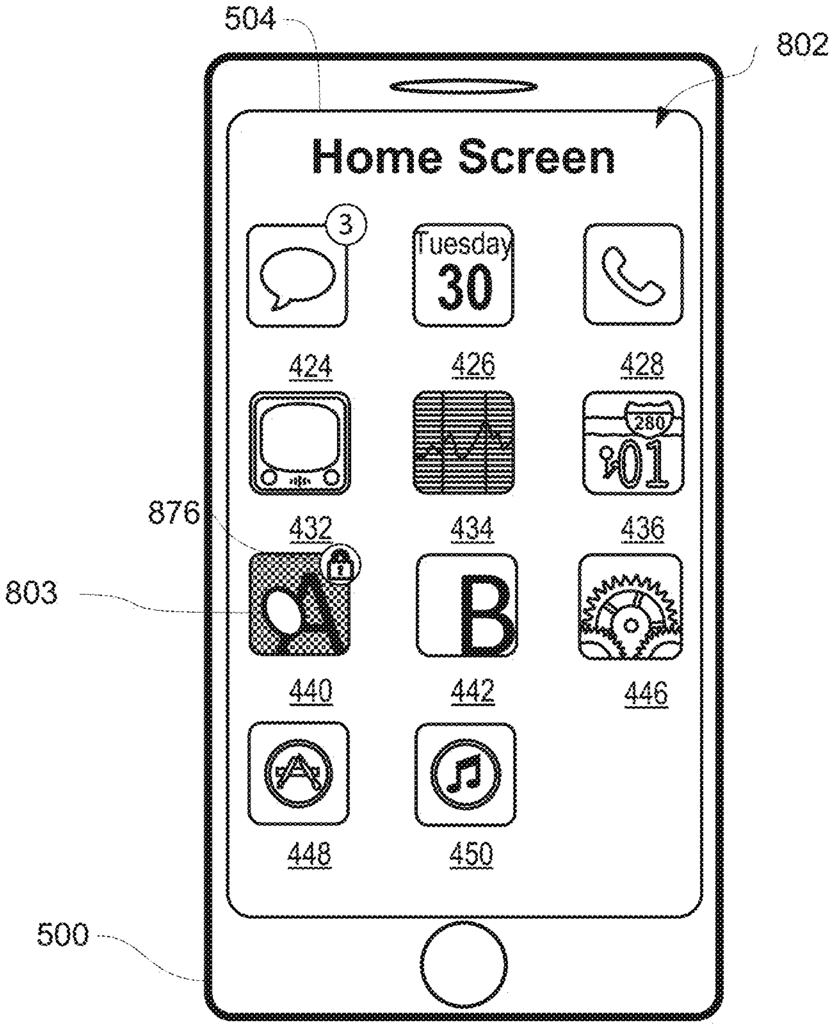
Figure 8N:
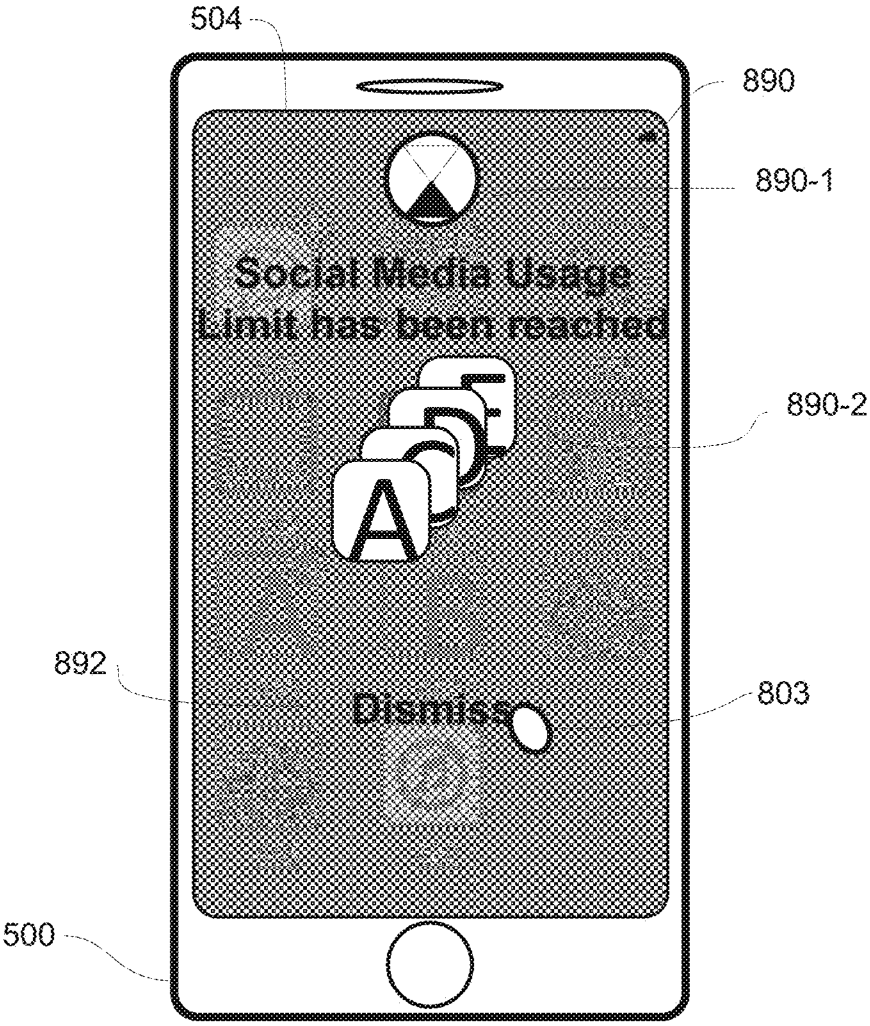
Figure 8O:
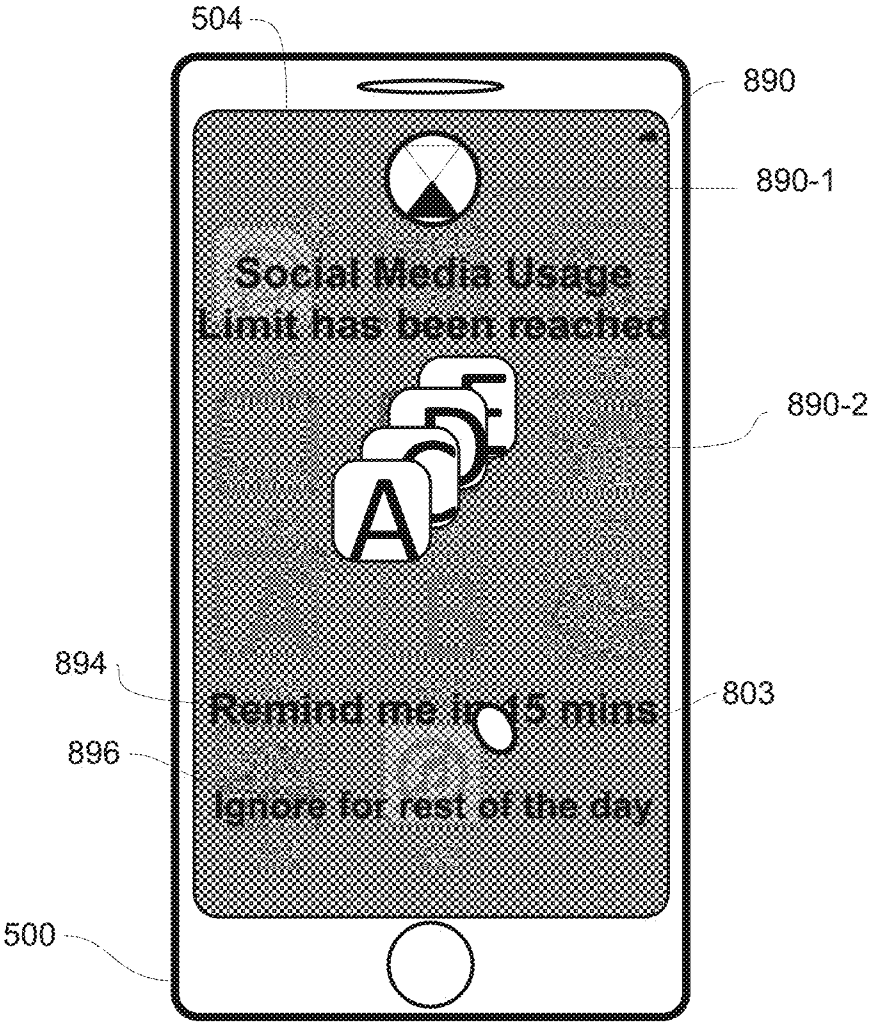
Figure 8P:
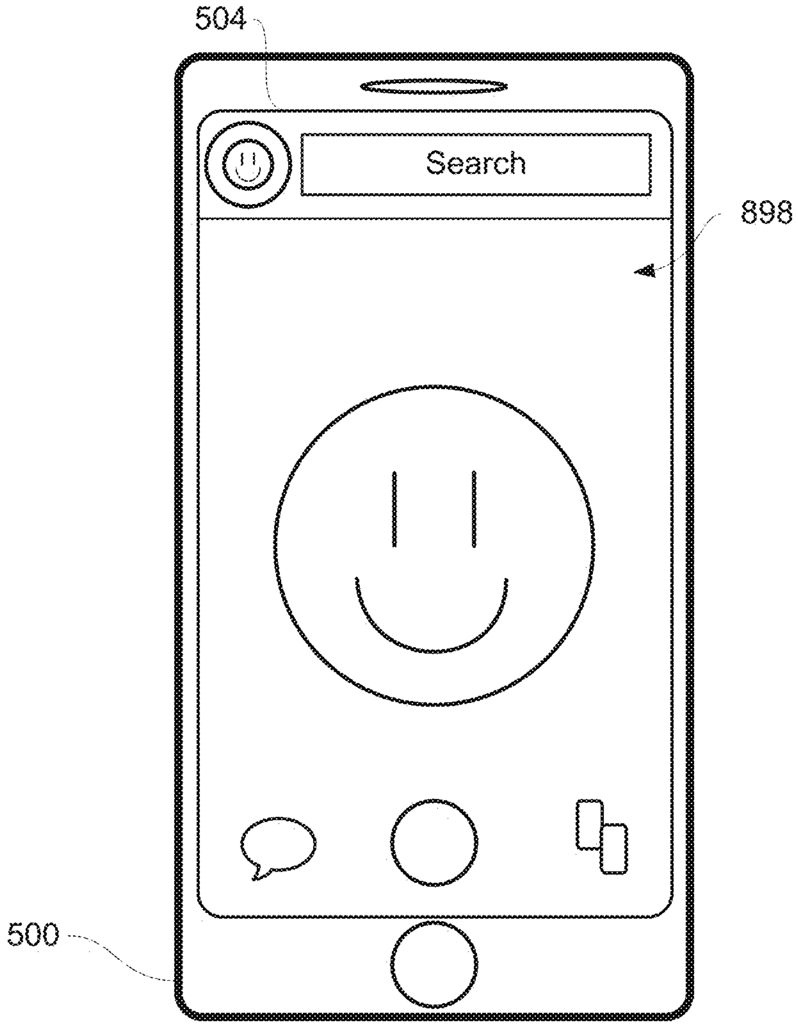
Figure 8Q:
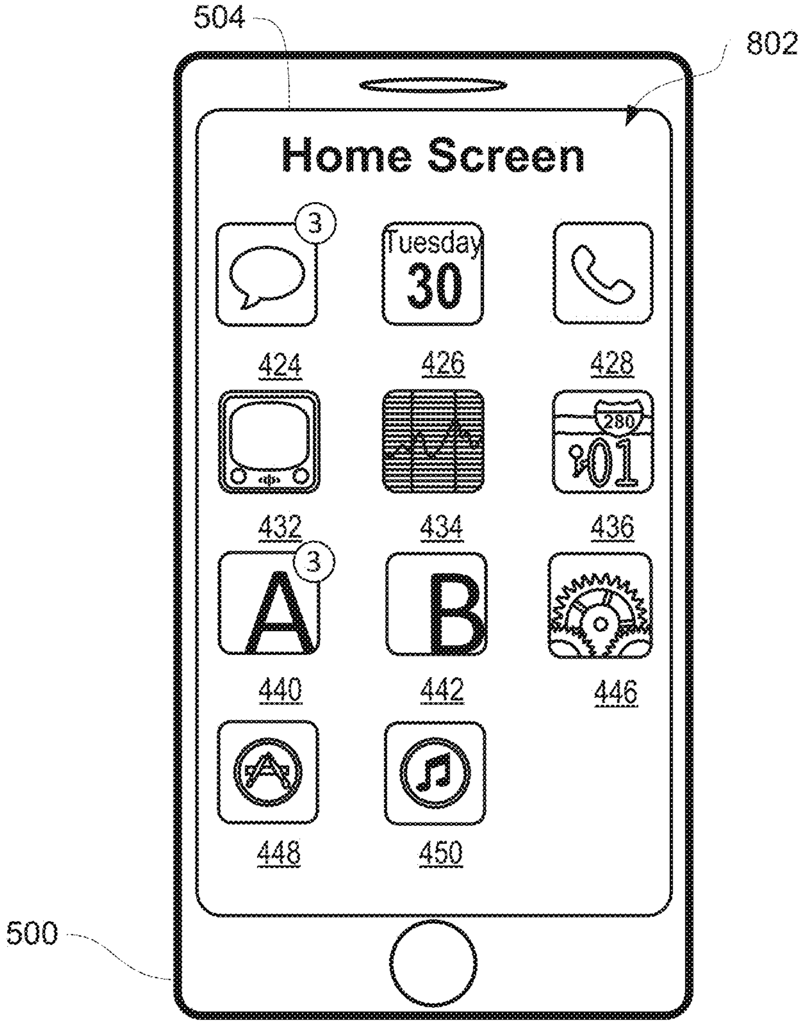
Figure 8R:
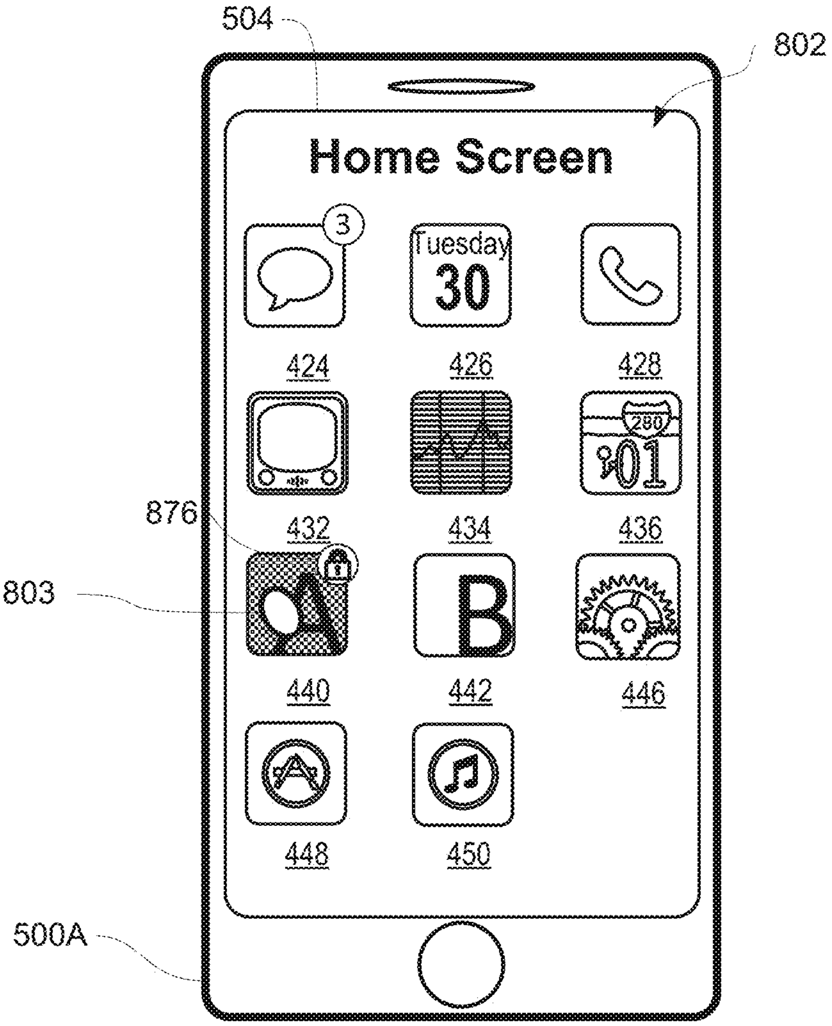
Figure 8S:
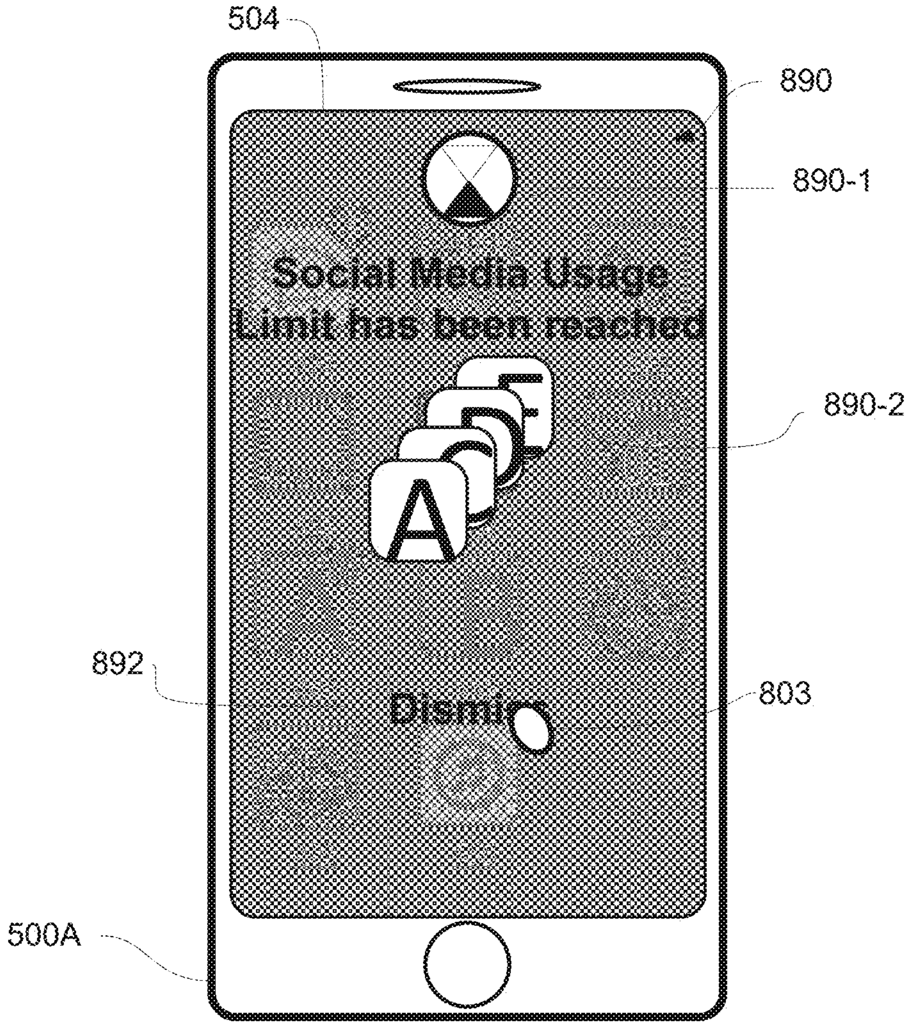
Figure 8T:
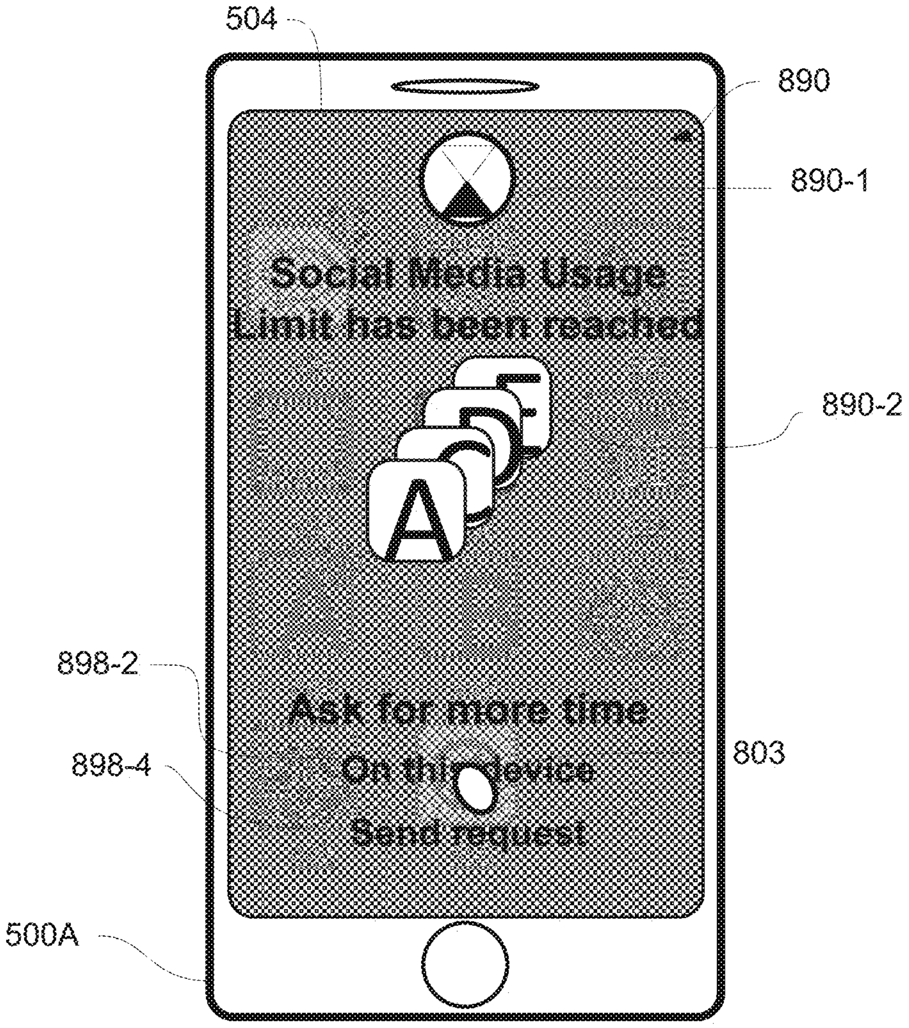
Figure 8U:
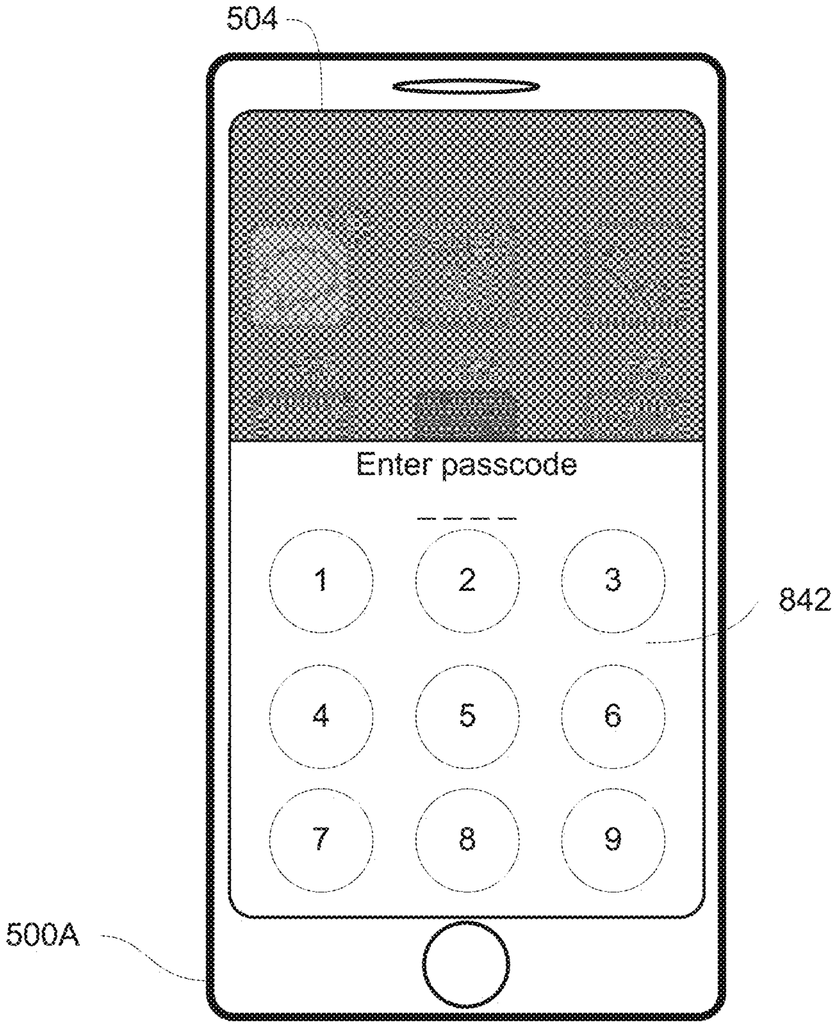
Figure 8V:
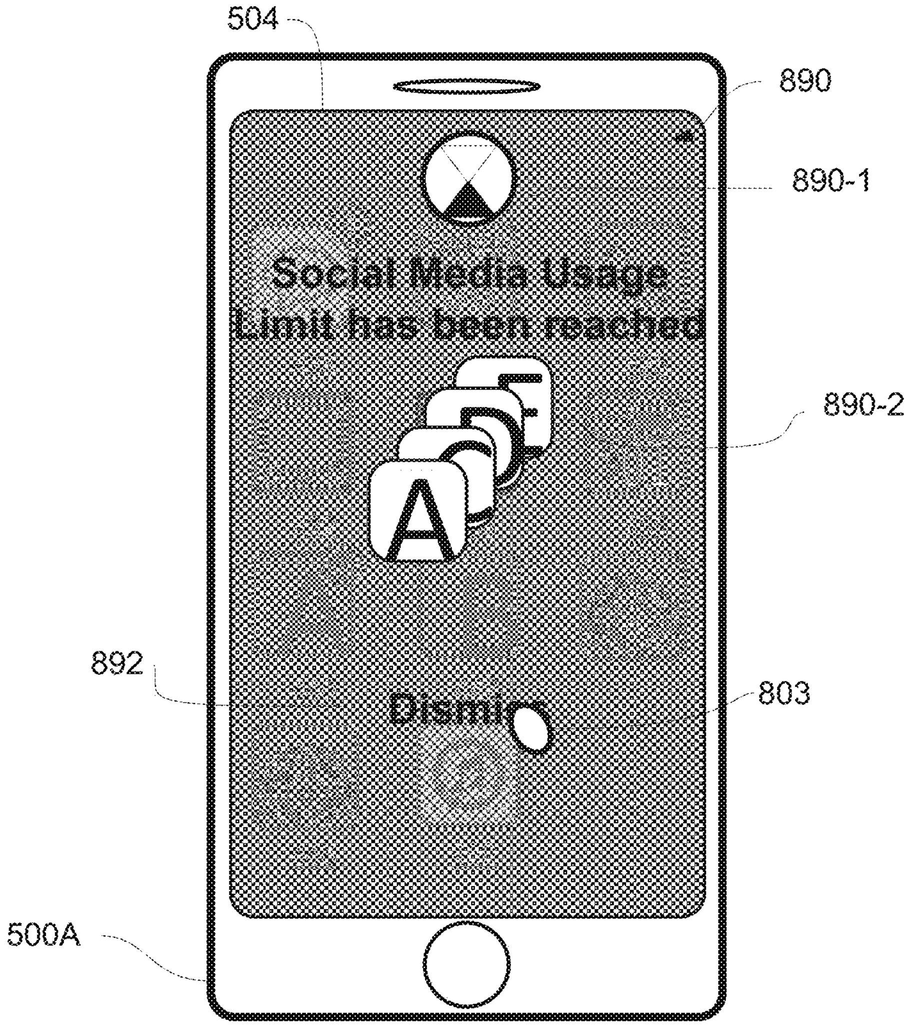
Figure 8W:
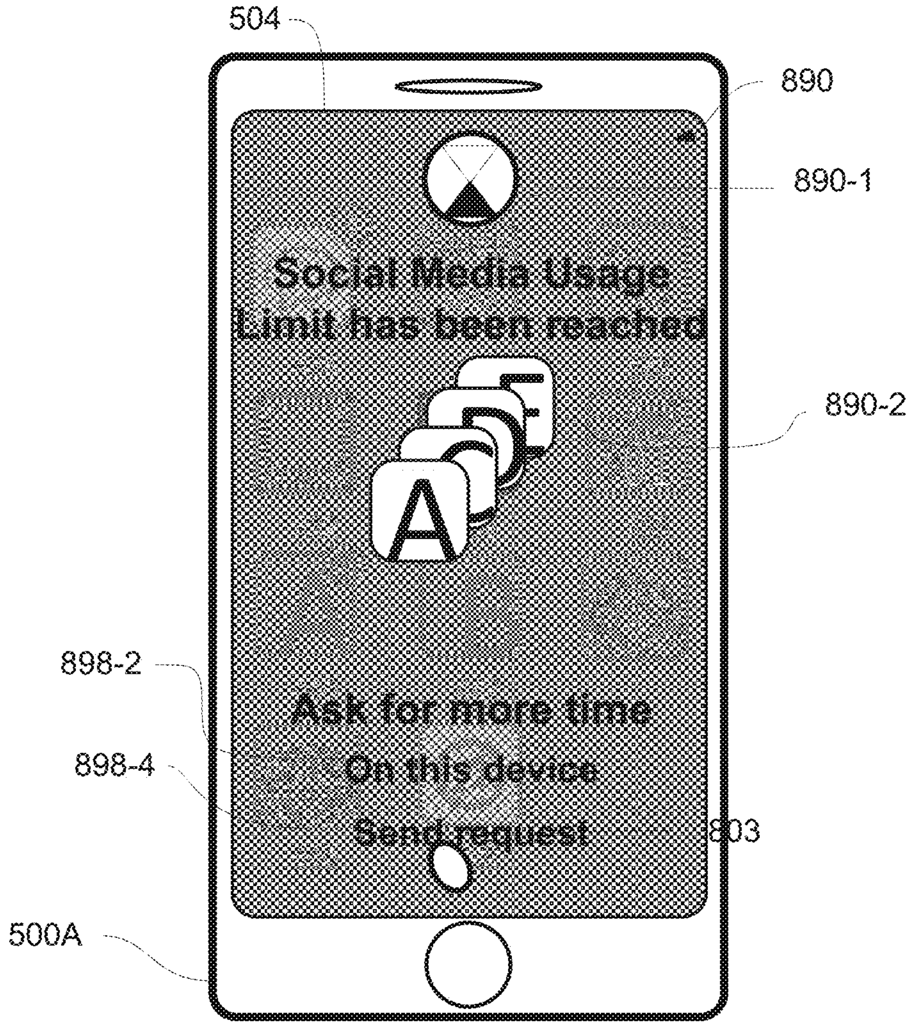
Figure 8X:
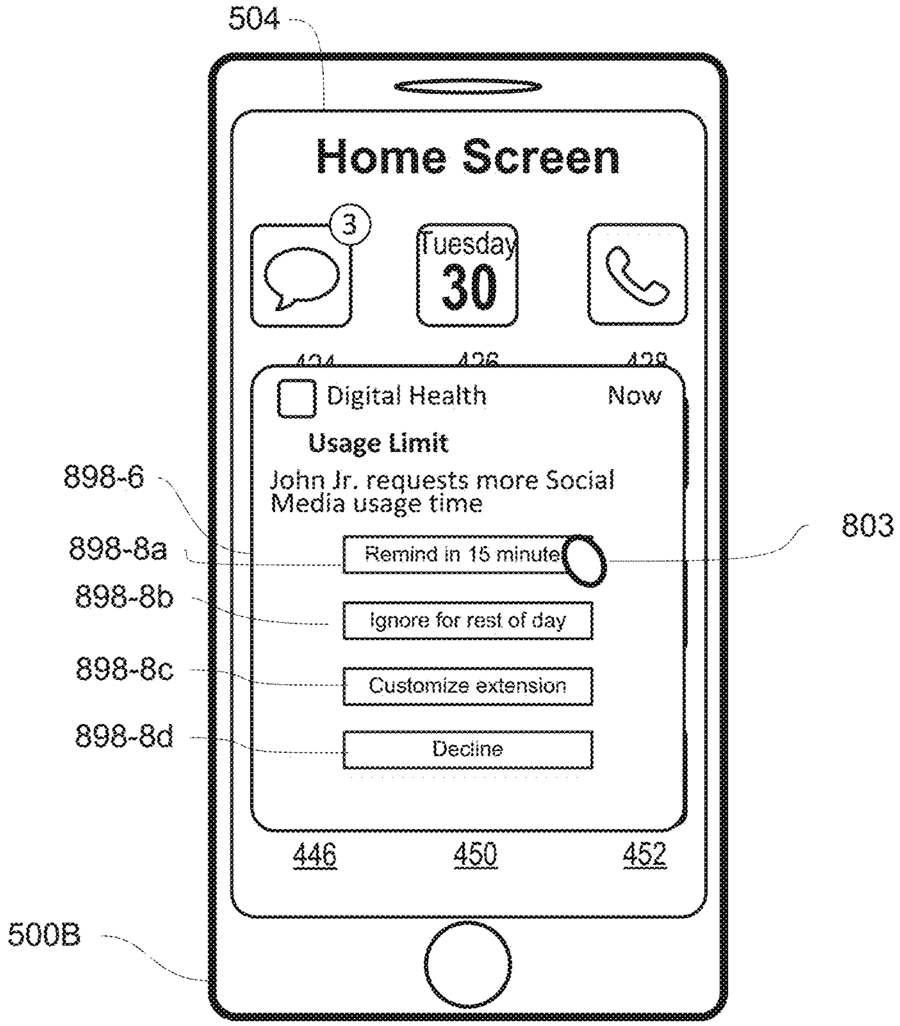
Figure 8Y:
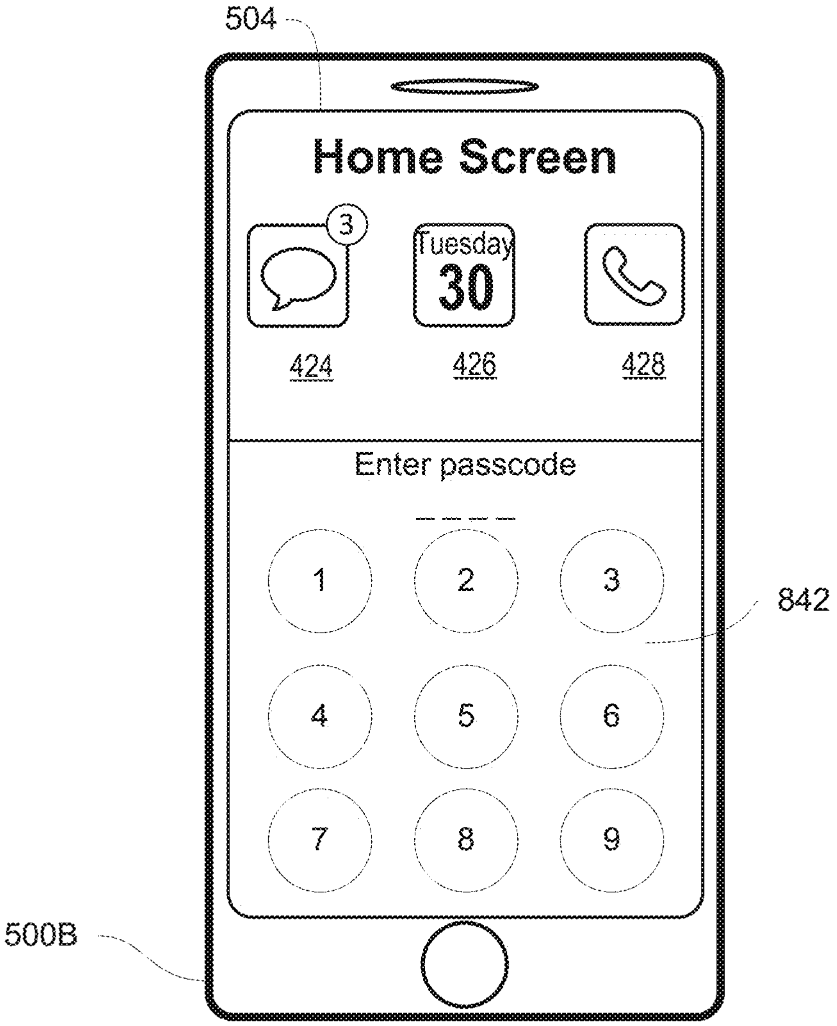
Figure 8Z:
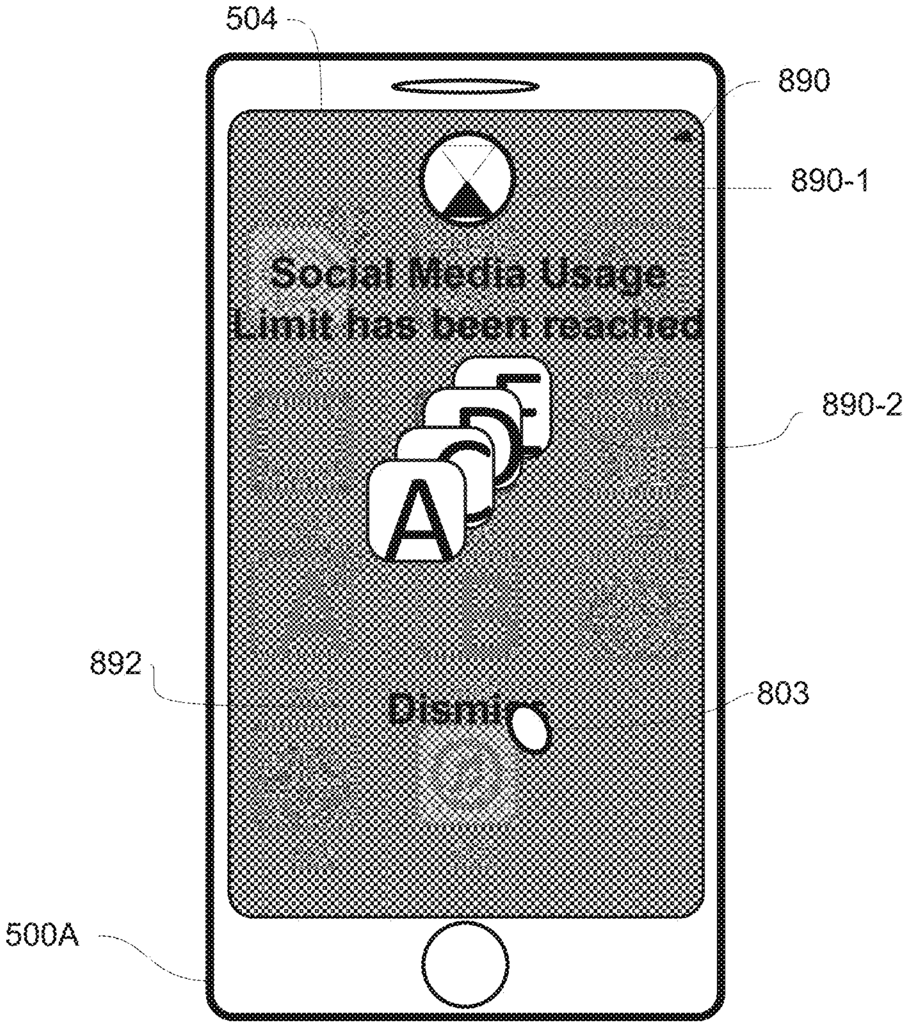
Figure 9A:
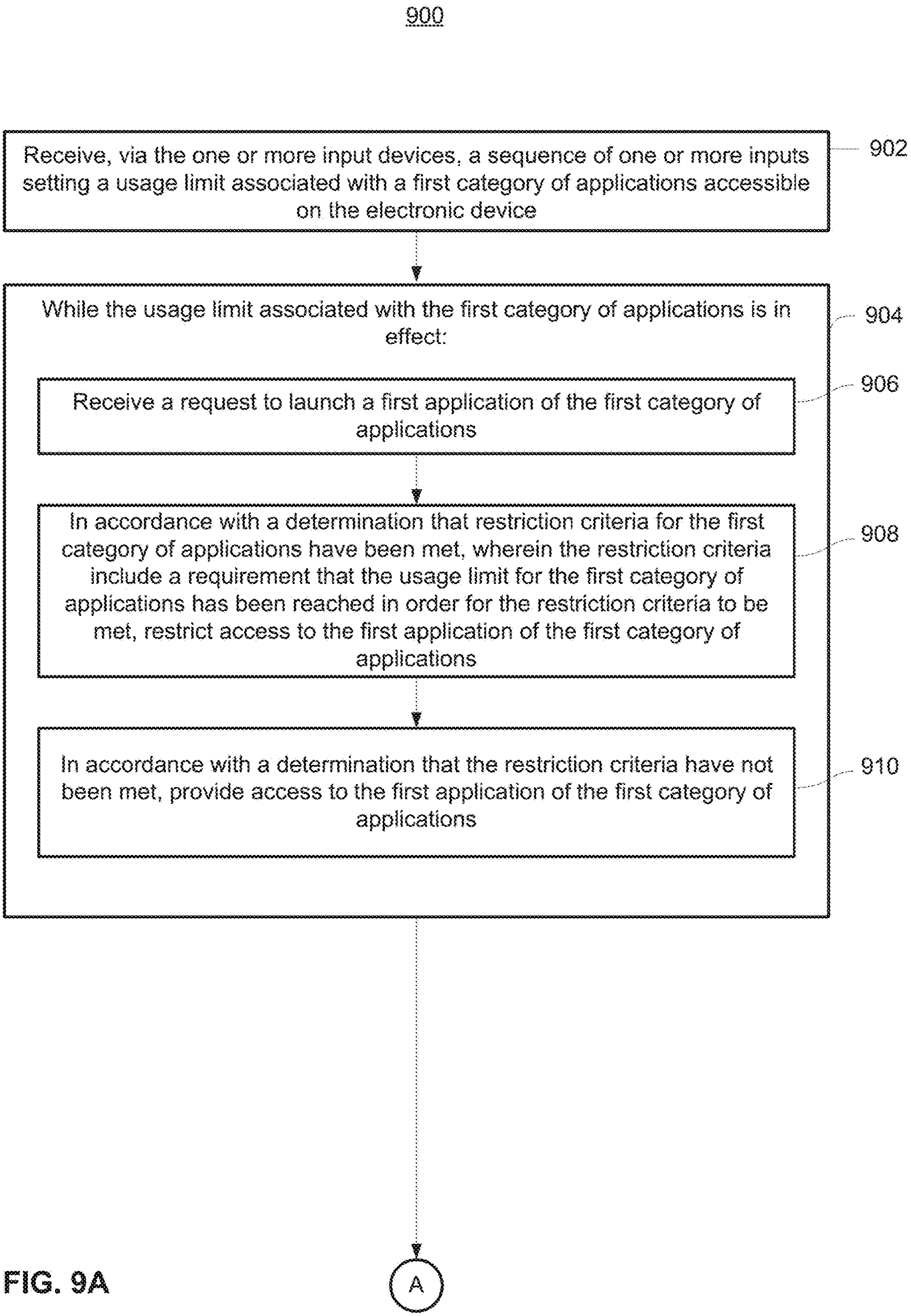
Figure 9B:
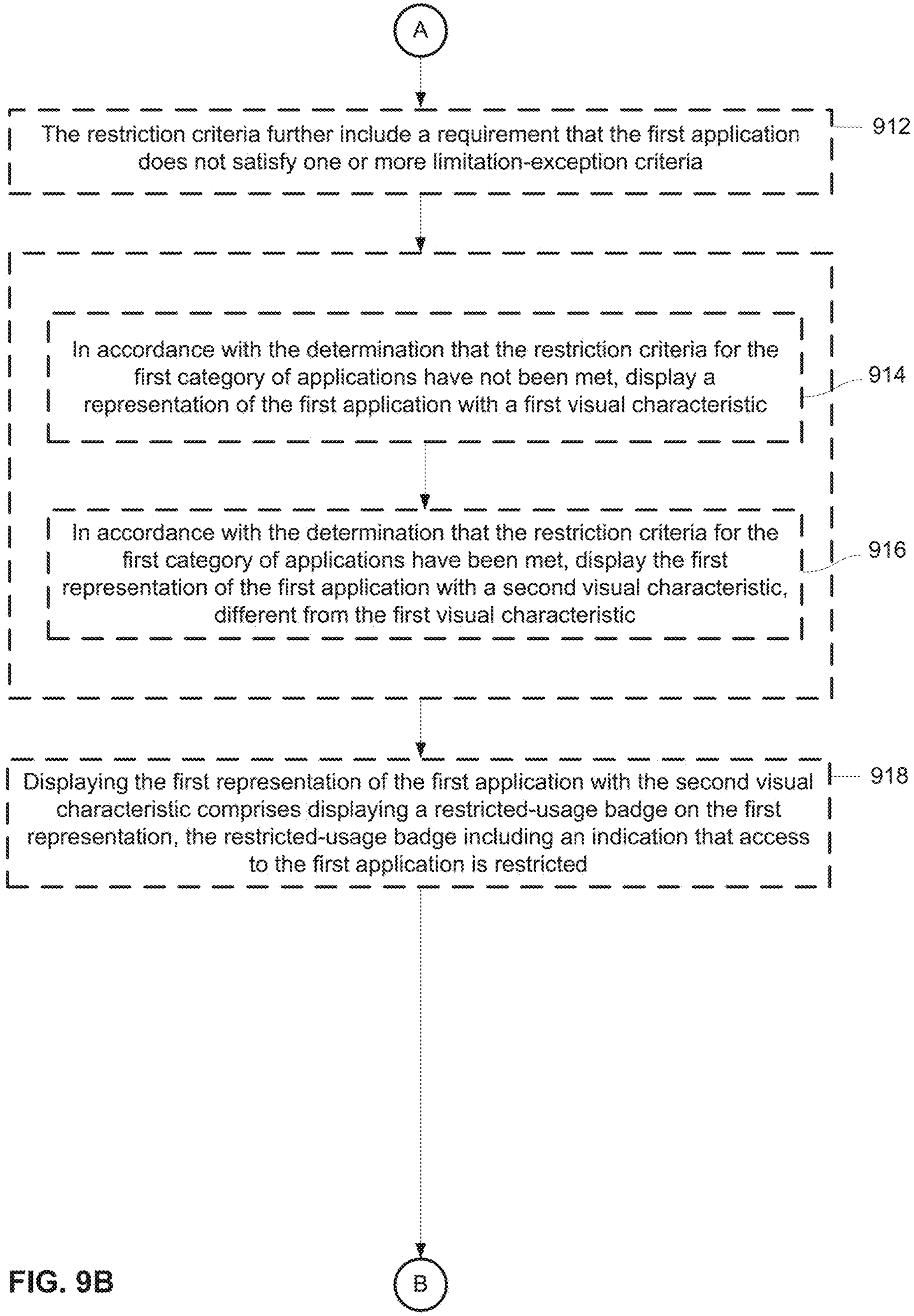
Figure 9C:
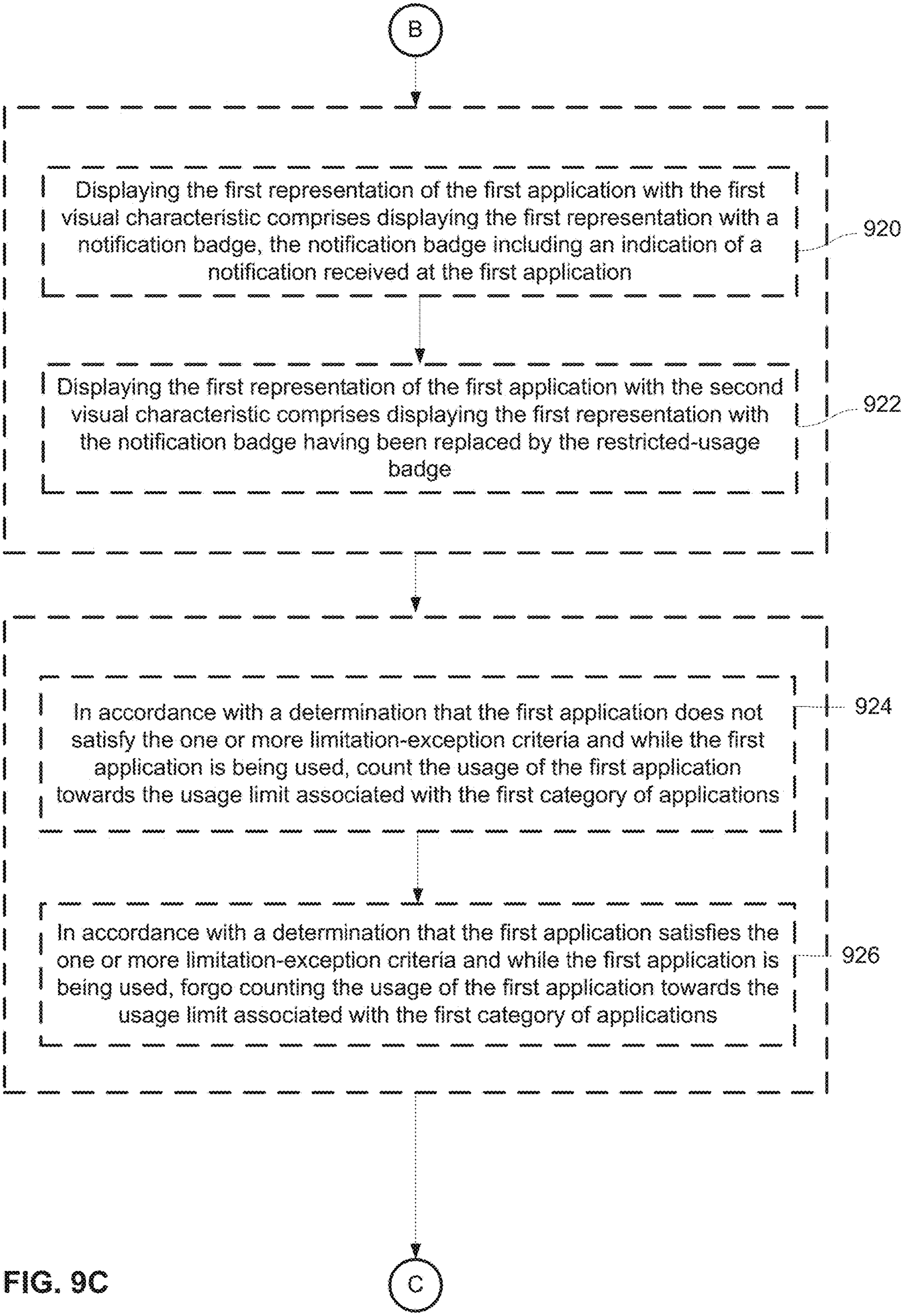
Figure 9D:
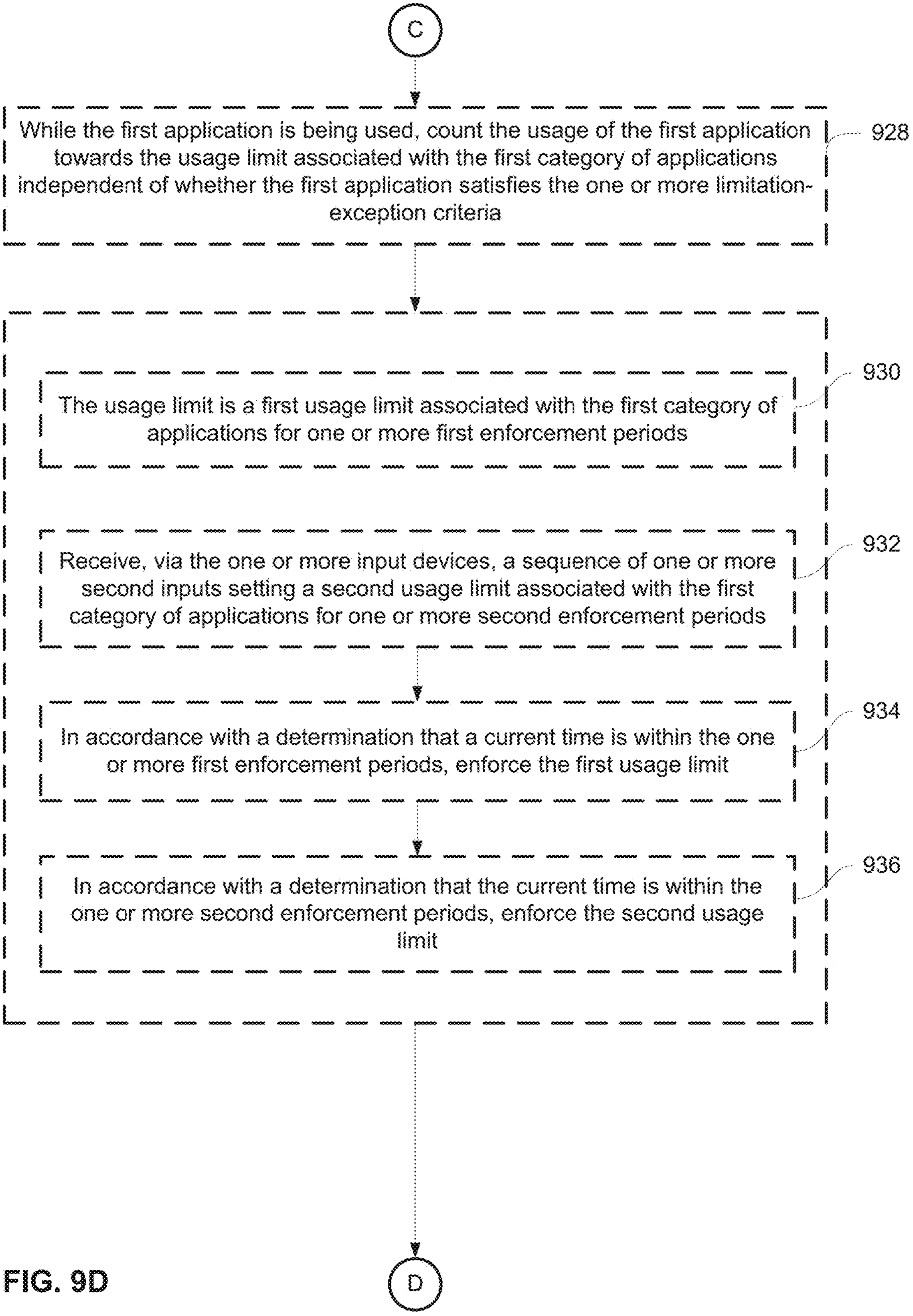
Figure 9E:
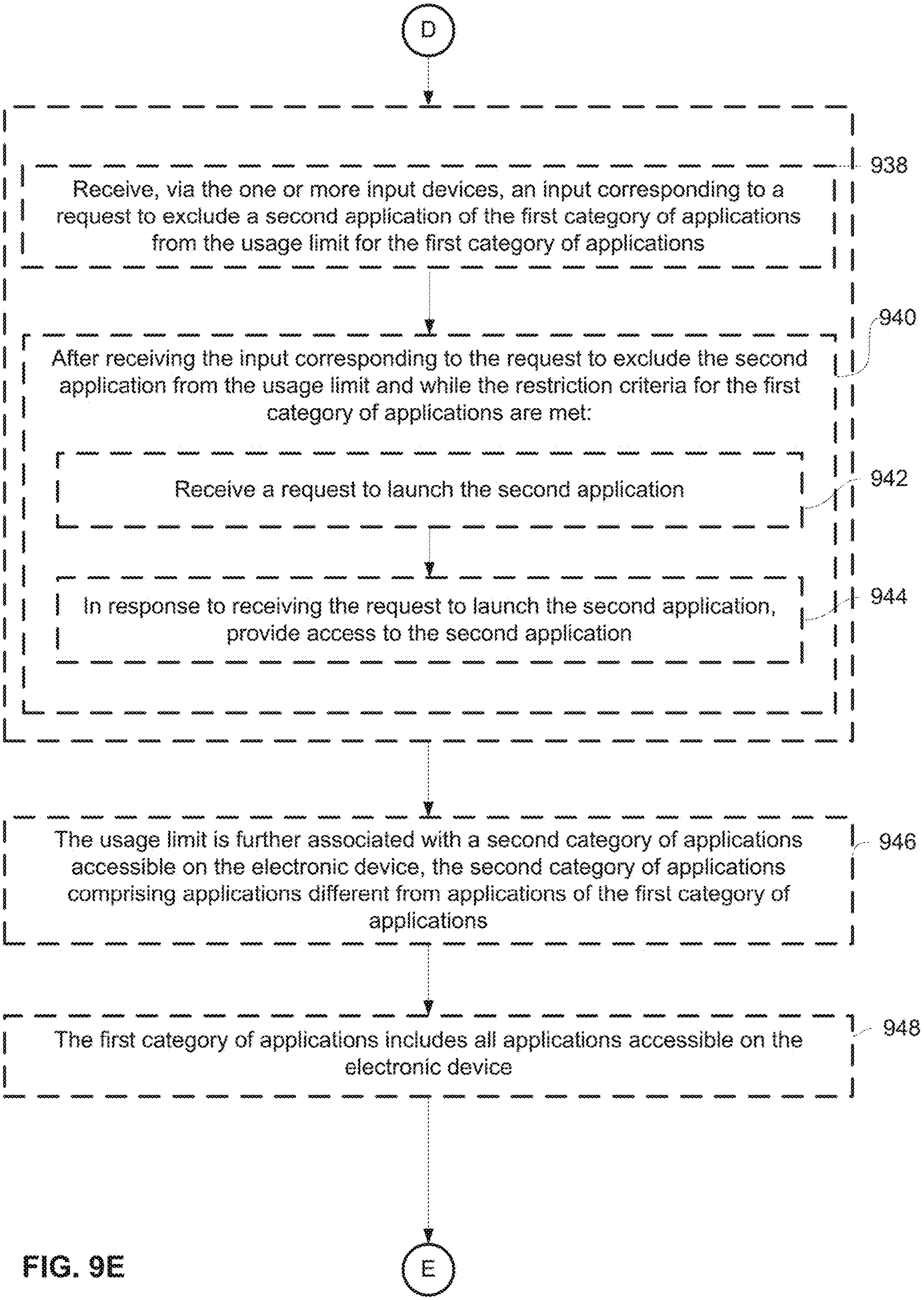
Figure 9F:
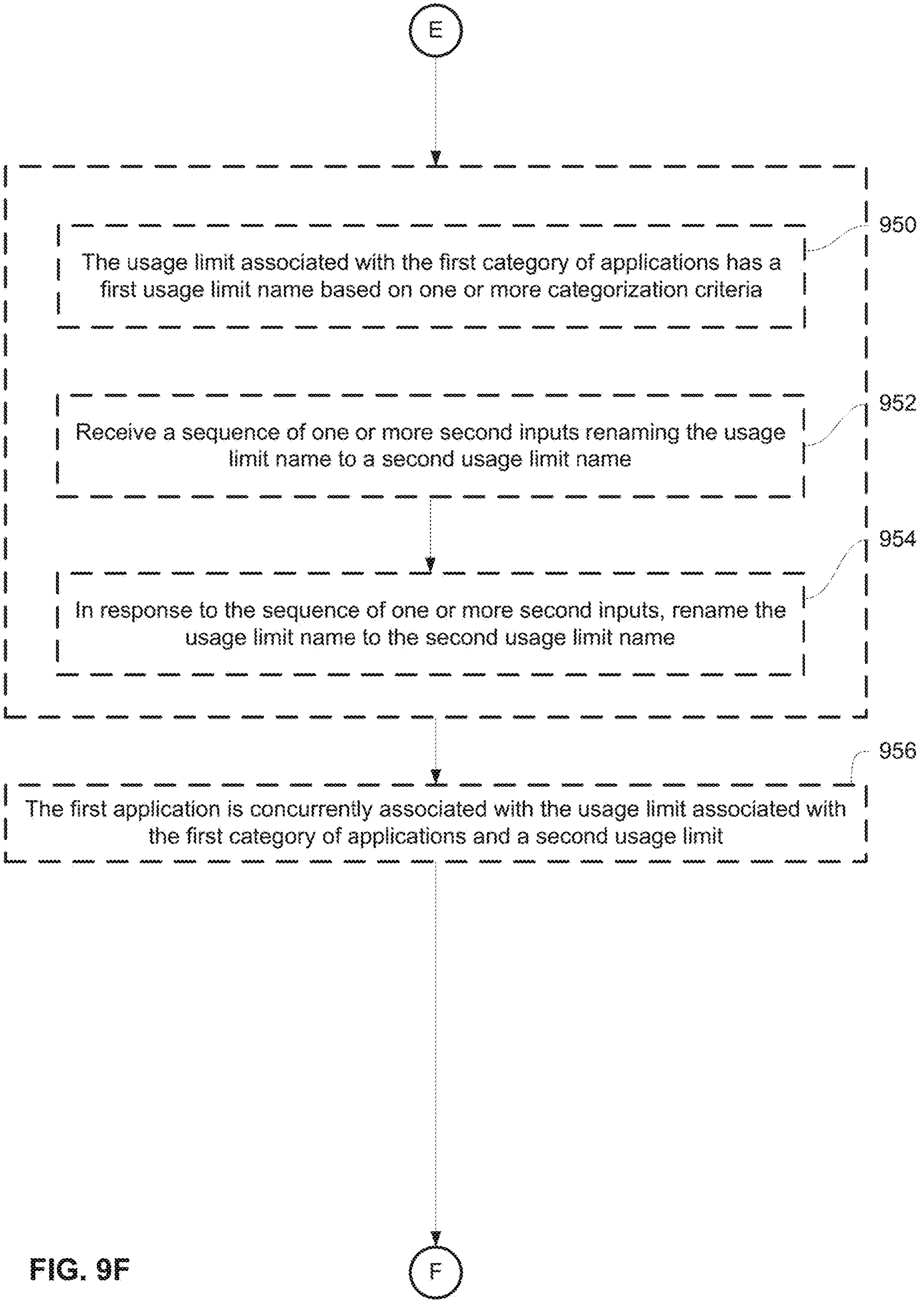
Figure 9G:
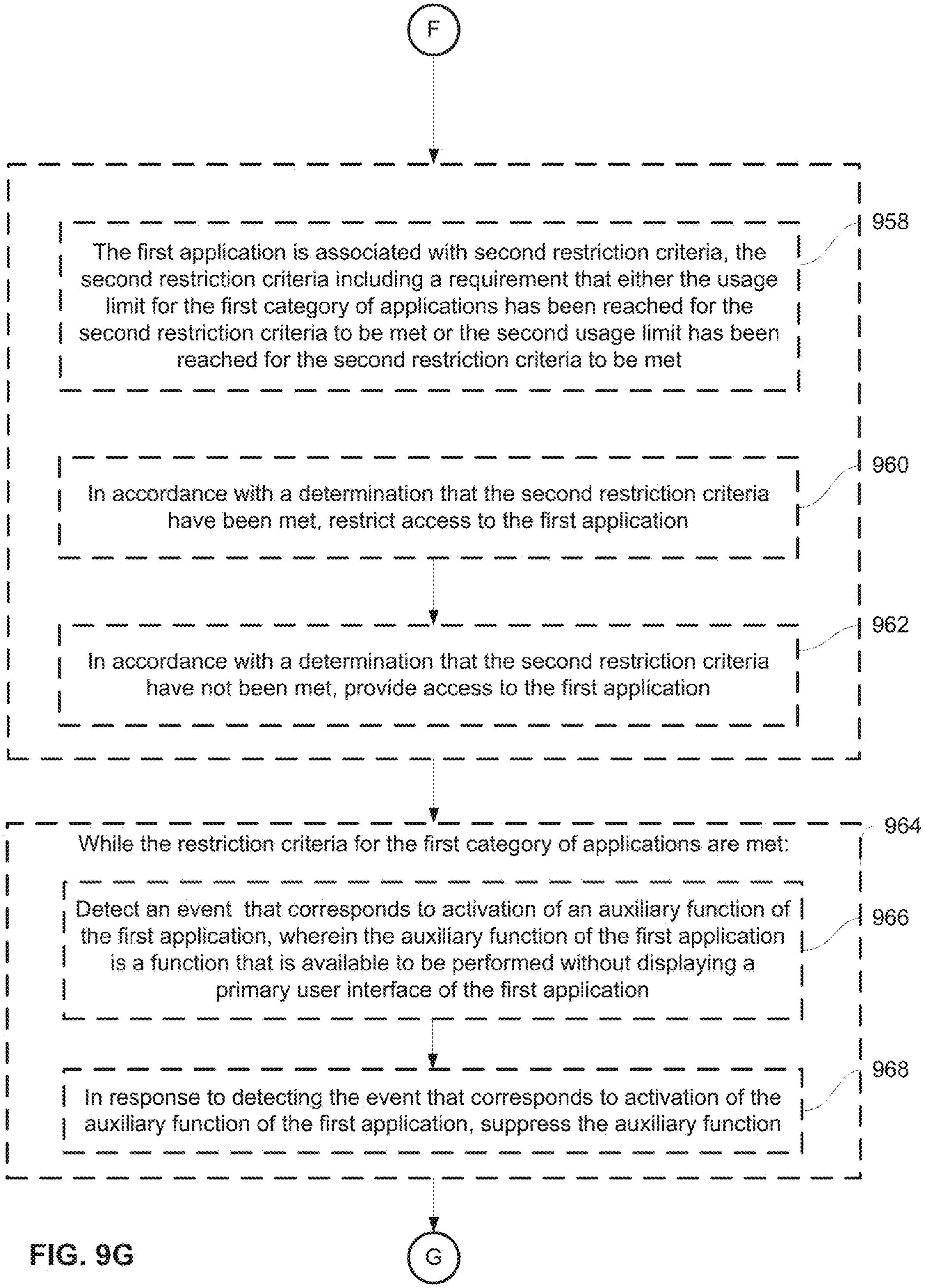
Figure 9H:
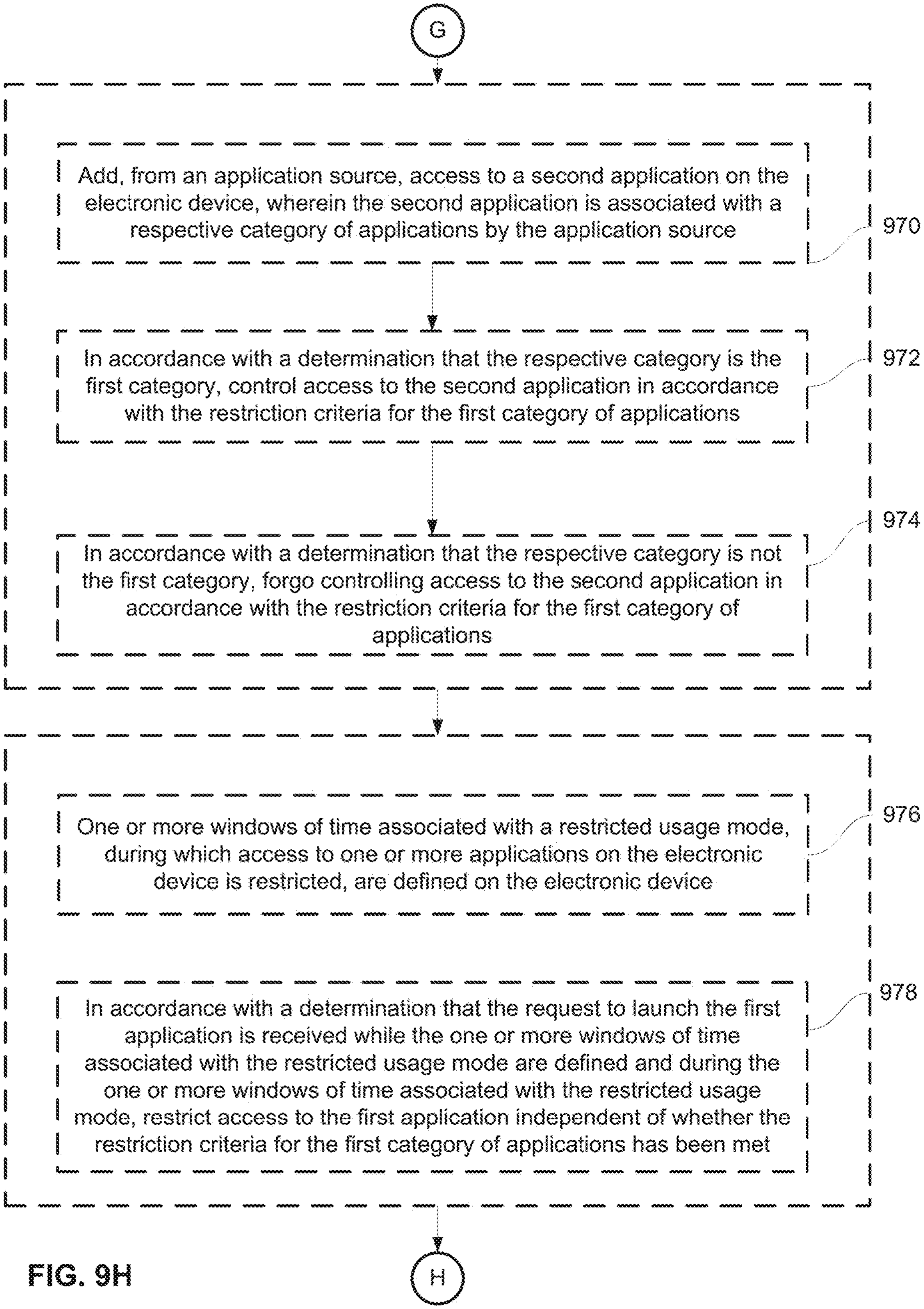
Figure 9J:
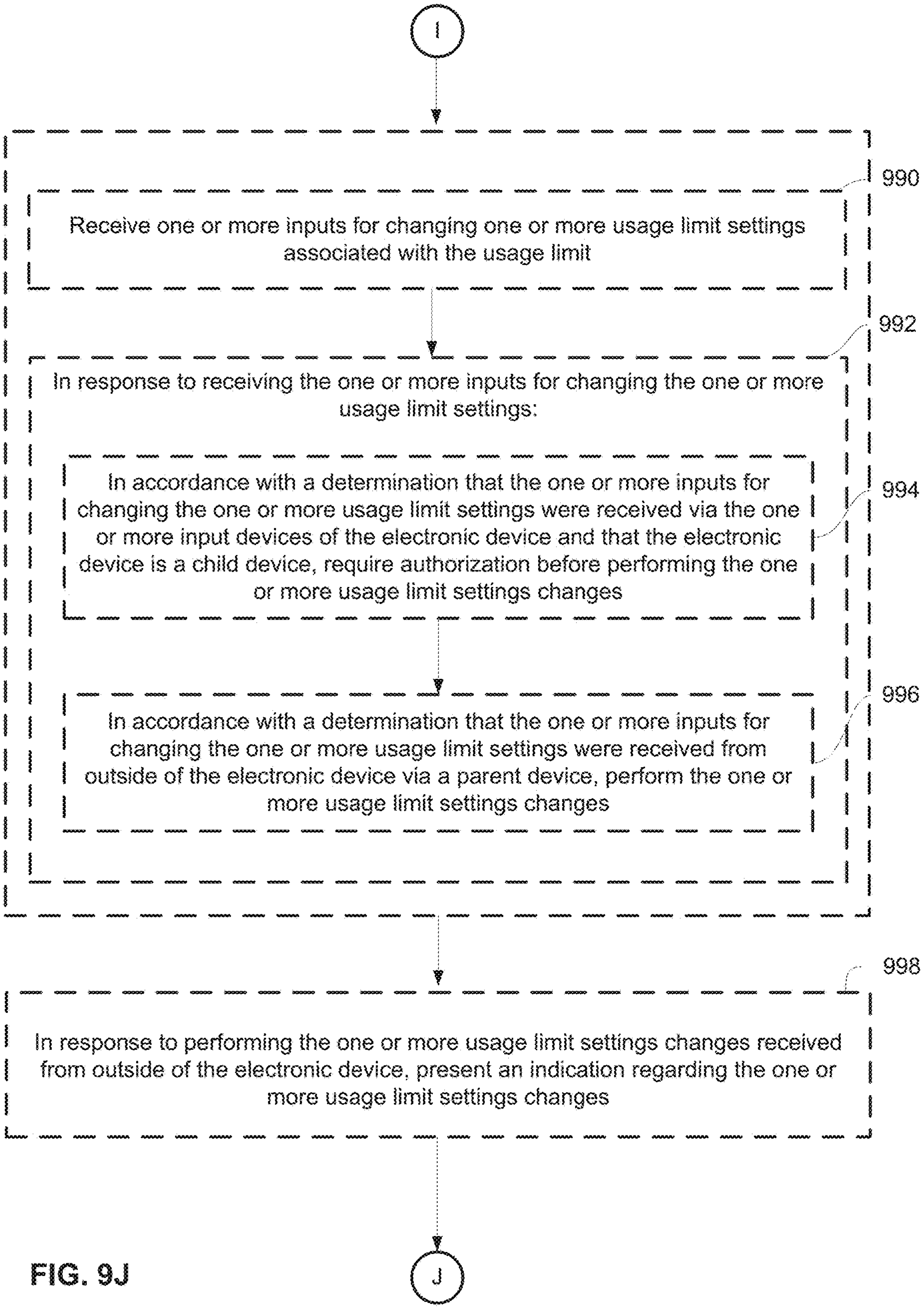
Figure 9K:
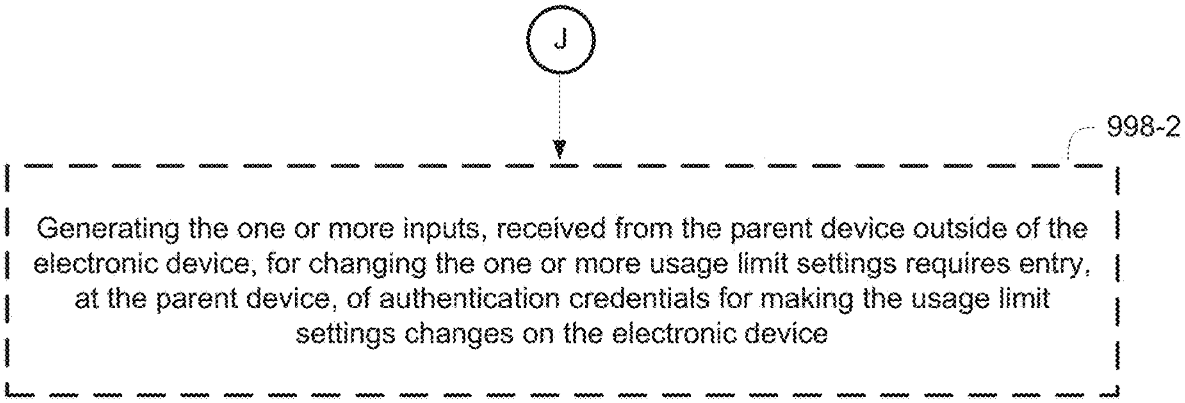

In FIGS. 8Y-8Z, a vertical swipe of contact 803 is detected on touch screen 504 while home screen 802 is displayed, which causes device 500 to display a notification history user interface 878 in FIG. 8Z at a time during which restriction criteria are met on device 500 (e.g., Social Media category usage limit is reached). The notification history user interface 878 includes notifications 880*a-b* associated with notifications of applications on the device. In some embodiments, in response to a determination that a usage limit is reached, appearances of notifications of applications associated with the usage limit are updated (e.g., the notification is greyed out) to indicate that the associated applications are restricted. In some embodiments, notifications with the updated appearances are not selectable. In some embodiments, in response to a determination that a usage limit is reached, notifications of applications associated with the usage limit are not displayed (e.g., suppressed) on the notification history user interface 878. When one or more notifications are suppressed on the notification history user interface 878, the electronic device 500 optionally displays one or more other notifications associated with non-restricted applications in place of the notifications associated with restricted applications. For example, in FIG. 8Z, notification 880*a* associated with Social Media application A is greyed out (or optionally not displayed), in response to a determination by the device 500 that the Social Media usage limit category has been reached, while notification 800*b* associated with the Music application indicates that access to the Music application is not restricted.

Such modifications of the display of representations associated with restricted applications are also made by device 500 in other user interfaces. For example, in FIGS. 8AA-8BB, a horizontal swipe of contact 803 is detected on touch screen 504 while home screen 802 is displayed, which causes device 500 to display a search user interface 866 in FIG. 8BB at a time during which restriction criteria are met on device 500 (e.g., Social Media category usage limit is reached). Search user interface 866 is substantially similar to the user interface described in FIGS. 8V-8W.

"App Suggestions" user interface 870*a* displays applications suggested to the user by the operating system of device 500 (e.g., suggesting commonly used applications, recently used applications, favorite applications, currently running applications). In some embodiments, when a usage limit is reached (e.g. Social Media category usage limit), appearances of suggested applications that are restricted are updated to indicate their restricted status (e.g., the icon is grayed out, Social Media Application A icon 440 is grayed out). In some embodiments, when a usage limit is reached, applications associated with the usage limit do not appear on the "App Suggestions" user interface 870*a*, and in some embodiments are replaced by representations of other applications for which restriction criteria have not been met.

In some embodiments, when a usage limit is reached (e.g., Social Media category usage limit), appearances of widgets corresponding to applications associated with the usage limit are updated to indicate their restricted status (e.g., the widgets are grayed out, widget 870*b*, which corresponds to Social Media Application A, is grayed out), as illustrated in FIG. 8BB. In some embodiments, when a usage limit is reached, widgets corresponding to applications associated with the usage limit do not appear on the search user interface 866. When application icon or widget is suppressed on the search user interface 866, the electronic device 500 optionally displays one or more other icons or widgets associated with non-restricted applications in place of the notifications associated with restricted applications. For example, in FIG. 8BB, widget 870*b* associated with Social Media application A is greyed out (or optionally not displayed), in response to a determination by the device 500 that the Social Media usage limit category has been reached, while widget 870*c* associated with the whitelisted Social Media Application B (e.g., a non-selected application on the usage limit setup user interface 818 in FIG. 8I) indicates that access to the Social Media Application B is not restricted.

In FIG. 8CC, the user has entered the search term "Social Media" into text field 868 at a time during which restriction criteria are met on device 500 (e.g. Social Media category usage limit is reached). In response to the search term "Social Media" having been entered into text field 868, device 500 displays various search results in search user interface 866 relating to the search term "Social Media." During this time, access to applications associated with a usage limit that is reached is restricted. For example, when the Social Media category usage limit is reached, device 500 displays a link 874*a* with an updated appearance (e.g., Social Media Application A icon is grayed out) to social media application "Social App A" installed on device 500, a link 874*b* with an updated appearance (e.g., Social Media Application A icon is grayed out) to social media website "Social App A", which is a website related to the "Social App A" app. In some embodiments, the updated link appearance indicates that the Social Media Application A and the social media website corresponding to Social Media Application A are restricted at the time of the search (e.g., when the Social Media category usage limit is reached). In some embodiments, when the Social Media category usage limit is reached, restricted Social Media category applications (e.g., non-whitelisted Social Media category applications, Social Media Applications A and C-E) do not appear in the search results. When one or more links are suppressed on the search user interface 866, the electronic device 500 optionally displays one or more other links associated with non-restricted applications in place of the notifications associated with restricted applications. For example, in FIG. 8CC, link 874*b* associated with Social Media application A is greyed out (or optionally not displayed), in response to a determination by the device 500 that the Social Media usage limit category has been reached, while links 874*c* associated with the uninstalled Social Media Application F and Social Media Application G indicate that installation of these applications is not restricted.

FIG. 8DD illustrates a web browser user interface 882 during which restriction criteria are met on device 500 (e.g. Social Media category usage limit is reached). As illustrated in the figure, the user attempts to access the website corresponding to Social Media Application A (e.g., "www.socmeda.com"). In some embodiments, in response to the attempt to access the Social Media website during a time when the Social Media category usage limit is reached, the content 882-4 of the web browser user interface 882 is hidden from the user by device 500, and a message notifying the user that the Social Media usage limit has been reached is shown by device 500, as illustrated in FIG. 8DD. In some embodiments, when a usage limit is reached, any aspect of the websites (e.g., pages with a same home page URL) corresponding to applications associated with the usage limit is restricted to the user.

FIG. 8EE illustrates another web browser user interface 882 during which restriction criteria are met on device 500 (e.g. Social Media category usage limit is reached). As illustrated in the figure, the user attempts to access the website corresponding to Social Media Application A (e.g., "www.socmeda.com"). In some embodiments, in response to the attempt to access the Social Media website during a time when the Social Media category usage limit is reached, the content 882-4 of the website is overlaid, by device 500, with a message 882-6 notifying the user that the Social Media usage limit has been reached. When the Social Media category usage limit is reached, appearances of user interface objects (e.g., Social Media Application icon A, images 1 and 2) on content 882-4 are optionally updated (e.g., the user interface objects are grayed out) to indicate that access to the website is restricted, as illustrated in FIG. 8EE. In some embodiments, when a usage limit is reached, any aspect of the websites (e.g., pages with a same home page URL) corresponding to applications associated with the usage limit is restricted to the user.

FIGS. 8FF-8HH illustrate exemplary methods of installing an application on device 500 in situations where the restriction criteria for a category associated with the application are met.

FIG. 8FF illustrates a home screen 802 when the Social Media category usage limit is reached. In response to the Social Media category usage limit being reached, the appearance of the Social Media Application A icon 440 is updated to reflect that access to the application is restricted (e.g., the icon is grayed out, a restriction badge 876 overlays the icon). As illustrated, the user selects App Store icon 448 to proceed to the App Store.

FIG. 8GG illustrates an App Store user interface 884. The App Store user interface 884 is displayed in response to selection of the App Store icon 448. As illustrated, the user selects link 886 (e.g., "Get") associated with Social Media Application F to add (e.g., download, install) the application to the electronic device. In some embodiments, based on App Store attributes or application metadata, Social Media Application F is associated with the Social Media category usage limit.

FIG. 8HH illustrates a home screen 802 when the Social Media category usage limit is reached. In response to adding Social Media Application F from the App Store, Social Media Application F icon 452 is added to the home screen 802. Because the Social Media category usage limit is reached and Social Media Application F is determined to be associated with the Social Media category usage limit, the Social Media Application F icon 452 reflects that the application is restricted (e.g., the icon is grayed out, a restriction badge 876*b* overlays the icon).

FIGS. 8II-8KK illustrate exemplary methods of restricting access to applications in accordance with a determination that the electronic device is in a restricted usage mode (e.g., described in more detail with reference to FIGS. 10A-10AAA and method 1100).

FIG. 8II illustrates a home screen 802 when no usage limit has yet been reached. In FIG. 8JJ, a message 888 (e.g., a notification) is presented and overlays the home screen 802. The message 888 indicates that a restricted usage mode (e.g., device downtime) will begin in 5 minutes. The message 888 ceases to display if the user selects "dismiss" on the message. In some embodiments, in the absence of a "dismiss" option, the message automatically ceases to display after a time period (e.g., 5 seconds, 30 seconds, or 1 minute).

FIG. 8KK illustrates a home screen 802 when bedtime restrictions (e.g., a restricted usage mode) are in effect, but no application usage limits have been reached. For example, FIG. 8KK optionally illustrates home screen 802 more than 5 minutes after the message 888 was presented. When bedtime restrictions are in effect, applications selected to be limited by the bedtime restrictions are restricted. In some embodiments, when bedtime restrictions are in effect, access to limited applications is restricted, even if no usage limit for those applications is reached. For example, when bedtime restrictions are optionally in effect, the Social Media category usage limit optionally has 2 hours remaining. The bedtime restrictions optionally override the usage limit settings. That is, Social Media category applications, and any other non-whitelisted applications, are restricted when bedtime restrictions are in effect, even when the Social Media category (or other) usage limit is not reached. Appearances of icons (e.g., the icons are grayed out, restriction badges 876 overlay the icons) of restricted applications are updated to indicate that the applications are restricted (e.g., Social Media Application A 440, Social Media Application B 442, Messenger Application 424, Music Application 450).

FIGS. 8LL-8PP illustrate exemplary methods of presenting an indication that access to an application is restricted and providing access to the application.

FIG. 8LL illustrates device 500 displaying home screen 802 when no usage limit is reached. FIG. 8MM illustrates device 500 displaying home screen 802 when a usage limit (e.g., Social Media category usage limit) is reached under the "notify" option of the usage limit settings. In some embodiments, the "notify" option is set on the category usage limit customization user interface 824 with reference to FIG. 8M. Appearances of application icons (e.g., Social Media Application A 440) associated with restrictions are updated to indicate that the application is restricted (e.g., the icon is grayed out, restriction badges 876 overlays the icon). As illustrated, the user attempts to launch Social Media Application A by selecting Social Media Application A icon 440 in FIG. 8MM.

In response to the attempt to launch a restricted application (e.g., access to the application is restricted when a usage limit is reached), device 500 optionally visually obscures home screen 802 (e.g., blurring, greying out, or visually altering the home screen) with a restriction notification user interface 890, as displayed in FIG. 8NN. Although the restriction notification user interface 890 is displayed in response to an action when the home screen was displayed (e.g., launching an application from the home screen), it is understood that the notification user interface 890 can be displayed over any currently displayed content by the device when the usage limit is reached (e.g., a user interface of an application). In some embodiments, device 500 displays explanation 890-1 indicating that the usage limit associated with the selected application has been reached. In some embodiments, the explanation 890-1 includes a visual indication (e.g., an empty hour glass) to convey to the user that a limit has been reached, as illustrated in FIG. 8NN. The restriction notification user interface 890 also optionally includes a plurality of icons 890-2. The plurality of icons 890-2 include application icons (e.g., Social Media Applications A and C-E) associated with the reached usage limit (e.g. Social Media category usage limit). If the reached usage limit were only associated with a single application, then user interface 890 optionally would include the icon only for that single application.

The restriction notification user interface 890 in FIG. 8NN includes a "dismiss" affordance 892. Selection of the dismiss affordance 892 is detected in FIG. 8NN (e.g., by contact 803 detected on dismiss affordance 892). In response to selection of the dismiss affordance 892, device 500 ceases to display the dismiss affordance 892 on the restriction notification user interface 890 and displays extend affordance 894 and ignore affordance 896 as shown in FIG. 8OO.

In some embodiments, the user selecting extend affordance 894 allows the user to access a restricted application beyond the application's usage limit (without changing the actual time set for the usage limit, such that the previously-defined usage limit will continue to be enforced on future days) for a predefined or user-defined amount of time beyond the usage limit (e.g., 5 minutes, 15 minutes, 30 minutes) (e.g., as described below with reference to method 900). In some embodiments, the user selecting ignore affordance 896 allows the user to forgo enforcement of the usage limit for that particular day (without changing the actual time set for the usage limit, such that the previously-defined usage limit will continue to be enforced on future days) (e.g., as described below with reference to method 900). In some embodiments, device 500 ceases to display extend affordance 894 and ignore affordance 896 after a period of time (e.g., 5 seconds, 10 seconds, 20 seconds) or when the user returns to the home screen 802 (e.g., by tapping on any part of the restriction notification user interface 890 (other than explanation 890-1, extend affordance 894 and ignore affordance 896), by selecting the home button of the electronic device).

Pursuant to the "notify" option, a parent device (e.g., a device associated with a parent on a family account) or a device not associated with a family account at all (e.g., a standalone device) optionally does not require the user to enter any authentication (e.g., a passcode, biometric authentication) to extend or ignore the usage limit restrictions on that device. As such, in response the selection of the extend affordance 894 or the ignore affordance 896 in FIG. 8OO, the restriction notification user interface 890 ceases to display and a user interface of the selected application is displayed; the user has unrestricted access to applications associated with the extended usage limit for an amount of time defined by the affordance selection (e.g., 15 minutes, rest of the day). When the usage limit is extended or ignored, all other aspects of applications (e.g., any of the restricted user interface objects described previously) associated with the usage limit are also extended or ignored. For example, a user can view or interact with widgets, notifications and webpages corresponding to the applications associated with the extended or ignored usage limit. For example, as illustrated in FIG. 8PP, in response to the selection of the extend affordance in FIG. 8OO, the restriction notification user interface 890 ceases to display and a Social Media Application A user interface 898 is displayed. After the restriction notification user interface 890 ceases to display, the user has an additional 15 minutes of Social Media category usage time. In some embodiments, after the restriction notification user interface 890 ceases to display and prior to accessing the selected application, a graphical user interface object (e.g., a reset hour glass, such as an animation of hour glass 890-1 being flipped over and starting to run again) is presented on the display to indicate that usage limit is extended. In some embodiments, usage of applications associated the reached usage limit is tracked beyond the reached limit (e.g., by extending, by ignoring for the rest of the day). For example, the Social Media category usage limit optionally is two hours. When the Social Media category usage limit is reached, the user optionally extends Social Media usage beyond the usage limit. The user's Social Media usage beyond the two hour limit is optionally tracked by the device.

FIGS. 8QQ-8UU illustrate exemplary methods of presenting an indication that access to an application is restricted and providing access to the application on a parentally controlled child device using local authentication.

FIG. 8QQ illustrates a parentally controlled child device 500A displaying home screen 802 when no usage limit is reached. FIG. 8RR illustrates device 500 displaying home screen 802 when a usage limit (e.g., Social Media category usage limit) is reached under the "notify and block" option of the usage limit settings. In some embodiments, the "notify and block" option is set on the category usage limit customization user interface 824 with reference to FIG. 8M. Appearances of application icons (e.g., Social Media Application A 440) associated with restrictions are updated to indicate that the application is restricted (e.g., the icon is grayed out, restriction badges 876 overlays the icon). As illustrated, the user attempts to launch Social Media Application A by selecting Social Media Application A icon 440 in FIG. 8RR.

In response to the attempt to launch a restricted application (e.g., access to the application is restricted when a usage limit is reached), device 500A optionally visually obscures home screen 802 (e.g., blurring, greying out, or visually altering the home screen) with a restriction notification user interface 890, as displayed in FIG. 8SS. The restriction notification user interface 890 is substantially similar to the user interface described in FIG. 8NN.

Selection of the dismiss affordance 892 is detected in FIG. 8SS (e.g., by contact 803 detected on dismiss affordance 892). In response to selection of dismiss affordance 892, device 500A ceases to display dismiss affordance 892 on the restriction notification user interface 890 and displays local authentication request affordance 898-2 and remote authentication request affordance 898-4 as shown in FIG. 8TT.

Under the "notify and block" option, a parentally controlled child device (e.g., a device associated with a child on a family account) requires the user to enter authentication (e.g., a local authentication (e.g., a passcode, biometric authentication) on the device, a remote authentication from a different device (e.g., a parent device)) to extend or ignore the usage limit restrictions on that device. For example, as illustrated in FIG. 8TT, the user selects the local authentication request affordance 898-2 to request local authentication of the desired extension of the social media usage limit (e.g., authentication on the parentally controlled child device 500A).

As illustrated in FIG. 8UU, in response to the selection of the local authentication request affordance 898-2 in FIG. 8TT, a passcode input user interface 842 displayed by device 500A prompts an authorizing user (e.g., a parent) to enter the authentication in-person. Although a four-digit numeric passcode is prompted in the illustration, it is understood that different kinds of authentication credentials are optionally used to secure digital health settings (e.g., alphanumeric passwords, biometric authentication, etc.). In some embodiments, the authenticating passcode to extend or ignore the usage limit is different than the passcode of the electronic device to prevent unauthorized extension of the usage limit. For example, the authenticating passcode is optionally the digital health passcode with reference to FIG. 8N. In some embodiments, in response to a correctly entered authentication (e.g., a correct passcode), the user is granted additional access to the selected application beyond the usage limit (e.g., 15 minutes, rest of the day). When the usage limit is extended or ignored, all other aspects of applications (e.g., any of the restricted user interface objects described previously) associated with the usage limit are also extended or ignored. For example, a user can view or interact with widgets, notifications and webpages corresponding to the applications associated with the extended or ignored usage limit.

After the request to extend usage beyond the usage limit is authenticated, the electronic device behaves in a substantially similar manner as an electronic device under the "notify" option after a usage limit is extended, as described in FIG. 8PP and its respective descriptions.

FIGS. 8VV-8YY illustrate exemplary methods of presenting an indication that access to an application is restricted and providing access to the application based on authentication credentials from a parent device.

In response to an attempt to launch a restricted application (e.g., access to the application is restricted when a usage limit is reached), as similarly reflected in FIGS. 8QQ and 8RR and their respective descriptions, child device 500A optionally visually obscures home screen 802 (e.g., blurring, greying out, or visually altering the home screen) with a restriction notification user interface 890, as displayed in FIG. 8VV. The restriction notification user interface 890 is substantially similar to the user interface described in FIG. 8NN.

Selection of the dismiss affordance 892 is detected in FIG. 8VV (e.g., by contact 803 detected on dismiss affordance 892). In response to selection of dismiss affordance 892, device 500A ceases to display dismiss affordance 892 on the restriction notification user interface 890 and displays local authentication request affordance 898-2 and remote authentication request affordance 898-4 as shown in FIG. 8WW.

Under the "notify and block" option, a child device (e.g., a device associated with a child on a family account) requires the user to enter authentication (e.g., a local authentication (e.g., a passcode, biometric authentication) on the device, a remote authentication from a different device (e.g., a parent device)) to extend or ignore the usage limit restrictions on that device. For example, as illustrated in FIG. 8WW, the user selects the remote authentication request affordance 898-4 to request remote authentication of the desired extension of the social media usage limit (e.g., authentication on a parent device 500B).

For example, as illustrated in FIG. 8XX, in response to the selection of the remote authentication request affordance 898-2 on the child device 500A in FIG. 8WW, a message 898-6 including a plurality of extension affordances 898-8*a* to 898-8*d* is displayed on the parent device 500B. As illustrated in FIG. 8BB, in some embodiments, the message 898-6 notifies the parent user that a usage limit (e.g., Social Media category) on a child device (e.g., John Jr.'s device) is reached and the child user is requesting additional usage beyond the usage limit. The plurality of extension affordances 898-8*a* to 898-8*d* give the parent user different usage limit extension options (e.g., extend by 15 minutes, extend for the rest of the day, customize the extension, decline the request for extension); the selected extension option is applied to the child device 500A. For example, as illustrated in FIG. 8XX, the parent user selects extension affordance 898-8*a* to give the requesting child user an additional 15 minutes beyond the usage limit.

In some embodiments, in response to the selection of one of the extension affordances 898-8*a* to 898-8*d*, a passcode input user interface 842 prompts an authorizing user (e.g., a parent) to enter an authentication on the remote authenticating device (e.g., parent device 500B), as illustrated in FIG. 8YY. Although a four-digit numeric passcode is prompted in the illustration, it is understood that different kinds of authentication credentials are optionally used to secure digital health settings (e.g., alphanumeric passwords, biometric authentication, etc.). In some embodiments, the authenticating passcode to extend or ignore the usage limit is different than the passcode of the electronic device to prevent unauthorized extension of the usage limit. For example, the authenticating passcode is optionally the digital health passcode with reference to FIG. 8N. In some embodiments, in response to a correctly entered authentication (e.g., a correct passcode) at parent device 500B, the child device 500A is granted additional access to the selected application beyond the usage limit; the amount of additional access depends on the selected extension affordance. In some embodiments, a passcode is not required to respond to the message 898-6. In some embodiments, after the request is authenticated, the child device 500A displays an indication (e.g., a notification) of the result of the request (e.g., extend by 15 minutes, extend of the rest of the day, request is declined).

After the request to extend usage beyond the usage limit is authenticated by a remote authenticating device (e.g., parent device 500B), the electronic device behaves in a substantially similar manner as an electronic device under the "notify" option after a usage limit is extended, as reflected in FIG. 8PP and its respective descriptions.

FIGS. 8ZZ-8CCC illustrate exemplary methods of presenting an indication that access to an application is restricted and providing access to the application based on input from a parent device.

In response to an attempt to launch a restricted application (e.g., access to the application is restricted when a usage limit is reached), as similarly described in FIGS. 8QQ and 8RR and their respective descriptions, child device 500A optionally visually obscures home screen 802 (e.g., blurring, greying out, or visually altering the home screen) with a restriction notification user interface 890, as displayed in FIG. 8ZZ. The restriction notification user interface 890 is substantially similar to the user interface described in FIG. 8NN.

Selection of the dismiss affordance 892 is detected in FIG. 8ZZ (e.g., by contact 803 detected on dismiss affordance 892). In response to selection of dismiss affordance 892, device 500A ceases to display dismiss affordance 892 on the restriction notification user interface 890 and displays local authentication request affordance 898-2 and remote authentication request affordance 898-4 as shown in FIG. 8AAA.

Under the "notify and block" option, a child device (e.g., a device associated with a child on a family account) requires the user to enter authentication (e.g., a local authentication (e.g., a passcode, biometric authentication) on the device, a remote authentication from a different device (e.g., a parent device)) to extend or ignore the usage limit restrictions on that device. For example, as illustrated in FIG. 8AAA, the user selects the remote authentication request affordance 898-4 to request remote authentication of the desired extension of the social media usage limit (e.g., authentication on a parent device 500B).

As illustrated in FIG. 8BBB, in some embodiments (e.g., in contrast to the embodiments of FIGS. 8VV-8YY, in response to the selection of the remote authentication request affordance 898-2 on the child device 500A, the restriction notification user interface 890 ceases to display, and a messaging user interface 898-10 is displayed. For example, a messaging user interface that includes a current state of a conversation (e.g., not necessarily related to the usage limit being reached) between the child and the child's parent(s) is displayed (e.g., in the messaging application on device 500B). The messaging user interface 898-10 in FIG. 8BBB includes a message input user interface 898-12 and message send affordance 898-14. Before sending a request for additional application access beyond the usage limit, the child is optionally able to input a message (e.g., using an input device (e.g., a keyboard)) that will be sent with the request for additional application access to a remote authenticating device (e.g., parent device 500B) as part of the existing messaging conversation with the child's parents. To send the request for additional access and the accompanying message, the user selects the message send affordance 898-14. In some embodiments, the child user is able to send the request for additional access to their parents without inputting a message.

In FIG. 8CCC, in response to the selection of the message send affordance 898-14 in FIG. 8BBB, the messaging user interface 898-10 updates with the child's request for additional access optionally represented as a rich message 898-16 to the child's parents. On a device that received the remote authentication request (e.g., parent device 500B), rich message 898-16 is also displayed on the messaging user interface 898-10. The rich message 898-16 optionally includes a request from the child user for additional access, the accompanying message and a plurality of extension affordances 898-18*a* to 898-18*d*.

The plurality of extension affordances 898-18*a*-898-18*d* give the parent user different usage limit extension options (e.g., extend by 15 minutes, extend for the rest of the day, customize the extension, decline the request for extension); the selected extension option is applied to the child device 500A, similar to the selection of an extension affordance described in FIGS. 8XX-8CCC.

In some embodiments, in response to the selection of one of the extension affordances 898-18*a* to 898-18*d*, the authorizing user (e.g., a parent) is prompted to enter an authentication on the remote authenticating device (e.g., parent device 500B), as similarly described in FIG. 8YY. In some embodiments, the authenticating passcode to extend or ignore the usage limit is different than the passcode of the electronic device to prevent unauthorized extension of the usage limit. In some embodiments, in response to a correctly entered authentication (e.g., a correct passcode) at the parent device, the child is granted additional access to the selected application beyond the usage limit; the amount of additional access depends on the selected extension affordance. In some embodiments, a passcode is not required to respond to the message 898-16.

In some embodiments, after the request is authenticated, the child device 500A displays an indication (e.g., a new message on the messaging user interface 898-10, a notification outside of messaging user interface 898-10) of the result of the request (e.g., extend by 15 minutes, extend of the rest of the day, request is declined).

After the request to extend usage beyond the usage limit is authenticated by a remote authenticating device (e.g., parent device 500B), the electronic device behaves in a substantially similar manner as an electronic device under the "notify" option after a usage limit is extended, as described in FIG. 8PP and its respective descriptions.

FIGS. 8DDD-8GGG illustrate exemplary methods of presenting an indication that access to an application is restricted and providing access to the application based on authenticating credentials inputted to the electronic device.

FIG. 8DDD illustrates device 500 displaying home screen 802 when a usage limit (e.g., Social Media category usage limit) is reached under the "notify and block" option of the usage limit settings. In some embodiments, the "notify and block" option is set on the category usage limit customization user interface 824 with reference to FIG. 8M. Appearances of application icons (e.g., Social Media Application A 440) associated with restrictions are updated to indicate that the application is restricted (e.g., the icon is grayed out, restriction badges 876 overlays the icon). As illustrated, the user attempts to launch Social Media Application A by selecting Social Media Application A icon 440.

In response to the attempt to launch a restricted application (e.g., access to the application is restricted when a usage limit is reached), device 500 optionally visually obscures home screen 802 (e.g., blurring, greying out, or visually altering the home screen) with a restriction notification user interface 890, as displayed in FIG. 8EEE. The restriction notification user interface 890 is substantially similar to the user interface described in FIG. 8NN.

For example, selection of the dismiss affordance 892 is detected (e.g., by contact 803 detected on dismiss affordance 892). In response to selection of dismiss affordance 892, device 500 displays ceases to display dismiss affordance 892 on the restriction notification user interface 890 and displays extend affordance 894 and ignore affordance 896 as shown in FIG. 8FFF.

Under the "notify and block" option, a device without parental control (e.g., a device associated with an adult member (e.g., non-child) in a family account, or a device that is not associated with a family account at all (e.g., a standalone device)) requires the user to enter authentication (e.g., a passcode, biometric authentication) on the device to extend or ignore the usage limit restrictions. For example, as illustrated in FIG. 8EEE, the user selects the extend affordance 894 to request for an additional 15 minutes of usage time for the restricted category.

For example, as illustrated in FIG. 8GGG, in response to the selection of the extend affordance 894, a passcode input user interface 842 prompts the user to enter the authentication. Although a four-digit numeric passcode is prompted in the illustration, it is understood that different kinds of authentication credentials are optionally used to secure digital health settings (e.g., alphanumeric passwords, biometric authentication, etc.). In some embodiments, the authenticating passcode to extend or ignore the usage limit is different than the passcode of the electronic device to prevent unauthorized extension of the usage limit. For example, the authenticating passcode is optionally the digital health passcode with reference to FIG. 8N. In some embodiments, in response to a correctly entered authentication (e.g., a correct passcode), the user is granted additional access to the selected application beyond the usage limit (e.g., 15 minutes, rest of the day).

After the request to extend usage beyond the usage limit is authenticated, the electronic device behaves in a substantially similar manner as an electronic device under the "notify" option after a usage limit is extended, as described in FIG. 8PP and its respective descriptions.

FIGS. 8HHH-8III illustrate exemplary methods of displaying an indication that a warning threshold of a usage limit has been reached.

FIG. 8HHH illustrates a user interface 898 of Social Media Application A displayed by device 500. Social Media category usage limit has not been reached while the Social Media Application is being displayed in FIG. 8HHH. FIG. 8III illustrates the user interface 898 while Social Media Application A is being displayed and a threshold amount of Social Media category usage has been reached (e.g., 1 hour 55 minutes, 90% of the Social Media category usage limit). In response to the threshold amount being reached, a notification 898-20 is presented by device 500 on top of the user interface 898 to indicate a remaining time (e.g., 5 minutes)

for the Social Media category usage limit. In some embodiments, the message automatically ceases to display after a time period (e.g., 5 seconds, 30 seconds, or 1 minute).

FIGS. 8JJJ-8KKK illustrate exemplary methods of changing usage limit settings on a child device.

FIG. 8JJJ illustrates an application limits user interface 850 of a child device. A user attempts to access usage limit settings for the Social Media category by selecting Social Media category 852*a*. As illustrated in FIG. 8KKK, in accordance with the selection of Social Media category 852*a* and a determination that the device is a child device, the electronic device requires authentication (e.g., by inputting a passcode on passcode input user interface 842, by providing an authentication credential), before the Social Media category usage limit settings can be changed or viewed. Although a four-digit numeric passcode is prompted in the illustration, it is understood that different kinds of authentication credentials are optionally used to secure digital health settings (e.g., alphanumeric passwords, biometric authentication, etc.). In some embodiments, the passcode required to change or view usage limit settings is different from the passcode of the electronic device to prevent unauthorized access to usage limit settings. For example, the authenticating passcode is optionally the digital health passcode with reference to FIG. 8N.

FIGS. 8LLL-8NNN illustrate exemplary methods of changing child device usage limits settings from a parent device.

FIG. 8LLL illustrates a child device 500A and a parent device 500B. The child device 500A and parent device 500B belong to a same family account. In some embodiments, the designations of child and parent devices are determined during initial family account set up. The child device 500A in FIG. 8LLL displays home screen 802 when usage limit settings (e.g., Social Media category usage limit) are in effect. Meanwhile, the parent device 500B in FIG. 8LLL displays an application limits user interface 850 of the child device 500A. In some embodiments, the application limits user interface 850 of the child device 500A is remotely accessed on parent device 500B from a family account user interface described in the disclosure (e.g., as described with reference to FIGS. 6A-6UU and method 700). A parent selects Social Media category 852*a* (e.g., by using contact 805) to view or change the child device's Social Media category usage limit settings. It is understood that the application limits user interface illustrated on parent device 500B in FIG. 8LL is substantially similar to the application limits user interfaces described in the disclosure (e.g., as described with reference to FIGS. 6A-6UU and method 700).

FIG. 8MMM illustrates a child device 500A and a parent device 500B while a parent user is attempting to modify child usage limit settings on the parent device 500B. In response to the selection of Social Media category 852*a* in FIG. 8LLL, the parent device 500B requires authentication (e.g., by inputting a passcode on passcode input user interface 842, by providing an authentication credential), before the Social Media category usage limit settings for the child device 500A can be changed or viewed. Although a four-digit numeric passcode is prompted in the illustration, it is understood that different kinds of authentication credentials are optionally used to secure digital health settings (e.g., alphanumeric passwords, biometric authentication, etc.). In some embodiments, the passcode required to change or view usage limit settings is different from the passcode of the parent device to prevent unauthorized access to usage limit settings. For example, the authenticating passcode is optionally the digital health passcode with reference to FIG. 8N. In some embodiments, a passcode (e.g., alphanumeric passwords, biometric authentication, etc.) is not required to change a child device's usage limit settings from a parent device. After the attempt to modify child usage limit settings is authenticated on the parent device, the parent user is optionally able to modify any usage limit settings associated with the selected category.

For example, FIG. 8NNN illustrates a child device 500A and a parent device 500B when a parent modifies child usage limit settings on the parent device 500B. After the parent modifies the child device 500A's Social Media usage settings (e.g., using the methods described in the disclosure, Social Media category usage limit has been modified from two hours to one hour as shown in FIG. 8NNN), the parent device displays the application limits user interface 850 of the child device. The modified usage limit settings (e.g., one hour next to Social Media 852*a*) are displayed on the application limits user interface on the parent device 500B in FIG. 8NNN. Meanwhile, on the child device 500A, after a parent modifies the child device 500A's Social Media usage limit settings, a message 898-20 (e.g., a pop-up notification) is presented over home screen 802, for example, as shown in FIG. 8NNN to indicate that the child's Social Media usage limit settings (e.g., usage limit time, customized usage limit time periods, addition of a usage limit, removal of a usage limit, combination of usage limits) have been modified by their parent. In some embodiments, the message automatically ceases to display on the child device after a time period (e.g., 5 seconds, 30 seconds, or 1 minute). In some embodiments, notification 898-20 and appropriate details in notification 898-20 are presented on child device 500A in response to usage settings changes implemented on a parent device 500B regardless of whether those changes are more or less limiting for the child device 500A (e.g., regardless of whether the parent has increased the child's social media usage limit, or reduced it).

FIGS. 9A-9K are flow diagrams illustrating a method 900 of setting and enforcing a usage limit (e.g., restricting an application or a category of application in accordance with a determination that a usage limit associated with the application or category is reached) in accordance with some embodiments of the disclosure. The method 900 is optionally performed at an electronic device such as device 100, device 300, or device 500 as described above with reference to FIGS. 1A-1B, 2-3, 4A-4B, and 5A-5H. Some operations in method 900 are, optionally, combined, and/or the order of some operations is, optionally, changed.

As described below, the method 900 provides ways of setting and enforcing a usage limit for applications or categories of applications on an electronic device. The method reduces usage of the electronic device when a usage limit is reached without requiring the user to monitor his or her own usage. For battery-operated electronic devices, limiting access to applications when one or more usage limits are reached conserves power and increases the time between battery charges.

In some embodiments, an electronic device in communication with a display and one or more input devices (e.g., a mobile device including a touch screen such as device 500 a computer or tablet computer including one or more of a keyboard, mouse, trackpad, and touch screen, a wearable device such as a smart watch including a touch screen, or a set top box in communication with a television and an input device (e.g., a remote control)), receives (902), via the one or more input devices, a sequence of one or more inputs setting a usage limit associated with a first category of applications accessible on the electronic device (e.g., a maximum amount of time (e.g., an hour, three hours, twelve hours) that can be spent using the device or using the device in a specific manner (e.g., using a specific application (e.g., particular social media applications, SMS, Phone, particular travel applications, Email), a specific category of applications (e.g., social media, streaming media, games, travel, work, communications, payment, news), specific functions of the device (e.g., audio, camera, Bluetooth, Wi-Fi), specific functions of an application (e.g., communicating with one or more contacts stored on the electronic device, etc.)) is set on the device by one or more inputs to the device), such as in FIGS. 8A-8M (e.g., usage limit setup for the Social Media category). In some embodiments, the maximum amount of time is aggregated across multiple sessions (e.g., periods of time during which the application is used by the user separated by periods of time during which the application is not used by the user (e.g., when the user is not using the device to run the application, including when the device is off, when the device is asleep, when the device is disconnected from a network, etc.)). In some embodiments, the usage limit is set in a settings user interface of the electronic device (e.g., a settings application for setting the usage limit and one or more other settings of the electronic device such as power settings, display settings, email settings, etc.). In some embodiments, the usage limit is set at a different electronic device in communication with (e.g., by way of wireless connection) the electronic device. For example, a parent device is optionally used to set usage limits for a child's device.

In some embodiments, while the usage limit associated with the first category of applications is in effect (904) (e.g., when the usage limit is in effect, the usage time of the category of applications (e.g., social media category usage time) associated with the usage limit is monitored by the electronic device), the electronic device receives (906) a request to launch a first application of the first category of applications (e.g., a request from a user of the electronic device to launch an application (e.g., A particular social media application), a request from an application on the electronic device for performing a specific function on the device, etc.), such FIG. 8MM (e.g., attempting to launch a Social Media application from the home screen when the Social Media category usage limit has been reached). In some embodiments, an internal timer is associated with usage time of each specific category of applications or each application. In some embodiments, an associated internal timer starts once an application is launched. In some embodiments, the timer stops when the application is no longer used (e.g., the application is closed, the device is turned off or asleep, the device is disconnected, etc.).

In some embodiments, while the usage limit associated with the first category of applications is in effect (904), in accordance with a determination that restriction criteria for the first category of applications have been met, wherein the restriction criteria include a requirement that the usage limit for the first category of applications has been reached in order for the restriction criteria to be met (e.g., determining that the user's usage time of one or more applications (e.g., social media applications) or one or more operations of the first category reaches the usage limit that was set), the electronic device restricts (908) access to the first application of the first category of applications (e.g., restricting the user's access to the one or more applications (e.g., a particular social media application) or operations of the first category (e.g., social media applications in general), such as in FIG. 8NN (e.g., in response to the selection of Social Media, Social Media Application A does not launch). In some embodiments, the usage time of the application being requested to be launched is compared with the usage limit. In some embodiments, in response to determining that the usage limit of the first category of application has been reached, the request to launch the application does not launch the application, or displays a dialog indicating that the usage limit has been reached and requires further user action to complete the launching of the application. In some embodiments, restricting the application from the user is different than preventing the application from running. For example, despite being restricted from the user, the restricted applications or operations are optionally still running on the device (e.g., in the background for performing operating system tasks) independent of user input.

In some embodiments, while the usage limit associated with the first category of applications is in effect (904), in accordance with a determination that the restriction criteria have not been met (e.g., the usage limit for the first category of applications (e.g., social media applications) has not been reached (e.g., determining that the user's usage time of one or more applications or one or more operations of the first category has not reached the usage limit that was set)), the electronic device provides (910) access to the first application of the first category of applications, such as in FIG. 8PP (e.g., the user's access to applications (e.g., a particular social media application) or operations of the first category (e.g., social media applications generally) is not restricted. In some embodiments, the usage time of the application being requested to be launched is compared with the usage limit. In some embodiments, in response to the request to launch the application, the application launches as normal. The application usage limits described here are optionally the same or similar to the application usage limits or thresholds described with reference to methods 700 and 1300. The above-described method of setting a usage limit for a category of applications as a whole and enforcing that usage limit across individual applications of that category of applications allows the electronic device to effectively limit a user's usage of particular device operations and provides an easy way for a user to set such usage limits, which make the usage of the device more efficient (e.g., the user does not have to monitor his or her own device usage, thus reducing the inputs provided by the user to the device (e.g., inputs for otherwise monitoring the user's usage); with the understanding that a usage limit is set, the user may use the limited operations more wisely and efficiently to perform all necessary tasks under the usage limit; if a usage limit is reached, the device restricts the user from using the restricted operations, thereby preventing the user from unknowingly going over the usage limit and spending more time on the device than intended), which, additionally, reduces power usage and improves battery life of the device by enabling the user to use the device more quickly and efficiently.

In some embodiments, the restriction criteria further include a requirement that the first application does not satisfy one or more limitation-exception criteria (912) (e.g., inclusion on a list of applications that is available for use even if the usage limit is used up (e.g., a whitelist)), such as in FIG. 8I (e.g., Social Media Application B is not selected to be enforced by the Social Media category usage limit). In some embodiments, use of such an application does not count toward the usage limit (e.g., the application belongs to the first category, but the usage of the application does not count toward the usage limit for that category and/or for overall device usage. In some embodiments, the application being requested to be launched is compared to a list of applications that are exempted from the usage limit. The above-described limitation-exception criteria allow the electronic device to determine whether usage of an application belonging to a category having an associated usage limit is exempted from counting toward the usage limit, which reduces the user's burden of manually determining whether particular applications should be exempted (e.g., for example, a particular social media application is optionally exempted because the user needs the application to communicate with family and friends), which, additionally, reduces power usage and improves battery life of the device by enabling the user to use the device more quickly and efficiently.

In some embodiments, in accordance with the determination that the restriction criteria for the first category of applications have not been met, the electronic device displays (914) a representation (e.g., icon, widget, window of the first application in a multitasking view along with other windows of other applications) of the first application (e.g., an icon for the first application) with a first visual characteristic (e.g. display normal icons for the applications installed on the electronic device when the usage limit has not been reached (e.g., in a home screen of the electronic device), such as in color, not obscured, etc.)), such as FIG. 8U (e.g., appearances of application icons and notification badges indicate that the applications are not restricted). For example, the electronic device displays one or more application windows associated with one or more applications (e.g., in a multitasking graphical user interface view), or the electronic device displays one or more icons for launching the applications on a home screen of the electronic device.

In some embodiments, in accordance with the determination that the restriction criteria for the first category of applications have been met (e.g., in accordance with the determination that the usage limit is reached and the first application is not on the whitelist), the electronic device displays (916) the first representation of the first application with a second visual characteristic, different from the first visual characteristic (e.g., change the appearance of the icon of the applications not on the white list), such as FIG. 8Y-8EE, (e.g., appearances of application icons, widgets, notifications and websites indicate that the applications are restricted). In some embodiments, when the usage limit is reached, the electronic device modifies the appearances of various aspects of applications that are not included in the application whitelist. For example, icons for applications not included in the whitelist (e.g., icons on a home screen of the device, a particular social media application icon) are shaded out when the applications are restricted. As another example, notification badges included on the application icons for applications that are not included in the application whitelist are optionally modified (e.g., a particular social media application icon). As another example, in some embodiments, the electronic device has multitasking capabilities. In such embodiments, the electronic device optionally displays a user interface that concurrently displays visual representations of more than one application (e.g., a user interface that displays icons from multiple applications concurrently, screenshots of the current user interfaces of multiple applications concurrently, etc.). In some embodiments, representations for restricted applications not in the application whitelist in the above multitasking user interface are modified by the electronic device (e.g., faded or shaded out, or otherwise modified to be displayed with a different visual characteristic than representations corresponding to applications that are included in the application whitelist). The change in appearance of application representations described here is optionally the same or similar to the change in appearance of application representations described with reference to methods 1100 and 1300. The above-described manner of selectively changing the appearance of the applications not on an application whitelist when a usage limit is reached allows the electronic device to efficiently and selectively limit usage of certain applications during certain periods of time by providing an indication of what applications the user does or does not have access to when a usage limit is reached, which reduces usage of the electronic device during those periods of time, which, additionally, reduces power consumption and improves battery life of the device.

In some embodiments, displaying the first representation of the first application with the second visual characteristic comprises displaying a restricted-usage badge on the first representation, the restricted-usage badge including an indication that access to the first application is restricted (918) (e.g., a badge with a visual indication of a lock or some other restriction symbol that is added to the application icon for the first application (and optionally other applications that have reached their usage limits), such as overlaying the top-right portions of that application icon; in some embodiments, the badge overlays a portion of texts associated with the application icon; in some embodiments, the badge overlays at least a part of the application icon), such as in FIG. 8AA (e.g., a restricted-usage badge replaces a notification badge for Social Media Application A). The above-described manner of selectively changing the appearance of the representations of applications not on an application whitelist when a usage limit is reached allows the electronic device to efficiently and selectively limit usage of certain applications during certain periods of time by displaying restricted-usage badges on the applications the user does not have access to when a usage limit is reached, which reduces the likelihood of the user attempting to access such restricted application, which, additionally, reduces usage of the electronic device during those periods of time, thereby reducing power consumption and improving the battery life of the device.

In some embodiments, displaying the first representation of the first application with the first visual characteristic comprises displaying the first representation with a notification badge (e.g., an indicator of unread messages, missed calls, etc.), the notification badge including an indication of a notification received at the first application (920) (e.g., the number of unread messages, missed calls, etc.), such as FIG. 8U (e.g., notification badge for Social Media Application A indicates the number of unread messages associated with the application). In some embodiments, displaying the first representation of the first application with the second visual characteristic comprises displaying the first representation with the notification badge having been replaced by the restricted-usage badge (922) (e.g., blurs the indicator or replaces the indicator with a graphic), such as in FIG. 8AA (e.g., a restricted-usage badge replaces a notification badge for Social Media Application A). In some embodiments, the above-described restricted-usage badge replaces the indication of the notification badge of the application icon for the non-whitelist application when a usage limit is reached, as previously described. In some embodiments, replacing the indication of the notification badge with the above-described restricted-usage badge hides the number of notifications associated with the application such that the number of notifications is no longer displayed on the display. The above-described manner of selectively changing the appearance of the representations of applications not on an application whitelist when a usage limit is reached allows the electronic device to efficiently and selectively limit usage of certain applications during certain periods of time by replacing notification indications of application representations with restricted-usage badges on the applications the user does not have access to when a usage limit is reached, which deters the user from attempting to access a restricted application with recent notifications by not indicating that such notifications exist, which reduces usage of the electronic device during those periods of time, which, additionally, reduces power consumption and improves battery life of the device).

In some embodiments, in accordance with a determination that the first application does not satisfy the one or more limitation-exception criteria (e.g., a non-white listed application, the first application is not on the whitelist, the first application is configured to be restricted after the usage limit is reached) and while the first application is being used (e.g., a primary user interface of the first application is being displayed on the electronic device, or the user is otherwise interacting with the first application (e.g., via a secondary user interface of the first application)), the electronic device counts (924) the usage of the first application towards the usage limit associated with the first category of applications (e.g., counting a contribution of usage of a non-white listed application to the usage limit associated with the first category of applications, which includes the first application).

In some embodiments, in accordance with a determination that the first application satisfies the one or more limitation-exception criteria (e.g., a white listed application, the first application is on the whitelist, the first application is configured to be accessible after the usage limit is reached, usage of an application for a white-listed purpose (e.g., a phone app or a messaging app used to communicate with a parent)) and while the first application is being used, the electronic device forgoes (926) counting the usage of the first application towards the usage limit associated with the first category of applications (e.g., in accordance with a determination that the usage of the first application is excluded from the usage limit (e.g., because the first application is included in an application whitelist, and the electronic device provides access to the first application after the usage limit for the first category of applications is reached, for example; as another example, because the usage of the first application is for a white-listed purpose (e.g., a phone app or a messaging app used to communicate with a parent)) and its usage is not counted toward the usage limit. The above-described method of forgoing counting a usage of an application that satisfies the one or more limitation criteria (e.g., a whitelisted application, an application that is not restricted after the usage limit has been reached) allows the electronic device to monitor a usage limit of a category of applications without monitoring the whitelisted applications, which allows the electronic device to better manage a category of applications that includes one or more whitelisted applications (e.g., an application that is not restricted after the usage limit has been reached) without having to add an additional category for the whitelisted applications, which, additionally, reduces power usage and improves battery life of the device by enabling the user to use the device more quickly and efficiently.

While the first application is being used (e.g., a primary user interface of the first application is being displayed on the electronic device, or the user is otherwise interacting with the first application (e.g., via a secondary user interface of the first application)), the electronic device optionally counts (928) the usage of the first application towards the usage limit associated with the first category of applications independent of whether the first application satisfies the one or more limitation-exception criteria (e.g., counting a contribution of usage of the first application towards the usage limit associated with the first category of applications, independent of whether the first application is on the whitelist). For example, a particular social media application, which is associated with the Social Media category and a 1 hr. usage limit, is optionally a whitelisted application and its usage is counted toward the usage limit. A usage of a different social media application, which is optionally not whitelisted, is also optionally counted toward the usage limit. The above-described method of counting a usage of an application allows the electronic device to monitor a usage limit of a category of applications including whitelisted applications, which allows the electronic device to better manage a category of applications that includes one or more whitelisted applications (e.g., an application that is not restricted after the usage limit has been reached) because the usage limit of a category accounts for the usage of the whitelisted application without having to add an additional category for the whitelisted applications, which, additionally, reduces power usage and improves battery life of the device by enabling the user to use the device more quickly and efficiently.

In some embodiments, the usage limit is a first usage limit associated with the first category of applications for one or more first enforcement periods (930) (e.g., usage limits for the first category of applications for weekdays), such as in FIG. 8L (e.g., a default Social Media category usage limit of two hours). In some embodiments, the electronic device receives (932), via the one or more input devices, a sequence of one or more second inputs setting a second usage limit associated with the first category of applications for one or more second enforcement periods (e.g., a second maximum amount of time (e.g., an hour, three hours, twelve hours) that can be spent using the device or using the device in a specific manner (e.g., using a specific application (e.g., particular social media applications, SMS, Phone, particular travel applications, Email) during a time outside of a default time (e.g., the second usage limit is in effect on Saturdays and Sundays while the first usage limit (e.g., a default usage limit) is in effect Monday to Friday; the second usage limit is in effect during work/school hours while the first usage limit is in effect outside of work hours; the second usage limit is in effect on specific days of the week while the first usage limit is in effect outside of the specific days) is set), such as in FIG. 8L (e.g., a Social Media category usage limit of 1 hr for Monday, Wednesday and Thursday).

In some embodiments, in accordance with a determination that a current time is within the one or more first enforcement periods (e.g., determining that the current time is during the user defined enforcement period (e.g., specific days of the week, work/school hours, Monday to Friday)), the electronic device enforces (934) the first usage limit (e.g., enforcing (e.g., counting toward the second usage limit when an application (e.g., a particular social media application) of the first category of applications (e.g., social media) is accessed, providing or restricting access to the application of the first category of applications based on the second usage limit) the second usage limit during the user defined enforcement period), as shown in FIG. 8L.

In some embodiments, in accordance with a determination that the current time is within the one or more second enforcement periods (e.g., determining that the current time is outside the user defined enforcement period (e.g., a default period, outside specific days of the week, after work/school hours, Saturday to Sunday)), the electronic device enforces (936) the second usage limit, as shown in FIG. 8L (e.g., enforcing (e.g., counting toward the first usage limit when an application (e.g., A particular social media application) of the first category of applications (e.g., social media) is accessed, providing or restricting access to the application of the first category of applications based on the first usage limit) the first usage limit (e.g., default usage limit) outside of the user defined enforcement period)). The above-described method of allowing different usage limits for the first category of applications on different days allows the electronic device to effectively limit a user's usage of particular device operations during defined time periods and provides an easy way for the user to set such usage limits during defined time periods, which make the usage of the electronic device more efficient (e.g., the user's usage is specifically limited during school/work times, work days, specific days; with the understanding that a second usage limit is set, the user may use the limited operations more wisely and efficiently to perform all necessary tasks under the second usage limit during the specific periods (e.g., school/work times, work days); if a usage limit is reached, the device restricts the user from using the restricted operations, thereby preventing the user from unknowingly going over the usage limit and spending more time on the device than intended during the specific periods (e.g., school/work times, work days)), which, additionally, reduces power usage and improves battery life of the device by enabling the user to use the device more quickly and efficiently.

In some embodiments, the electronic device receives (938), via the one or more input devices, an input corresponding to a request to exclude a second application of the first category of applications (e.g., a second particular social media application is associated with the social media category having an associated usage limit) from the usage limit for the first category of applications (e.g., for example, the request to exclude the second application is optionally set on a settings user interface. As another example, if a particular application is not included in a usage limit, then the particular application would optionally be excluded from the usage limit), such as in FIG. 8I (e.g., Social Media Application B is not selected to be enforced by the Social Media category usage limit).

After receiving the input corresponding to the request to exclude the second application from the usage limit and while the restriction criteria for the first category of applications are met (940), the electronic device optionally receives (942) a request to launch the second application, such as in FIG. 8AA (e.g., Social Media Application B is not restricted from being launched when the Social Media category usage limit has been reached). In some embodiments, in response to receiving the request to launch the second application, the electronic device provides (944) access to the second application (e.g., regardless of whether the usage limit associated with social media applications is reached, access to the second particular social media application is not restricted), such as in FIG. 8AA (e.g., appearance of Social Media Application B icon does not update when the Social Media category usage limit is reached). Although the first application (e.g., a first particular social media application) and the second application (e.g., a second particular social media application different from the first particular social media application) belong to the social media category, the electronic device is able to exclude the second application (e.g., the second particular social media application) from the category (e.g., Social Media) usage limit while use of the first application is limited. In some embodiments, the user is able to define which applications are excluded from such category-usage limits. In some embodiments, if the user or electronic device does not define a usage limit for an application, then the application is excluded. The above-described method of excluding an application associated with a category from a usage limit of the category allows the electronic device to distinguish between an application in which usage is limited by the usage limit (e.g., the first application) and an application in which usage is not limited by the usage limit (e.g., the second application), which reduces the burden on the user for dealing with restrictions on applications that should be excluded from such restrictions (e.g., for example, although the second application is associated with a category having a usage limit, the second application is optionally excluded from the usage limit by the user, because the user does not wish the application to be restricted), which, additionally, reduces power usage and improves battery life of the device by enabling the user to use the device more quickly and efficiently.

In some embodiments, the usage limit is further associated with a second category of applications accessible on the electronic device, the second category of applications comprising applications different from applications of the first category of applications (946) (e.g., the usage limit is associated with two or more categories such that a total usage limit for both categories of applications is set, and each of the two or more categories has a different group of applications (e.g., no two groups have the same list of applications)), such as in FIG. 8Q (e.g., Social Media category usage limit is associated with the Social Media category usage limit and Streaming and Social Media categories usage limit). For example, a usage limit is optionally associated with social media and streaming applications. As another example, a usage limit is optionally associated with social media and messaging applications. Although a particular social media application is associated with both the social media and messaging categories, the lists of applications in the social media category and the messaging are optionally different. The above-described method of associating the first category of applications and a second category of applications to a usage limit allows the electronic device to limit usage of the applications of the two categories with a joint-category usage limit, which reduces a user's burden to track different usage limits of different groups, if an overall usage total for the different groups is desired, which, additionally, reduces power usage and improves battery life of the device by enabling the user to use the device more quickly and efficiently.

In some embodiments, the first category of applications includes all applications accessible on the electronic device (948) (e.g., the usage limit is associated with all applications and categories on the electronic device such that a total usage limit for all applications on the electronic device is set), such as in 8Q (e.g., an "All" usage limit). For example, if an overall limit is optionally set, the usage of a first and second particular social media application are limited by the overall limit, even though the particular applications are associated with the social media category. The total usage limit here is the same or similar to the total screen time usage limit described with reference to method 700. The above-described method of setting an overall usage limit for all categories of applications allows the electronic device to limit all non-white listed application usages with an overall usage limit (e.g., enforcing a user screen time limit), which reduces the user's burden of defining an individual limit for each category when an overall usage limit is desired, which, additionally, reduces power usage and improves battery life of the device by enabling the user to use the device more quickly and efficiently.

In some embodiments, the usage limit associated with the first category of applications has a first usage limit name based on one or more categorization criteria (950) (e.g., a category name previously defined by the user, a category name previously defined by the device), such as in FIG. 8Q (e.g., Social Media category usage limit has a default name of "Social Media"). In some embodiments, the default name of the usage limit is a device-determined name of the category of applications determined based on the categories of applications within that category of applications, such as "News" or "Games" or "News and Games"). The electronic device optionally receives (952) a sequence of one or more second inputs renaming the usage limit name to a second usage limit name (e.g., for example, the sequence of one or more second inputs are optionally received from the one or more input devices (e.g., the electronic device, a remote input device)), such as in FIG. 8R (e.g., the user selects "Rename" affordance to rename the Social Media category usage limit name). In some embodiments, in response to the sequence of one or more second inputs, the electronic device renames (954) the usage limit name to the second usage limit name (e.g., the category name is redefined by the user), such as in FIGS. 8S-8T (e.g., the user renames Social Media category usage limit to "John's Fun Things"). In some embodiments, the user is able to rename category names (e.g., name previously defined by the user, name previously defined by the device) by entering (e.g., via a soft keyboard, voice input, etc.) a new user-defined category name. For example, the user is able to create a category including applications from a number of different system-defined categories (e.g., a particular social media application, which belongs to the social media category and a particular gaming application, which belongs to the Games category) and create their own category name (e.g., "Restricted Applications," "Social Media and Games"). In some embodiments, the electronic device automatically renames the category name. For example, a category named "Social Media" initially optionally includes a particular social media application. A particular gaming application is optionally added to the category. In response to the addition of the gaming application, the category name is optionally changed to "Social Media and Games" by the device. The above-described method of renaming a usage limit category name allows the electronic device to receive an input (e.g., from a user, from a remote input device) and rename the usage limit category name, in response to the input, which allows the user to rename usage category name when a more appropriate usage limit category name is desired (e.g., when a new application is associated to the usage limit, a more appropriate name is required to include the newly associated application), instead of having to set up the usage limit again, which, additionally, reduces power usage and improves battery life of the device by enabling the user to use the device more quickly and efficiently.

In some embodiments, the first application is concurrently associated with the usage limit associated with the first category of applications and a second usage limit (956) (e.g., the first application is associated with two concurrent usage limits), such as in FIG. 8Q (e.g., Social Media Application is concurrently associated with the Social Media category usage limit and the Streaming and Social Media categories usage limit). For example, the Social media category is optionally associated with two usage limits. For example, the electronic device optionally has an overall limit, which includes the social media category limit, of 2 hours and/or the electronic device optionally has a usage limit for a specific application within the social media category (e.g., of half an hour or some other amount). The second usage limit is optionally an overall usage limit of the electronic device, a usage limit for a category of applications of the electronic device (different from the first category of applications, but including the first application), a usage limit for the first application itself, separate from the usage limit of the first category of applications, etc. The above-described method of enforcing two or more usage limits concurrently allows the electronic device to monitor the usage of an application against two or more usage limits, which reduces a user's burden of separately associating an application to each of the two or more usage limits that the user wishes to limit and separately monitoring each of the two or more usage limits, which, additionally, reduces power usage and improves battery life of the device by enabling the user to use the device more quickly and efficiently.

In some embodiments, the first application is associated with second restriction criteria, the second restriction criteria including a requirement that either the usage limit for the first category of applications has been reached for the second restriction criteria to be met or the second usage limit has been reached for the second restriction criteria to be met (958) (e.g., in some embodiments, the second restriction criteria is met when the most conservative limit is reached (e.g., the usage limit with the least time remaining)), such as in FIG. 8Q (e.g., Social Media Application is concurrently associated with the Social Media category usage limit and the Streaming and Social Media categories usage limit, and the more conservative usage limit is enforced). In some embodiments, in accordance with a determination that the second restriction criteria have been met, the electronic device restricts (960) access to the first application, such as in FIG. 8Q (e.g., Social Media Application is concurrently associated with the Social Media category usage limit and the Streaming and Social Media categories usage limit, and the more conservative usage limit is enforced).

In some embodiments, in accordance with a determination that the second restriction criteria have not been met, the electronic device provides (962) access to the first application, such as in FIG. 8Q (e.g., Social Media Application is concurrently associated with the Social Media category usage limit and the Streaming and Social Media categories usage limit, and neither usage limit has been reached). For example, the first application is optionally associated with two usage limits. The first application optionally belongs to the Social Media category, which optionally has a first usage limit (e.g., of 1 hour or some other amount of time); and the electronic device optionally has an overall limit (e.g., of 2 hours or some other amount of time, a second usage limit). If one of the usage limits is met (e.g., if the most conservative/limiting usage limit is met), even if other usage limits are not met, the electronic device optionally restricts access to the first application. Without any device usage, the Social Media category usage limit optionally has 1 hour remaining, and the overall usage limit optionally has 2 hours remaining. In this example, the Social Media category usage limit is the least remaining usage limit for a social media application. As another example, after some device usage, the overall usage limit optionally has 30 minutes remaining and the Social Media category optionally has 1 hour remaining (e.g., because no social media applications have been used so far during the current enforcement time period). In this example, the overall usage limit is optionally the least remaining usage limit for a social media application. For any category or application associated with more than one usage limit, a more conservative remaining usage limit optionally limits the usage of the first application. The above-described method of enforcing a most conservative usage limit of two or more concurrently usage limits allows the electronic device to monitor the usage of an application against two or more usage limits and enforcing the most conservative remaining usage limit, which reduces a user's burden of separately associating an application to each of the two or more usage limits that the user wishes to limit and separately determining which of the usage limits is reached earlier, which, additionally, reduces power usage and improves battery life of the device by enabling the user to use the device more quickly and efficiently.

In some embodiments, while the restriction criteria for the first category of applications are met (964), the electronic device detects (966) an event (e.g., occurrence of an event that would trigger display of a notification for the application, a request to display a widget corresponding to the application, a request to share content with the application via a system sharing user interface, a request to view a website associated with the application, a request to view a history of prior notifications (including notifications of the application), a request to display application content in picture-in-picture (PIP) mode, a request to display the application in search results, or a request to display and/or perform media control operations associated with the application) that corresponds to activation of an auxiliary function of the first application, wherein the auxiliary function of the first application is a function (e.g., displaying interactive notification, performing share sheet action, displaying widget, displaying notification history, displaying website in browser, displaying application content in PIP mode, displaying application in search results, or displaying and/or controlling media control operations) that is available to be performed without displaying a primary user interface of the first application (e.g., without launching the application in an application window or other primary view of the application), such as in FIGS. 8Y-8EE (e.g., the user is attempting to view or access application suggestions, widgets, search results and websites corresponding to Social Media Application A when the Social Media category usage limit has been reached).

In some embodiments, in response to detecting the event that corresponds to activation of the auxiliary function of the first application, the electronic device suppresses (968) the auxiliary function (e.g., suppressing notification generation functions associated with the application, the display of website(s) associated with the application, share sheet action (s), the display of application content in PIP mode, and any other functions associated with the application (including operating system functions) (e.g., restricting the app from appearing in search results, restricting access to a widget associated with the application, restricting the application from appearing as a suggested application) such as in FIGS. 8Y-8EE (e.g., the application suggestions, widgets, search results and websites corresponding to Social Media Application A, when the Social Media category usage limit has been reached, are not accessible to the user). In some embodiments, the launching of the application is also suppressed (e.g., restricted), where such launching is from a home screen of the electronic device (or other user interface of the electronic device). In some embodiments, the auxiliary function is suppressed by preventing the function from being performed in response to detecting the event. The auxiliary functions described here are optionally the same or similar to the auxiliary functions described with reference to method 1300). The above-described manner of suppressing functions across different aspects of the operating system of applications for which usage limits have been exceeded allows the electronic device to efficiently reduce overall usage of the electronic device, which reduces power consumption and improves battery life of the device.

In some embodiments, the electronic device adds (970), from an application source (e.g., an application store for browsing and/or downloading applications to the electronic device), access to a second application on the electronic device, wherein the second application is associated with a respective category of applications by the application source (e.g., downloading a new application (e.g., a second particular social media application) from the app store, remotely accessing a new application, installing a new application on the device. In some embodiments, the app store associates the application with a particular category of applications based on publisher information about the application or some other determination made by the app store (e.g., news applications are designated as part of a news category in the app store, games are designated as part of a games category in the app store, etc.)), such as in FIGS. 8FF-8GG (e.g., the user is adding Social Media Application F from the App Store user interface).

In some embodiments, in accordance with a determination that the respective category is the first category (e.g., determining that the category assigned to the added application by the app store is the same as an existing category that has a usage limit on the electronic device), the electronic device controls (972) access to the second application in accordance with the restriction criteria for the first category of applications (e.g., if the usage limit of the first category (e.g., social media) is reached, the electronic device optionally restricts the user's access to the second applications (e.g., the second particular social media application added from the application source) as well), such as in FIG. 8HH (e.g., the newly added Social Media Application F is determined to be in the Social Media category usage limit; when the Social Media category usage limit has been reached, access to the newly added Social Media Application F is restricted). Thus, the electronic device applies the first category restrictions to the later-added second application. In some embodiments, determining that the category assigned to the added application by the app is based on app store attributes of the added application (e.g., games, social media, news, streaming. In some embodiments, this determination is based on metadata associated with the added application.

In some embodiments, in accordance with a determination that the respective category is not the first category (e.g., determining that the added application does not belong to the first category (e.g., a category different from social media)), the electronic device forgoes (974) controlling access to the second application in accordance with the restriction criteria for the first category of applications (e.g., the usage of the added application (e.g., a second particular social media application) is optionally not associated with the first category usage limit (e.g., social media usage limit). In some embodiments, the added application is controlled based on a different usage limit for another category of applications that the added application falls within. In some embodiments, if the added application does not fall within any usage limit on the electronic device, it is not controlled by any usage limit on the electronic device. The above-described method of determining a category (e.g., social media) of an added application (e.g., a second particular social media application) based on one or more categorization criteria (e.g., app store categorization, metadata of the new application) and enforcing the usage limit associated with the determined category (e.g., social media) for the new application (e.g., the second particular social media application) allows the electronic device to effectively limit a user's usage of the added application without having the user to determine the categorization of the new application, which make the usage of the device more efficient (e.g., the user does not have to manually determine the category of the added application; the user does not have to manually determine the usage limit of the added application; the user does not have to monitor his or her own device usage of the added application, thus reducing the inputs provided by the user to the device (e.g., inputs for otherwise monitoring the user's usage); if a usage limit is reached, the device restricts the user from using the added application, thereby preventing the user from unknowingly going over the usage limit and spending more time on the device than intended), which, additionally, reduces power usage and improves battery life of the device by enabling the user to use the device more quickly and efficiently.

In some embodiments, one or more windows of time associated with a restricted usage mode, during which access to one or more applications on the electronic device is restricted, are defined on the electronic device (976) (e.g., a user of the electronic device defines hours of the day (e.g., 10 pm to 5 am) as a bedtime restricted usage mode during which the electronic device prevents or attempts to prevent access to all applications on the electronic device except for, in some embodiments, applications that are included on a whitelist of applications), such as in FIG. 8E (e.g., a device downtime period is set). In some embodiments, the user merely defines the windows of time above, and does not specify any particular applications to which access is to be restricted—in such embodiments, the electronic device optionally defaults to restricting or attempting to restrict usage of all applications except for whitelist applications during the restricted usage mode. In some embodiments, in accordance with a determination that the request to launch the first application is received while the one or more windows of time associated with the restricted usage mode are defined (e.g., the restricted usage mode is set to go into effect during the defined period(s) of time, the bedtime restricted usage mode is set) and during the one or more windows of time associated with the restricted usage mode (e.g., the electronic device is currently in the restricted usage mode, the electronic device is currently in the bedtime restricted usage mode), the electronic device restricts (978) access to the first application independent of whether the restriction criteria for the first category of applications has been met (e.g., the restricted usage mode overrides usage limits), such as in FIGS. 8II-8KK (e.g., device downtime settings override Social Media category usage limit settings, device downtime settings restrict Social Media applications when Social Media category usage limit has not been reached). Even if, for example, the usage limit of the first category of applications has not been met, access to the first category of applications is optionally restricted during the restricted usage mode. The restricted usage mode described here is optionally the same or similar to the restricted usage mode described with reference to method 1100. The above-described manner of enforcing a restricted usage mode (e.g., bedtime restricted usage mode) in conjunction with application usage limits allows the electronic device to restrict access to one or more applications or categories of applications before a usage limit has been reached (e.g., during device downtime, designated times of inactivity (e.g., bedtime)), which allows the user to better manage device usage during a time of restricted activity (e.g., bedtime) despite the fact that usage limits may not have been reached, which, additionally, reduces power usage and improves battery life of the device by enabling the user to use the device more quickly and efficiently.

In some embodiments, restricting access to the first application comprises presenting an indication indicating that access to the first application is restricted (e.g., displaying a visual indication (e.g., an hourglass representing that time is up, one or more application icons associated with the usage limit that is reached) on the display, playing a sound with a speaker associated with the electronic device, generating haptic(s) and/or tactile output(s), etc. indicating that the application is restricted (e.g., a notification)), wherein the indication includes an affordance selectable to provide access to the first application without requiring authentication credentials (980) (e.g., a graphical user interface element or soft button that allows the user to access the restricted application when a usage limit is reached), such as in FIGS. 8NN-8OO (e.g., a restriction notification user interface under "notify" option providing extend and ignore affordances to proceed with the restricted application). In some embodiments, different applications are associated with different restriction options that are in effect when a usage limit is reached. For example, the electronic device optionally allows one or more applications to be associated with a "notify" restriction option. If a user attempts to launch an application associated with the "notify" restriction (e.g., by selecting the icon for that application from the home screen of the electronic device when a usage limit is reached, and assuming the application is not included in the application whitelist), the electronic device optionally displays a pop-up indication that indicates the application usage is currently restricted (e.g., because usage time limit is reached). The pop-up notification optionally includes one or more affordances that, when selected, allow the user to proceed to the application without needing to enter any authorization credentials (e.g., a "proceed anyway" affordance that opens the application without the need for administrator or other credentials to be entered. In some embodiments, app usage beyond an allowable limit (e.g., even if approved due to extension of time) is, optionally, indicated in the dashboard user interface described above with reference to method 700 (e.g., as illustrated in FIGS. 6L-6P, 6EE-6HH, 6OO-6SS, and 6UU). In some embodiments, in response to selecting the affordance to provide access to the first application and prior to providing access to the first application, the visual indication on the display updates to a second visual indication to show that access is being provided. The "notify" option described here is optionally the same or similar to the "notify" option described with reference to method 1100. The above-described manner of notifying the user that an application is restricted when a usage limit is reached but giving the user the option of nonetheless accessing the application when needed allows the electronic device to efficiently limit usage of certain applications during certain periods of time while allowing the user to perform necessary tasks on the electronic device, which reduces usage of the electronic device during those periods of time, which, additionally, reduces power consumption and improves battery life of the device.

In some embodiments, restricting access to the first application comprises presenting an indication indicating that access to the first application is restricted, wherein the indication includes an affordance selectable to provide access to the first application while requiring authentication credentials (982) (e.g., displaying a visual indication (e.g., an hourglass representing that time is up, one or more application icons associated with the usage limit that is reached) on the display, playing a sound with a speaker associated with the electronic device, generating haptic(s) and/or tactile output(s), etc. indicating that the application is restricted (e.g., a notification)), such as in FIGS. 8EEE-8GGG (e.g., a restriction notification user interface under "notify and block" option providing extend and ignore affordances to request for authentication before proceeding with the restricted application). In some embodiments, the electronic device allows one or more applications to be associated with a "block and notify" restriction option. If a user attempts to launch an application associated with the "block and notify" restriction (e.g., by selecting the icon for that application from the home screen of the electronic device when a usage limit is reached, and assuming the application is not included in the application whitelist), the electronic device blocks the application from launching and optionally displays a pop-up indication that indicates the application usage is currently restricted (e.g., because a usage limit is reached). In some embodiments, the pop-up indication requires authentication credentials (e.g., a password, passcode, or consent from a parent device/account, finger print authentication, facial authentication (e.g., attention awareness via a depth camera is required for successful biometric authentication)) to access the application. If the electronic device is a child device in a family account (e.g., the device of a user designated as a child, as opposed to a parent or administrator in the family account), the notification displayed optionally includes an affordance for requesting permission from an adult/parent device in the family account for accessing the application when a usage limit is reached. In such cases, selection of the request in the notification optionally results in a notification being delivered to one or more (or all) parent devices associated with the family account, and upon permission being granted (e.g., at least one of the parent devices or at the child device with a passcode), the electronic device allows access to the application. In some embodiments, in response to selecting the affordance to provide access to the first application and prior to providing access to the first application, the visual indication on the display updates to a second visual indication to show that access is being provided. The "block and notify" option described here is optionally the same or similar to the "block and notify" option described with reference to method 1100. The above-described manner of blocking the application from launching and notifying the user that the application is restricted when a usage limit is reached allows the electronic device to efficiently limit usage of certain applications during certain periods of time, which reduces usage of the electronic device during those periods of time, which, additionally, reduces power consumption and improves battery life of the device.

In some embodiments, in accordance with a determination that the electronic device is not a child device (e.g., is not a child device in a family account (e.g., is a parent device in a family account, based on a classification of a user account associated with the electronic device or an option selected on the electronic device), selection of the affordance causes a request for a passcode to be entered to access the first application (984), such as in FIGS. 8EEE-8GGG (e.g., a restriction notification user interface under "notify and block" option providing extend and ignore affordances to request for authentication before proceeding with the restricted application). For example, the determination that the electronic device is not a child device is, optionally, based on a determination that the user account associated with the electronic device (e.g., the user currently signed into the device) is not classified as a child account. In some embodiments, the determination that the electronic device is not a child device is, optionally, based on a determination that electronic device is set to a parent device in the device's settings (e.g., set while initially setting up the device) or is not associated with a family account at all. For example, the pop-up notification optionally includes one or more affordances that, when selected, only allow the user to proceed to the application if proper authentication credentials are provided. In some embodiments, the affordance comprises one or more of a soft button or an entry field(s) for a user id, password, passcode, finger print authentication, and/or facial authentication (e.g., attention awareness via a depth camera is required for successful biometric authentication). For example, if the device is not a child device in a family account (e.g., is a parent device in a family account) or is not associated with a family account at all, the electronic device optionally requests that the user enter the credentials (e.g., user id and/or password, passcode) for the user account with which the electronic device is associated (e.g., the user id and/or password or passcode associated with the profile with which the device is configured). In some embodiments, the credentials (e.g., user id and/or password, passcode) are different from the credentials to access the electronic device (e.g., different passcode than what is used to "unlock" the device and/or login to the device). In this way, a user (e.g., a child) who is not the owner of the device (e.g., a parent) will be unable to circumvent the application restrictions if the user does not enter the secondary passcode.

In some embodiments, in accordance with a determination that the electronic device is a child device (e.g., based on a classification of a user account associated with the electronic device or an option selected on the electronic device), selection of the affordance causes the display to present a first affordance requiring a passcode (e.g., a parental control passcode different from a passcode to unlock the device or to access a user account associated with device operation) to be entered to access the first application, and a second affordance that when selected initiates a process to request access to the first application from a parent device (986) (e.g., initiates a process to request more time from a parent device in the family account) such as in FIG. 8TT-8CCC (e.g., a local authentication request affordance and a remote authentication request affordance are displayed on the restriction notification user interface on the child device; in response to the selection of an affordance, authentication is requested on the different corresponding devices). For example, the determination that the electronic device is a child device is, optionally, based on a determination that the user account associated with the electronic device (e.g., the user currently signed into the device) is classified as a child account. In some embodiments, the determination that the electronic device is a child device is, optionally, based on a determination that electronic device is set to a child device in the device's settings (e.g., set while initially setting up the device). In some embodiments, the process will send a message to the parent device (e.g., a text message or any other alert on the parent device, an email request to an email account associated with the parent(s)) requesting access to the first application). The process will then allow the parent to grant the child device access to the restricted application (e.g., the parent is able to choose to allow the child device to access the restricted application when a usage limit is reached) or to deny the child device access to the restricted application. In some embodiments, the electronic device presents an affordance for entering a passcode and/or an affordance for initiating the process to request access to the first application. In some embodiments, the passcode is a parental control passcode or a usage passcode different from the passcode for unlocking the electronic device. In this way, a child is optionally unable to circumvent the restricted access mode, but a parent is optionally able to enter the passcode to allow the electronic device to access the first application. The requests for additional time described here are similar to the requests for additional time described with reference to the restricted usage mode in method 1100. The above-described manner of notifying the user that an application is restricted when a usage limit is reached but enabling the user the option of nonetheless accessing the application when needed allows the electronic device to efficiently limit usage of certain applications during certain periods of time while allowing the user to perform necessary tasks on the electronic device, which reduces usage of the electronic device during those periods of time, which, additionally, reduces power consumption and improves battery life of the device.

In some embodiments, while the usage limit associated with the first category of applications is in effect, in accordance with a determination that a warning threshold of the usage limit has been reached (e.g., a warning threshold is reached when a fraction of the usage limit has been reached (e.g., 90%, 5 minutes remaining, 45 minutes of 1 hour; 5 minutes, 10 minutes, 1 hour, or any period of time before a usage limit is reached)), the electronic device displays (988) an indication (e.g., text, an image, a sound, a haptic and/or tactile output, etc.) that the warning threshold of the usage limit has been reached (e.g., a notification indicating that a usage limit is about to be reached and a threshold time (e.g., 90%, 5 minutes remaining, 45 minutes of 1 hour) has been reached or a specific time (e.g., 5 minutes, 10 minutes, 1 hour, or any period of time) remains until the usage limit is reached, such as in FIG. 8III (e.g., a notification is displayed on the device indicating that the Social Media category usage limit has five minutes remaining). In some examples, the threshold time is defined by the user. In some embodiments, the notification comprises text, image(s), and/or sound. In embodiments, the notification comprises a haptic and/or tactile output indication. In some embodiments, the notification includes a button that allows the user to dismiss the notification. In some embodiments, the electronic device ceases display of the notification after an amount of time. The above-described manner of notifying the user that a usage limit is about to be reached (e.g., a specific fraction (e.g., 90%, 5 minutes remaining, 45 minutes of 1 hour) of the usage limit has been used) makes the user-device interface more efficient (e.g., the user does not have to monitor the time, provides the user with an opportunity to finish the task currently being performed on the device, and prompts the user to stop using the device in anticipation of the usage limit being reached, thus reducing the inputs provided by the user to the device (e.g., inputs for updating usage limit settings)), which allows the electronic device to efficiently reduce overall usage of the electronic device, which, additionally, reduces power consumption and improves battery life of the device.

In some embodiments, the electronic device receives one or more inputs for changing one or more usage limit settings associated with the usage limit (990) (e.g., changes to the start/end times of the usage limit, changes to whitelists, etc.), such as in FIG. 8JJJ (e.g., the user is attempting to view or modify Social Media category usage settings). In some embodiments, in response to receiving the one or more inputs for changing the one or more usage limit settings (992), in accordance with a determination that the one or more inputs for changing the one or more usage limit settings were received via the one or more input devices of the electronic device and that the electronic device is a child device (e.g., based on a classification of a user account associated with the electronic device or an option selected on the electronic device), the electronic device requires (994) authorization before performing the one or more usage limit settings changes (e.g., require the user of the electronic device to enter a passcode in order to make the changes to the usage limit settings), such as in FIGS. 8JJJ-8KKK (e.g., modifying usage limit settings on a child device requires a passcode). For example, the determination that the electronic device is a child device is, optionally, based on a determination that the user account associated with the electronic device (e.g., the user currently signed into the device) is classified as a child account. In some embodiments, the determination that the electronic device is a child device is, optionally, based on a determination that electronic device is set to a child device in the device's settings (e.g., set while initially setting up the device). In some embodiments, if the electronic device is a child device in a family account, any of the usage limit settings or preferences or rules, etc. described herein are able to be modified at the child device only in response to entry of a password or other authentication credentials at the child device (e.g., upon determining that one of the settings is being modified, the electronic device prompts the user to enter a password that must be authenticated before the modification is allowed). In some embodiments, the authentication credentials are the same as the credentials for unlocking the device (e.g., the passcode, finger print authentication, and/or facial authentication (e.g., attention awareness via a depth camera is required for successful biometric authentication) to unlock the device). In some embodiments, the authentication credentials are different than the credentials for unlocking the device (e.g., credentials of a parent in the family account). In some embodiments, a parent device is able to modify the above settings in effect on the child device remotely (e.g., optionally, with entry of the parent credentials at the parent device).

In some embodiments, in response to receiving the one or more inputs for changing the one or more usage limit settings (992), in accordance with a determination that the one or more inputs for changing the one or more usage limit settings were received from outside of the electronic device via a parent device (e.g., changes to the usage limit settings were made on a parent device (e.g., is a parent device in a family account, based on a classification of a user account associated with the electronic device or an option selected on the electronic device)), the electronic device performs (996) the one or more usage limit settings changes (e.g., make the changes to usage limit settings without requiring additional credential to be entered), such as in FIGS. 8LLL-8NNN (e.g., the parent device is modifying the child device's usage limit settings). For example, the determination that the electronic device is not child device is, optionally, based on a determination that the user account associated with the electronic device (e.g., the user currently signed into the device) is not classified as a child account. In some embodiments, the determination that the electronic device is not a child device is, optionally, based on a determination that electronic device is set to a parent device in the device's settings (e.g., set while initially setting up the device). In some embodiments, the electronic device is the parent device. In some embodiments, the electronic device is different from the parent device (e.g., the electronic device is a child device). In some embodiments, the parent device makes changes to the usage limit settings on a child device remotely (e.g., through the Internet, Bluetooth, or other network or protocol. The manners in which the usage limits are set/changed here are the same or similar to the manners in which the restricted usage mode is set/changed as described with reference to method 1100. The above-described manner of limiting the ability to change usage limit settings allows the electronic device to efficiently and selectively limit usage of certain applications during certain periods of time, which reduces usage of the electronic device during those periods of time, which, additionally, reduces power consumption and improves battery life of the device.

In some embodiments, in response to performing the one or more usage limit settings changes received from outside of the electronic device, the electronic device presents (998) an indication (e.g., a visual indication (e.g., one or more of text and an image), a sound indication, a spoken indication, and/or a haptic and/or tactile output indication) regarding the one or more usage limit settings changes (e.g., present a notification that the usage limit settings were changed remotely by a parent device (e.g., is a parent device in a family account, based on a classification of a user account associated with the electronic device or an option selected on the electronic device)), such as in FIG. 8NNN (e.g., a notification is displayed on the child device when its usage limit settings are modified by the parent device). For example, the determination that the electronic device is not child device is, optionally, based on a determination that the user account associated with the electronic device (e.g., the user currently signed into the device) is not classified as a child account. In some embodiments, the determination that the electronic device is not a child device is, optionally, based on a determination that electronic device is set to a parent device in the device's settings (e.g., set while initially setting up the device). In some embodiments, if the parent device does modify the above settings in effect on the child device remotely, the child device displays a notification that such remote modification occurred, the specifics of the modification (e.g., the parent device has changed a usage limit, the parent device has changed the time window during which the usage limit is in effect from 10 pm to 6 am to 9 pm to 7 am, etc.). The notification generated on the child device here is the same or similar to the notification generated on the child device with reference to the restricted usage mode described in method 1100. The above-described manner of changing usage limit settings allows the electronic device to efficiently and selectively limit usage of certain applications during certain periods of time, which reduces usage of the electronic device during those periods of time, which, additionally, reduces power consumption and improves battery life of the device.

In some embodiments, generating the one or more inputs, received from the parent device outside of the electronic device, for changing the one or more usage limit settings requires entry, at the parent device (e.g., is a parent device in a family account, based on a classification of a user account associated with the electronic device or an option selected on the electronic device), of authentication credentials for making the usage limit settings changes on the electronic device (998-2) (e.g., for example, in response to receiving inputs changing the usage limit settings from a device of a parent device (e.g., an authorizing adult's device), a passcode (e.g., a device usage limit passcode or other authentication credentials, optionally different from authentication credentials for accessing the parent and/or child device) is optionally required, at the parent device, for proceeding with usage limit settings change), such as in FIG. 8MMM (e.g., a passcode is required on the parent device to modify the child device's usage limit settings on the parent device). For example, the determination that the electronic device is not child device is, optionally, based on a determination that the user account associated with the electronic device (e.g., the user currently signed into the device) is not classified as a child account. In some embodiments, the determination that the electronic device is not a child device is, optionally, based on a determination that electronic device is set to a parent device in the device's settings (e.g., set while initially setting up the device). The above-described method of requiring an authentication credential (e.g., a passcode, finger print authentication, facial authentication) to change usage limit settings from a parent device allows the electronic device to set the usage limit by a remote device after the authentication credentials are entered, which prevents unauthorized access to a parent's device (e.g., a child may have access to an adult's device and use the adult's device to change the child device usage limit settings), which, additionally, reduces power usage and improves battery life of the device by enabling the user to use the device more quickly and efficiently.

It should be understood that the particular order in which the operations in FIGS. 9A-9K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1500) are also applicable in an analogous manner to method 900 described above with respect to FIGS. 9A-9K. For example, the usage limits on an electronic device, usage restriction settings, etc., described above with reference to method 900 optionally have one or more of the characteristics of the usage limits on an electronic device, usage restriction settings, etc., described herein with reference to other methods described herein (e.g., methods 700, 1100, 1300 and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9K are, optionally, implemented by components depicted in FIGS. 1A-1B. For example, displaying operations 914, 916, 918, 920, 922, 942, and 988 and receiving operations 902, 906, 932, and 990 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Restricted Usage Mode User Interface

Users interact with electronic devices in many different manners and during various times during the day or night. For example, a user may read news updates on a News application installed on an electronic device during his or her morning train commute or in bed at the end of the day. However, in some circumstances, it is difficult for the user to monitor and limit usage of certain application during certain periods of time. The embodiments described below provide ways in which an electronic device is efficiently and selectively limiting access to certain applications during certain periods of time, which reduces usage of the electronic device during those periods of time without requiring the user to monitor his or her own usage. Limiting access to applications during certain periods of time further reduces the power usage of the device and increases battery life for battery-powered devices. It is understood that people use devices. When a person uses a device, that person is optionally referred to as a user of the device.

Figure 10A:
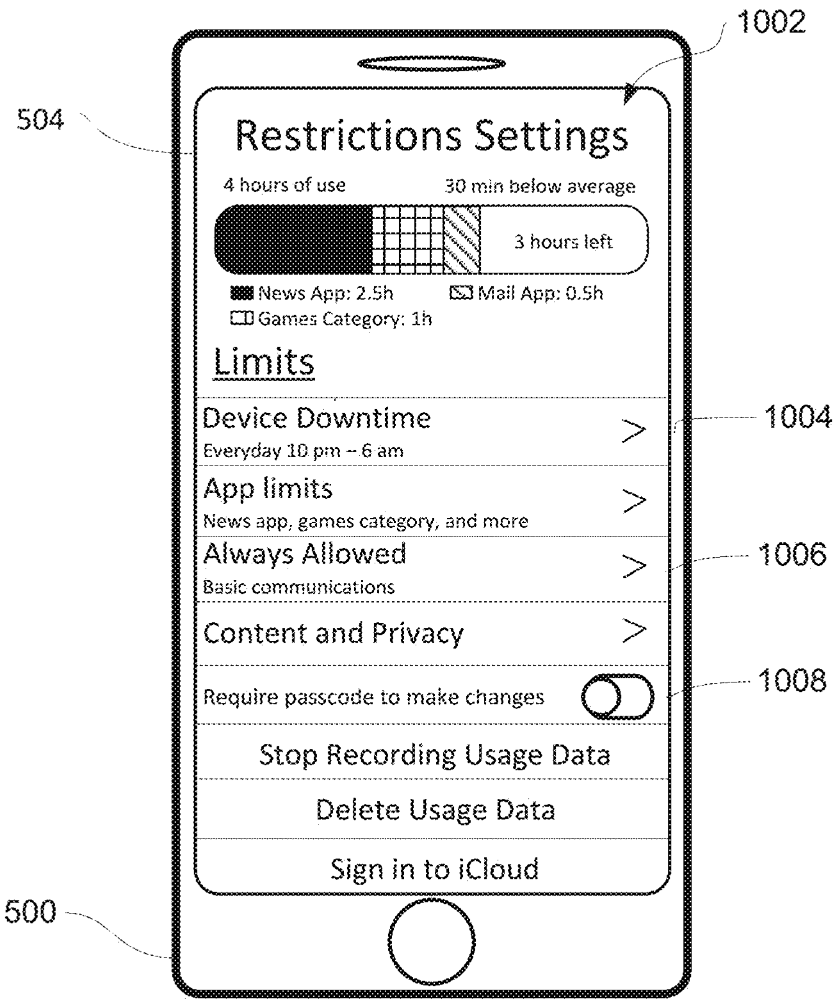
FIGS. 10A-10AAA illustrate exemplary ways in which an electronic device limits access to certain applications during certain periods of time in accordance with some embodiments of the disclosure.

FIGS. 10A-10AAA illustrate exemplary ways in which an electronic device limits access to certain applications during certain periods of time in accordance with some embodiments of the disclosure. The embodiments in these figures are used to illustrate the processes described below, including the processes described with reference to FIGS. 11A-11I.

FIG. 10A illustrates exemplary device 500 with touch screen 504, such as described with reference to FIGS. 5A-5H. Touch screen 504 optionally displays one or more user interfaces that include various content. In the example illustrated in FIG. 10A, touch screen 504 displays a "Restrictions Settings" graphical user interface 1002 for defining one or more application restriction settings, as described above with reference to FIGS. 6A-6D. For example, FIG. 10A illustrates a selectable affordance 1004 for defining a "Device Downtime" (e.g., a restricted usage mode), during which device 500 prevents or attempts to prevent access to certain applications on the device. FIG. 10A illustrates that selectable device downtime settings affordance 1004 includes information about the restricted usage mode (e.g., that the device downtime mode is automatically enabled every day from 10 pm to 6 am). In some embodiments, the device downtime or restricted usage mode is a bedtime restricted mode for reducing device usage during the user-defined bedtime hours.

Figure 10B:
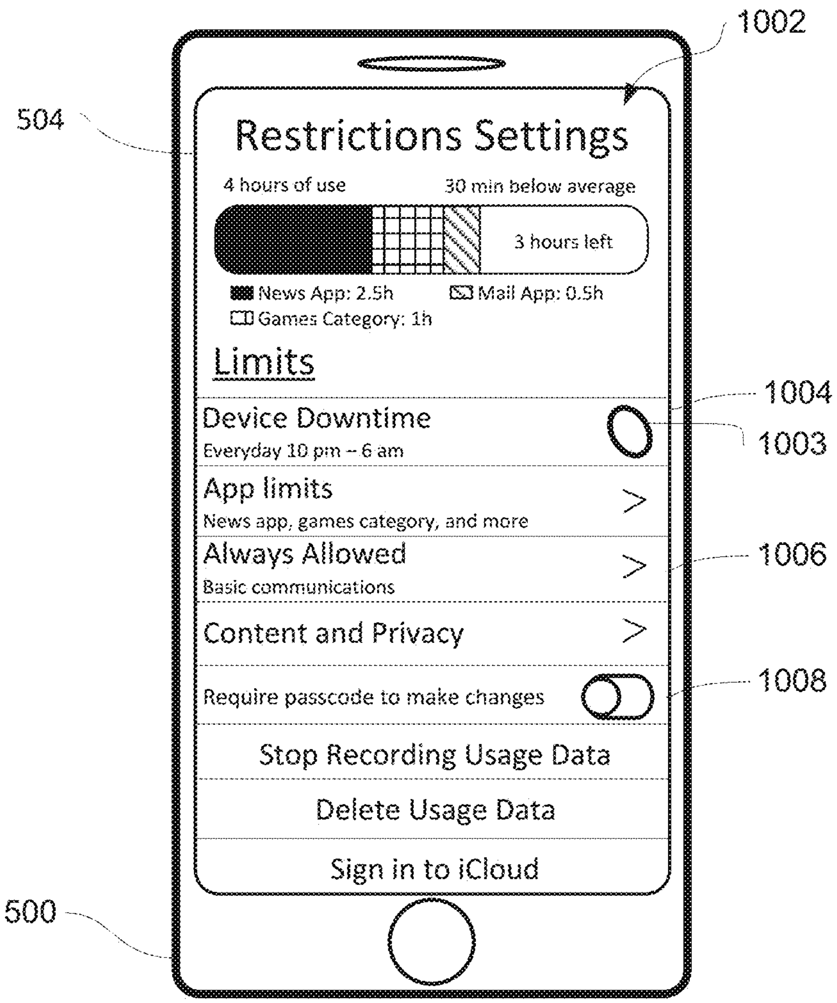

Affordance 1004 is selectable to define restricted usage mode settings or rules, as will now be described. For example, in FIG. 10B, selection of device downtime settings affordance 1004 is detected (e.g., by a tap of contact 1003 detected on device downtime settings affordance 1004, as shown in FIG. 10B). In response to selection of device downtime settings affordance 1004, device 500 displays "Device Downtime" graphical user interface 1010 as shown in FIG. 10C.

Figure 10C:
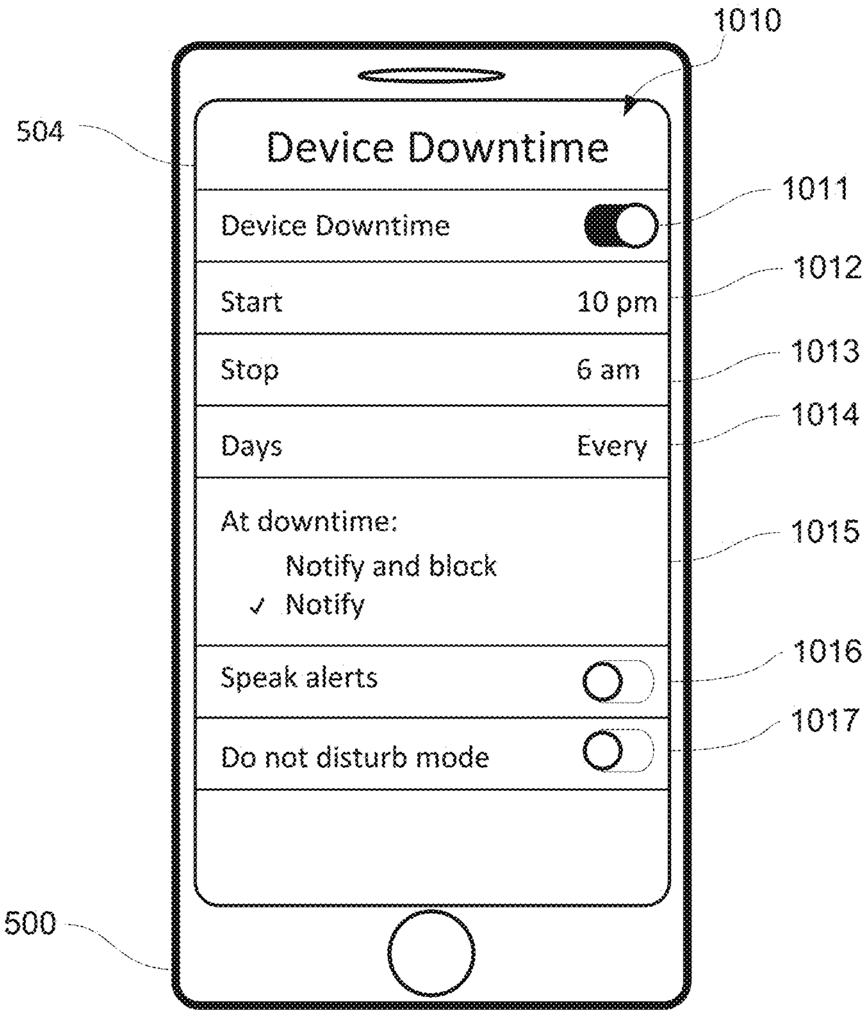

FIG. 10C illustrates exemplary restricted usage mode settings or rules. Device downtime screen 1010 optionally includes toggle input affordance 1011 to enable or disable the enforcement of the restricted usage mode settings, start affordance 1012 for defining the start time of the restricted usage mode, end affordance 1013 for defining the end time of the restricted usage mode, days affordance 1014 for defining on what days the restricted usage mode settings are enforced, downtime affordance 1015 for defining how device 500 will enforce the restricted usage mode at the start time (e.g., under a "notify and block" option or a "notify" option as explained with reference to FIGS. 8LL-8GGG), spoken affordance 1016 for enabling restricted usage mode alerts to be spoken (e.g., with an audible voice reading restricted usage mode alerts or notifications aloud), or do not disturb affordance 1017 for enabling a do not disturb mode (e.g., a mode that silences calls and alerts that arrive when device 500 is locked) during the restricted usage mode as illustrated in FIG. 10C. For example, turning off toggle input affordance 1011 will optionally disable the enforcement of the restricted usage mode settings even within the times and days defined by start affordance 1012, end affordance 1013, and days affordance 1014. In some embodiments, turning off toggle input affordance 1011 will save the restricted usage mode settings or rules defined on device downtime screen 1010 such that the settings will be restored when toggle input affordance 1011 is turned back on.

Figure 10D:
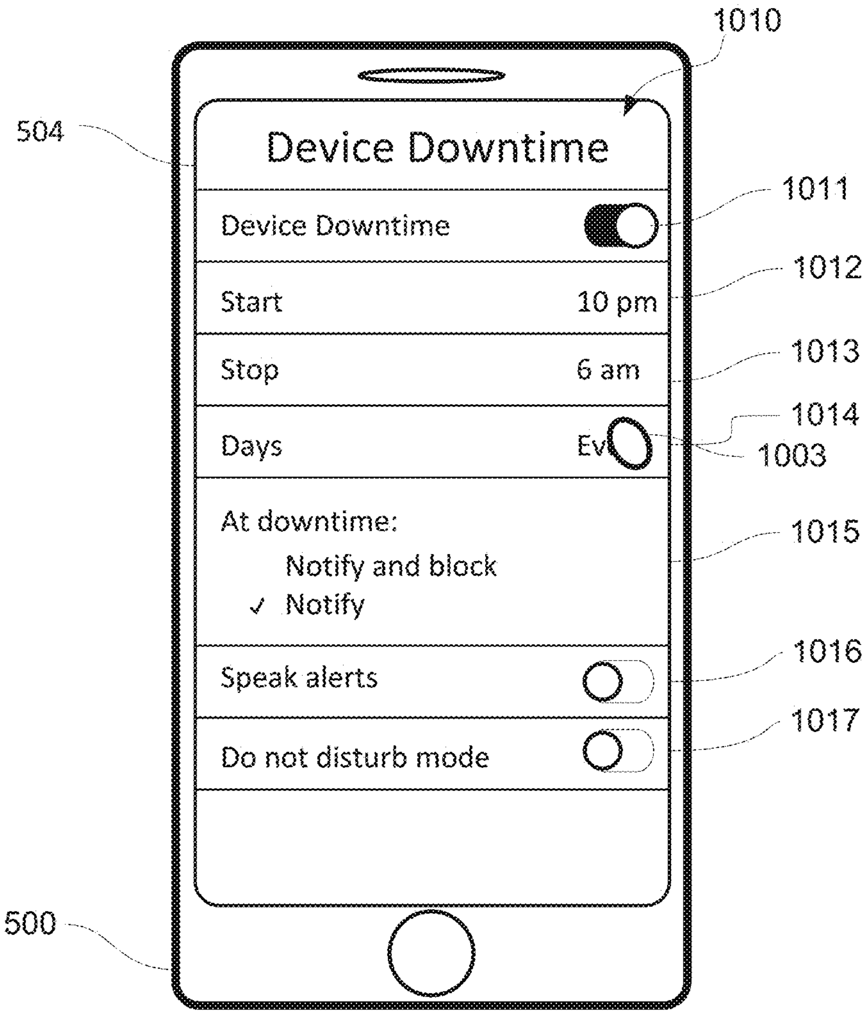

In some embodiments, days affordance 1014 is selectable to display another user interface for defining on what days the restricted usage mode settings are enforced. For example, in FIG. 10D, selection of days affordance 1014 is detected (e.g., by a tap of contact 1003 detected on days affordance 1014, as shown in FIG. 10D). In response to selection of days affordance 1014, device 500 displays "Days" graphical user interface 1020, as shown in FIG. 10E.

Figure 10E:
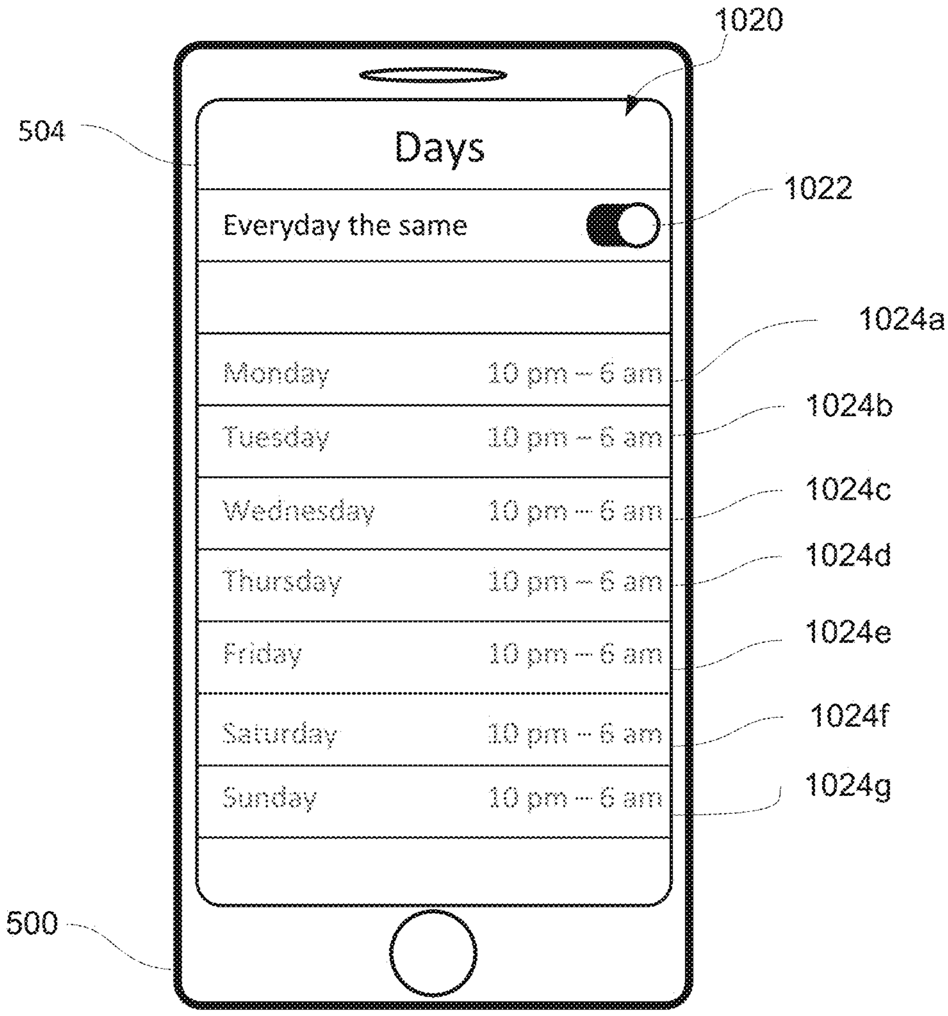
Figure 10F:
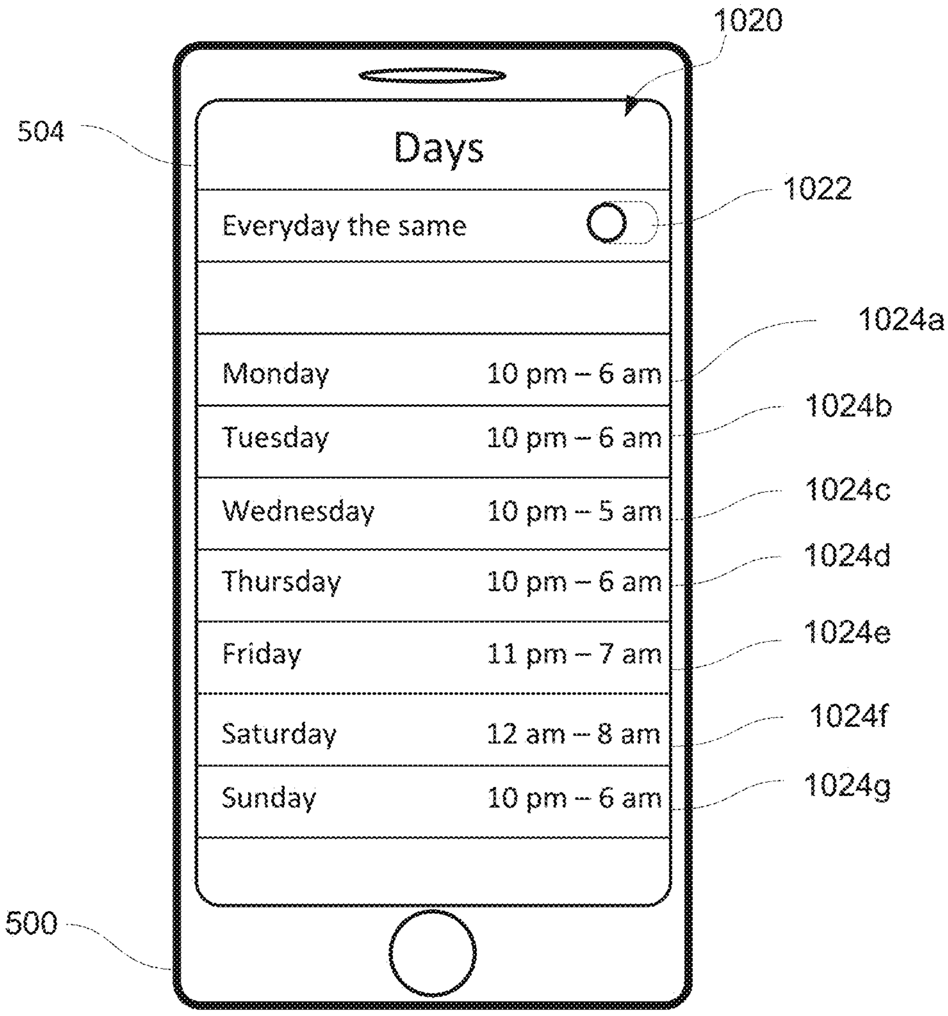

FIG. 10E illustrates an exemplary days graphical user interface 1020 for defining on what days the restricted usage mode settings are enforced. Days graphical user interface 1020 optionally includes an everyday affordance 1022 for requiring that every day of the week has the same restricted usage start and end times (e.g., as defined by start affordance 1012 and end affordance 1013 in device downtime screen 1010, as illustrated in FIG. 10C). In some embodiments, days graphical user interface 1020 includes affordances **1024*a* through 1024*g* to define different start and end times for each day of the week, Monday through Sunday respectively, as illustrated in FIG. 10E. Enabling everyday affordance 1022 optionally prohibits the user from using affordances 1024*a* through 1024*g* to define different start and end times for different days of the week by disabling affordances 1024*a* through 1024*g*, as illustrated in FIG. 10E. In some embodiments, device 500 visually obscures affordances 1024*a* through 1024*g* (e.g., by distorting, greying, fading out the affordances) when everyday affordance 1022 is enabled, as shown in FIG. 10E. In some embodiments, device 500 forgoes displaying affordances 1024*a* through 1024*g* when everyday affordance 1022 is enabled. In some embodiments, disabling everyday affordance 1022 enables the user to use affordances 1024*a* through 1024*g* to define different start and/or end times for different days of the week by enabling affordances 1024*a* through 1024*g* (e.g., allows the user to define start and/or end times on a daily basis), as illustrated in FIG. 10F. For example, disabling everyday affordance 1022 optionally allows the user to define different restricted usage mode start and end times for Friday and Saturday through affordances 1024*e* and 1024*f*, as shown in FIG. 10F. In some embodiments, enabling everyday affordance 1022 will save the different start and end times defined with affordances 1024*a* through 1024*g* on days graphical user interface 1020 such that these settings will be restored the next time everyday affordance 1022** is disabled.

Figure 10G:
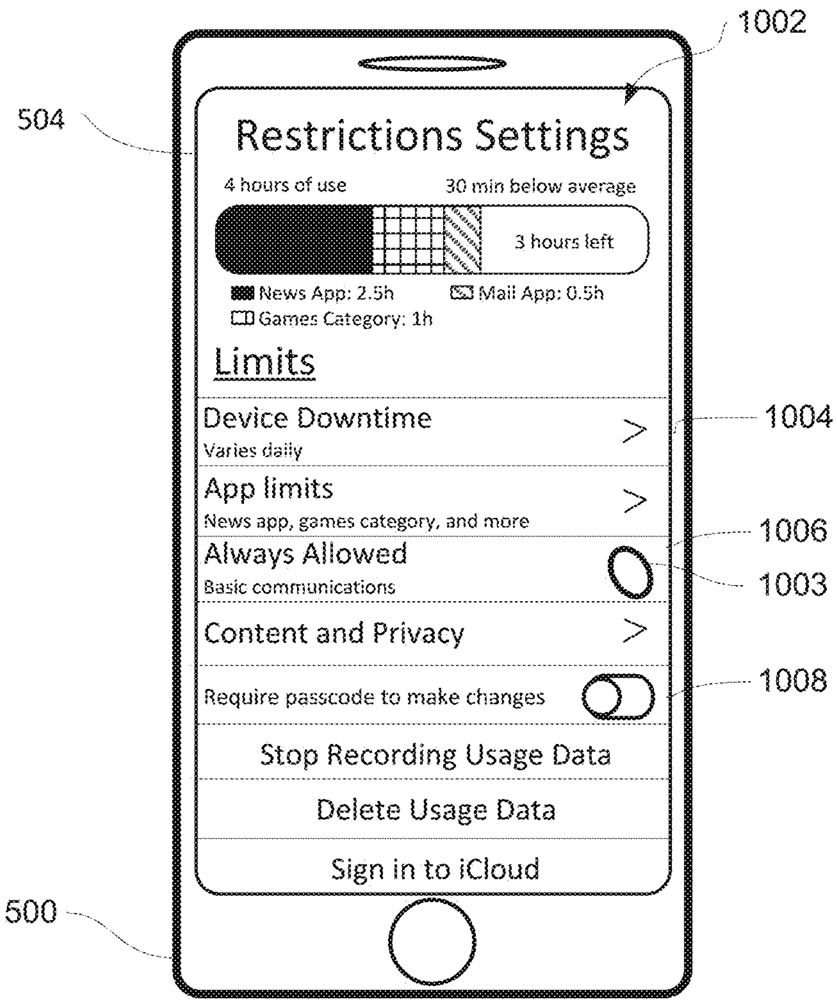

In some embodiments, as shown in FIG. 10G, always allowed affordance 1006 of restrictions settings user interface 1002 is selectable to display another user interface for defining a list of applications that are not subject to restricted usage mode rules during the restricted usage mode (e.g., an application usage whitelist). For example, in FIG. 10G, selection of always allowed affordance 1006 is detected (e.g., by a tap of contact 1003 detected on always allowed affordance 1006, as shown in FIG. 10G). In response to selection of always allowed affordance 1006, device 500 displays "Always Allowed" graphical user interface 1025 as shown in FIG. 10H.

Figure 10H:
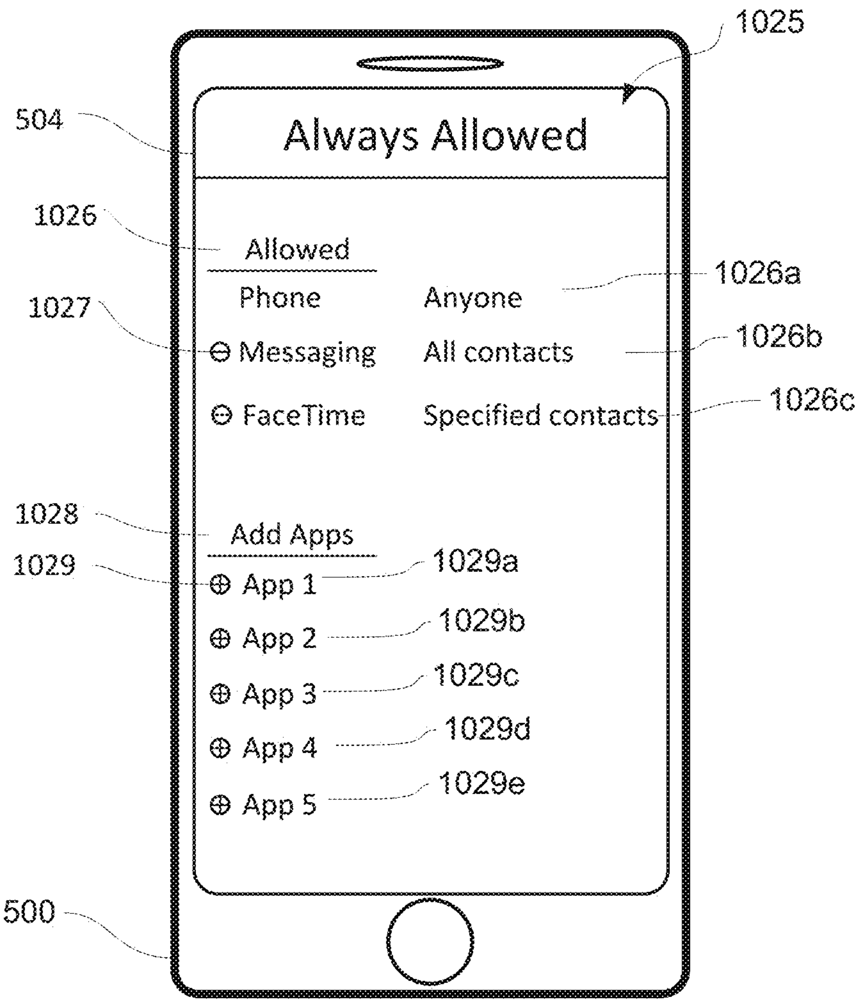

As shown in FIG. 10H, device 500 enables the user to add or remove applications from a list of applications that are not subject to restricted usage mode rules during the restricted usage mode (e.g., application usage whitelist 1026, as shown in FIG. 10H) from the always allowed graphical user interface 1025. For example, FIG. 10H illustrates Phone app 1026*a*, Messaging app 1026*b*, and FaceTime app 1026*c* on whitelist 1026. In some embodiments, always allowed graphical user interface 1025 will include a selectable remove affordance 1027 adjacent to certain applications listed on whitelist 1026 that, when selected by the user, cause device 500 to remove the corresponding application from whitelist 1027 (e.g., making that particular application subject to the restricted usage mode rules). In some embodiments, certain applications will be permanently on whitelist 1026. For example, FIG. 10H shows Phone app 1026*a* without a remove affordance 1027 to remove it from whitelist 1026—thus, Phone app 1026*a* for making or receiving calls on device 500 is optionally permanently included on whitelist 1026. In some embodiments, always allowed graphical user interface 1025 indicates whether the applications on whitelist 1026 are not subject to restricted usage mode rules during the restricted usage mode with respect to communications through that particular app with anyone, contacts saved to device 500, or particular contacts saved on device 500. For example, FIG. 10H shows that communications through Phone app 1026*a* are not restricted with anyone during the restricted usage mode, communications through Messages app 1026*b* are not restricted with respect to all contacts stored on device 500 during the restricted usage mode (but are optionally restricted with respect to others that are not stored contacts on device 500), and communications through FaceTime app 1026*c* are not restricted with respect to certain specified contacts. In some embodiments, the user is allowed to change which communications through the whitelisted apps are not subject to the restricted usage mode rules during the restricted usage mode, as described in detail below with reference to FIGS. 10K-10S.

Figure 10I:
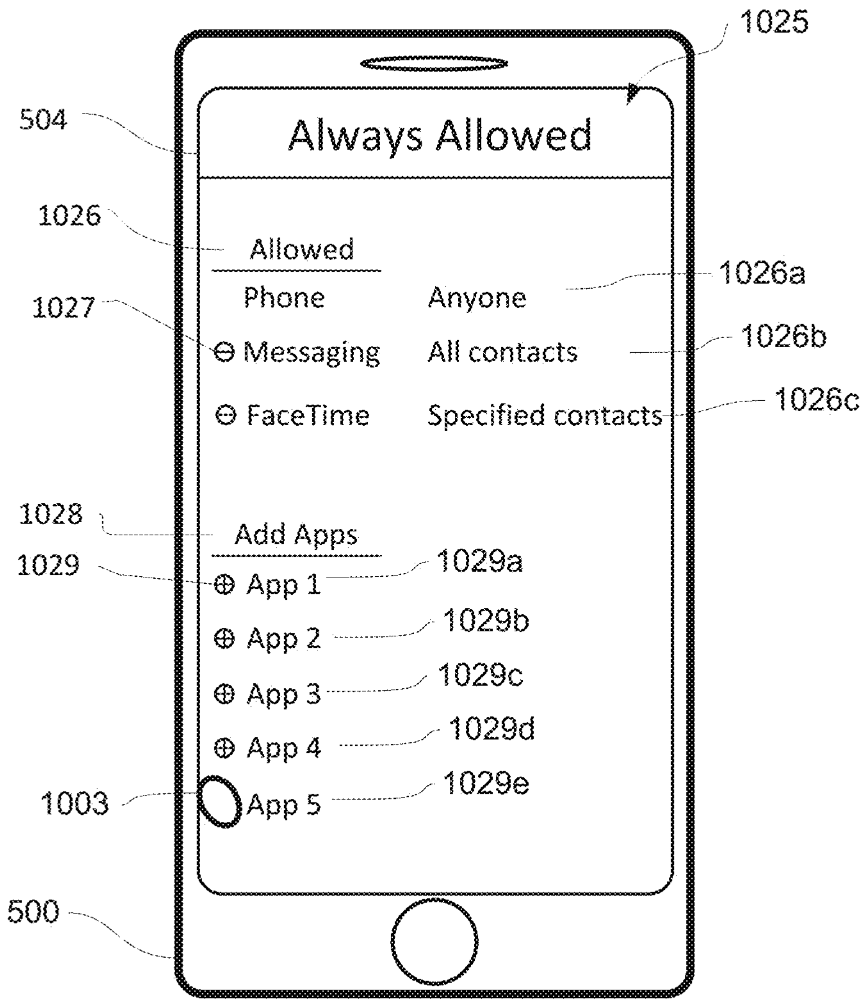
Figure 10J:
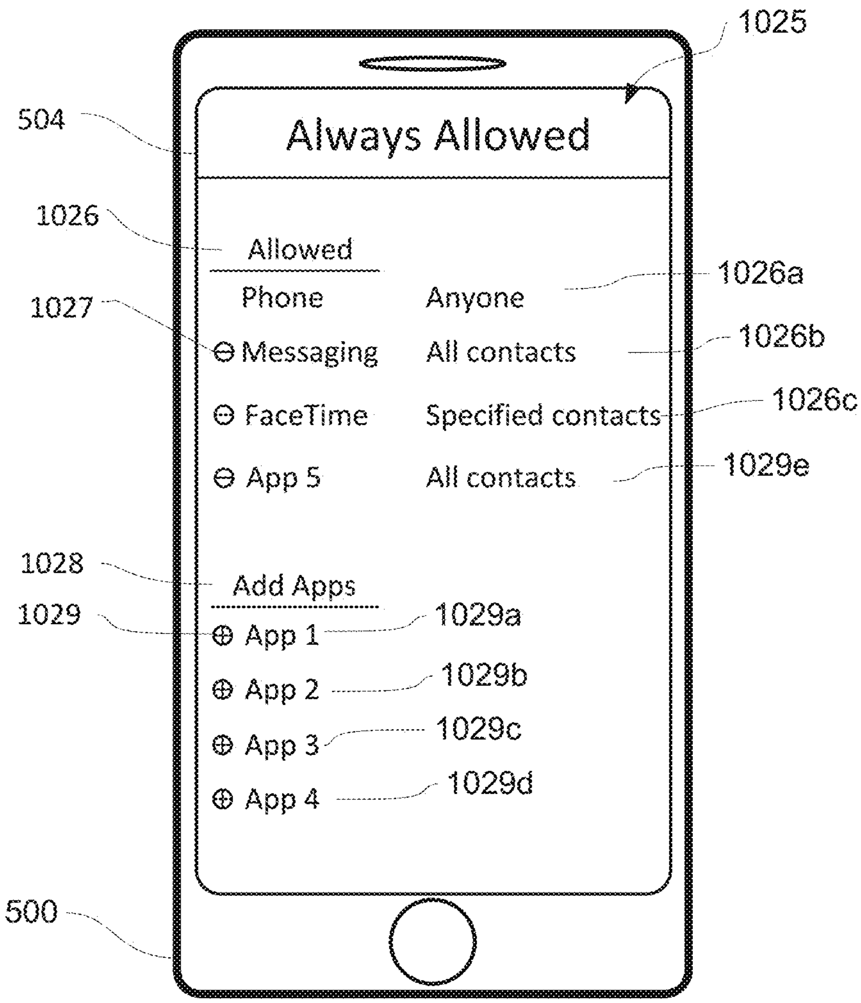

In some embodiments, as shown in FIG. 10H, always allowed graphical user interface 1025 will include list 1028 of applications that can be added to whitelist 1026 (e.g., applications 1029*a* through 1029*e*). In some embodiments, the applications listed in list 1028 include all applications installed on device 500. FIG. 10H shows selectable add affordances 1029 adjacent to each of applications 1029*a* through 1029*e* that enable the user to add any of applications 1029*a* through 1029*e* to whitelist 1026. For example, FIG. 10I illustrates addition of "App 5" (e.g., by a tap of contact 1003 detected on add affordance 1029 adjacent to application 1029*e*). In response to selection of add affordance 1029 adjacent to application 1029*e*, App 5 is added to whitelist 1026 as shown in FIG. 10J.

Figure 10K:
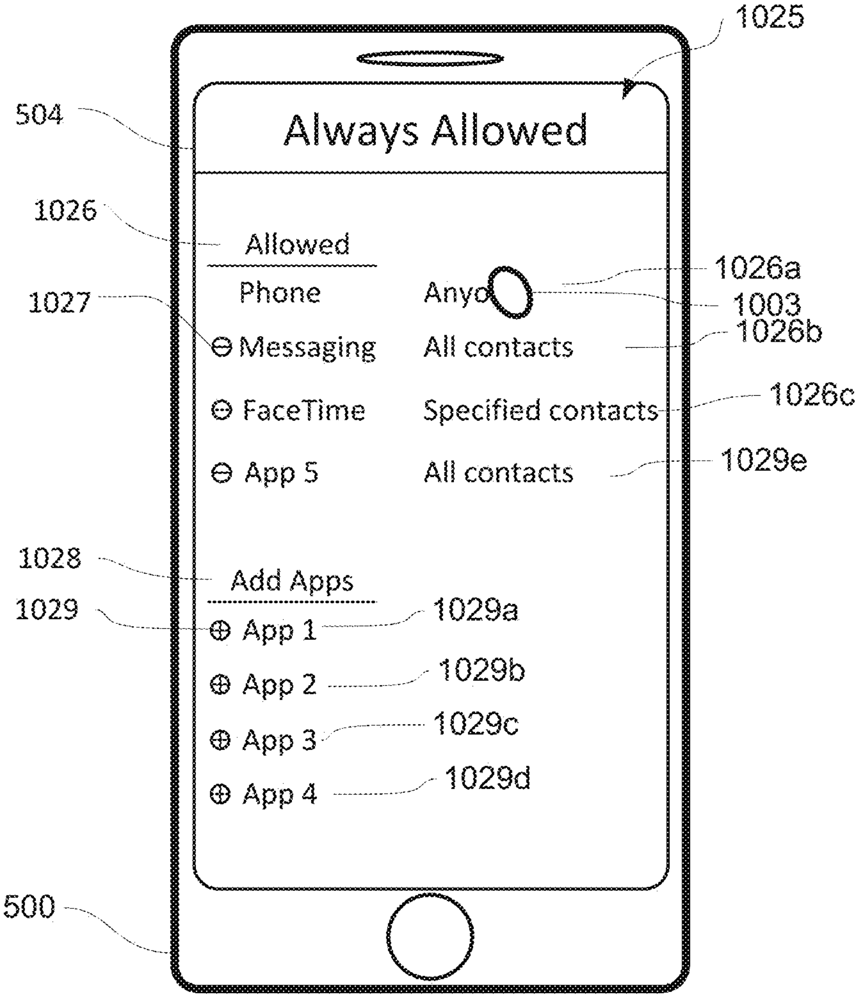
Figure 10L:
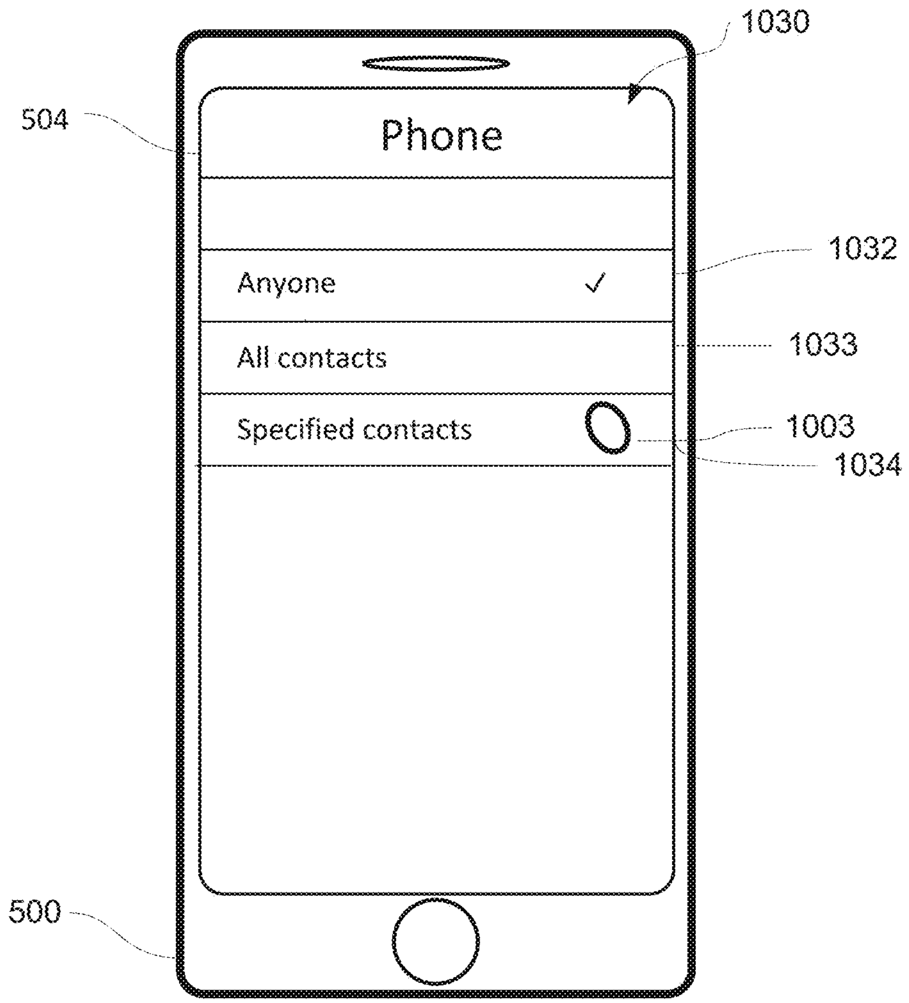

In some embodiments, one or more of applications 1026*a*, 1026*b*, 1026*c*, 1026*d*, and 1029*e* are selectable to display another user interface for changing the communications restrictions associated with those applications during the restricted usage mode. For example, in FIG. 10K, selection of Phone app 1026*a* is detected (e.g., by tap of contact 1003 detected on the entry of application 1026*a* in whitelist 1026, as shown in FIG. 10K). In response to selection of the entry of application 2016*a* in whitelist 1026, device 500 optionally displays "Phone" communications graphical user interface 1030, as shown in FIG. 10L. Phone communications graphical user interface 1030 optionally includes two selectable affordances for defining what communications with the Phone app are not subject to restricted usage mode rules during the restricted usage mode. For example, FIG. 10L displays a selectable "Anyone" option 1032 that, when selected, allows communications (e.g., both incoming and outgoing communications) with anyone (e.g., whether or not the other party's communications information is stored on device 500) through the Phone app during the restricted usage mode, a selectable "All contacts" option 1033 that, when selected, allows communications (e.g., both incoming and outgoing communications) through the Phone app with any contacts saved on device 500 during the restricted usage mode, and a selectable "Specified contacts" option 1034 that, when selected, allows the user to define with what contacts communications (e.g., both incoming and outgoing communications) are allowed through the Phone app during the restricted usage mode, as will now be described.

Figure 10M:
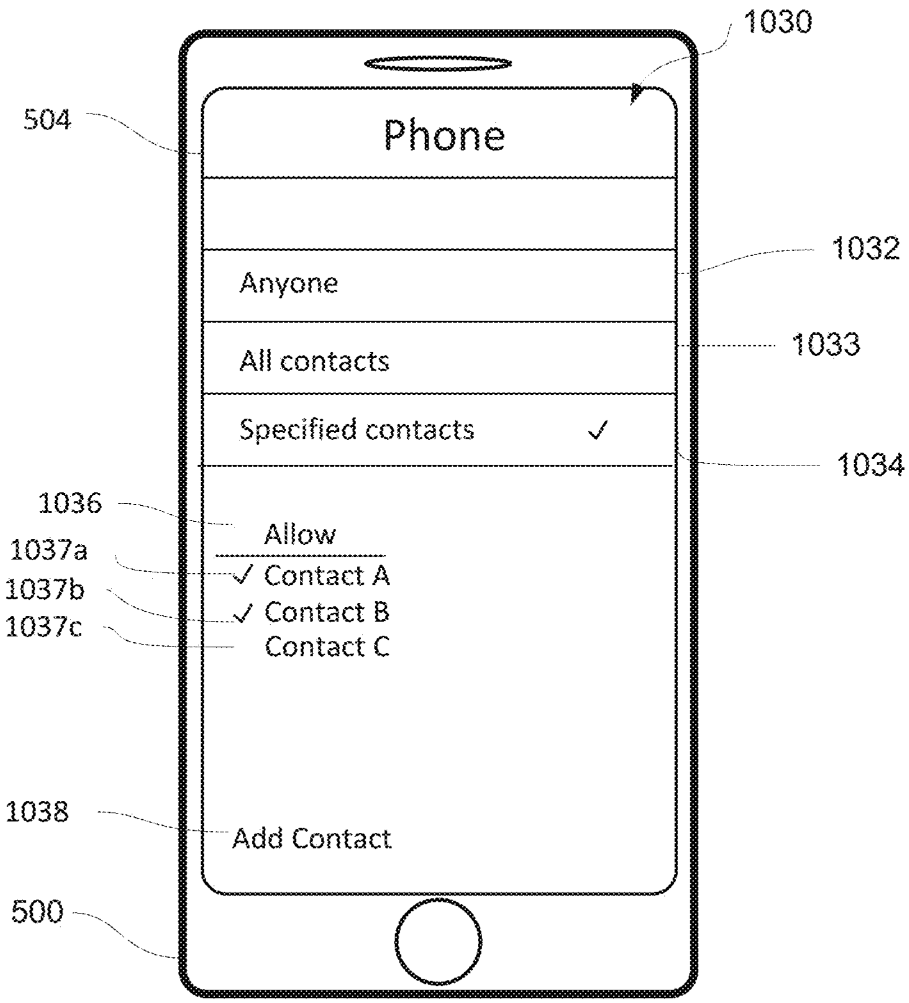

In some embodiments, specified contacts option 1034 is selectable to display information for defining with what contacts communications (e.g., both incoming and outgoing communications) are allowed through the Phone app during the restricted usage mode. For example, in FIG. 10L, selection of specified contacts option 1034 is detected (e.g., by a tap of contact 1003 detected on specified contacts option 1034, as shown in FIG. 10L). In response to selection of specified contacts option 1034, device 500 displays an allowed contacts list 1036 that includes selectable contacts stored on device 500 (e.g., contacts 1037*a*, 1037*b*, and 1037*c*) that, when selected, define with what contacts communications are allowed through the Phone app during the restricted usage mode, as shown in FIG. 10M. In some embodiments, selection of specified contacts option 1034 also causes device 500 to display a selectable "Add contact" affordance 1038 that, when selected, allows the user to enter and store a new contact on device 500 that would then be displayed as a selectable contact in allowed contacts list 1036. For example, in FIG. 10M, communications (e.g., both incoming and outgoing communications) are only allowed through the Phone app during the restricted usage mode with contacts A and B, but not contact C.

Figure 10N:
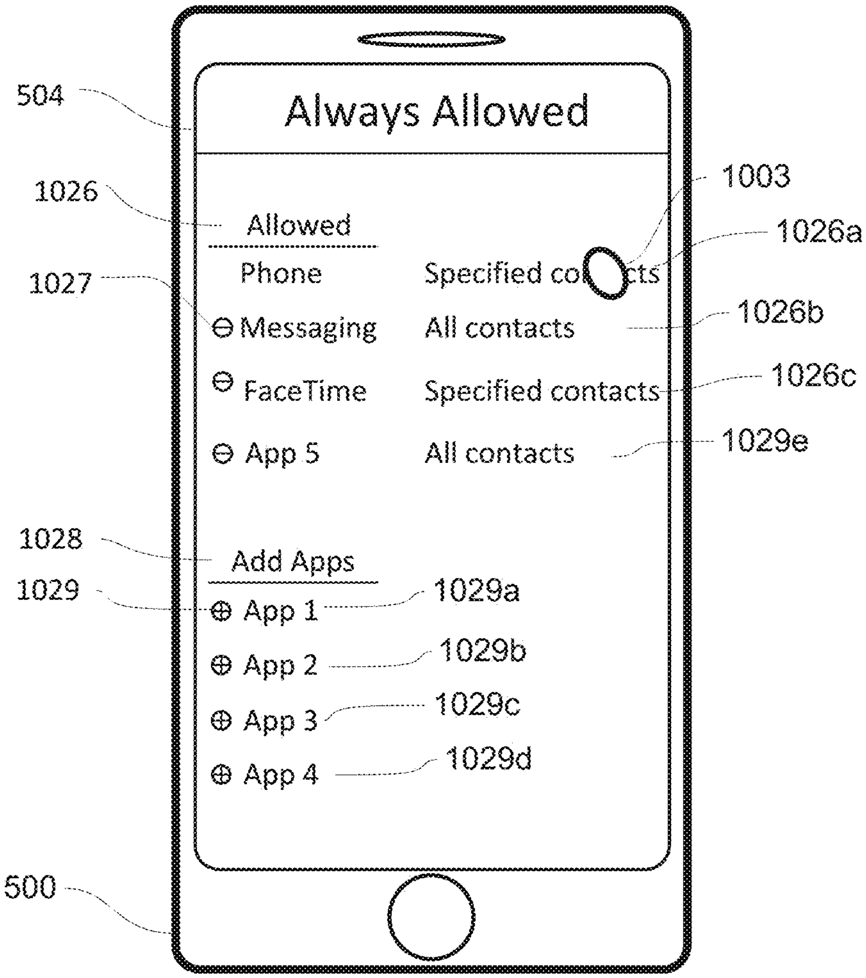

In some embodiments, device 500 allows the user to define a daytime allowed contacts list of contacts with which communications through a particular application are allowed during daytime hours (e.g., outside of the restricted usage mode) and a nighttime allowed contacts list of contacts with which communications through that same application are allowed during nighttime hours (e.g., during the restricted usage mode) (e.g., as descried with reference to FIG. 10M above). For example, FIG. 10N illustrates detecting selection of Phone app 1026*a* (e.g., by tap of contact 1003 detected on the entry of application 1026*a* in whitelist 1026, as shown in FIG. 10N). In response to selection of the entry of application 2016*a* in whitelist 1026, device 500 displays "Phone" communications graphical user interface 1030 as shown in FIG. 10O.

Figure 10O:
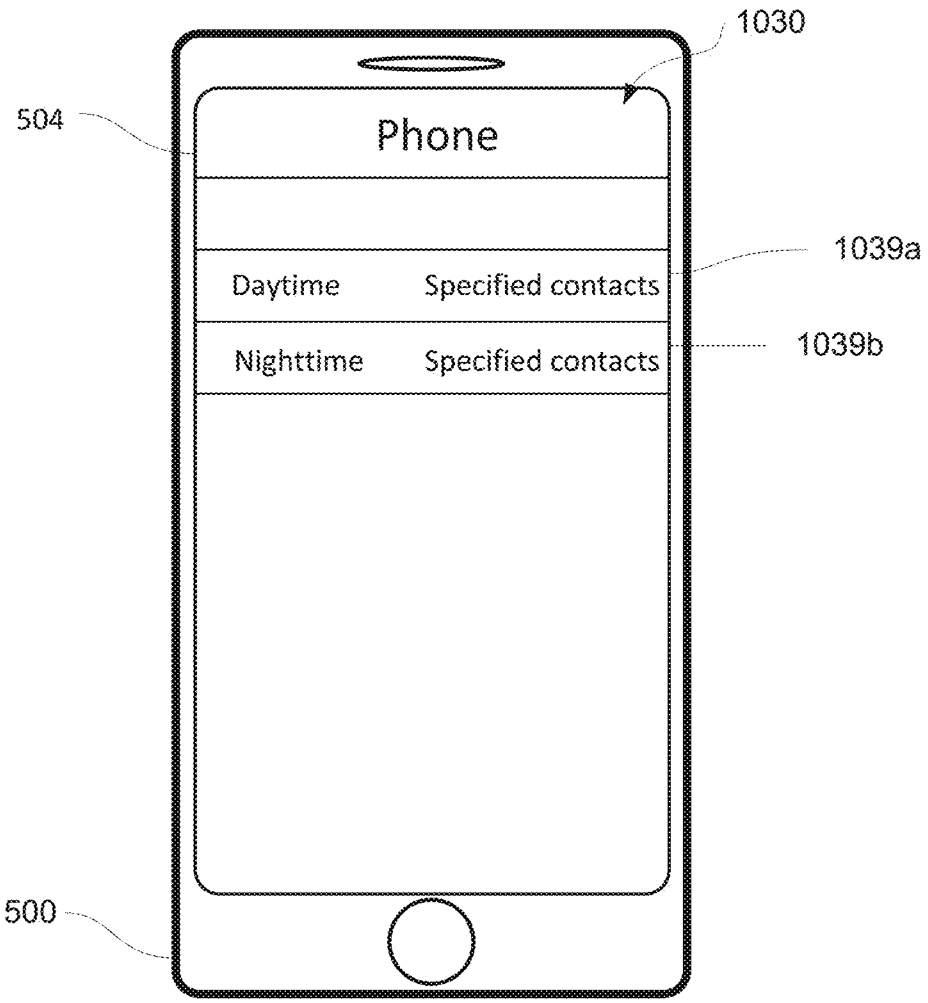
Figure 10P:
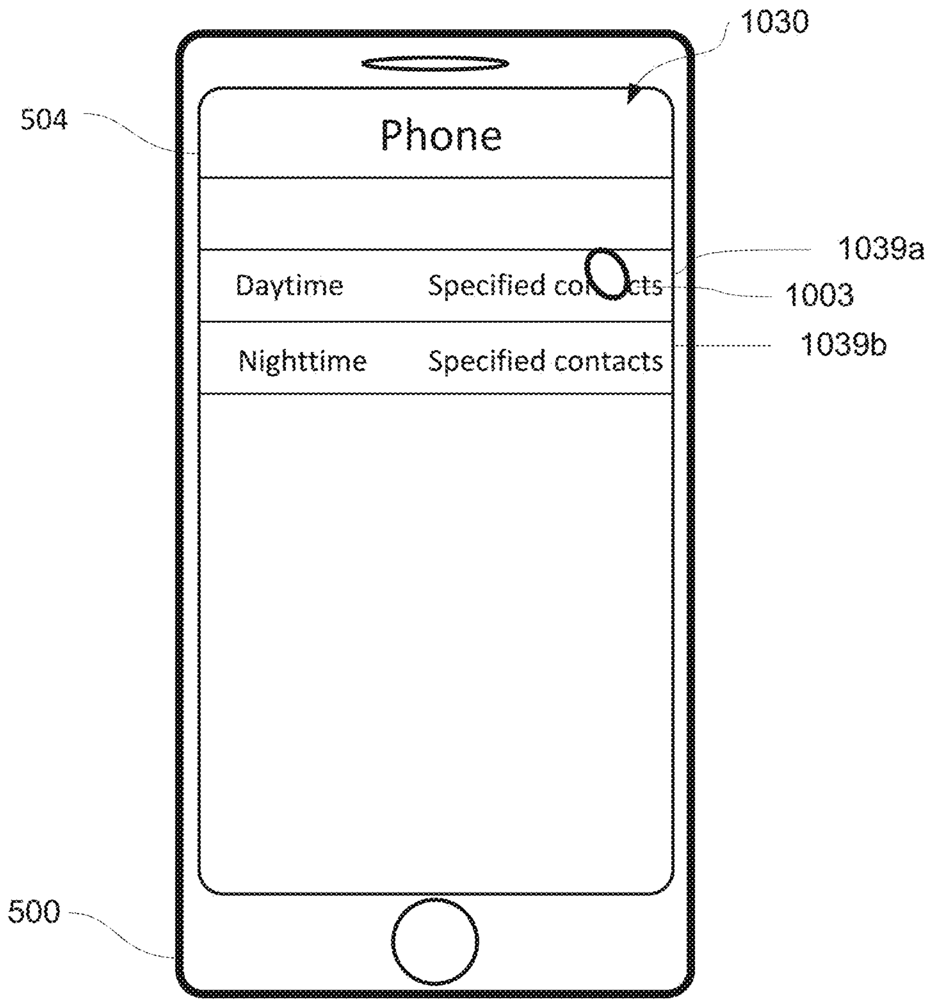
Figure 10Q:
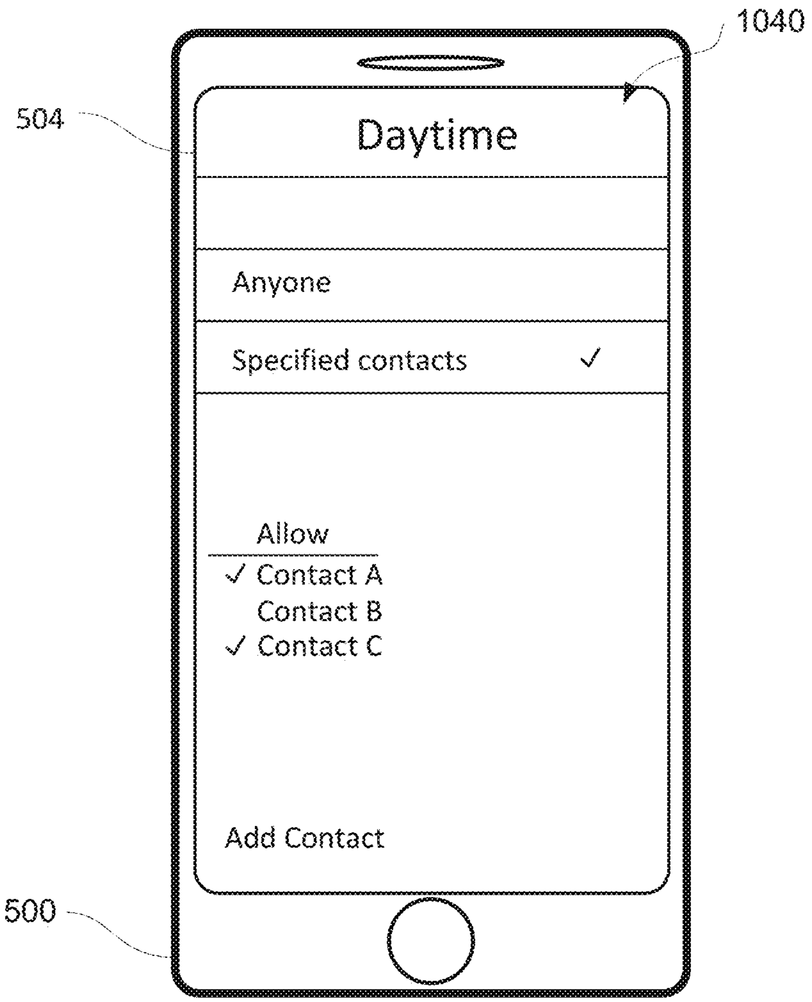
Figure 10R:
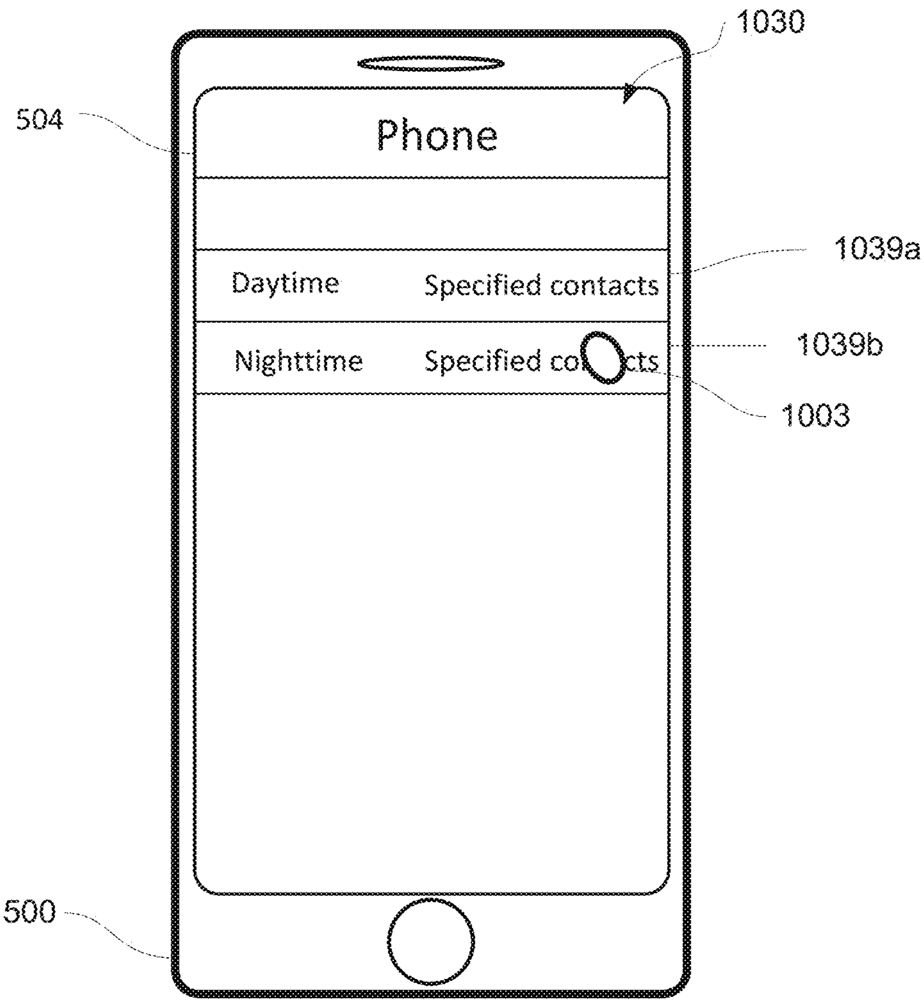
Figure 10S:
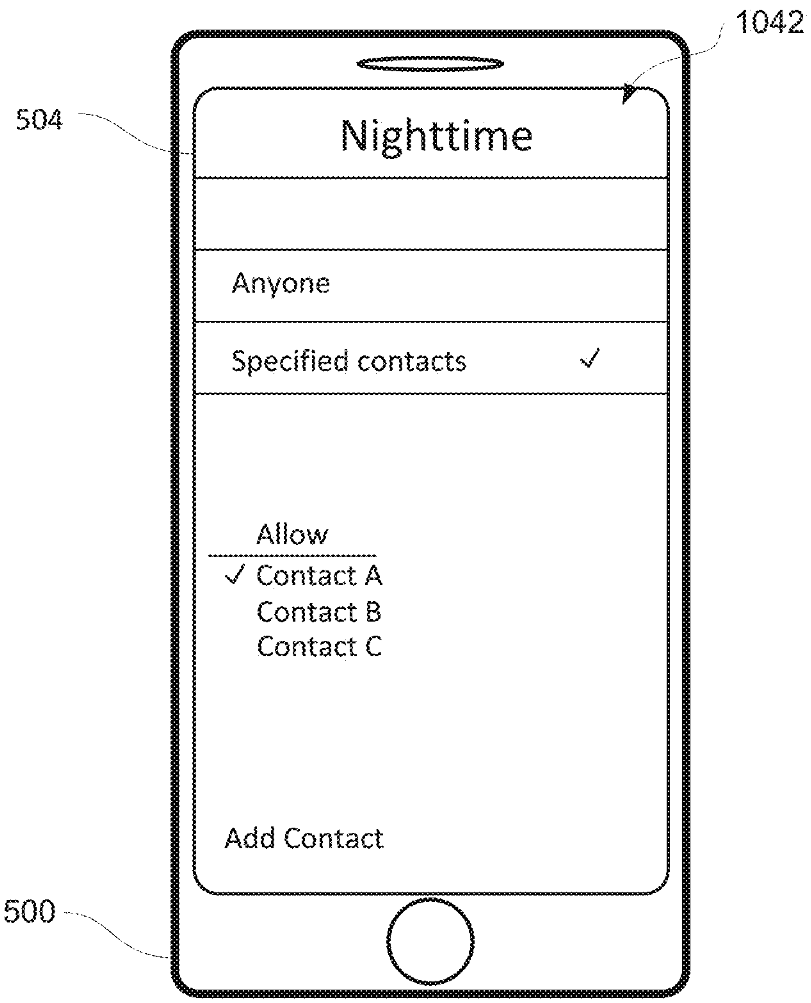

In some embodiments, "Phone" communications graphical user interface 1030 includes a selectable daytime affordance 1039*a* and a selectable nighttime affordance 1039*b*, as shown in FIG. 10O. For example, in FIG. 10P, selection of daytime affordance 1039*a* is detected (e.g., by tap of contact 1003 detected on daytime affordance 1039*a*, as shown in FIG. 10P). In response to selection of daytime affordance 1039*a*, device 500 displays "Daytime" graphical user interface 1040, as illustrated in FIG. 10Q. In some embodiments, daytime graphical user interface 1040 functions as described above with reference to FIGS. 10L-10M to define with what contacts (e.g., anyone, all contacts, or specified contacts) communications (e.g., both incoming and outgoing communications) are allowed through the Phone app during daytime hours (e.g., outside the restricted usage mode) (e.g., to define a daytime whitelist). As shown in FIG. 10R, selection of nighttime affordance 1039*b* is optionally detected (e.g., by tap of contact 1003 detected on nighttime affordance 1039*b*, as shown in FIG. 10R). In response to selection of nighttime affordance 1039*b*, device 500 displays "Nighttime" graphical user interface 1042, as illustrated in FIG. 10S. In some embodiments, nighttime graphical user interface 1042 functions as described above with reference to FIGS. 10L-10M to define with what contacts (e.g., anyone, all contacts, or specified contacts), or communications (e.g., both incoming and outgoing communications) are allowed through the Phone app during bedtime hours (e.g., during the restricted usage mode) (e.g., to define a nighttime whitelist). In some embodiments, the daytime and nighttime whitelists are different, as shown in FIGS. 10Q and 10S.

Figure 10T:
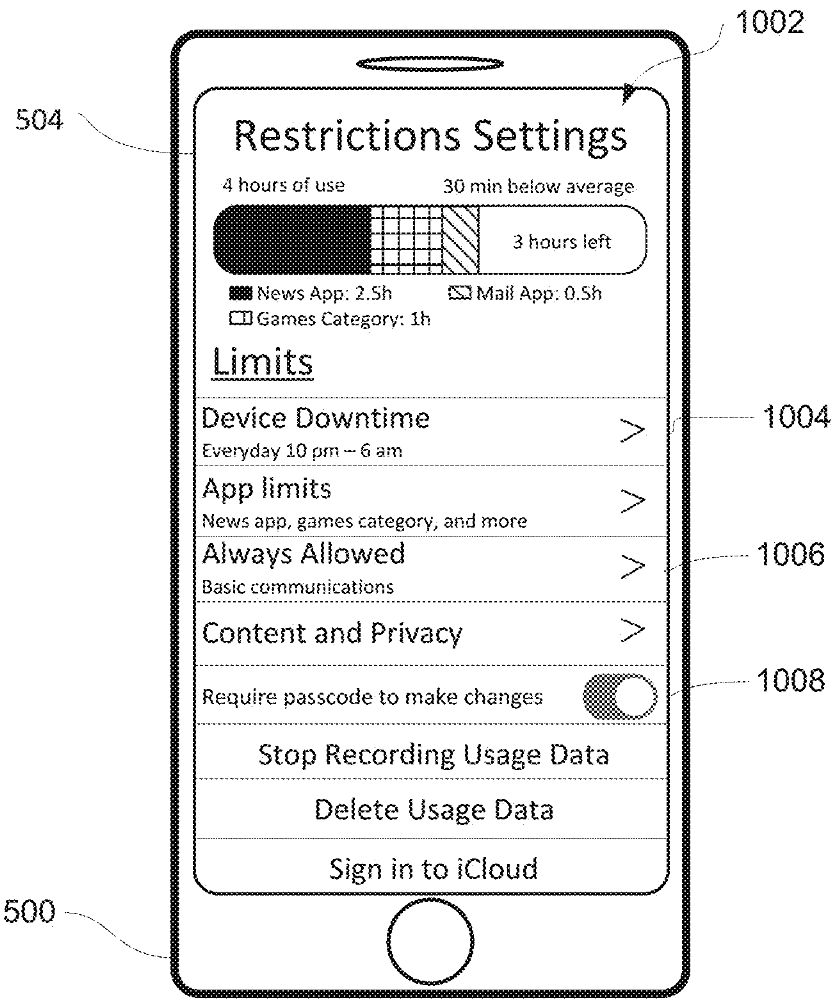
Figure 10U:
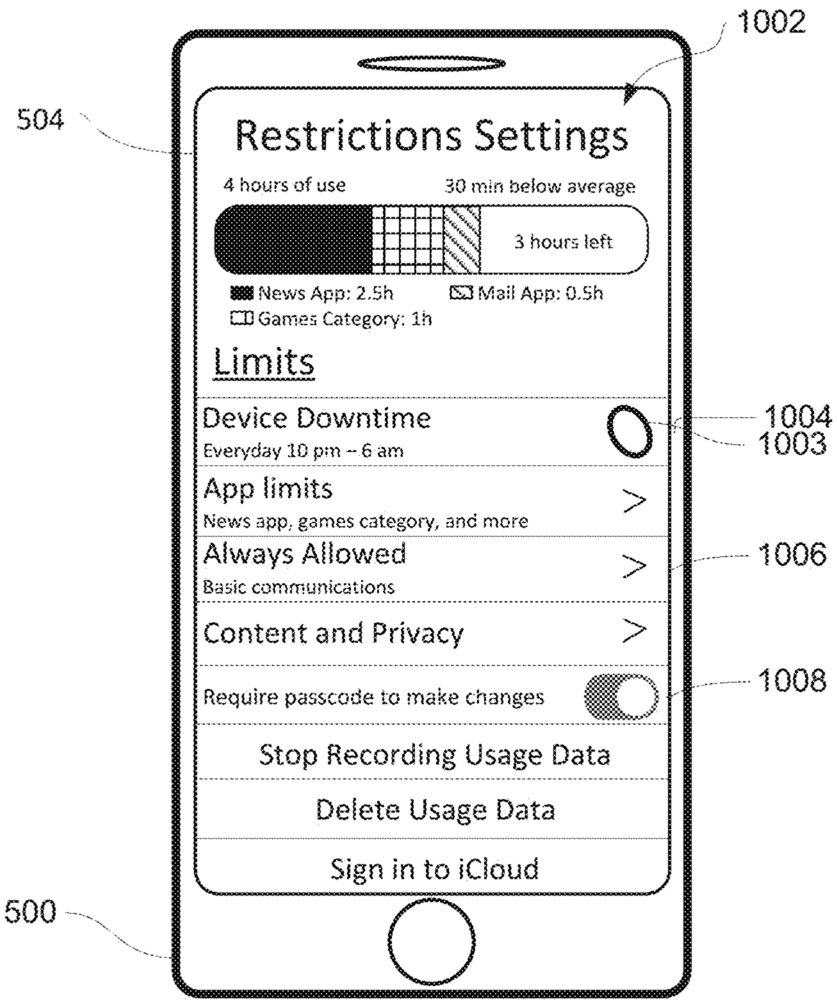
Figure 10V:
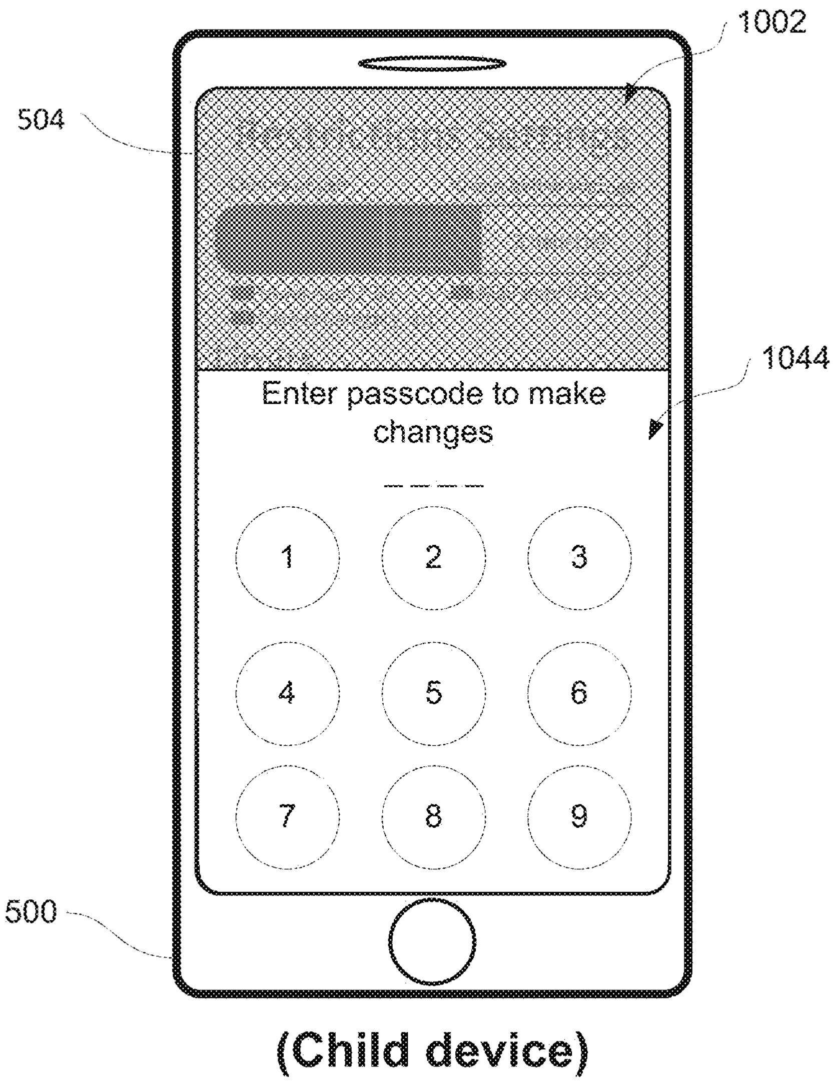

In some embodiments, device 500 is a child device (e.g., the device of a user designated as a child, as opposed to a parent or administrator in the family account), as illustrated in FIG. 10T. If device 500 is a child device, changing one or more restriction settings on restrictions settings graphical user interface 1002 is optionally not allowed and/or optionally requires that a passcode be entered (or other authentication, as described in this disclosure, is required). In FIG. 10T, passcode affordance 1008 is optionally permanently toggled on for a child device, requiring the user of device 500 to enter a passcode to make any changes on restrictions settings graphical user interface 1002. For example, in FIG. 10U, selection of device downtime settings affordance 1004 is detected (e.g., by a tap of contact 1003 detected on device downtime settings affordance 1004, as shown in FIG. 10U) while passcode affordance 1008 is toggled on. In response to selection of device downtime settings affordance 1004, device 500 displays passcode graphical user interface 1044 requiring the user to enter a passcode before being allowed to make changes to any device downtime settings, as shown in FIG. 10V. In some embodiments, passcode graphical user interface 1044 is not displayed by device 500 until a device restriction setting is changed by the user as described above with reference to FIGS. 10C-10S (e.g., a user of a child device is able to view restriction settings, including device downtime and always allowed settings, without having to enter a passcode). In some embodiments, the passcode required at FIG. 10V is different than a passcode to logon to or unlock device 500 (e.g., is a passcode unique to restriction settings). In some embodiments, biometrics are required instead of a passcode to make changes to the restriction settings (e.g., as described in process 1100 below).

Figure 10W:
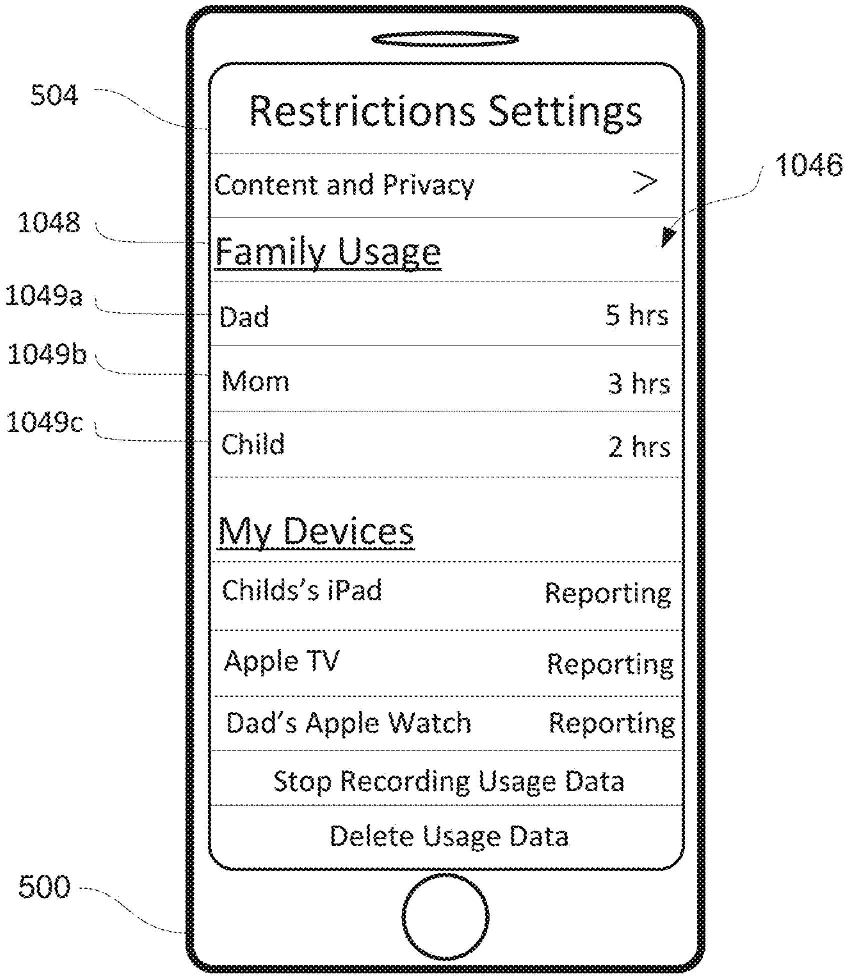

In FIG. 10W, device 500 is displaying a "Family" graphical user interface 1046 in which a user is able to view family usage limits 1048 (e.g., usage limits associated with members of the family account and/or usage limits of devices associated with the family account) and make changes to those family limits (e.g., as described above with reference to FIGS. 6C-6D). For example, FIG. 10W illustrates usage limits 1048 for a dad account 1049*a*, a mom account 1049*b*, and a child account 1049*c*. In some embodiments, family settings graphical user interface 1046 is contained within the restriction settings interface 1002 (e.g., as described above with reference to FIGS. 6C-6D).

Figure 10X:
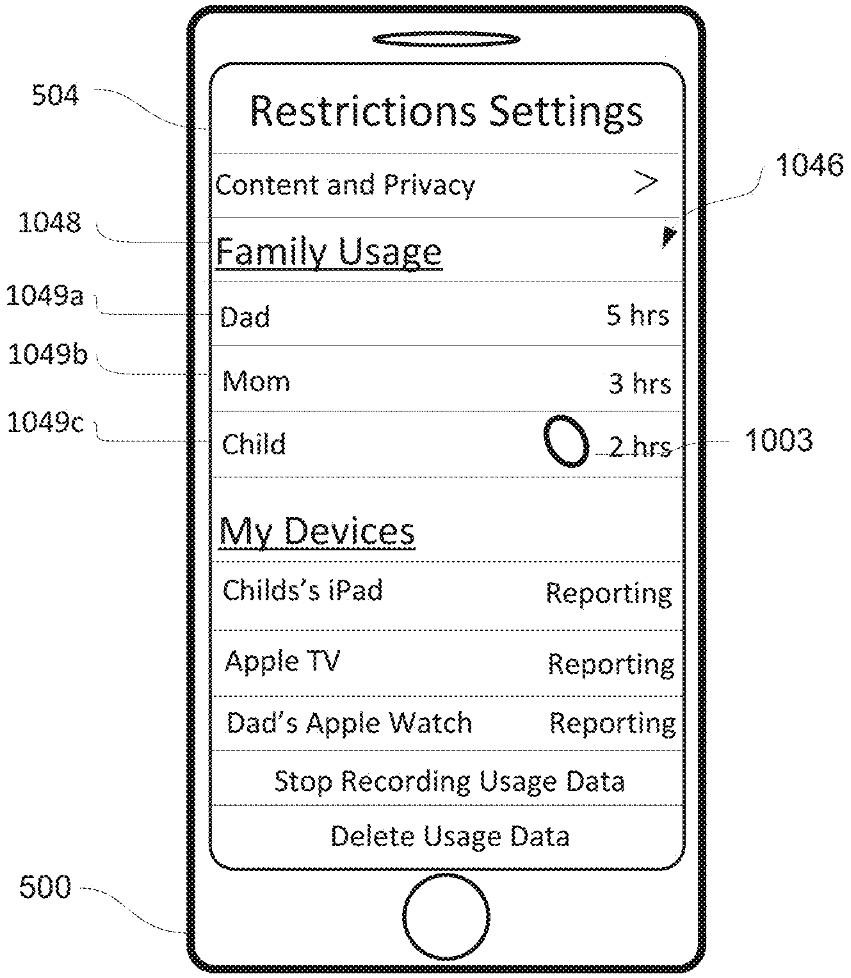
Figure 10Y:
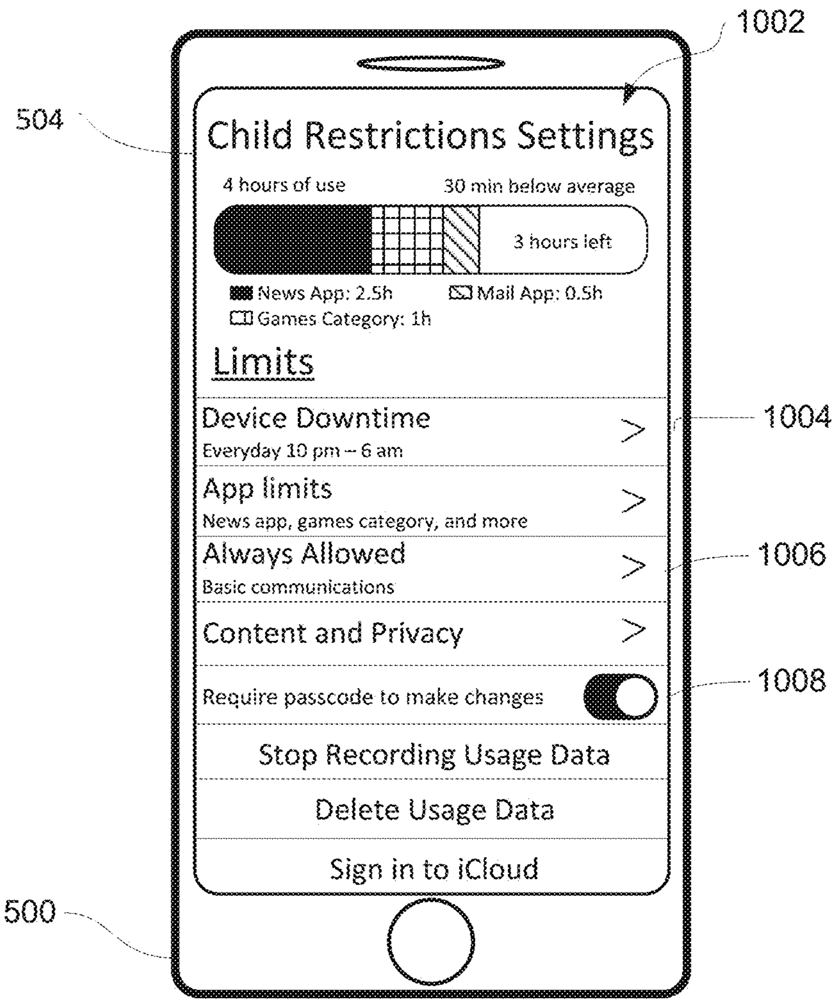

In some embodiments, each of dad account 1049*a*, mom account 1049*b*, and child account 1049*c* is selectable to display a restriction settings graphical user interface to make changes to the restriction settings associated with each of those accounts. For example, in FIG. 10X, selection of child account 1049*c* is detected (e.g., by a tap of contact 1003 detected on child account 1049*c*, as shown in FIG. 10X). In response to selection of child account 1049*c*, device 500 displays child restrictions settings graphical user interface 1002 associated with child account 1049*c*, as shown in FIG. 10Y.

Figure 10Z:
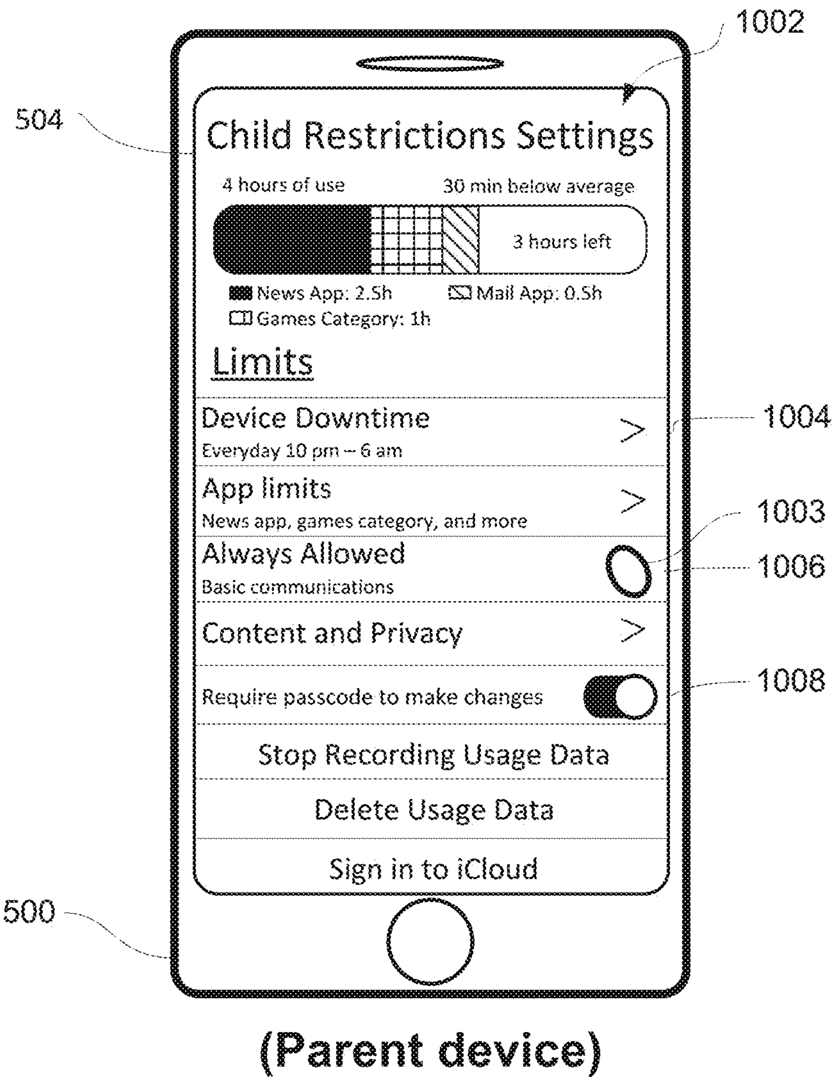
Figure 10A:
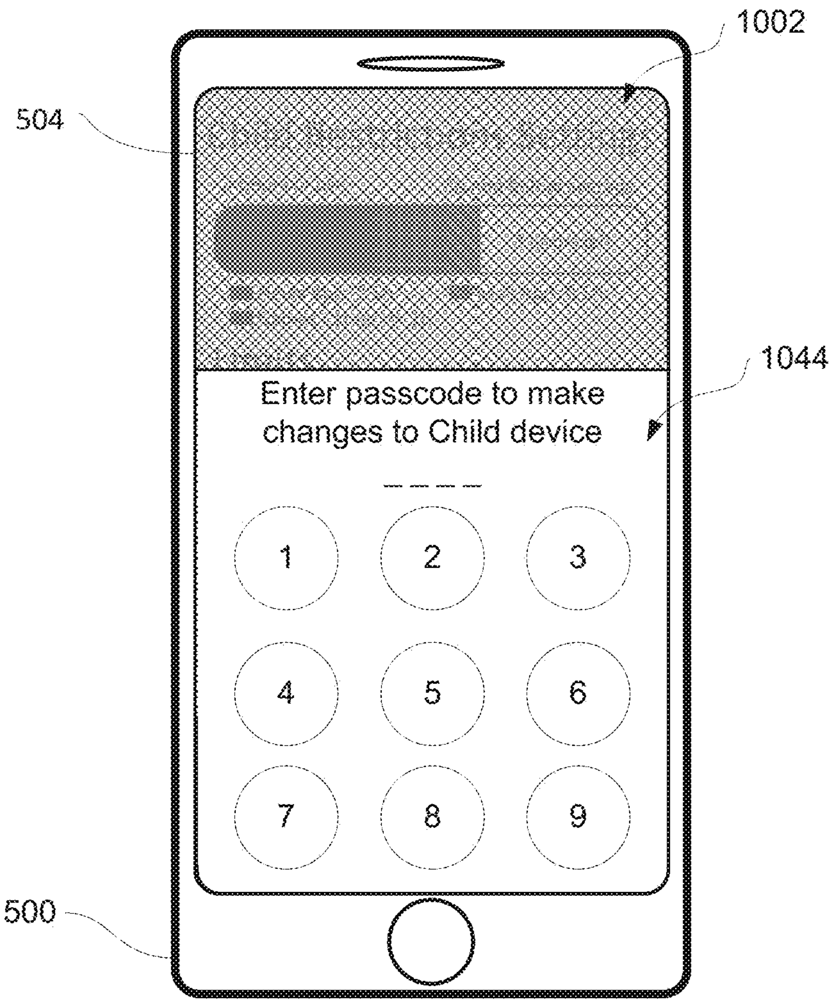
Figure 10B:
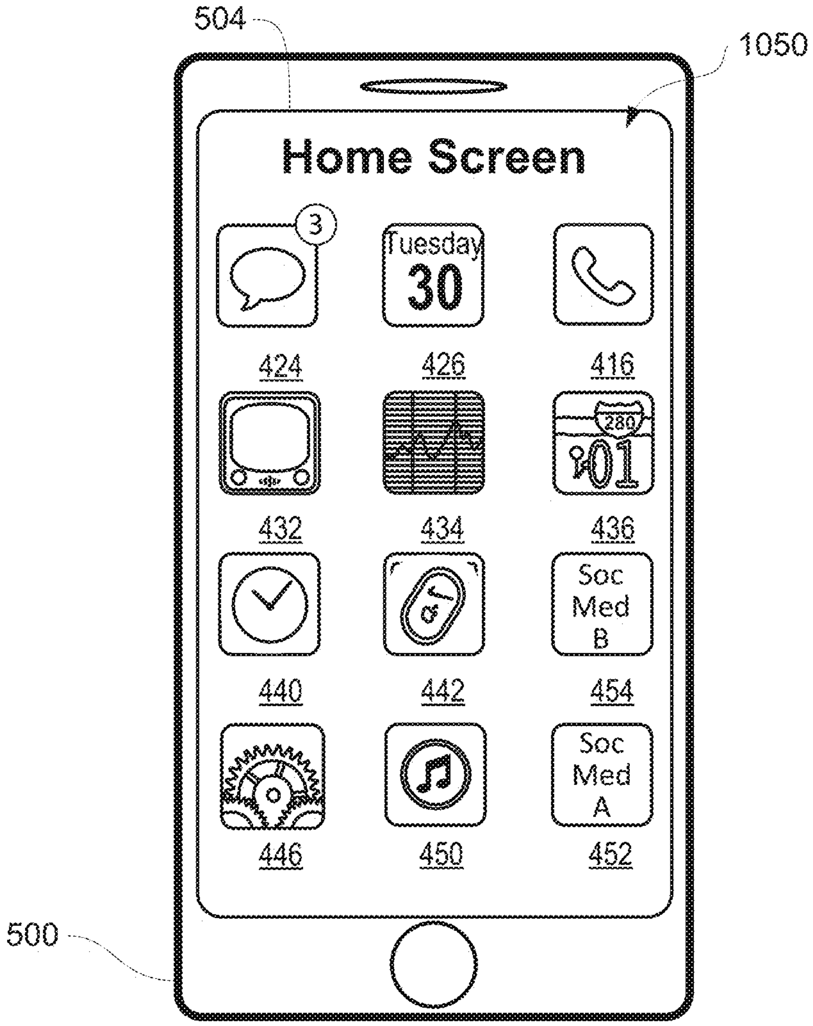
Figure 10C:
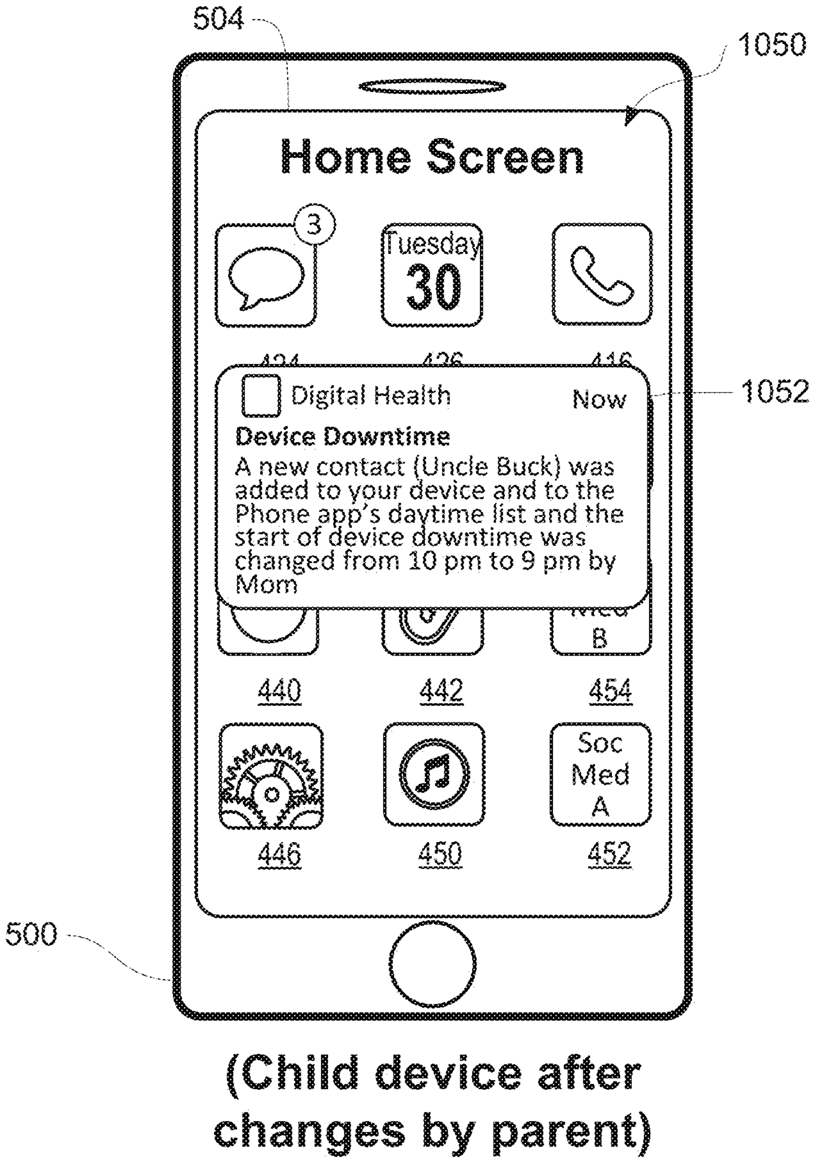
Figure 10D:
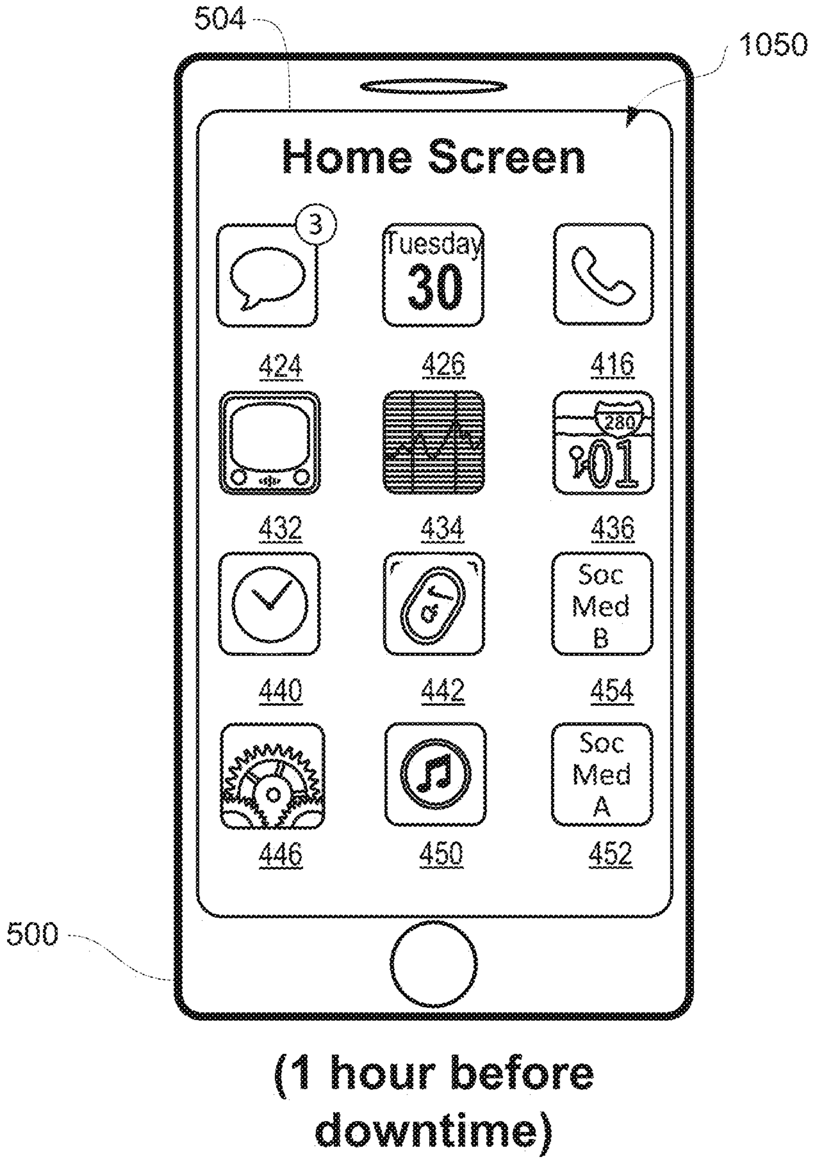
Figure 10E:
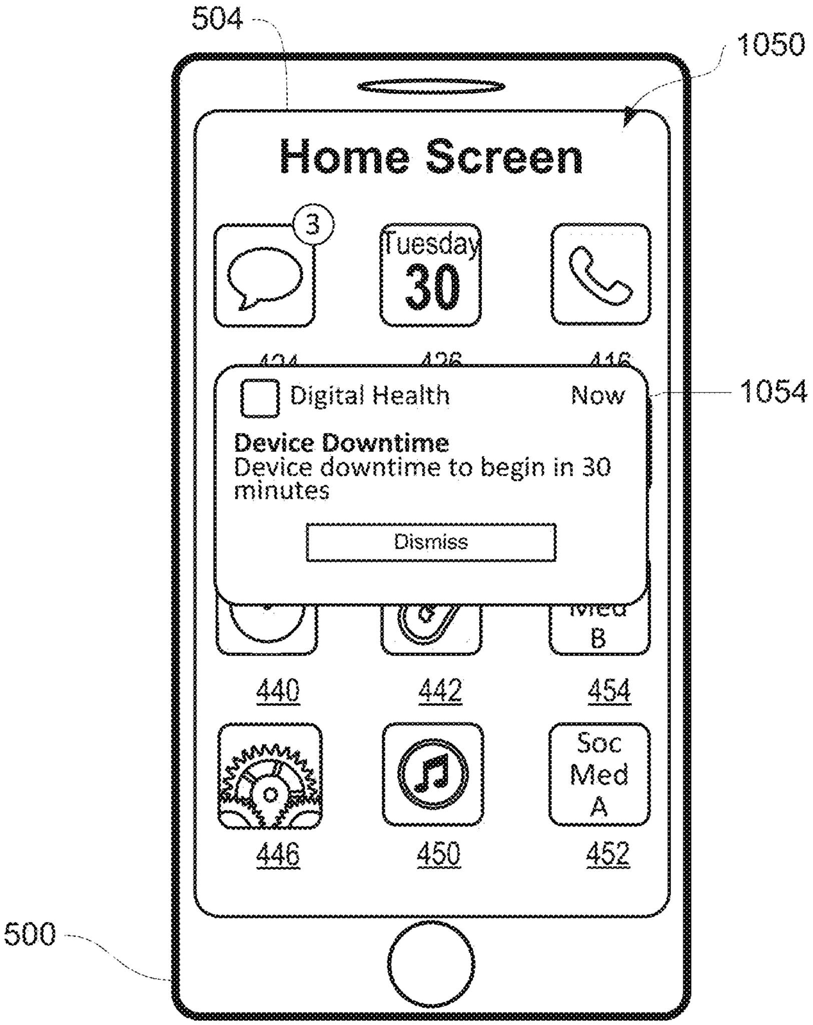
Figure 10F:
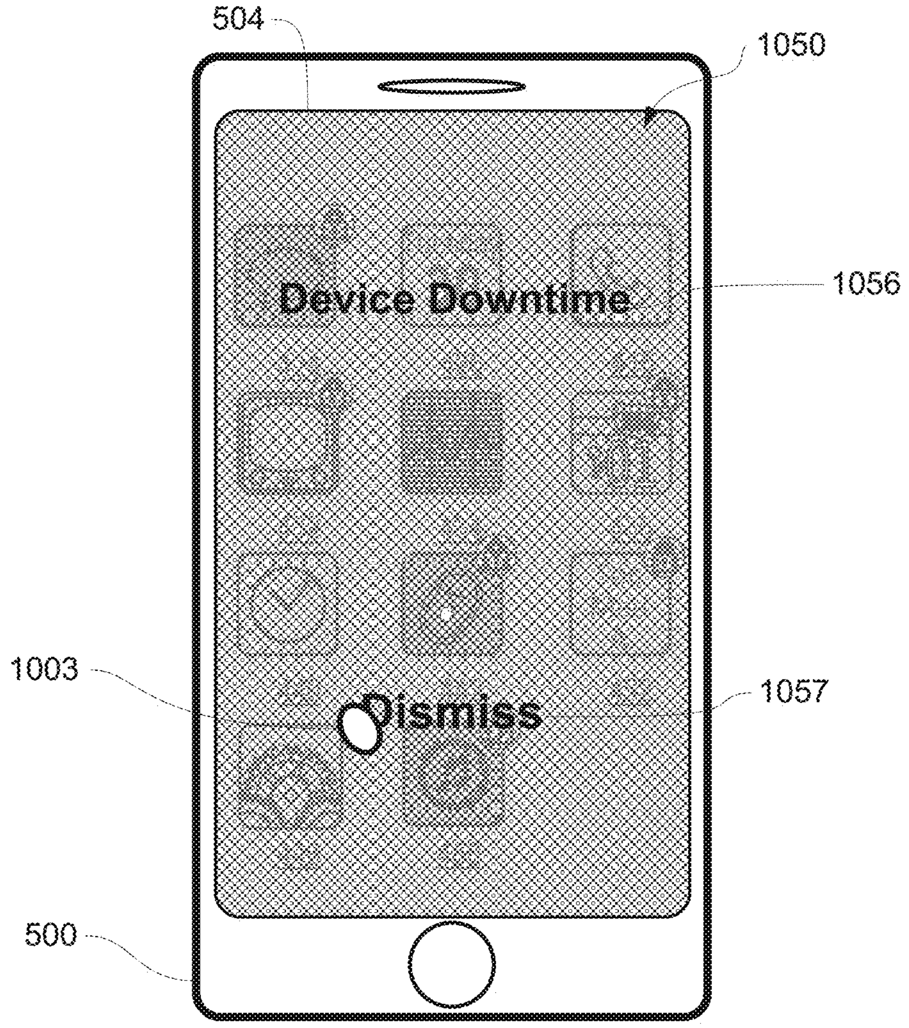
Figure 10G:
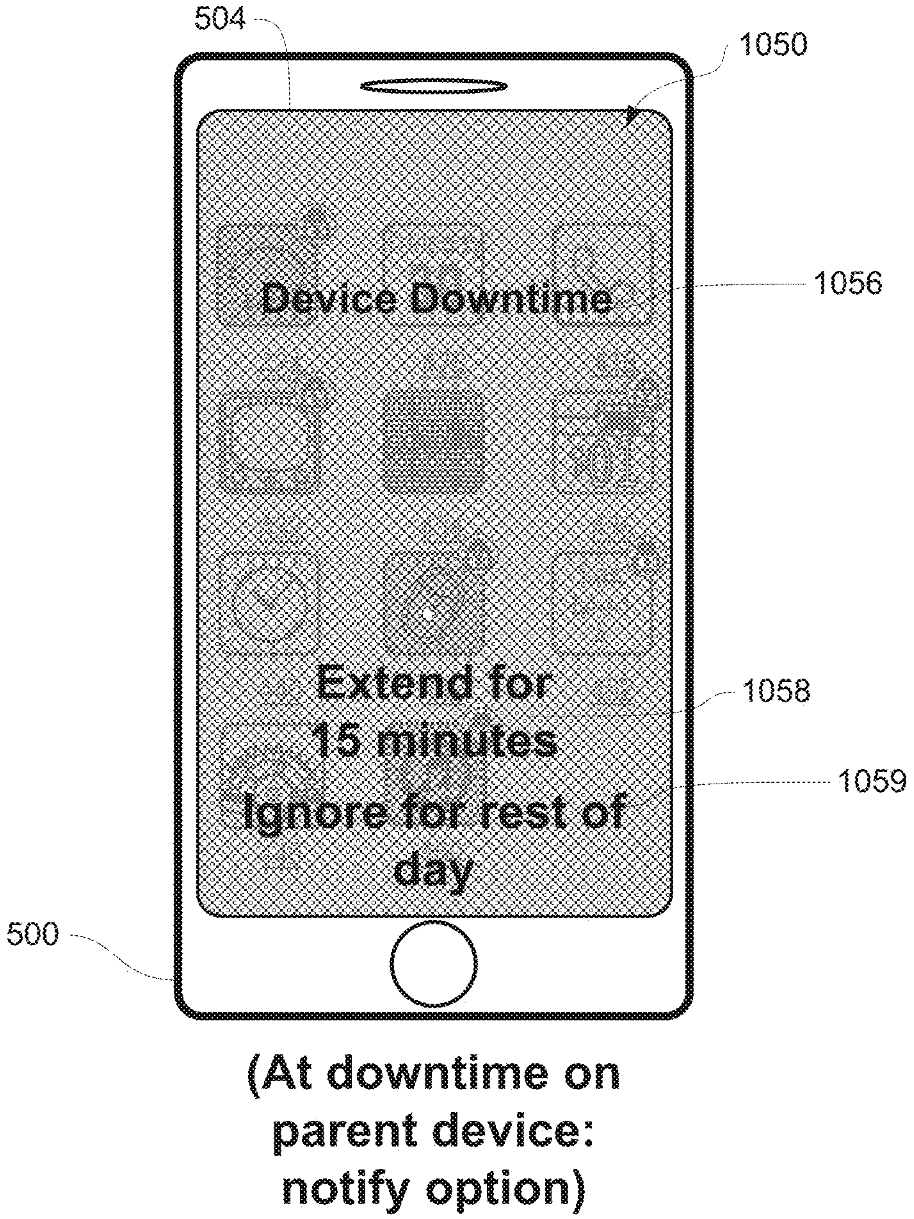
Figure 10H:
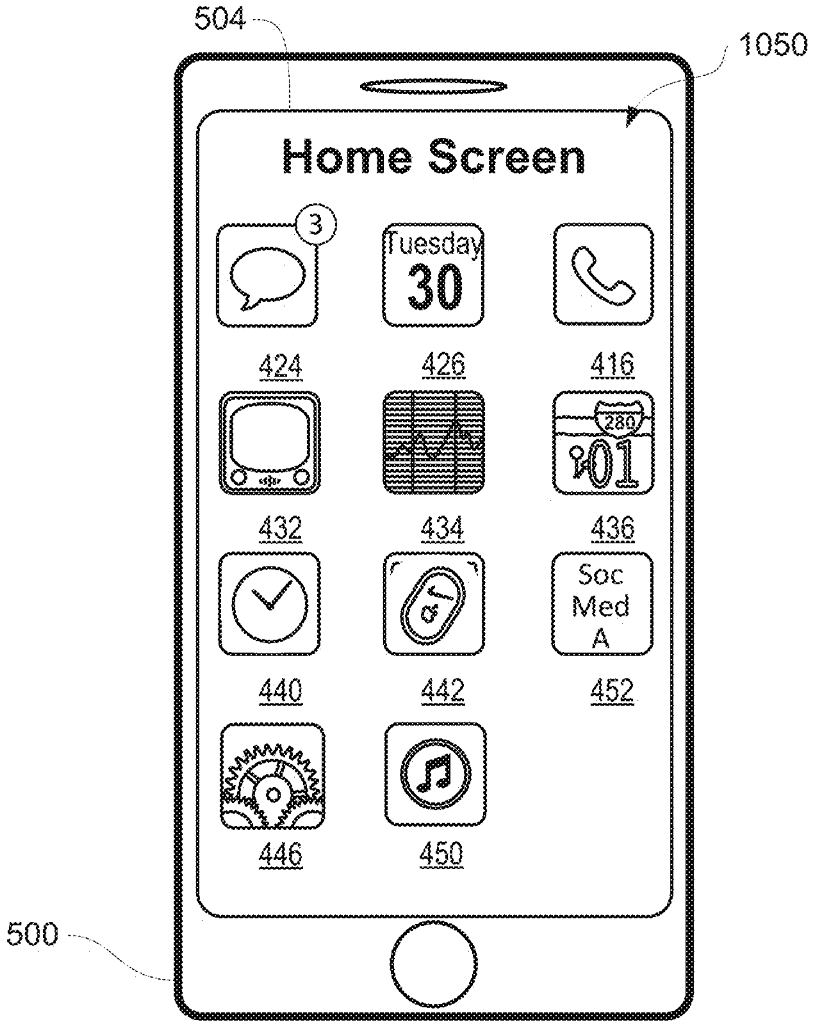
Figure 10I:
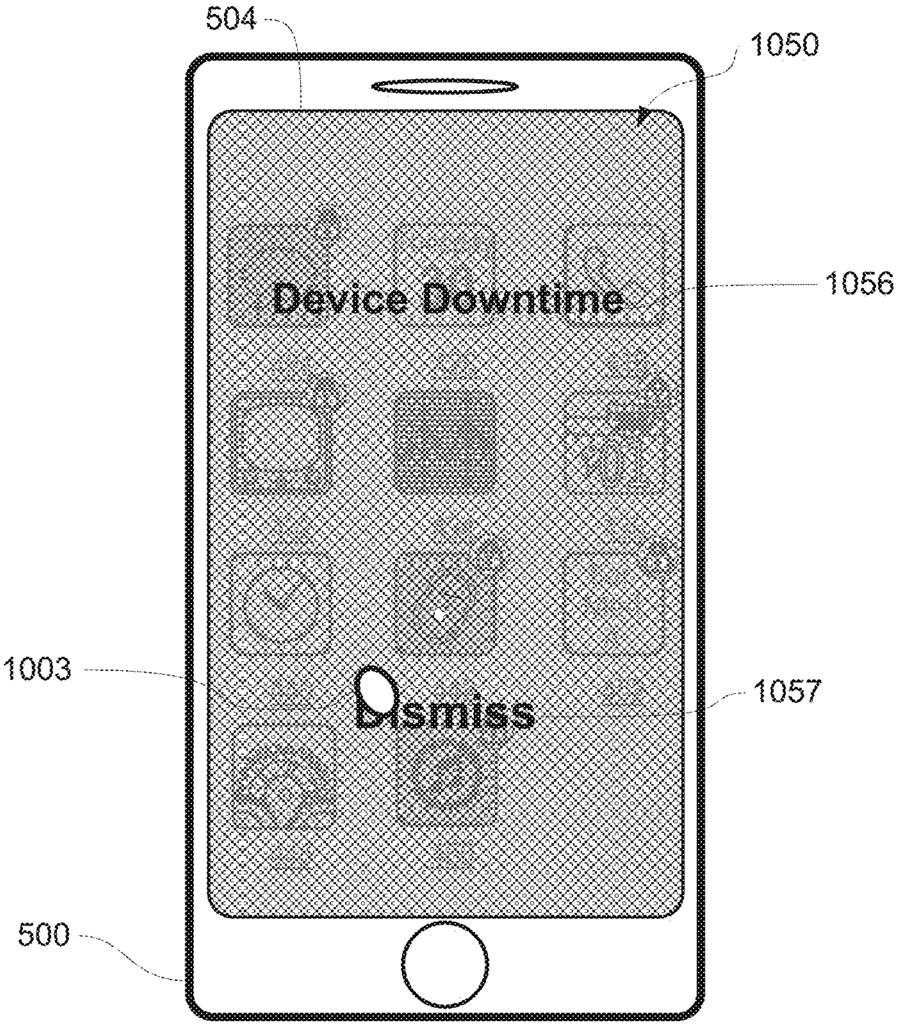
Figure 10J:
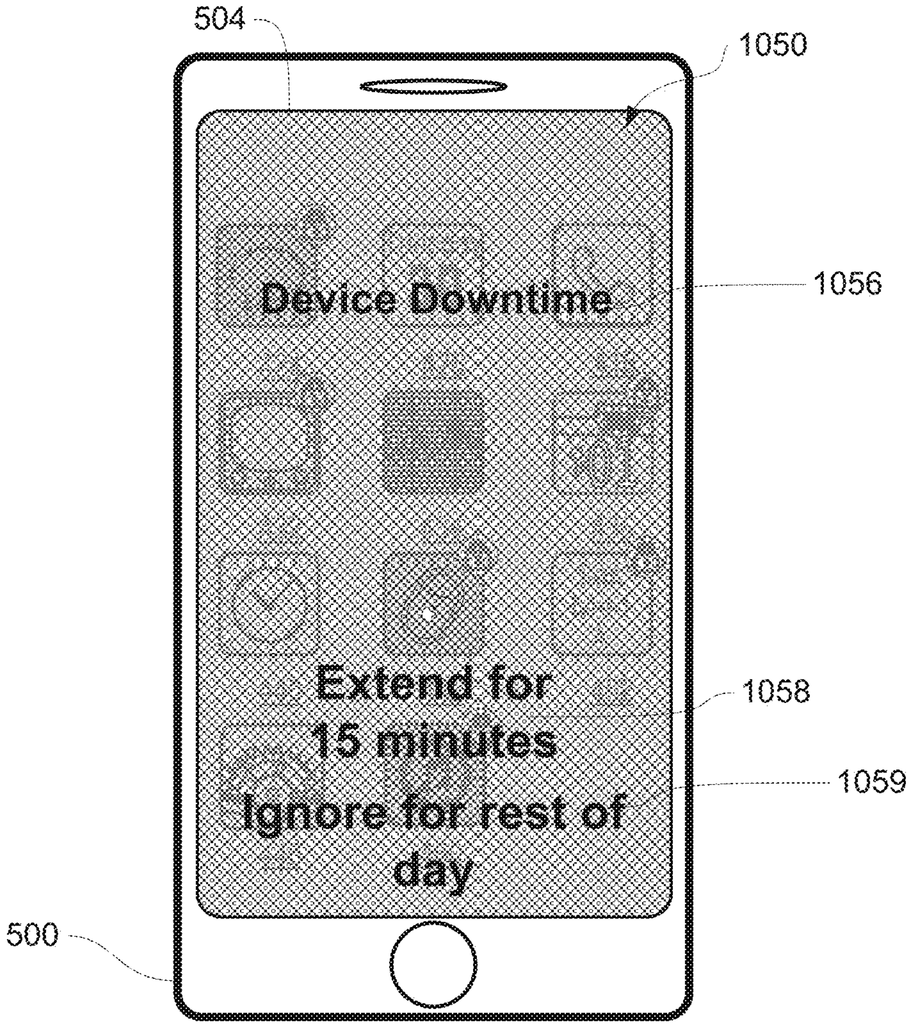
Figure 10K:
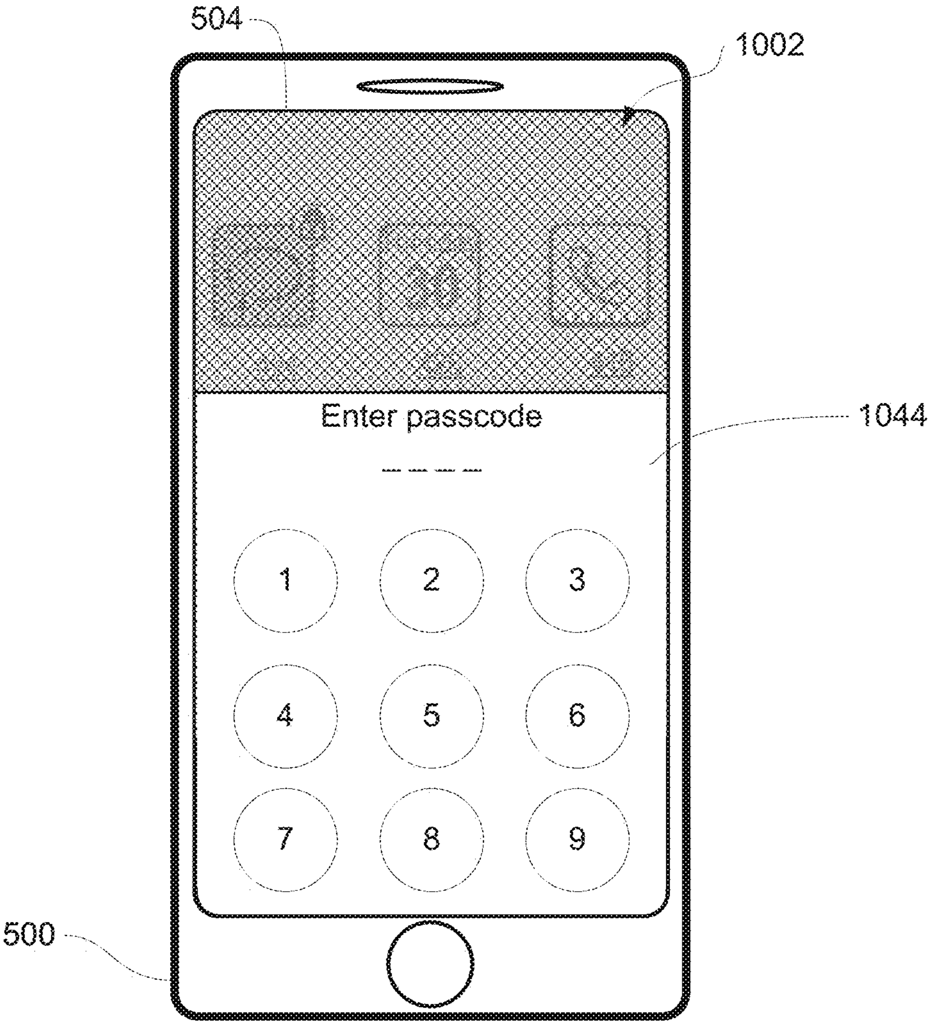
Figure 10L:
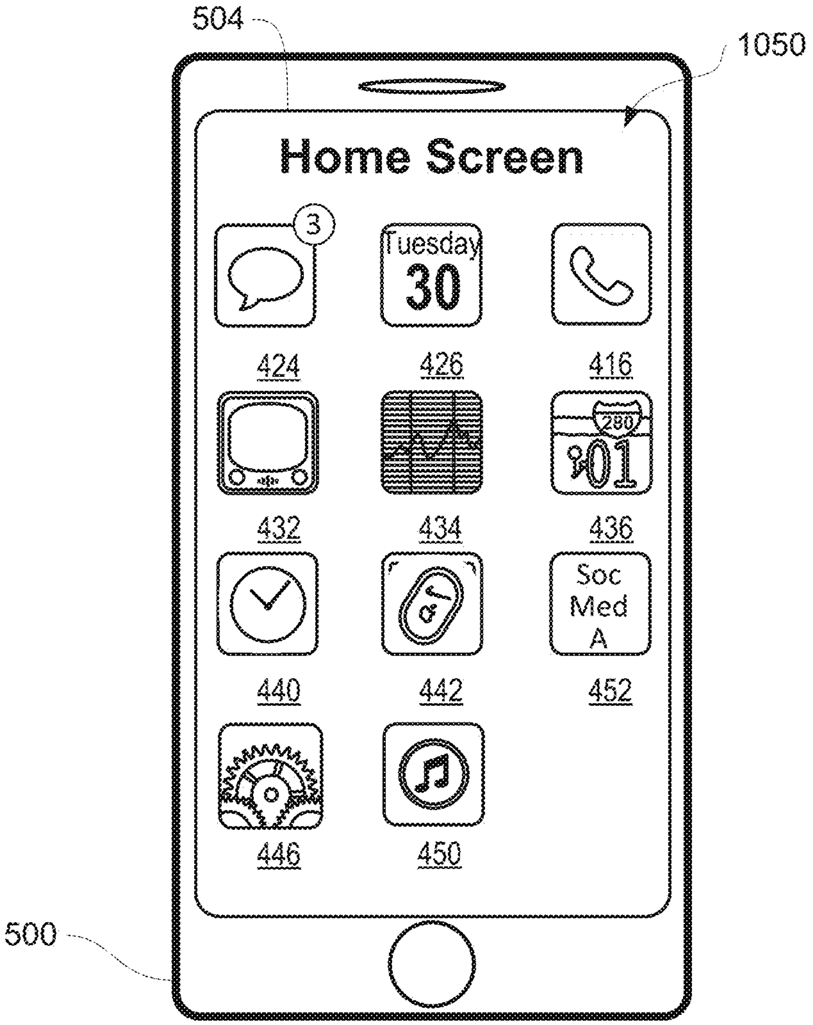
Figure 10M:
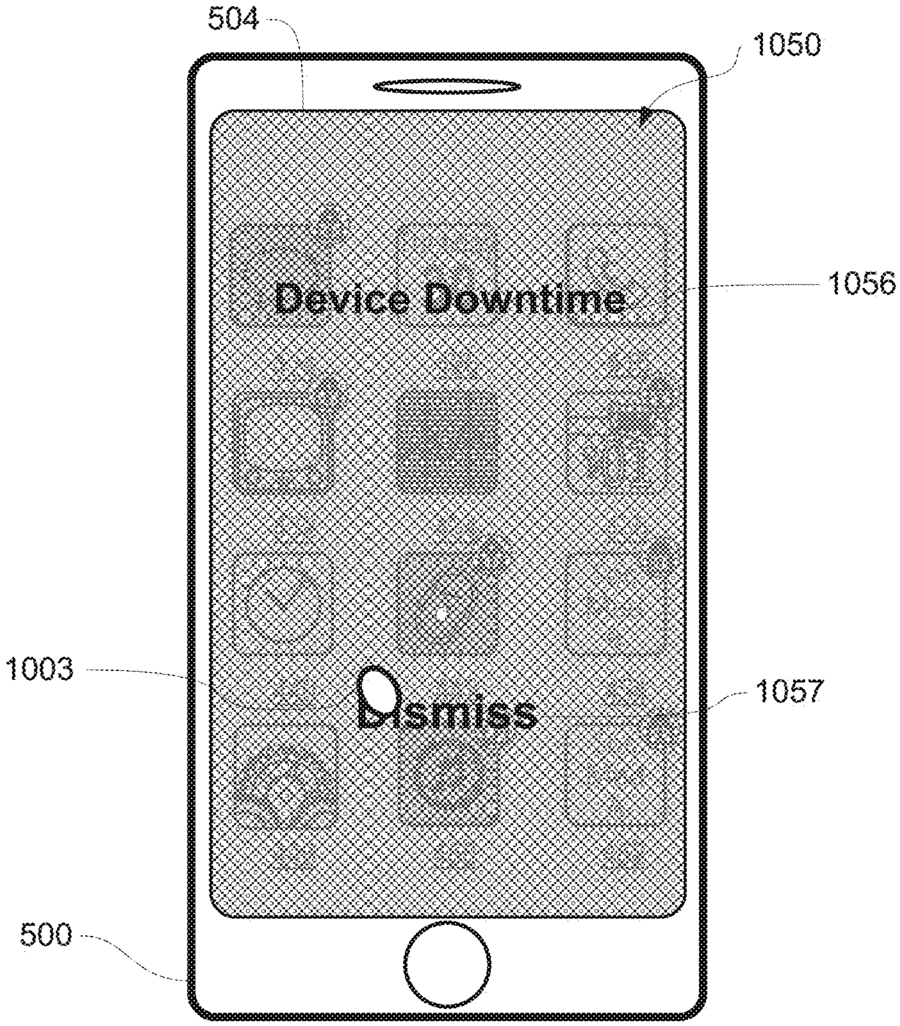
Figure 10N:
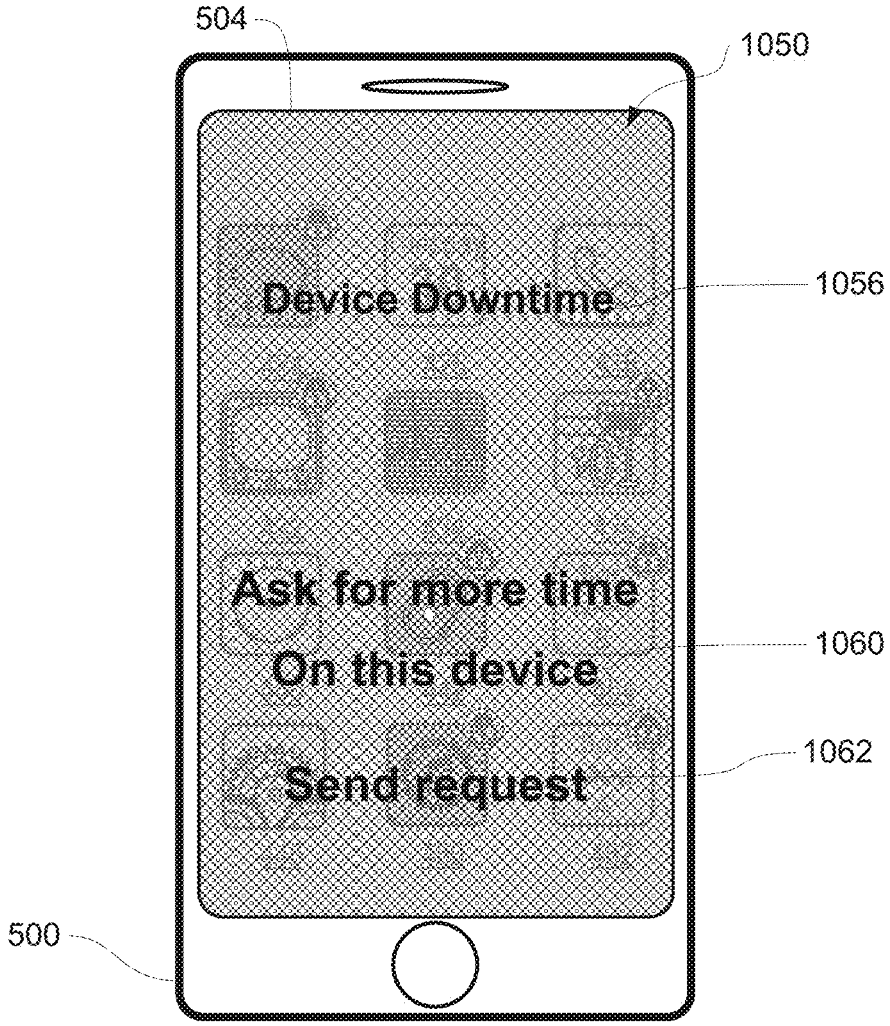
Figure 10O:
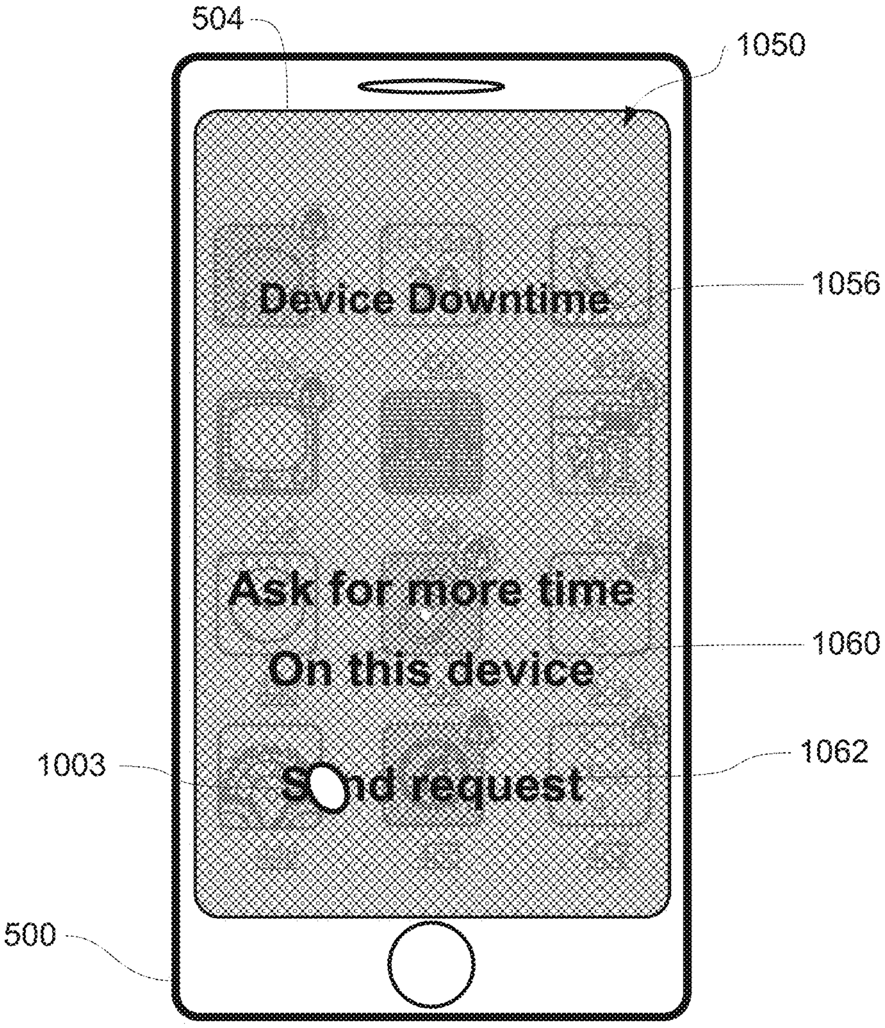
Figure 10P:
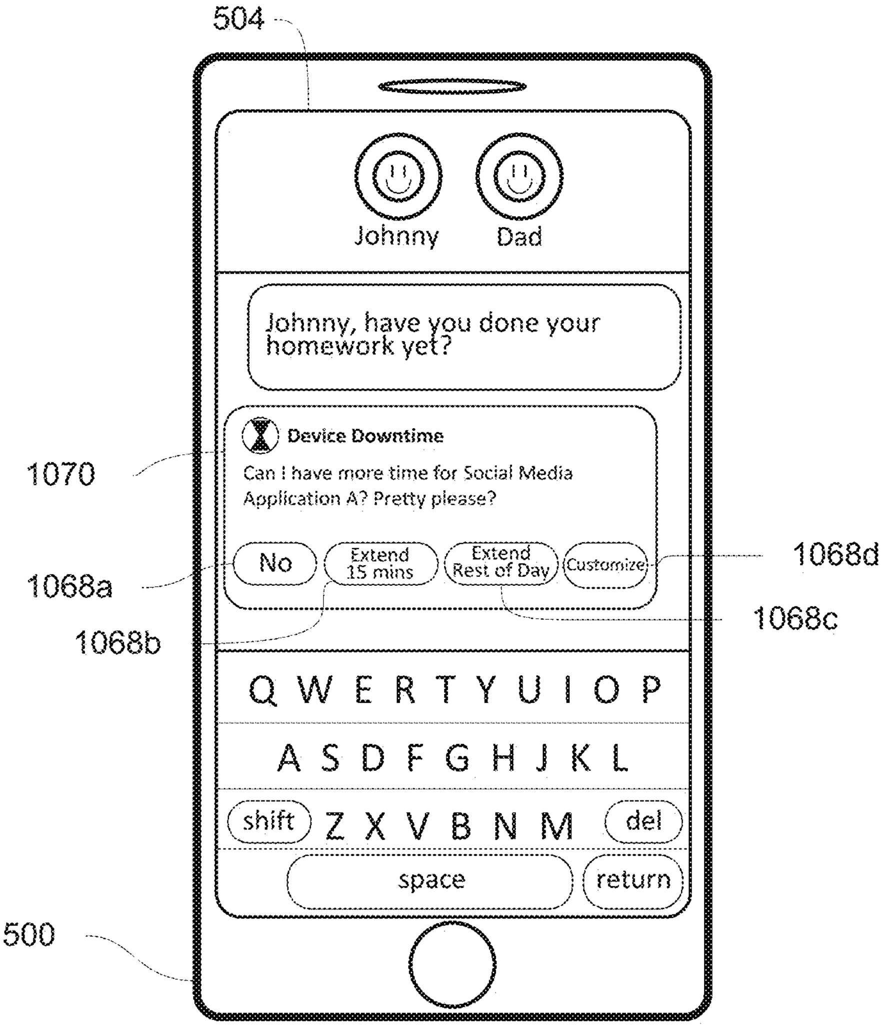
Figure 10Q:
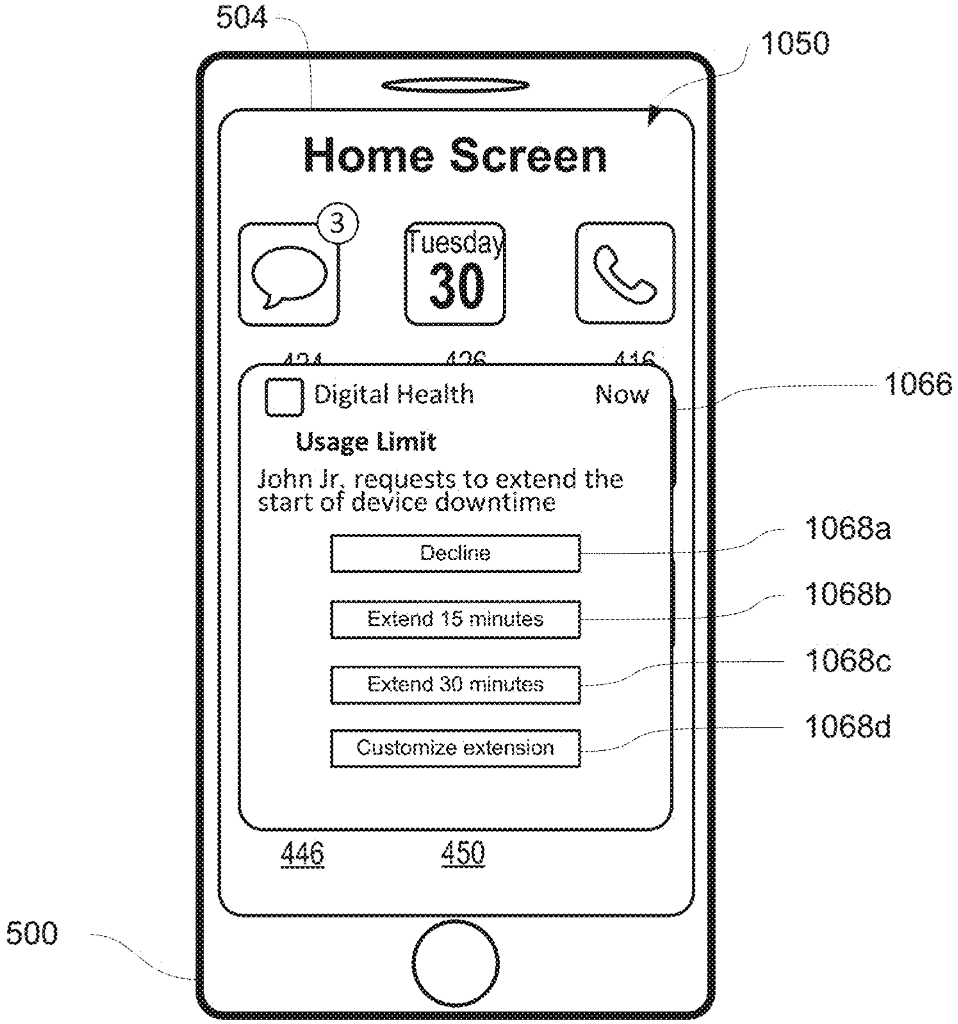
Figure 10R:
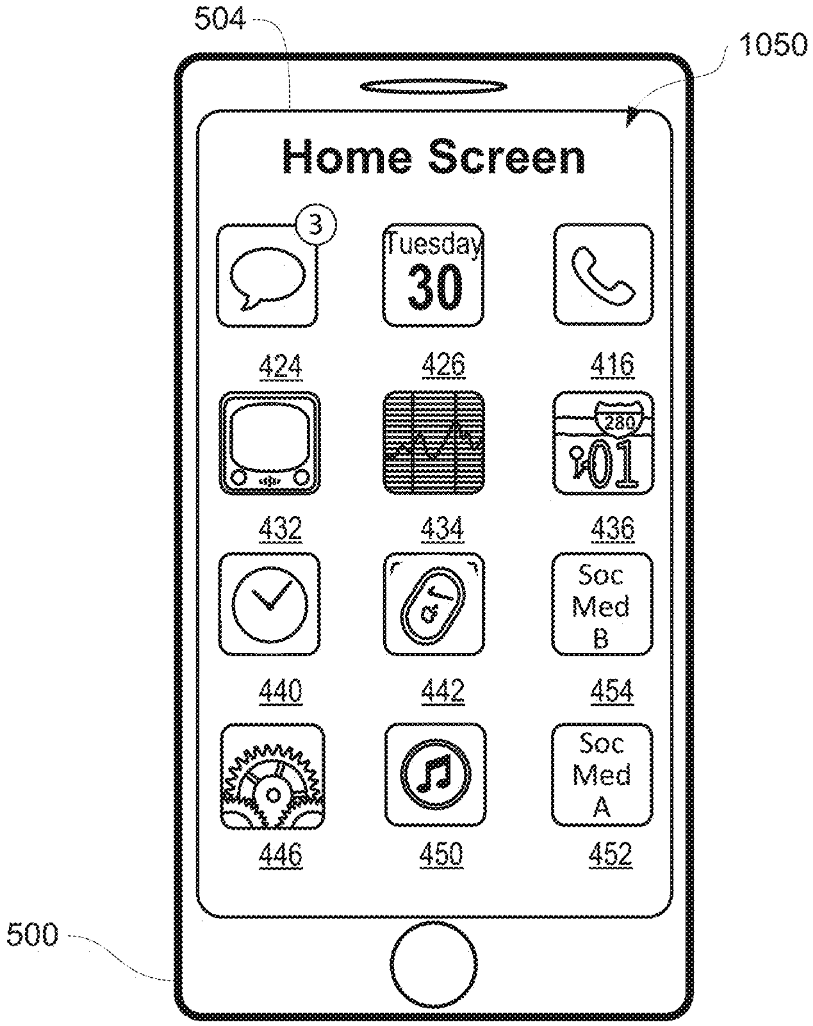
Figure 10S:
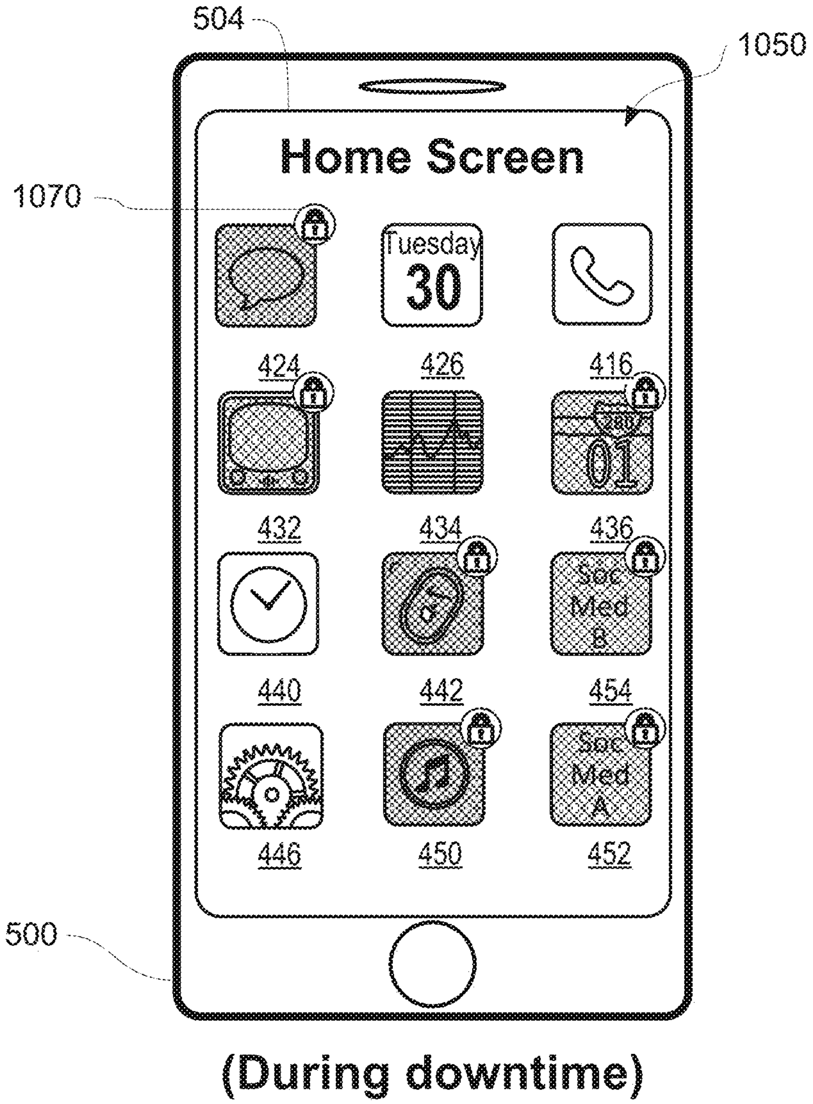
Figure 10T:
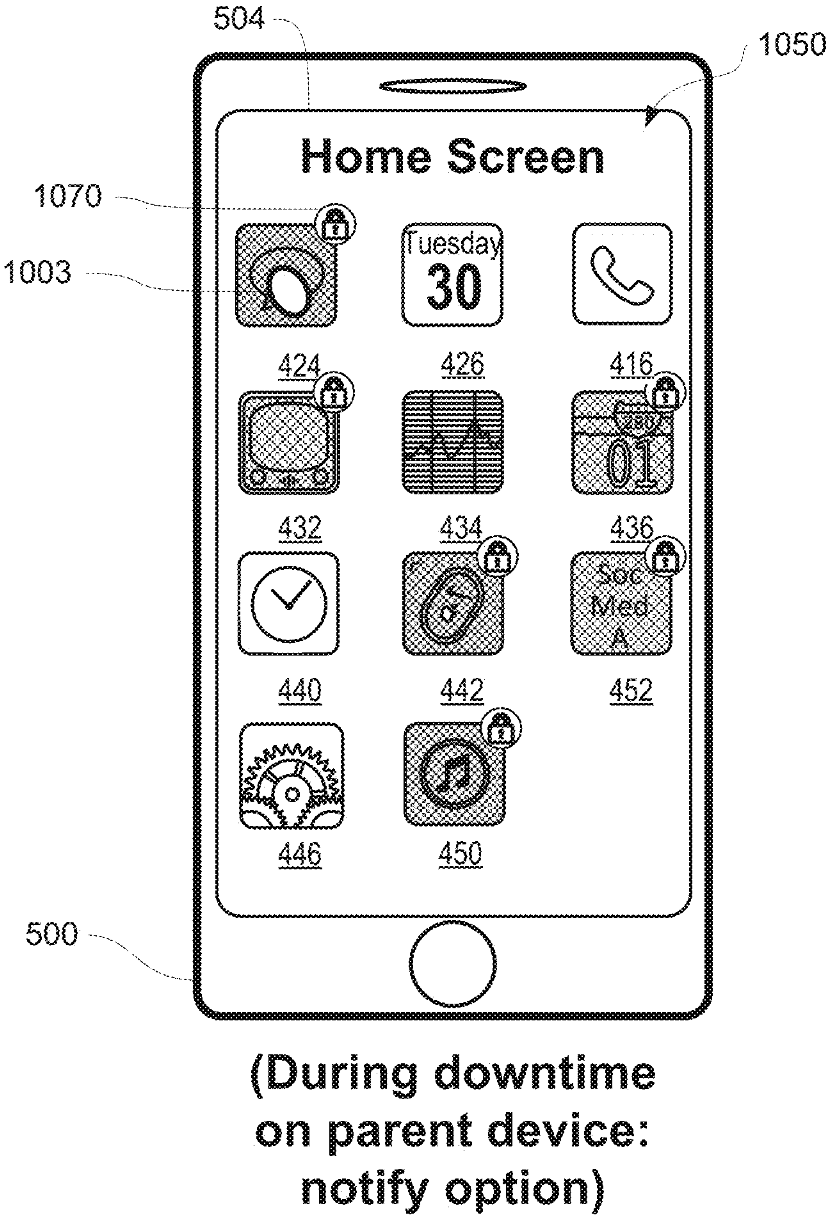
Figure 10U:
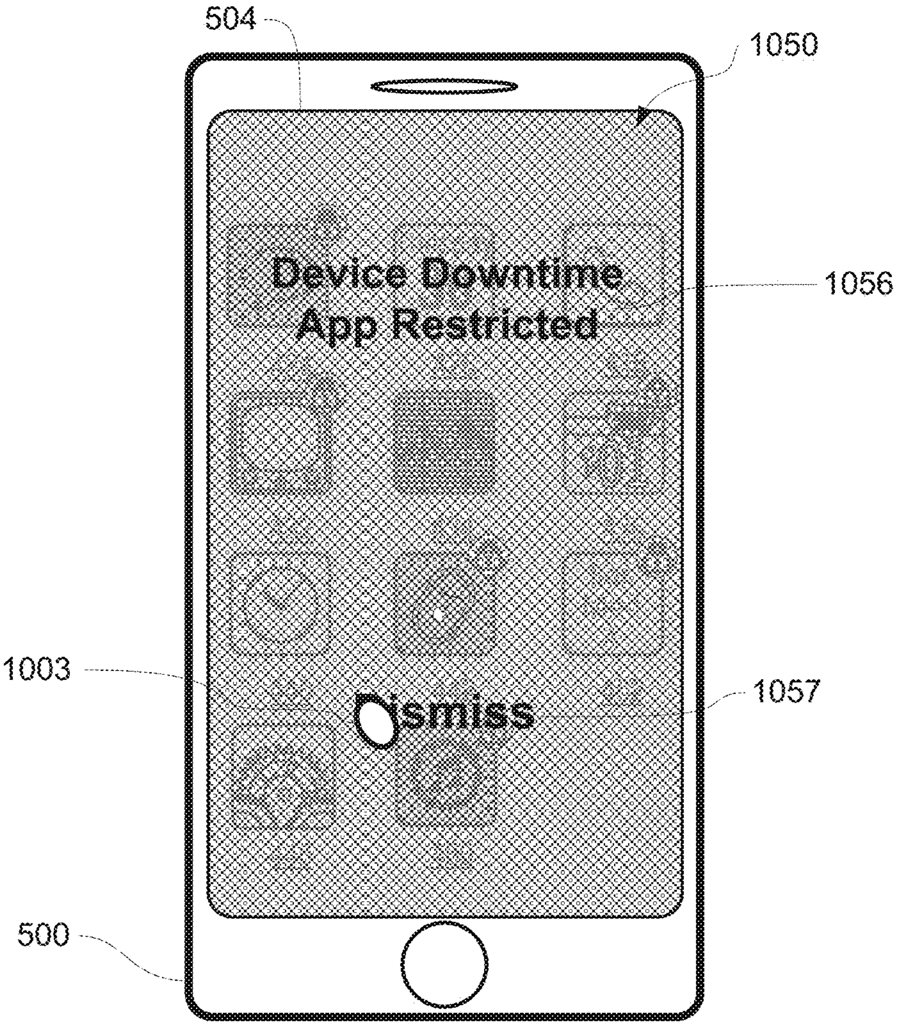
Figure 10V:
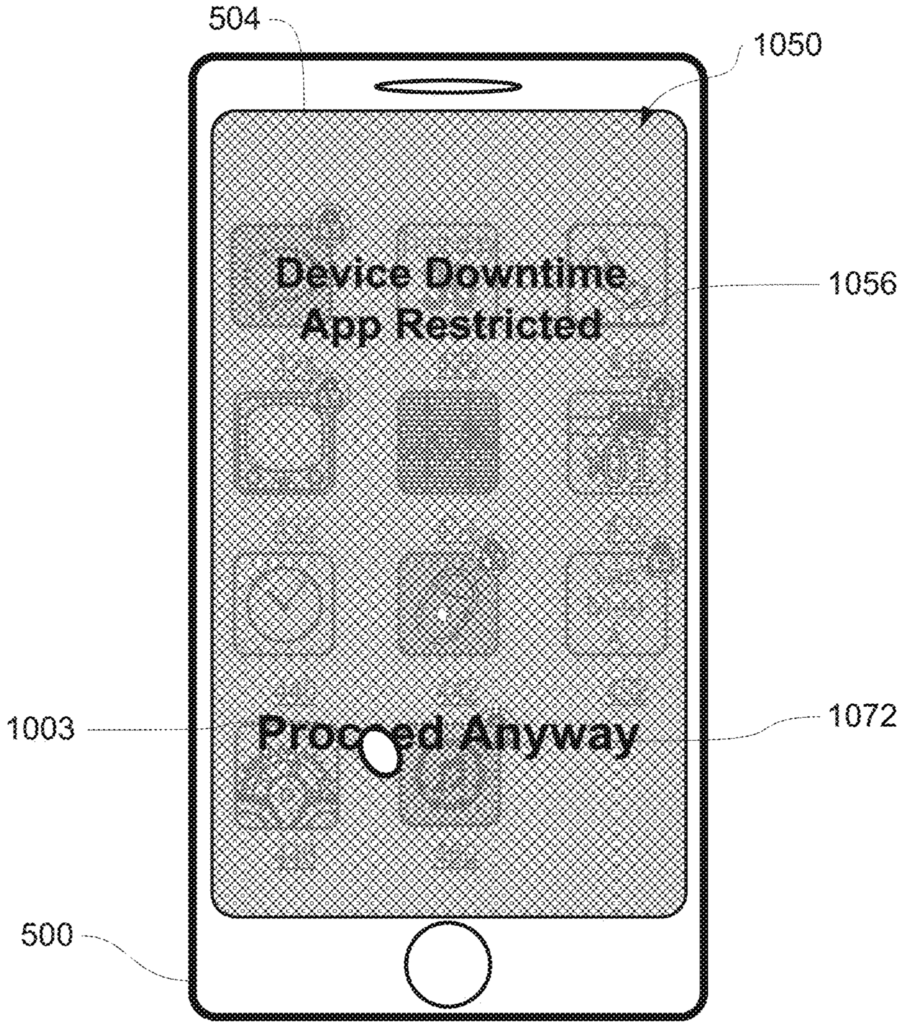
Figure 10W:
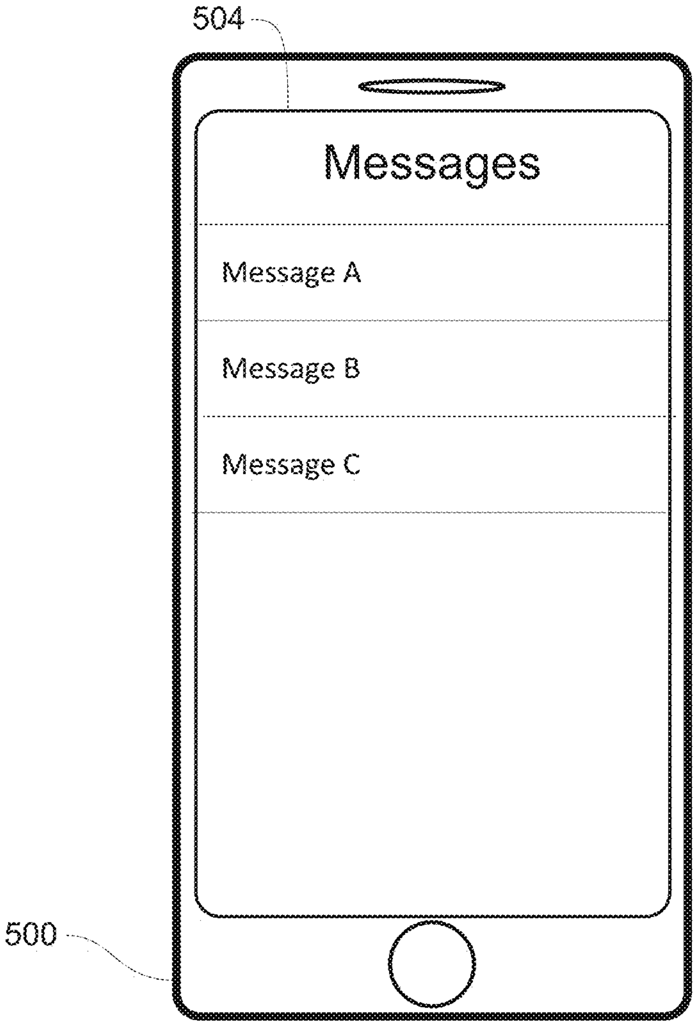
Figure 10X:
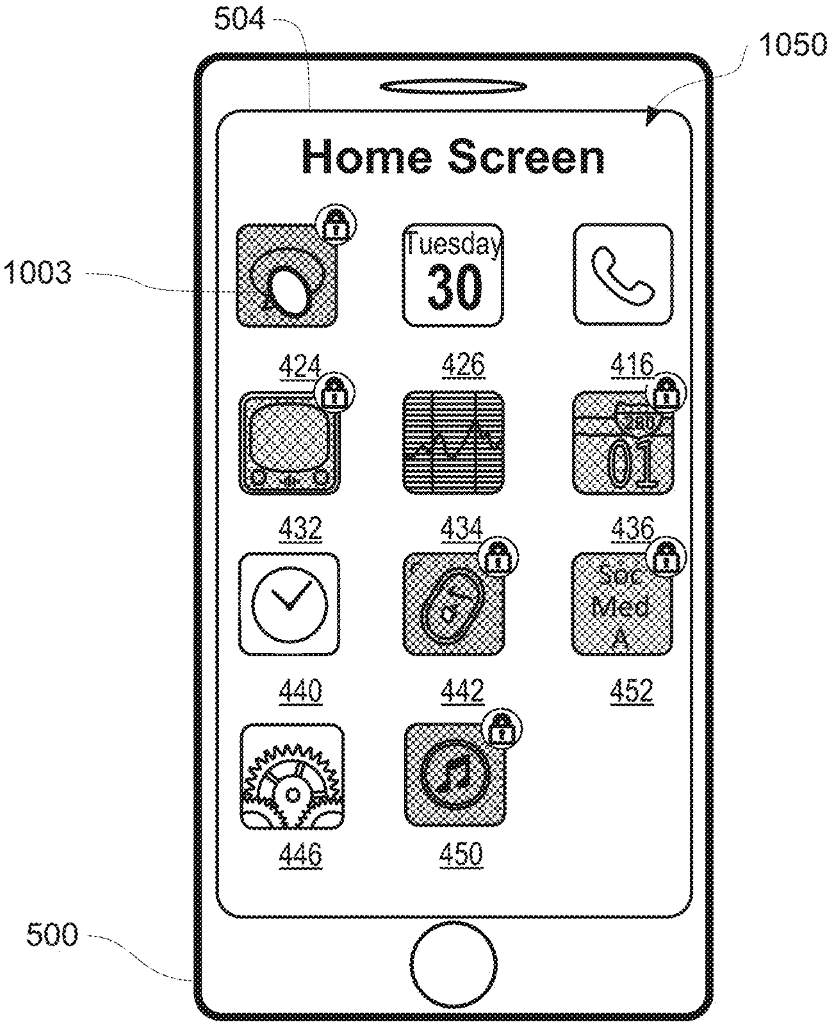
Figure 10Y:
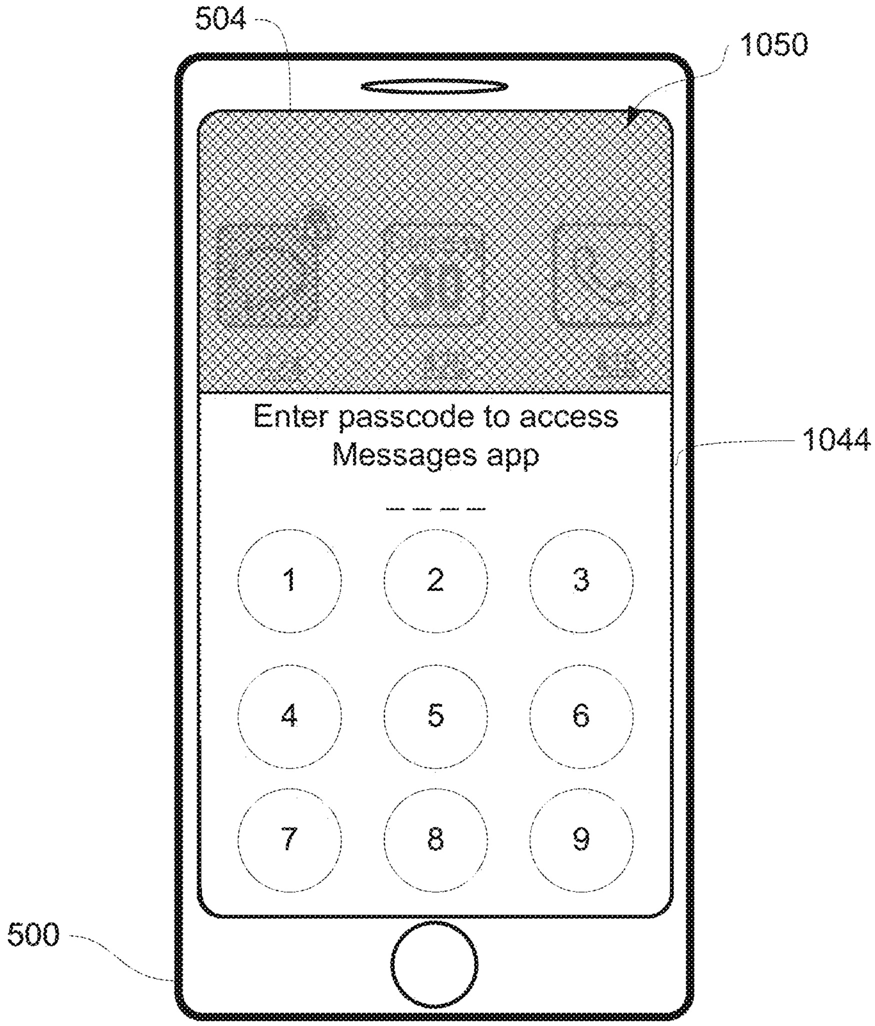
Figure 10Z:
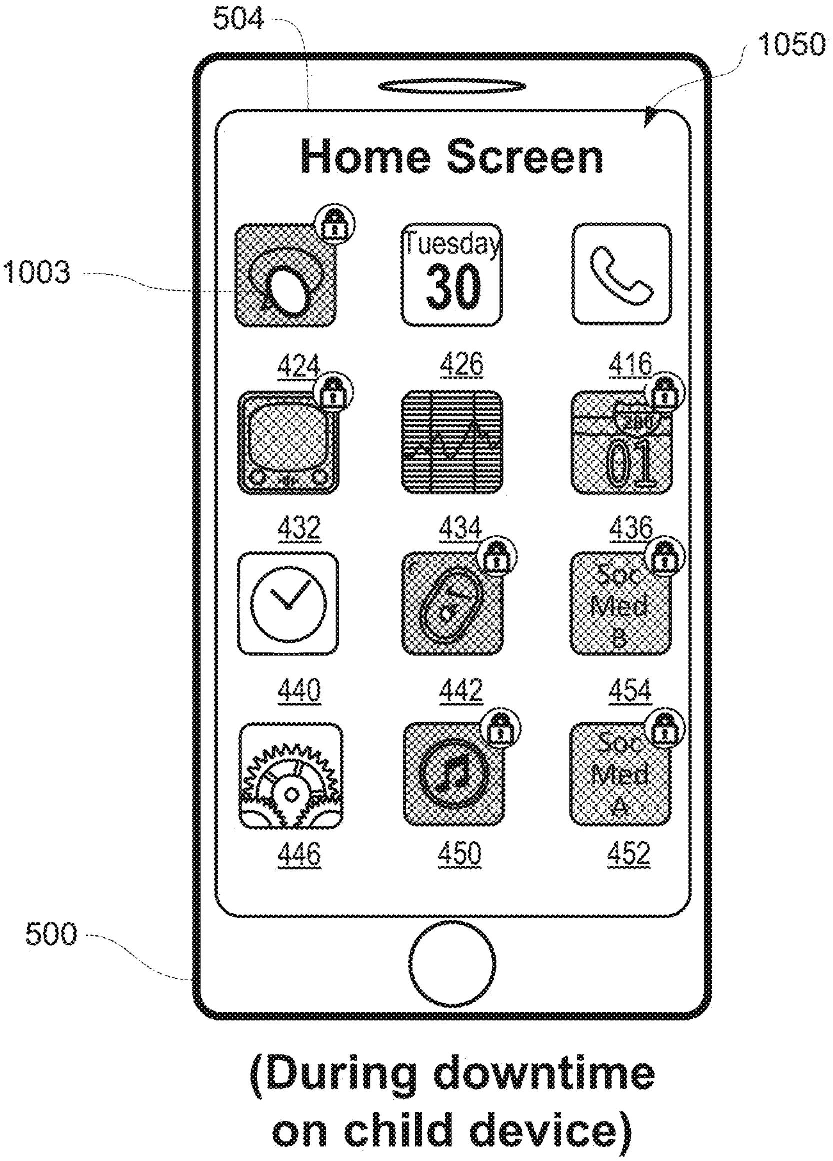
Figure 11A:
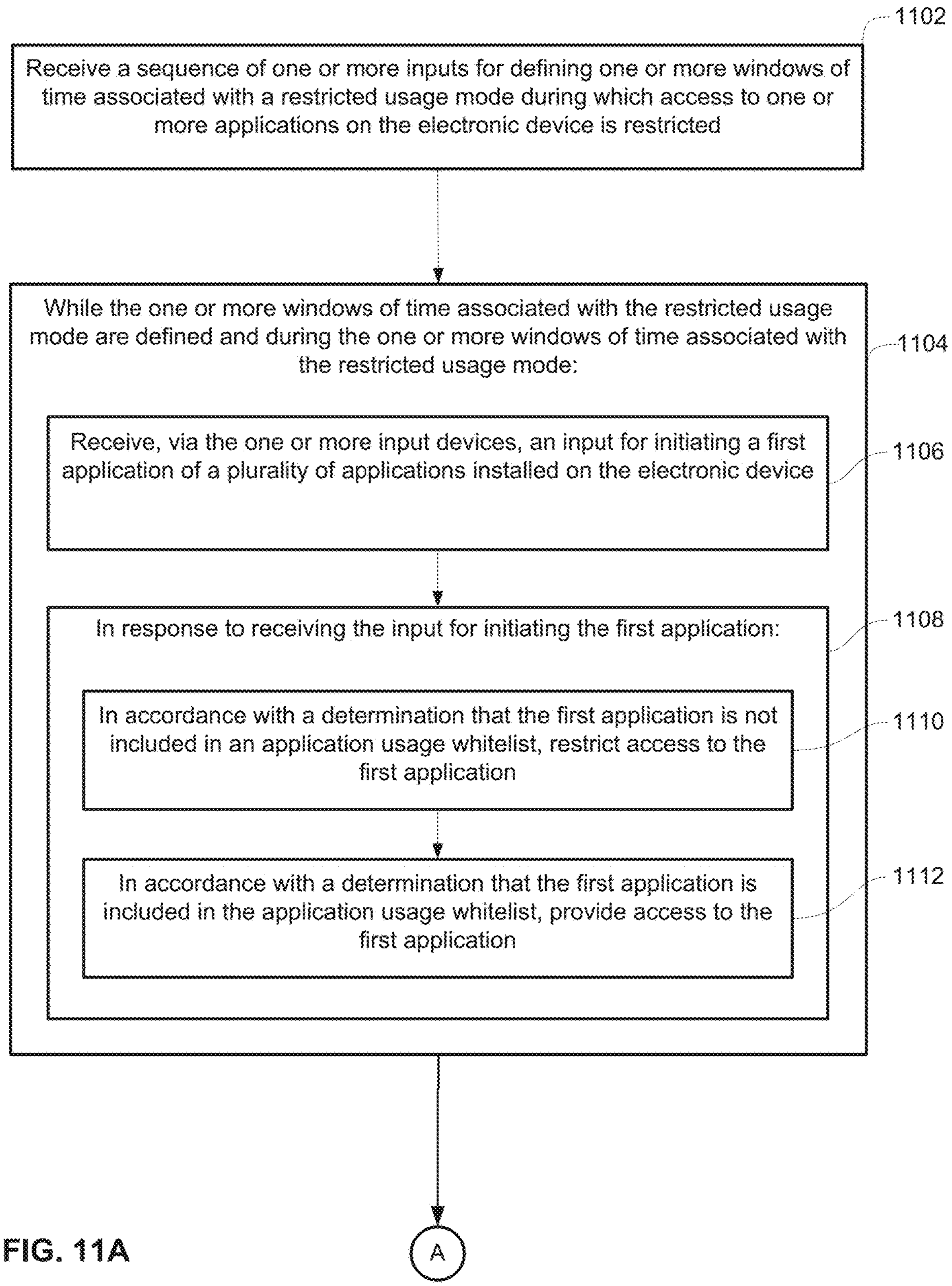
FIGS. 11A-11I are flow diagrams illustrating a method of limiting access to certain applications during certain periods of time in accordance with some embodiments of the disclosure.
Figure 11B:
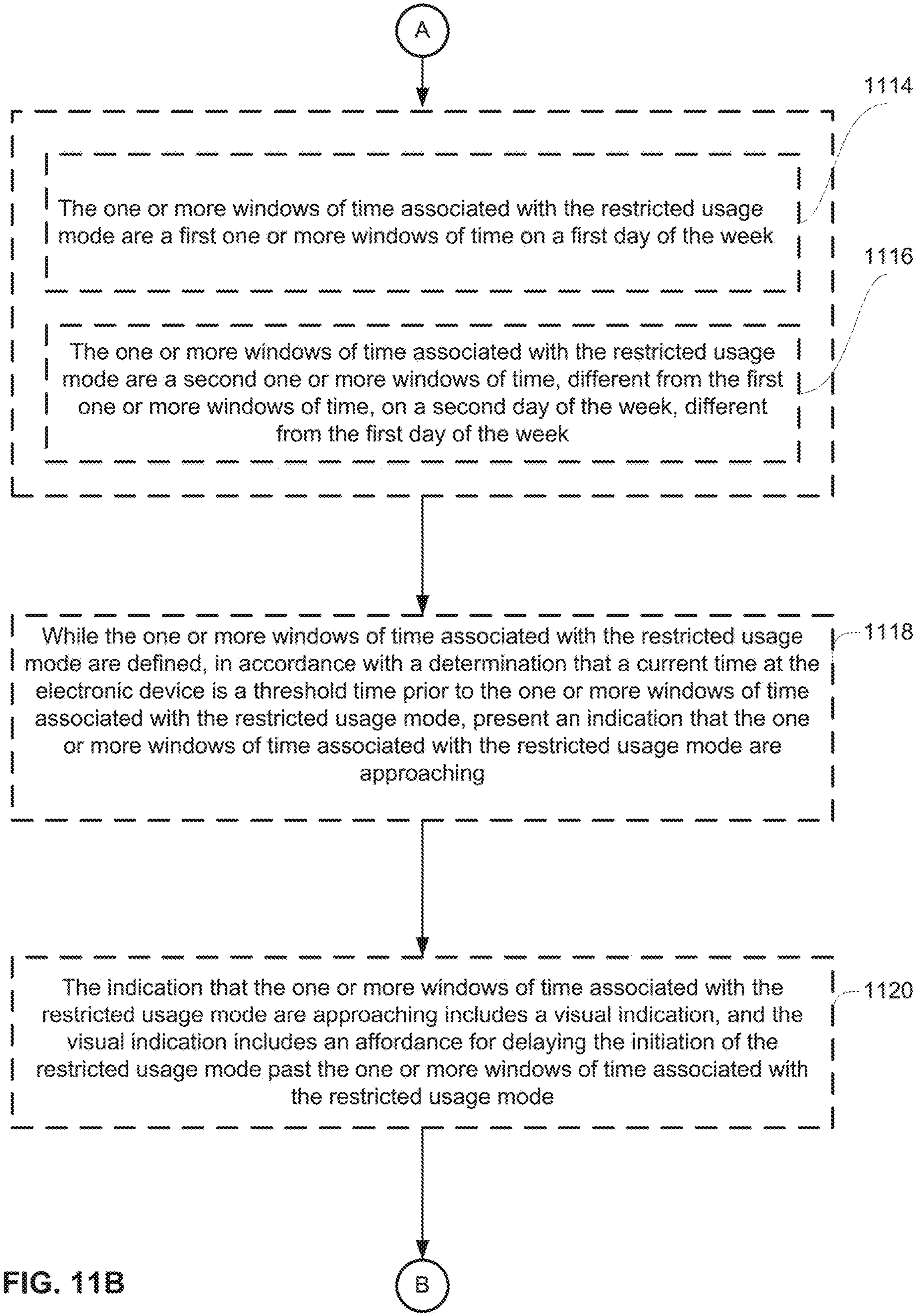
Figure 11C:
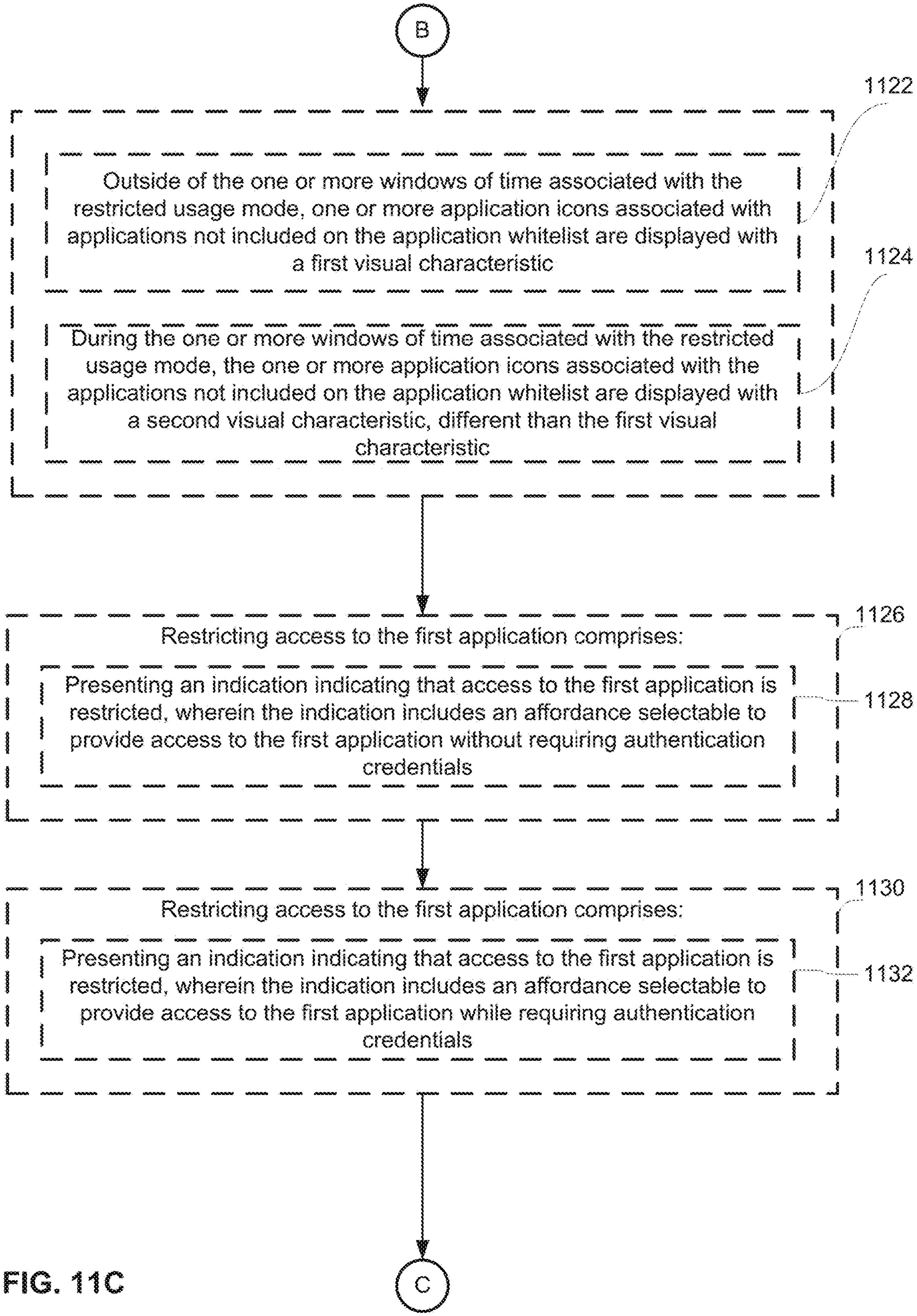
Figure 11D:
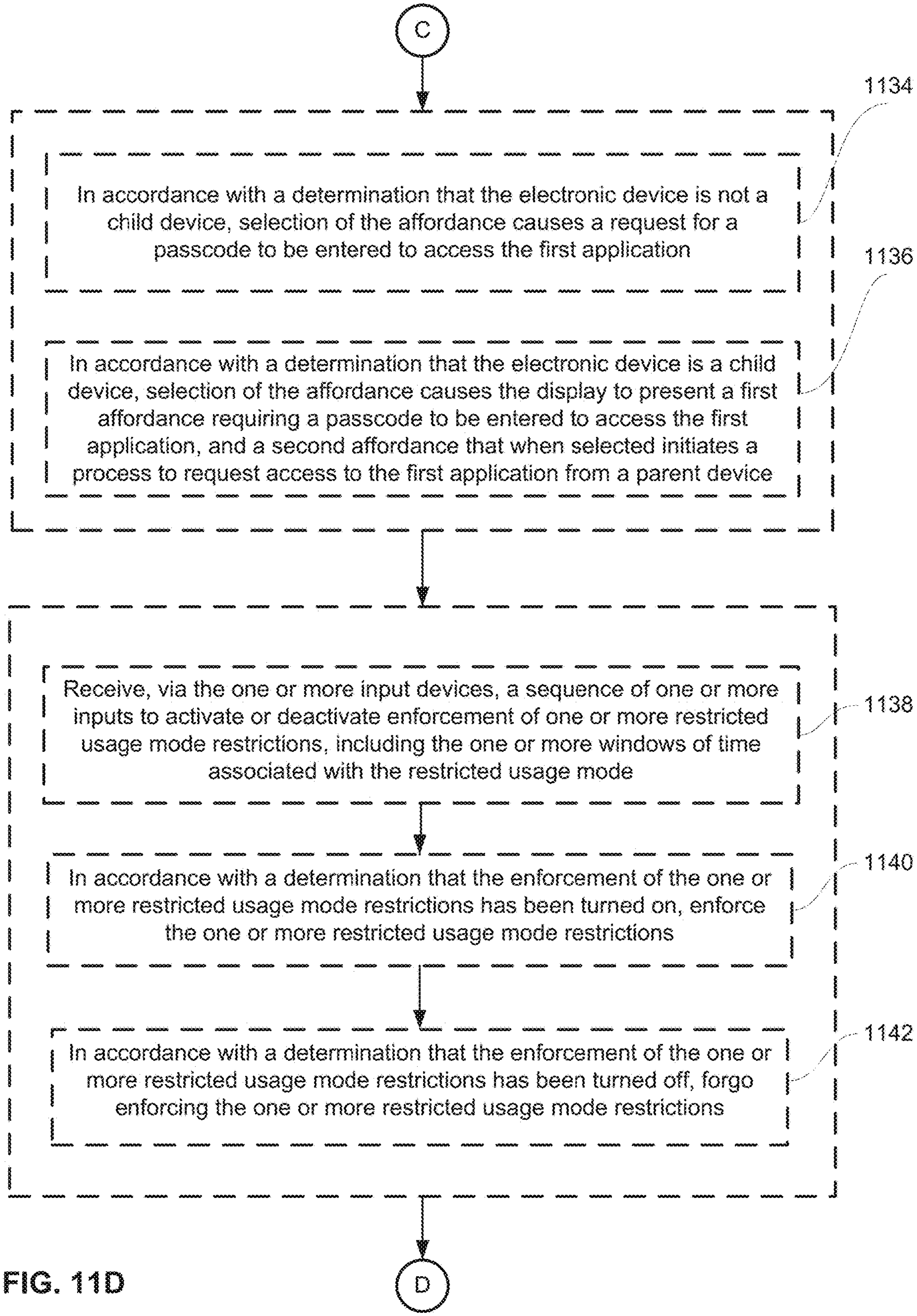
Figure 11E:
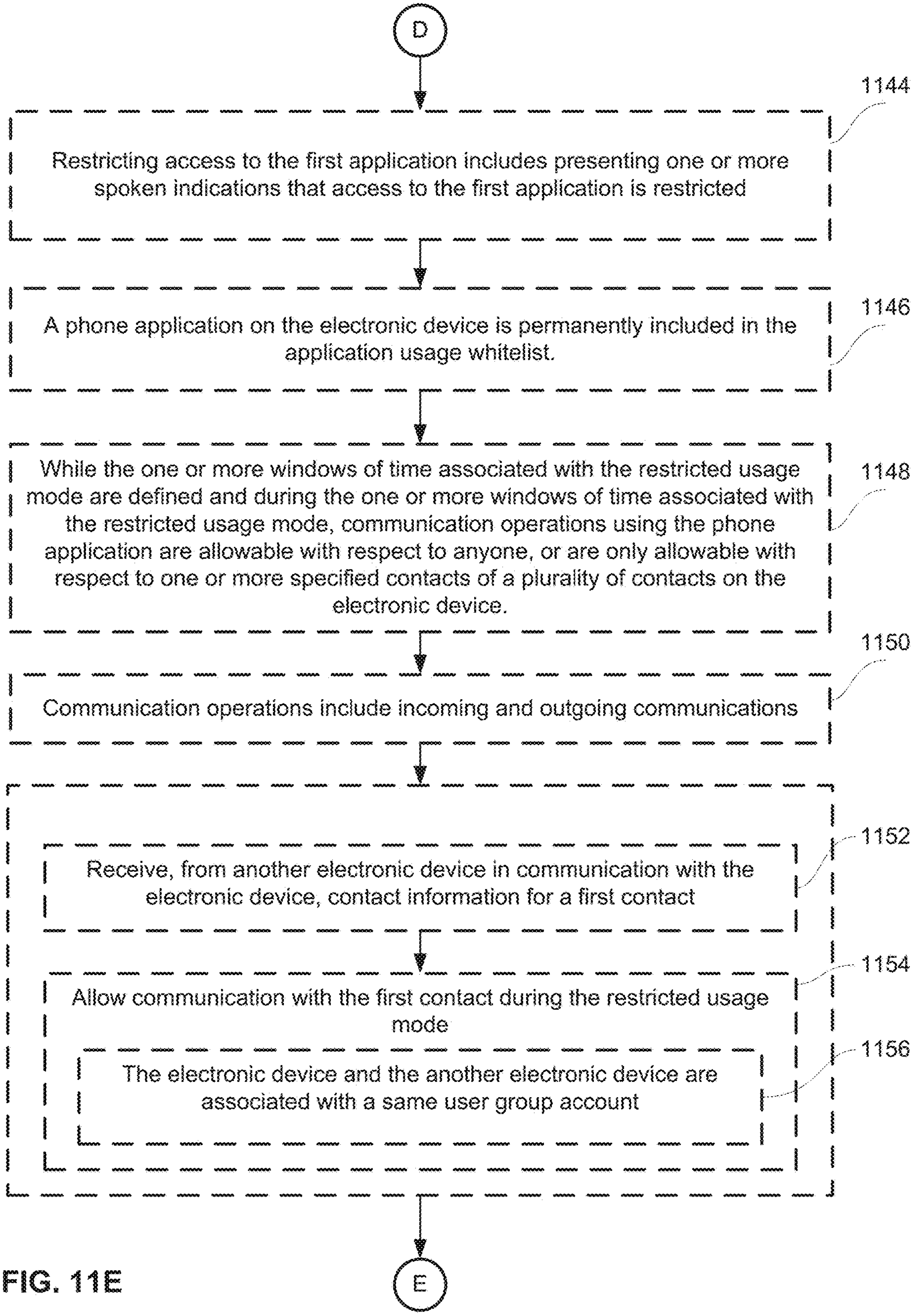
Figure 11F:
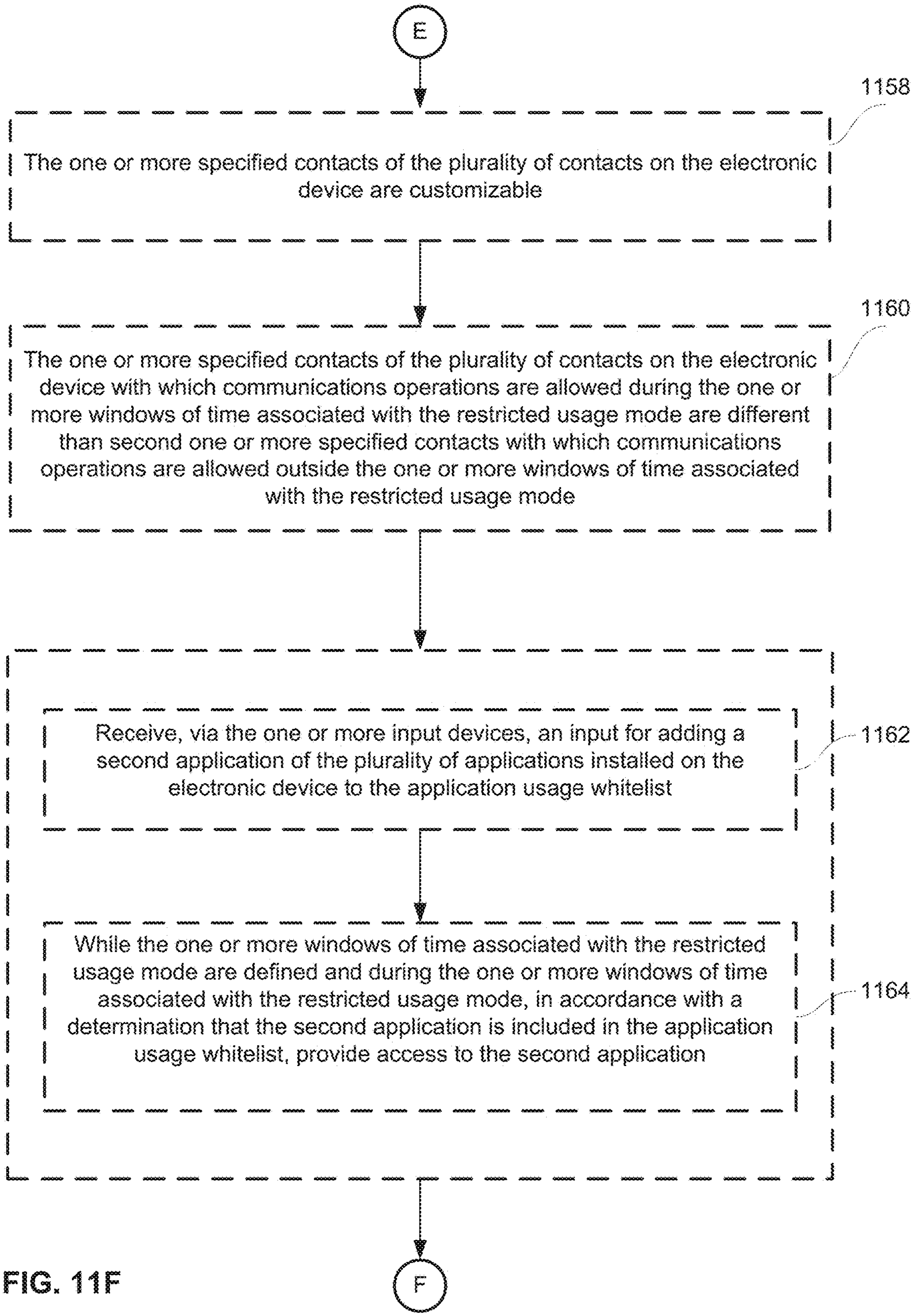
Figure 11G:
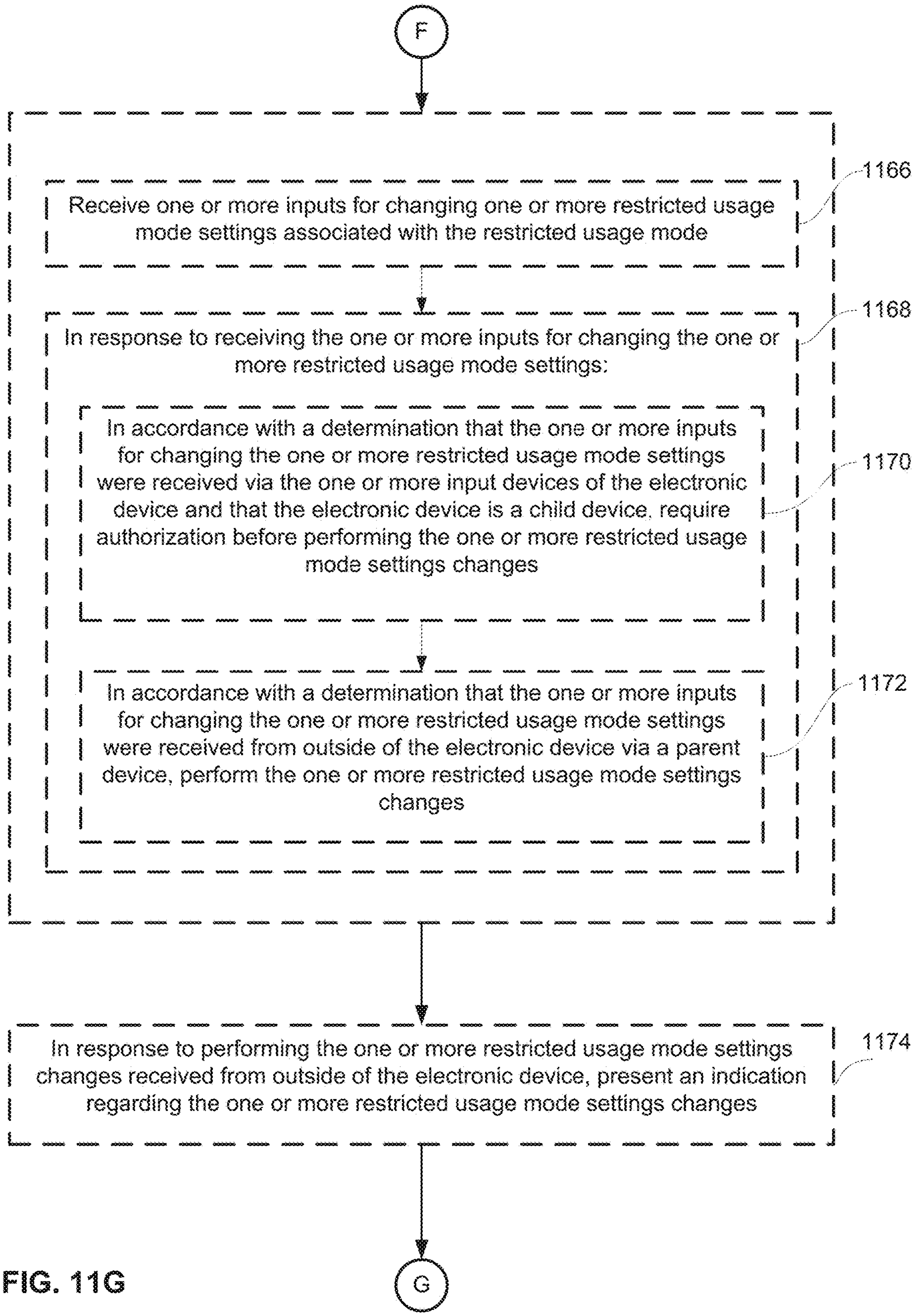
Figure 11H:
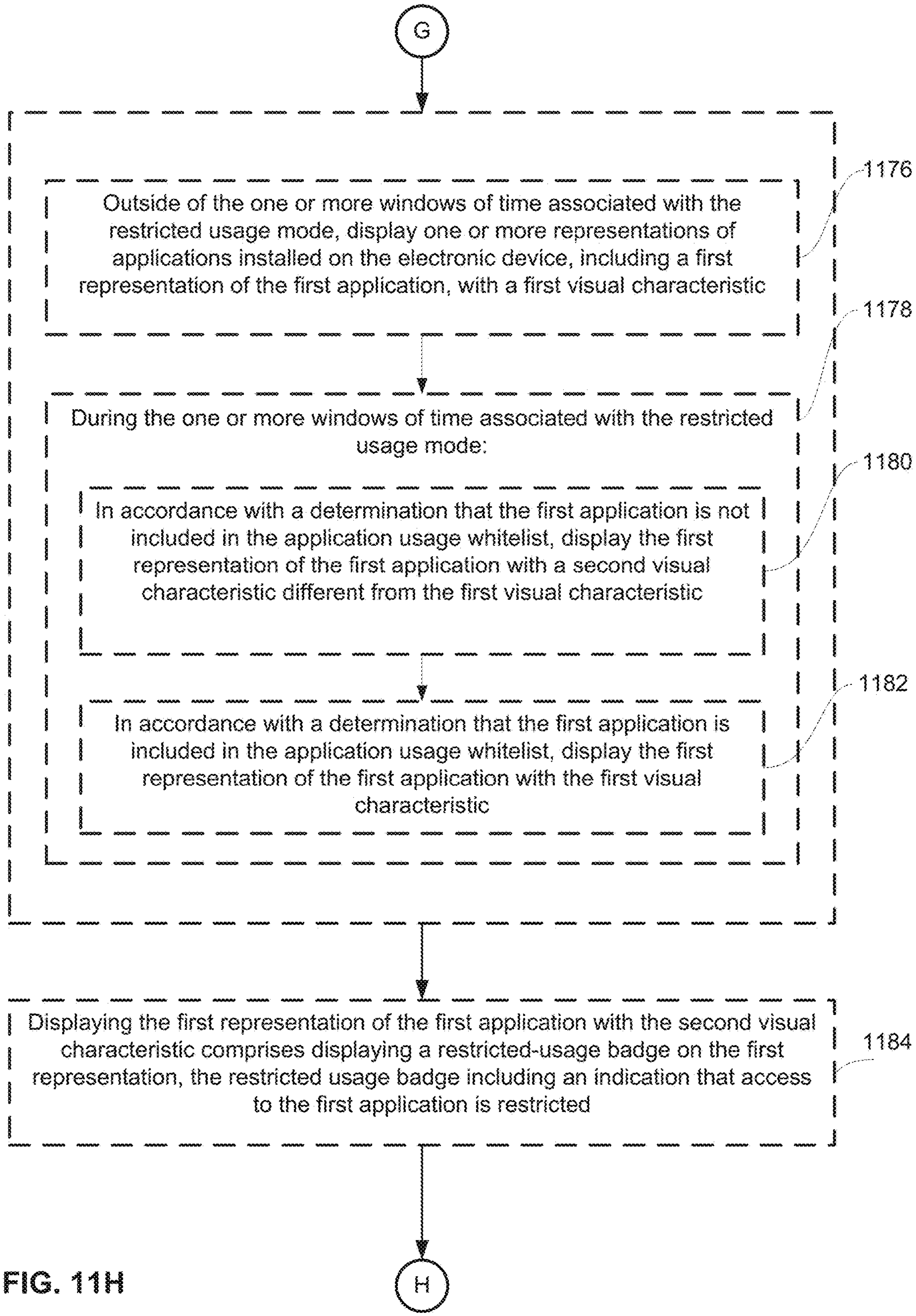
Figure 11I:
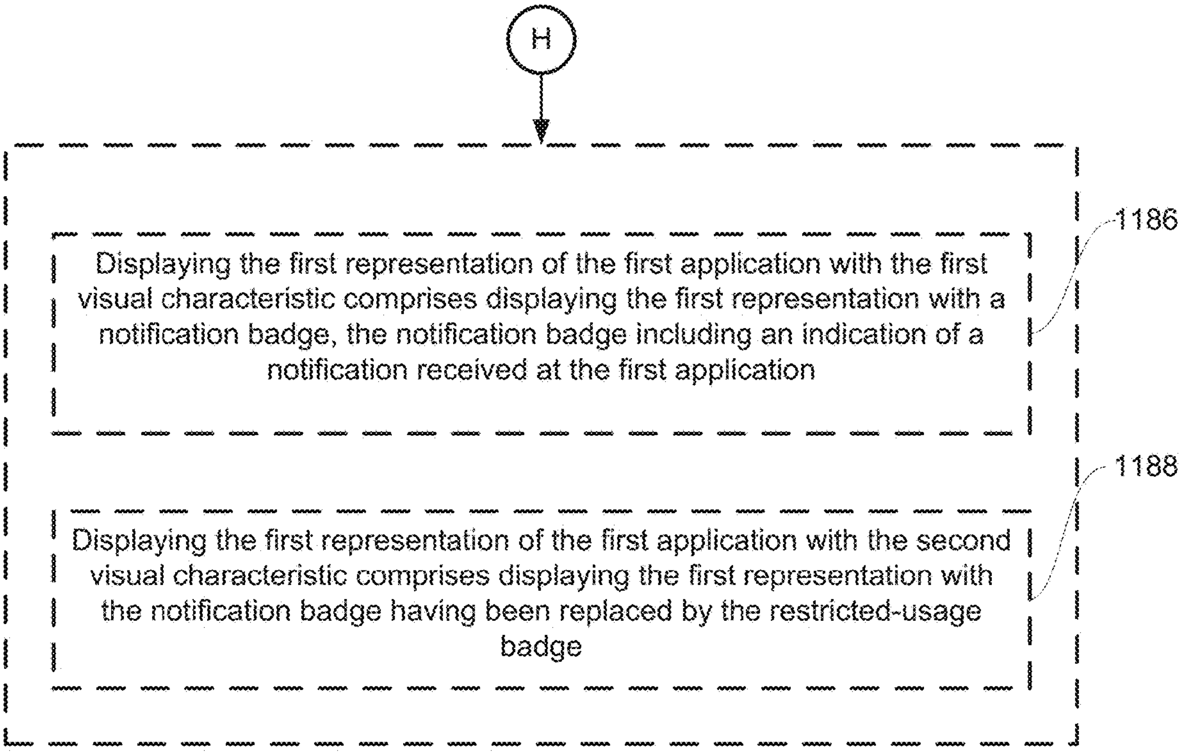

In some embodiments, for device 500 (e.g., parent device) to make changes to the restriction settings associated with child account 1049*c* on child restrictions settings graphical user interface 1002, the parent is required to enter a passcode (or provide other restriction setting authentication, such as facial recognition). For example, in FIG. 10Z, selection of always allowed affordance 1006 is detected (e.g., by a tap of contact 1003 detected on always allowed affordance 1006, as shown in FIG. 10Z). In response to selection of always allowed affordance 1006, device 500 displays passcode graphical user interface 1044 requiring the user to enter a passcode before being allowed to make changes to any restriction settings associated with the child account, as shown in FIG. 10AA. In some embodiments, passcode graphical user interface 1044 is not displayed by device 500 until a device restriction setting is changed by the user, as described above with reference to FIGS. 10C-10S (e.g., a user of a parent device is able to view restriction settings for a child device, including device downtime and always allowed settings, without having to enter a passcode). In some embodiments, the passcode required at FIG. 10AA is different than a passcode to logon to or unlock device 500 or the child device (e.g., is a passcode unique to restriction settings). In some embodiments, biometrics are optionally entered instead of a passcode to make changes to the restriction settings (e.g., as described in process 1100 below).

FIG. 10BB illustrates a child device 500 displaying home screen 1050 at a time before changes to its restriction settings are changed remotely (e.g., by a parent device as described above with reference to FIGS. 10W-10AA). FIG. 10CC illustrates child device 500 displaying home screen 1050 at a time after changes to restriction settings are changed remotely (e.g., by a parent device as described above with reference to FIGS. 10A-10S and 10W-10BB). In some embodiments, device 500 generates notification 1052 to indicate to the user of the child device that its device downtime restrictions have been changed remotely, as illustrated in FIG. 10CC. For example, notification 1052 in FIG. 10CC shows that a new contact was added to device 500's daytime allowed contacts list and that the start time of the restricted usage mode was changed by a parent associated with the family account (e.g., by Mom as described above with reference to FIGS. 10A-10Q).

FIG. 10DD illustrates device 500 displaying home screen 1050 at a time before the start time of the restricted usage mode. In FIG. 10DD, home screen 1050 includes icons 424, 426, 416, 432, 434, 436, 440, 442, 454, 446, 450, and 452 for launching or otherwise displaying different applications on device 500, as described above with reference to FIG. 4A. Because the device is not in the restricted usage mode (and because no individual or category usage limits, as described with reference to method 900 are set or reached), the user is able to launch any application associated with icons 424, 426, 416, 432, 434, 436, 440, 442, 454, 446, 450, and 452 without restrictions.

In some embodiments, device 500 will display a warning before the device enters the restricted usage mode. For example, as shown in FIG. 10EE, device 500 is displaying notification 1054 indicating that a device downtime (e.g., a restricted usage mode) will begin in 30 minutes. In some embodiments, notification 1054 will include a selectable affordance 1055 to dismiss notification 1054, which, when selected by the user, causes notification 1054 to disappear. In some embodiments, notification 1054 will automatically disappear (e.g., close without user input) after a period of time (e.g., 5 seconds, 10 seconds, 20 seconds).

FIG. 10FF illustrates device 500 displaying home screen 1050 at the start of the restricted usage mode under the "notify" option of the device downtime settings (e.g., as described above with reference to FIGS. 8LL-8PP and 10D). In some embodiments, device 500 can be a parent device (e.g., a device associated with a parent on a family account) or a standalone device (e.g., a device not associated with any family account). Device 500 optionally visually obscures home screen 1050 (e.g., blurring, greying out, or visually altering the home screen) at the start of the restricted usage mode, as displayed in FIG. 10FF. In some embodiments, device 500 is displaying a graphical user interface other than home screen 1050 (e.g., an application graphical user interface, notification history graphical user interface, etc.) at the start of the restricted usage mode, and device 500 visually obscures that graphical user interface (e.g., blurring, greying out, or visually altering that graphical user interface) at the start of the restricted usage mode. In some embodiments, device 500 displays explanation 1056 indicating that the restricted usage mode has begun and a dismiss affordance 1057. For example, in FIG. 10FF, selection of dismiss affordance 1057 is detected (e.g., by a tap of contact 1003 detected on dismiss affordance 1057, as shown in FIG. 10FF). In response to selection of dismiss affordance 1057, device 500 ceases to display dismiss affordance 1057, displays extend affordance 1058, and ignore affordance 1059 as shown in FIG. 10GG. In some embodiments, the user selecting extend affordance 1058 allows the user to delay the start of the restricted usage mode (without changing the actual time set for the restricted usage mode, such that the restricted usage mode will continue to be triggered at the previously-defined time on future days) for a predefined or user-defined amount of time to extend the start of the restricted usage mode (e.g., 5 minutes, 15 minutes, 30 minutes) (e.g., as described below with reference to method 1100). In some embodiments, the user selecting ignore affordance 1059 allows the user to forgo the start of the restricted usage mode for that particular day (without changing the actual time set for the restricted usage mode, such that the restricted usage mode will continue to be triggered at the previously-defined time on future days) (e.g., as described below with reference to method 1100). In some embodiments, device 500 ceases to display extend affordance 1058 and ignore affordance 1059 after a period of time (e.g., 5 seconds, 10 seconds, 20 seconds) or when the user taps on any part of the home screen 1050 (other than explanation 1056, extend affordance 1058, and ignore affordance 1059). Under the "notify option", a parent device (e.g., a device associated with a parent on a family account) or a standalone device (e.g., a device not associated with any family account) do not require the user to enter any authentication (e.g., a passcode) to extend or ignore the restricted usage mode on that device. For example, FIG. 10HH illustrates parent device 500 displaying home screen 1050 after the user either selected extend affordance 1058 or ignore affordance 1059 under the "notify option". Because device 500 in FIG. 10HH is not in the restricted usage mode (e.g., because it has been extended), the user is able to launch any application associated with icons 424, 426, 416, 432, 434, 436, 440, 442, 452, 446, and 450 without restrictions. Extending or ignoring the start of the restricted usage mode optionally enables any application to be launched or any application functionality to be performed that might have otherwise been restricted (e.g., access widgets or websites associated with those apps, receive notifications, suggest those apps to the user, etc.).

FIG. 10II illustrates device 500 displaying home screen 1050 at the start of the restricted usage mode under the "notify and block" option of the device downtime settings (e.g., as described above with reference to FIGS. 8QQ-8GGG and 10D). In some embodiments, device 500 can be a parent device (e.g., a device associated with a parent on a family account) or a standalone device (e.g., a device not associated with any family account). Device 500 optionally visually obscures home screen 1050 (e.g., blurring, greying out, or visually altering the home screen) at the start the restricted usage mode, as displayed in FIG. 10II. In some embodiments, device 500 is displaying a graphical user interface other than home screen 1050 (e.g., an application graphical user interface, notification history graphical user interface, etc.) at the start of the restricted usage mode, and device 500 visually obscures that graphical user interface (e.g., blurring, greying out, or visually altering that graphical user interface) at the start of the restricted usage mode. In some embodiments, device 500 displays explanation 1056 indicating that the restricted usage mode has begun and a dismiss affordance 1057. For example, in FIG. 10II, selection of dismiss affordance 1057 is detected (e.g., by a tap of contact 1003 detected on dismiss affordance 1057, as shown in FIG. 10II). In response to selection of dismiss affordance 1057, device 500 ceases to display dismiss affordance 1057, and displays extend affordance 1058 and ignore affordance 1059, as shown in FIG. 10JJ. In some embodiments, the user selecting extend affordance 1058 allows the user to delay the start of the restricted usage mode (without changing the actual time set for the restricted usage mode, such that the restricted usage mode will continue to be triggered at the previously-defined time on future days) for a predefined or user-defined amount of time to extend the start of the restricted usage mode (e.g., 5 minutes, 15 minutes, 30 minutes) (e.g., as described below with reference to method 1100). In some embodiments, the user selecting ignore affordance 1059 allows the user to forgo the start of the restricted usage mode for that particular day (without changing the actual time set for the restricted usage mode, such that the restricted usage mode will continue to be triggered at the previously-defined time on future days) (e.g., as described below with reference to method 1100). In some embodiments, device 500 ceases to display extend affordance 1058 and ignore affordance 1059 after a period of time (e.g., 5 seconds, 10 seconds, 20 seconds) or when the user taps on any part of the home screen 1050 (other than explanation 1056, extend affordance 1058, and ignore affordance 1059). Under the "notify and block option", a parent device (e.g., a device associated with a parent on a family account) or a standalone device (e.g., a device not associated with any family account) optionally require the user to enter authentication (e.g., a passcode) to extend or ignore the restricted usage mode on that device. For example, in response to selection of either extend affordance 1058 or the ignore affordance 1059 in FIG. 10JJ under the "notify and block option", device 500 displays passcode graphical user interface 1044 requiring the user to enter a passcode before the restricted usage mode can be extended or ignored, as shown in FIG. 10KK. In some embodiments, the passcode required at FIG. 10KK is different than a passcode to logon to or unlock device 500 (e.g., is a passcode unique to restriction settings). In some embodiments, biometrics are entered instead of a passcode to make changes to the restriction settings (e.g., as described in process 1100 below).

FIG. 10LL illustrates device 500 displaying home screen 1050 after the user entered a proper passcode in passcode graphical user interface 1044 of FIG. 10KK under the "notify and block option". Because device 500 in FIG. 10LL is not in the restricted usage mode (e.g., because it has been extended), the user is able to launch any application associated with icons 424, 426, 416, 432, 434, 436, 440, 442, 452, 446, and 450 without restrictions. Extending the start of the restricted usage mode optionally enables any application to be launched or any application functionality to be performed that might have otherwise been restricted (e.g., access widgets or websites associated with those apps, receive notifications, suggest those apps to the user, etc.).

FIG. 10MM illustrates child device 500 displaying home screen 1050 at the start of the restricted usage mode of the device downtime settings (e.g., as described above with reference to 10D). Child device 500 optionally visually obscures home screen 1050 (e.g., blurring, greying out, or visually altering the home screen) at the start the restricted usage mode, as displayed in FIG. 10MM. In some embodiments, child device 500 is displaying a graphical user interface other than home screen 1050 (e.g., an application graphical user interface, notification history graphical user interface, etc.) at the start of the restricted usage mode, and child device 500 visually obscures that graphical user interface (e.g., blurring, greying out, or visually altering that graphical user interface) at the start of the restricted usage mode. In some embodiments, device 500 displays explanation 1056 indicating that the restricted usage mode has begun and a dismiss affordance 1057. For example, in FIG. 10MM, selection of dismiss affordance 1057 is detected (e.g., by a tap of contact 1003 detected on dismiss affordance 1057, as shown in FIG. 10MM). In response to selection of dismiss affordance 1057, device 500 ceases to display dismiss affordance 1057 and displays selectable affordance 1060 to request more time before the restricted usage mode is enforced (e.g., extend the start time of the restricted usage mode) on device 500 and selectable affordance 1062 to request more time on another device (e.g., on a parent device) (e.g., as described above with reference to FIGS. 8TT-8CCC), as shown in FIG. 10NN. In some embodiments, selecting either affordance 1060 or affordance 1062 allows a parent to delay the start of the restricted usage mode without changing the actual time set for the restricted usage mode, such that the restricted usage mode will continue to be triggered at the previously-defined time on future days. For example, in FIG. 1000, selection of affordance 1062 is detected (e.g., by a tap of contact 1003 detected on affordance 1062, as shown in FIG. 1000). In response to selection of affordance 1026, device 500 initiates a process for requesting more time on another device (e.g., as described above with reference to FIGS. 8WW-8CCC). For example, the process for requesting more time on another device optionally sends a message 1070 (that is editable by the user) to parent device(s) within a messaging user interface with affordances to decline the request (e.g., affordance 1068*a*), to extend the start time of the restricted usage mode for a predetermined period of time (e.g., affordances 1068*b* and 1068*c*), and to customize the period of time of the extension, (e.g., affordance 1068*d*) (e.g., as described above with reference to FIGS. 8AAA-8CCC), as shown in FIG. 10PP. In some embodiments, the process for requesting more time on another device sends a notification 1066 with affordances to decline the request (e.g., affordance 1068*a*), to extend the start time of the restricted usage mode for a predetermined period of time (e.g., affordances 1068*b* and 1068*c*), and to customize the period of time of the extension, (e.g., affordance 1068*d*), as shown in FIG. 10QQ.

FIG. 10RR illustrates device 500 displaying home screen 1050 at a time before the start time of the restricted usage mode. In FIG. 10RR, home screen 1050 includes icons 424, 426, 416, 432, 434, 436, 440, 442, 454, 446, 450, and 452 for launching or otherwise displaying different applications on device 500, as described above with reference to FIG. 4A. Because the device is not in the restricted usage mode, the user is able to launch any application associated with icons 424, 426, 416, 432, 434, 436, 440, 442, 454, 446, 450, and 452 without restrictions.

FIG. 10SS illustrates touch screen 504 displaying home screen 1050 during the restricted usage mode. In some embodiments, device 500 prevents or attempts to prevent access to all applications on the device during the restricted usage mode except for applications that are included on an application usage whitelist. In some embodiments, the icons corresponding to restricted apps (e.g., application not on the application usage whitelist that are subject to restrictions during the restricted usage mode) are altered during the restricted usage mode. For example, icons 424, 432, 436, 442, 454, 450, and 452 correspond to restricted apps and are obscured (e.g., distorted, greyed out, faded out, and/or visually altered) during the restricted usage mode, as shown in FIG. 10SS. In some embodiments, a placeholder generic indication (e.g., a lock icon) 1070 is placed over or partially over icons corresponding to restricted applications, as shown in FIG. 1055. Placeholder generic indication (e.g., a lock icon) 1070 optionally replaces any unread notification indications corresponding to restricted apps (e.g., as shown in FIG. 1055). In some embodiments, a placeholder generic indicator (e.g., lock icon) is placed over or adjacent to text associated with the application icon of the restricted application (e.g., next to the name of the application).

In some embodiments, the icons displayed on home screen 1050 are selectable to launch the applications corresponding to those icons (e.g., during normal operation outside of the restricted usage mode). During the restricted usage mode, device 500 attempts to prevent access to restricted applications under the "notify" option (e.g., as described above with reference to FIGS. 10C and 10FF). For example, under the "notify" option, a user of device 500 (e.g., a parent device or standalone device) is optionally able to select an icon corresponding to a restricted application during the restricted usage mode. For example, in FIG. 10TT, selection of icon 424 (corresponding to the restricted Messages app) is detected (e.g., by a tap of contact 1003 detected on icon 424, as shown in FIG. 10TT). In response to selection of icon 424, device 500 optionally visually obscures home screen 1050 (e.g., blurring, greying out, or visually altering the home screen), as displayed in FIG. 10UU. In some embodiments, device 500 displays explanation 1056 indicating that the access to the Messages app is restricted during the restricted usage mode and a dismiss affordance 1057. For example, in FIG. 10UU, selection of dismiss affordance 1057 is detected (e.g., by a tap of contact 1003 detected on dismiss affordance 1057, as shown in FIG. 10UU). In response to selection of dismiss affordance 1057, device 500 ceases to display dismiss affordance 1057 and displays proceed affordance 1072 as shown in FIG. 10VV. In some embodiments, the user selecting proceed affordance 1072 allows the user to access restricted Messages app during the restricted usage mode (e.g., as described below with reference to method 1100), as shown in FIG. 10WW. In some embodiments, device 500 ceases to display proceed affordance 1072 after a period of time (e.g., 5 seconds, 10 seconds, 20 seconds) or when the user taps on any part of the home screen 1050 (other than explanation 1056 and proceed affordance 1072).

Device 500 (e.g., a parent or standalone device) attempts to prevent access to restricted applications during the restricted usage mode under the "notify and block" option (e.g., as described above with reference to FIGS. 10C and 10II-10LL). In some embodiments, under the "notify and block" option, a user of device 500 is optionally able to select an icon corresponding to a restricted application during the restricted usage mode. For example, in FIG. 10XX, selection of icon 424 (corresponding to the restricted Messages app) is detected (e.g., by a tap of contact 1003 detected on icon 424, as shown in FIG. 10XX). In response to selection of icon 424, device 500 optionally visually obscures home screen 1050 (e.g., blurring, greying out, or visually altering the home screen) and displays passcode graphical user interface 1044 requiring the user to enter a passcode to access the restricted Messages app during the restricted usage mode, as displayed in FIG. 10YY. In some embodiments, the passcode required at FIG. 10YY is different than a passcode to logon to or unlock device 500 (e.g., is a passcode unique to restriction settings). In some embodiments, biometrics are entered instead of a passcode to make changes to the restriction settings (e.g., as described in process 1100 below).

In some embodiments, child device 500 attempts to prevent access to restricted applications during the restricted usage mode. In some embodiments, a user of child device 500 is able to select an icon corresponding to a restricted application during the restricted usage mode. For example, in FIG. 10ZZ, selection of icon 424 (corresponding to the restricted Messages app) is detected (e.g., by a tap of contact 1003 detected on icon 424, as shown in FIG. 10ZZ). In response to selection of icon 424, child device 500 optionally visually obscures home screen 1050 (e.g., blurring, greying out, or visually altering the home screen) and displays selectable affordance 1082 to request access to the Messages app during restricted usage mode on child device 500 (e.g., by requiring a parent to enter a passcode directly on device 500) and selectable affordance 1084 to request access to the Messages app during restricted usage mode on another device (e.g., requiring to grant access from a parent device via an iMessage or notification) (e.g., as described above with reference to FIGS. 8TT-8CCC and 10NN-10QQ), as shown in FIG. 10AAA.

FIGS. 11A-11I are flow diagrams illustrating a method 1100 of selectively restricting access to applications on the electronic device during a restricted usage mode in accordance with some embodiments of the disclosure. The method 1100 is optionally performed at an electronic device such as device 100, device 300, or device 500 as described above with reference to FIGS. 1A-1B, 2-3, 4A-4B, and 5A-5H. Some operations in method 1100 are, optionally, combined, and/or the order of some operations is, optionally, changed.

As described below, the method 1100 provides ways of selectively restricting access to applications on the electronic device during a restricted usage mode. The method reduces usage of the electronic device during certain periods of time without requiring the user to monitor his or her own usage. For battery-operated electronic devices, limiting access to applications during certain periods of time conserves power and increases the time between battery charges.

In some embodiments, an electronic device (e.g., a mobile phone, a tablet computer, etc. such as device 100, device 300, or device 500) in communication with a display and one or more input devices (e.g., a mobile device including a touch screen, such as device 500 including touch screen 504, a computer or tablet computer, including one or more of a keyboard, mouse, trackpad, and touch screen, such as touch screen 504, a wearable device such as a smart watch including a touch screen, or a set top box in communication with a television and an input device (e.g., a remote control)) receives (1102) a sequence of one or more inputs (e.g., from the one or more input devices of the electronic device or from a second electronic device or different from the electronic device) for defining one or more windows of time associated with a restricted usage mode during which access to one or more applications on the electronic device is restricted, such as in FIGS. 10A-10E. In some embodiments, the restricted usage mode is a bedtime restricted usage mode. In some embodiments, the electronic device is a child device and the one or more inputs are received from a parent device in communication (e.g., wireless communication) with and associated with (e.g., the user accounts of both the parent device and the child device are associated with a family or other group account) the child device. For example, a user of the electronic device defines hours of the day (e.g., 10 pm to 5 am) as a bedtime restricted usage mode, during which the electronic device prevents or attempts to prevent access to all applications on the electronic device except for, in some embodiments, applications that are included on a whitelist of applications. In some embodiments, the user defines the windows of time above and does not specify any particular applications to which access is to be restricted. In such embodiments, the electronic device optionally defaults to restricting or attempting to restrict usage of all applications except for whitelist applications during the restricted usage mode.

While the one or more windows of time associated with the restricted usage mode are defined and during the one or more windows of time associated with the restricted usage mode (1104), the electronic device optionally receives (1106), via the one or more input devices, an input for initiating a first application of a plurality of applications installed on the electronic device (e.g., an input to open and/or use an application on the electronic device or an input to continue using an application on the electronic device when the one or more windows of time come into effect (e.g., the application was being used when the restricted usage mode went into effect)), such as in FIG. 10TT. In some embodiments, in response to receiving the input for initiating the first application (1108), in accordance with a determination that the first application is not included in an application usage whitelist (e.g., a list of applications that are not subject to restricted access during the restricted usage mode (e.g., are able to be fully or partially accessed during the bedtime restricted usage mode)), the electronic device restricts (1110) access to the first application (e.g., prohibit the application from launching, limit functionality of the application, or require further action by the user to launch the application, such as displaying a dialog box when the user attempts to launch the application that indicates the bedtime restriction and requires further confirmation from the user to proceed to the application), such as in FIGS. 10TT-10AAA. In some embodiments, in response to receiving the input for initiating the first application (1112), in accordance with a determination that the first application is included in the application usage whitelist, the electronic device provides access to the first application (e.g., launching the application as normal as if the restricted usage mode where not in effect), such as in FIG. 10I.

In some embodiments, the one or more windows of time associated with the bedtime restricted usage mode are preset by a user of the electronic device or remotely set by a user of a different electronic device in communication with the electronic device. In some embodiments, when an application is launched outside of the bedtime restricted usage mode, no bedtime usage restrictions occur (e.g., the application is launched as normal as if the restricted usage mode were not in effect). In some embodiments, access is provided to the first application with certain restrictions (e.g., an application may be launched but with limited functionality during the bedtime restricted mode.) For example, a phone application is optionally on the whitelist for use to communicate with certain contacts (e.g., a relative) and the phone application is launched restricting communications with other contacts. In some embodiments, the electronic device enters the restricted usage mode while a restricted application (e.g., an application not on the application usage whitelist) is running, and the restricted application is associated with a "notify" restriction option or in a "block and notify" restriction option (e.g., as described in further detail below). For example, under the "notify" restriction option, the electronic device displays a pop-up indication over the running application (e.g., obscuring display of the running application) that indicates the application usage is currently restricted (e.g., because bedtime restrictions are in effect), and the indication optionally includes one or more affordances that, when selected, allow the user to continue using the application. Under the "notify and block" restriction option, the electronic device blocks the user from using the application (e.g., blurs the application) and optionally displays a pop-up notification over the running application (e.g., obscuring display of the running application), including an indication that the application usage is currently restricted (e.g., because bedtime restrictions are in effect) and the indication requires authentication credentials (e.g., a password, passcode, biometrics, or consent from a parent device/account) to continue to use the application. Detecting biometrics optionally includes detecting, with a depth camera or another sensor, the user's face. The restricted usage mode described herein is optionally the same or similar to the restricted usage mode described with reference to methods 700, 900, and 1300. The above-described manner of selectively restricting access to applications during a bedtime restricted usage mode allows the electronic device to efficiently and selectively limit usage of certain applications during certain periods of time, which reduces usage of the electronic device during those periods of time, which, additionally, reduces power consumption and improves battery life of the device.

In some embodiments, the one or more windows of time associated with the restricted usage mode (e.g., a bedtime restricted usage mode) are a first one or more windows of time on a first day of the week (1114), and the one or more windows of time associated with the restricted usage mode are a second one or more windows of time, different from the first one or more windows of time, on a second day of the week, different from the first day of the week (e.g., different days are able to have different settings (time, usage restriction, etc.) for the restricted usage mode (1116), such as in FIG. 10F. For example, the hours for a bedtime restricted usage mode during which the electronic device prevents or attempts to prevent access to certain applications on the electronic device are defined differently for different days of the week (e.g., 10 pm to 5 am on Monday, 11 pm to 6 am on Saturday, 9 pm to 5 am on weekdays, 11 pm to 7 am on weekends). The above-described manner of defining different hours of a bedtime restricted usage mode for different days of the week makes the user-device interface more efficient (e.g., the user does not have to update the hours for the bedtime restricted usage mode on a daily basis, thus reducing the inputs provided by the user to the device (e.g., inputs for updating the hours for the bedtime restricted usage mode)), which allows the electronic device to efficiently reduce overall usage of the electronic device, which, additionally, reduces power consumption and improves battery life of the device.

In some embodiments, while the one or more windows of time associated with the restricted usage mode are defined in accordance with a determination that a current time at the electronic device is a threshold time prior to the one or more windows of time associated with the restricted usage mode (e.g., 5 minutes, 10 minutes, 1 hour, or any period of time before the start of the restricted usage mode), the electronic device presents (1118) an indication (e.g., text, an image, a sound, a haptic and/or tactile output, etc.) that the one or more windows of time associated with the restricted usage mode are approaching (e.g., a notification indicating that a restricted usage mode (e.g., a bedtime restricted usage mode) is about to go into effect within the threshold time (e.g., 5 minutes, 10 minutes, 1 hour, or any period of time), such as in FIG. 10EE. In some examples, the threshold time is defined by the user. In some embodiments, the notification comprises text, image(s), and/or sound. In embodiments, the notification comprises a haptic and/or tactile output indication. The above-described manner of notifying the user that the restricted usage mode will soon go into effect makes the user-device interface more efficient (e.g., the user does not have to monitor the time, provides the user with an opportunity to finish the task currently being performed on the device, and prompts the user to stop using the device in anticipation of the restricted usage mode, thus reducing the inputs provided by the user to the device (e.g., inputs for updating the hours for the bedtime restricted usage mode)), which allows the electronic device to efficiently reduce overall usage of the electronic device, which, additionally, reduces power consumption and improves battery life of the device.

In some embodiments, the indication that the one or more windows of time associated with the restricted usage mode are approaching includes a visual indication (1120), and the visual indication includes an affordance for delaying the initiation of the restricted usage mode past the one or more windows of time associated with the restricted usage mode (e.g., allows the user to delay the start of the restricted usage mode (without changing the actual time set for the restricted usage mode, such that the restricted usage mode will continue to be triggered at the previously-defined time on future days), such as in FIGS. 10EE-10QQ. In some embodiments, the affordance includes a predefined amount of time to extend the start of the restricted usage mode (e.g., 5 minutes, 15 minutes, 30 minutes). In some embodiments, the affordance allows the user to manually change the start time of the restricted usage mode (e.g., manually enter a different start time). In some embodiments, the electronic device allows the user to delay the start of the restricted usage mode anytime leading up to and including the start of the restricted usage mode (e.g., allowing the user to dismiss the restricted usage mode for a period of time or for the rest of the day). Delaying the start of the restricted usage mode optionally enables any application to be launched or any application functionality to be performed that might have otherwise been restricted (e.g., access widgets or websites associated with those apps, receive notifications, suggest those apps to the user, etc.). If the electronic device is a child device in a family account (e.g., the device of a user designated as a child, as opposed to a parent or administrator in the family account), the notification displayed optionally includes an affordance for requesting permission from an adult/parent device in the family account for extending the restricted usage mode (e.g., extending the beginning of the restricted usage mode by 15 minutes, 30 minutes, 1 hour, etc.). In such cases, selection of the request in the notification optionally results in a notification being delivered to one or more (or all) parent devices associated with the family account, and, upon permission of being granted at least one of the parent devices, the electronic device extends the start time of the restricted usage mode. In some embodiments, the affordance allows the user to prevent the electronic device from entering the restricted usage mode. In some embodiments, app usage beyond an allowable limit (e.g., even if approved due to extension of time) is, optionally, indicated in the dashboard user interface described above with reference to method 700 (e.g., as illustrated in FIGS. 6L-6P, 6EE-6HH, 6OO-6SS, and 6UU). The above-described manner of providing an affordance for the user to extend the start of the restricted usage mode makes the user-device interface more efficient (e.g., the user does not have to monitor the time, provides the user with an opportunity to extend the start time of the restricted usage mode to finish the task currently being performed on the device, and prompts the user to stop using the device in anticipation of the restricted usage mode, thus reducing the inputs provided by the user to the device (e.g., inputs for updating the hours for the bedtime restricted usage mode)), which allows the electronic device to efficiently reduce overall usage of the electronic device, which, additionally, reduces power consumption and improves battery life of the device.

In some embodiments, outside of the one or more windows of time associated with the restricted usage mode, one or more application icons associated with applications not included on the application whitelist are displayed (1122) with a first visual characteristic (e.g., display icons of applications not on the application whitelist normally outside of the restricted usage mode, such as in color, not grayed out, etc.), such as in FIG. 10RR, and, during the one or more windows of time associated with the restricted usage mode, the one or more application icons associated with the applications not included on the application whitelist are displayed (1124) with a second visual characteristic, different than the first visual characteristic (e.g., display the icons of applications not on the application usage whitelist during the restricted usage mode differently than while outside of the usage restricted mode), such as in FIG. 10SS. For example, for those applications that are not included on the application whitelist, the icons for those applications are optionally changed in the restricted usage mode to be greyed out (as compared to in color outside of the restricted usage mode) and/or a placeholder generic indicator is displayed over (or partially over any portion of) the icons for those applications in the restricted usage mode. In some embodiments, the placeholder generic indicator (e.g., lock icon) is placed over or adjacent to text associated with the application icon. In some embodiments, application icons include one or more visual indications of notifications associated with those applications when the restricted usage mode is not in effect (e.g., a badge overlaying a part of the icon that indicates a number of unread notifications received in that application). In such embodiments, for those applications not included in the application whitelist, those visual indications are removed, grayed out, have the number of notification removed therefrom, are replaced with a placeholder generic indication (e.g., a lock icon), or are otherwise altered so the notification status (e.g., number of notifications) of those applications is no longer conveyed by those indications. In some embodiments, all applications not on the application usage whitelist are displayed with a lock icon (in embodiments where the application icons used to include a visual indication of notifications for the applications, the lock icon replaces the notification indications). In some embodiments, the icons for the applications on the application whitelist are displayed the same during both the restricted usage mode and outside the restricted usage mode (e.g., in color, not greyed out, freely accessible, etc.). The above-described manner of displaying the applications that are restricted during a restricted usage mode differently allows the user to determine which applications are restricted, which allows the electronic device to efficiently and selectively limit usage of certain applications during certain periods of time by providing an indication of what applications the user does or does not have access to during the restricted usage mode, which reduces usage of the electronic device during those periods of time, which, additionally, reduces power consumption and improves battery life of the device.

In some embodiments, restricting access to the first application comprises the electronic device presenting (1126) an indication indicating that access to the first application is restricted (e.g., displaying a visual indication on the display, playing a sound with a speaker associated with the electronic device, generating haptic(s) and/or tactile output(s), etc. indicating that the application is restricted (e.g., a notification)), such as in FIG. 10UU. Optionally, the indication includes (1128) an affordance selectable to provide access to the first application without requiring authentication credentials (e.g., a graphical user interface element, link, or soft button that allows the user to access the restricted application during the restricted usage mode), such as in FIGS. 10UU-10VV. In some embodiments, different applications are associated with different restriction options that are in effect during the restricted usage mode. For example, the electronic device optionally allows one or more applications to be associated with a “notify” restriction option. If a user attempts to launch an application associated with the “notify” restriction (e.g., by selecting the icon for that application from the home screen of the electronic device during the restricted usage mode and assuming the application is not included in the application whitelist), the electronic device optionally displays a pop-up indication that indicates the application usage is currently restricted (e.g., because bedtime restrictions are in effect). The pop-up notification optionally includes one or more affordances that, when selected, allow the user to proceed to the application without needing to enter any authorization credentials (e.g., an “ignore for the day” affordance that opens the application without the need for administrator or other credentials to be entered). The above-described manner of notifying the user that an application is restricted during a restricted usage mode, but giving the user the option of nonetheless accessing the application when needed, allows the electronic device to efficiently limit usage of certain applications during certain periods of time while allowing the user to perform necessary tasks on the electronic device, which reduces usage of the electronic device during those periods of time, which, additionally, reduces power consumption and improves battery life of the device.

In some embodiments, restricting access to the first application comprises the electronic device presenting (1130) an indication indicating that access to the first application is restricted, such as in FIG. 10UU. Optionally, the indication includes (1132) an affordance selectable to provide access to the first application while requiring authentication credentials (e.g., displaying a visual indication on the display, playing a sound with a speaker associated with the electronic device, generating haptic(s) and/or tactile output, etc. indicating that the application is restricted (e.g., a notification)), such as in FIG. 10VV. In some embodiments, the electronic device allows one or more applications to be associated with a "notify and block" restriction option. If a user attempts to launch an application associated with the "notify and block" restriction (e.g., by selecting the icon for that application from the home screen of the electronic device during the restricted usage mode and assuming that the application is not included in the application whitelist), the electronic device blocks the application from launching and optionally displays a pop-up indication that indicates that the application usage is currently restricted (e.g., because bedtime restrictions are in effect). In some embodiments, the pop-up indication requires authentication credentials (e.g., a password, passcode, biometrics, or consent from a parent device/account) to access the application. Detecting biometrics optionally includes detecting, with a depth camera or another sensor, the user's face. If the electronic device is a child device in a family account (e.g., the device of a user designated as a child, as opposed to a parent or administrator in the family account), the notification displayed optionally includes an affordance for requesting permission from an adult/parent device in the family account for accessing the application during the restricted usage mode. In such cases, selection of the request in the notification optionally results in a notification being delivered to one or more (or all) parent devices associated with the family account, and, upon permission being granted (e.g., at least one of the parent devices or at the child device with a passcode), the electronic device allows access to the application. In some embodiments, the parent is required to enter a passcode at the parent device to allow access to restricted application on the child device from the parent device. The above-described manner of blocking the application from launching and notifying the user that the application is restricted during a restricted usage mode allows the electronic device to efficiently limit usage of certain applications during certain periods of time, which reduces usage of the electronic device during those periods of time, which, additionally, reduces power consumption and improves battery life of the device.

In some examples, in accordance with a determination that the electronic device is not a child device (e.g., is not a child device in a family account (e.g., is a parent device in a family account) or is not associated with a family account at all), selection of the affordance causes (1134) a request for a passcode to be entered to access the first application, such as in FIG. 10YY. In some embodiments, the determination that the electronic device is not a child device is based on a determination that the electronic device is a parent device (e.g., based on a classification of a user account associated with the electronic device or an option selected on the electronic device). For example, the determination that the electronic device is a parent device is, optionally, based on a determination that the user account associated with the electronic device (e.g., the user currently signed into the device) is classified as a parent account. In some embodiments, the determination that the electronic device is a parent device is, optionally, based on a determination that electronic device is set as a parent device in the device's settings (e.g., set while initially setting up the device).) In some embodiments, the request for a passcode to be entered is a pop-up notification that optionally includes one or more affordances that, when selected, only allow the user to proceed to the application if proper authentication credentials (e.g., a password, passcode, biometrics, or consent from a parent device/account) are provided. Detecting biometrics optionally includes detecting, with a depth camera or another sensor, the user's face. In some embodiments, the affordance comprises one or more of a soft button or an entry field(s) for a user id, password, and/or passcode. For example, if the device is not a child device in a family account (e.g., is a parent device in a family account) or is not associated with a family account at all, the electronic device optionally requests that the user enter the credentials (e.g., user id and/or password, passcode) for the user account with which the electronic device is associated (e.g., the user id and/or password or passcode associated with the profile with which the device is configured). In some embodiments, the credentials (e.g., user id and/or password, passcode) are different from the credentials to access the electronic device (e.g., different passcode than what is used to "unlock" the device and/or login to the device). In this way, a user (e.g., a child) who is not the owner of the device (e.g., a parent) will be unable to circumvent the restricted usage mode if the user does not enter the secondary passcode.

In some examples, in accordance with a determination that the electronic device is a child device (e.g., based on a classification of a user account associated with the electronic device or an option selected on the electronic device), selection of the affordance causes (1136) the display to present a first affordance requiring a passcode (e.g., a parental control passcode different from a passcode to unlock the device or to access a user account associated with device operation) to be entered to access the first application and a second affordance that, when selected, initiates a process to request access to the first application from a parent device (e.g., initiates a process to request more time from a parent device in the family account), such as in FIGS. 10MM-10QQ. For example, the determination that the electronic device is a child device is, optionally, based on a determination that the user account associated with the electronic device (e.g., the user currently signed into the device) is classified as a child account. In some embodiments, the determination that the electronic device is a child device is, optionally, based on a determination that electronic device is set as a child device in the device's settings (e.g., set while initially setting up the device). In some embodiments, the process will send a message to the parent device (e.g., a text message or any other alert on the parent device, an email request to an email account associated with the parent(s)) requesting access to the first application. The process will then allow the parent to grant the child device access to the restricted application (e.g., the parent is able to choose to allow the child device to access the restricted application during then restricted usage mode) or to deny the child device access to the restricted application. In some embodiments, the electronic device presents an affordance for entering a passcode and/or an affordance for initiating the process to request access to the first application. In some embodiments, the passcode is a parental control passcode or a usage passcode different from the passcode for unlocking the electronic device. In this way, a child is optionally unable to circumvent the restricted access mode, but a parent is optionally able to enter the passcode to allow the electronic device to access the first application. In some embodiments, the parent is required to enter a passcode at the parent device to allow access to restricted application on the child device from the parent device. The above-described manner of notifying the user that an application is restricted during a restricted usage mode, but enabling the user the option of nonetheless accessing the application when needed, allows the electronic device to efficiently limit usage of certain applications during certain periods of time while allowing the user to perform necessary tasks on the electronic device, which reduces usage of the electronic device during those periods of time, which, additionally, reduces power consumption and improves battery life of the device.

In some embodiments, the electronic device receives (1138), via the one or more input devices, a sequence of one or more inputs to activate or deactivate enforcement of one or more restricted usage mode restrictions, including the one or more windows of time associated with the restricted usage mode (e.g., manually turn on or off enforcement of the restricted usage mode on the electronic device according to the restricted usage mode restrictions during the one or more windows of time associated with the restricted usage mode), such as in FIG. 10C. For example, turning off the enforcement of the restricted usage mode rules that define usage restrictions during the hours of 10 pm to 7 am (e.g., one or more windows of time associated with the restricted usage mode) disables those usage restrictions during the hours of 10 pm to 7 am (e.g., while on vacation). Conversely, turning on the enforcement of the same restricted usage mode rules enables those usage restrictions during the hours of 10 pm to 7 am. In some embodiments, enforcement of the restricted usage mode rules can be toggled on or off during or outside the one or more windows of time associated with the restricted usage mode (e.g., controlling whether or not the electronic device will enter—if toggled on while outside the one or more windows of time—or exit—if toggled off during the one or more windows of time—the restricted usage mode during the one or more windows of time associated with the restricted mode). In some embodiments, the electronic device stores the usage restriction settings (e.g., the user-defined start time(s), end time(s), whitelist(s), etc.) when the enforcement of the restricted usage mode is turned off such that the usage restriction settings are maintained for the next time the restricted usage mode is turned on. For example, when enforcement of the restricted usage mode rules is turned back on (after having been turned off), the electronic device optionally enforces the restricted usage mode restrictions according to the same restricted usage mode rules that had been set up before the restricted usage mode was turned off (e.g., enforces restricted usage mode during the hours of 10 pm to 7 am when the restricted usage mode is toggled back on). In some embodiments, in accordance with a determination that the enforcement of the one or more restricted usage mode restrictions has been turned on, the electronic device enforces (1140) the one or more restricted usage mode restrictions (e.g., operate the electronic device outside of the restricted usage mode or in the restricted usage mode (according to the restricted usage mode rules)), such as in FIG. 10C. For example, during the restricted usage mode, the electronic device operates to prohibit restricted applications from launching, limit functionality of restricted applications, and require further action by the user to launch a restricted application, such as displaying a dialog box when the user attempts to launch the restricted application that indicates the bedtime restriction and requires further confirmation from the user to proceed to the application. In some embodiments, access is provided to the first application with certain restrictions (e.g., an application may be launched but with limited functionality during the bedtime restricted mode.) For example, a phone application is optionally on the whitelist for use to communicate with certain contacts (e.g., a relative) and the phone application is launched restricting communications with other contacts.

In some embodiments, in accordance with a determination that the enforcement of the one or more restricted usage mode restrictions has been turned off, the electronic device forgoes enforcing (1142) the one or more restricted usage mode restrictions (e.g., operate the electronic device outside of the restricted usage mode as long as enforcement of the restricted usage mode has been turned off, independent of whether the current state of the electronic device (e.g., the current time) would have otherwise caused the device to operate in the restricted usage mode), such as in FIGS. 10C and 10HH. For example, outside of the restricted usage mode, the electronic device allows launching applications as normal as if the restricted usage mode were not in effect. In some embodiments, when an application is launched outside of the bedtime restricted usage mode, no bedtime usage restrictions occur (e.g., the application is launched as normal as if the restricted usage mode were not in effect). In some embodiments, the electronic device provides a toggle for toggling the enforcement of restricted usage mode on or off. Thus, even if the current time is within the one or more restricted usage windows of time, but the restricted usage mode is turned off, the restrictions associated with the restricted usage mode are not enforced. The above-described manner of allowing a user to manually enforce or not the restricted usage mode rules allows the electronic device to customize enforcement of the restricted usage mode to user desires, which selectively reduces usage of the electronic device, which, additionally, reduces power consumption and improves battery life of the device.

In some embodiments, restricting access to the first application includes presenting (1144) one or more spoken indications that access to the first application is restricted (e.g., spoken notifications in which an audible voice indicates that access to the application is restricted in some embodiments in addition to the visual notification(s) described above). In some embodiments, the electronic device performs spoken notifications only in accordance with a determination that restricted usage indications are to be spoken (e.g., based on a designation of a user account associated with the electronic device or based on electronic device settings). For example, the electronic device optionally provides an option that the user is able to select or not select for providing (or not) the notifications audibly in addition to or alternatively to providing them visually. In some embodiments, the electronic device, optionally, does not perform spoken notifications in accordance with a determination that restricted usage indication are not to be spoken (e.g., displays notifications without an audible voice indicating that access to the application is restricted). In some embodiments, the notifications optionally include sound (e.g., a chime, alert, music, etc.) without a voice reading the notification. In some embodiments, any of the notifications described herein are able to be generated audibly by the electronic device (e.g., read to the user of the electronic device) to, for example, facilitate providing such notifications to users who cannot read or see (e.g., children). The above-described manner of providing audible notifications while restricting access to applications during a restricted usage mode allows the electronic device to efficiently limit usage of certain applications while in the restricted usage mode, while optionally not displaying additional information, which reduces power consumption and improves battery life of the device.

In some embodiments, a phone application on the electronic device (e.g., an application that allows outgoing and incoming voice and/or video calls on the electronic device) is (1146) permanently included in the application usage whitelist (e.g., access to the phone app is not restricted during the restricted usage mode). In some embodiments, the electronic device has phone capabilities (e.g., is able to make phone calls, receive phone calls, etc.) that are implemented using a phone application installed on the electronic device (e.g., in the same way that other applications such as messaging applications, email applications, video applications, etc. are installed on the electronic device), such as in FIG. 10H. In such embodiments, the phone application is optionally always (e.g., permanently) included in the whitelist of applications such that the restricted usage mode restrictions do not apply to the phone application. Thus, the user is optionally able to use the phone application as normal regardless of whether the restricted usage mode is in effect. In some embodiments, the phone application is only permanently included in the application usage whitelist with respect to certain specified contacts (e.g., phone application is only freely usable to contact certain contacts), and usage of the phone application to communicate with other contacts is able to be restricted. The above-described manner of allowing access to phone operations while restricting access to other applications during a restricted usage mode allows the electronic device to efficiently limit usage of certain communications applications while in the restricted usage mode, which reduces power consumption and improves battery life of the device.

In some embodiments, while the one or more windows of time associated with the restricted usage mode are defined and during the one or more windows of time associated with the restricted usage mode (e.g., during the restricted usage mode (e.g., bedtime mode)), communication operations (e.g., phone call, text message, email, and/or videoconferencing operations) using the phone application are allowable (1148) with respect to anyone (e.g., communications operations are not restricted to any particular contacts during the restricted usage mode) or are only allowable with respect to one or more specified contacts of a plurality of contacts on the electronic device (e.g., communications are restricted to contacts saved on the electronic device, contacts in a specified group of contacts on the electronic device, or contacts on a whitelist during the restricted usage mode), such as in FIGS. 10J-10M. In some embodiments, the contacts with which the phone application is able to communicate without restriction are able to be defined at the electronic device. For example, the electronic device optionally provides a setting for allowing the phone application to communicate with (e.g., make calls to, receive calls from, etc.) all contacts (e.g., an "anyone" setting) or a specified subset of contacts without restriction during the restricted usage mode (e.g., a "contacts" setting). In some embodiments, the electronic device provides a user interface for only allowing the phone application to communicate with select individuals (e.g., only contacts on the electronic device, or certain contacts on the electronic device) without restriction during the restricted usage mode. Communications with other individuals are optionally restricted in the ways described previously (e.g., not allowed, not allowed without a user id/password, passcode, biometrics, or permission from a parent device, etc.). The above-described manner of allowing the user to selectively restrict access to communications operations to certain contacts during a restricted usage mode allows the electronic device to efficiently limit usage of certain communications applications while in the restricted usage mode, which reduces power consumption and improves battery life of the device.

In some embodiments, communication operations include (1150) incoming and outgoing communications (e.g., outgoing and/or incoming phone calls, emails, text messages, and video conference calls). During the restricted usage mode, the electronic device prevents communications (e.g., blocks phone calls, text messages, video conference requests, etc.) from anyone not specified for communication during the restricted usage mode. The above-described manner of allowing the user to selectively restrict access to communications operations to certain contacts during a restricted usage mode allows the electronic device to efficiently limit usage of certain communications applications while in the restricted usage mode, which reduces power consumption and improves battery life of the device.)

In some embodiments, the electronic device receives (1152), from another electronic device in communication with (e.g., via a wireless or wired connection) the electronic device, contact information for a first contact (e.g., from another electronic device (e.g., a parent device)), such as in FIG. 10CC. In some embodiments, the electronic device allows (1154) communication with the first contact during the restricted usage mode (e.g., to allow performance of communications operations with respect to the first contact when the communications restrictions are set to the contacts setting (e.g., when communications operations are only allowed during the restricted usage mode with contacts that are specified on the electronic device)), such as in FIG. 10M In some embodiments, the electronic device automatically saves the received contact information for the first contact in the plurality of contacts saved on the electronic device. Optionally, the electronic device and the another electronic device are associated (1156) with a same user group account (e.g., a "family" or "family sharing" account), such as in FIG. 10W. In some embodiments, the other electronic device is a device of a parent in the family account. In such embodiments, the parent device is able to share one or more contacts of the parent (e.g., contact information, such as name, phone number, email address, etc.) with the child device. For example, the parent device is able to transmit and save, to the child's device, the contact information for a contact on the parent device via selection of a "share with child device" affordance on the parent device (e.g., without needing to specify the child's contact information or specify a target device to which to send the contact information). In some embodiments, the parent is required to enter a passcode at the parent device to transmit and save contact information on the child device. The above-described manner of allowing the user to selectively restrict access to communications operations to certain contacts during a restricted usage mode allows the electronic device to efficiently limit usage of certain communications applications while in the restricted usage mode, which reduces power consumption and improves battery life of the device.

In some embodiments, the one or more specified contacts of the plurality of contacts on the electronic device (e.g., contacts saved on the electronic device, contacts in a specified group of contacts on the electronic device, or contacts on a whitelist during the restricted usage mode are allowed) are customizable (1158) (e.g., contacts are able to be added or removed from a contacts whitelist (e.g., contacts in which communication operations are not restricted during the restricted usage mode)), such as in FIG. 10M. In some embodiments, the specific contacts that are included or are not on a contact whitelist are controllable by the electronic device. For example, certain contacts of the electronic device are able to be designated as "allowable" or "unrestricted" such that communications with those contacts during the restricted usage mode are not restricted (e.g., communications with other contacts or individuals are optionally restricted during the restricted usage mode). In some embodiments, these "unrestricted" contacts are defined at the electronic device itself (e.g., within a settings user interface of the electronic device itself). In some embodiments, these "unrestricted" contacts are defined at another device (e.g., if the current device is a child device in a family account, defined at a parent device in the family account for the child device). In some embodiments, the parent is required to enter a passcode at the parent device to define "unrestricted" contacts on the child device from the parent device. The above-described manner of allowing the user to selectively restrict access to communications operations to certain contacts during a restricted usage mode allows the electronic device to efficiently limit usage of certain communications applications while in the restricted usage mode, which reduces power consumption and improves battery life of the device.

In some embodiments, the one or more specified contacts of the plurality of contacts on the electronic device with which communications operations are allowed during the one or more windows of time associated with the restricted usage mode (e.g., during the restricted usage mode (e.g., bedtime mode)) are different (1160) than the second one or more specified contacts with which communications operations are allowed outside the one or more windows of time associated with the restricted usage mode (e.g., a daytime contacts whitelist in which communications are not restricted during the restricted usage mode), such as in FIGS. 10O-10S. In some embodiments, the daytime contacts whitelist is different from the bedtime contacts whitelist (e.g., contacts in which communication operations are not restricted during the restricted usage mode). For example, if the restricted usage mode is set to be from 10 pm to 6 am, application and/or contact whitelists for 10 pm to 6 am are optionally different than the application and/or contact whitelists for 6 am to 10 pm (e.g., different applications and/or contacts are able to be restricted in different ways during the two time periods). In some embodiments, particular contacts are able to be listed in both the daytime contacts whitelist and the bedtime contacts whitelist (e.g., contacts optionally overlap in both whitelists). In some embodiments, the daytime contacts whitelist is the same as the bedtime contacts whitelist. In some embodiments, communication operations with contacts not on the daytime contacts whitelist are restricted outside of the restricted usage mode. In some embodiments, a parent is able to set or update the daytime and/or bedtime contacts whitelists from a parent device. In some embodiments, the parent is required to enter a passcode at the parent device to set or update the daytime and/or bedtime contacts whitelists on the child device from the parent device. The above-described manner of allowing the user to selectively restrict access to communications operations to certain contacts during and outside of a restricted usage mode allows the electronic device to efficiently limit usage of certain communications applications while in the restricted usage mode, which reduces power consumption and improves battery life of the device.

In some embodiments, the electronic device receives (1162), via the one or more input devices, an input for adding a second application of the plurality of applications installed on the electronic device to the application usage whitelist, such as in FIGS. 10I-10J. While the one or more windows of time associated with the restricted usage mode are defined and during the one or more windows of time associated with the restricted usage mode, in accordance with a determination that the second application is included in the application usage whitelist, the electronic device provides (1164) access to the second application (e.g., add application to the list of applications not restricted during the restricted usage mode), such as in FIG. 10J. In some embodiments, any application installed on the electronic device is able to be added to the whitelist of applications, whether in a settings user interface of the electronic device itself or via another device (e.g., if the current device is a child device in a family account, defined at a parent device in the family account for the child device). In some embodiments, the parent is required to enter a passcode at the parent device to set or update application whitelists on the child device from the parent device. The above-described manner of allowing the user to selectively restrict access to certain applications during a restricted usage mode allows the electronic device to efficiently limit usage of certain communications applications while in the restricted usage mode, which reduces power consumption and improves battery life of the device.

In some embodiments, the electronic device receives (1166) one or more inputs for changing one or more restricted usage mode settings associated with the restricted usage mode (e.g., changes to the start/end times of the restricted usage mode, changes to whitelists, etc.), such as in FIG. 10F. In response to receiving the one or more inputs for changing the one or more restricted usage mode settings (1168), in accordance with a determination that the one or more inputs for changing the one or more restricted usage mode settings were received via the one or more input devices of the electronic device and that the electronic device is a child device (e.g., based on a classification of a user account associated with the electronic device or an option selected on the electronic device), the electronic devices requires (1170) authorization before performing the one or more restricted usage mode settings changes (e.g., require the user of the electronic device to enter a passcode in order to make the changes to the restricted usage mode), such as in FIGS. 10T-10V. For example, the determination that the one or more inputs for changing the one or more restricted usage mode settings were received at a child device is, optionally, based on a determination that the user account associated with the electronic device (e.g., the user currently signed into the device) is classified as a child account. In some embodiments, the determination that the one or more inputs for changing the one or more restricted usage mode settings were received at a child device is, optionally, based on a determination that electronic device is set as a child device in the device's settings (e.g., set while initially setting up the device). In some embodiments, if the electronic device is a child device in a family account, any of the restricted usage mode settings or preferences or rules, etc. described herein are able to be modified at the child device only in response to entry of a password or other authentication credentials at the child device (e.g., upon determining that one of the settings is being modified, the electronic device prompts the user to enter a password that must be authenticated before the modification is allowed). In some embodiments, the authentication credentials are the same as the credentials for unlocking the device (e.g., the passcode to unlock the device). In some embodiments, the authentication credentials are different than the credentials for unlocking the device (e.g., credentials of a parent in the family account). In some embodiments, a parent device is able to modify the above settings in effect on the child device remotely (e.g., optionally, with entry of the parent credentials at the parent device). In some embodiments, the parent is required to enter a passcode at the parent device to modify the above settings on the child device remotely. In response to receiving the one or more inputs for changing the one or more restricted usage mode settings (1168), in accordance with a determination that the one or more inputs for changing the one or more restricted usage mode settings were received from outside of the electronic device via a parent device (e.g., changes to the restricted usage mode we made on a parent device), the electronic device performs (1172) the one or more restricted usage mode settings changes (e.g., make the changes to restricted usage mode without requiring additional credential to be entered), such as in FIGS. 10X-10CC. For example, the determination that the one or more inputs for changing the one or more restricted usage mode settings were received via a parent device is, optionally, based on a determination that the user account associated with that other device (e.g., the user currently signed into that device) is classified as a parent account. In some embodiments, the determination that the one or more inputs for changing the one or more restricted usage mode settings were received via a parent device is, optionally, based on a determination that the other device is set as a parent device in the device's settings (e.g., set while initially setting up the device). In some embodiments, the electronic device is the parent device. In some embodiments, the electronic device is different from the parent device (e.g., the electronic device is a child device). In some embodiments, the parent device makes changes to the restricted usage mode settings on a child device remotely (e.g., through the Internet, Bluetooth, or other network or protocol). In some embodiments, the parent is required to enter a passcode at the parent device to make changes to the restricted usage mode settings on the child device remotely. The above-described manner of limiting the ability to change restricted usage mode settings allows the electronic device to efficiently and selectively limit usage of certain applications during certain periods of time, which reduces usage of the electronic device during those periods of time, which, additionally, reduces power consumption and improves battery life of the device.

In some embodiments, in response to performing the one or more restricted usage mode settings changes received from outside of the electronic device, the electronic device presents (1174) an indication (e.g., a visual indication (e.g., one or more of text and an image), a sound indication, a spoken indication, and/or a haptic and/or tactile output indication) regarding the one or more restricted usage mode settings changes (e.g., present a notification that the restricted usage mode settings were changed remotely by a parent device), such as in FIG. 10CC. In some embodiments, if the parent device does modify the above settings in effect on the child device remotely, the child device displays a notification that such remote modification occurred, the specifics of the modification (e.g., the parent device has changed the time window during which the restricted usage mode is in effect from 10 pm to 6 am to 9 pm to 7 am, etc.), etc.). The above-described manner of changing restricted usage mode settings allows the electronic device to efficiently and selectively limit usage of certain applications during certain periods of time, which reduces usage of the electronic device during those periods of time, which, additionally, reduces power consumption and improves battery life of the device.

In some embodiments, outside of the one or more windows of time associated with the restricted usage mode, the electronic device displays (1176) one or more representations (e.g., icon, widget, window of the first application in a multitasking view along with other windows of other applications) of applications installed on the electronic device, such as in FIG. 10RR. For example, the electronic device displays one or more application windows associated with one or more applications (e.g., in a multitasking graphical user interface view), or the electronic device displays one or more icons for launching the applications on a home screen of the electronic device. The one or more representations include a first representation of the first application, with a first visual characteristic (e.g. display normal icons for the applications installed on the electronic device when not in the restricted usage mode (e.g., in a home screen of the electronic device), such as in color, not obscured, etc. In some embodiments, during the one or more windows of time associated with the restricted usage mode (1178) (e.g., in response to the start of the one or more windows of time associated with the restricted usage mode), in accordance with a determination that the first application is not included in the application usage whitelist (e.g., a list of applications that are not subject to restricted access during the restricted usage mode (e.g., are able to be fully or partially accessed during the restricted usage mode)), the electronic device displays (1180) the first representation of the first application with a second visual characteristic different from the first visual characteristic (e.g., the appearance of the representations of applications not on the application whitelist is different from the appearance of the representations of applications not on the application whitelist), such as in FIG. 10SS. In some embodiments, during the restricted notification mode, the electronic device modifies the appearances of various aspects of applications that are not included in the application whitelist. For example, icons for applications not included in the whitelist (e.g., icons on a home screen of the device) are shaded out during the restricted usage mode and/or a placeholder generic indicator is displayed over (or partially over any portion of) the icons for those applications in the restricted usage mode, as previously described. In some embodiments, the placeholder generic indicator (e.g., lock icon) is placed over or adjacent to text associated with the application icon. As another example, notification badges included on the application icons for applications that are not included in the application whitelist are optionally modified, as previously described. As another example, in some embodiments, the electronic device has multitasking capabilities in which the electronic device optionally displays a user interface that concurrently displays visual representations of more than one application (e.g., a user interface that displays icons from multiple applications concurrently, screenshots of the current user interfaces of multiple applications concurrently, multiple application windows for different applications are concurrently presented, etc.). In some embodiments, during the restricted usage mode, representations for applications not in the application whitelist in the above multitasking user interface are modified by the electronic device (e.g., faded or shaded out or otherwise modified to be displayed with a different visual characteristic than representations corresponding to applications that are included in the application whitelist). In some embodiments, during the one or more windows of time associated with the restricted usage mode (1178) (e.g., in response to the start of the one or more windows of time associated with the restricted usage mode), in accordance with a determination that the first application is included in the application usage whitelist, the electronic device displays (1182) the first representation of the first application with the first visual characteristic (e.g., the appearance of the representations for the applications that are included on the application whitelist continue to be displayed with the same visual characteristics during the restricted usage mode), such as in FIG. 10SS. The above-described manner of selectively changing the appearance of representations of applications not on an application whitelist during a restricted usage mode allows the electronic device to efficiently and selectively limit usage of certain applications during certain periods of time by providing an indication of what applications the user does or does not have access to during the restricted usage mode, which reduces usage of the electronic device during those periods of time, which, additionally, reduces power consumption and improves battery life of the device.

In some embodiments, displaying the first representation of the first application with the second visual characteristic comprises displaying (1184) a restricted-usage badge on the first representation, the restricted usage badge including an indication that access to the first application is restricted (e.g., a badge with a visual indication of a lock or some other restriction symbol that is added to the application icons, such as overlaying those application icons or any portion(s) of those application icons (e.g., the top-right portion of the icons)), such as in FIG. 1055. In some embodiments, the restriction symbol (e.g., lock icon) is placed over or adjacent to text associated with restricted application icons. In some embodiments, application icons include one or more visual indications of notifications associated with those applications when the restricted usage mode is not in effect (e.g., a badge overlaying a part of the icon that indicates a number of unread notifications received in that application). In such embodiments, for those applications not included in the application whitelist, those visual indications are removed, grayed out, have the number of notification removed therefrom, are replaced with a placeholder generic indication (e.g., a lock icon), or are otherwise altered so the notification status (e.g., number of notifications) of those applications is no longer conveyed by those indications. The above-described manner of selectively changing the appearance of the representations of applications not on an application whitelist during a restricted usage mode allows the electronic device to efficiently and selectively limit usage of certain applications during certain periods of time by displaying restricted-usage badges on the applications the user does not have access to during the restricted usage mode, which reduces the likelihood of the user attempting to access such restricted application, which, additionally, reduces usage of the electronic device during those periods of time, thereby reducing power consumption and improving the battery life of the device.

In some embodiments, displaying the first representation of the first application with the first visual characteristic comprises displaying (1186) the first representation with a notification badge (e.g., an indicator of unread messages, missed calls, etc.), the notification badge including an indication of a notification received at the first application (e.g., the number of unread messages, missed calls, etc.), and displaying the first representation of the first application with the second visual characteristic comprises displaying (1188) the first representation, with the notification badge having been replaced by the restricted-usage badge (e.g., blurs the indicator or replaces the indicator with a graphic), such as in FIGS. 10RR-10SS. In some embodiments, the above-described lock badge replaces the indication of the notification badge of the application icon for the non-whitelist application during the restricted usage mode time window(s), as previously described. The above-described manner of selectively changing the appearance of the representations of applications not on an application whitelist during a restricted usage mode allows the electronic device to efficiently and selectively limit usage of certain applications during certain periods of time by replacing notification indications of applications representations with restricted-usage badges on the applications the user does not have access to during the restricted usage mode, which deters the user from attempting to access a restricted application with recent notifications by not indicating that such notifications exist, which reduces usage of the electronic device during those periods of time, which, additionally, reduces power consumption and improves battery life of the device.

It should be understood that the particular order in which the operations in FIGS. 11A-11I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1500) are also applicable in an analogous manner to method 1100 described above with respect to FIGS. 11A-11I. For example, the restricted usage mode, usage restriction settings, etc., described above with reference to method 1100 optionally has one or more of the characteristics of the restricted usage mode, usage restriction settings, etc. described herein with reference to other methods described herein (e.g., methods 700, 900, 1300 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, and 5A-5H) or application specific chips. Further, the operations described above with reference to FIGS. 11A-11I are, optionally, implemented by components depicted in FIGS. 1A-1B. For example, displaying operations 1122, 1124, 1176, 1180, 1182, 1184, 1186, and 1188, and receiving operations 1102, 1106, 1138, 1152, 1162, and 1166, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186 and determines whether a first contact at a first location on the touch screen corresponds to a predefined event or sub-event such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state

192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Suppressing Auxiliary Application Functions in User Interfaces

Users interact with electronic devices in many different manners and during various times during the day or night. For example, a user may read news updates on a News application installed on an electronic device during her morning train commute or in bed at the end of the day. However, in some circumstances, it is difficult for the user to monitor and limit usage of certain application during certain periods of time. The embodiments described below provide ways in which an electronic device suppresses auxiliary functions of certain applications when restriction criteria for those certain applications are met, such as when an application usage limit associated with those applications is reached and/or during one or more periods of time during which the electronic device operates in a restricted usage mode. Suppressing auxiliary functions of applications when the restriction criteria are met allows the electronic device to efficiently reduce overall usage of the electronic device, and thus reduces the power usage of the device and increases battery life for battery-powered devices. It is understood that people use devices. When a person uses a device, that person is optionally referred to as a user of the device.

Figure 12A:
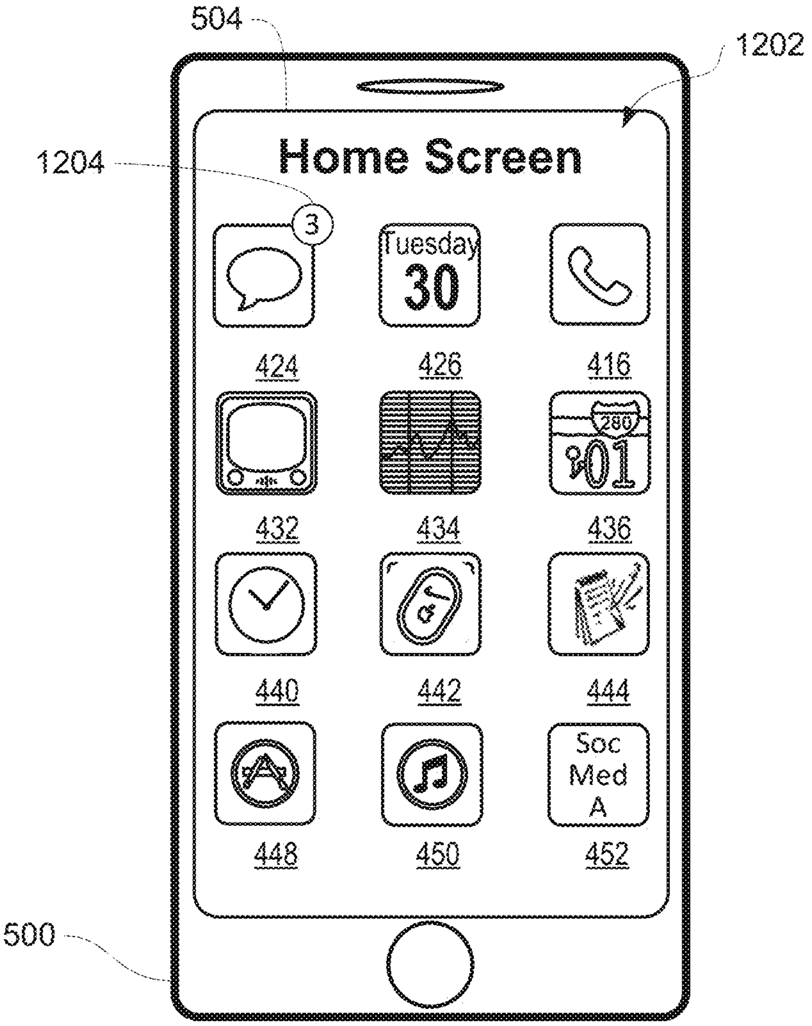
FIGS. 12A-12BB illustrate exemplary ways in which an electronic device suppresses auxiliary functions of certain applications when an application usage limit associated with those applications is reached in accordance with some embodiments of the disclosure.
Figure 12B:
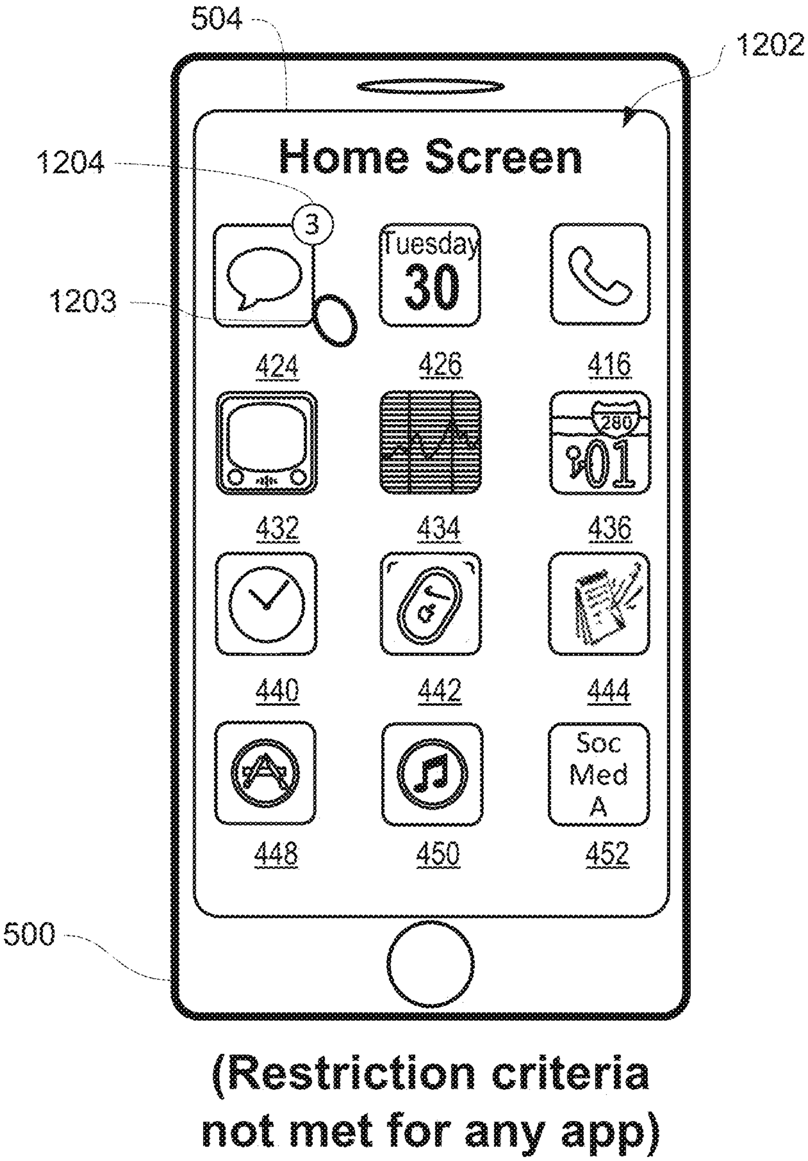

FIGS. 12A-12BB illustrate exemplary ways in which an electronic device suppresses auxiliary functions of certain applications when an application usage limit or restriction criteria associated with those applications is reached in accordance with some embodiments of the disclosure. The embodiments in these figures are used to illustrate the processes described below, including the processes described with reference to FIGS. 13A-13H.

FIG. 12A illustrates exemplary device 500 with touch screen 504, described with reference to FIGS. 5A-5H. Touch screen 504 optionally displays one or more user interfaces that include various content. In the example illustrated in FIG. 12A, touch screen 504 displays home screen 1202 at a time during which restriction criteria are not met on device 500 (e.g., a user-defined usage limit has not been reached, and it is outside of one or more user-defined windows of time associated with a restricted usage mode). In some embodiments, the restriction criteria are met when a usage limit is reached for a given application or category of applications, as discussed with reference to methods 700 and 900 above. In some embodiments, the restriction criteria are met during one or more windows of time associated with a restricted usage mode, as described above with reference to method 1100. In FIG. 12A, home screen 1202 includes icons 424, 426, 416, 432, 434, 436, 440, 442, 444, 448, 450, and 452 for launching or otherwise displaying different applications on device 500, as described above with reference to FIG. 4A. As shown in FIG. 12A, one or more application icons optionally include a notification indicator 1204 that informs the user of any unread notifications associated with the application. For example, notification indicator 1204 in FIG. 12A indicates that there are three unread messages in Messages app 424. In some embodiments, notification indicator 1204 is a badge superimposed over (or partially over) the appropriate icon, as illustrated in FIG. 12A.

Figure 12C:
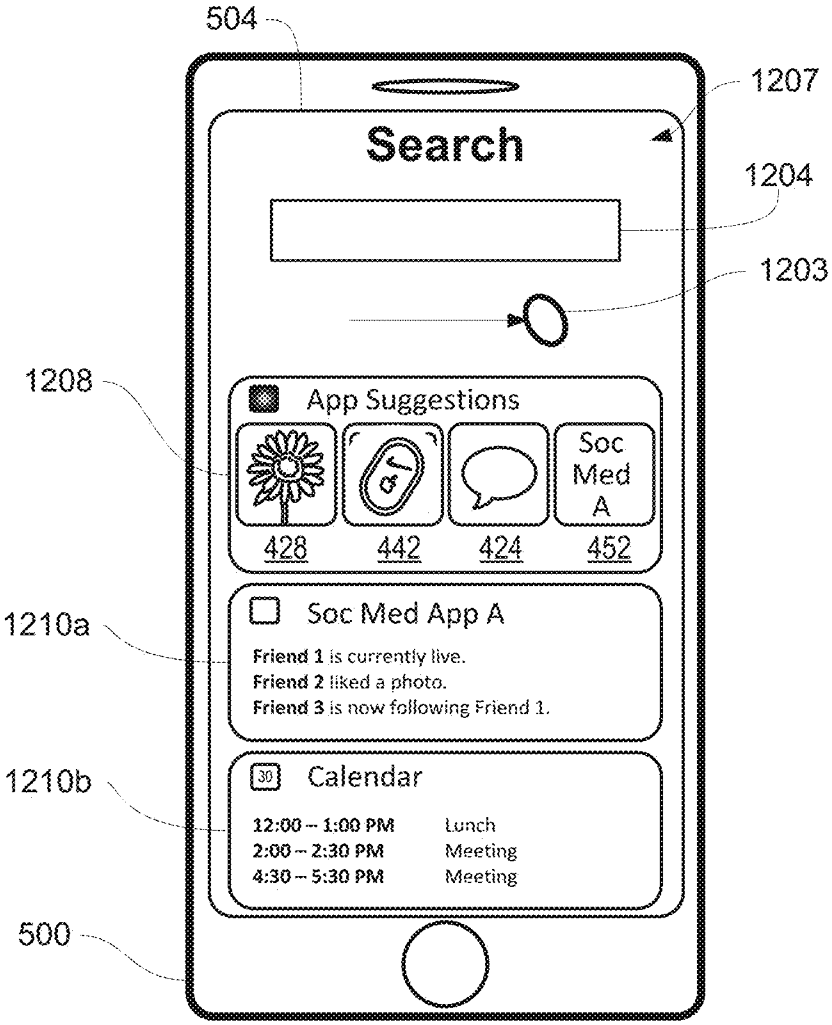

In FIGS. 12B-12C, a horizontal swipe of contact 1203 is detected on touch screen 504 while home screen 1202 is displayed, which causes device 500 to display a search user interface 1207 at a time during which restriction criteria are not met on device 500. Search user interface 1207 is optionally a user interface of the operating system of device 500 via which content accessible from device 500 is searched (e.g., websites, news, e-mail, applications installed on device 500, applications available to be downloaded to device 500, calendar entries, etc.). Search user interface 1207 optionally includes text field 1204 for entering one or more search terms to search the content accessible from device 500, "App Suggestions" user interface 1208 for displaying applications suggested to the user by the operating system of device 500 (e.g., suggesting commonly used applications, recently used applications, favorite applications, currently running applications), and widgets 1210 corresponding to applications installed on device 500 (e.g., a user interface object or window including text, image(s), and/or any other content associated with and updated by corresponding application), as shown in FIG. 12C. For example, in FIG. 12C, app suggestions user interface 1208 includes Photos app 428, Workout Support app 442, Messages app 424, and Soc Med A app 452, and widget **1210*a* corresponds to a "Soc Med App A" application and widget 1210*b*** corresponds to a "Contacts" application.

Figure 12D:
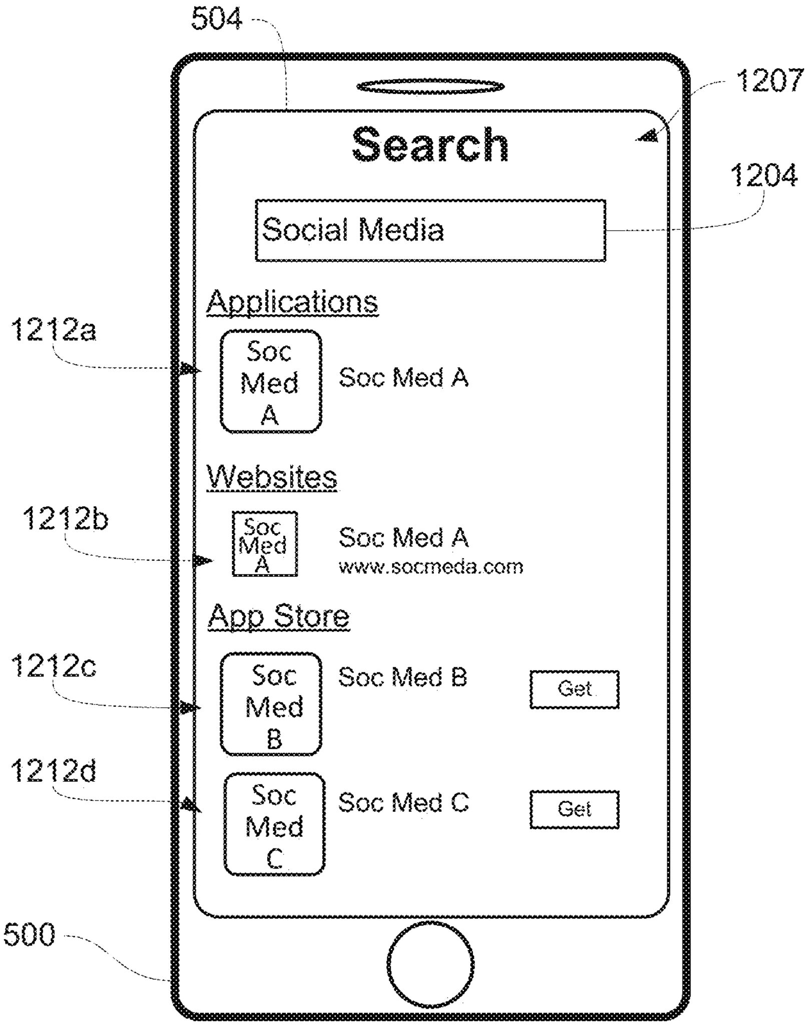

In FIG. 12D, the user has entered the search term "Social Media" into text field 1204 at a time during which restriction criteria are not met on device 500. In response to the search term "Social Media" having been entered into text field 1204, device 500 displays various search results in search user interface 1207 relating to the search term "Social Media." For example, device 500 displays a link **1212*a* to social media application "Soc Med A" installed on device 500, a link 1212*b* to social media website "Soc Med A", which is a website related to the "Soc Med A" app, and affordances to two social media applications available for download from an App Store (e.g., a repository of applications): affordance 1212*c* to download "Soc Med B" and affordance 1212*d*** to download "Soc Med C" applications.

Figure 12E:
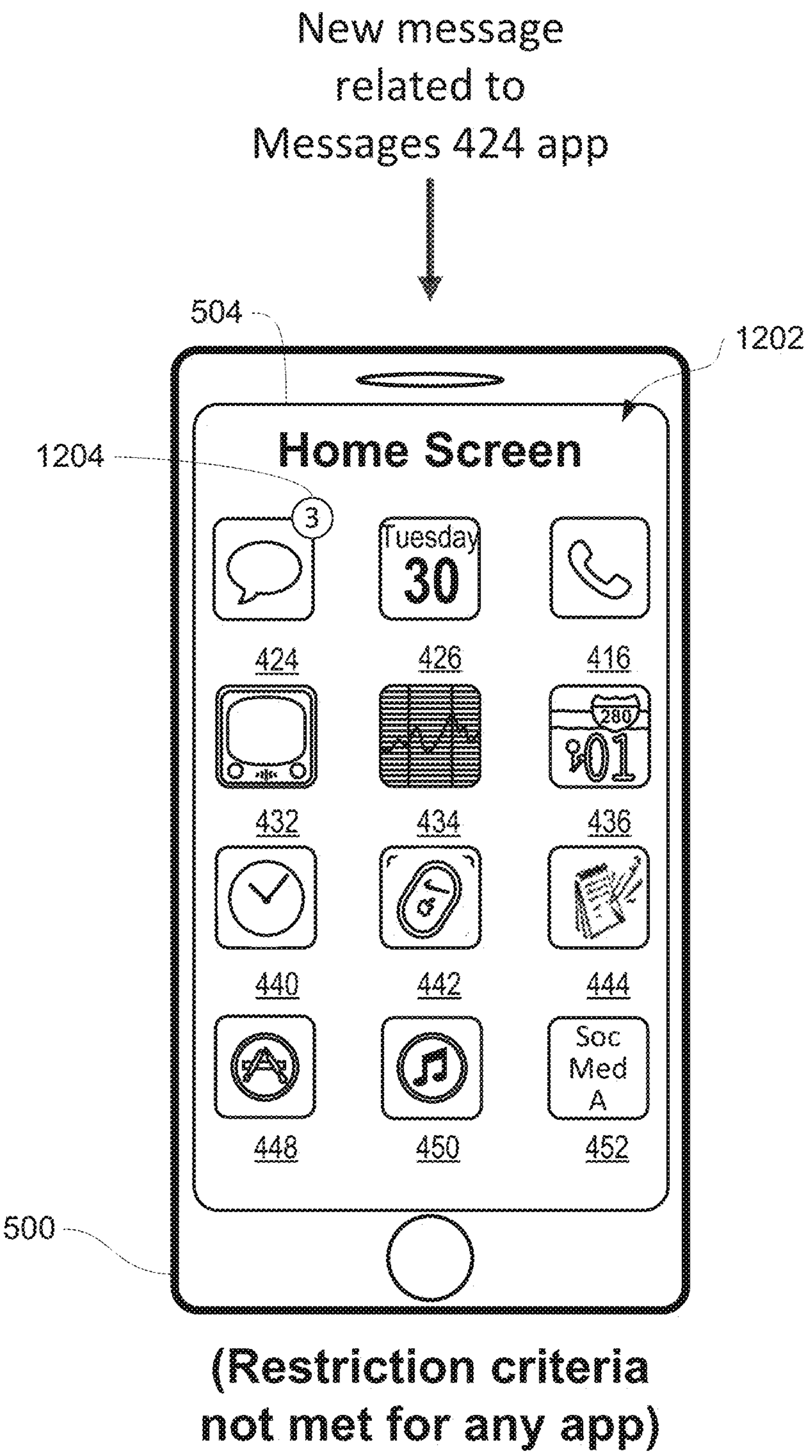
Figure 12F:
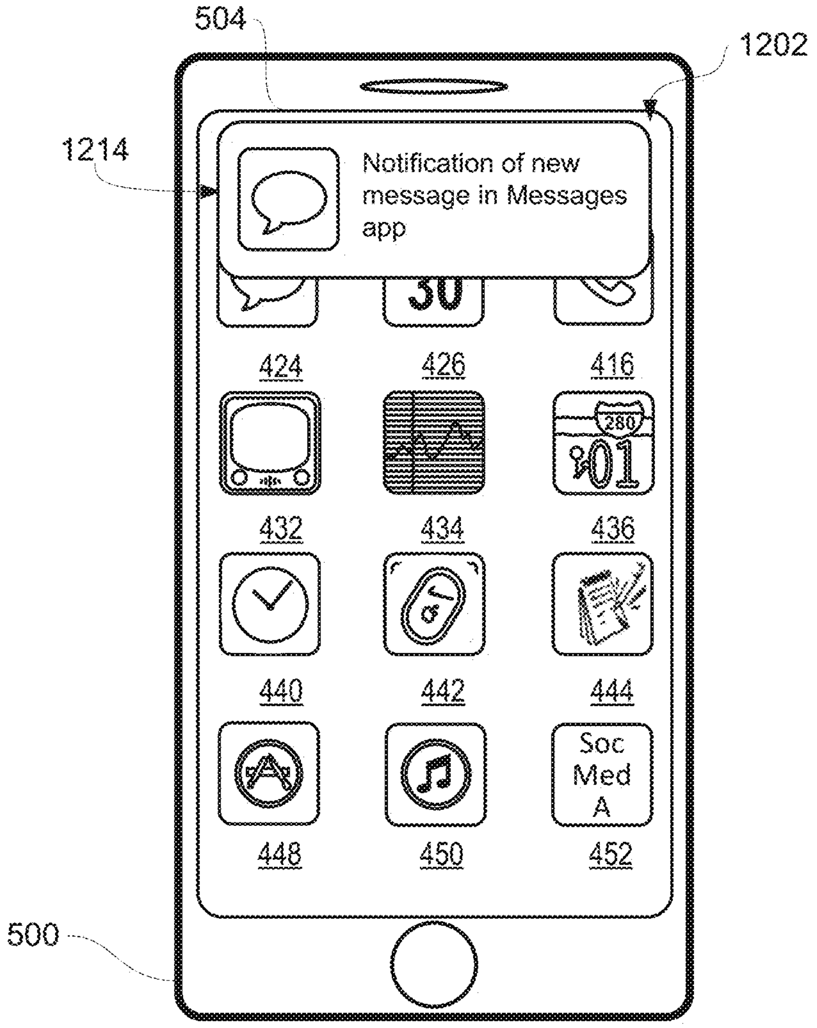

FIG. 12E illustrates a new message being received at device 500 while device 500 is displaying home screen user interface 1202 at a time during which restriction criteria are not met on device 500. In some embodiments, the event of receiving a message at device 500 corresponds to activation of a function to display a notification related to the new message on device 500. For example, FIG. 12F illustrates device 500 displaying a notification 1214 indicating that a new message was received relating to 424 Messages app in response to receiving the message in FIG. 12E. In some embodiments, the event of receiving a new message corresponds to activation of other auxiliary functions, such as updating an unread messages indicator over an application icon. For example, FIG. 12F illustrates device 500 updating indicator 1204 on Messages app 424 in response to detecting the new message for Messages app 424 to reflect that there are now four unread messages in Messages app 424 (including the newly received message).

Figure 12G:
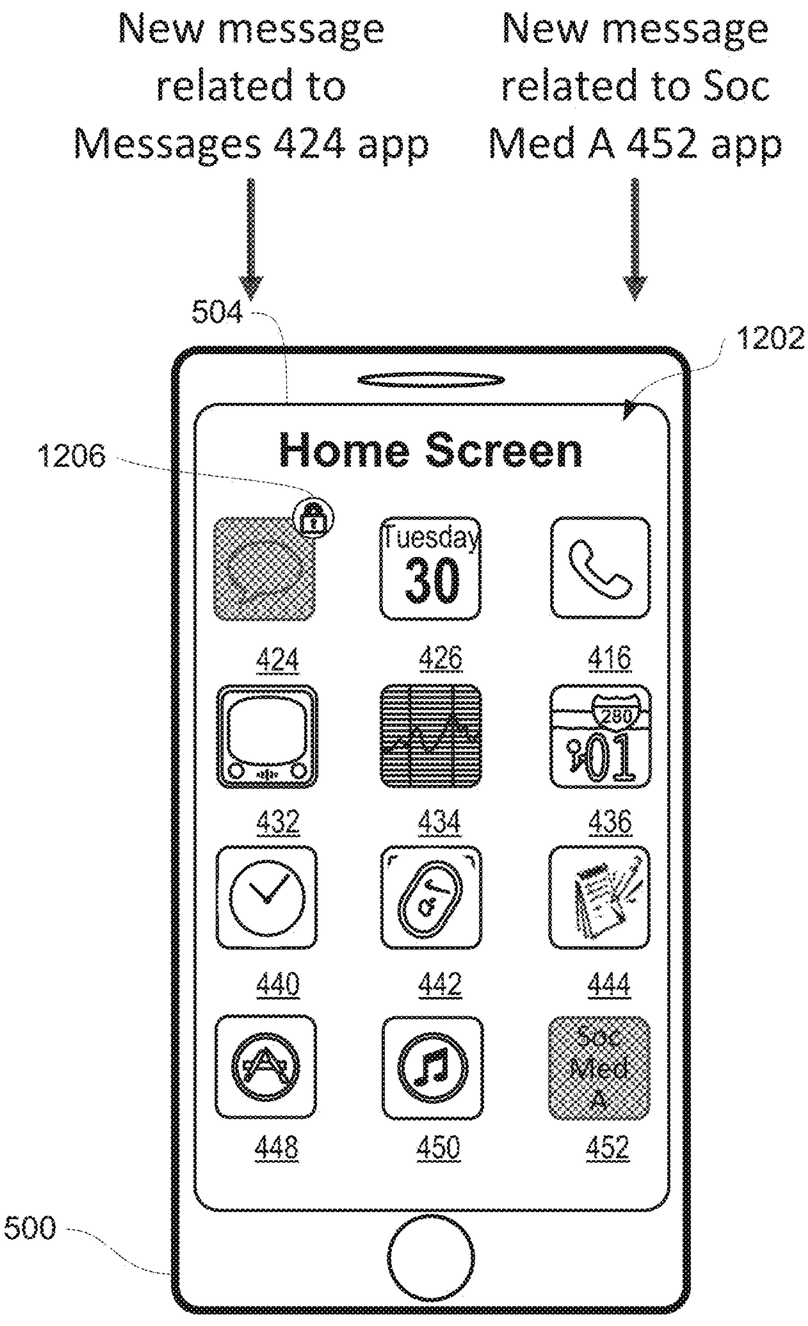

FIG. 12G illustrates touch screen 504 displaying home screen 1202 at a time during which restriction criteria are met for Messages app 424 and Soc Med A app 452 on device 500 (e.g., a user-defined usage limit has been reached and/or the current time is during one or more user-defined windows of time associated with a restricted usage mode) at the time that new messages related to Messages app 424 and Soc Med A app 452 are being received at device 500. In some embodiments, the icons corresponding to restricted apps are altered while restriction criteria are met for those apps. For example, icons 424 and 452, corresponding to restricted Messages app 424 and Soc Med A app 452, are obscured (e.g., distorted, greyed out, faded out, and/or visually altered) while restriction criteria are met for those apps. FIG. 12G illustrates that indicator 1204 associated with Messages app 424 is optionally obscured such that the number of unread notifications (e.g., the number of unread messages in Messaged app 424) are no longer visible. In some embodiments, indicator 1204 is obscured by replacing the indicator with a placeholder generic indication 1206 (e.g., a lock icon), as illustrated in FIG. 12G. In some embodiments, the placeholder generic indication is overlaid over (or partially over) all icons associated with all restricted applications, regardless of whether the restricted application has any unread notifications. In some embodiments, a placeholder generic indicator (e.g., lock icon) is placed over or adjacent to text associated with the application icon of the restricted application.

Figure 12H:
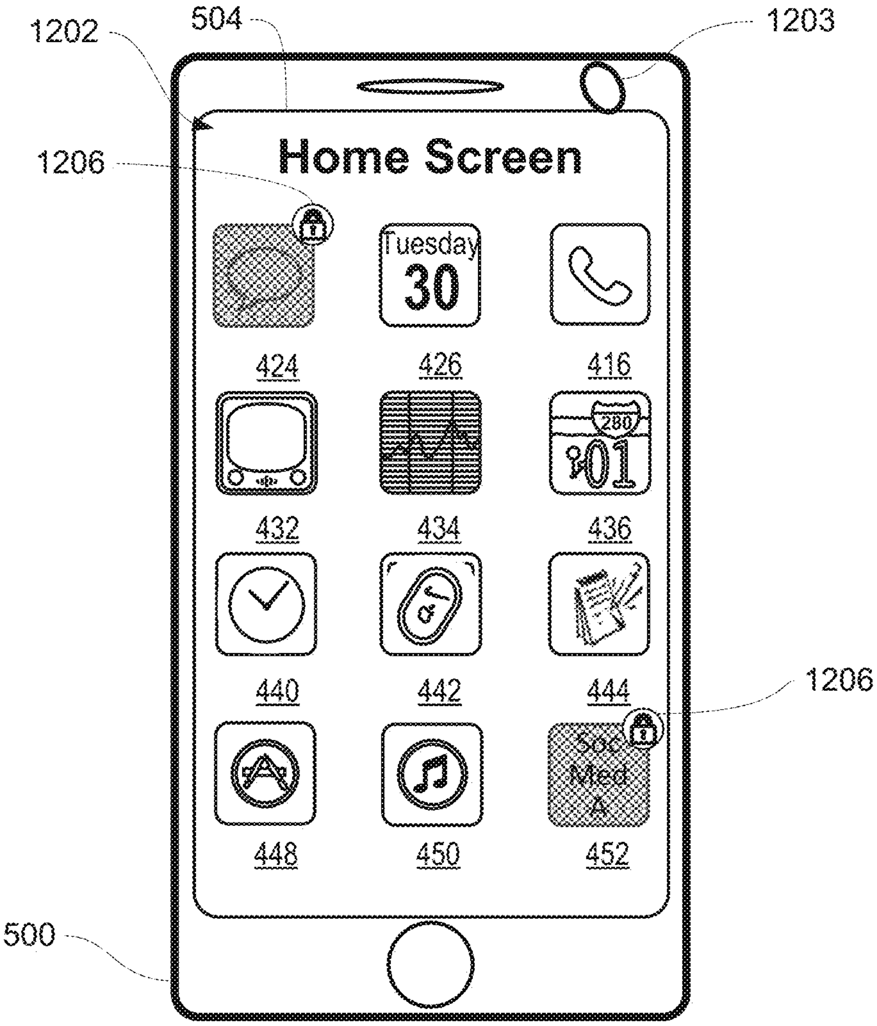

FIG. 12H illustrates device 500 suppressing notifications for restricted applications by foregoing displaying notifications for the two new messages that were received in the Messages and Soc Med A apps while restriction criteria are met for those applications. FIG. 12H further illustrates device 500 foregoing to update indicator 1204 on Messages app 424 to reflect that there are now five unread messages in the Messages app (including the newly received message). In some embodiments, device 500 will place a placeholder generic indication 1206 (e.g., a lock icon) superimposed over (or partially over) the icon associated with a restricted application for which a message was received while restriction criteria are met for that application, as shown in FIG. 12H. For example, FIG. 12H illustrates lock icon 1206 overlaying the top right portion Soc Med A app 452. In some embodiments, the placeholder generic indication is overlaid over (or partially over) all icons associated with all restricted applications, regardless of whether the restricted application has any unread notifications. In some embodiments, a placeholder generic indicator (e.g., lock icon) is placed over or adjacent to text associated with the application icon of the restricted application.

Figure 12I:
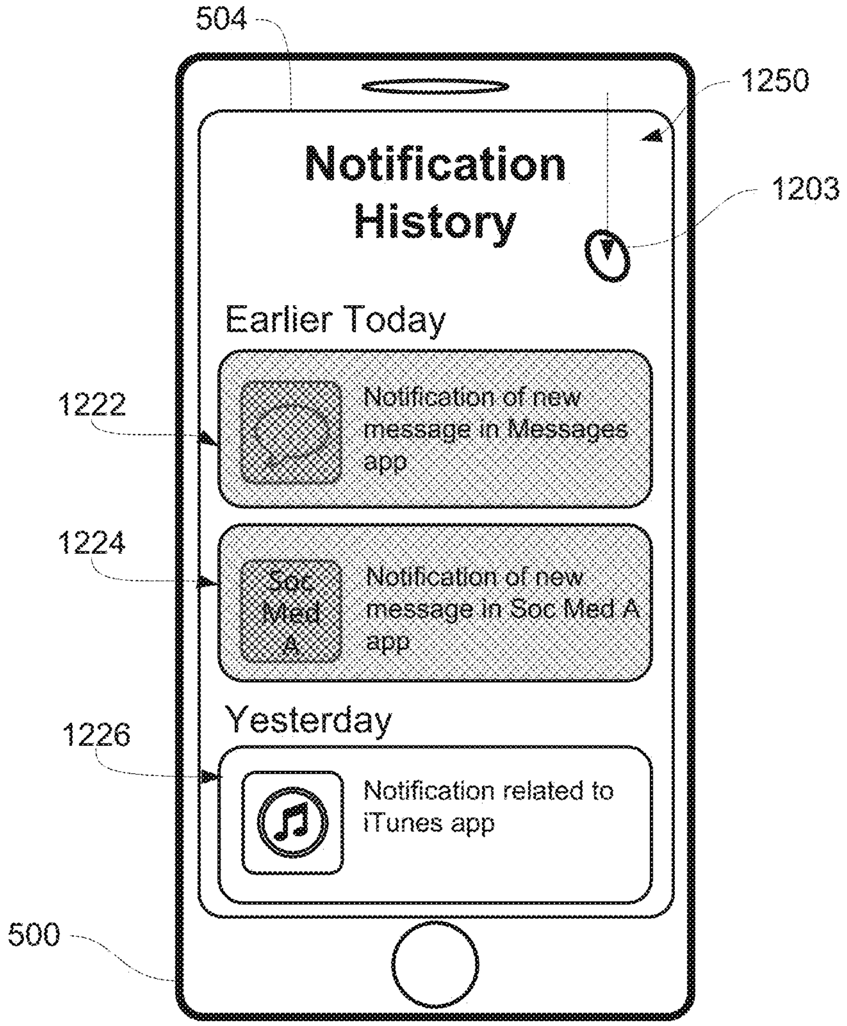

In FIGS. 12H-12I, a vertical swipe of contact 1203 is detected on touch screen 504 while home screen 1202 is displayed (e.g., from an area of touch screen 504 that is not displaying down to the home screen 1202), which causes device 500 to display a notification history interface 1220 at a time during which restriction criteria are met on device 500. Notification history interface 1220 is optionally a user interface of the operating system of device 500 that displays previously received notifications corresponding to one or more applications stored on device 500. In some embodiments, device 500 displays suppressed notifications for restricted applications in the notification history interface 1220. In some embodiments, device 500 visually obscures the notifications of restricted application shown in the notification history interface 1220 (e.g., blurring, greying out, or visually altering the notifications), as shown in FIG. 12I. For example, in FIG. 12I, device 500 displays notification 1222 associated with the Messages app 424 and notification 1224 associated with Soc Med A app 452, which were received at FIG. 12G but were suppressed in FIG. 12H, in notification history interface 1220.

Figure 12J:
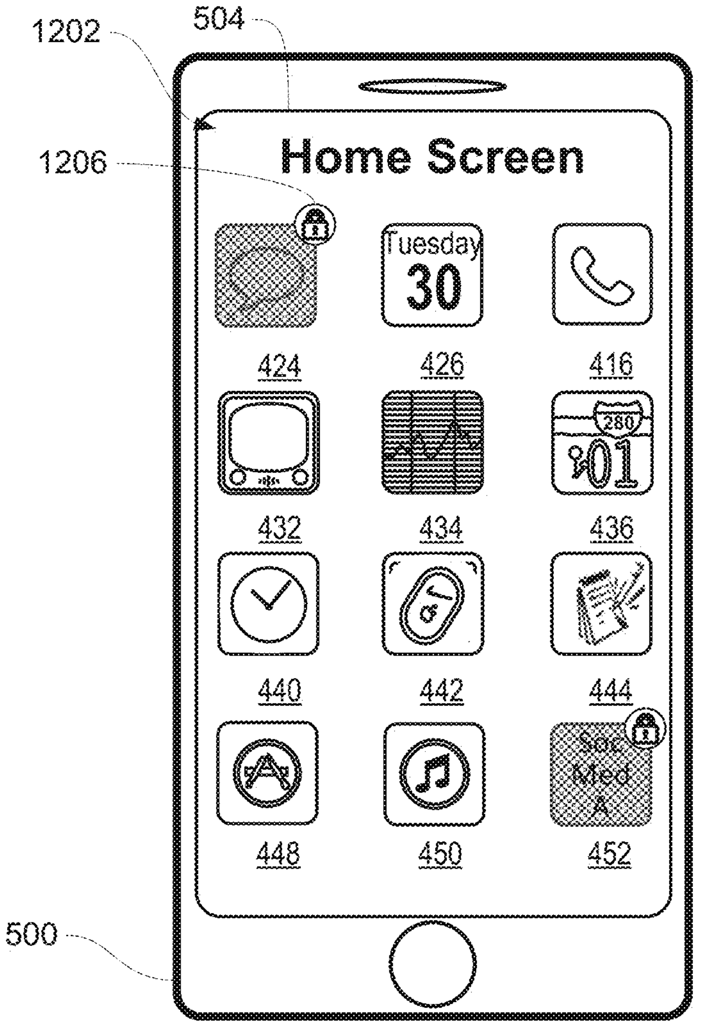
Figure 12K:
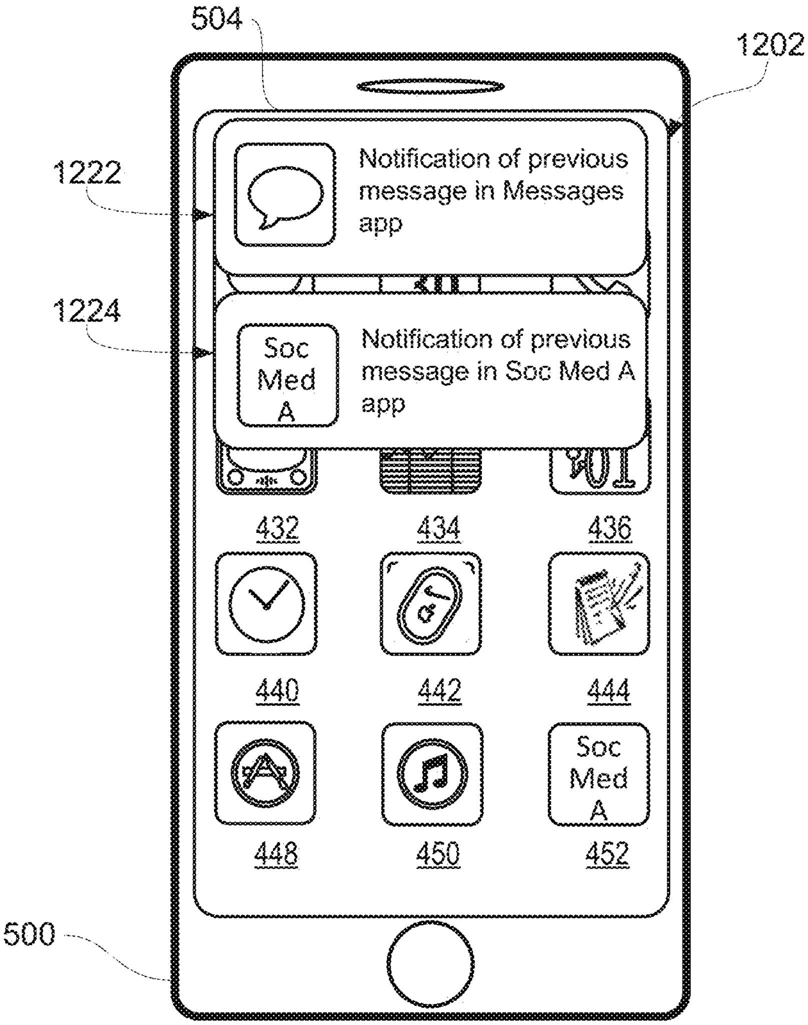

In some embodiments, device 500 displays previously suppressed notifications as if they were just received when the usage limits for the applications associated with those notifications are reset (e.g., after the restriction criteria are no longer met for those applications; for example, after the usage limits for the applications are no longer met, or after the restricted usage mode of the device ends). For example, FIG. 12J illustrates touch screen 504 displaying home screen 1202 at a time during which restriction criteria are met for Messages app 424 and Soc Med A app 452 on device 500 (e.g., a user-defined usage limit has been reached, or the current time is during one or more user-defined windows of time associated with a restricted usage mode) and after new messages related to Messages app 424 and Soc Med A app 452 had been received and suppressed at device 500 while the restriction criteria were met (e.g., as described above with reference to FIGS. 12G-12H). FIG. 12K illustrates device touch screen 504 displaying home screen 1202 when usage limits are reset for the Messages app 424 and Soc Med A app 452 (e.g., at the moment in time in which restriction criteria are no longer met for those applications). In response to the usage limits being reset for the Messages app 424 and Soc Med A app 452 or the restricted usage mode for device 500 ending, device 500 optionally displays, as new notifications, any notifications associated with those applications that were previously suppressed while the restriction criteria for those applications were met. For example, device 500 optionally presents previously suppressed notification 1222 associated with the Messages app 424 and previously suppressed notification 1224 associated with Soc Med A app 452 as "new" notifications (e.g., as if they were just received).

Figure 12L:
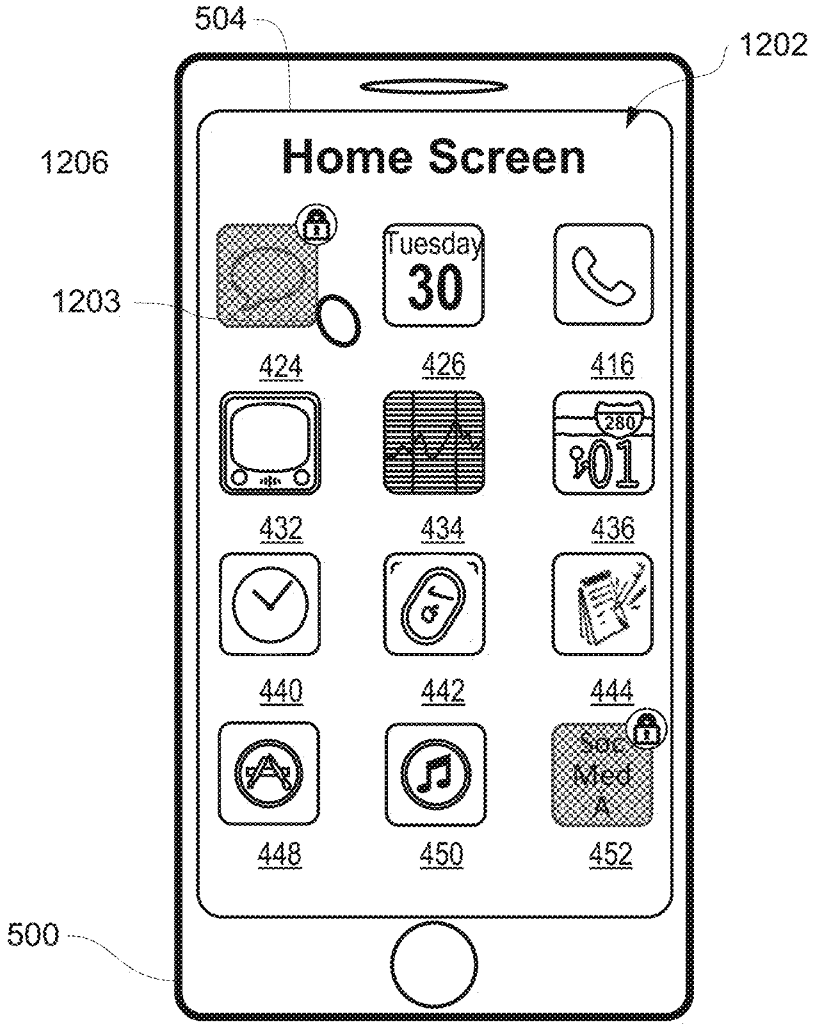
Figure 12M:
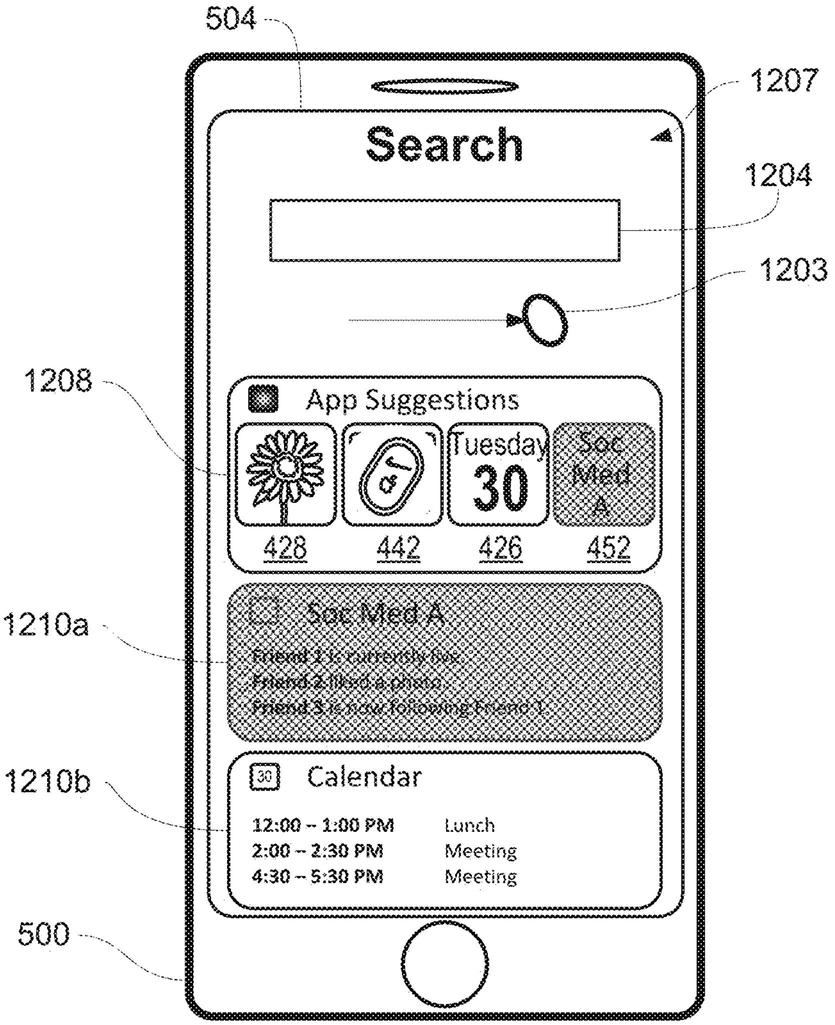

In some embodiments, device 500 suppresses other auxiliary functions associated with restricted applications (e.g., application for which restricted criteria are met), such as suppressing restricted applications in search results, suppressing widgets associated with restricted applications, suppressing restricted applications from appearing in an application suggestions graphical user interface, and/or suppressing windows corresponding to restricted applications from appearing in a multitasking graphical user interface. For example, in FIGS. 12L-12M, a horizontal swipe of contact 1203 is detected on touch screen 504 while home screen 1202 is displayed at a time during which restriction criteria are met for Messages app 424 and Soc Med A app 452 (e.g., as described above with reference to FIGS. 12G-12H), which causes device 500 to display a search user interface 1207 with suppressed auxiliary functions associated with restricted applications. Search user interface 1207 optionally includes text field 1204 for entering one or more search terms to search the content accessible from device 500, "App Suggestions" user interface 1208 for displaying applications suggested to the user by the operating system of device 500, and widgets 1210 corresponding to applications installed on device 500 (e.g., as described above with reference to FIG. 12C). In some embodiments, device 500 suppresses restricted applications in the app suggestions user interface 1208 and widgets associated with restricted applications, as shown in FIG. 12M. For example, device 500 suppresses application suggestions and widgets associated with restricted apps by optionally visually obscuring restricted applications (e.g., blurring, greying out, or visually altering restricted applications) in App Suggestions user interface 1208 (e.g., visually obscure restricted Soc Med A app 452) and visually obscuring widgets associated with restricted applications (e.g., visually obscuring widget 1210*a* associated with restricted Soc Med A app 452), as shown in FIG. 12M. In some embodiments, device 500 suppresses application suggestions and widgets associated with restricted apps by optionally not displaying restricted applications in App Suggestions user interface 1208 and not displaying widgets associated with restricted applications (e.g., forgoing from displaying Soc Med A app 452 and widget 1210*a* associated with restricted Soc Med A app 452), and instead displaying other unrestricted apps (e.g., applications for which restricted criteria are not met) and/or widgets associated with unrestricted apps.

Figure 12N:
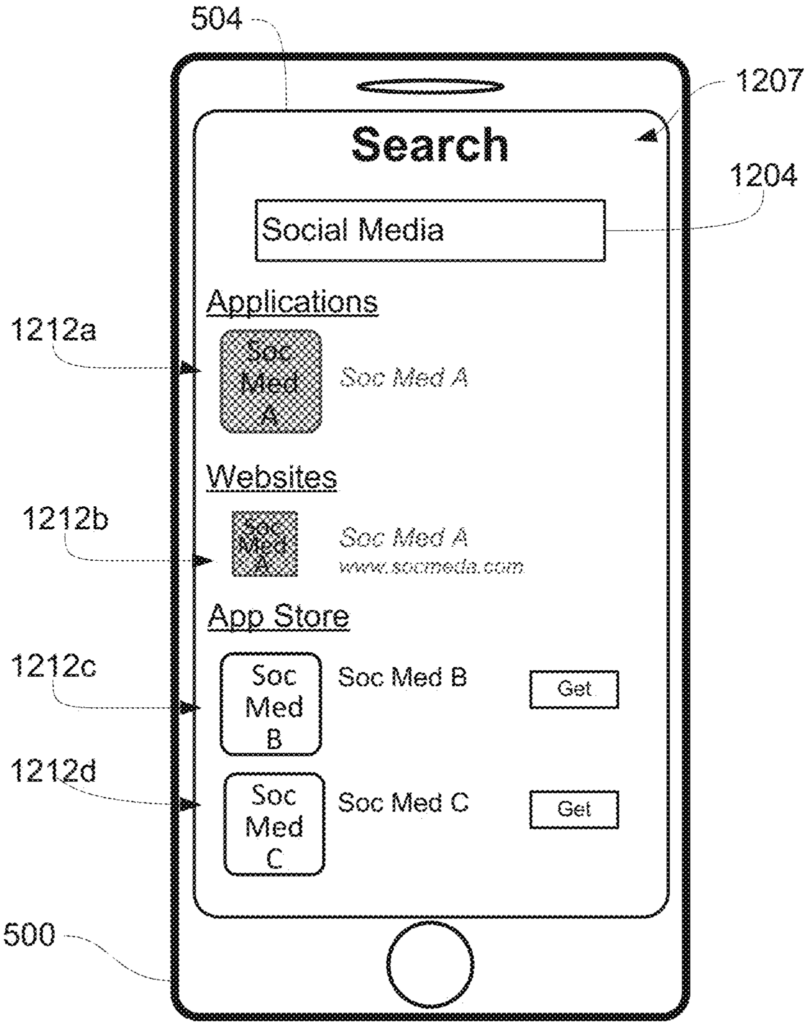
Figure 12O:
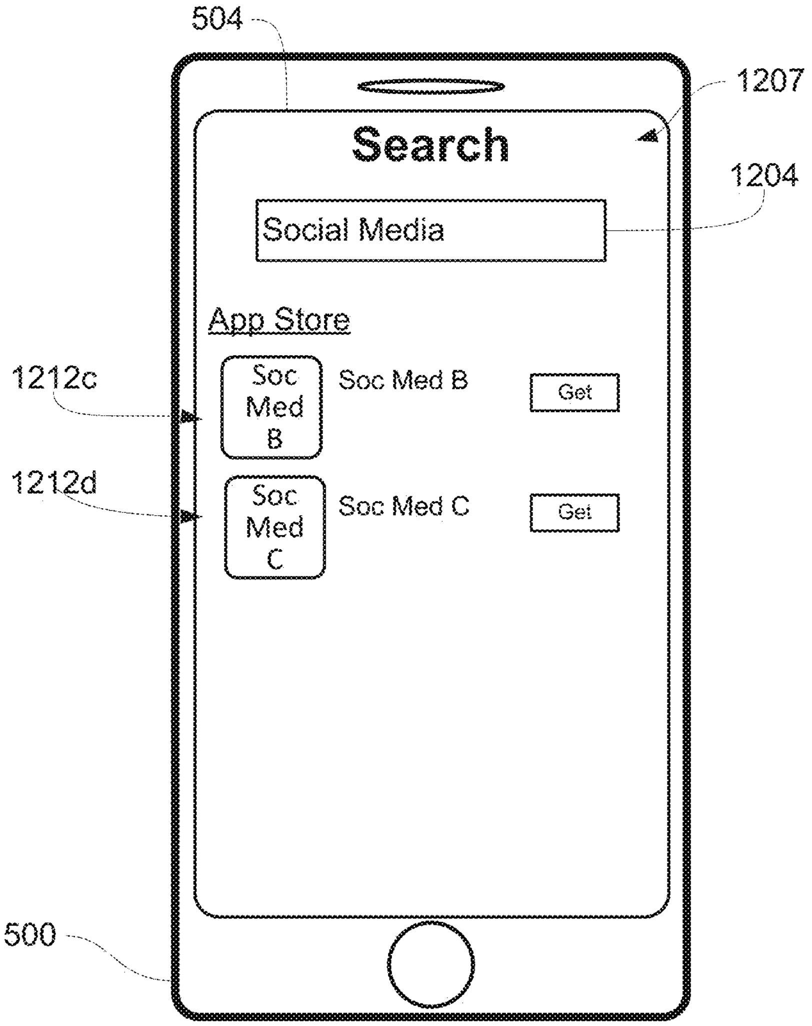

In FIG. 12N, the user has entered the search term "Social Media" into text field 1204 at a time during which restriction criteria are met for the Soc Med A app 452 on device 500. In response to the search term "Social Media" having been entered into text field 1204, device 500 displays various search results in search user interface 1207 relating to the search term "Social Media." For example, device 500 optionally displays a link 1212*a* to social media application "Soc Med A" 452 installed on device 500, a link 1212*b* to social media website "Soc Med A", which is a website related to the "Soc Med A" app, and links to two social media applications available for download from an App Store (e.g., a repository of applications): link 1212*c* to "Soc Med B" and link 1212*d* to "Soc Med C" applications. Because restriction criteria are met for Soc Med A app 452, link 1212*a* and link 1212*b* are suppressed (e.g., visually altered or obscured), as shown in FIG. 12N. In some embodiments, link 1212*a* and link 1212*b* are suppressed by not being displayed by device 500, as shown in FIG. 12O. Instead of displaying link 1212*a* and link 1212*b*, links to other unrestricted apps (e.g., applications for which restricted criteria are not met) are optionally displayed.

Figure 12P:
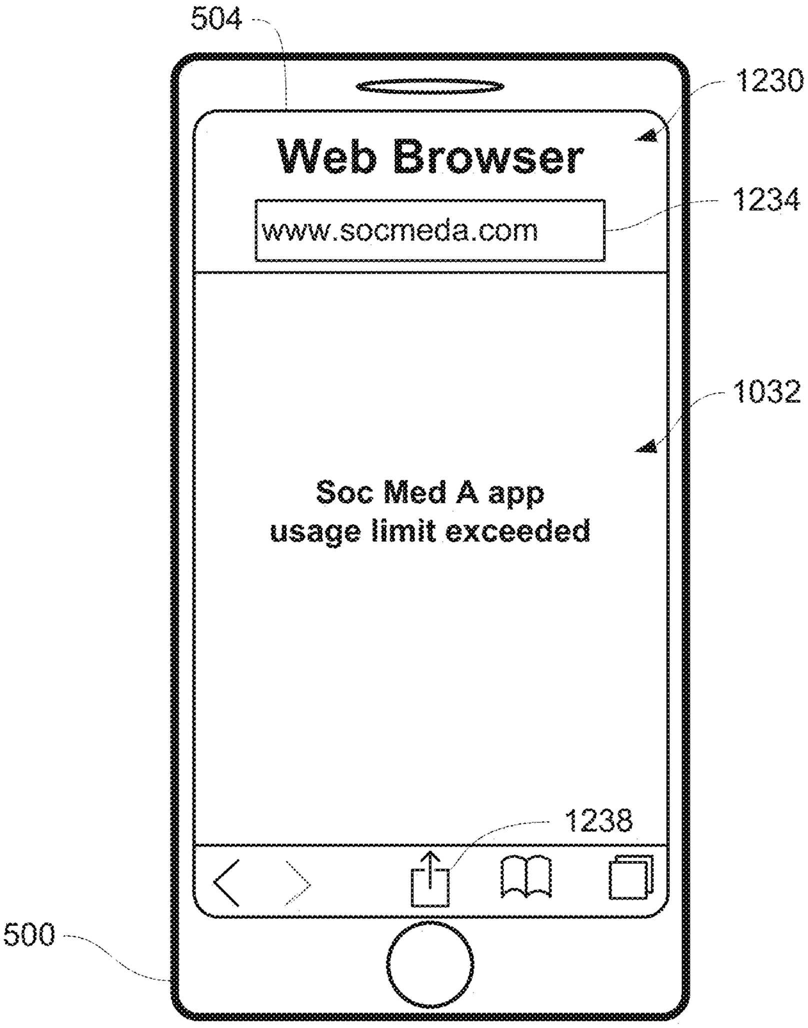
Figure 12Q:
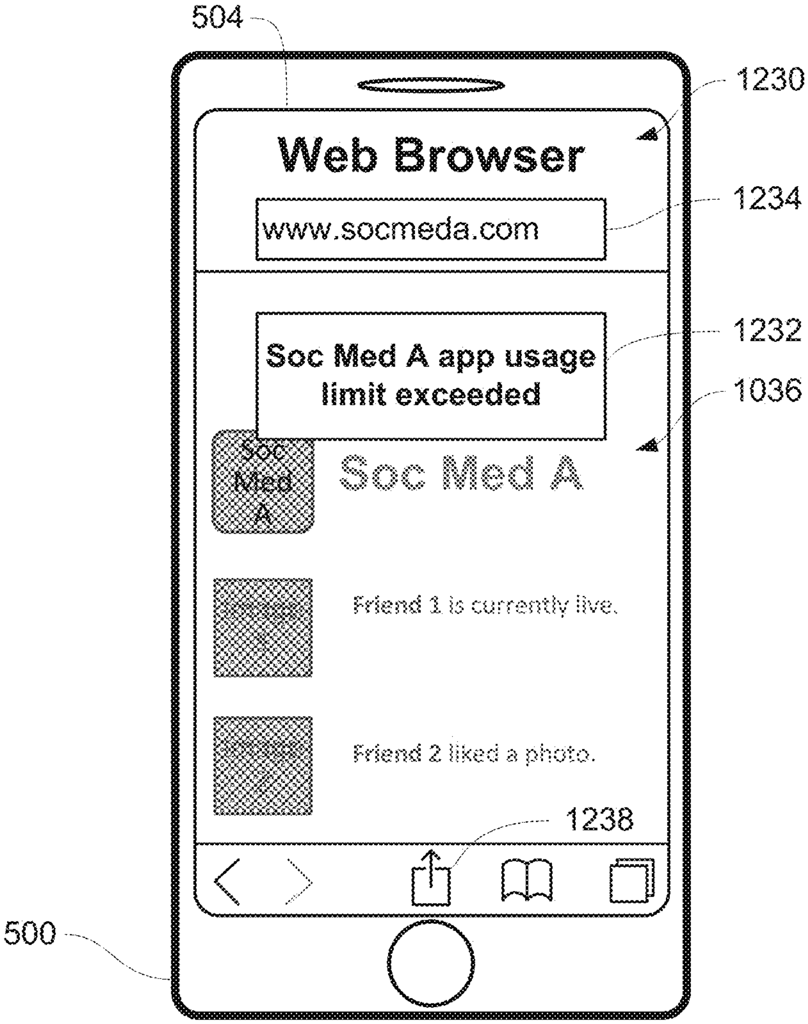
Figure 12R:
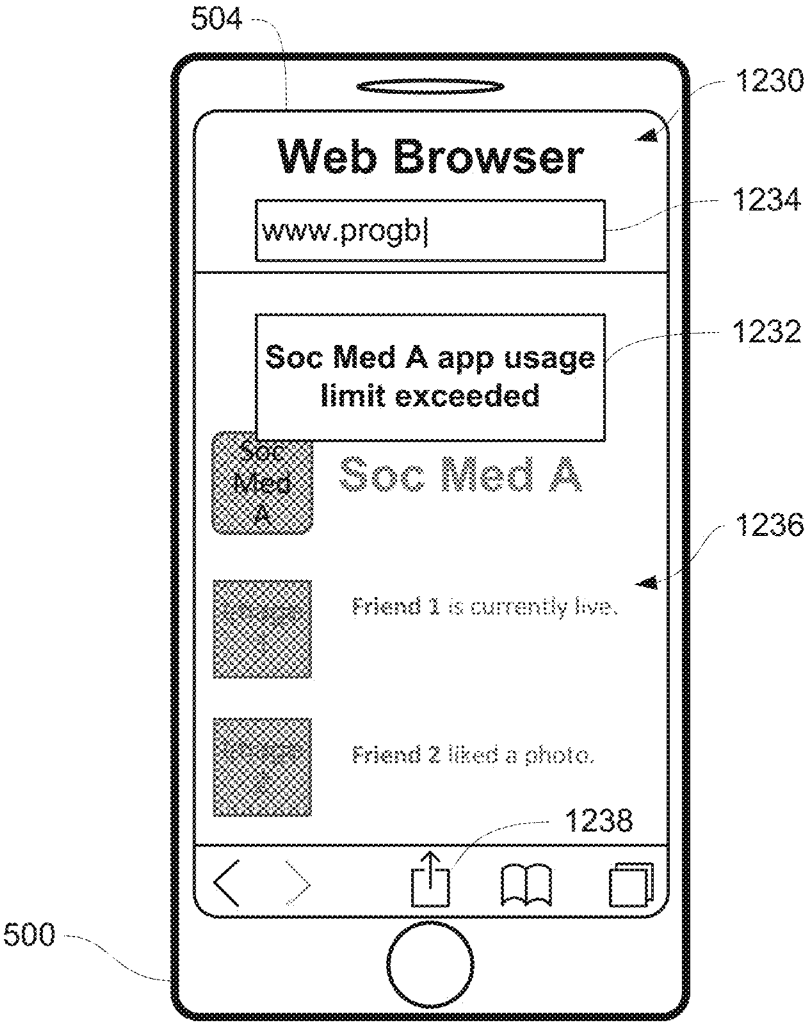
Figure 12S:
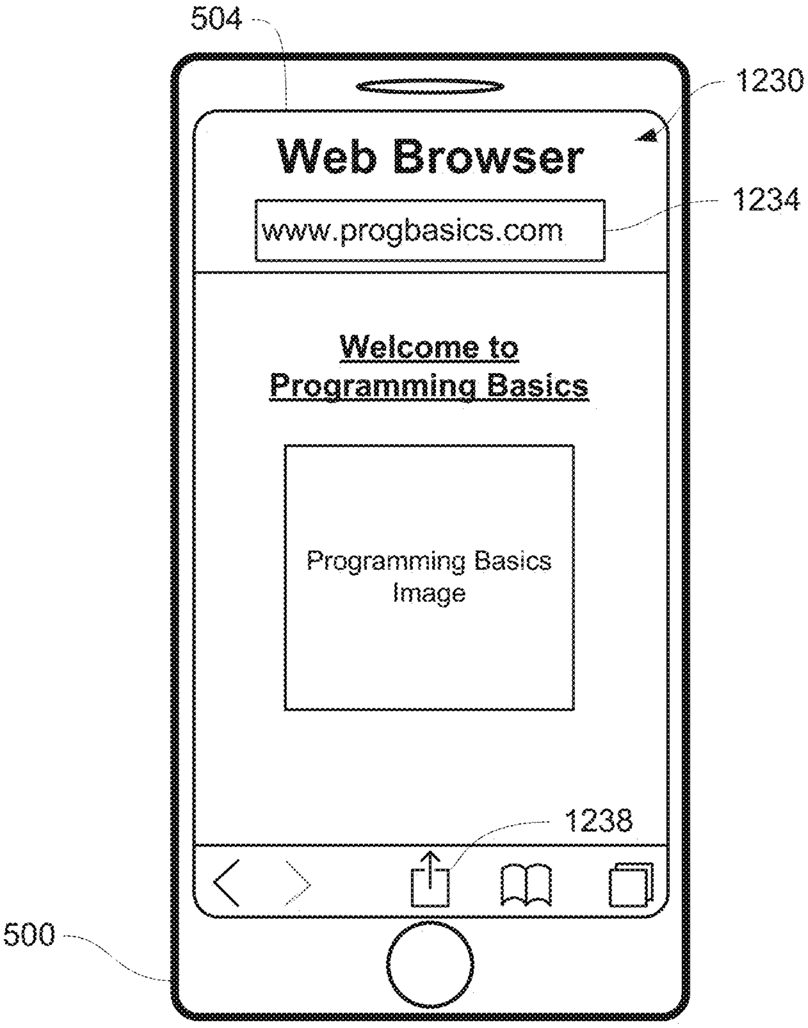

In some embodiments, device 500 suppresses other auxiliary functions associated with restricted applications (e.g., application for which restricted criteria are met), such as suppressing website content associated with restricted applications. For example, FIG. 12P illustrates device 500 displaying a web browser interface 1230 suppressing web content from the website "www.socmeda.com", which is associated with restricted Soc Med A app 452, by forgoing displaying web content from the website. In some embodiments, device 500 suppresses not only the home page of the website associated with the restricted application but also any other web pages of the website (e.g., pages with a same home page URL). In some embodiments, device 500 displays an indication 1232 (e.g., a text and/or images) explaining that the website is restricted because the restriction criteria are met for Soc Med A app 452, as shown in FIG. 12P. In some embodiments, device 500 suppresses web content from a restricted application by obscuring (e.g. blurring, greying out, or visually altering) the web content 1236 and displaying an indication 1232 explaining that the website is restricted, as shown in FIG. 12Q. In some embodiments, web browser interface 1230 includes a URL field 1234 for entering web addresses (e.g., URLs) of websites. Device 500 optionally allows the user to enter a website address in URL field 1234 while suppressing a website associated with a restricted application and allows the user to navigate to another website, as shown in FIGS. 12R-12S.

Figure 12T:
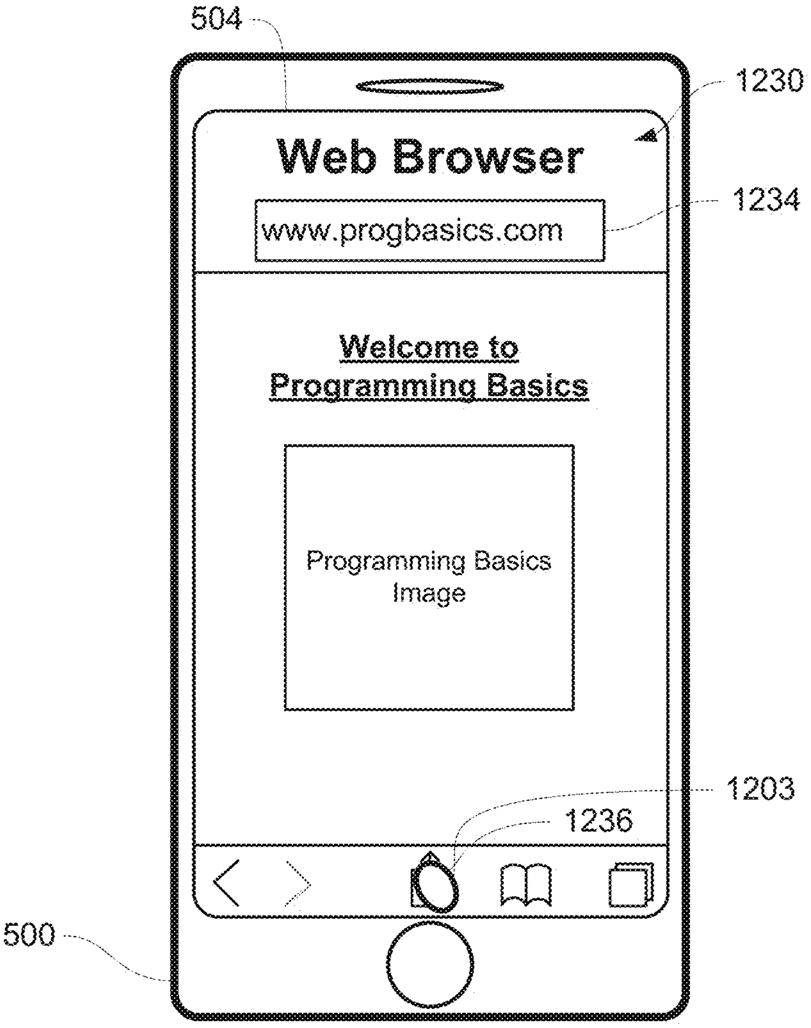
Figure 12U:
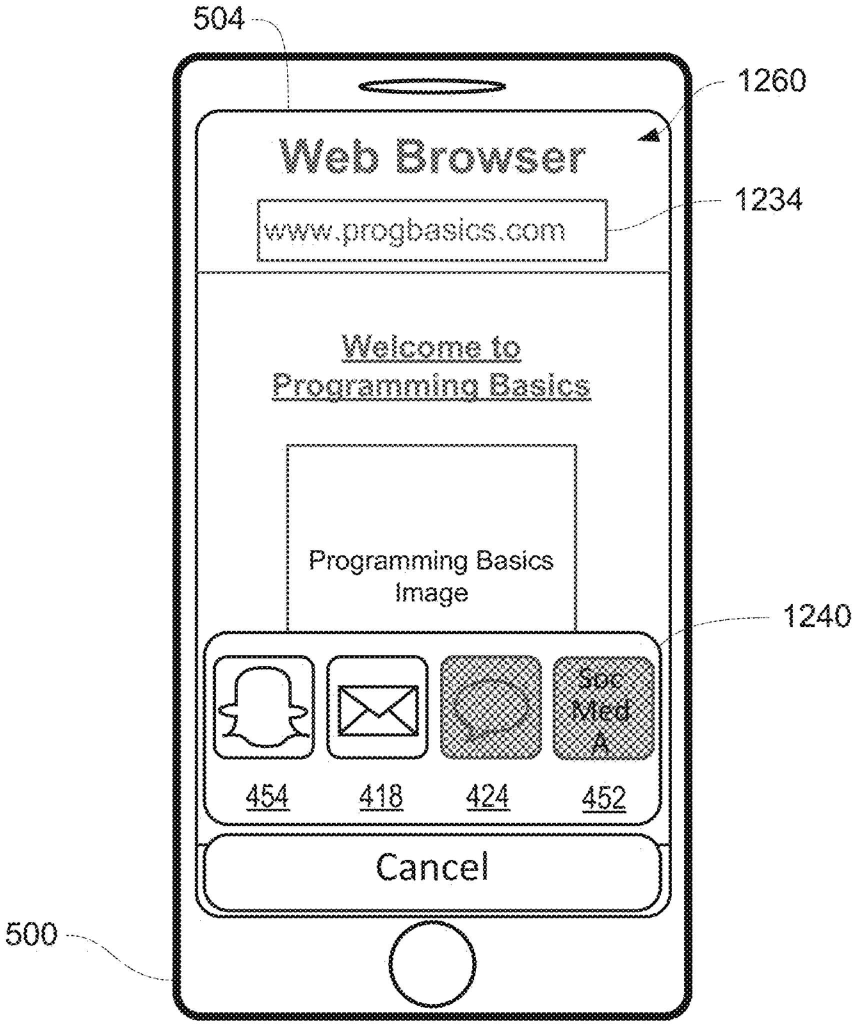

In some embodiments, device 500 allows the user to share content with other via one or more applications installed on the device. FIG. 12T illustrates device 500 displaying web content in web browser interface 1230, which optionally includes a selectable share affordance 1236 for sharing the web content. For example, in FIG. 12T, selection of share affordance 1236 is detected (e.g., by a tap of contact 1003 detected on share affordance 1236, as shown in FIG. 12T). In response to selection of share affordance 1236, device 500 displays share sheet graphical user interface 1240 as shown in FIG. 12U. In some embodiments, share sheet graphical user interface 1240 includes selectable icons of applications installed on device 500 that a user optionally selects to share the web content, as shown in FIG. 12U. In some embodiments, device 500 suppresses the icons of restricted applications in the share sheet graphical user interface 1240. For example, in FIG. 12U, device 500 suppresses restricted Messages app icon 424 and restricted Soc Med A app icon 452 in the share sheet graphical user interface 1240 by visually obscuring restricted Messages app icon 424 and restricted Soc Med A app icon 452 (e.g., by blurring, greying out, or visually altering the icons). In some embodiments, device 500 suppresses restricted Messages app icon 424 and restricted Soc Med A app icon 452 by forgoing displaying restricted Messages app icon 424 and restricted Soc Med A app icon 452 in the share sheet graphical user interface 1240 (e.g., by not displaying icons of restricted applications), and instead displaying other unrestricted apps (e.g., applications for which restricted criteria are not met).

Figure 12V:
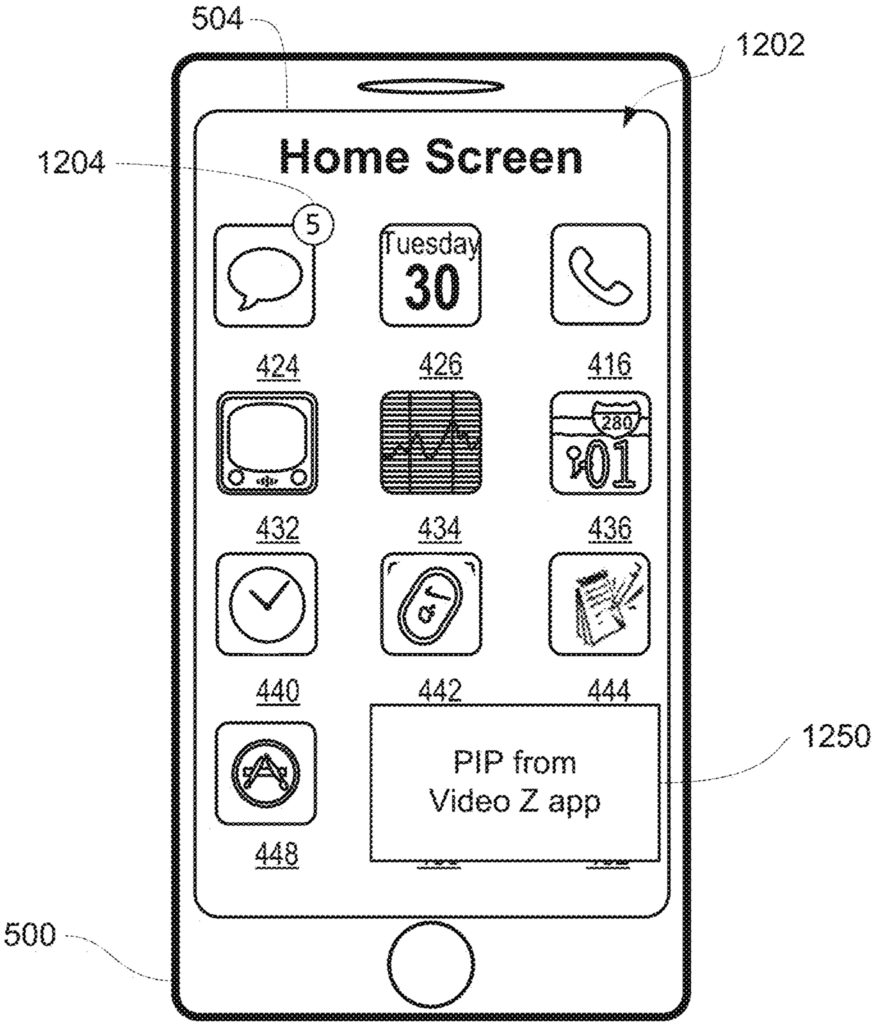
Figure 12W:
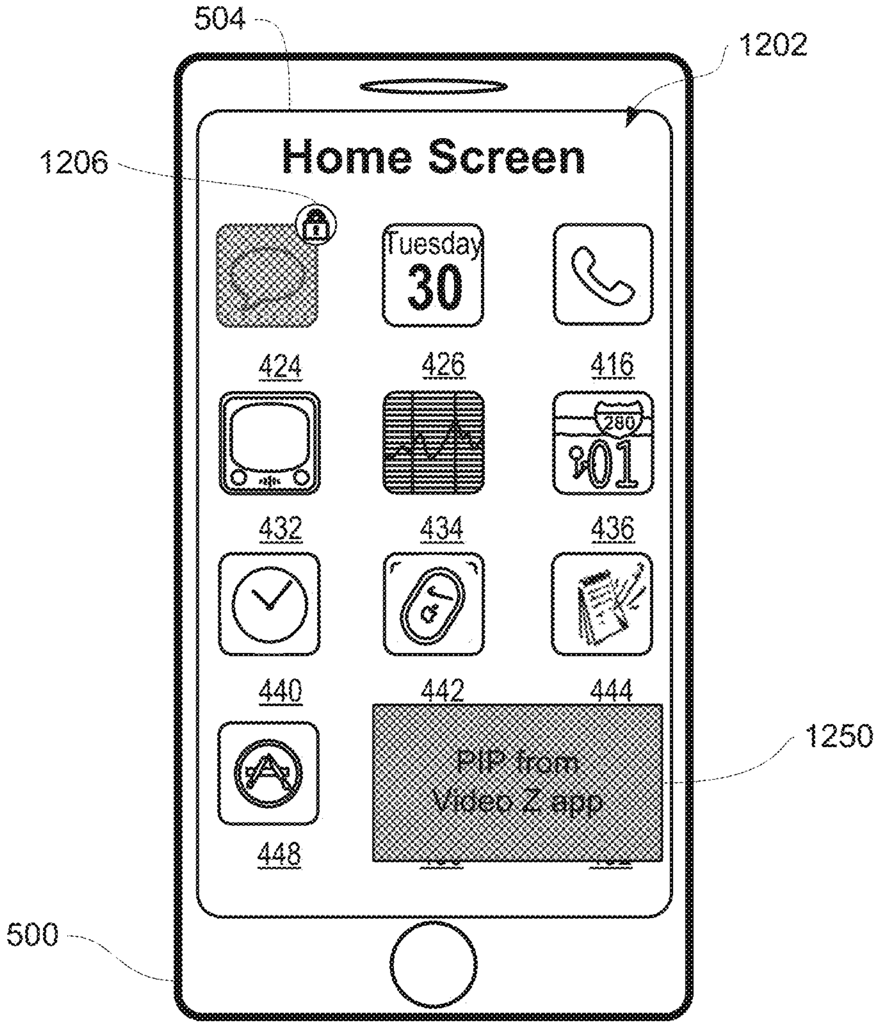
Figure 12X:
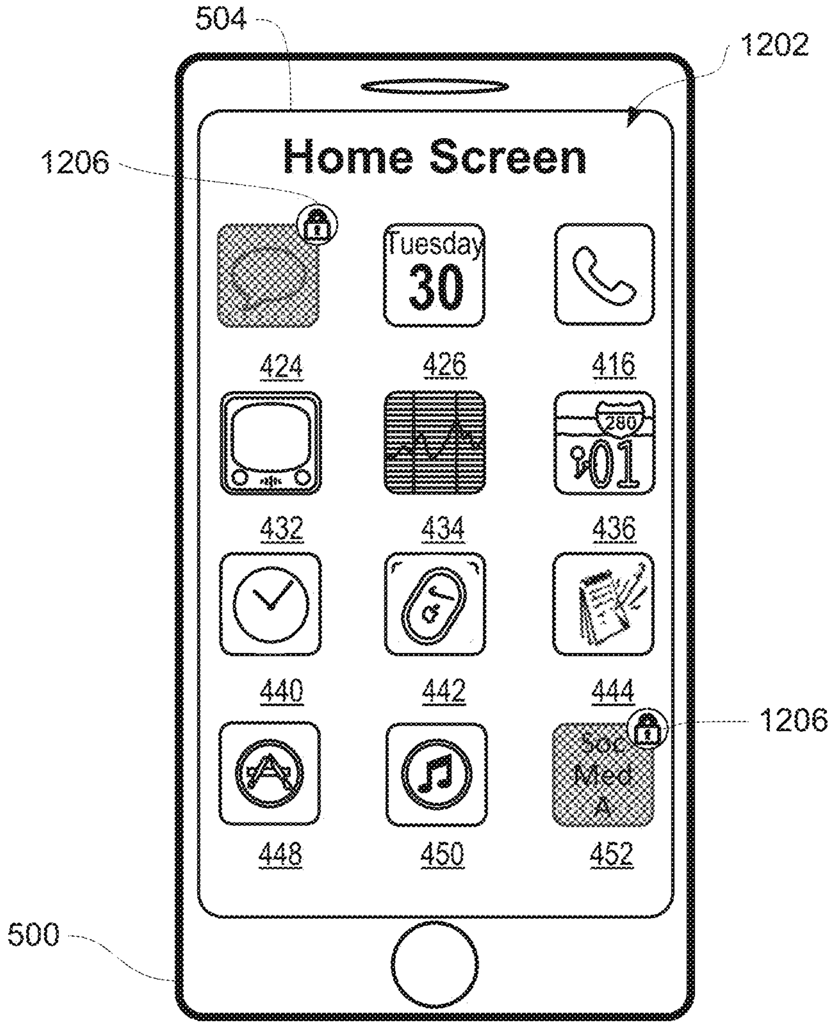

FIG. 12V illustrates device 500 displaying content associated with Video Z app in picture-in-picture (PIP) interface 1250 at a time during which restriction criteria for Video Z app is not met. In some embodiments, PIP interface 1250 is displayed over another user interface (e.g., over a home screen, a primary user interface of another application, user interfaces of other applications) as shown in FIG. 12V. In some embodiments, device 500 suppresses application content from being displayed in a picture-in-picture (PIP) interface 1250 when restriction criteria for that application are met. For example, FIG. 12W illustrates suppressing displaying content associated with Video Z app in PIP interface 1250 at a time during which restriction criteria for Video Z app is met. In some embodiments, device 500 suppresses displaying content associated with Video Z app in PIP interface 1250 by visually obscuring (e.g. blurring, greying out, or visually altering) the content and/or PIP interface 1250, as shown in FIG. 12W. In some embodiments, device 500 suppresses displaying content associated with Video Z app in PIP interface 1250 by foregoing display of the content associated with Video Z app in the PIP interface 1250. If PIP interface 1250 is currently displaying content associated with Video Z app when the restriction criteria are met, device 500, in some embodiments, suppresses displaying content associated with Video Z app by stopping the display of the content in the PIP interface 1250 (e.g., closing the PIP window) and/or obscuring the PIP interface 1250 (e.g., graying or fading out the PIP window) and/or pausing playback of the video. In some embodiments, device 500 suppresses displaying content associated with Video Z app in PIP interface 1250 by visually obscuring the content and/or PIP interface 1250 and automatically closing the PIP interface 1250 after a period of time (e.g., 5 seconds, 10 seconds, 20 seconds), as illustrated in FIG. 12X (e.g., showing device 500 after ceasing to display PIP interface 1250).

In some embodiments, device 500 suppresses other auxiliary functions associated with restricted applications (e.g., application for which restricted criteria are met), such as suppressing a media control interface for controlling media content associated with restricted applications. For example, in FIGS. 12Y-12Z, a vertical swipe of contact 1203 is detected on touch screen 504 while home screen 1202 is displayed (e.g., from an area of touch screen 504 that is not displaying up to the home screen 1202), which causes device 500 to display a media control interface 1260 at a time during which restriction criteria are not met on device 500. Media control interface 1260 is optionally a user interface of the operating system of device 500 that controls the play back of content from various applications on device 500. Media control interface 1260 optionally includes media control buttons 1262 for controlling media content and media content information 1264 indicating what media content the media control interface 1260 is currently controlling, as shown in FIG. 12Z. For example, FIG. 12Z illustrates device 500 controlling media play back of the song "Hit Song" by "Pop Star" through a Music app. In some embodiments, device 500 suppresses media control interface 1260 for media content associated with restricted applications (e.g., applications for which restricted criteria are met). For example, FIG. 12AA illustrates device 500 displaying media control interface 1260 at a time during which restriction criteria are met for Music app, Messages app 424, and Soc Med A app 452 on device 500, and suppressing media control interface 1260 for controlling media content associated with the Music app. In some embodiments, device 500 suppresses device 500 suppress media control interface 1260 by stopping the playback of media content associated with the Music app and disabling the media control buttons 1262 (e.g., not allowing the buttons to be used to control media content associated with a restricted application), as shown in FIG. 12AA. In some embodiments, device 500 also visually obscures media control buttons 1262 (e.g., by blurring, greying, or visually altering the media control buttons), as shown in FIG. 12AA. In some embodiments, device 500 automatically resets media control interface 1260 after a period of time (e.g., 5 seconds, 10 seconds, 20 seconds), as illustrated in FIG. 12BB. For example, FIG. 12BB shows device 500 no longer playing media content associated with the Music app (e.g., media content information 1264 associated with the Music app is no longer displayed) and device 500 no longer disabling media control buttons 1262. In some embodiments, device 500 ceases display of media control interface 1260 a time period (e.g., 5 seconds, 10 seconds, 20 seconds) after the restriction criteria are met and/or a time period after device 500 resets the media control interface 1260.

FIGS. 13A-13H are flow diagrams illustrating a method 1300 of suppressing auxiliary functions of certain applications when an application usage limit or restriction criteria associated with those applications is reached in accordance with some embodiments of the disclosure. The method 1300 is optionally performed at an electronic device such as device 100, device 300, or device 500, as described above with reference to FIGS. 1A-1B, 2-3, 4A-4B and 5A-5H. Some operations in method 1300 are, optionally, combined, and/or the order of some operations is, optionally, changed.

As described below, the method 1300 provides ways to suppress auxiliary functions of certain applications when an application usage limit associated with those applications is reached. The method reduces overall usage of the electronic device by limiting the ways in which the user interacts with certain applications. For battery-operated electronic devices, reducing the overall usage of the electronic device conserves power and increases the time between battery charges.

In some embodiments, an electronic device in communication with a display and one or more input devices (e.g., a mobile device including a touch screen, such as device 500 including touch screen 504, a computer, or tablet computer, including one or more of a keyboard, mouse, trackpad, touch screen, such as touch screen 504, a wearable device such as a smart watch including a touch screen, or a set top box in communication with a television and an input device (e.g., a remote control)), while enforcing restrictions (e.g., maintaining screen time information, time using particular applications, information about notifications received from particular applications, information about attention events, and optionally controlling the amount of the above that the electronic device allows (e.g., usage limits, bedtime restrictions, etc.)) for one or more applications, including a first application of a plurality of applications installed on the electronic device, detects (1302) an event (e.g., occurrence of an event that would trigger display of a notification for the application, a request to display a widget corresponding to the application, a request to share content with the application via a system sharing user interface, a request to view a web site associated with the application, a request to view a history of prior notifications (including notifications of the application), a request to display application content in picture-in-picture (PIP) mode, a request to display the application in search results, a request to view a multitasking graphical user interface, or a request to display and/or perform media control operations associated with the application) that corresponds to activation of an auxiliary function of the first application, wherein the auxiliary function of the first application is a function (e.g., displaying interactive notification, performing share sheet action, displaying widget, displaying notification history, displaying website in browser, displaying application content in PIP mode, displaying application in search results, displaying application windows in a multitasking graphical user interface, or displaying and/or controlling media control operations) that is available to be performed without displaying a primary user interface of the first application (e.g., without launching the application in an application window or other primary view of the application), such as in FIG. 12C. In some embodiments, usage limits for the one or more applications are enforced over a period of time (e.g., over a twenty-four hour period, a week, or any other period of time).

In some embodiments, in response to detecting the event that corresponds to activation of the auxiliary function of the first application (1304), in accordance with a determination that restriction criteria (e.g., a user-defined "limit" of usage for the application (e.g., a usage limit or allowance) has been reached) for the first application have been met, the electronic device suppresses (1306) the auxiliary function (e.g., suppressing notification generation functions associated with the application, the display of website(s) associated with the application, share sheet action(s), the display of a window corresponding to the application in a multitasking graphical user interface, the display of application content in PIP mode, and any other functions associated with the application (including operating system functions) (e.g., restricting the app from appearing in search results, restricting access to a widget associated with the application, restricting the application from appearing as a suggested application, or restricting the window corresponding to the application from appearing in a multitasking graphical user interface)), such as in FIG. 12M. In some embodiments, the usage limit is set for overall device usage, usage of a plurality of applications within a given category of applications, or for a particular application. In some embodiments, the launching of the application is also suppressed (e.g., restricted). In some embodiments, the auxiliary function is suppressed by preventing the function from being performed in response to detecting the event.

In some embodiments, in response to detecting the event that corresponds to activation of the auxiliary function of the first application (1304), in accordance with a determination that the restriction criteria have not been met, the electronic device performs (1308) the auxiliary function without displaying the primary user interface of the application (e.g., allowing normal use of or performance of various application-related functions on the electronic device, such as generation of notifications from the application, share sheet actions, displaying of website associated with the application, displaying of application content in PIP mode, displaying a widget associated with application, displaying a window corresponding to the application from appearing in a multitasking graphical user interface, etc.), such as in FIG. 12C. The restrictions and auxiliary functions described herein are optionally the same or similar to the restricted usage modes, the auxiliary functions and/or the application usage limits described with reference to methods 700, 900, and 1100. The above-described manner of suppressing functions of applications for which usage limits have been exceeded allows the electronic device to efficiently reduce overall usage of the electronic device, which reduces power consumption and improves battery life of the device.

The auxiliary function optionally comprises presenting a first type of indication (e.g., displaying a visual indication on the display, playing a sound with a speaker associated with the electronic device, generating haptic(s) and/or tactile output(s), etc.) of a notification associated with the first application (e.g., alerts and/or notifications generated by the application) in response to the occurrence of the event corresponding to activation of the notification (1310), such as in FIG. 12F. In some embodiments, a notification comprises a visual indication (e.g., a window, pop-up box), including text and/or an image. Additionally or alternatively, a notification optionally includes a sound and/or haptic and/or tactile output indication. In some embodiments, the electronic device suppresses notifications associated with the application for which a usage limit has been exceeded. In some embodiments, notifications are suppressed by forgoing the display of the user visual indication (e.g., text and/or image) or forgoing the generation of the notification. In some embodiments, notifications are suppressed by obscuring the user visual indication (e.g., visually altering the visual indication, text, and/or image). In some embodiments, a notification is suppressed by forgoing performing a sound and/or haptic and/or tactile output indication associated with the application. In some embodiments, performing the auxiliary function comprises presenting notifications generated by the first application. The above-described manner of suppressing notifications associated with applications for which restriction criteria are met allows the electronic device to efficiently reduce overall usage of the electronic device (e.g., by not performing notification functions and, thus, not prompting the user to interact with the notification and/or electronic device), which reduces power consumption and improves battery life of the device.

In some embodiments, detecting the event that corresponds to activation of an auxiliary function of the first application comprises detecting the occurrence of the event corresponding to activation of the notification associated with the first application (1312) (e.g., detecting occurrence of an event that would trigger presentation of a notification), such as in FIG. 12E. In some embodiments, suppressing the auxiliary function comprises forgoing presenting the first type of indication in response to the notification generated by the first application (1314) (e.g., suppress the notification associated with the restricted application), such as in FIGS. 12G-12H. In some embodiments, notifications are suppressed by forgoing the display of the user visual indication (e.g., text and/or image) or forgoing the generation of the notification. In some embodiments, notifications are suppressed by obscuring the user visual indication (e.g., visually altering the visual indication, text, and/or image). In some embodiments, a notification is suppressed by forgoing performing a sound and/or haptic and/or tactile output indication associated with the application.

In some embodiments, performing the auxiliary function comprises presenting the first type of indication in response to the notification generated by the first application (1316) (e.g., display a banner, a pop-up notification, or a lock screen notification), such as in FIG. 12F. In some embodiments, performing the auxiliary function comprises presenting notifications generated by the first application. The above-described manner of suppressing notifications associated with applications for which restriction criteria are met, and not suppressing notifications associated with applications for which restriction criteria are not met, allows the electronic device to efficiently and selectively reduce usage of the electronic device (e.g., by not performing notification functions for certain applications and, thus, not prompting the user to interact with the notification and/or electronic device), which reduces power consumption and improves battery life of the device.

In some embodiments, in accordance with the determination that the restriction criteria for the first application are met (1318), the electronic device includes (1319) a visual indication (e.g., an image, window, text, etc.) of the first type of indication in a notification history user interface (e.g., a user interface for displaying visual indications of a plurality of notifications previously generated by one or more applications of the electronic device), such as in FIG. 12I. In some embodiments, the notification history user interface further comprises one or more indications of notifications generated by one or more applications other than the first application (1319). In some embodiments, the electronic device displays a notification history for a plurality of applications, including visual indications of any suppressed notifications generated by the first application in the notification history user interface.

In some embodiments, the notifications generated by the plurality of applications, including the first application, are displayed in a notification history user interface (e.g., window) dedicated to displaying notifications that have been received via multiple applications on the electronic device (e.g., even in accordance with a determination that the restriction criteria for the first application are met). This optionally allows the user to later browse the notifications of the application that were suppressed. In some embodiments, visual indications of notifications from applications that are not suppressed are also presented outside of the notification history user interface (in addition to being presented in the notification history user interface), while visual indications of notifications from applications that are suppressed (e.g., the first application) are only presented in the notification history user interface. The above-described manner of displaying suppressed notification(s) associated with applications for which restriction criteria are met in a notification history allows the electronic device to efficiently organize and display otherwise suppressed notifications without pushing the notifications through (e.g., by not alerting the user of the notification with a pop-up window, sound, and/or haptic and/or tactile output indication upon generation of the notification), which reduces overall usage of the electronic device (e.g., by not prompting the user to interact with the notification and/or electronic device), which reduces power consumption and improves battery life of the device.

In some embodiments, suppressing the auxiliary function comprises forgoing presenting the first type of indication in response to the notification generated by the first application (1320) (e.g., do not actively present new indications (e.g., images, sounds, and haptics and/or tactile outputs) of any notifications associated with the application while the usage limit for that application have already been exceeded), such as in FIGS. 12G-12H. In some embodiments, after suppressing auxiliary function of the first application, the electronic device determines (1322) that the restriction criteria for the first application are no longer met (e.g., usage of the first application no longer meets a usage limit for the first application, the device is no longer in a restricted usage (e.g., device downtime or bedtime mode), etc.), such as in FIG. 12K. In some embodiments, in response to determining that the restriction criteria for the first application are no longer met, the electronic device presents (1324) the indication for the notification generated by the first application (e.g., display notifications in a notification history user interface and/or as "new" notifications actively presented as if they were just received when the usage limits are reset), such as in FIG. 12K. In some embodiments, notifications generated by an application during a period in which the usage limit for that application have been reached are presented to the user when the usage limit for that application are reset and are thus no longer exceeded. For example, if the usage limit for the relevant application is a limit per day, the usage limit optionally resets at midnight for the next day. In such circumstances, upon the usage limit for the application resetting at midnight, the electronic device optionally displays the previously-suppressed notifications in a user interface that the notifications would have been presented previously had they not been suppressed (e.g., on a wake or lock screen of the device). In some embodiments, the notifications will all be performed at once (e.g., in one alert, window, or pop-up box containing all previously suppressed notifications) or will be displayed separately/sequentially. The above-described manner of presenting notifications associated with applications when usage limits reset allows the electronic device to efficiently present previously suppressed notifications while reducing overall usage of the electronic device, which reduces power consumption and improves battery life of the device.

The auxiliary function optionally comprises displaying a widget user interface showing one or more secondary user interfaces of one or more applications, including a secondary user interface of the first application (1326) (e.g., a widget corresponding to the application), such as in FIG. 12C. In some embodiments, a widget comprises a user interface object (e.g., a window), including text and/or an image associated with an application (e.g., a weather widget displaying the current temperature, a sports widget displaying scores to live events, a news widget displaying the headlines of recent events, and/or any user interface object displaying content associated with the application). In some embodiments, the content of the widget corresponding to the application is updated dynamically by the application. In some embodiments, the secondary user interface (e.g., the widget) is displayed concurrently with additional secondary user interfaces (e.g., widgets) of other applications different than the primary user interfaces of those other applications (e.g., the widget is displayed concurrently with widgets of other applications). In some embodiments, the secondary user interfaces (e.g., widgets) are displayed in a widget's user interface that is different from a primary user interface of the first application. The event that corresponds to activation of the auxiliary function optionally includes a request to display the widget user interface (1328) (e.g., an input from a user to display the widget user interface on the electronic device), such as in FIGS. 12B-12C. In some embodiments, suppressing the auxiliary function comprises displaying the widget user interface while suppressing (e.g., not displaying or obscuring with a splash screen or a message indicating that the restriction criteria are met) the secondary user interface of the first application (1330) (e.g., suppress the one or more widgets for which a usage limit was exceeded), such as in FIG. 12M. In some embodiments, the widget is suppressed by forgoing the display of the user interface object (e.g., text and/or image) of the widget associated with the application for which the usage limit was exceeded (e.g., the widget is not displayed) while displaying other widgets. In some embodiments, the widget is suppressed by obscuring the user interface object (e.g., visually altering the user interface object, text, and/or image) while displaying other widgets. Obscuring the widget optionally includes displaying an indication of the restriction criteria in place of the text and/or images associated with the application (e.g., the content of the widget when the restriction criteria are not met). In some embodiments, all widgets are suppressed. In some embodiments, performing the auxiliary function comprises displaying a widget user interface showing one or more widgets of one or more applications, including a widget of the first application. The widget user interface described herein is optionally the same or similar to the widget user interfaces described with reference to FIG. 8W. The above-described manner of suppressing widgets corresponding to applications for which usage limits have been exceeded makes the user-device interface more efficient (e.g., the user does not have to monitor his or her own device usage with respect to the application and the widget associated with that application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

In some embodiments, the auxiliary function comprises presenting visual indications of one or more applications, including the first application, for which suggestion criteria have been met in a suggestions user interface (1332) (e.g., displaying application suggestions to a user on the electronic device in, for example, a system (e.g., operating system) user interface of the electronic device, as opposed to a user interface of a particular application on the electronic device, such as in FIG. 12C. In some embodiments, the applications suggested to the user are commonly used applications, recently used applications, favorite applications, currently running applications, etc. In some embodiments, the suggested applications are displayed in response to a search operation performed on the electronic device. For example, the user optionally enters one or more characters in a search box and initiates a search for items containing the one or more characters. In some embodiments, the search is performed on all installed applications on the electronic device, applications available for download in an app store, websites, content of applications installed on the electronic device (e.g., search the contents of messages, emails), etc. The search results would then optionally include a listing of applications, web sites, and/or content, including the one or more entered characters.

The event that corresponds to activation of the auxiliary function optionally includes a request to present visual indications of the one or more applications for which the suggestion criteria have been met in the suggestions user interface (1334) (e.g., an input from a user to display application suggestions on the electronic device), such as in FIGS. 12B-12C. In some embodiments, suppressing the auxiliary function optionally comprises presenting the suggestions user interface without presenting a visual indication of the first application (1336) (e.g., do not display the application in a suggestions interface), such as in FIG. 12M. For example, the first application will not be displayed along with commonly used applications even when the first application is common used. In another example, the first application will not be displayed in search results even though the search prompting the display of the search results encompasses the first application. In some embodiments, the visual indication of the first application is displayed in the suggestions (or search results) user interface; however, it is obscured to indicate that restriction criteria for the first application have been met. In some embodiments, the suggestions user interface is suppressed (e.g., all applications are not displayed or obscured). In some embodiments, performing the auxiliary function comprises presenting the suggestions user interface, including the visual indications of the one or more applications, including the visual indication of the first application (e.g., display the application in the suggestions interface). The above-described manner of suppressing the suggestions of applications for which usage limits have been exceeded allows the electronic device to efficiently reduce overall usage of the electronic device, which reduces power consumption and improves battery life of the device.

The auxiliary function optionally comprises displaying web content associated with the first application in a browser user interface (1338) (e.g., display web content or a website associated with the first application in a web browser), such as in FIG. 12S. In some embodiments, the event that corresponds to activation of the auxiliary function includes a request to display web content associated with the first application in the browser user interface (1340) (e.g., an input from a user to display web content or a website associated with the first application in a web browser), such as in FIG. 12R. In some embodiments, suppressing the auxiliary function comprises preventing access to the web content associated with the first application (1342) (e.g., forgoing displaying website content associated with an application for which a usage limit has been reached), such as in FIG. 12P. For example, if the usage limit for application A, which is associated with website A, has been reached, the display of website A (or content from website A) in a browser application will be prevented. If the usage limit has not been reached, the display of website A will optionally not be prevented. In some embodiments, the electronic device will suppress not only the application for which a usage limit has been exceeded but also any websites associated with that application. The electronic device optionally presents a visual indication (e.g., a splash screen or other image that obscures the content of the webpage) of the restriction criteria in place of the content of the website when the restriction criteria are met. In some embodiments, performing the auxiliary function comprises presenting web content associated with the first application in a browser (e.g., displaying a website in a browser). The websites associated with applications described herein are optionally the same or similar to the websites associated with applications described with reference to method 900. The above-described manner of suppressing web content associated applications for which usage limits have been exceeded makes the user-device interface more efficient (e.g., the user does not have to monitor his or her own device usage with respect to the application and the website associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

In some embodiments, preventing access to the web content associated with the first application comprises (1344) loading the web content associated with the first application from a first website (1346) (e.g., the content of the website associated with the application for which a usage limit has been exceeded is loaded by the electronic device (e.g., downloaded to local memory)), such as in FIG. 12Q. In some embodiments, preventing access to the web content associated with the first application comprises (1344) forgoing displaying the web content associated with the first application (1348) (e.g., the web content is loaded but not displayed by the electronic device), such as in FIG. 12Q. In some embodiments, the electronic device displays some user interface element over the content (e.g., a pop-up dialog or splash screen) that blocks display of the content and/or indicates that the content is blocked because the usage limit for application A has been reached. Additionally or alternatively, the web content is optionally displayed, however, in an obscured manner (e.g., distorted, greyed out, faded out, and/or visually altered. The above-described manner of suppressing web content associated applications for which restriction criteria are met (e.g., usage limits have been exceeded or the device is in a restricted mode) makes the user-device interface more efficient (e.g., the user does not have to monitor his or her own device usage with respect to the application and the website associated with the application, thus reducing the inputs provided by the user to the device (e.g., inputs for monitoring usage are reduced)), which allows the electronic device to efficiently reduce overall usage of the electronic device, which, additionally, allows the electronic device to cache web content for future use, which, additionally, reduces power consumption and improves battery life of the device while improving performance speeds.

In some embodiments, preventing access to the web content associated with the first application comprises (1350) forgoing displaying the web content associated with the first application while maintaining display of one or more user interface elements (e.g., one or more graphical user interface buttons, text input field) in the browser user interface for navigating to another website (1352) (e.g., for navigating to other websites, for navigating within a website), such as in FIG. 12R. In some embodiments, the navigation controls of the browser (e.g., the URL field or buttons on the browser) remain operational while certain web content associated with an application for which restriction criteria are met is restricted. In some embodiments, websites not associated with any application on the electronic device remain accessible while restriction criteria for one or more applications on the electronic device are met. For example, while access to a website associated with the first application is restricted, the navigation controls of the browser are not restricted, optionally allowing the user to navigate to other websites. The above-described manner of suppressing web content associated applications for which restriction criteria are met while allowing access to other websites makes the user-device interface more efficient (e.g., the user does not have to monitor his or her own device usage with respect to the application and websites associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

In some embodiments, while the restriction criteria for the first application are met, detecting a second event that corresponds to a request to view the second web content from a second website in the browser user interface (1354)

(e.g., detecting occurrence of an event that would trigger displaying content from another website that is, optionally, not associated with the first application), such as in FIGS. 12R-12S. In some embodiments, the second event is the user entering the URL for another website into the address field of the browser.

In some embodiments, in response to detecting the second event that corresponds to a request to view the second web content from the second website in the browser user interface while the restriction criteria for the first application are met (1356), in accordance with a determination that the second website is associated with the first application, the electronic device forgoes (1358) displaying the second web content (e.g., restrict access to web content from all websites associated with the application(s) for which the restriction criteria are met (e.g., usage limit has been reached, the device is in a restricted access mode, etc.)), such as in FIG. 12P. In some embodiments, the electronic device displays an image over the content (e.g., a pop-up dialog or splash screen) that blocks display of the content and/or indicates that the content is blocked because the usage limit for application A has been reached. Additionally or alternatively, the web content is optionally obscured and displayed (e.g., distorted, greyed out, and/or visually altered).

In some embodiments, in response to detecting the second event that corresponds to a request to view the second web content from the second website in the browser user interface while the restriction criteria for the first application are met (1356), in accordance with a determination that the second website is associated with a second application and that restriction criteria for the second application are not met, the electronic device displays (1360) the second web content (e.g., display the web content associated with the application for which restriction criteria are not met (e.g., usage limit has been reached or device is in a restricted usage mode, etc.)), such as in FIG. 12S. In some embodiments, only websites associated with an application for which restriction criteria are met are restricted, and the user is allowed to navigate to other websites. In some embodiments, websites not associated with any application on the electronic device are also accessible while restriction criteria for one or more applications on the electronic device are met. The above-described manner of suppressing web content associated applications for which restriction criteria are met while allowing access to other websites makes the user-device interface more efficient (e.g., the user does not have to monitor his or her own device usage with respect to the application and websites associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device).

In some embodiments, the auxiliary function comprises displaying media content in a picture-in-picture user interface of the first application, the picture-in-picture user interface partially overlapping one or more other user interfaces (1362) (e.g., displaying a picture-in-picture (PIP) window over another user interface (e.g., over a home screen, a primary user interface of another application, or user interfaces of other applications)), such as in FIG. 12V. The event that corresponds to activation of the auxiliary function optionally includes a request to display the media content in the picture-in-picture user interface of the first application (1364) (e.g., a request to view content from the first application in a PIP window, etc.), such as in FIG. 12V. In some examples, the PIP window is already displaying content from the first application and the request is to continue displaying the content (e.g., receiving content to display). In some embodiments, suppressing the auxiliary function comprises suppressing the picture-in-picture user interface of the first application (1366) (e.g., forgoing displaying the PIP window, stop displaying the content in the PIP window), such as in FIG. 12W. For example, if the usage limit for application A has been reached, the user will be unable to circumvent the restricted access to application A by trying to initiate a PIP window of the application (e.g., the PIP window will not be displayed). In some embodiments, the PIP window for the application will be currently displayed when the usage limit for the application is met, and the electronic device will suppress this functionality by stopping displaying the PIP window or by otherwise obscuring the PIP window of the first application (e.g., graying or fading out the PIP window). In some embodiments, the PIP window is a window playing back media (e.g., a movie, a TV show, music, etc.) on the electronic device using a media playback application on the electronic device. If the usage limit has not been reached, the display of a PIP window will optionally not be prevented (e.g., will not be suppressed). In some embodiments, performing the auxiliary function comprises displaying a PIP window of the first application partially overlapping one or more other user interfaces. The above-described manner of suppressing a PIP window associated applications for which usage limits have been exceeded makes the user-device interface more efficient (e.g., the user does not have to monitor his or her own device usage with respect to the application and PIP windows associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

In some embodiments, suppressing the picture-in-picture user interface of the first application comprises (1368), in accordance with a determination that the restriction criteria for the first application are met while displaying the picture-in-picture user interface of the first application (1370) (e.g., the usage limit for the application is met while the application is being used in a PIP mode), obscuring the picture-in-picture user interface for a first period of time (1372) (e.g., visually altering and/or blocking the PIP window), such as in FIG. 12W. In some embodiments, the PIP window will continue displaying content from the first application, but the content will be visually altered (e.g., be blurred, be displayed in greyscale, or be displayed with a watermark). In some embodiments, the PIP window will stop displaying the content from the first application and will instead display other information (e.g., a visual indication that the usage limit for the particular application has been exceeded). In some embodiments, the other information displayed will include an affordance (e.g., a graphical user interface element or soft button) to close the PIP window).

In some embodiments, suppressing the picture-in-picture user interface of the first application comprises (1368), in accordance with a determination that the restriction criteria for the first application are met while displaying the picture-in-picture user interface of the first application (1370) (e.g., the usage limit for the application is met while the application is being used in a PIP mode), ceasing to display the picture-in-picture user interface after the first period of time (1374) (e.g., the PIP window will be automatically closed after a period of time (e.g., 5 seconds, 10 seconds, 20 seconds), such as in FIG. 12X. For example, the content of the PIP window will be faded out, and the PIP window will automatically close after the period of time.

In some embodiments, the period of time is specified by the user in the settings of the electronic device. In some embodiments, in accordance with a determination that the restriction criteria for the first application are met while not displaying the picture-in-picture user interface of the first application, the electronic device detects, with the one or more input devices, a user input corresponding to a request to display the picture-in-picture user interface of the first application (e.g., detects an input for displaying the PIP user interface of the first application while the restriction criteria are met), and in response to the user input corresponding to the request to display the picture-in-picture user interface of the first application, and while the restriction criteria for the first application are met, the electronic device forgoes displaying the picture-in-picture user interface of the first application (e.g., the restriction criteria for the first application are met while a PIP window for that application is not being displayed), and the electronic device prevents the the window from launching at a later time. In this way, a user of the electronic device cannot circumvent the restrictions to the particular application once the usage limits to that particular application have been exceeded. The above-described manner of suppressing a PIP window associated applications for which restriction criteria are met makes the user-device interface more efficient (e.g., the user does not have to monitor his or her own device usage with respect to the application and PIP windows associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

In some embodiments, the auxiliary function comprises displaying a plurality of affordances (e.g., one or more graphical user interface buttons) for controlling playback of media content associated with the first application (1376) (e.g., media control buttons that include one or more of play, pause, rewind, forward, skip, etc. buttons), such as in FIG. 12Z. In some embodiments, media control buttons are displayed on a media control user interface. In some embodiments, performing the auxiliary function comprises displaying one or more graphical user interface buttons (e.g., soft buttons) for controlling playback of media content associated with the first application (e.g., one or more of play, pause, rewind, forward, skip, etc. buttons).

Figure 12Y:
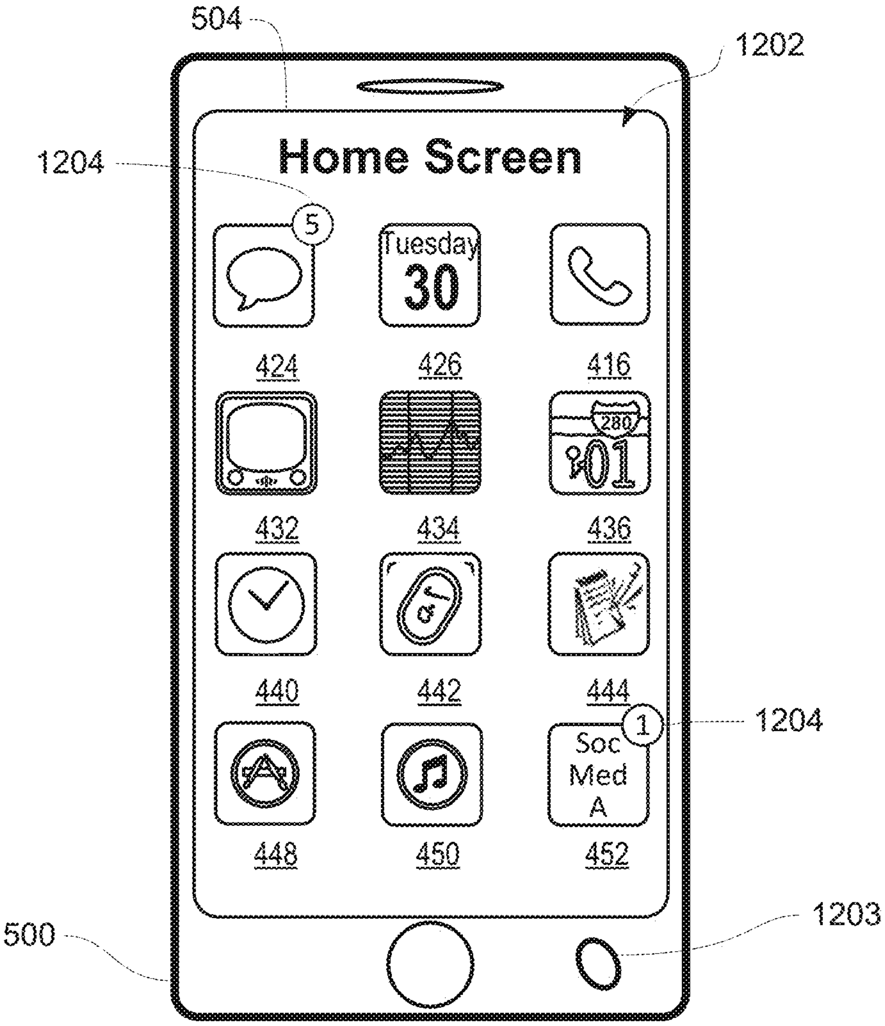
Figure 12Z:
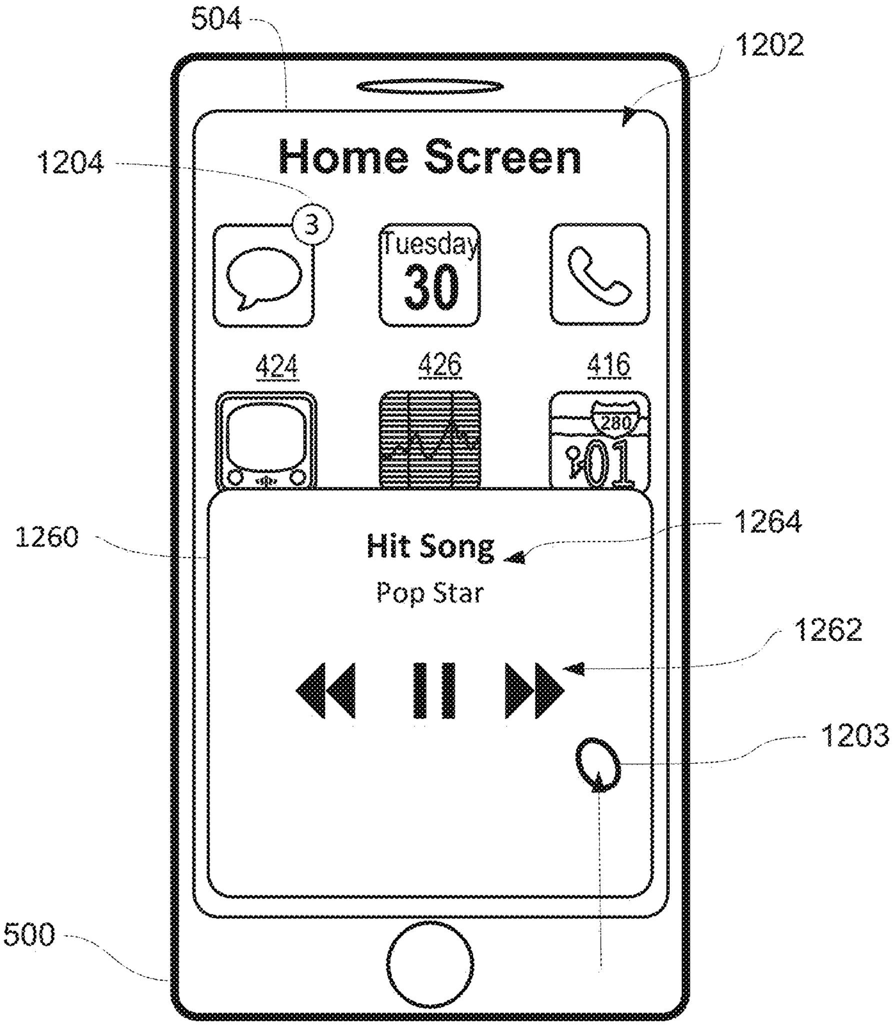
Figure 12A:
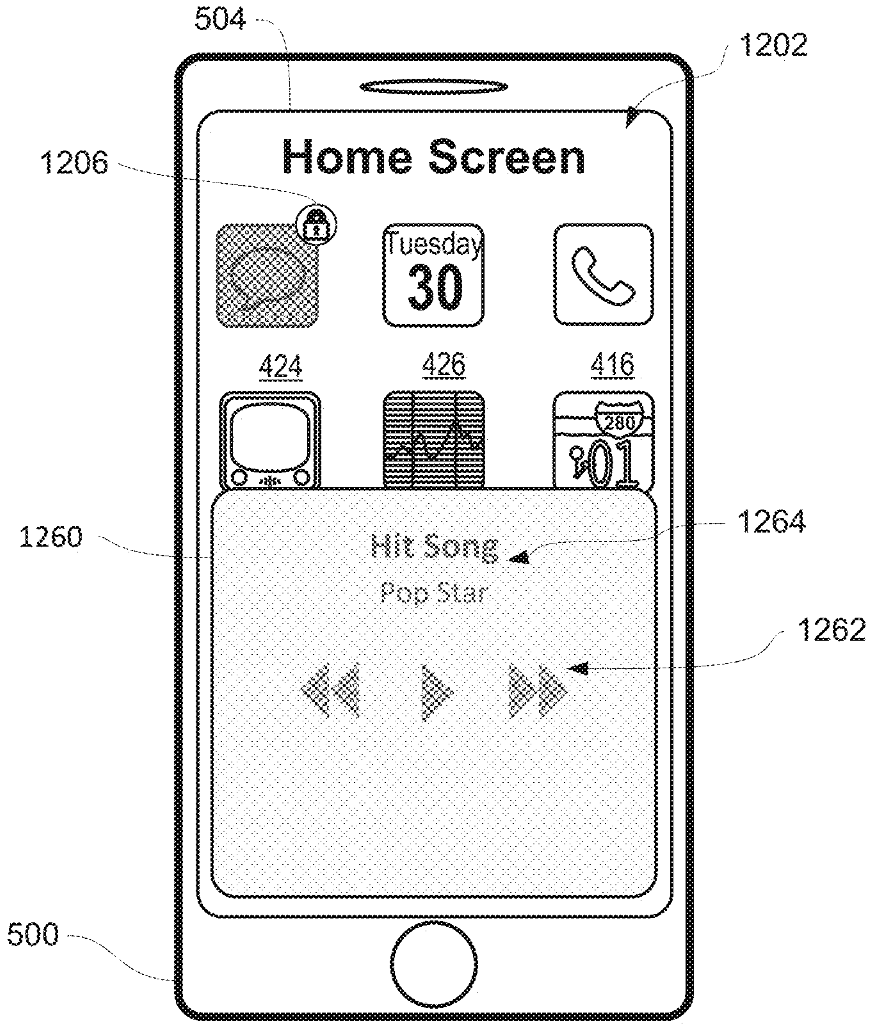
Figure 12B:
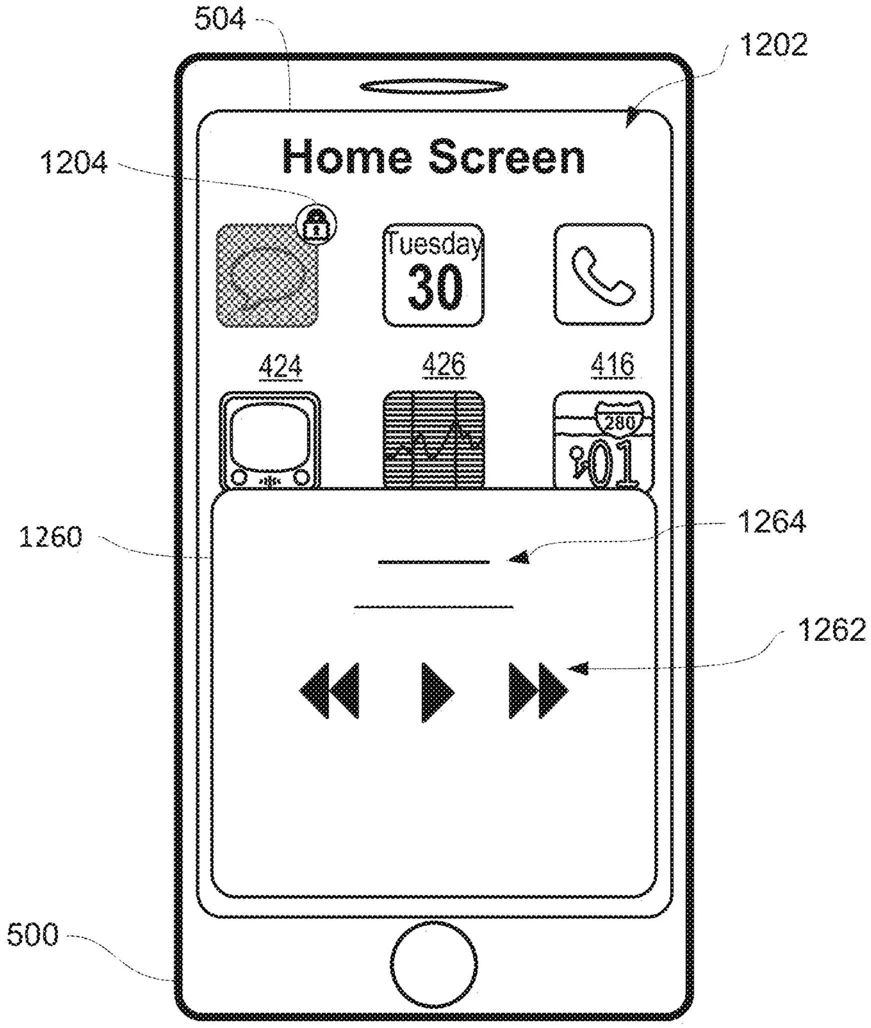
Figure 13A:
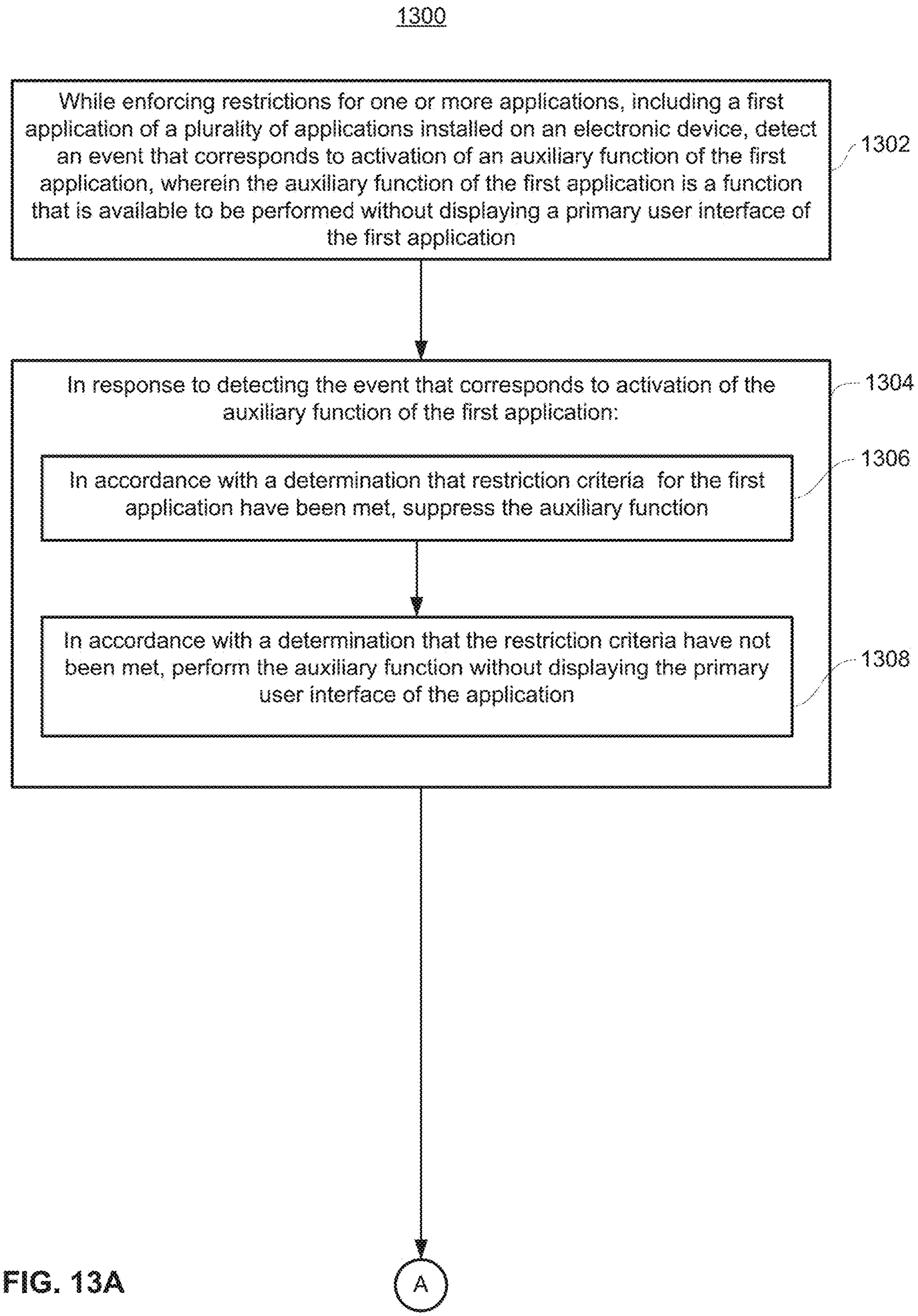
FIGS. 13A-13H are flow diagrams illustrating a method of suppressing auxiliary functions of certain applications when an application usage limit associated with those applications is reached in accordance with some embodiments of the disclosure.
Figure 13B:
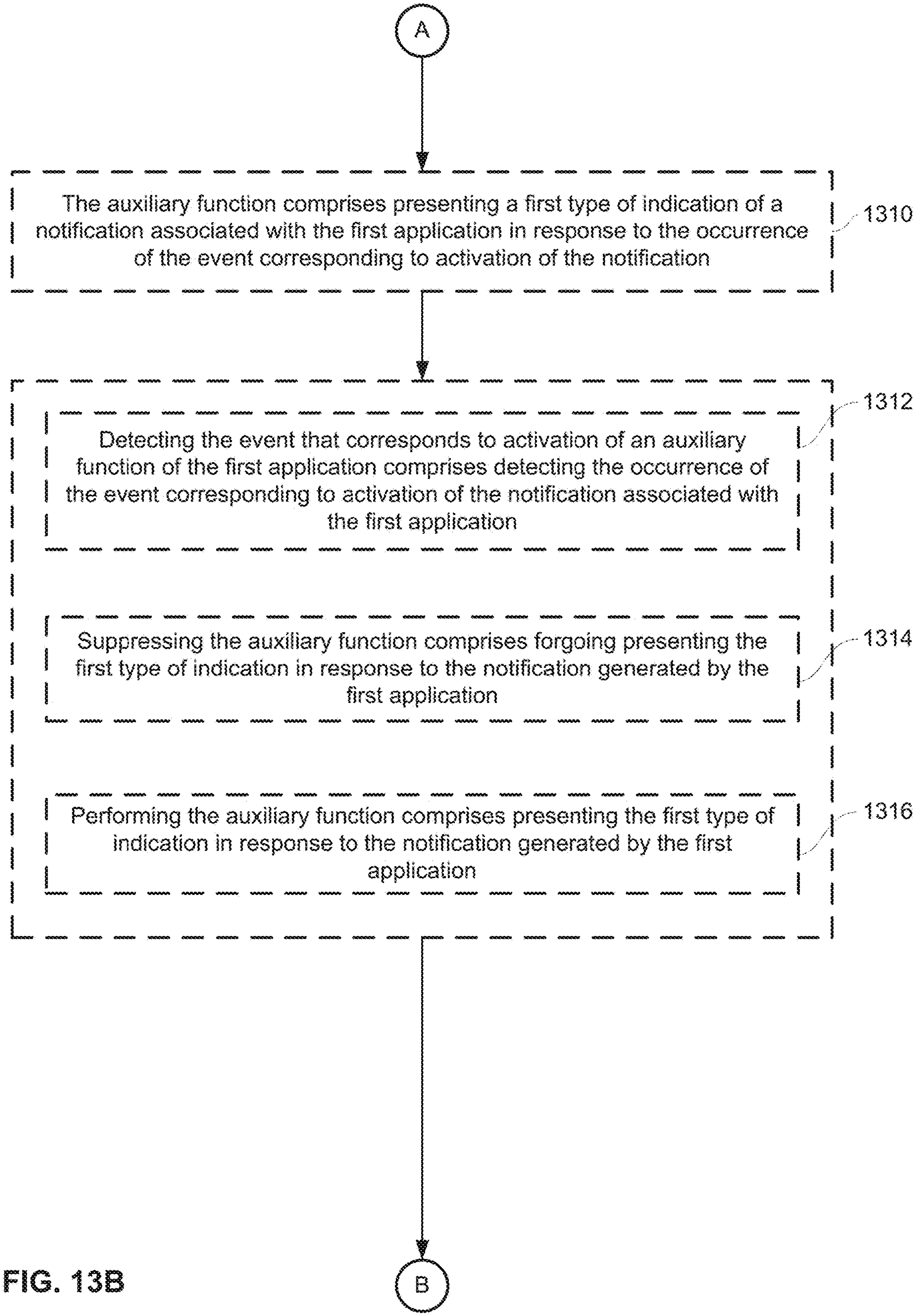
Figure 13C:
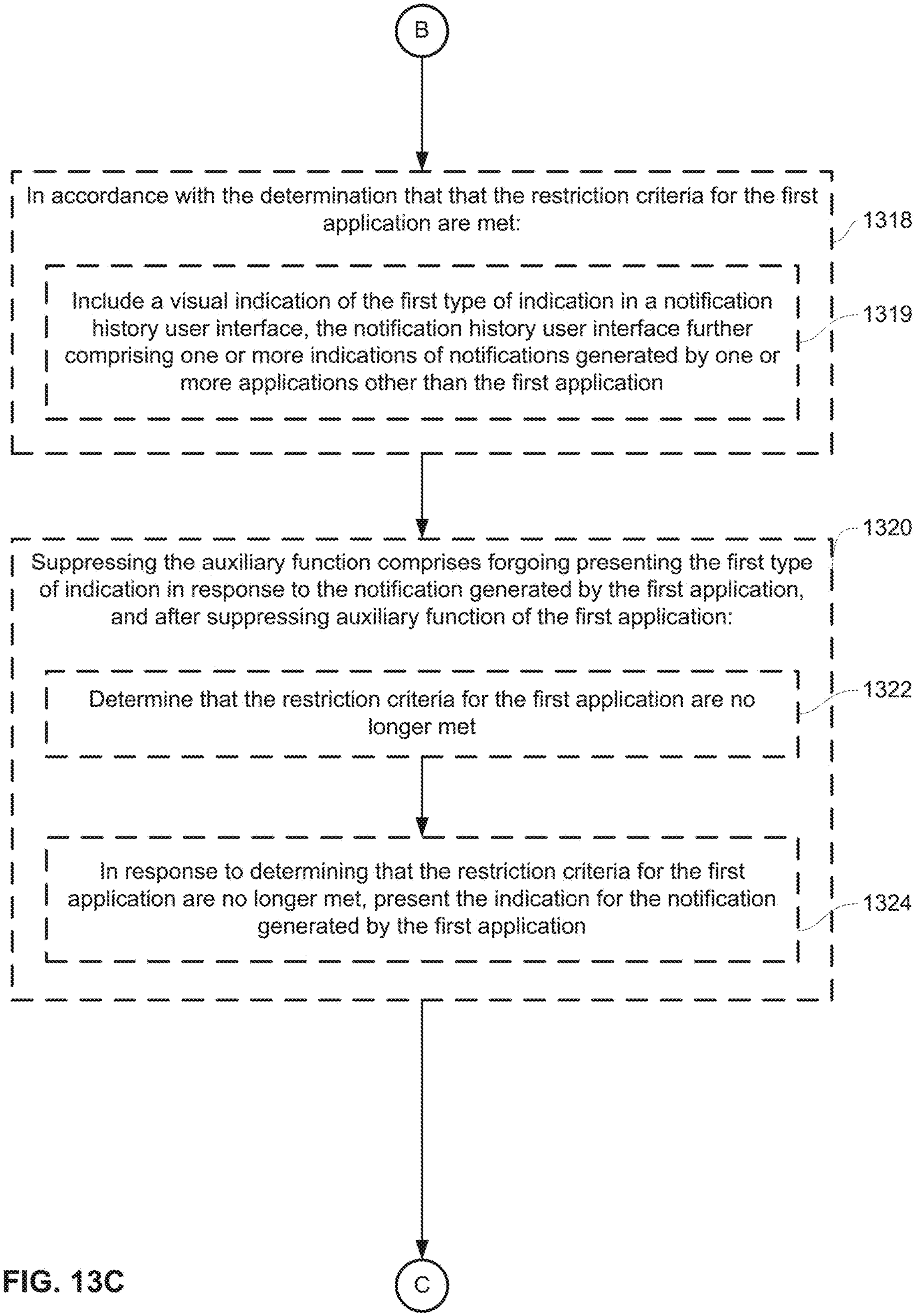
Figure 13D:
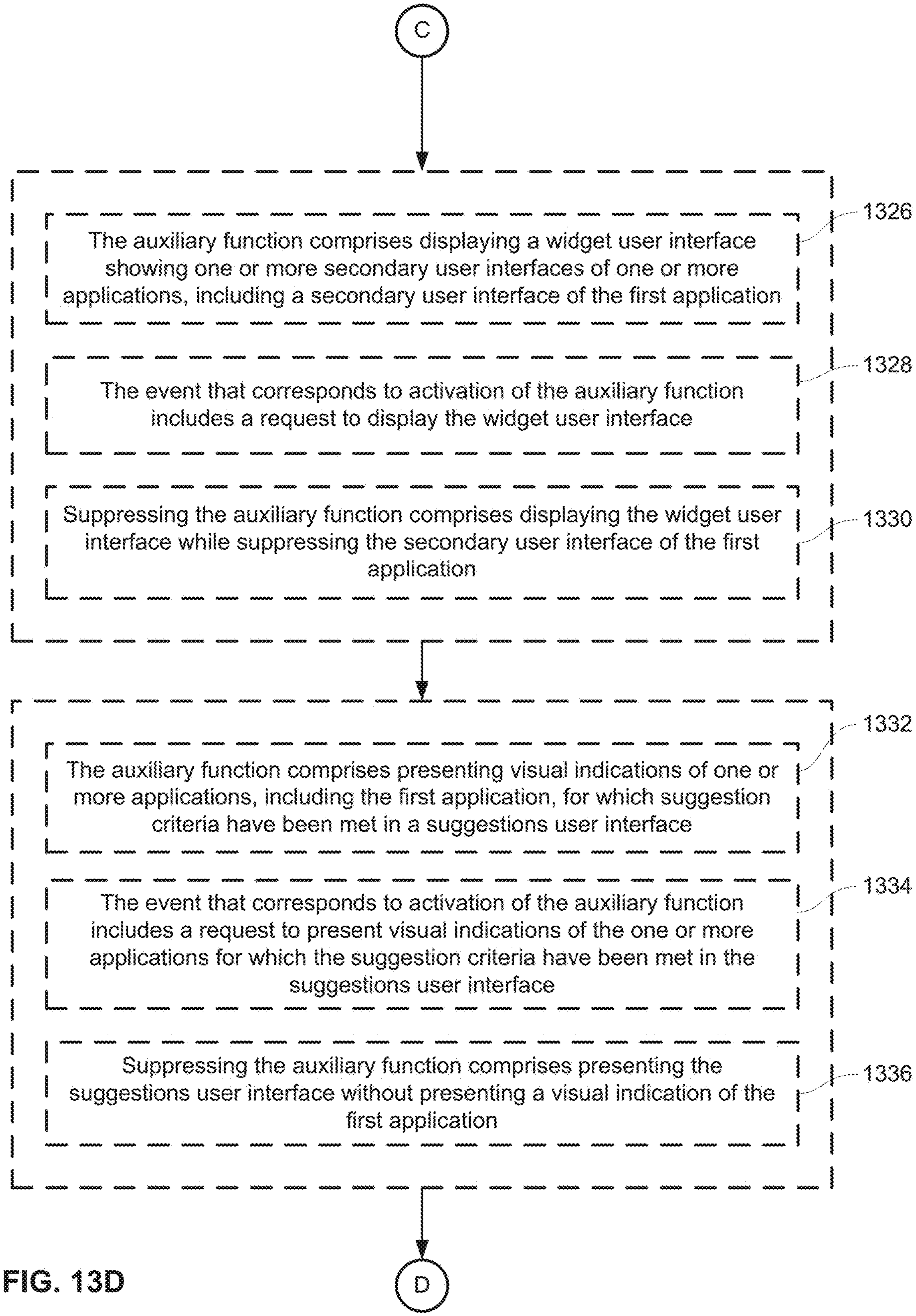
Figure 13E:
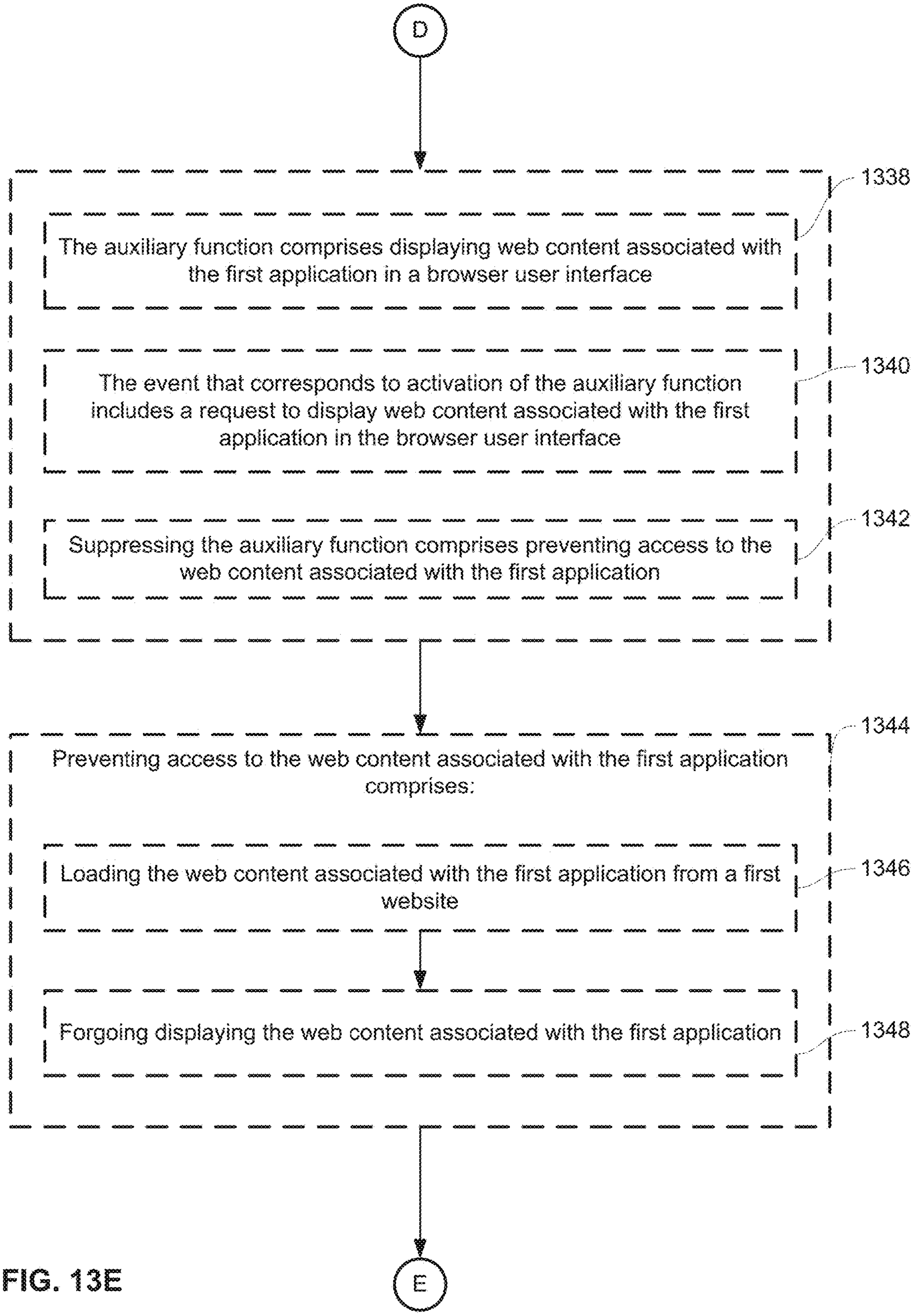
Figure 13F:
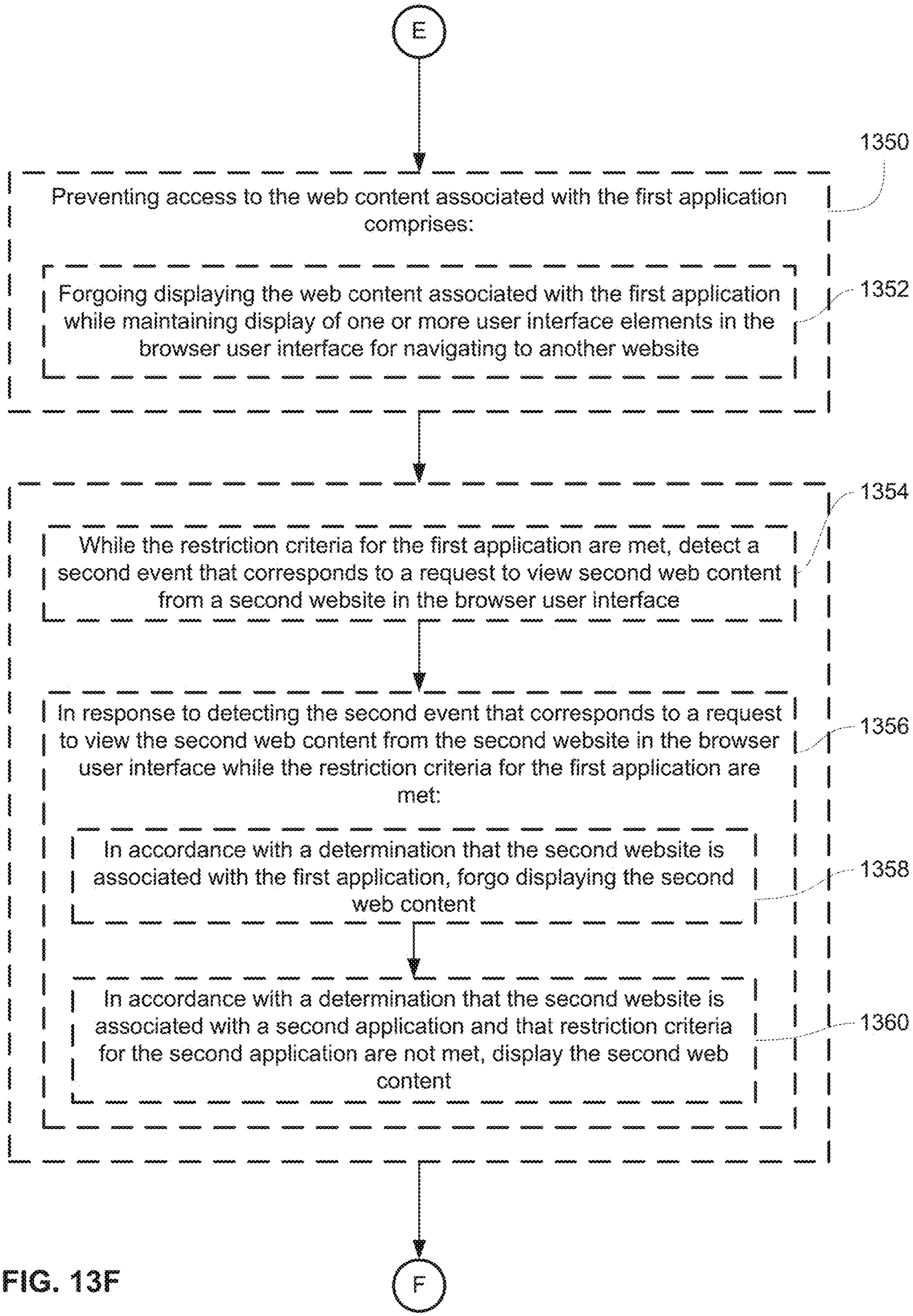
Figure 13G:
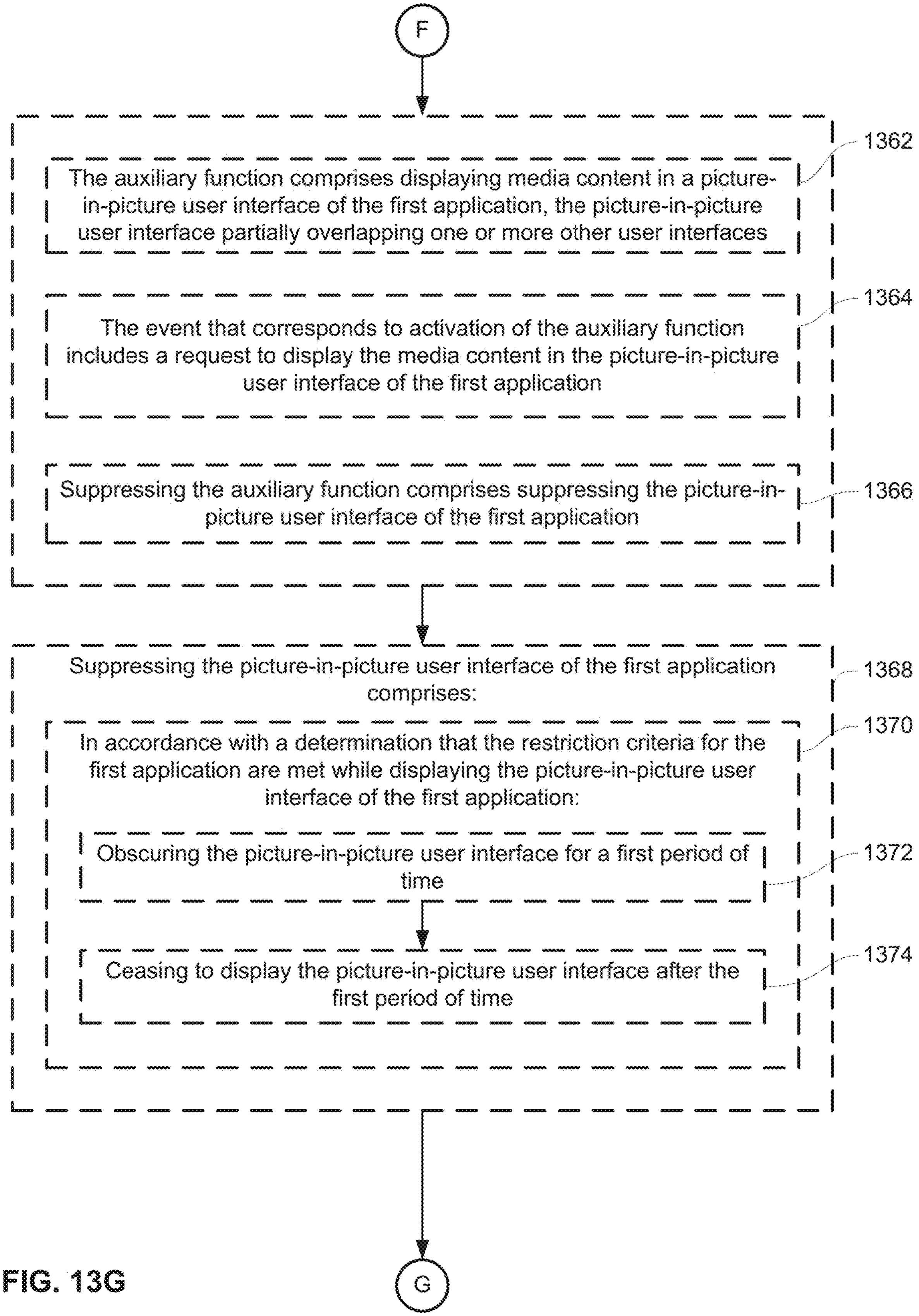
Figure 13H:
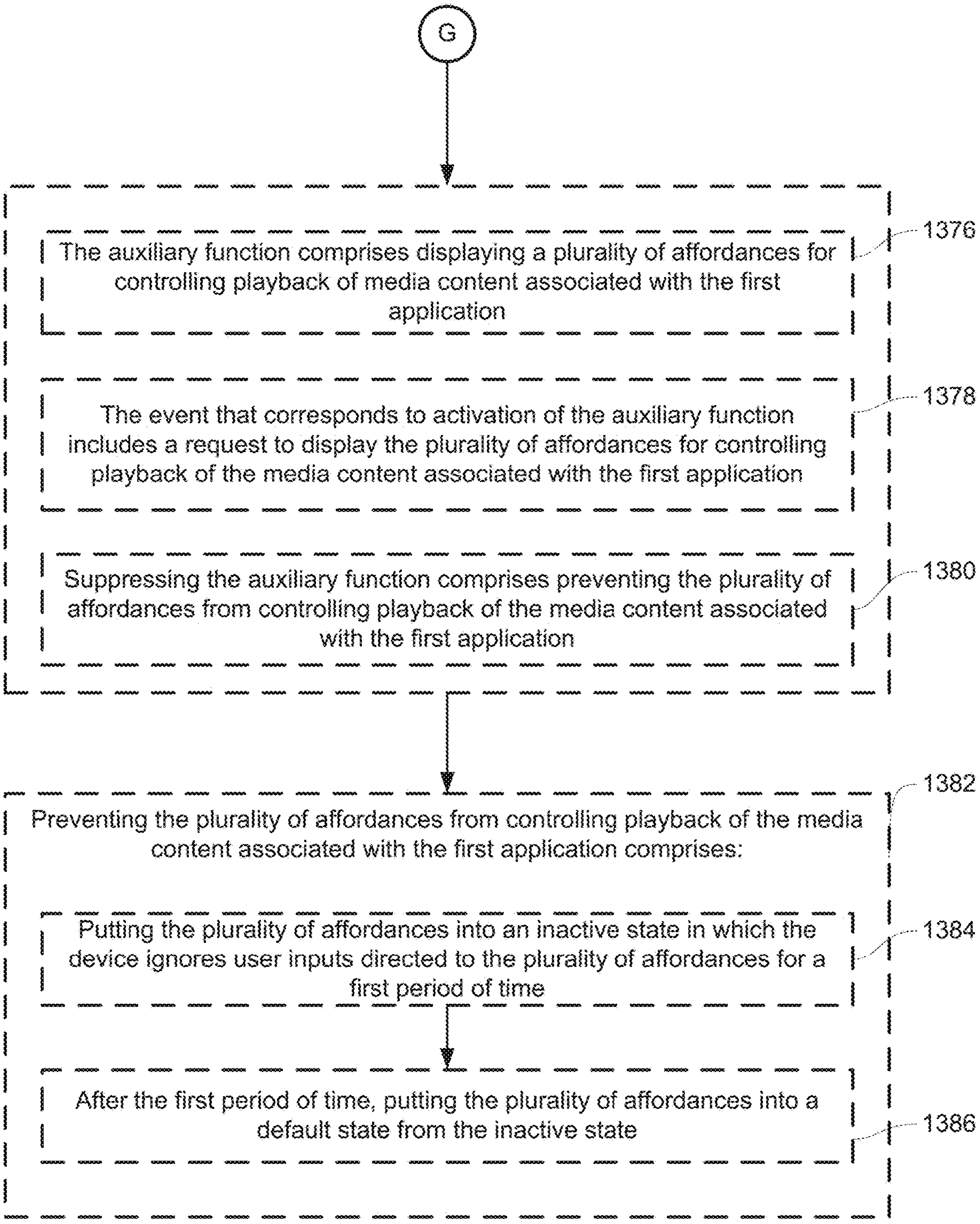

The event that corresponds to activation of the auxiliary function optionally includes a request to display the plurality of affordances for controlling playback of the media content associated with the first application (1378) (e.g., user input requesting to view media control buttons that control the playback of media associated with the first application on the electronic device), such as in FIGS. 12Y-12Z.

In some embodiments, suppressing the auxiliary function comprises preventing the plurality of affordances from controlling playback of the media content associated with the first application (1380), such as in FIG. 12AA. In some embodiments, the media control buttons will be displayed but will be inoperable (e.g., the buttons will not perform the media control functions associated with them). For example, a media control interface will be displayed with media control buttons, including a play button, but the electronic device will prevent the user from performing a play operation when the play button is selected. In some embodiments, the inoperable media control buttons will be obscured (e.g., visually altered) in the media control user interface. In some embodiments, when restriction criteria for a particular media playback application (e.g., a movie playback application, a television show playback application, or a music playback application) are met, access to media playback controls for controlling playback of that media playback application is suppressed by the electronic device. In some embodiments, these media playback controls are displayed in a user interface of the application itself or outside of the application itself (e.g., in a system or operating system user interface of the electronic device that is accessible globally on the electronic device). In some embodiments, the media playback controls are blocked such that they are no longer selectable to control playback of any media using the media playback application as long as the usage limit for the application is currently reached. In some embodiments, the media control buttons will be suppressed by being prevented from being displayed by the electronic device (e.g., by preventing the media control user interface from being displayed or displaying the media control user interface without the media control buttons) when the restriction criteria for the media playback application (e.g., the first application) are met. In some embodiments, the suppressed media control user interface will be displayed on the electronic device for a period of time (e.g., 5 seconds, 10 seconds, 20 seconds) and automatically close (e.g., cease to be displayed) after that period of time. The above-described manner of suppressing media control buttons associated with applications for which restriction criteria are met makes the user-device interface more efficient (e.g., the user does not have to monitor his or her own device usage with respect to the application and media control buttons associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

In some embodiments, preventing the plurality of affordances from controlling playback of the media content associated with the first application comprises (1382) putting the plurality of affordances into an inactive state in which the device ignores user inputs directed to the plurality of affordances (e.g., into a state in which the media control buttons cannot perform each of the media functions associated with each of the media control buttons) for a first period of time (1384) (e.g., for five minutes, fifteen minutes, one hour, or any user-defined period), such as in FIG. 12AA. For example, a play button will not play content in response to a selection input on the play button when the play button is in a frozen state. In some embodiments, the frozen media control buttons will be obscured (e.g., visually altered) to indicate to a user that they are frozen. In some embodiments, even though the media control buttons in the frozen state are non-operational, they will still indicate that media was recently being played back (or could potentially be controlled by the media control buttons if the usage limit is reset), such as by displaying the title of the media, an image of the media, etc. In some embodiments, the period of time is the time remaining until the restriction criteria of the particular application associated with the media control buttons are no longer met. In some embodiments, if the restriction criteria for the particular media playback application are met while the media controls are controlling playback of the media playback application (e.g., while the media playback application is playing media on the electronic device), the media controls are frozen in their current state (e.g., indicating a current playback status of the media, an identity (e.g., title) of the media, etc.) and are blocked from interaction from the user at the moment the restriction criteria become met. In some embodiments, playback of the media is additionally ceased when the playback controls are put into the frozen state. In some embodiments, the media controls are reset to their default state (e.g., indicating that no media is being played by the media playback application, indicating no title of media, etc.) some time period (e.g., 5 seconds, 10 seconds, 20 seconds) after being frozen.

In some embodiments, preventing the plurality of affordances from controlling playback of the media content associated with the first application comprises (1382), after the first period of time, putting the plurality of affordances into a default state from the inactive state (1386) (e.g., return the media control buttons into a default state in which the media control buttons do not indicate that any media is being played back and, thus, do not control playback of the media), such as in FIG. 12BB. Thus, in some embodiments in the default state, the media control buttons no longer indicate a current playback status of the media, an identity (e.g., title) of the media, etc. In some embodiments, the period of time is the time remaining until the usage limit for the particular application associated with the media control buttons is reset. In some embodiments, although the affordances for controlling the media content are reset in the default state, the electronic device prevents the presentation of media associated with any application for which restriction criteria are met. In some embodiments, the electronic device ceases to display the media control interface instead of placing the media control buttons into a default state after the first period of time. The above-described manner of suppressing media control buttons associated applications for which restriction criteria are met makes the user-device interface more efficient (e.g., the user does not have to monitor his or her own device usage with respect to the application and media control buttons associated with the application, thus reducing the inputs provided by the user to the device (e.g., inputs for monitoring usage are reduced)), which allows the electronic device to efficiently reduce overall usage of the electronic device, which, additionally, reduces power consumption and improves battery life of the device.

It should be understood that the particular order in which the operations in FIGS. 13A-13H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1500) are also applicable in an analogous manner to method 1300 described above with respect to FIGS. 13A-13H. For example, the usage limits on an electronic device, the restricted usage mode, auxiliary functions, usage restriction settings, etc., described above with reference to method 1100 optionally have one or more of the characteristics of the usage limits on an electronic device, restricted usage mode, auxiliary functions, usage restriction settings, etc., described herein with reference to other methods described herein (e.g., methods 700, 900, 1100 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application-specific chips. Further, the operations described above with reference to FIGS. 13A-13H are, optionally, implemented by components depicted in FIGS. 1A-1B. For example, detecting operation 1302, suppressing operation 1306 and performing operation 1308, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186 and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Remote Management of Restriction Settings

Users interact with electronic devices in many different manners, including using applications accessible on the device. In some circumstances, an administrator (e.g., a parent) remotely manages the restriction settings at a restricted device (e.g., their child's electronic device). The embodiments described below provide ways in which an electronic device enables a restricted device user to request administrator permission, either at the restricted device with a passcode or at an authorizing device or other remote administrator, to change one or more usage restriction settings of the restricted device. Requesting administrator authentication to change a usage restriction setting at the restricted device allows the electronic device to provide for an efficient manner of facilitating such changes when authentication is required by another party (e.g., a parent). This facilitation enhances the operability of the device and makes the user-device interface more efficient (e.g., by allowing the user to interact with the device with fewer inputs), which reduces power usage and improves battery life of the electronic device by enabling the user to use the device more quickly and efficiently. It is understood that people use devices. When a person uses a device, that person is optionally referred to as a user of the device.

Figure 14A:
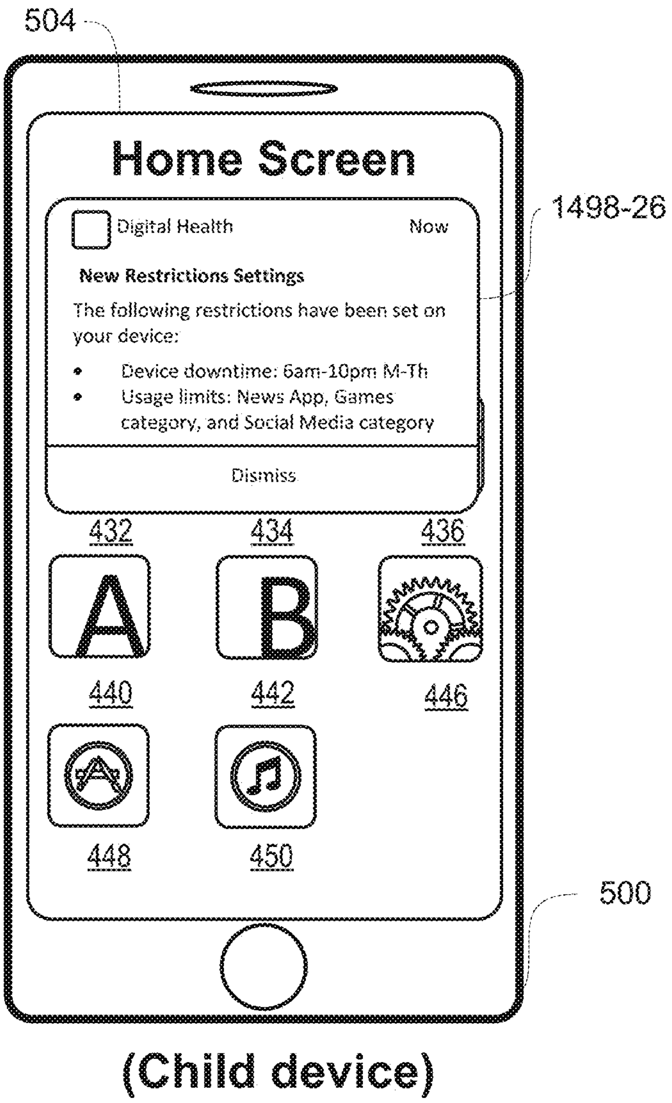
FIGS. 14A-14T illustrate exemplary ways in which an electronic device manages restriction settings with permission optionally provided by another electronic device in accordance with some embodiments of the disclosure.
Figure 14B:
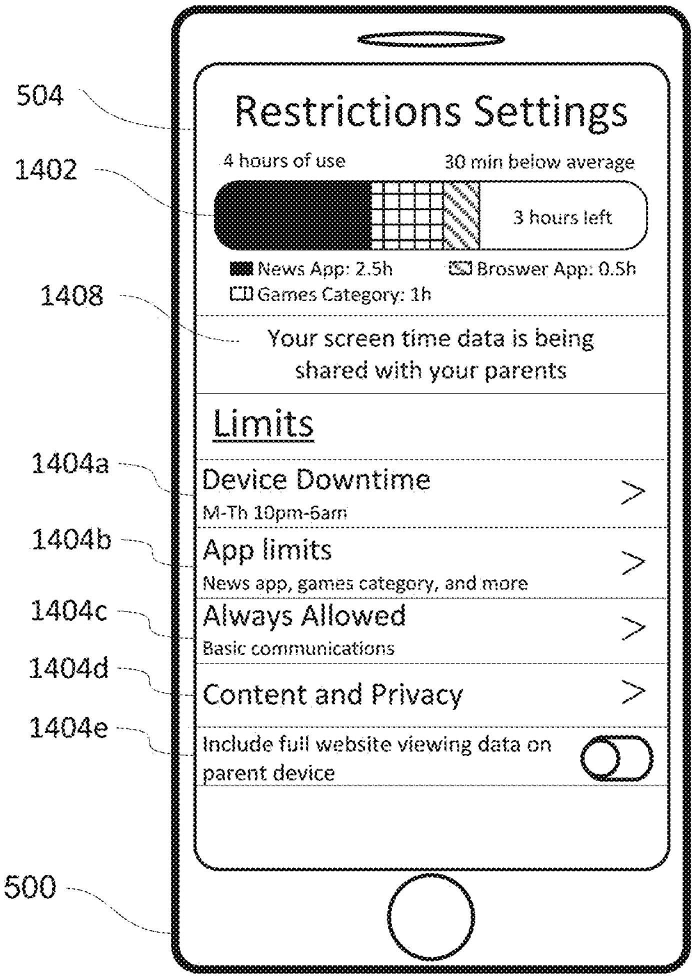
Figure 14C:
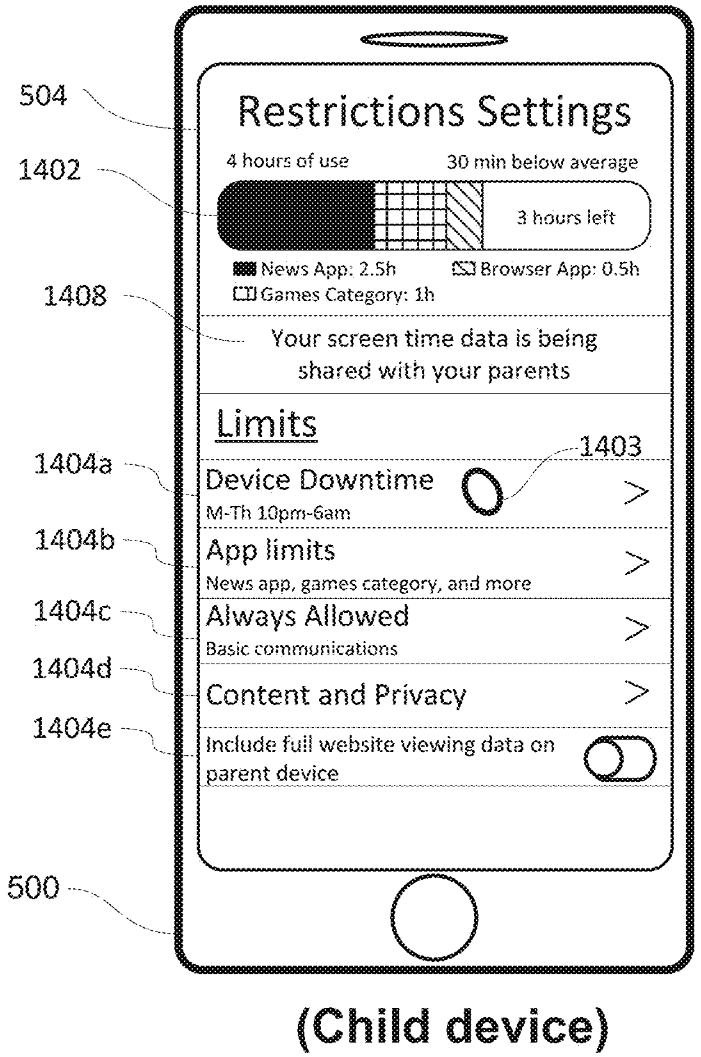
Figure 14D:
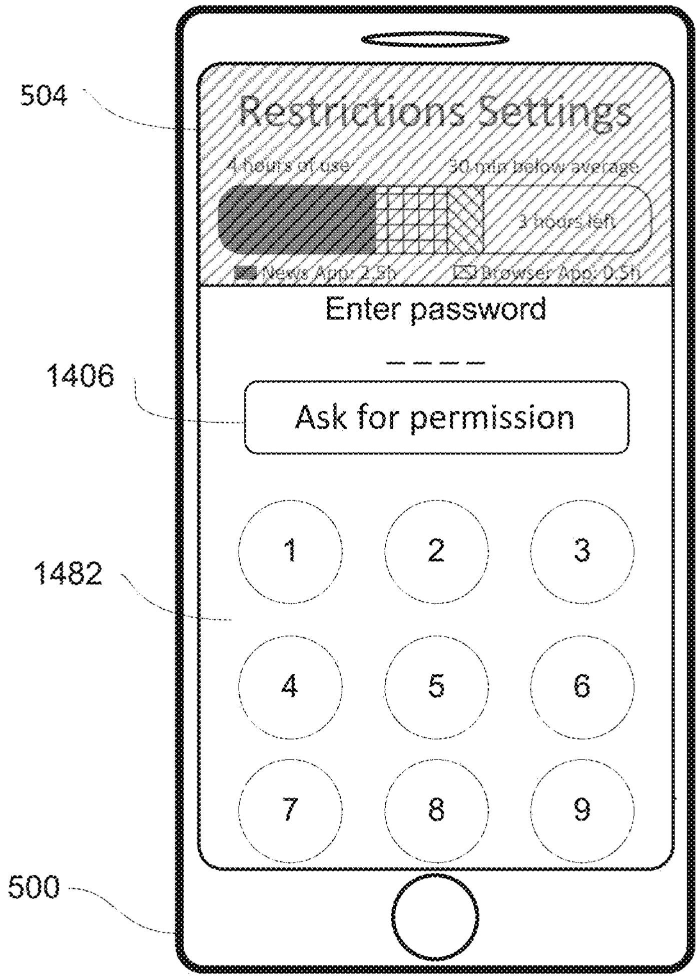
Figure 14E:
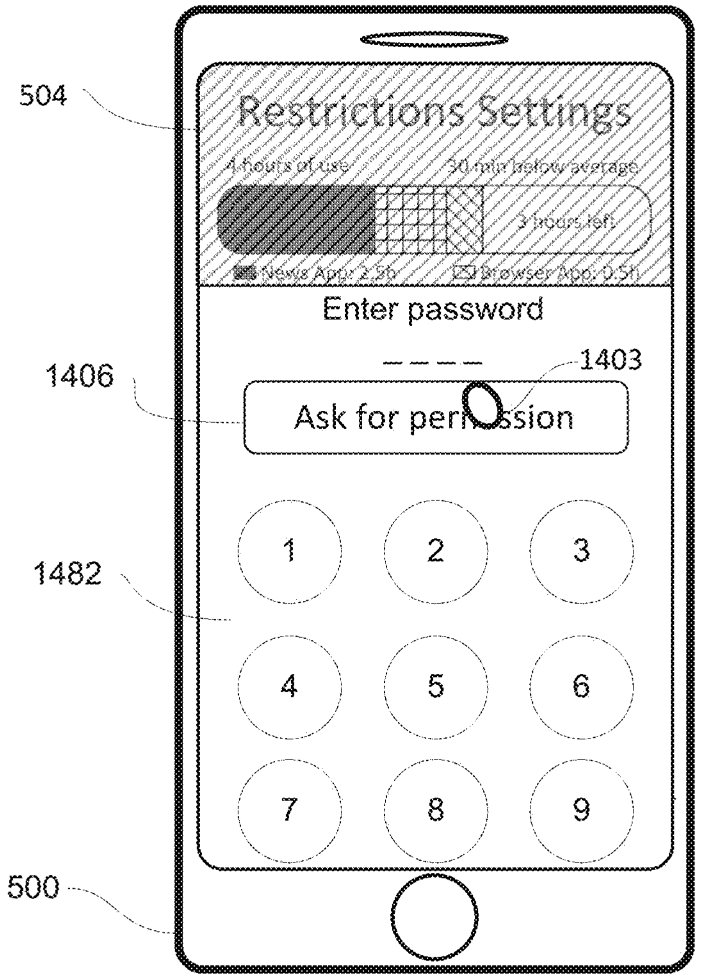
Figure 14F:
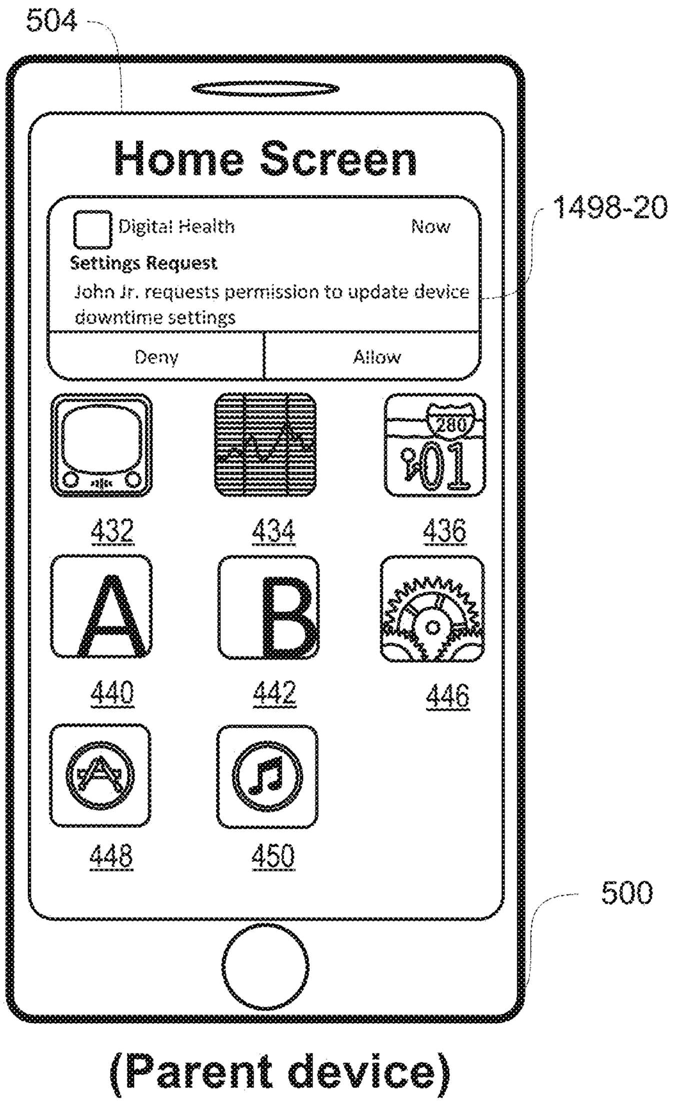
Figure 14G:
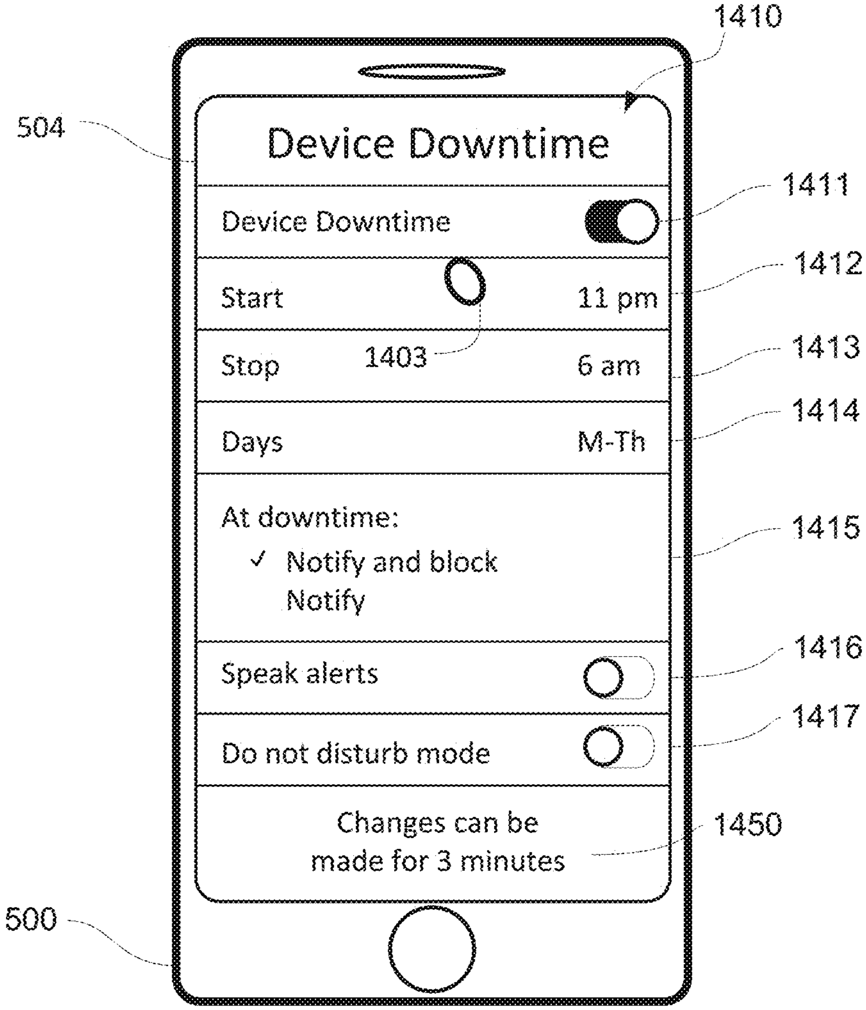
Figure 14H:
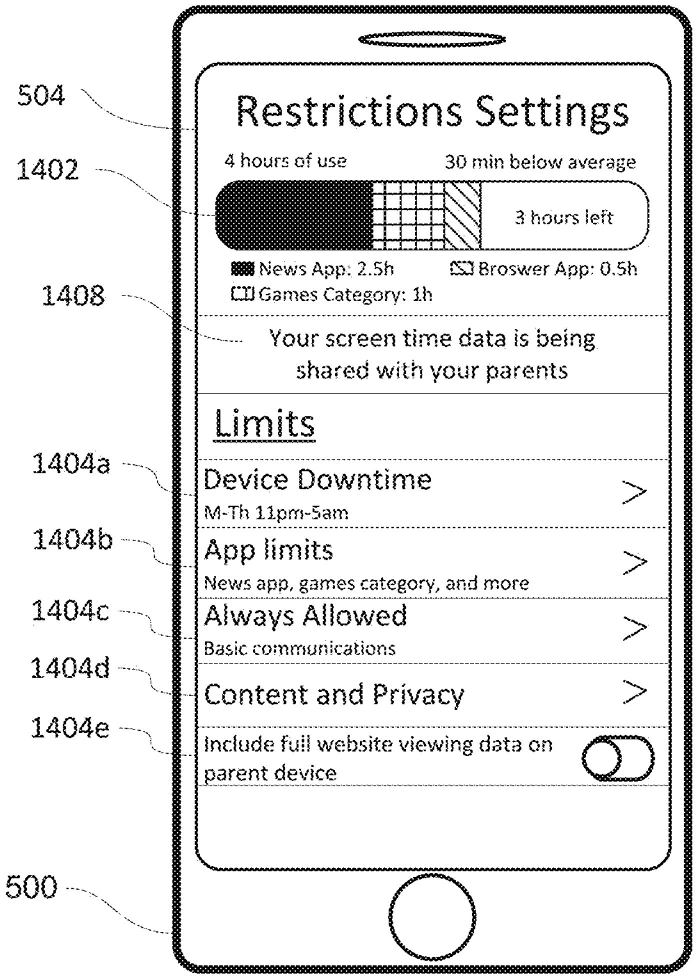
Figure 14I:
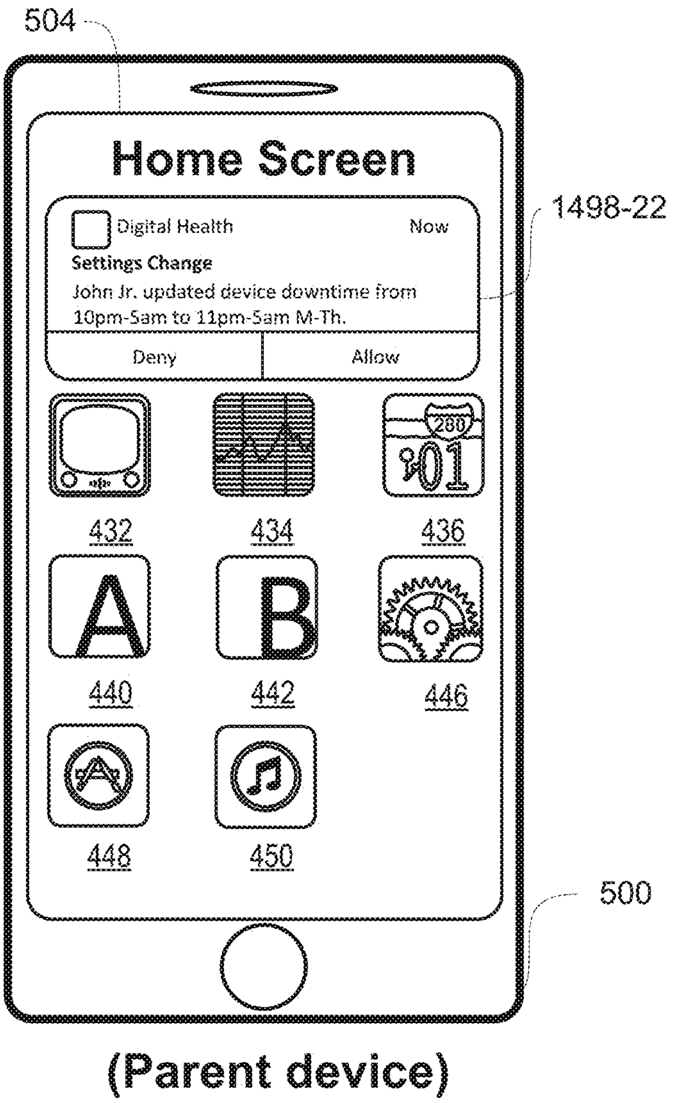
Figure 14J:
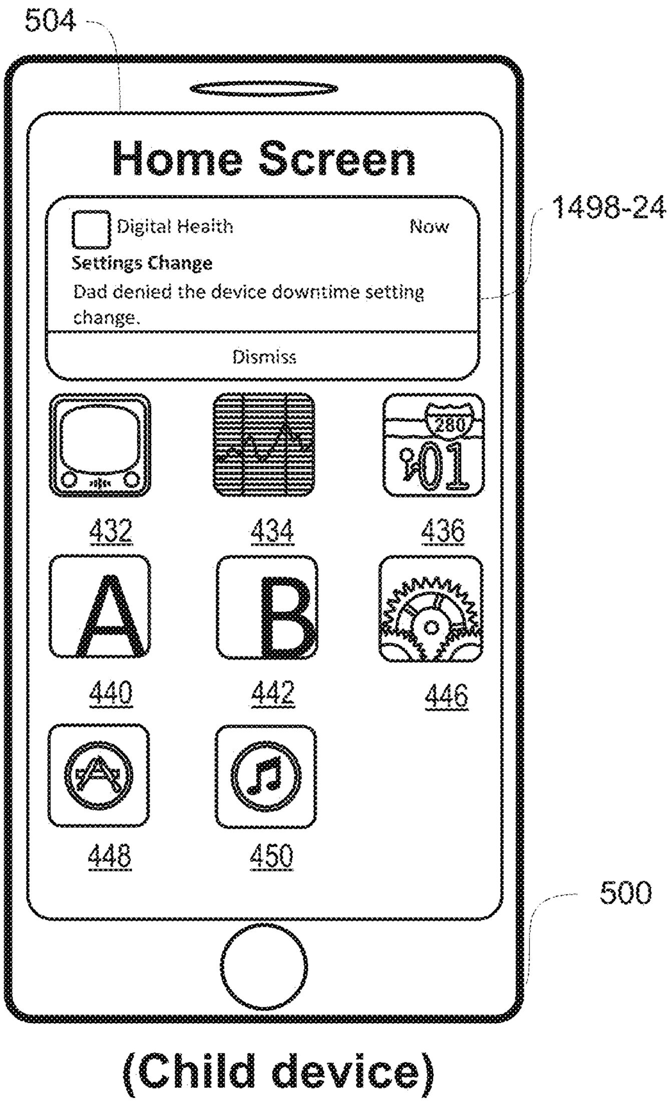
Figure 14K:
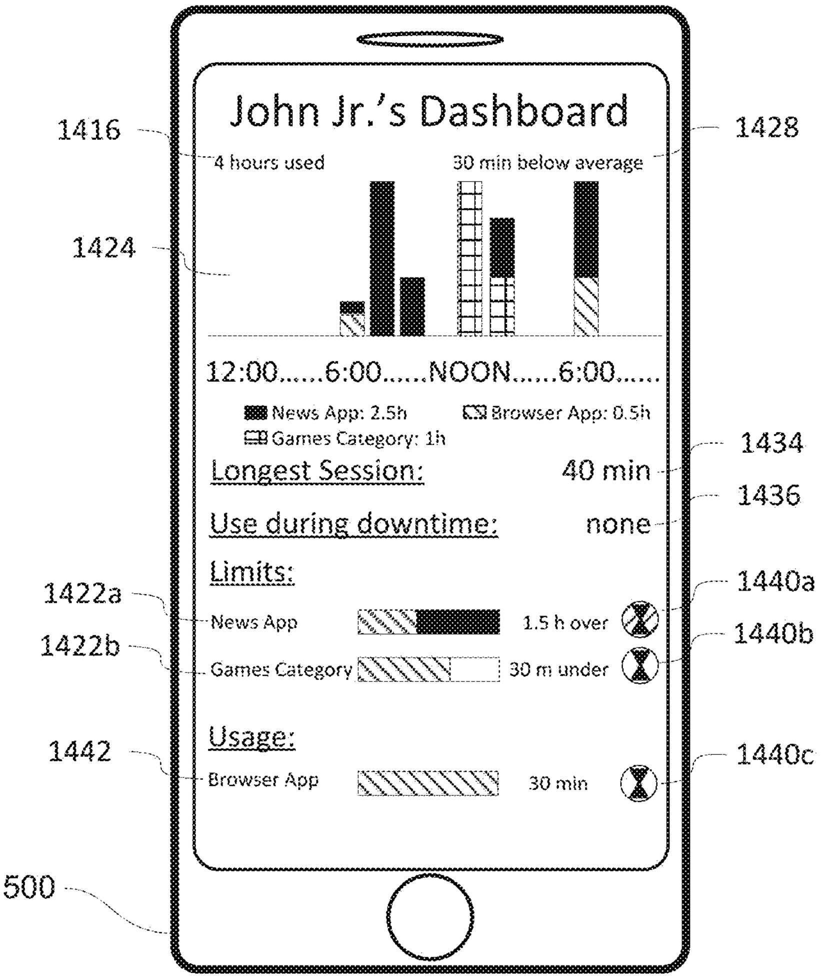
Figure 14L:
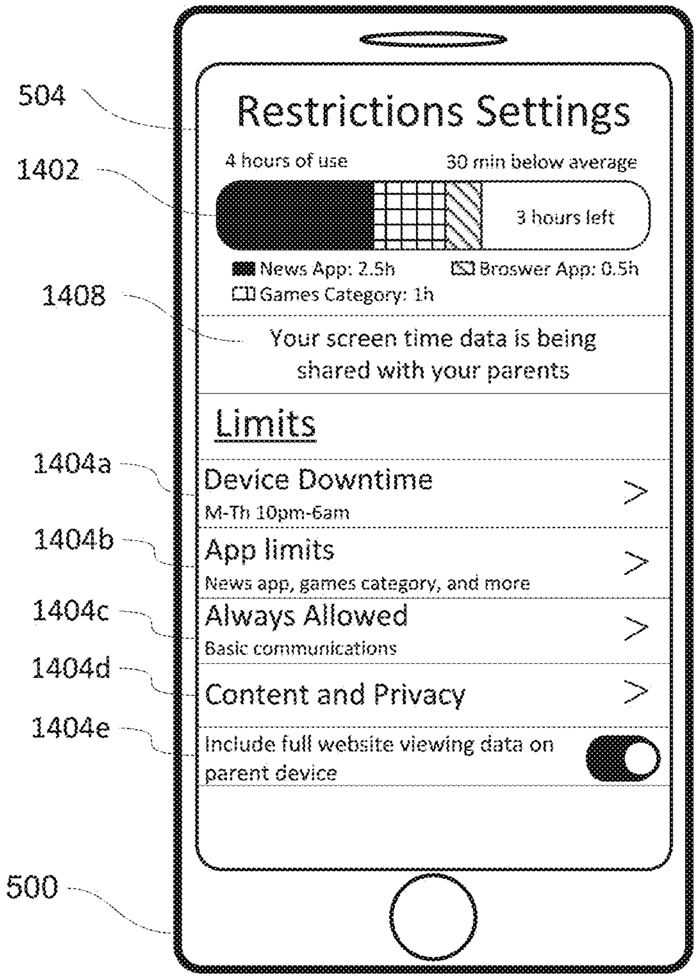
Figure 14M:
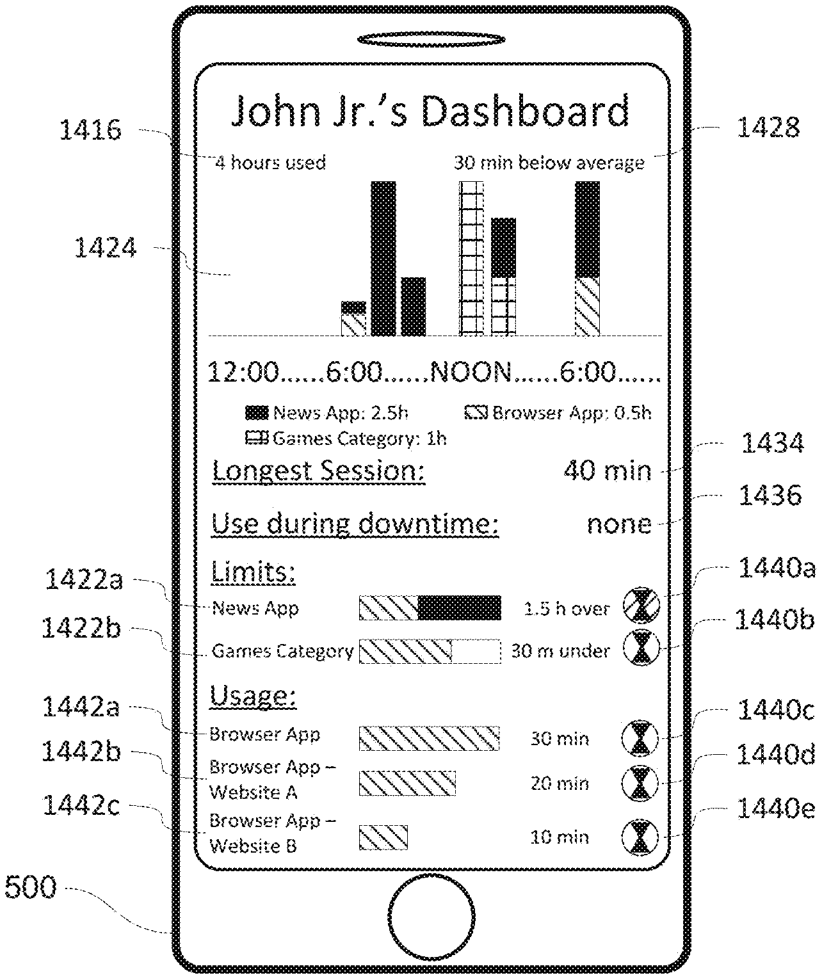
Figure 14N:
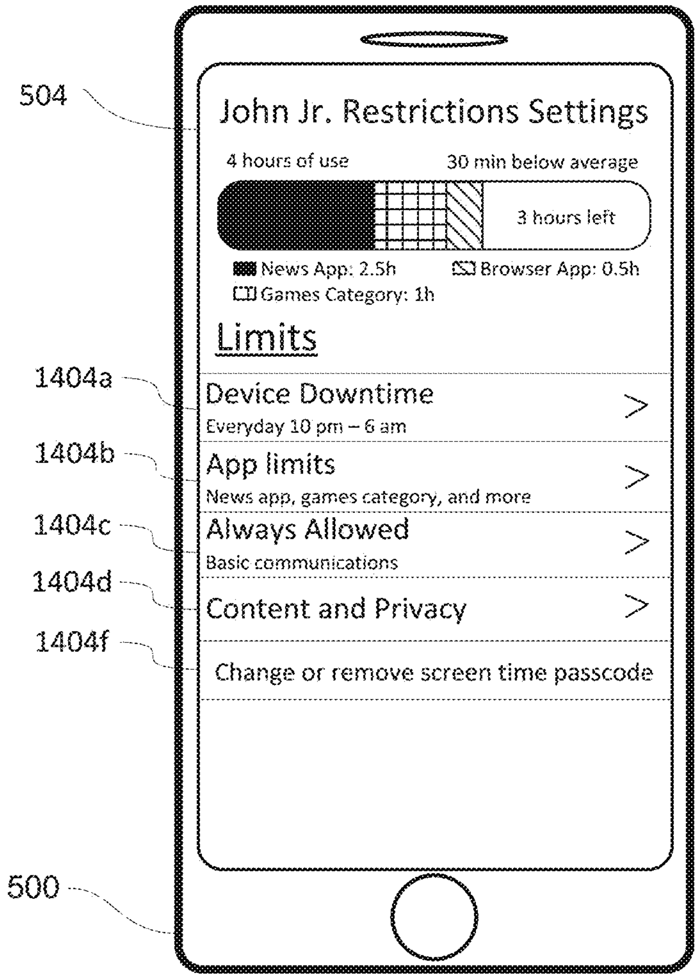
Figure 14O:
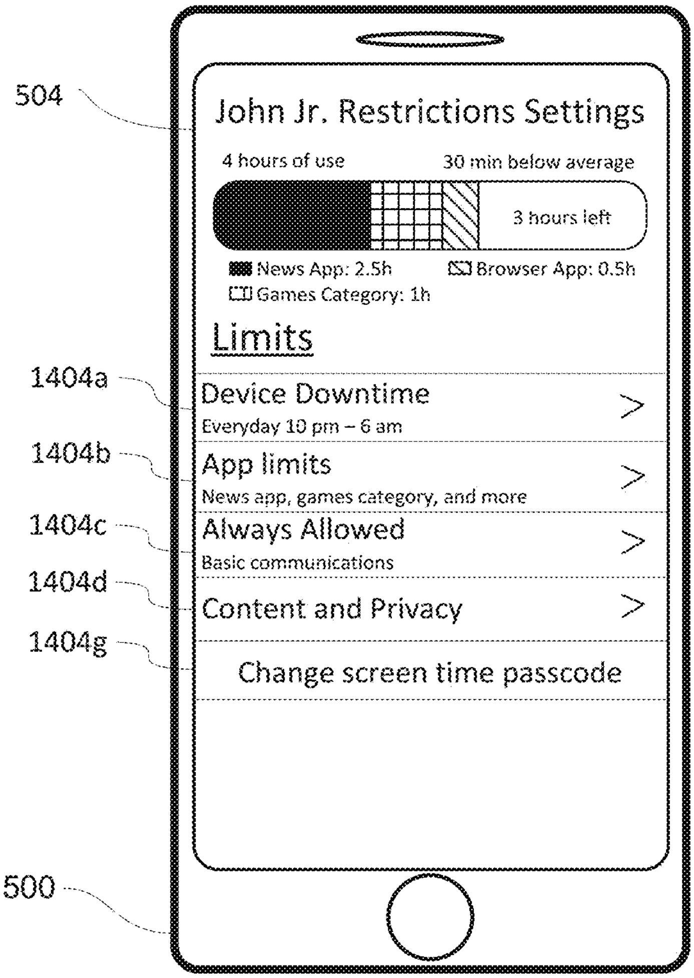
Figure 14P:
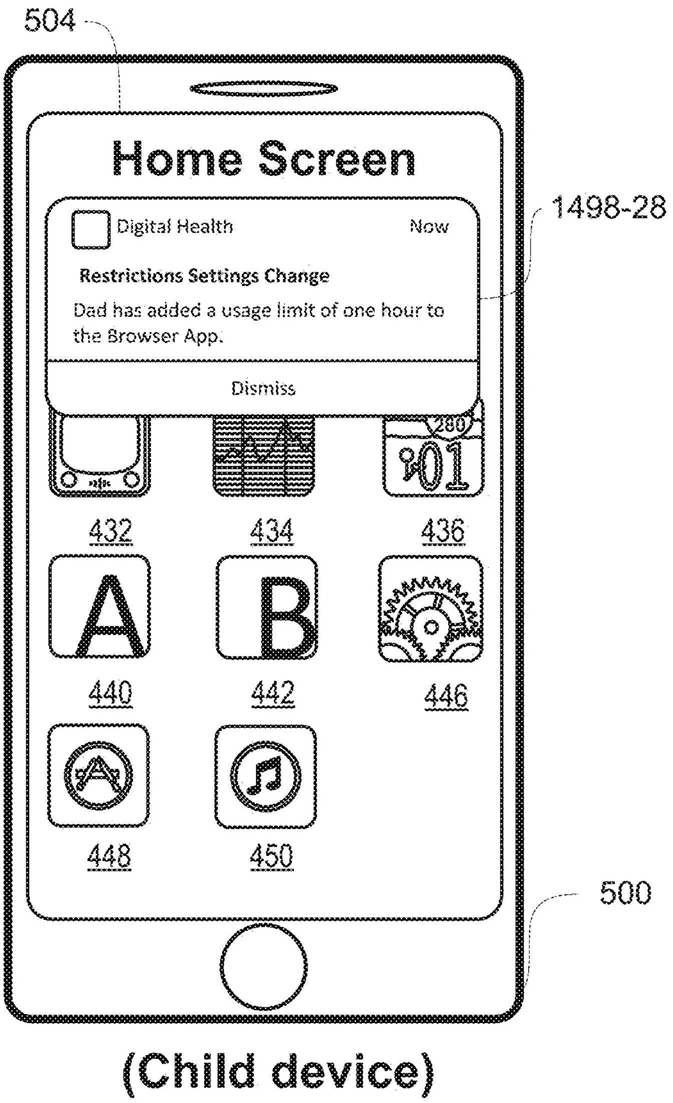
Figure 14Q:
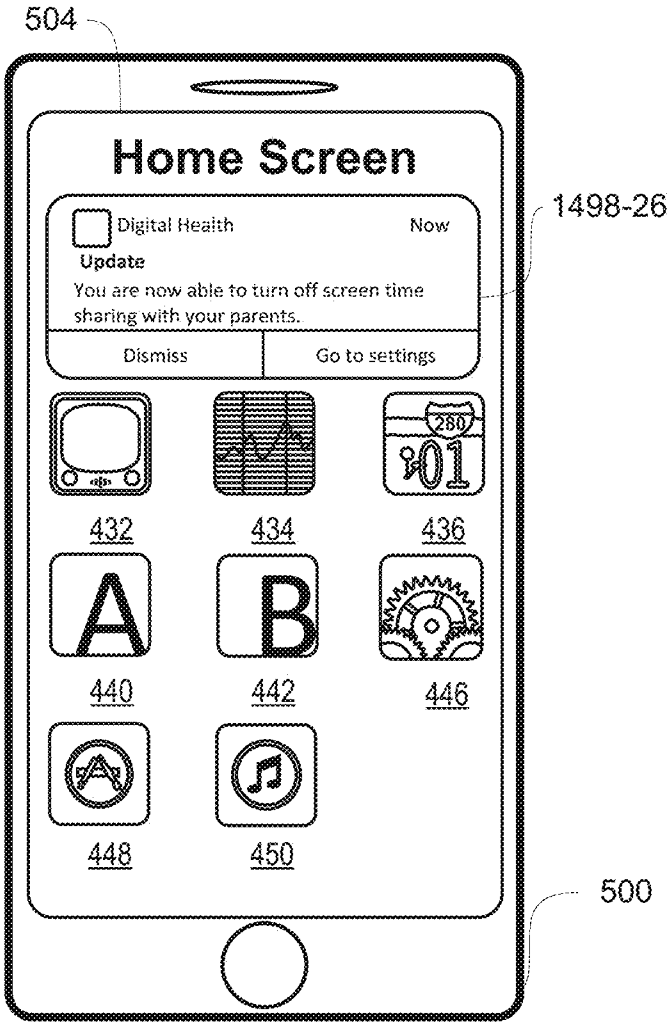
Figure 14R:
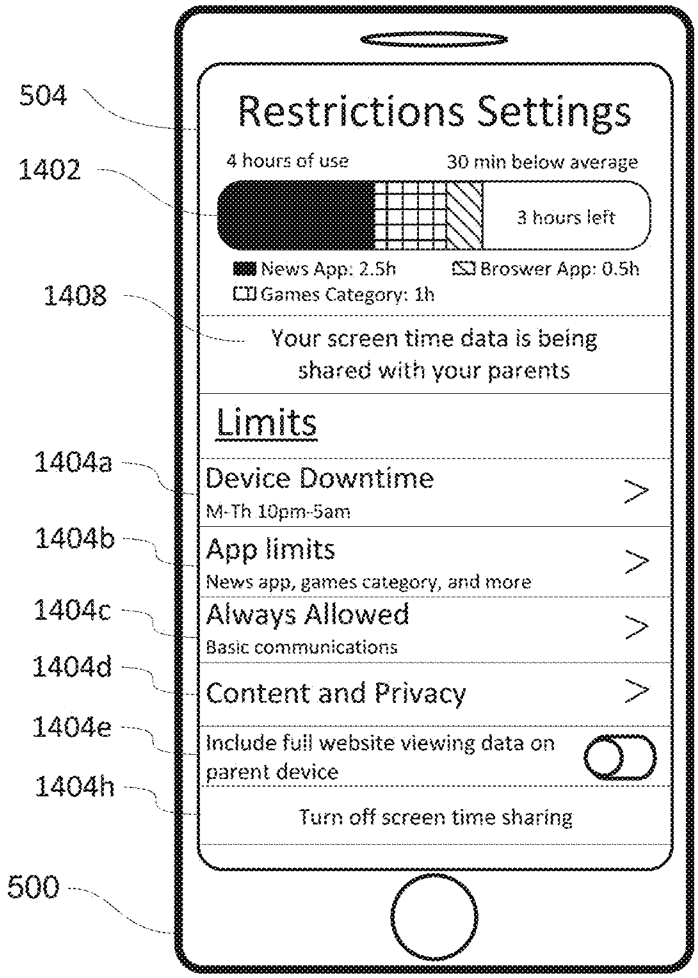
Figure 14S:
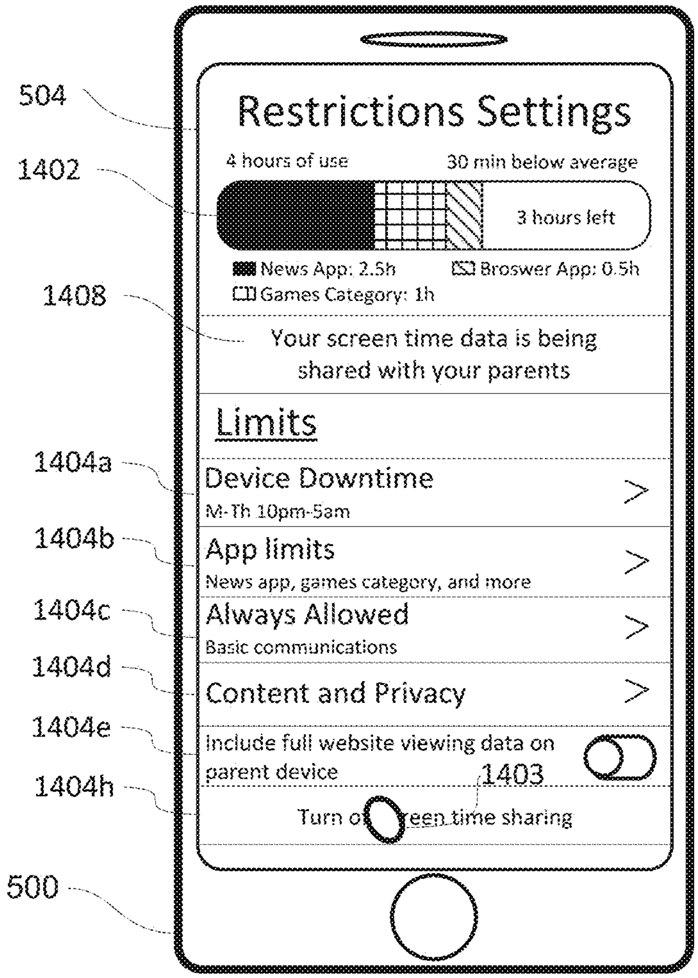
Figure 14T:
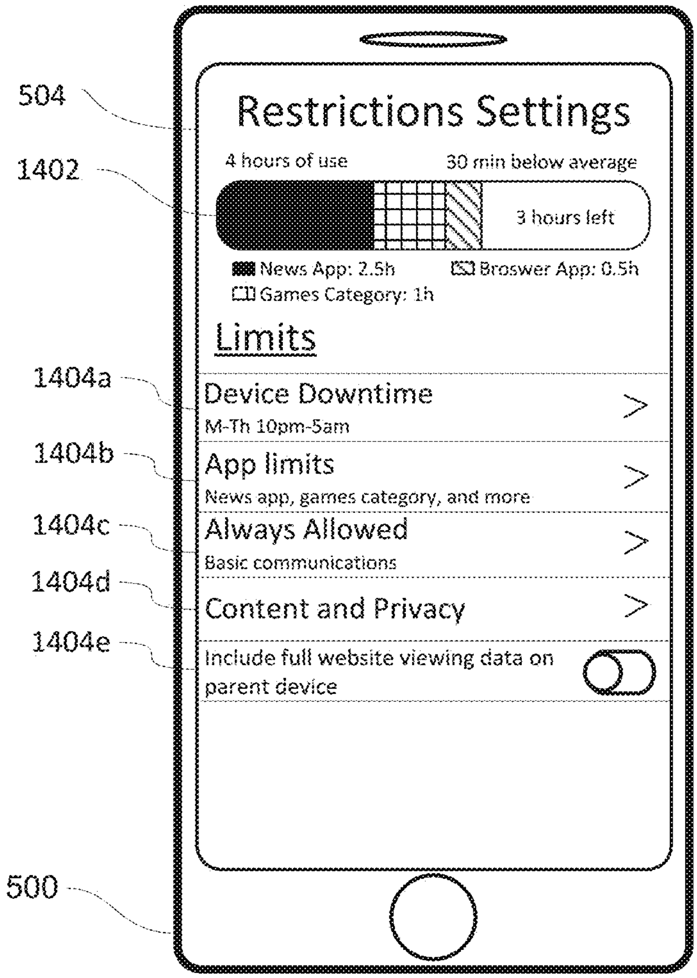
Figure 15A:
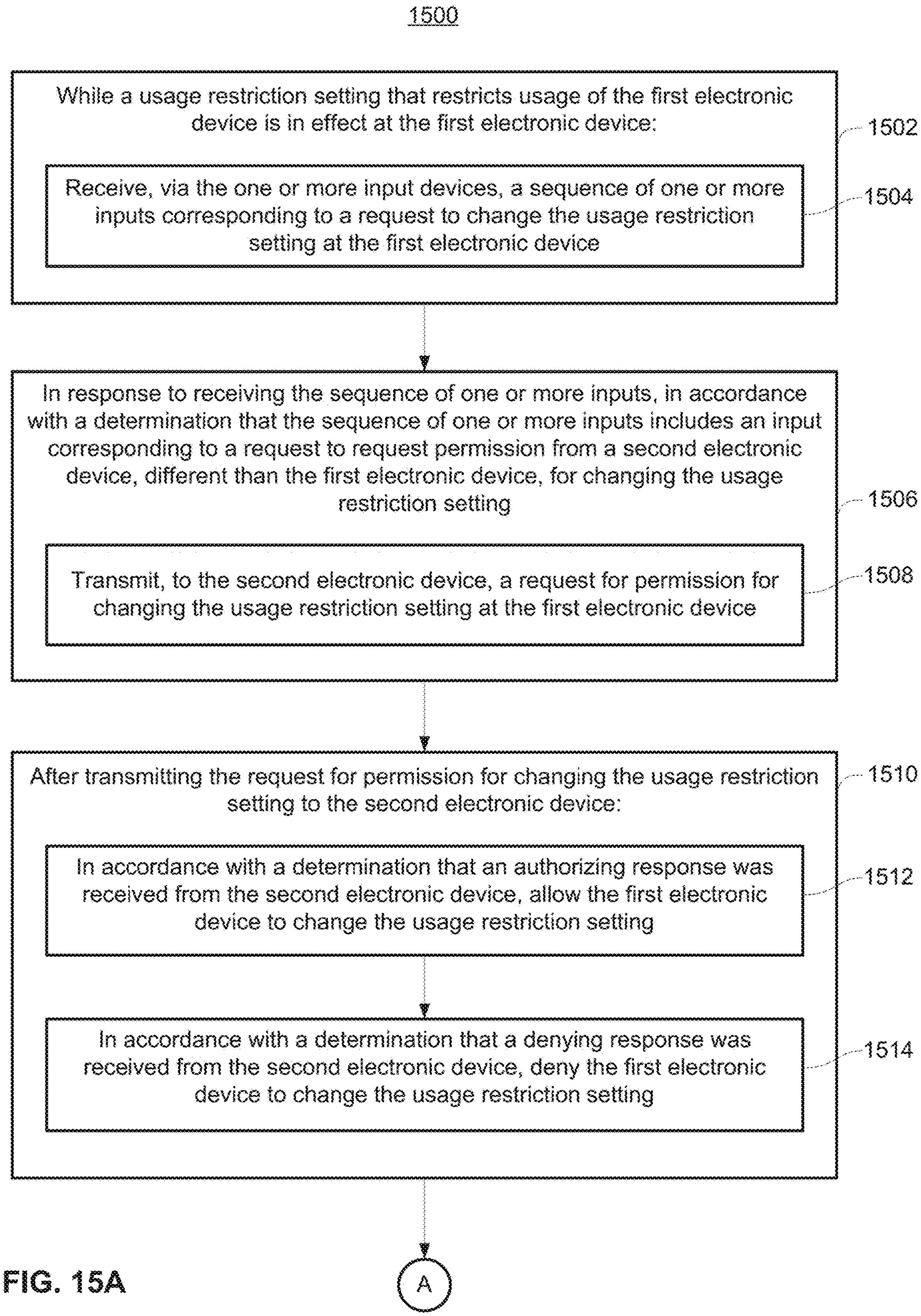
FIGS. 15A-15G are flow diagrams illustrating a method of managing restriction settings with permission optionally provided by another electronic device in accordance with some embodiments of the disclosure.
Figure 15B:
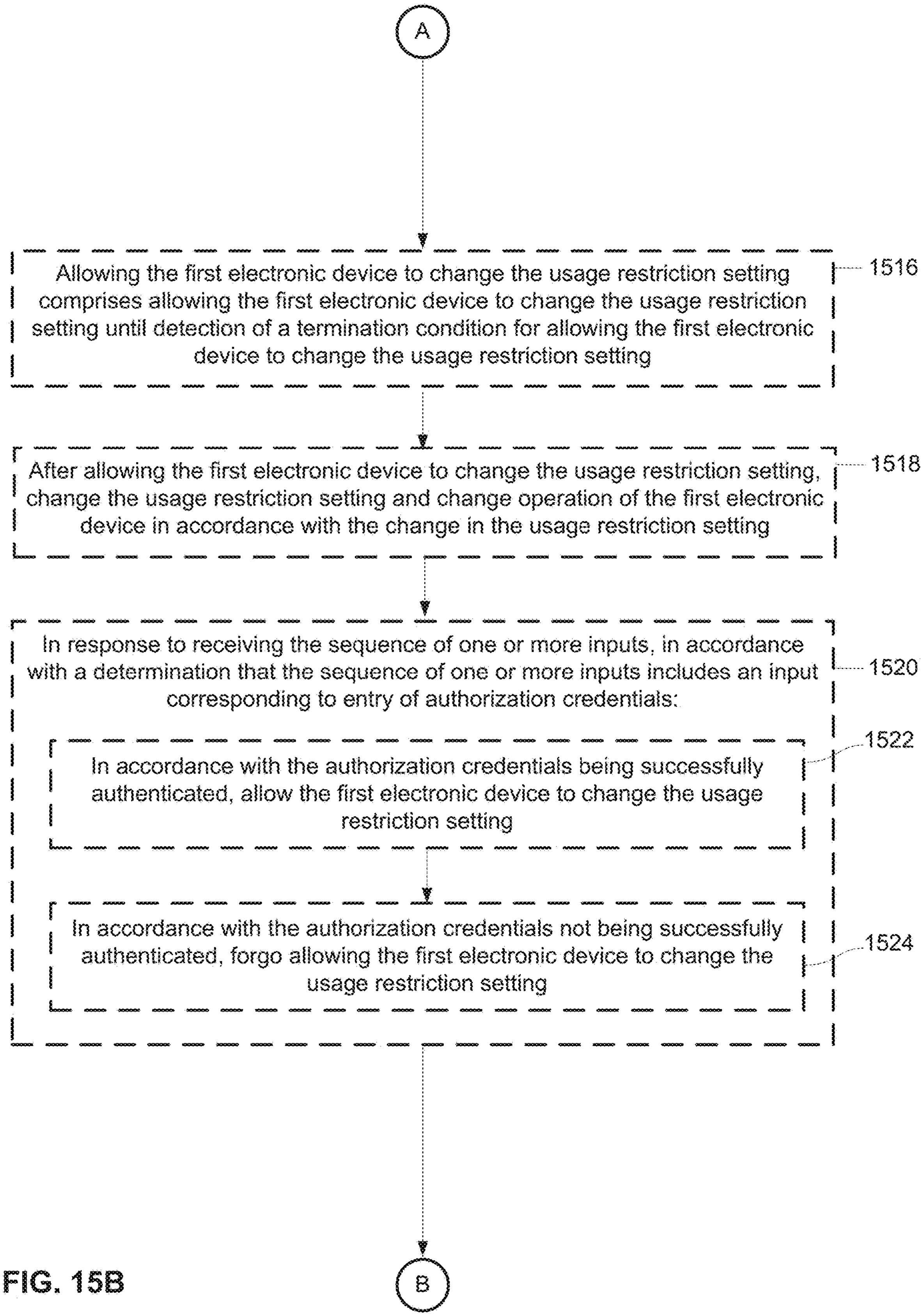
Figure 15C:
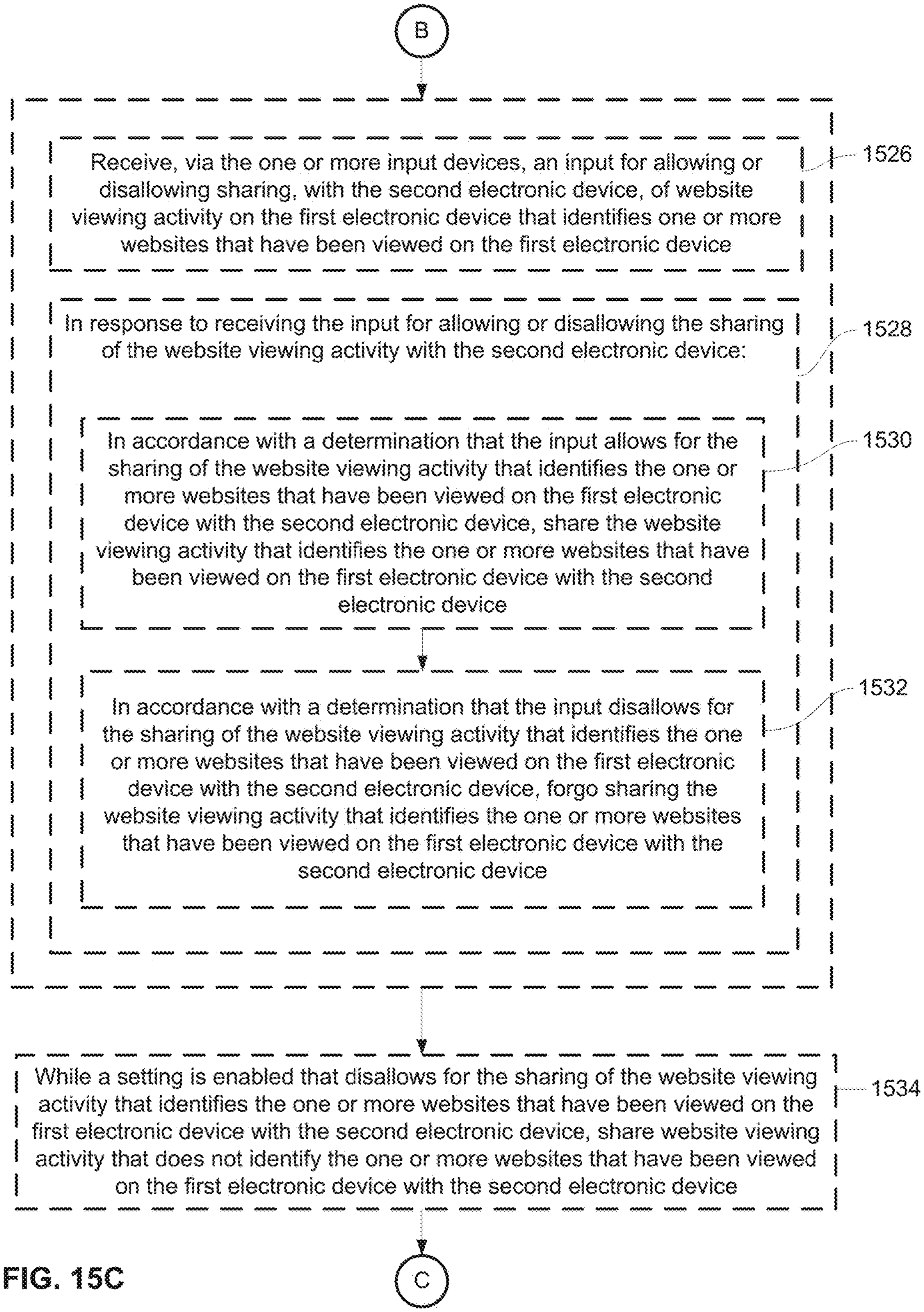
Figure 15D:
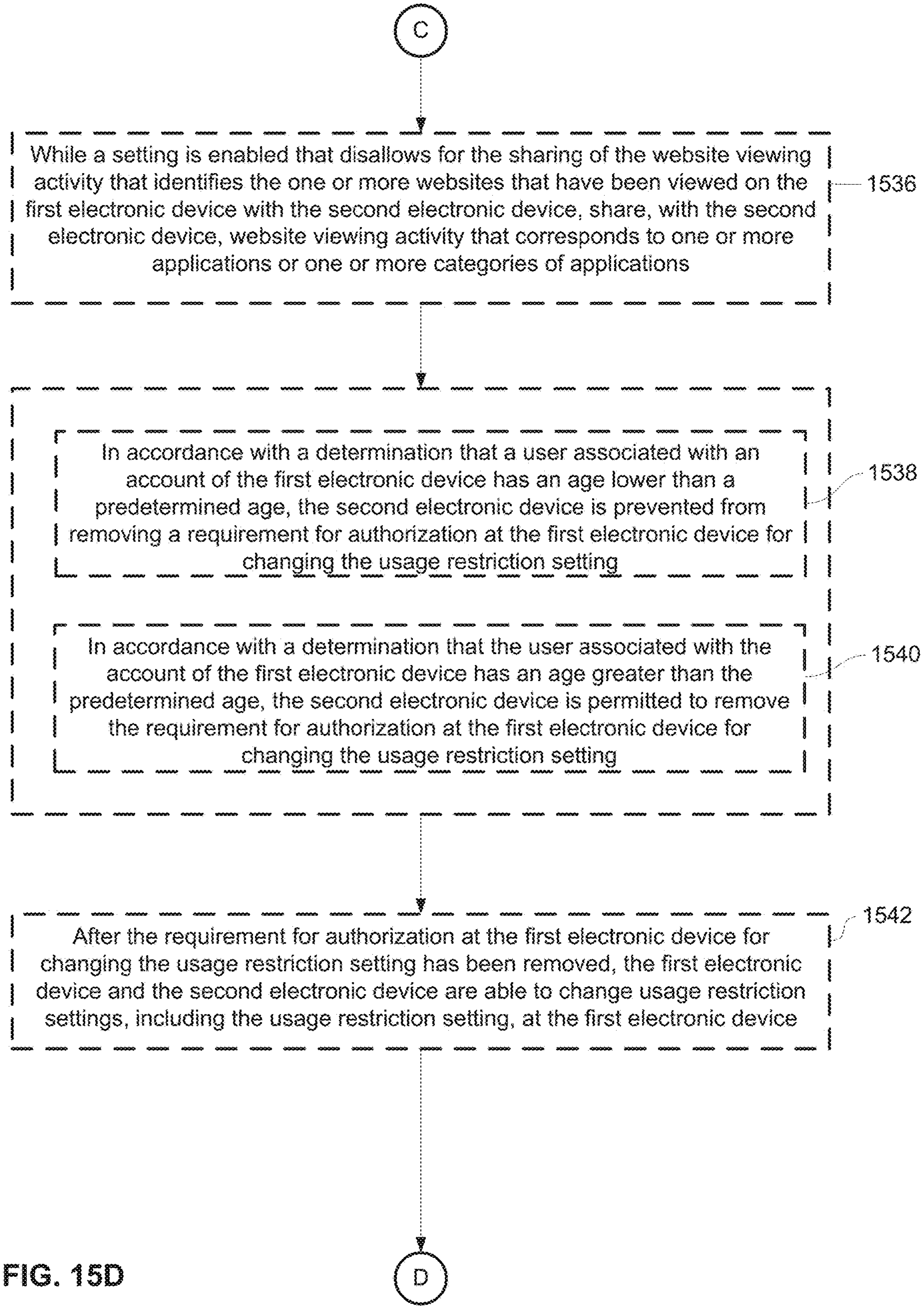
Figure 15E:
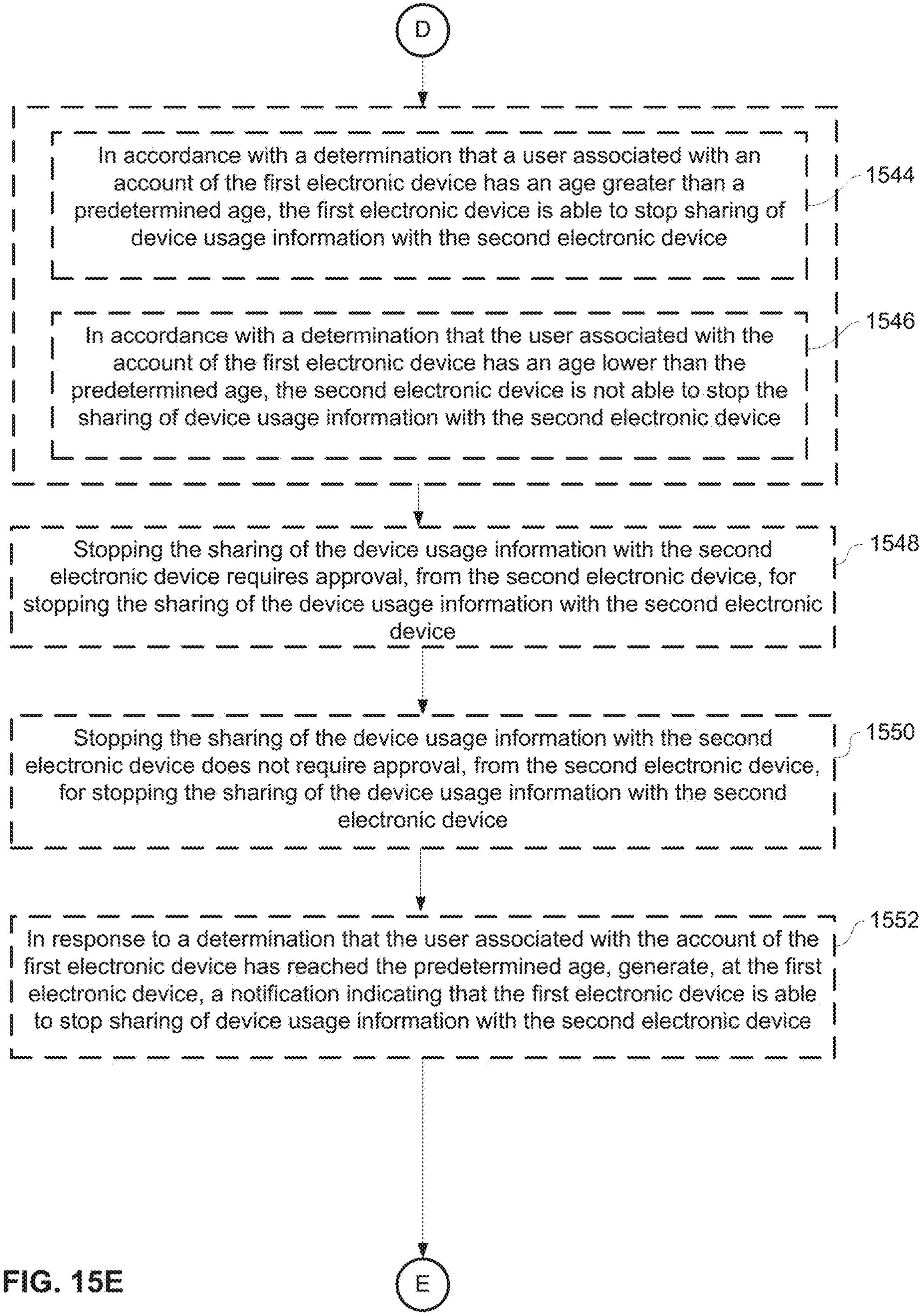
Figure 15F:
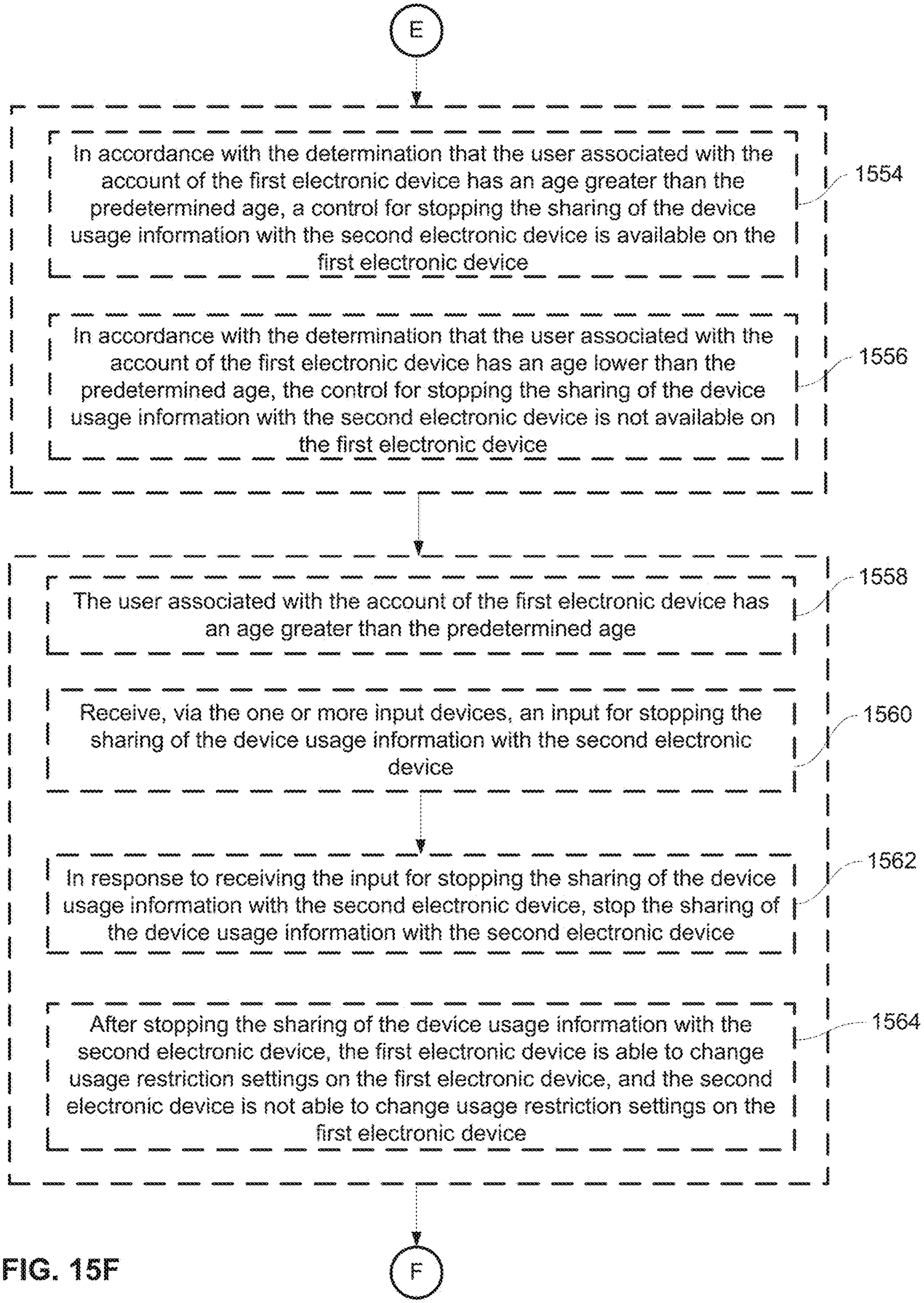
Figure 15G:
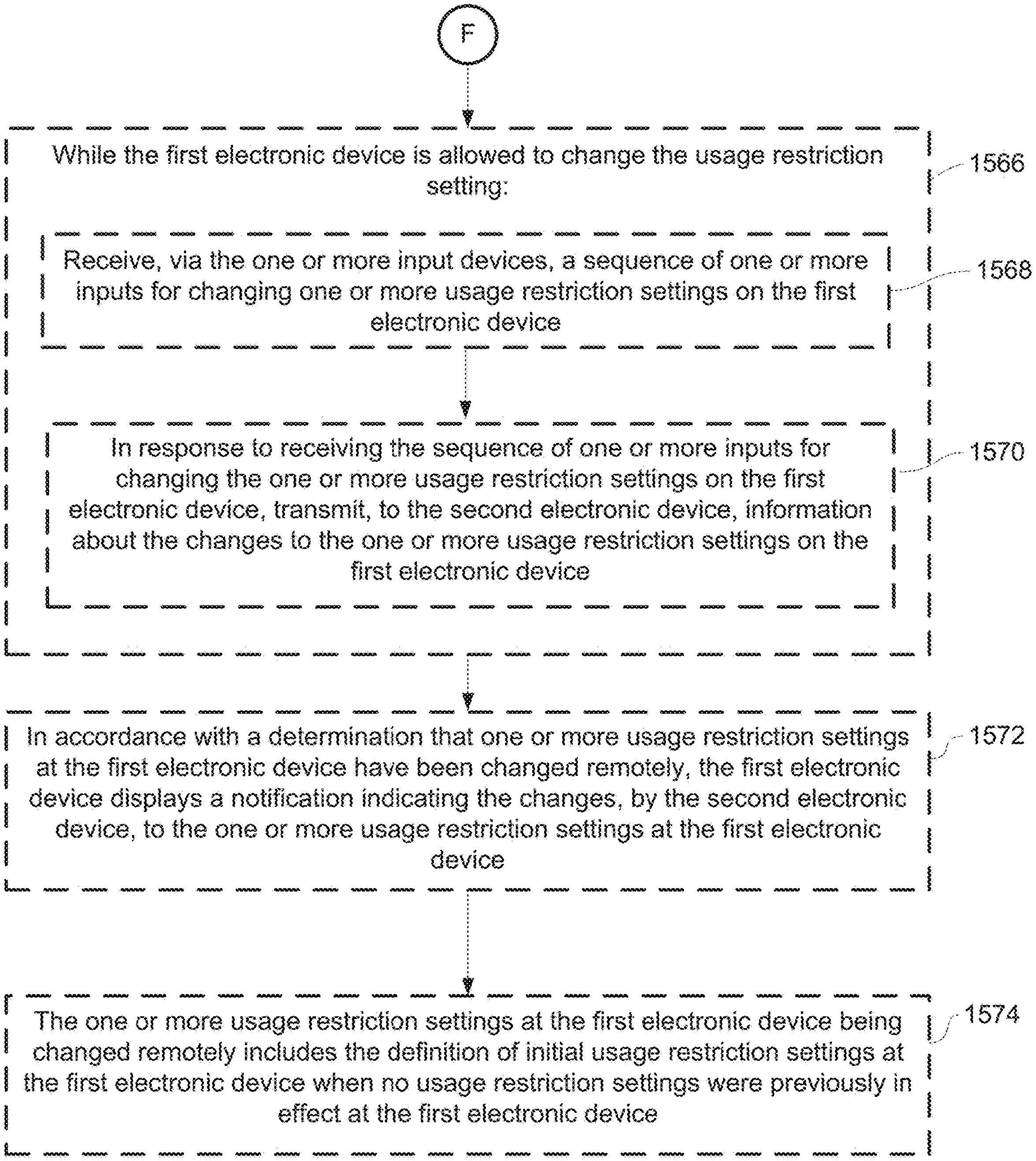

FIGS. 14A-14T illustrate exemplary ways in which an electronic device manages restriction settings with permission optionally provided by another electronic device in accordance with some embodiments of the disclosure. The embodiments in these figures are used to illustrate the processes described below, including the processes described with reference to FIGS. 15A-15G.

FIG. 14A illustrates exemplary device 500 with touch screen 504, described with reference to FIGS. 5A-5H. The electronic device 500 illustrated in FIG. 14A is associated with a restricted account, such as a child account affiliated with a group of user accounts in one family, including one or more child user accounts and one or more parent user accounts. In some embodiments, the administrator or parent user accounts have permission to change one or more restriction settings (e.g., one or more restriction settings described above with reference to FIGS. 10A-13H) of the child electronic device 500. Touch screen 504 optionally displays one or more user interfaces that include various content. In the example illustrated in FIG. 14A, touch screen 504 displays an indication 1498-26 that initial restriction settings have been set for the electronic device (e.g., by a parent device) when they were not previously set. The indication 1498-26 includes information about which restriction settings have been set and their details (e.g., "device downtime from 6 am-10 pm M-Th" and "Usage limits: News App, Games category, and Social Media category"). Thus, in some embodiments, device 500 displays a notification 1498-26 when a parent device first sets usage restriction settings for device 500.

FIG. 14B illustrates a restrictions settings user interface displayed on a child device 500, such as described with reference to FIGS. 6A-6C, 8O-8Q, and 10A-10AA. The restrictions settings user interface includes an indication 1402 of device usage, and indication 1408 that the screen time data is being shared with one or more parent devices associated with the child device, and a plurality of affordances 1404*a-e* for modifying various restrictions settings of the electronic device (e.g., "Device Downtime" 1404*a*, "App Limits" 1404*b*, "Always Allowed" 1404*c*, "Content and Privacy" 1404*d*, and "Include full website viewing data on parent device" 1404*e*). Device downtime 1404*a* is described in more detail above with reference to FIGS. 10A-11I. App limits 1404*b* is described in more detail above with reference to FIGS. 8A-9K. Always allowed 1404*c* is described in more detail above with reference to FIGS. 6A-13H. Turning on Include full website viewing data on parent device 1404*e* optionally allows the parent device to present information about which web sites the child device 500 accesses with a web browsing application. When this feature is turned off, the parent device optionally does not present usage information about which web sites were accessed by the child device 500; however, accessing a web site associated with an application installed on the child device 500 is optionally counted as using the electronic device to access that application (e.g., time spent accessing a web site associated with an application counts towards a usage limit for that application or category of applications and is included in usage data for that application and/or category). It should be understood that sharing screen time data (e.g., as indicated by indication 1402) with a parent or administrator device also includes sharing other usage data and restriction permissions, such as the ability to set device downtime, applications and functions that are always allowed, sharing and privacy permissions, content purchasing settings, age-restricted content consumption settings, and the like, and that such settings are also optionally subject to the remote management schemes of this disclosure.

As shown in FIG. 14B, the age of the child whose user account is associated with device 500 is below a threshold age at which sharing screen time data with the child's parents is optional. Therefore, electronic device 500 presents the indication 1408 that the screen time data is shared with the child's parents without presenting a setting for no longer sharing screen time data with the child's parents.

In FIG. 14C, the electronic device 500 detects a contact 1403 at the affordance 1404*a* for changing one or more device downtime settings. In response to the request to change the setting, the electronic device 500 presents an authorization user interface illustrated in FIG. 14D. As shown in FIG. 14D, the authorization user interface includes an affordance 1406 for remotely asking for permission from an administrative account (e.g., from a parent account or parent device) to change the setting and a keypad 1482 for entering a passcode for changing the setting. In some embodiments, the passcode for changing the restriction settings is different from the passcode for unlocking the electronic device 500 so that the administrator or parent may know the passcode without the non-administrator or child knowing the passcode.

In FIG. 14E, the electronic device 500 detects a contact 1403 at the affordance 1406 for remotely requesting parental permission to change the restriction setting. In response to the request to request permission to change the restriction setting, the electronic device 500 transmits a signal to another electronic device (e.g., an electronic device associated with an administrator's user account or a parent's user account) to request permission to change the restriction setting.

FIG. 14F illustrates an electronic device 500 associated with a parent's user account. The electronic device 500 presents an indication 1489-20 that the child requested permission to change a restriction setting at the child's electronic device. As shown in FIG. 14F, in some embodiments, indication 1489-20 includes information about which restriction setting the child is attempting to change (e.g., device downtime). The parent is able to approve (e.g., via selection of "allow" in indication 1498-20) or deny (e.g., via selection of "deny" in indication 1498-20) the child's access to the restriction settings at the child's electronic device. If the parent denies the child's request to change the restriction setting, then the child device is unable to change the restriction settings. If the parent approves the child's request to access the restriction settings at the child's electronic device, the child's electronic device presents a user interface for changing the restriction setting. In some embodiments, when the parent approves the changes to the restriction setting, the child device is granted access to the restriction settings for a predetermined time period, for a single session (e.g., until the child exits the restrictions settings user interface), until one or more restriction settings change, or until the child leaves the settings user interface for more than a predetermined amount of time.

FIG. 14G illustrates an electronic device 500 associated with a child user account. The electronic device 500 presents a user interface for changing one or more settings (1411-1417) associated with device downtime 1410, such as in response to the parent in FIG. 14F selecting "allow" in indication 1498-20, or in response to successful entry of a passcode in FIG. 14D. As shown in FIG. 14G, the electronic device 500 detects contact 1403 and optionally further user inputs for changing the device downtime start time from 10 pm to 11 pm. As discussed above, the parental authorization to change one or more restriction settings is optionally valid for a limited amount of time. Thus, electronic device 500 presents indication 1450 that changes to the device downtime settings can be made for three more minutes. Other authorization time frames and criteria, as discussed above, are possible. After the setting is changed, the restrictions setting user interface is updated to reflect the changed setting, as shown in FIG. 14H (e.g., "Device Downtime 1404*a*" is set for M-Th 11 pm-5 am, when it had been set to M-Th 10 pm-5 am, as shown in FIGS. 14B-14C).

When the child makes a change to the restriction settings, the parent device optionally presents an indication describing which changes were made. FIG. 14I illustrates an electronic device 500 associated with a parent account. As shown in FIG. 14I, the electronic device 500 presents an indication 1498-22 that the child device changed the device downtime from 10 pm-5 am M-Th to 11 pm-5 am M-Th. The indication 1498-22 includes affordances for denying or allowing the change. Thus, the parent device is optionally able to override the settings changes made at the child device. If the parent device approves the changes to the settings made by the child device, the child device operates in accordance with those changes. For example, by approving a change in device downtime from 10 pm-5 am to 11 pm-5 am, the child device operates in the normal, non-restricted mode until 11 pm, as opposed to operating in the restricted usage mode starting at 10 pm.

If the parent denies the settings changes made by the child device, the child device optionally presents an indication that the settings change was denied. FIG. 14J illustrates an electronic device 500 associated with a child user account. The electronic device 500 presents an indication 1498-24 that the change to the restriction setting was denied by a parent (e.g., "Dad denied the device downtime setting change"). Further, when the parent denies the setting change made at the child device, the child device continues to operate in accordance with the settings before they were changed. That is to say, the child device will optionally continue to transition into the restricted usage mode starting at 10 pm.

FIG. 14K illustrates a usage dashboard for a child's device usage presented at an electronic device 500 associated with a parent user account. The child device usage dashboard includes an indication 1416 of overall usage of the child's device, an indication 1428 of how the usage of the child's device compares to an average usage of the device, a graph 1424 illustrating detailed device usage metrics, an indication 1434 of the longest session on the child's device for the day, an indication 1436 of device usage during device downtime, indications 1422*a-b* of usage of applications and categories of applications for which usage limits are set, an indication 1442 of usage of application for which a usage limit is not set, and a plurality of affordances 1440*a-c* for changing restriction settings associated with the applications and categories presented in the dashboard user interface, such as described with reference to FIGS. 6L-6U.

As shown in FIG. 14K, the dashboard user interface includes an indication 1442 of how much time the child's electronic device was used to access a browser application, but does not include detailed information about which websites were accessed and for how long. However, time spent using the browser application to access websites associated with applications and categories for which usage metrics are presented optionally counts as using the electronic device to access the associated application (e.g., accessing one or more web sites associated with the news app optionally counts towards the news app usage metric and usage limit 1422*a*).

FIG. 14L illustrates the restriction settings user interface presented by the electronic device 500 associated with the child user account. As shown in FIG. 14L, the setting "include full website viewing data on parent device" 1404*e* is activated. When this setting is activated, the administrator or parent electronic device optionally presents information in the dashboard user interface about which web sites the child device accesses, as shown in FIG. 14M. In FIG. 14M, the dashboard user interface includes indications 1442*b* and 1442*c* of the amount of time the child electronic device accessed website A and website B, respectively, in addition to indication 1442*a* of the total amount of time the child electronic device used the browser application.

FIG. 14N illustrates a child restriction settings user interface presented by the electronic device 500 associated with the parent user account. The restriction settings user interface includes an indication of usage of the child device and a plurality of affordances 1404*a-f* for changing restriction settings of the child device, such as described with reference to FIGS. 8LLL-8NNN and 10Y to 10AA. If the age of the child is above a threshold age (e.g., 13 years old), the parent optionally has the option of removing and/or changing a screen time password required for making changes to the restriction settings of the child electronic device at the child electronic device by selecting affordance 1404*f*. As shown in FIG. 14O, when the child's age is below the threshold age, the parent device has the ability to change the screen time password by selecting affordance 1404*g*, but the screen time password cannot be removed.

When the parent changes a restriction setting of the child device, the child device optionally presents an indication of which setting has changed. FIG. 14P illustrates an indication 1498-28 of a restriction setting change presented at the electronic device 500 associated with the child user account. The indication 1498-28 includes information about which setting has changed and how it has been changed (e.g., "Dad has added a usage limit of one hour to the Browser App.").

As described herein, a parent device is optionally able to access screen time data of a child device and make changes to one or more restriction settings of the child device. It should be understood that sharing screen time data is one example of a number of types of information and permissions that are shared with the parent or administrator device. Here and throughout the description, sharing screen time data is understood to optionally include one or more of the ability to view any of the usage metrics described above with reference to FIGS. 6A-6UU (e.g., screen time, notifications, device pickups, etc.), the ability to set and update one or more restrictions settings (e.g., device downtime and/or usage limits), the ability to set one or more content and privacy settings, content purchasing settings, age-restricted content consumption settings, and the like.

Once the child's age exceeds a predetermined threshold (e.g., 18 years old), the child device is optionally able to stop sharing screen time data with the child's parents and/or take over control, from the parent device, of the usage restriction settings on the child device. FIG. 14Q illustrates an indication 1498-26 that the child device is able to stop sharing screen time data with the child's parents presented at the child device 500. The indication 1498-26 is optionally displayed when the child's age exceeds the predetermined threshold (e.g., 18 years old). When the child's age exceeds this threshold, the restrictions settings user interface of the child device is optionally updated to include a setting to stop sharing screen time data with the child's parents. FIG. 14R illustrates the restrictions settings user interface presented at the child device 500 when the age of the child exceeds the threshold at which sharing screen time data with the child's parents is optional. As shown in FIG. 14R, the settings user interface is updated to include affordance 1404*h* ("Turn off screen time sharing"). In some embodiments, the settings user interface on the child device 500 did not include affordance 1404*h* when the child's age was below the predetermined threshold (e.g., 18 years old). FIG. 14S illustrates the child device 500 detecting a contact at affordance 1404*h*.

In some embodiments, in response to this request to stop sharing screen time data with the child's parents, the child device requests permission from the parent device to stop sharing screen time data, which optionally includes displaying the authentication user interface illustrated in FIG. 14D. The parent is optionally able to approve the request for the child device to stop sharing screen time data by providing the passcode or authentication at the child device, or by authenticating the request at the parent device, as discussed above with reference to FIG. 14F. If permission to stop sharing screen time data is required, the screen time data optionally continues to be shared with the parent device until the parent approves the settings change to stop sharing screen time data. In some embodiments, parental permission to stop sharing screen time data is not required when the child's age exceeds the age threshold (e.g., 18 years old).

As shown in FIG. 14T, when the child device 500 no longer shares usage data with the child's parents, the restrictions settings user interface is updated in accordance with the change. In FIG. 14T, the indication 1408 that the screen time data is shared with the child's parents and the affordance 1404*h* for turning off screen time sharing are no longer presented in the restrictions settings user interface. Optionally, the setting 1404*e* for toggling including full website viewing data on parent device also ceases to be displayed. In some embodiments, after the child device stops sharing screen time data with the parent device, the user of the child device is free to change usage restriction settings on the child device (e.g., device downtime, usage limits, the ability to add/remove apps on the child device, change content purchasing settings, view age restricted content, privacy settings, etc.) without the need for an authorization input (e.g., a passcode or approval from a parental device).

FIGS. 15A-15G are flow diagrams illustrating a method 1500 of managing restriction settings with permission optionally provided by another electronic device in accordance with some embodiments of the disclosure. The method 1500 is optionally performed at an electronic device such as device 100, device 300, or device 500 as described above with reference to FIGS. 1A-1B, 1-3, 4A-4B, and 5A-5H. Some operations in method 1500 are, optionally, combined and/or the order of some operations is, optionally, changed.

As described below, the method 1500 provides ways to update one or more restriction settings associated with an electronic device 500 (e.g., a restricted device) with the permission of another electronic device (e.g., an authorizing device) or user account. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device 500 (e.g., a smart phone, a smart watch, a tablet computer, a computer, a set-top box, etc.) in communication with a display device (e.g., a display, a touch screen, a television) and one or more input devices (e.g., a touch screen, a touch-sensitive surface, a remote control, etc.), while a usage restriction setting that restricts usage of the first electronic device is in effect at the first electronic device (1502) (e.g., a usage limit that limits usage of one or more applications, categories of applications, total device use, etc. such as described with reference to methods 700, 900, 1100 and/or 1300, a restricted usage mode such as described with reference to methods 700, 900, 1100 and/or 1300, etc. that is in effect on the first electronic device. In some embodiments, the first electronic device is a restricted device (e.g., a device that is associated with a child or restricted account in a set of related accounts that includes one or more parent or administrator accounts) such as described with reference to methods 700, 900, 1100 and/or 1300 whose usage restriction settings are controlled by an authorizing device (e.g., a device that is associated with a parent account or administrator account in a set of related accounts that includes one or more child or restricted accounts) such as described with reference to methods 700, 900, 1100 and/or 1300)), receives (1504), via the one or more input devices, a sequence of one or more inputs corresponding to a request to change the usage restriction setting at the first electronic device (e.g., an input at the restricted device for changing a usage limit, a restricted usage mode setting, etc. in effect on the restricted device, where such usage restriction settings have been set by, or are controlled by, an authorizing device, such as in FIG. 14C. In some embodiments, this input for changing the usage restriction setting on the restricted device is detected at a usage restriction settings user interface displayed on the restricted device that displays information about the usage restriction settings that are in effect on the restricted device).

In some embodiments, in response to receiving the sequence of one or more inputs, in accordance with a determination that the sequence of one or more inputs includes an input corresponding to a request to request permission from a second electronic device, such as in FIGS. 14D-14E, (or from an administrator account that is associated with the second electronic device. In some embodiments, the request for permission is sent to a plurality of accounts that have administrator privileges (e.g., multiple parents in a family)), different than the first electronic device, for changing the usage restriction setting (1506) (e.g., the user interface displayed by the restricted device provides for multiple manners of changing usage restriction settings at the restricted device, including: providing a passcode at the restricted device for changing the settings, such as described with reference to methods 700, 900, 1100 and/or 1300, or requesting permission from an authorizing device for making changes to the usage restriction settings, or requesting permission from an administrator account that is associated with the authorizing device. In some embodiments, the restricted device detects an input requesting permission from the authorizing device for making the change to the usage restriction settings), the first electronic device transmits (1508), to the second electronic device, a request for permission for changing the usage restriction setting at the first electronic device, such as in FIGS. 14D-14F, (e.g., a request that causes a notification or other message to be displayed at the authorizing device that indicates that an attempt to change the usage restriction setting on the restricted device has been detected. In some embodiments, this notification on the authorizing device identifies the particular usage restriction setting that the restricted device is attempting to change and/or includes information about how the restricted device is attempting to change the usage restriction setting (e.g., the new value of the usage restriction setting that is detected at the restricted device). In some embodiments, in response to an input detected at the authorizing device that authorizes the change, the authorizing device transmits a change authorization to the restricted device, and the restricted device is allowed to change the usage restriction setting on the restricted device. In some embodiments, in response to an input detected at the authorizing device that denies the change, the restricted device is not allowed to change the usage restriction setting on the restricted device, and the usage restriction setting remains as it was before the input was detected for changing the usage restriction setting).

In some embodiments, after transmitting the request for permission for changing the usage restriction setting to the second electronic device (1510), as in FIGS. 14D-14F, in accordance with a determination that an authorizing response was received from the second electronic device (e.g., the user of the authorizing device selects an “allow” affordance displayed on the notification received at the authorizing device), the first electronic device is allowed (1512) to change the usage restriction setting, such as in FIGS. 14G-14H; and in accordance with a determination that a denying response was received from the second electronic device (e.g., the user of the authorizing device selects a “deny” affordance displayed on the notification received at the authorizing device), the first electronic device is denied (1514) to change the usage restriction setting, such as in FIG. 14I. In some embodiments, the user of the restricted device is able to instead enter a passcode at the restricted device to allow the restricted device to change the usage setting even if no response is received from the authorizing device.

The above-described manner of controlling the changing of a usage restriction setting on a restricted device from an authorizing device allows the electronic device to provide for an efficient manner of facilitating such changes when they require authorization from another party, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, allowing the first electronic device to change the usage restriction setting comprises allowing the first electronic device to change the usage restriction setting until detection of a termination condition for allowing the first electronic device to change the usage restriction setting (1516), such as in FIG. 14G (e.g., the restricted device is allowed to change the usage restriction setting for a predetermined time period (e.g., 30 seconds, 2 minutes, 5 minutes) after receiving approval from the authorizing device, the restricted device is allowed to change the restricted usage setting until the restricted leaves the settings user interface where such changes are to be made (and optionally must request permission again before being allowed to change usage restriction settings after leaving the settings user interface), the restricted device is allowed to change the restricted usage setting until the restricted device confirms a settings change (e.g., via selection of a “save” or “okay” or “back” affordance in the settings user interface that effectuates the settings change), the restricted device is allowed to change the restricted usage setting until the restricted device leaves the settings user interface for more than a predetermined amount of time (e.g., 30 seconds, 2 minutes, 5 minutes)).

The above-described manner of limiting, in various ways, the ability of the restricted device to make changes to the usage restriction settings following approval to make them allows the electronic device to manage such approval so that it is not limitless, which enhances the operability of the device and makes the user-device interface more efficient (e.g., by allowing the authorizing device to efficiently manage changes to the usage settings on the restricted device), which, additionally, reduces power usage and improves battery life of the device by enabling the user to use the device more quickly and efficiently.

In some embodiments, after allowing the first electronic device to change the usage restriction settings, the first electronic device changes the usage restriction setting and changing operation of the first electronic device in accordance with the change in the usage restriction setting (1518), such as in FIG. 14H (e.g., changing the application or application usage limits in effect on the restricted device in accordance with the change in the usage setting, changing a device downtime on the restricted device in accordance with the change in the usage setting, etc. as described in methods 700, 900, 1100 and/or 1300).

The above-described manner of operating the restricted device in accordance with the updated usage restriction setting allows the electronic device to provide for an efficient manner of implementing such updates, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, in response to receiving the sequence of one or more inputs, in accordance with a determination that the sequence of one or more inputs includes an input corresponding to entry of authorization credentials (1520), such as at keypad 1482 illustrated at least in FIG. 14D (e.g., a passcode, biometric, or other authorization credentials for changing usage restriction settings as described in methods 700, 900, 1100 and/or 1300), in accordance with the authorization credentials being successfully authenticated (e.g., the user of the restricted device enters correct credentials for changing the usage restriction setting), the first electronic device is allowed (1522) to change the usage restriction setting, such as in FIGS. 14G-14H; and in accordance with the authorization credentials not being successfully authenticated (e.g., the user of the restricted device enters incorrect credentials for changing the usage restriction setting), the first electronic device forgoes (1524) allowing the first electronic device to change the usage restriction setting, such as in FIG. 14J. Thus, in some embodiments, the restricted device is allowed to change the usage restriction setting in response to authorizing credentials being entered at the restricted device in lieu of receiving authorization from the authorizing device. In some embodiments, no request for permission is transmitted to the authorizing device when the authorizing credentials are entered at the restricted device.

The above-described manner of providing for passcode or other authorization input at the restricted device for changing the usage restriction settings allows the electronic device to provide for an efficient manner of allowing such changes (e.g., locally), which enhances the operability of the device and makes the user-device interface more efficient (e.g., by allowing the user to interact with the device with alternative inputs), which, additionally, reduces power usage and improves battery life of the device by enabling the user to use the device more quickly and efficiently.

In some embodiments, the first electronic device receives (1526), via the one or more input devices, an input for allowing or disallowing sharing, with the second electronic device, of website viewing activity on the first electronic device that identifies one or more websites that have been viewed on the first electronic device (e.g., allowing or disallowing the authorizing device to view the names/identities of individual websites that the user of the restricted device has viewed (as compared with total website viewing time, which the authorizing device is optionally able to view regardless of whether the restricted device allows or disallows the sharing of individual website viewing sharing), in a similar manner to dialog 1489-20 described above with reference to FIG. 14F. In some embodiments, the user of the restricted device is only able to control the sharing of this website viewing data if the user of the account of the restricted device is above a predetermined age (e.g., 10 years old, 13 years old, 18 years old), and is otherwise not able to control this sharing of data). In response to receiving the input for allowing or disallowing the sharing of the website viewing activity with the second electronic device (1528), in a similar manner to the allowing or disallowing described above with reference to FIG. 14F, in accordance with a determination that the input allows for the sharing of the website viewing activity that identifies the one or more websites that have been viewed on the first electronic device with the second electronic device, the first electronic device shares (1530) the website viewing activity that identifies the one or more websites that have been viewed on the first electronic device with the second electronic device, such as in FIG. 14M (e.g., the authorizing device is able to view identifying information (e.g., the web address, the title/name, etc.) of individual websites viewed by the user of the restricted device and/or the time spent viewing those individual websites); and in accordance with a determination that the input disallows for the sharing of the website viewing activity that identifies the one or more websites that have been viewed on the first electronic device with the second electronic device, the first electronic device forgoes (1532) sharing the website viewing activity that identifies the one or more websites that have been viewed on the first electronic device with the second electronic device, such as in FIG. 14K (e.g., the authorizing device is not able to view identifying information (e.g., the web address, the title/name, etc.) of individual websites viewed by the user of the restricted device and/or the time spent viewing those individual websites).

The above-described manner of controlling the sharing of individualized website usage information allows the electronic device to provide for an efficient manner of maintaining privacy at the restricted device while still facilitating the enforcement of usage restrictions, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, while a setting is enabled that disallows for the sharing of the website viewing activity that identifies the one or more websites that have been viewed on the first electronic device with the second electronic device, the first electronic device shares (1534) website viewing activity that does not identify the one or more websites that have been viewed on the first electronic device with the second electronic device, such as in FIG. 14K (e.g., even though the authorizing device is not able to view individual website viewing information from the restricted device, the authorizing device is able to view information about web usage in general on the restricted device, such as the total amount of time spent on the restricted device viewing websites, without being able to view which websites were viewed, the time of day that the websites were viewed, the duration of individual sessions of viewing the websites, and/or particular webpages or subdomains that were viewed and instead the amount of time that the website is used is aggregated with application usage).

The above-described manner of continuing to share general web usage information with the authorizing device allows the electronic device to provide for an efficient manner of implementing usage restrictions even when individualized website usage information is not shared with the authorizing device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, while a setting is enabled that disallows for the sharing of the website viewing activity that identifies the one or more websites that have been viewed on the first electronic device with the second electronic device, the first electronic device shares (1536), with the second electronic device, website viewing activity that corresponds to one or more applications or one or more categories of applications, such as in FIG. 14K (e.g., sharing with the second electronic device aggregate statistics about usage of a first application and usage of a web browser to access a website associated with the first application and aggregate statistics about usage of a second application and usage of the web browser to access a website associated with the second application without sharing specific information about web browsing activity performed at the web browser) (e.g., even though the authorizing device is not able to view individual website viewing information from the restricted device, the authorizing device is able to view information about web usage for websites that correspond to applications (e.g., ESPN website viewing, which corresponds to the ESPN app, is reflected on the authorizing device as usage of the ESPN app) or categories of applications (e.g., social media website viewing, which corresponds to the category of social media apps, is reflected on the authorizing device as usage in the social media category of apps). Further, in some embodiments, usage limits for those applications or categories are still imposed on the restricted device, when applicable, such that web site viewing on the restricted device is restricted when that viewing is restricted by the application/category limits in effect on the restricted device as described in methods 700, 900, 1100 and/or 1300).

The above-described manner of reflecting website usage data that corresponds to applications/categories of applications allows the electronic device to provide for an efficient manner of implementing usage restrictions even when individualized website usage information is not shared with the authorizing device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, in accordance with a determination that a user associated with an account of the first electronic device has an age lower than a predetermined age (e.g., 10, 13, 15 years old), the second electronic device is prevented from removing (e.g., the second device is not able to remove) a requirement for authorization at the first electronic device for changing the usage restriction setting (1538), such as in FIG. 14O (e.g., the authorizing device cannot remove the requirement that a passcode, or other authorizing credential or action (such as authorizing device approval) be provided at the restricted device for changing usage restriction settings on the restricted device. In some embodiments, the authorizing device is, however, able to change the passcode or other authorizing credential required at the restricted device for changing usage restriction settings at the restricted device), and in accordance with a determination that the user associated with the account of the first electronic device has an age greater than the predetermined age (e.g., 10, 13, 15 years old), the second electronic device is permitted to remove the requirement for authorization at the first electronic device for changing the usage restriction setting (1540), such as in FIG. 14N (e.g., the authorizing device is able to remove the requirement that a passcode, or other authorizing credential or action (such as authorizing device approval) be provided at the restricted device for changing usage restriction settings on the restricted device. In some embodiments, the authorizing device is, alternatively, still able to change the passcode or other authorizing credential required at the restricted device for changing usage restriction settings at the restricted device).

The above-described manner of providing the authorizing device with the controlled ability to remove the passcode requirement from the restricted device allows the electronic device to provide for an efficient manner of implementing usage restrictions even when individualized website usage information is not shared with the authorizing device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, after the requirement for authorization at the first electronic device for changing the usage restriction setting has been removed, the first electronic device and the second electronic device are able to change usage restriction settings, including the usage restriction setting, at the first electronic device (1542), such as allowing the first electronic device to change one or more settings as described above with reference to FIG. 14G (e.g., once the passcode is removed, both the authorizing device or an administrator account and the restricted device are able to change restrictions and limits in effect on the restricted device).

The above-described manner of allowing both the restricted and the authorizing device to make changes to usage restriction settings when the passcode requirement is removed allows the electronic device to provide for an efficient manner of facilitating such changes while maintaining the authorizing device's ability to affect usage restriction settings on the restricted device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, in accordance with a determination that a user associated with an account of the first electronic device has an age greater than a predetermined age (e.g., 15, 18 years old), the first electronic device is able to stop sharing of device usage information with the second electronic device (1544), such as in FIGS. 14R-14T (e.g., the restricted device is able to stop the ability of the authorizing device or an administrator account to see usage information about the restricted device. In some embodiments, the restricted device is able to break away from the authorizing device and is able to turn off or otherwise adjust usage restriction settings at the restricted device independent of any authorization from the authorizing device), and in accordance with a determination that the user associated with the account of the first electronic device has an age lower than the predetermined age, the second electronic device is not able to stop the sharing of device usage information with the second electronic device (1546), such as in FIG. 14B (e.g., the restricted device is not able to stop the ability of the authorizing device or an administrator account to see usage information about the restricted device).

The above-described manner of controlling when the restricted device is able to stop the sharing of usage information with the authorizing device allows the electronic device to provide for an efficient manner of controlling such ability, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, stopping the sharing of the device usage information with the second electronic device requires approval, from the second electronic device, for stopping the sharing of the device usage information with the second electronic device (1548), in a manner similar to that described above with reference to FIG. 14F (e.g., the restricted device is not able to stop the sharing of the usage information with the authorizing device without approval for doing so from the authorizing device or an administrator account. In some embodiments, when the restricted device attempts to turn off the sharing of the usage information with the authorizing device, the authorizing device displays a notification indicating the request and with options for "allowing" or "denying" the request. If the user of the authorizing device selects "allow", the restricted device is optionally able to stop sharing the usage information with the authorizing device. If the user of the authorizing device selects "deny", the restricted device is optionally not able to stop the sharing of the usage information with the authorizing device).

The above-described manner of requiring authorizing device approval for stopping of usage information sharing with the authorizing device allows the electronic device to provide for an efficient manner of control over such a change by the authorizing device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, stopping the sharing of the device usage information with the second electronic device does not require approval, from the second electronic device, for stopping the sharing of the device usage information with the second electronic device (1550), such as in FIG. 14T (e.g., the restricted device is able to stop the sharing of the usage information with the authorizing device without approval for doing so from the authorizing device or an administrator account. In some embodiments, a notification of this action is sent to the authorizing device that indicates the action being taken by the restricted device without the ability of the authorizing device to approve or deny the action; and in some embodiments, a notification of this action is not sent to the authorizing device).

The above-described manner of not requiring authorizing device approval for stopping usage information sharing allows the electronic device to provide for an efficient manner of stopping such sharing, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, in response to a determination that the user associated with the account of the first electronic device has reached the predetermined age (e.g., based on a birthday of the user and a current date/time), the first electronic device generates (1552) a notification indicating that the first electronic device is able to stop sharing of device usage information with the second electronic device, such as in FIG. 14Q (e.g., the restricted device displays a notification when the user of the restricted device reaches the age at which the user is able to stop the sharing of usage information with the authorizing device so that the user knows that they are now able to take such action).

The above-described manner of generating a notification for the user of the restricted device when the user is able to change the sharing of information with the authorizing device allows the electronic device to provide for an efficient manner of facilitating such changes, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, in accordance with the determination that the user associated with the account of the first electronic device has an age greater than the predetermined age, a control for stopping the sharing of the device usage information with the second electronic device is available on the first electronic device (1554), such as in FIGS. 14R-14S (e.g., an affordance, button or control for changing the sharing of the usage information with the authorizing device is displayed and is enabled in the usage restriction settings user interface on the restricted device), and in accordance with the determination that the user associated with the account of the first electronic device has an age lower than the predetermined age, the control for stopping the sharing of the device usage information with the second electronic device is not available on the first electronic device (1556), such as in FIG. 14B (e.g., an affordance, button or control for changing the sharing of the usage information with the authorizing device is not displayed in the usage restriction settings user interface on the restricted device, or is displayed in the usage restriction settings user interface on the restricted device but is not enabled (e.g., is greyed out)).

The above-described manner of making available or not a control for changing the sharing of information with the authorizing device allows the electronic device to provide for an efficient manner of facilitating such changes while comporting with restrictions on abilities to make such changes, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, the user associated with the account of the first electronic device has an age greater than the predetermined age (1558), such as in FIGS. 14R-14S; the first electronic device receives (1560), such as in FIG. 14S, via the one or more input devices, an input for stopping the sharing of the device usage information with the second electronic device; and in response to receiving the input for stopping the sharing of the device usage information with the second electronic device, the first electronic device stops (1562) the sharing of the device usage information with the second electronic device, such as in FIG. 14T (e.g., the user of the restricted device selects the button or toggle in the usage restriction settings user interface for stopping the sharing of usage information with the authorizing device). In some embodiments, after stopping the sharing of the device usage information with the second electronic device, the first electronic device is able to change usage restriction settings on the first electronic device, and the second electronic device is not able to change usage restriction settings on the first electronic device (1564) in a manner similar to that described above with reference to FIG. 14G (e.g., once the usage information sharing and/or usage restriction sharing with the authorizing device or administrator account have been disabled, the previously-restricted device is able modify usage restriction settings on the previously-restricted device, but the authorizing device or administrator account is no longer able to modify such settings on the previously-restricted device. In effect, the restricted device is optionally no longer restricted by the authorizing device/administrator account).

The above-described manner of allowing the previously-restricted device to make changes to the usage restriction settings on that device but not allowing the authorizing device to do so allows the electronic device to operate independently of the authorizing device in usage restrictions, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, while the first electronic device is allowed to change the usage restriction setting (1566), such as in FIG. 14G, the first electronic device receives (1568), via the one or more input devices, a sequence of one or more inputs for changing one or more usage restriction settings on the first electronic device, such as in FIG. 14G (e.g., after receiving approval from the authorizing device for changing usage restriction settings on the restricted device, the user of the restricted device provides inputs to the restricted device for changing the usage restriction settings, such as changing one or more usage limits in effect on the restricted device, changing device downtime settings in effect on the restricted device, etc.); and in response to receiving the sequence of one or more inputs for changing the one or more usage restriction settings on the first electronic device, the first electronic device transmits (1570), to the second electronic device, information about the changes to the one or more usage restriction settings on the first electronic device, such as in FIG. 14I (e.g., the restricted device transmits to the authorizing device or administrator account information about the changes to the usage restriction settings that the restricted device has attempted to make (e.g., information about all the changes attempted at the restricted device, such as the specific usage limit changes, the specific device downtime changes, etc.). In some embodiments, the restricted device makes the changes to the restricted usage settings and in conjunction with making the changes transmits information about the changes to the authorizing device, which optionally displays a notification of the changes so the user of the authorizing device is able to see the changes that were made on the restricted device; in such embodiments, the notification optionally does not have a mechanism via which the user of the authorizing device is able to cancel, deny or nullify the changes made by the restricted device. Rather, in such embodiments, the authorizing device must optionally manually make changes to the usage restriction settings of the restricted device to reverse any of the changes made by the restricted device. In contrast, in some embodiments, the restricted device does not make the changes to the restricted usage settings and first transmits information about the attempted changes to the authorizing device, which optionally displays a notification of the attempted changes so the user of the authorizing device is able to see the changes that are proposed on the restricted device; in such embodiments, the notification optionally does have a mechanism (e.g., selectable affordances) via which the user of the authorizing device is able to cancel/deny/nullify or approve the changes attempted to be made by the restricted device).

The above-described manner of transmitting information about usage restriction changes to the authorizing device allows the electronic device to efficiently communicate such changes to the authorizing device, which enhances the operability of the device and makes the user-device interface more efficient (e.g., by allowing device to operate with fewer inputs from the user), which, additionally, reduces power usage and improves battery life of the device by enabling the user to use the device more quickly and efficiently.

In some embodiments, in accordance with a determination that one or more usage restriction settings at the first electronic device have been changed remotely (e.g., by the second electronic device or another electronic device associated with a user who is permitted to make changes to the usage restriction settings of the first electronic device, such as an administrator account), the first electronic device displays a notification indicating the changes, by the second electronic device, to the one or more usage restriction settings at the first electronic device (1572), such as in FIG. 14P (e.g., the restricted device receives, from the authorizing device, information about changes that the authorizing device has made to the usage restriction settings on the restricted device, and in response the restricted device displays a notification on the restricted device with the particulars of the changes (e.g., changes to usage limits, device downtime, etc.) so that the user of the restricted device is able to see the changes made by the authorizing device).

The above-described manner of displaying a notification at the restricted device with usage restriction changes made by the authorizing device allows the electronic device to provide for an efficient manner of providing information of such changes to the user of the restricted device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

In some embodiments, the one or more usage restriction settings at the first electronic device being changed remotely includes the definition of initial usage restriction settings at the first electronic device when no usage restriction settings were previously in effect at the first electronic device (1574), such as in FIG. 14A (e.g., the restricted device receives, from the authorizing device or administrator account, information about the initial usage restrictions the authorizing device puts in effect on the restricted device when the authorizing device puts those restrictions in effect, and in response the restricted device displays a notification on the restricted device with the particulars of those initial restrictions (e.g., usage limits, device downtime, etc.) so that the user of the restricted device is able to see the usage restrictions that are now in effect on the restricted device. In some embodiments, the notification includes information about all of the restrictions that are now in effect on the restricted device (e.g., every usage limit, every characteristic of the device downtime, etc.). In some embodiments, the notification instead includes a summary of key restrictions that are now in effect on the restricted device, such as the total limit on games (as opposed to the limits on individual games), the total limit on screen time (as opposed to individual limits on screen time), the start and stop times of device downtime (as opposed to also including exceptions defined by the authorizing device for the device downtime), etc.).

The above-described manner of displaying a notification at the restricted device with initial usage restriction settings made by the authorizing device allows the electronic device to provide for an efficient manner of providing information of such settings to the user of the restricted device, which enhances the operability of the device and makes the user-device interface more efficient (e.g., by allowing the user to interact with the device with fewer inputs), which, additionally, reduces power usage and improves battery life of the device by enabling the user to use the device more quickly and efficiently.

It should be understood that the particular order in which the operations in FIGS. 15A-15G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1300) are also applicable in an analogous manner to method 1500 described above with respect to FIGS. 15A-15G For example, the methods of updating restriction settings at one electronic device with permission of another electronic device or user account described above with reference to method 1500, usage restriction settings, etc. optionally have one or more of the characteristics of the usage metric dashboard user interface, usage metrics, notification metrics, device pickup metrics, usage restriction settings, etc. described herein with reference to other methods described herein (e.g., methods 700, 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 15A-15G are, optionally, implemented by components depicted in FIGS. 1A-1B. For example, displaying operation 1572 and receiving operations 1504, 1526, 1560, and 1568 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to control and/or present device usage information to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present or control device usage in a meaningful way to the user. Accordingly, use of such personal information data enables users to more personalized delivery of such services. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of presenting information about device usage, the present technology can be configured to allow users to select to "opt in" or "opt out" of participation in the collection of personal information data during registration for services or anytime thereafter. In another example, users can select not to provide user-based or device-based usage data for the determination of device usage and/or control of such usage. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, device usage information can be determined by inferring device usage based on non-personal information data or a bare minimum amount of personal information, such as the content being requested by the device associated with a user, other non-personal information available to the device, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display and one or more input devices:

while enforcing one or more usage limits for one or more applications that define an amount of time the one or more applications can be accessed, the one or more applications including a first application of a plurality of applications installed on the electronic device, detecting an event that corresponds to activation of an auxiliary function of the first application, wherein the auxiliary function of the first application is a function that includes displaying content associated with the first application without displaying a primary user interface of the first application; and in response to detecting the event that corresponds to activation of the auxiliary function of the first application:

in accordance with a determination that an amount of time the first application has been accessed has exceeded a usage limit for the first application, suppressing the auxiliary function without displaying the content associated with the first application; and in accordance with a determination that the amount of time the first application has been accessed has not exceeded the usage limit for the first application, performing the auxiliary function including displaying the content associated with the first application without displaying the primary user interface of the first application.

2. The method of claim 1, wherein:

the auxiliary function comprises presenting a first type of indication of a notification associated with the first application in response to occurrence of an event corresponding to activation of the notification.

3. The method of claim 2, wherein:

suppressing the auxiliary function comprises forgoing presenting the first type of indication in response to the notification associated with the first application; and performing the auxiliary function comprises presenting the first type of indication in response to the notification associated with the first application.

4. The method of claim 3, further comprising in accordance with the determination that that the amount of time the first application has been accessed has exceeded the usage limit for the first application:

including a visual indication of the first type of indication in a notification history user interface, the notification history user interface further comprising one or more indications of notifications generated by one or more applications other than the first application.

5. The method of claim 2, wherein suppressing the auxiliary function comprises forgoing presenting the first type of indication in response to the notification generated by the first application, and the method further comprises:

after suppressing auxiliary function of the first application:

determining that the usage limit for the first application is no longer exceeded; and in response to determining that the usage limit for the first application is no longer exceeded, presenting the indication for the notification generated by the first application.

6. The method of claim 1, wherein:

the auxiliary function comprises displaying a widget user interface showing one or more secondary user interfaces of one or more applications, including a secondary user interface of the first application;

the event that corresponds to activation of the auxiliary function includes a request to display the widget user interface; and suppressing the auxiliary function comprises displaying the widget user interface while suppressing the secondary user interface of the first application.

7. The method of claim 1, wherein:

the auxiliary function comprises presenting visual indications of one or more applications, including the first application, for which suggestion criteria have been met in a suggestions user interface;

the event that corresponds to activation of the auxiliary function includes a request to present visual indications of the one or more applications for which the suggestion criteria have been met in the suggestions user interface; and suppressing the auxiliary function comprises presenting the suggestions user interface without presenting a visual indication of the first application.

8. The method of claim 1, wherein:

the auxiliary function comprises displaying web content associated with the first application in a browser user interface;

the event that corresponds to activation of the auxiliary function includes a request to display web content associated with the first application in the browser user interface; and suppressing the auxiliary function comprises preventing access to the web content associated with the first application.

9. The method of claim 8, wherein preventing access to the web content associated with the first application comprises:

loading the web content associated with the first application from a first website and forgoing displaying the web content associated with the first application.

10. The method of claim 8, wherein preventing access to the web content associated with the first application comprises:

forgoing displaying the web content associated with the first application while maintaining display of one or more user interface elements in the browser user interface for navigating to another website.

11. The method of claim 8, further comprising:

while the usage limit for the first application is exceeded, detecting a second event that corresponds to a request to view second web content from a second website in the browser user interface;

in response to detecting the second event that corresponds to a request to view the second web content from the second website in the browser user interface while the usage limit for the first application is exceeded:

in accordance with a determination that the second website is associated with the first application, forgoing displaying the second web content; and in accordance with a determination that the second website is associated with a second application and that restriction criteria for the second application are not met, displaying the second web content.

12. The method of claim 1, wherein:

the auxiliary function comprises displaying media content in a picture-in-picture user interface of the first application, the picture-in-picture user interface partially overlapping one or more other user interfaces;

the event that corresponds to activation of the auxiliary function includes a request to display the media content in the picture-in-picture user interface of the first application; and suppressing the auxiliary function comprising suppressing the picture-in-picture user interface of the first application.

13. The method of claim 12, wherein suppressing the picture-in-picture user interface of the first application comprises:

in accordance with a determination that the usage limit for the first application is exceeded while displaying the picture-in-picture user interface of the first application:

obscuring the picture-in-picture user interface for a first period of time, and ceasing to display the picture-in-picture user interface after the first period of time.

14. The method of claim 1, wherein:

the auxiliary function comprises displaying a plurality of affordances for controlling playback of media content associated with the first application;

the event that corresponds to activation of the auxiliary function includes a request to display the plurality of affordances for controlling playback of the media content associated with the first application; and suppressing the auxiliary function comprises preventing the plurality of affordances from controlling playback of the media content associated with the first application.

15. The method of claim 14 wherein preventing the plurality of affordances from controlling playback of the media content associated with the first application comprises:

putting the plurality of affordances into an inactive state in which the electronic device ignores user inputs directed to the plurality of affordances for a first period of time; and after the first period of time, putting the plurality of affordances into a default state different from the inactive state.

16. An electronic device, comprising:

one or more processors;

memory; and one or more programs, wherein the one or more programs are stored in the memory and configured to be executed by the one or more processors, the one or more programs including instructions for:

while enforcing one or more usage limits for one or more applications that define an amount of time the one or more applications can be accessed, the one or more applications including a first application of a plurality of applications installed on the electronic device, detecting an event that corresponds to activation of an auxiliary function of the first application, wherein the auxiliary function of the first application is a function that includes displaying content associated with the first application without displaying a primary user interface of the first application; and in response to detecting the event that corresponds to activation of the auxiliary function of the first application:

in accordance with a determination that an amount of time the first application has been accessed has exceeded a usage limit for the first application, suppressing the auxiliary function without displaying the content associated with the first application; and in accordance with a determination that the amount of time the first application has been accessed has not exceeded the usage limit for the first application, performing the auxiliary function including displaying the content associated with the first application without displaying the primary user interface of the first application.

17. The electronic device of claim 16, wherein:

the auxiliary function comprises displaying a widget user interface showing one or more secondary user interfaces of one or more applications, including a secondary user interface of the first application;

the event that corresponds to activation of the auxiliary function includes a request to display the widget user interface; and suppressing the auxiliary function comprises displaying the widget user interface while suppressing the secondary user interface of the first application.

18. The electronic device of claim 16, wherein:

the auxiliary function comprises presenting visual indications of one or more applications, including the first application, for which suggestion criteria have been met in a suggestions user interface;

the event that corresponds to activation of the auxiliary function includes a request to present visual indications of the one or more applications for which the suggestion criteria have been met in the suggestions user interface; and suppressing the auxiliary function comprises presenting the suggestions user interface without presenting a visual indication of the first application.

19. The electronic device of claim 16, wherein:

the auxiliary function comprises displaying web content associated with the first application in a browser user interface;

the event that corresponds to activation of the auxiliary function includes a request to display web content associated with the first application in the browser user interface; and suppressing the auxiliary function comprises preventing access to the web content associated with the first application.

20. The electronic device of claim 19, wherein the one or more programs further include instructions for:

while the usage limit for the first application is exceeded, detecting a second event that corresponds to a request to view second web content from a second website in the browser user interface;

in response to detecting the second event that corresponds to a request to view the second web content from the second website in the browser user interface while the usage limit for the first application is exceeded:

in accordance with a determination that the second website is associated with the first application, forgoing displaying the second web content; and in accordance with a determination that the second website is associated with a second application and that restriction criteria for the second application are not met, displaying the second web content.

21. The electronic device of claim 16, wherein:

the auxiliary function comprises displaying media content in a picture-in-picture user interface of the first application, the picture-in-picture user interface partially overlapping one or more other user interfaces;

the event that corresponds to activation of the auxiliary function includes a request to display the media content in the picture-in-picture user interface of the first application; and suppressing the auxiliary function comprising suppressing the picture-in-picture user interface of the first application.

22. The electronic device of claim 21, wherein suppressing the picture-in-picture user interface of the first application comprises:

in accordance with a determination that the usage limit for the first application is exceeded while displaying the picture-in-picture user interface of the first application:

obscuring the picture-in-picture user interface for a first period of time, and ceasing to display the picture-in-picture user interface after the first period of time.

23. A non-transitory computer readable storage medium storing one or more programs, the one or more programs comprising instructions, which when executed by one or more processors of an electronic device, cause the electronic device to:

while enforcing one or more usage limits for one or more applications that define an amount of time the one or more applications can be accessed, the one or more applications including a first application of a plurality of applications installed on the electronic device, detect an event that corresponds to activation of an auxiliary function of the first application, wherein the auxiliary function of the first application is a function that includes displaying content associated with the first application without displaying a primary user interface of the first application; and in response to detecting the event that corresponds to activation of the auxiliary function of the first application:

in accordance with a determination that an amount of time the first application has been accessed has exceeded a usage limit for the first application, suppress the auxiliary function without displaying the content associated with the first application; and in accordance with a determination that the amount of time the first application has been accessed has not exceeded the usage limit for the first application, perform the auxiliary function including displaying the content associated with the first application without displaying the primary user interface of the first application.

24. The non-transitory computer readable storage medium of claim 17, wherein:

the auxiliary function comprises displaying a widget user interface showing one or more secondary user interfaces of one or more applications, including a secondary user interface of the first application;

the event that corresponds to activation of the auxiliary function includes a request to display the widget user interface; and suppressing the auxiliary function comprises displaying the widget user interface while suppressing the secondary user interface of the first application.

25. The non-transitory computer readable storage medium of claim 23, wherein:

the auxiliary function comprises presenting visual indications of one or more applications, including the first application, for which suggestion criteria have been met in a suggestions user interface;

the event that corresponds to activation of the auxiliary function includes a request to present visual indications of the one or more applications for which the suggestion criteria have been met in the suggestions user interface; and suppressing the auxiliary function comprises presenting the suggestions user interface without presenting a visual indication of the first application.

26. The non-transitory computer readable storage medium of claim 23, wherein:

the auxiliary function comprises displaying web content associated with the first application in a browser user interface;

the event that corresponds to activation of the auxiliary function includes a request to display web content associated with the first application in the browser user interface; and suppressing the auxiliary function comprises preventing access to the web content associated with the first application.

27. The non-transitory computer readable storage medium of claim 26, wherein the instructions, which when executed by the one or more processors of the electronic device, further cause the electronic device to:

while the usage limit for the first application is exceeded, detect a second event that corresponds to a request to view second web content from a second website in the browser user interface;

in response to detecting the second event that corresponds to a request to view the second web content from the second website in the browser user interface while the usage limit for the first application is exceeded:

in accordance with a determination that the second website is associated with the first application, forgo displaying the second web content; and in accordance with a determination that the second website is associated with a second application and that restriction criteria for the second application are not met, display the second web content.

28. The non-transitory computer readable storage medium of claim 23, wherein:

the auxiliary function comprises displaying media content in a picture-in-picture user interface of the first application, the picture-in-picture user interface partially overlapping one or more other user interfaces;

the event that corresponds to activation of the auxiliary function includes a request to display the media content in the picture-in-picture user interface of the first application; and suppressing the auxiliary function comprising suppressing the picture-in-picture user interface of the first application.

29. The non-transitory computer readable storage medium of claim 28, wherein suppressing the picture-in-picture user interface of the first application comprises:

in accordance with a determination that the usage limit for the first application is exceeded while displaying the picture-in-picture user interface of the first application:

obscuring the picture-in-picture user interface for a first period of time, and ceasing to display the picture-in-picture user interface after the first period of time.

* * * * *